(12) United States Patent
Recker et al.

(10) Patent No.: US 10,009,987 B2
(45) Date of Patent: Jun. 26, 2018

(54) WIRELESS LIGHTING SYSTEM WITH CAMERA OPERATION

(71) Applicant: Wireless Environment, LLC, Mayfield Village, OH (US)

(72) Inventors: Michael V. Recker, Gaithersburg, MD (US); David B. Levine, Pepper Pike, OH (US)

(73) Assignee: WIRELESS ENVIRONMENT, LLC, Mayfield Village, OH (US)

( * ) Notice: Subject to any disclaimer, the term of this patent is extended or adjusted under 35 U.S.C. 154(b) by 0 days. days.

(21) Appl. No.: 15/726,196

(22) Filed: Oct. 5, 2017

(65) Prior Publication Data
US 2018/0049300 A1    Feb. 15, 2018

Related U.S. Application Data

(63) Continuation of application No. 15/147,422, filed on May 5, 2016, now Pat. No. 9,807,858, which is a continuation of application No. 14/627,214, filed on Feb. 20, 2015, now Pat. No. 9,351,353, which is a continuation of application No. 13/315,414, filed on Dec. 9, 2011, now Pat. No. 8,994,276, which is a continuation-in-part of application No. 12/942,134, filed on Nov. 9, 2010, now Pat. No. 8,829,799, which is a continuation-in-part of application No. 12/903,273, filed on Oct. 13, 2010, now Pat. No. 8,519,566, which is a continuation-in-part of application No. 12/827,574, filed on Jun. 30, 2010, (Continued)

(51) Int. Cl.
H05B 37/02    (2006.01)
H05B 33/08    (2006.01)
H02J 9/02    (2006.01)

(52) U.S. Cl.
CPC ............ *H05B 37/0272* (2013.01); *H02J 9/02* (2013.01); *H05B 33/0803* (2013.01); *H05B 33/0854* (2013.01); *H05B 33/0872* (2013.01); *H05B 37/0218* (2013.01); *H05B 37/0227* (2013.01); *H05B 37/0281* (2013.01); *Y02B 10/72* (2013.01); *Y10T 307/359* (2015.04)

(58) Field of Classification Search
None
See application file for complete search history.

(56) References Cited

U.S. PATENT DOCUMENTS 8,053,994 B2    11/2011    Liu et al.
8,138,690 B2    3/2012    Chemel et al.
(Continued)

*Primary Examiner* — Dedei K Hammond
(74) *Attorney, Agent, or Firm* — Finnegan, Henderson, Farabow, Garrett & Dunner, LLP

(57) ABSTRACT

A power management system for a lighting circuit may include a grid shifting controller that includes a processor and a connection to an external power source. The power management system may also include a communication interface associated with the grid shifting controller. The grid shifting controller may be configured to provide control information to a processor of at least one grid shifting electrical fixture over the communication interface, the control information being configured to direct the at least one grid shifting electrical fixture on the use of power from the external power source and an energy storage device associated with the at least one grid shifting electrical fixture.

21 Claims, 73 Drawing Sheets

Related U.S. Application Data now Pat. No. 8,491,159, which is a continuation-in-part of application No. 12/772,563, filed on May 3, 2010, now Pat. No. 8,362,713, which is a continuation-in-part of application No. 12/626,640, filed on Nov. 26, 2009, now Pat. No. 8,033,686, which is a continuation-in-part of application No. 11/847,509, filed on Aug. 30, 2007, now Pat. No. 8,669,716, which is a continuation-in-part of application No. 11/692,075, filed on Mar. 27, 2007, now Pat. No. 8,203,445.

(60) Provisional application No. 61/421,355, filed on Dec. 9, 2010, provisional application No. 61/409,099, filed on Nov. 1, 2010, provisional application No. 61/384,080, filed on Sep. 17, 2010, provisional application No. 61/246,362, filed on Sep. 28, 2009, provisional application No. 61/234,024, filed on Aug. 14, 2009, provisional application No. 61/186,097, filed on Jun. 11, 2009, provisional application No. 61/167,556, filed on Apr. 8, 2009, provisional application No. 61/167,655, filed on Apr. 8, 2009, provisional application No. 61/150,477, filed on Feb. 6, 2009, provisional application No. 61/118,257, filed on Nov. 26, 2008, provisional application No. 61/118,245, filed on Nov. 26, 2008, provisional application No. 60/786,636, filed on Mar. 28, 2006.

(56) References Cited

U.S. PATENT DOCUMENTS

| | | | |
|---|---|---|---|
| 9,351,353 B2 | 5/2016 | Recker et al. | |
| 2008/0036401 A1* | 2/2008 | Erhardt | H05B 37/0245 315/349 |
| 2010/0328930 A1 | 12/2010 | Wu et al. | |
| 2011/0060701 A1* | 3/2011 | Verfuerth | F21S 8/086 705/500 |

* cited by examiner

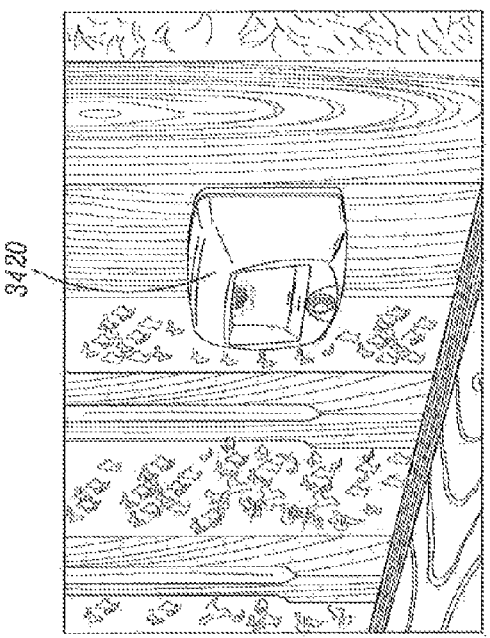
FIG. 34

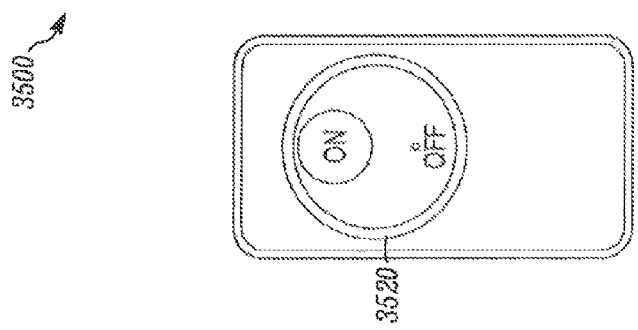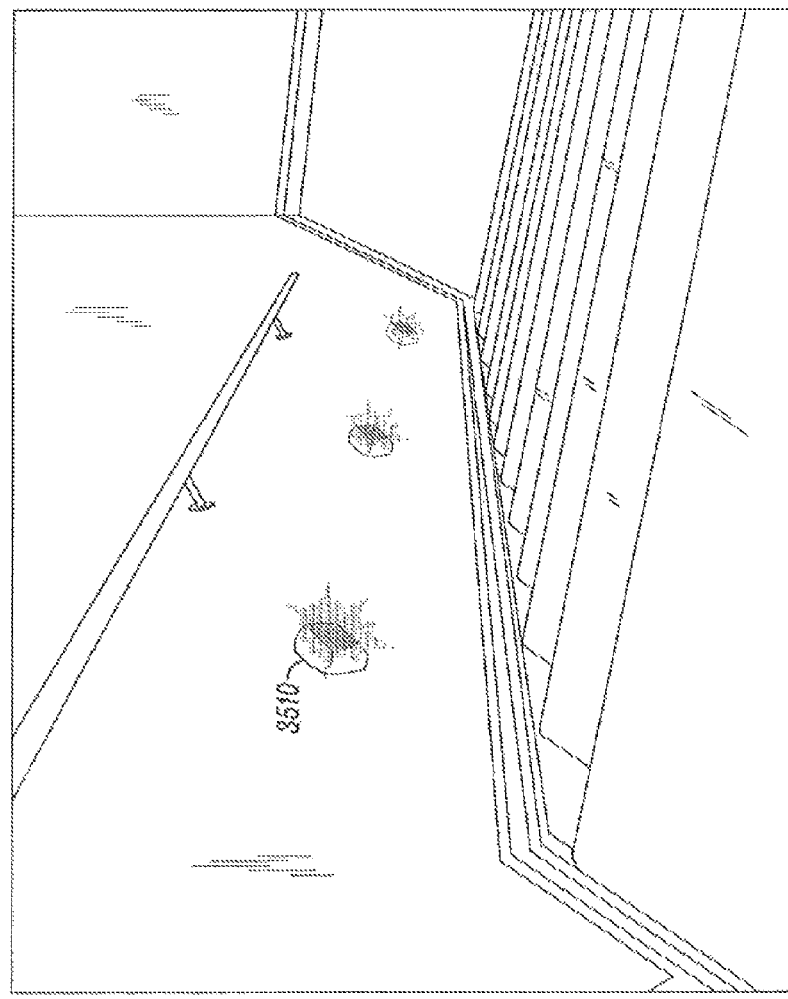
FIG. 35

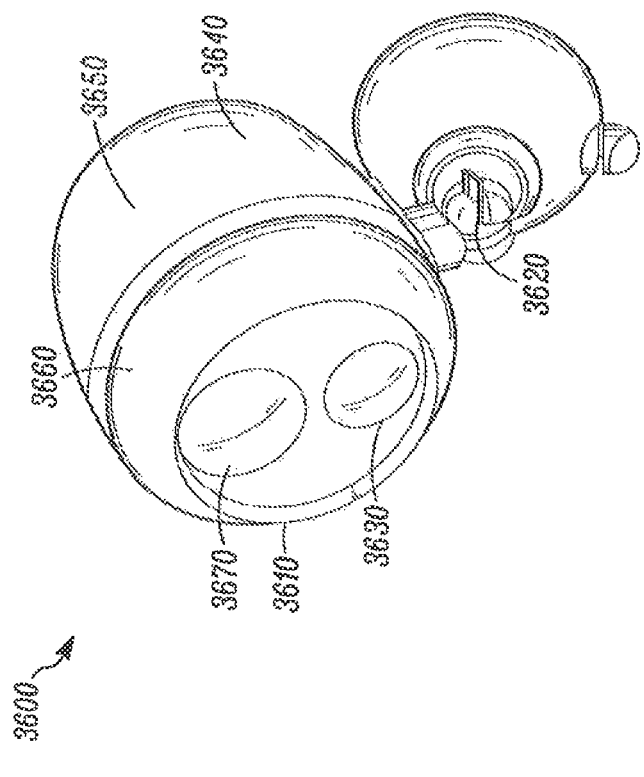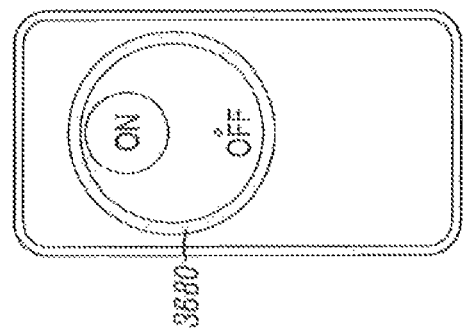
FIG. 36

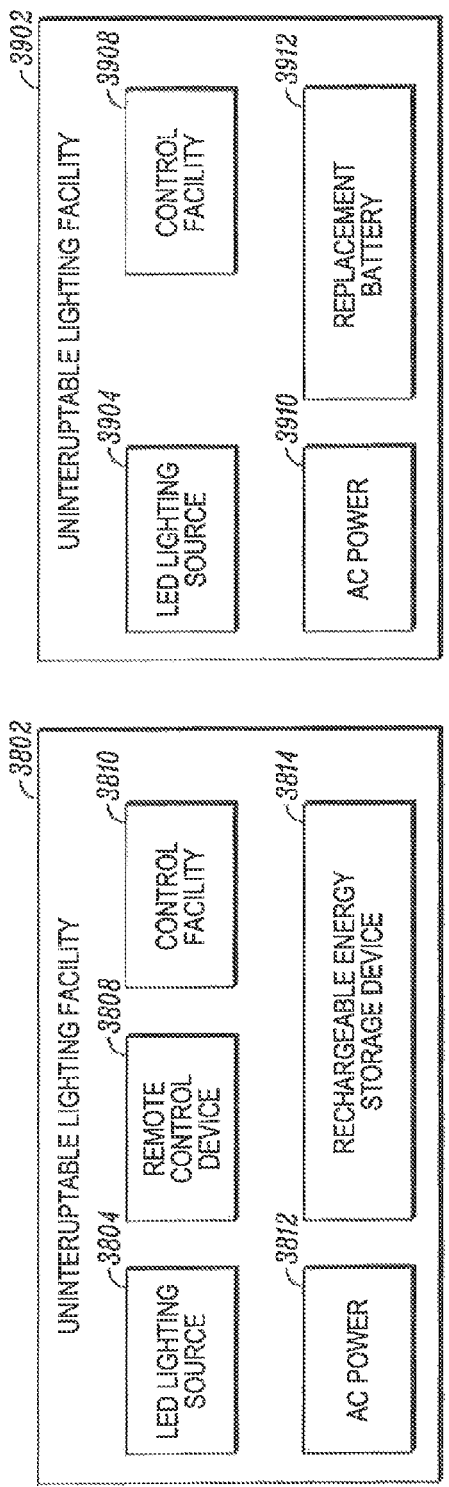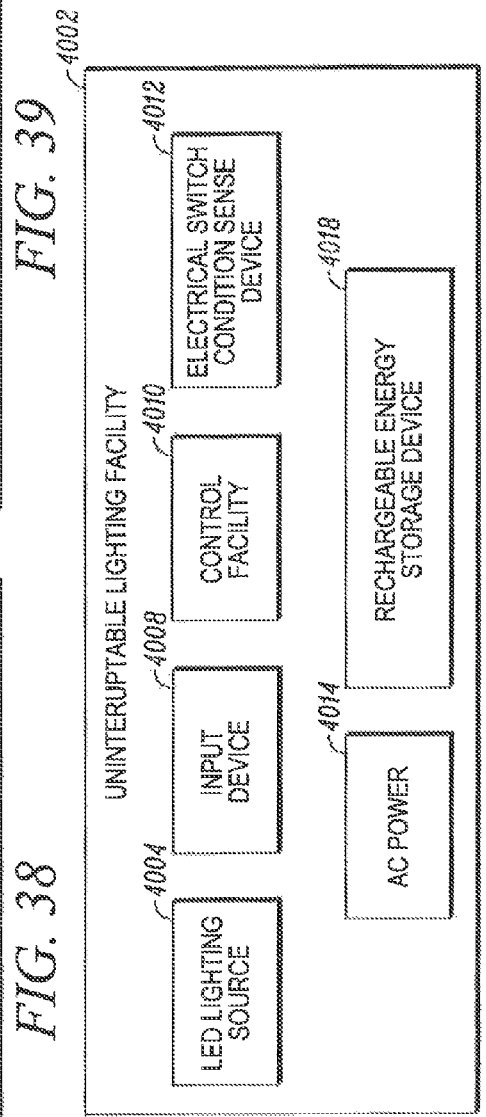

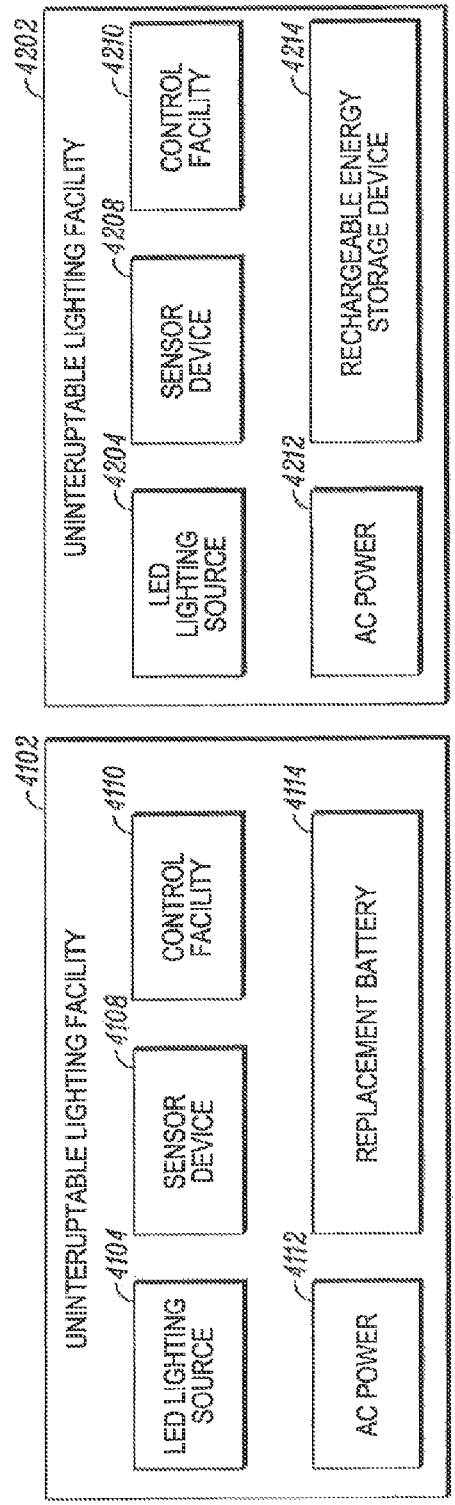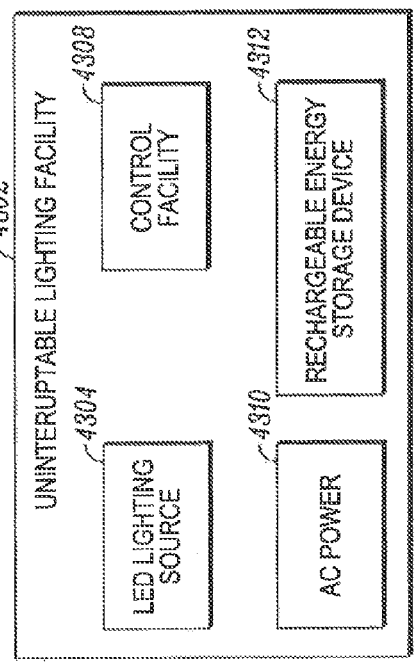

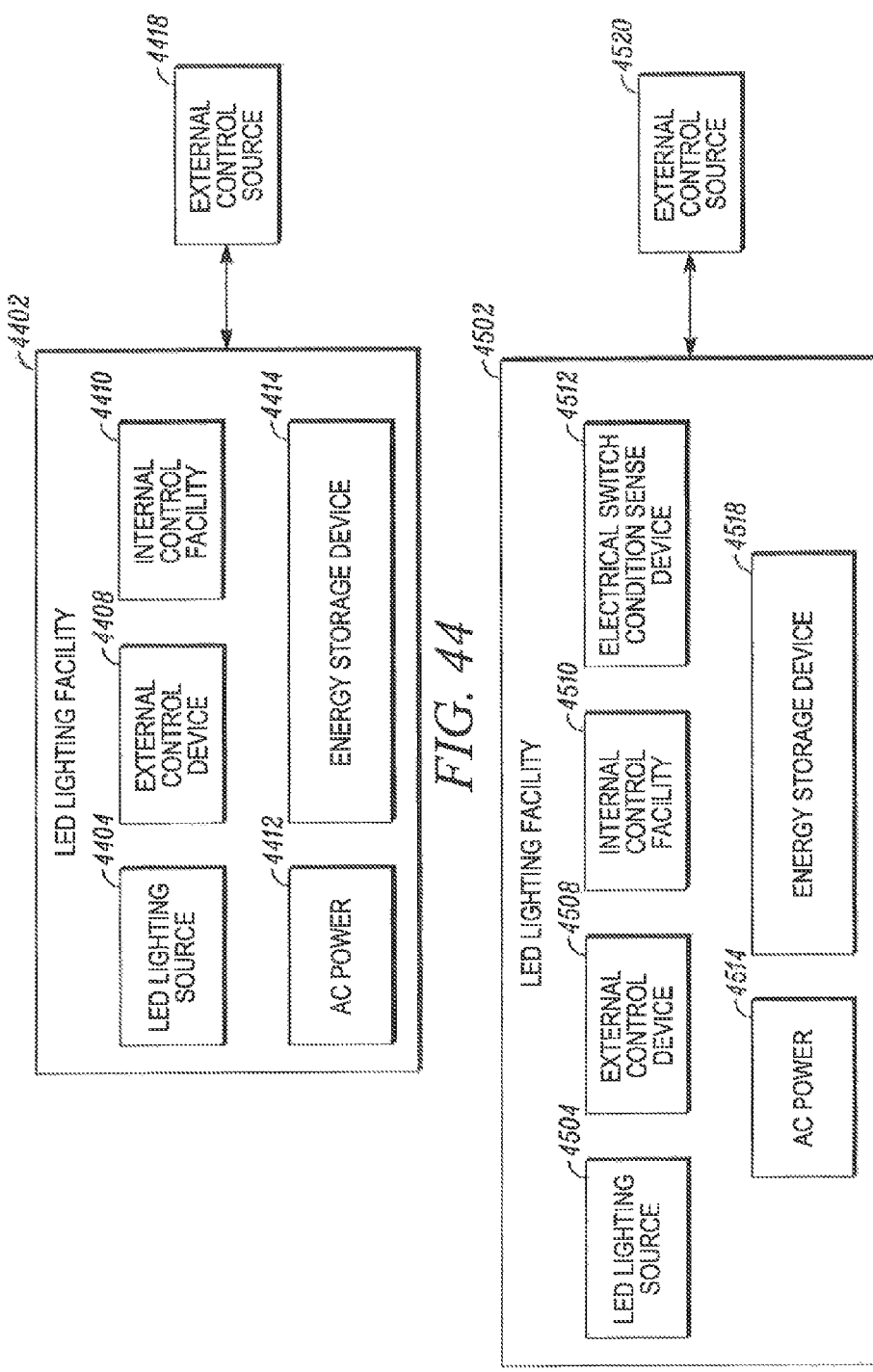

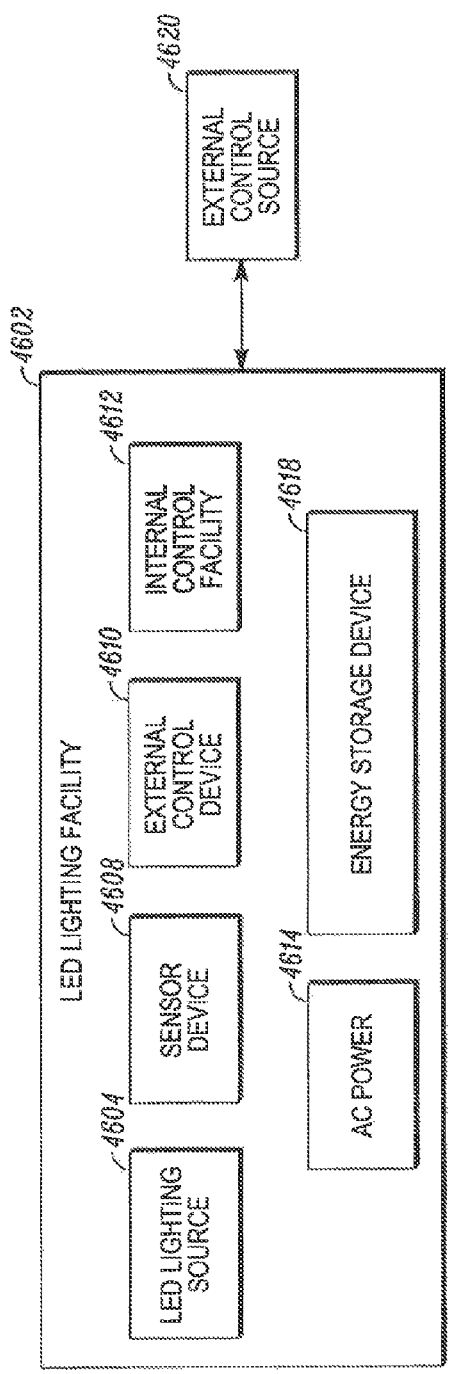
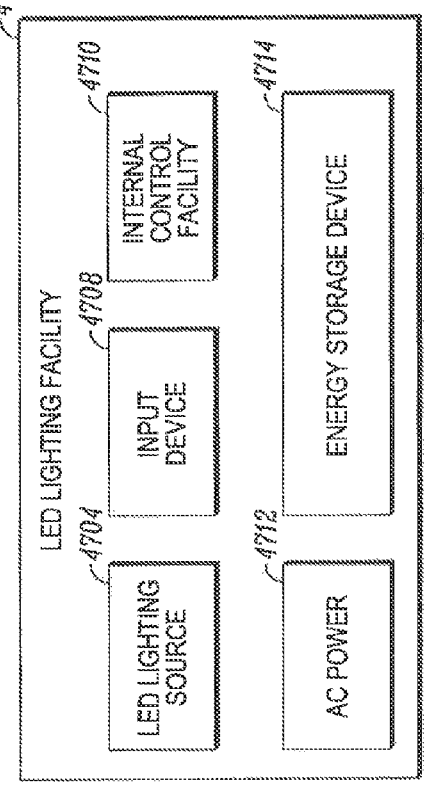
FIG. 46
FIG. 47

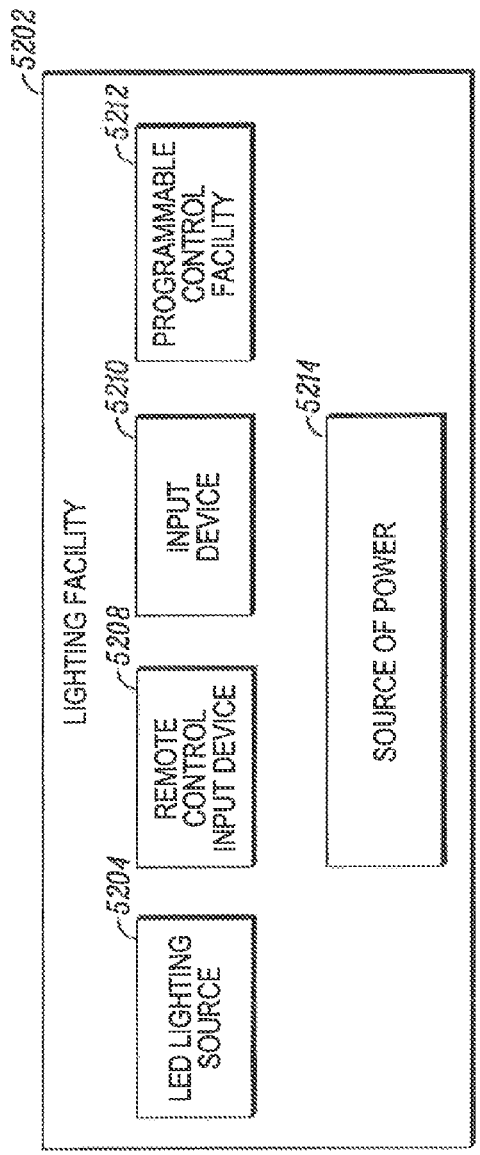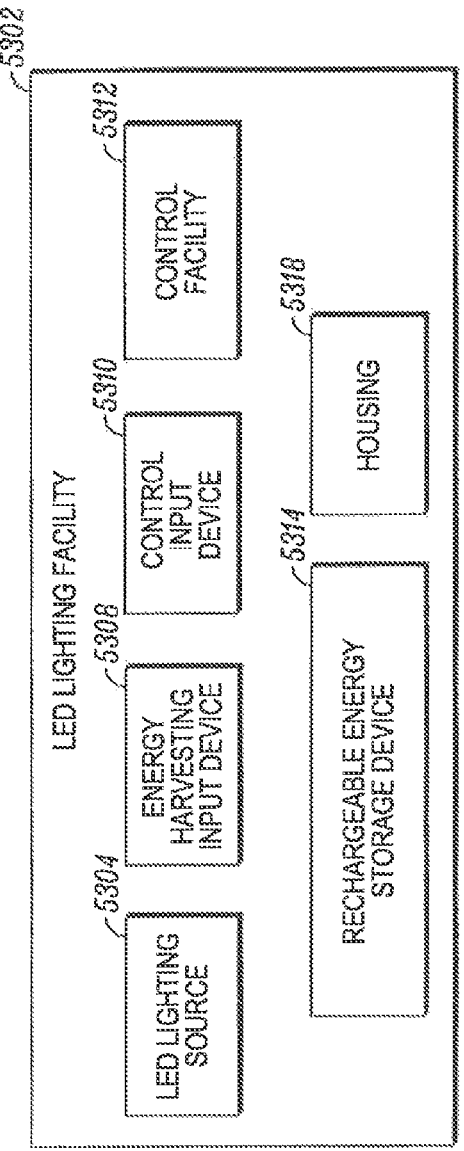

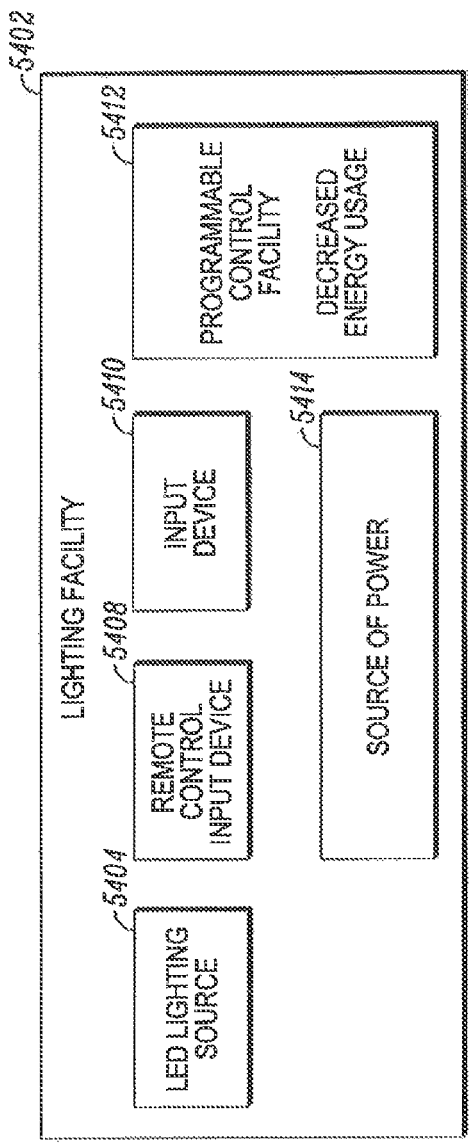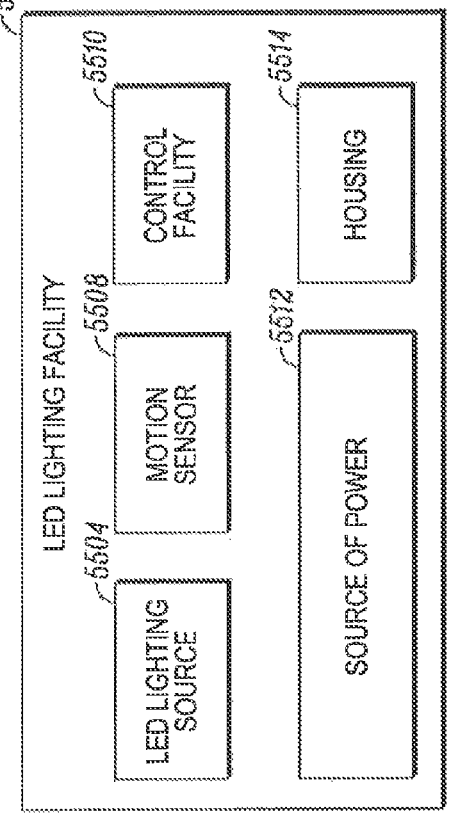

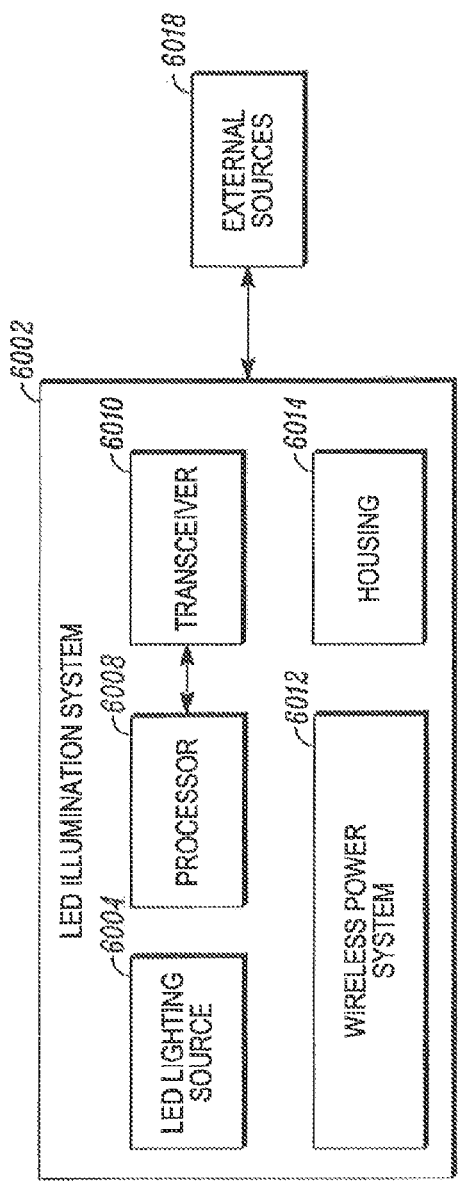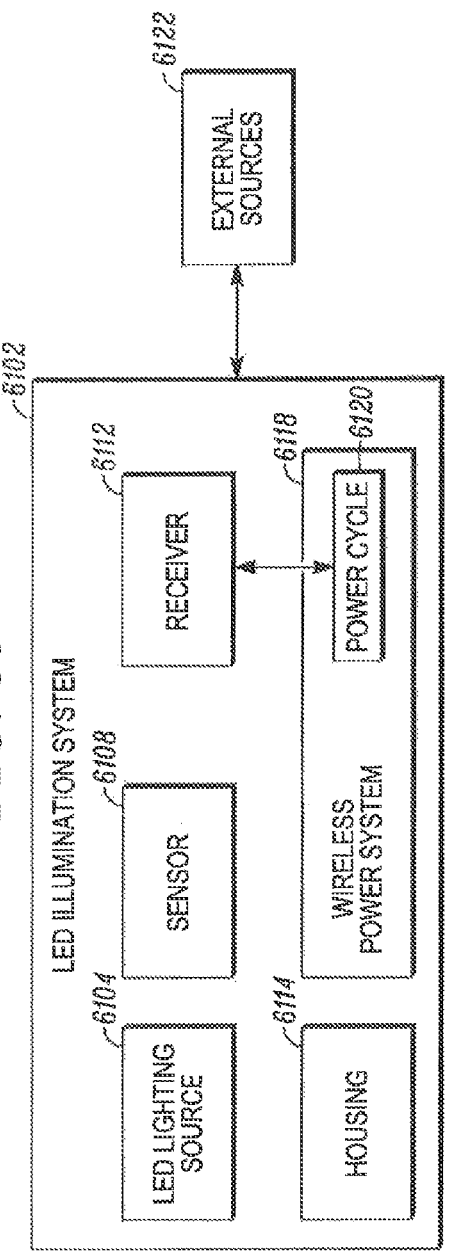

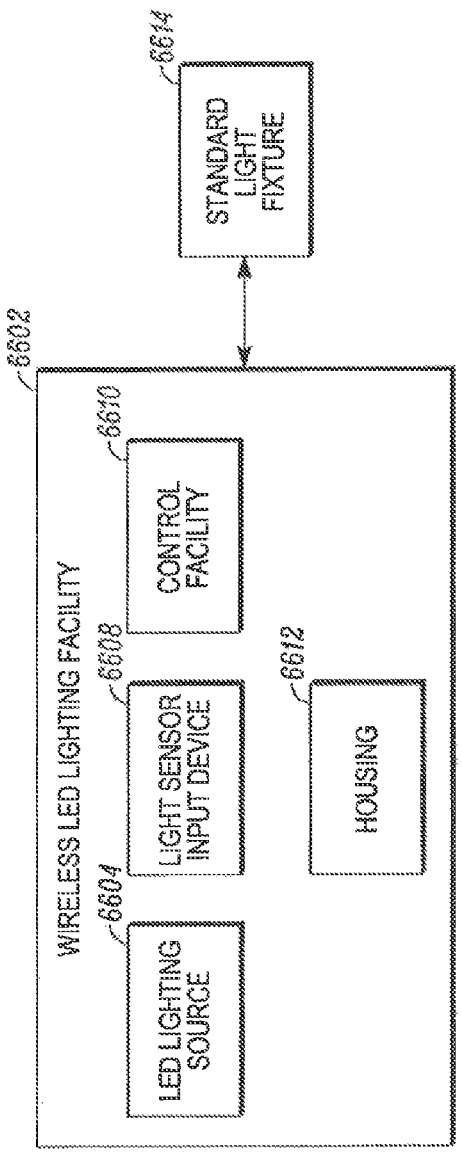
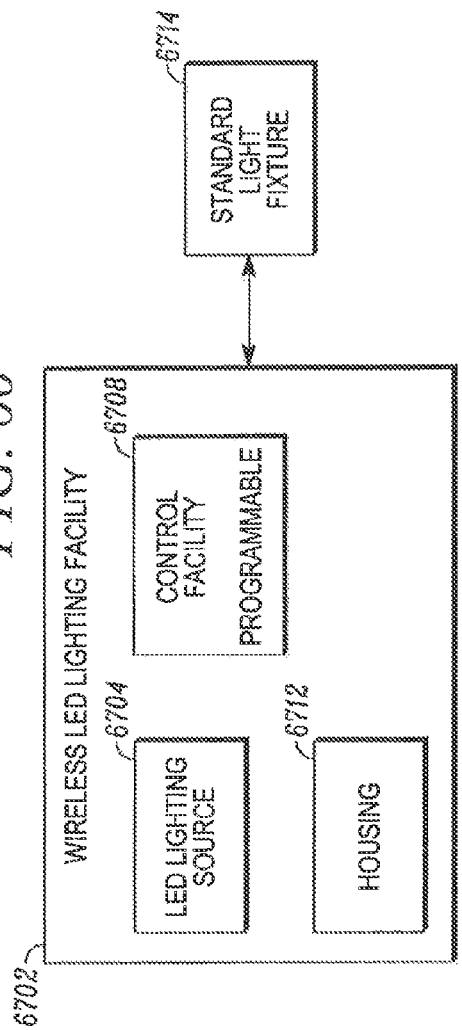

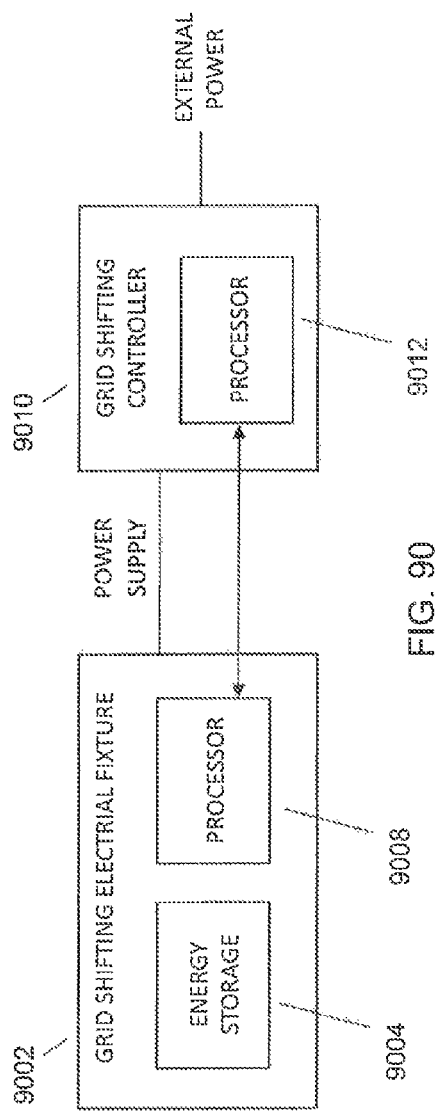
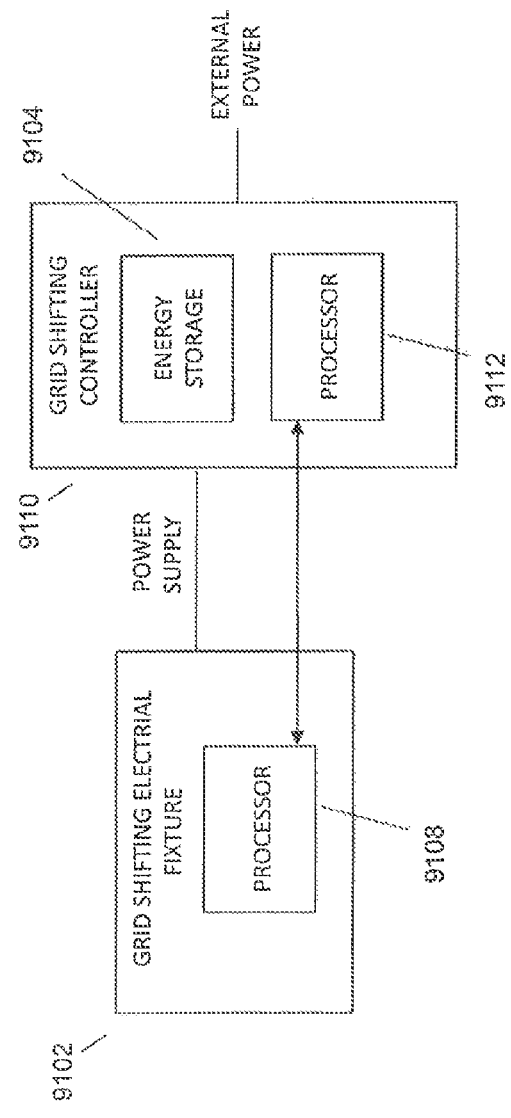

WIRELESS LIGHTING SYSTEM WITH CAMERA OPERATION

CROSS-REFERENCE TO RELATED APPLICATIONS

This application is a continuation of U.S. application Ser. No. 15/147,422, filed May 5, 2016, which is a continuation of U.S. application Ser. No. 14/627,214, filed Feb. 20, 2015, which is a continuation of U.S. application Ser. No. 13/315,414, filed Dec. 9, 2011, which claims priority to U.S. Provisional Application No. 61/421,355 filed Dec. 9, 2010, entitled INTELLIGENT POWER MANAGEMENT OF EMERGENCY LIGHTING DEVICES. Further, U.S. application Ser. No. 13/315,414 is a continuation-in-part of copending U.S. Nonprovisional application Ser. No. 12/942,134 filed Nov. 9, 2010, entitled AUTONOMOUS GRID SHIFTING LIGHTING AND DEVICE.

U.S. Nonprovisional application Ser. No. 12/942,134 filed Nov. 9, 2010 claims the benefit of U.S. Provisional Application No. 61/409,099 filed Nov. 1, 2010, entitled GRID SHIFTING SYSTEM FOR LIGHTING DEVICES. Also U.S. Nonprovisional application Ser. No. 12/942,134 is a continuation-in-part of the copending U.S. Nonprovisional application Ser. No. 12/903,273 filed Oct. 13, 2010, entitled REMOTE SWITCH SENSING IN LIGHT DEVICES.

U.S. Nonprovisional application Ser. No. 12/903,273 claims the benefit of U.S. Provisional Patent Application No. 61/384,080 filed Sep. 17, 2010, entitled REMOTE SWITCH SENSING IN LIGHTING DEVICES. Also U.S. Nonprovisional application Ser. No. 12/903,273 is a continuation-in-part of the following five copending Nonprovisional Patent Applications having the serial nos., filing dates, and titles as follows:

Ser. No. 12/827,574 filed Jun. 30, 2010, entitled WIRELESS EMERGENCY LIGHTING SYSTEM;

Ser. No. 12/772,563 filed May 3, 2010, entitled WIRELESS LIGHTING DEVICES AND GRID-SHIFTING APPLICATIONS;

Ser. No. 12/626,640 filed Nov. 26, 2009, entitled WIRELESS LIGHTING DEVICES AND APPLICATION;

Ser. No. 11/847,509 filed Aug. 30, 2007, entitled WIRELESS LIGHT BULB; and

Ser. No. 11/692,075 filed Mar. 27, 2007, entitled WIRELESS LIGHTING.

U.S. patent application Ser. No. 12/626,640 claims priority to the following eight Provisional Patent Applications having the serial nos., filing dates, and titles as follows:

61/118,245 filed Nov. 26, 2008, entitled WIRELESS LIGHT BULB APPLICATIONS;

61/150,477 filed Feb. 6, 2009, entitled WIRELESS LIGHT BULB APPLICATIONS;

61/167,556 filed Apr. 8, 2009, entitled WIRELESS LIGHT BULB APPLICATIONS;

61/186,097 filed Jun. 11, 2009, entitled WIRELESS LIGHT BULB APPLICATIONS;

61/234,024 filed Aug. 14, 2009, entitled WIRELESS LIGHT BULB APPLICATIONS;

61/246,362 filed Sep. 28, 2009, entitled WIRELESS LIGHT BULB APPLICATIONS;

61/118,257 filed Nov. 26, 2008, entitled WIRELESS STAIR LIGHT APPLICATIONS; and

61/167,655 filed Apr. 8, 2009, entitled WIRELESS STAIR LIGHT.

U.S. patent application Ser. No. 11/692,075 claims priority to U.S. Provisional Application Ser. No. 60/786,636 filed Mar. 28, 2006, entitled WIRELESS LIGHTING SYSTEM.

Each of the foregoing applications is incorporated herein by reference in its entirety.

BACKGROUND

Field

The present invention is directed generally to devices and applications for the use of wireless control and wireless power in lighting devices. More particularly, the invention relates to the use of wireless control and wireless power in light emitting diode (LED) based devices primarily for illumination purposes.

Description of the Related Art

Conservation and management of electrical power are a growing concern with regard to both cost and environmental impact. In various lighting applications, the use of light emitting diodes (LEDs) for illumination is beginning to emerge as a lighting source with potential for addressing these concerns. LED light sources have a long life, are energy efficient, are durable and operate over a wide temperature range. While LED lighting is becoming an attractive option for certain applications, it is not optimal for many applications. Therefore, there is a need for improved LED lighting systems.

SUMMARY

The present invention is directed generally to devices and applications related to the use of wireless control and wireless power in light emitting diode (LED) based lighting devices. More particularly, the devices and applications according to various embodiments of the present invention make use of wireless control and wireless power in lighting devices to provide advantages in ease of installation, in the ability to install lighting in locations independent of a connection to wired power, in cost savings, in energy efficiency and in the reduction of energy consumption at times of peak demand through controls and power management and in safety, security, and convenience for the end user.

Wireless control, as in relation to lighting facilities of the present invention, may be defined as any control aspect that provides a controlling function to the lighting facility without the use of a wired connection, such as a wired control interface, wired power control, and the like. Control aspects may include, but are not limited to, a wireless remote control interface (e.g. RF remote control), a wireless power controller (e.g. control of the source of power to the LEDs, such as including integrated energy storage device(s) and AC power), a wireless control input (e.g. an environmental sensor input), internal programmed control (e.g. internal program store controlled through a state machine or processor), and the like. In embodiments, cost savings and power management may be implemented through wireless control. In embodiments, wireless control may enable a distributed intelligence architecture where the LED lighting facility may operate in an autonomous manner in response to its wireless control inputs or internal program. In embodiment, wireless control may be used in conjunction with wireless power to allow operation of the lighting facility completely independent of the power grid.

In some embodiments, wireless control allows the installation of the device in any indoor or outdoor location where light may be desired without the need for a wired connection to control it. In some embodiments, wireless control is used in a lighting device with a wired connection but allows an alternate method of control of the light rather than by its wired connection. In some embodiments, a lighting circuit may have multiple lights on the circuit, but wireless control built into the lights on that lighting circuit may allow them to be independently controlled.

Power sources that can be used stand-alone as described herein (i.e. not connected to a traditional AC power source) are defined as wireless power sources. A wireless power source may be an energy storage device such as a non-rechargeable battery, a rechargeable battery, a capacitor, a fuel cell, and the like. A wireless power source may be derived from an energy harvesting method such as using solar cells, capturing radiofrequency energy, converting kinetic energy to electrical energy (including converting motion or tension into electrical energy), converting thermal energy into electrical energy, converting wind energy into electrical energy, and the like. Multiple wireless power sources may be used together in some embodiments. For example, a light bulb with an integrated rechargeable battery may also contain solar cells on its housing and the ability to charge the integrated battery accordingly.

In some embodiments, a wireless power source integrated into the lighting device allows the installation of the lighting device in any indoor or outdoor location where light may be desired without the need for a wired connection to an AC power source. In other embodiments there is a wired connection to an AC power source, but the wireless power source is used when advantageous, for example as a backup power source in an emergency or as an alternative power source to provide energy efficiency or cost savings.

The embodiments described for the present invention may use wireless control and wireless power in conjunction with LEDs as a light source for illumination. In one embodiment, a power uninterruptable LED light with sensor-based control for transferring to internal power in the event of an AC power disruption is described. The power uninterruptable LED light may be designed in a housing type of a bulb, tube, lamp, fixture, retrofit fixture, and the like. The housing may contain internal wireless power in the form of an internal power source such as a rechargeable battery that can be used to power the light source upon a detected AC power disruption. For example, the power uninterruptable LED light may be a standard size light bulb that when plugged into a standard light socket acts normally as a light bulb, but in the event of an AC power disruption may use the internal power source to continue emitting light through the power disruption. Several forms of wireless control can be used with the disclosed invention including AC power sensing, impedance sensing of the lighting circuit to determine the on/off state of controlling switches, remote control in the form of a radio frequency receiver, sensors built into the housing such as a motion sensor or light sensor, and the like.

Another embodiment of the invention is directed to an externally controllable LED light in a housing type of a bulb, tube, lamp, fixture, retrofit fixture, and the like, that may receive commands from a power company or lighting control software to control the use of the wireless power source. For example, a load control switch or demand response mechanism reducing light intensity may be designed to control lighting to reduce power consumption during periods of peak usage of electricity. In the instance of reducing the intensity of the lights, the present invention instead may move the power switched off or reduced by the power company or lighting control software onto battery power, thus enabling the light to stay at the same intensity level while still reducing the power consumed from the AC power source. The source of the load control signal is external to the externally controllable LED light itself. This is "grid shifting" or storing energy from the grid to the integrated power source at one time and using that stored energy at another time when it is advantageous. This allows moving on and off of the AC power source using the integrated power source as an alternate power source and the control of that and other functions with external signals. In some embodiments, AC power and the integrated power source may be used simultaneously where the load is shared by the power sources. In such a case, the load on the AC power source may be reduced by some amount by transferring some amount of load to the integrated power source. The externally controllable LED light may also contain any form of wireless control which can also be controlled by the power company or lighting control software to enable, disable or set the functionality of the wireless control mechanism.

Another embodiment of the invention is directed to a wirelessly controlled LED light bulb containing an integrated power source where the wireless control is through built in sensors, program based intelligence, remote control based on a communication interface wirelessly, over the wire, and the like. With wireless control and wireless power integrated, the wirelessly controlled LED light bulb may operate autonomously in response to the input devices, internal timers, internal clock and/or internal program. It may have the ability to use the integrated power source autonomously for grid shifting, load shedding, independent control of the light sources on a single lighting circuit, backup power, energy harvesting when an energy harvesting power source is integrated in the bulb, or any application-specific function in which an integrated power source may be advantageous.

Another embodiment of the invention is directed to a wirelessly networked LED light with sensor-based control. The wirelessly networked LED light with sensor-based control may be designed in a housing type of a bulb, tube, lamp, fixture, retrofit fixture, battery powered fixture, and the like. Building a networking capability into a removable and replaceable wirelessly networked LED light bulb creates the ability to plug bulbs in such that they become part of the network without running new wiring (i.e. a plug and play lighting network). This is enabled by building the ability to receive control and programming over a network as well as forward or route traffic to other wirelessly networked LED lights that are part of the network into the lights themselves. If the wirelessly networked LED light is a removable device such as a bulb, tube or lamp, it may be installed as a light source and a node in the lighting network by installing it in a standard socket. Networked bulbs, tubes, lamps, fixtures, retrofit fixtures and battery powered fixtures may operate in a coordinated fashion, where one or more light sources are operating with battery only, battery and AC or AC only power sources along with any control source within the group. In some embodiments, the source of the control for one or more lights in the group may be one of the lights in the group in response to a control input that light received. In addition to coordinating operation, the network may be used for communication purposes such that an extensible lighting network can be installed by installing bulbs, tubes, lamps and battery power fixtures in existing locations that do not require an electrician for new wiring or special hardware other than what is contained with the wirelessly networked LED light itself.

Another embodiment of the invention is directed to a centralized power outage system bridged to a networked lighting system. The centralized power outage control may come in the form of a module that detects a disruption in the AC power source and transmits to a system of bulbs, tubes, lamps, fixtures, retrofit fixtures, battery powered fixtures, and the like, to turn on, switch to backup power or change their mode of operation in some manner in response to the detected disruption in power. The power outage module may be connected to an emergency lighting circuit to transmit control to a networked lighting system when the emergency lighting circuit attempts to turn on emergency lighting. Due to its integrated power source, a wirelessly controlled and/or wirelessly powered LED light may continue to operate in an emergency situation as controlled by a power outage control module.

Another embodiment of the invention is directed to a sensor-based wirelessly controlled LED light. The sensor-based wirelessly controlled LED light may be designed in a housing type of a bulb, tube, lamp, fixture, retrofit fixture, and the like. In the embodiment, the sensor-based wirelessly controlled LED light is AC powered and contains input devices and the ability to autonomously respond to the input devices. For example, a daylight harvesting LED light bulb may adjust the light intensity based on the ambient light level detected by a light sensor built into the bulb. In an alternate version, the light sensor is built into a remote transmitter that may transmit the ambient light reading directly to one or more sensor-based wirelessly controlled LED lights that can then adjust the light intensity of the LED light source based on a configured net light that needs to be detected at the light sensor. The sensor-based wirelessly controlled LED light may have the ability to learn from the input devices. For example, a sensor-based wirelessly controlled LED light with a motion sensor and real time clock built into the device may learn that motion detections will be high at a certain time of the day. An internal program may schedule the light to turn on automatically at that time of day rather than use the motion sensor. The internal program may dynamically change the schedule to move the time the light turns on automatically to earlier or later times based on the motion detection input.

One advantage of the present invention is the ability to build intelligent lighting systems where wireless control and wireless power along with the ability to take advantage of the additional functionality is built into the light itself. One advantage of the present invention is the ability to provide battery back-up power within an LED bulb or tube that can fit into conventional AC powered sockets. In some embodiments, these lights are able to provide light in the event of power outage, and in other embodiments these lights may be used to reduce demand on the power grid by switching to battery power at peak times, then recharging off peak. One advantage of the present invention is the ability to create programmable light bulbs, tubes or lamps with integrated sensors. These intelligent lights may contain integrated controls that turn on, off, or change light intensity based on a programmable schedule, the detection of sensor inputs, or a change in lighting conditions. One advantage of the present invention is the ability to communicate controls to and between these LED lighting facilities. In some embodiments, intelligent lights may contain wireless transmitters and receivers allowing them to coordinate functions within groups of light bulbs or allowing them to receive control and programming over a network as well as forward or route traffic to other light bulbs that are part of the network. Thus, for example, a removable light bulb may also act as a node in a network of light bulbs providing the ability to deploy a lighting installation and a network to control the lighting installation by plugging light bulbs into sockets.

It should be appreciated that combinations of the foregoing concepts and additional concepts discussed in greater detail below are contemplated as being part of the inventive subject matter disclosed herein. In particular, all combinations of claimed subject matter appearing at the end of this disclosure, or elsewhere herein, are contemplated as being part of the inventive subject matter.

These and other systems, methods, objects, features, and advantages of the present invention will be apparent to those skilled in the art from the following detailed description of the preferred embodiment and the drawings. All documents mentioned herein are hereby incorporated in their entirety by reference.

BRIEF DESCRIPTION OF THE FIGURES

The invention and the following detailed description of certain embodiments thereof may be understood by reference to the following figures:

FIG. 34 shows a use scenario of the stair light on a deck near the stair to the deck.

FIG. 35 shows a use scenario of three stair lights mounted on a stair way and an RF remote control.

FIG. 36 shows a perspective view of the RF Spotlight embodiment of a wireless lighting module.

FIG. 38 shows an embodiment for an uninterruptable lighting facility with control, remote control, AC power, and battery.

FIG. 39 shows an embodiment for an uninterruptable lighting facility with control, AC power, and removable battery.

FIG. 40 shows an embodiment for an uninterruptable lighting facility with input device, impedance, control, AC power, and battery.

FIG. 41 shows an embodiment for an uninterruptable lighting facility with a sensor, control, AC power, and removable battery.

FIG. 42 shows an embodiment for an uninterruptable lighting facility with sensor, control, AC power, and rechargeable battery.

FIG. 43 shows an embodiment for an uninterruptable lighting facility with AC power and rechargeable battery.

FIG. 44 shows an embodiment for an externally controllable light with external control with power shifting, internal control, AC power, and battery.

FIG. 45 shows an embodiment for an externally controllable light with external control, internal control, impedance sense, AC power, and battery.

FIG. 46 shows an embodiment for an externally controllable light with external control, internal control, sensor, AC power, and battery.

FIG. 47 shows an embodiment for an externally controllable light with internal load sharing control, AC power, and battery.

FIG. 52 shows an embodiment for remote control wireless light with power management control, programmability, remote, and battery.

FIG. 53 shows an embodiment for remote control wireless light with energy harvesting, battery, and control.

FIG. 54 shows an embodiment for remote control wireless light with power management control, programmability with learned behavior, remote, and battery.

FIG. 55 shows an embodiment for remote control wireless light with motion sensing, AC power, and battery.

FIG. 60 shows an embodiment for a networked light with battery and internal control source.

FIG. 61 shows an embodiment for a networked light with wireless power, wireless control, and power management.

FIG. 66 shows an embodiment for a sensor-based wirelessly controlled light with daylight harvesting and power management.

FIG. 67 shows an embodiment for a sensor-based wirelessly controlled light with AC power and programmability through switch settings.

FIG. 90 shows a block diagram of a grid shifting system containing an energy storage device in the electrical fixture.

FIG. 91 shows a block diagram of a grid shifting system containing an energy storage device in a external grid shifting controller.

Figure 1:
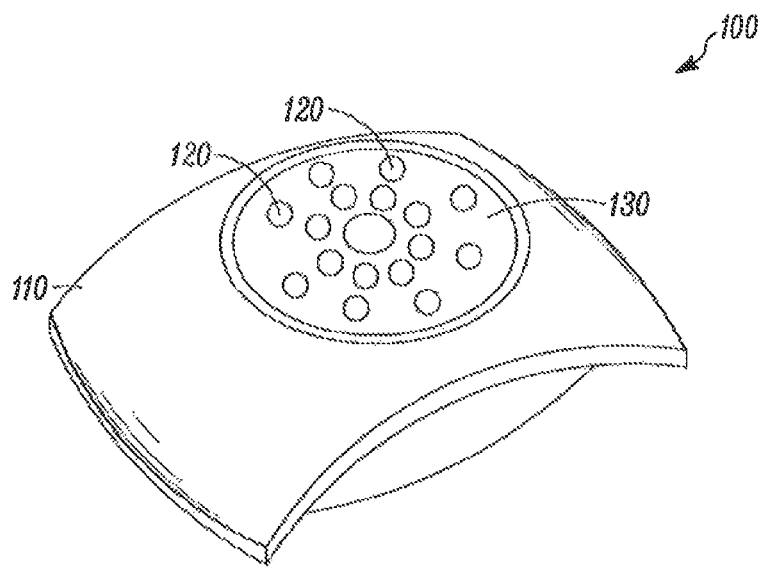
FIG. 1 shows a perspective view of one embodiment of a wireless lighting module.

While the invention has been described in connection with certain preferred embodiments, other embodiments would be understood by one of ordinary skill in the art and are encompassed herein.

All documents referenced herein are hereby incorporated by reference.

DETAILED DESCRIPTION

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation. Moreover, it is to be appreciated that the drawings may not be to scale.

As utilized herein, terms "component," "system," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips), optical disks (e.g., compact disk (CD), digital versatile disk (DVD)), smart cards, and flash memory devices (e.g., card, stick, key drive).

Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

The claimed subject matter is directed to wireless LED lighting. With reference to FIG. 1, illustrated is a perspective view of one embodiment of a wireless lighting module 100. In the illustrated embodiment, the wireless lighting module 100 includes a housing 110 and a plurality of LEDs 120. In one embodiment, the wireless lighting module 100 includes 16 LEDs. In alternative embodiments, the lighting module may include more LEDs 120 to provide greater illumination or fewer LEDs 120 to use less power. It is to be appreciated that the wireless lighting module 100 can include any number of LEDs 120, and the LEDs 120 can be positioned at substantially any locations with respect to one another as well as in comparison to the housing 110.

In one embodiment, the housing 110 is constructed of plastic. Alternatively, the housing 110 can be constructed of metal or any other known material. In one embodiment (not shown), the housing 110 includes a mounting device for mounting the wireless lighting module 100 to a wall, ceiling, cabinet, or other surface. Exemplary mounting devices include screws, nails, adhesive, suction cups, magnets, VELCRO, fixing posts, flanged heads of fasteners, and other known mounting devices. In this embodiment, the housing 110 is configured to be mounted under a cabinet or desk, on a mailbox, or on a wall or ceiling of a room, closet, attic, basement, garage, storage area, shed, wall unit, hallway, stairway, emergency exit path, or cabinet, or in any other indoor or outdoor location where light may be desired. In one embodiment, one wireless lighting module (e.g., the wireless lighting module 100) illuminates an area of 20 square feet. It is to be appreciated that the housing 110 can be any size and/or shape and is not limited to the depicted illustration (e.g., the housing 110 can be dome shaped, pyramid shaped, cylindrical.). According to another example, the housing 110 can form a rope light.

With continued reference to FIG. 1, the LEDs 120 of the wireless lighting module 100 are arranged in an array to disperse light over a desired area. In alternative embodiments (not shown), one or more LEDs 120 are arranged in a spotlight to focus light over a desired area. In one embodiment, the LEDs 120 are white. In an alternative embodiment, the LEDs 120 are colored. In such an embodiment, all of the LEDs in the wireless lighting module 100 may be of the same or different colors. When the LEDs in the wireless lighting module 100 are of different colors, the relative intensity of the LEDs may be controlled (e.g. via pulse-width modulation, constant current control, variable current control, or the like) to produce illumination in a variety of mixed colors. For example, the LEDs may include red, green, and blue LEDs and the mixed colors may include a substantial number of colors represented in an RGB color wheel of a certain resolution (e.g. 8-bit, 16-bit, 24-bit, and so on). Regardless of whether the LEDs are of different colors, controlling the intensity of one or more LEDs via pulse-width modulation may provide power savings, dimming, and so on.

In the illustrated embodiment, the wireless lighting module 100 further includes a light-transmitting cover 130. In one embodiment, the light-transmitting cover 130 is transparent. Alternatively, the cover may be colored or frosted. In one embodiment, the light-transmitting cover 130 is smooth. In alternative embodiments, the cover may be etched or otherwise textured. The light-transmitting cover 130 may have any desired shape. In an alternative embodiment (not shown), the module does not include a light-transmitting cover. In another embodiment, the wireless lighting module includes a filter (not shown).

In other embodiments, an optical lens or lenses or reflectors to direct the light, reflect the light or change the viewing angle of the LEDs. The housing of the unit may include any number of optical elements. The optical elements may serve to focus, diffuse, filter, collimate, or otherwise affect light produced by the LEDs. In embodiments, the optical elements may include one or more lenses, reflectors, optical filters, apertures, and so on. The lenses may be fixed, a multiple lens array, adjustable, and so on. The lenses or reflectors may be manually adjustable, motorized with direct control with switches on the unit for adjusting the direction or characteristics of the light source, motorized with a remote control for adjusting the direction or characteristics of the light source through RF or IR control or it may detect motion and automatically adjust the lenses or reflectors to aim the light in the direction of the motion either to illuminate an area or as a deterrent for security reasons or as a deterrent for animals.

Figure 2:
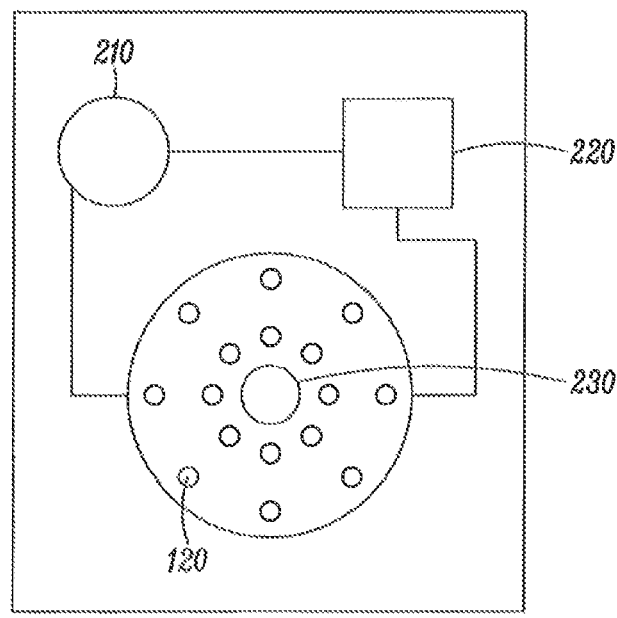
FIG. 2 shows a simplified schematic view of one embodiment of a wireless lighting module.

FIG. 2 shows a simplified top plan view of the wireless lighting module 100, with the housing 110 and light-transmitting cover 130 removed. As shown in the illustrated embodiment, the wireless lighting module 100 includes a power source, such as a battery 210. In alternative embodiments, the power source may be a solar cell. In one known embodiment, three "AAA" size alkaline batteries are used as a power source. In an alternative embodiment, three "C" size alkaline batteries are used. It should be understood that any number of known batteries may be used, including without limitation all known alkaline and nickel-cadmium batteries, depending on size and power requirements. According to another example, the power source can be any number and type of rechargeable batteries and/or non-rechargeable batteries. Pursuant to a further illustration, the power source can be a combination of a solar cell and one or more batteries (e.g., rechargeable, non-rechargeable.). Thus, for instance, a battery can supplement the power supplied by the solar cell (or vice versa) and/or the solar cell can recharge a battery. In some embodiments of the foregoing arrangement, a solar cell may be diode or-ed with a battery and the battery may be non-rechargeable. In alternate embodiments the power source may include a fuel cell, such as and without limitation a hydrogen fuel cell, a reformed methanol fuel cell, or the like. In alternate embodiments, the power source may include a capacitor, array of capacitors, super capacitors to store energy to be used as a power source similar to a battery, and the like.

In some embodiments, the power source may employ any and all forms of energy harvesting. Energy harvest may, without limitation, include capturing radiofrequency energy, converting kinetic energy to electrical energy (including converting motion or tension into electrical energy), converting thermal energy into electrical energy, converting wind energy into electrical energy, and so on. In some embodiments, energy harvesting may include collecting light from other light sources and converting that light into electrical energy. It will be understood that a variety of systems and methods that harvest energy are possible. In alternate embodiments, the power source may be through wireless power transmission where a method of wireless power transmission may act as the power source or in combination with the other power sources mentioned herein (e.g. rechargeable batteries, capacitors, and the like) to provide power to the module.

Power sources that can be used stand alone as described herein (i.e. not connected to a traditional AC power source) are defined as wireless power. A wireless power source allows the installation of the wireless lighting module 100 in any indoor or outdoor location where light may be desired without the need for a wired connection to an AC power source.

As shown, the battery 210 is electrically connected to the LEDs 120 to provide power for the light output. The battery 210 is also connected to a receiver 220 configured to receive a data stream. In one embodiment, the receiver 220 is configured to receive a data stream in the form of RF signals and is further configured to output data to logic 230. In one embodiment, the receiver 220 is configured to receive data at up to 100 kbps and has a receive sensitivity of as little as −115 dBm. In an alternative embodiment, the receiver 220 is configured to receive IR signals.

In one embodiment, the receiver 220 includes an integrated processor (not shown). The integrated processor of the receiver 220 is separate from the logic 230 of the wireless lighting module 100. The integrated processor is configured to convert an RF or IR data stream to digital data output. The integrated processor may be an integrated circuit, a microprocessor, or other known processor. For example, the receiver 220 may be a commercially available MAXIM MAX 1470 RF Integrated Circuit 300-450 MHz ASK Superheterodyne receiver.

With continued reference to FIG. 2, the battery 210 is also connected to the logic 230. The logic 230 is configured to monitor data received by the receiver 220. In one embodiment, described above, the receiver 220 outputs digital data. In an alternative embodiment, the receiver 220 outputs analog data and the logic 230 is configured to convert the analog data to digital data. The logic 230 is configured to detect specific sequences of data, such as commands and channel data, as will be described in more detail below. In response to the sequences of data, the logic 230 may control the LEDs 120 as described herein and elsewhere. In some embodiments, the sequences of data may originate from or relate to the output of a sensor. The logic 230 may be an integrated circuit, a microprocessor, or any known type of processor. For example, the logic 230 may be a commercially available FREESCALE Semiconductor MC68HC908QT microcontroller. Embodiments of the logic 230 may be programmable so that control of the LEDs 120, responses to sequences of data, and other programmable functions may be field programmable, end-user programmable, added and removed after market, added and removed by an OEM, and so on.

In one embodiment, the logic 230 employs a power sequencing algorithm to conserve power. In this embodiment, the logic 230 stays in a "hibernation" mode to conserve power. The logic 230 is activated a few times per second to monitor the receiver 220. If the logic 230 detects output from the receiver 220, the logic 230 reads the data and executes commands according to a protocol described below. If the logic 230 does not detect output from the receiver 220, it returns to hibernation mode.

The logic 230 is also in electric communication with the LEDs 120. The logic 230 maintains the on/off state of the LEDs 120. Additionally, the logic 230 may be configured to control the brightness of the LEDs 120. In one embodiment, the logic 230 is configured to turn off the LEDs 120 after a predetermined amount of time to conserve power. The logic 230 is also configured to control pulse width modulation to extend battery life.

In one embodiment, the LEDs 120 are color changing LEDs and the logic 230 is configured to control the color emitted by the LEDs 120. In one embodiment (not shown), when more than one wireless lighting module is employed, the modules may be synchronized such that the logic of each module changes the light color at the same time or according to a user preference.

Figure 3:
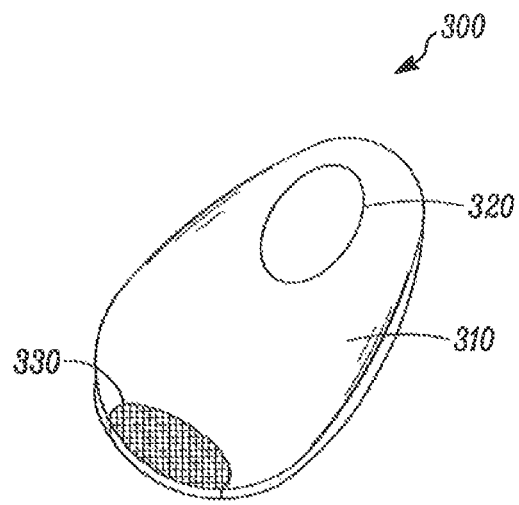
FIG. 3 shows a perspective view of one embodiment of a remote control for a wireless light.

FIG. 3 illustrates a perspective view of one embodiment of a remote control 300 for a wireless lighting module (e.g., the wireless lighting module 100 of FIG. 1). The remote control 300 includes a housing 310. In one embodiment (not shown), the housing 310 is configured to be attached to a keychain. In another embodiment (not shown), the housing 310 is configured to be mounted to a wall.

In the illustrated embodiment, the remote control 300 includes a button 320 configured to receive user input. Here, the button 320 receives an on/off toggle command. In an alternative embodiment (not shown), the remote control 300 includes a plurality of buttons. The additional buttons may be configured to receive a separate "on" command and "off" command. The additional buttons may also be configured to receive a "dim" or "brightness" command or a color changing command. In another alternative embodiment (not shown), the remote control 300 further includes a DIP switch for receiving a channel number. In other alternative embodiments (not shown), the remote control 300 employs dials, toggle switches, levers, knobs, buttons, or any other appropriate controls to receive user input. According to another example, the remote control 300 can utilize a touch panel for obtaining user input.

The remote control 300 further includes a transmitter 330 configured to transmit a signal. In one embodiment, the transmitter 330 is an RF transmitter. In an alternative embodiment, the transmitter 330 is an IR transmitter. In one embodiment, the transmitter 330 includes an integrated processor (not shown), such as a MAXIM MAX 1472 RF Integrated Circuit 300-450 MHz ASK transmitter and is configured to transmit data at up to 100 kbps. According to another illustration, the remote control 300 can include a transceiver that can receive data from a wireless lighting module as well as transmit data to the wireless lighting module. In some embodiments, the remote control 300 may transmit at a user-selected radio frequency or at a predetermined radio frequency with any and all types of encoding or modulation. It will be understood that the radio frequency may include UHF, VHF, ISM band, and so on. Furthermore, it will be understood that a variety of types of encoding or modulation are possible. For example and without limitation, the remote control 300 may function in accordance with WIFI, ZIGBEE, BLUETOOTH, or the like. For another example and without limitation, the remote control 300 may function substantially as an RFID tag. In embodiments, the remote control 300 may be handheld, wall mounted (e.g. as a switch or the like that is battery powered or AC powered from a switch plate), and so on.

Figure 4:
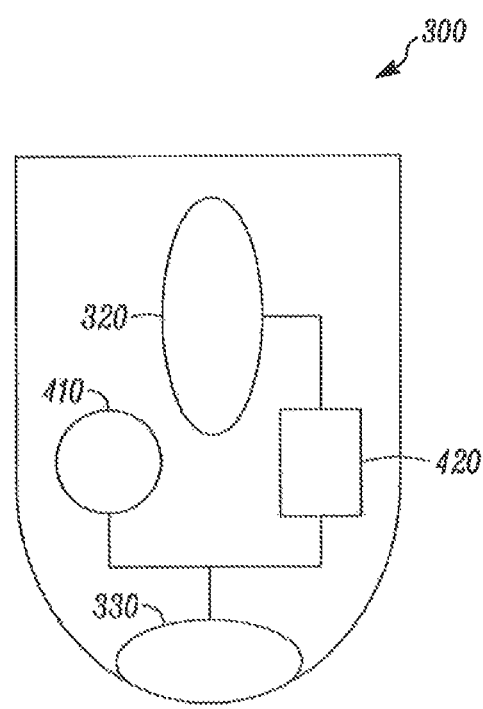
FIG. 4 shows a simplified schematic view of one embodiment of a remote control for a wireless light.

FIG. 4 illustrates a simplified top plan view of a remote control 300 with a housing 310 removed. The remote control 300 includes a power source, such as a battery 410. In one embodiment, the battery 410 is a CR2032 coin cell battery.

In alternative embodiments, any number of any known type of battery may be used. The battery is electrically connected to and supplies power to the transmitter 330.

In the illustrated embodiment, the battery 410 is also connected to and supplies power to logic 420. The logic 420 is configured to monitor a switch (not shown) connected to the button 320. The logic 420 is further configured to build and send a control message to the transmitter 330. In one embodiment, the logic 420 sends a digital control message to the transmitter 330. An integrated circuit (not shown) of the transmitter 330 then converts the digital control message to an analog control message for transmission as an RF signal. In an alternative embodiment, the transmitter 330 is configured to transmit a digital RF signal. In another alternative embodiment, the logic 420 sends an analog control message to the transmitter 330.

In one embodiment, the logic 420 is configured to recognize an on/off toggle command. The logic 420 receives the on/off toggle command when a user presses the button 320. In another embodiment (not shown), the logic 420 is configured to recognize a separate "on" command and "off" command. In yet another embodiment (not shown), the logic 420 is configured to recognize a "dim" or "brightness" command or a "color change" command. When the logic 420 receives a command, the logic 420 outputs a control message containing the command and a channel number. In one embodiment, the logic 420 receives the channel number from a user input device. In an alternative embodiment, the logic 420 looks up the channel number in a memory (not shown). In another alternative embodiment, the processor generates a random number to use as a channel number.

Figure 5:
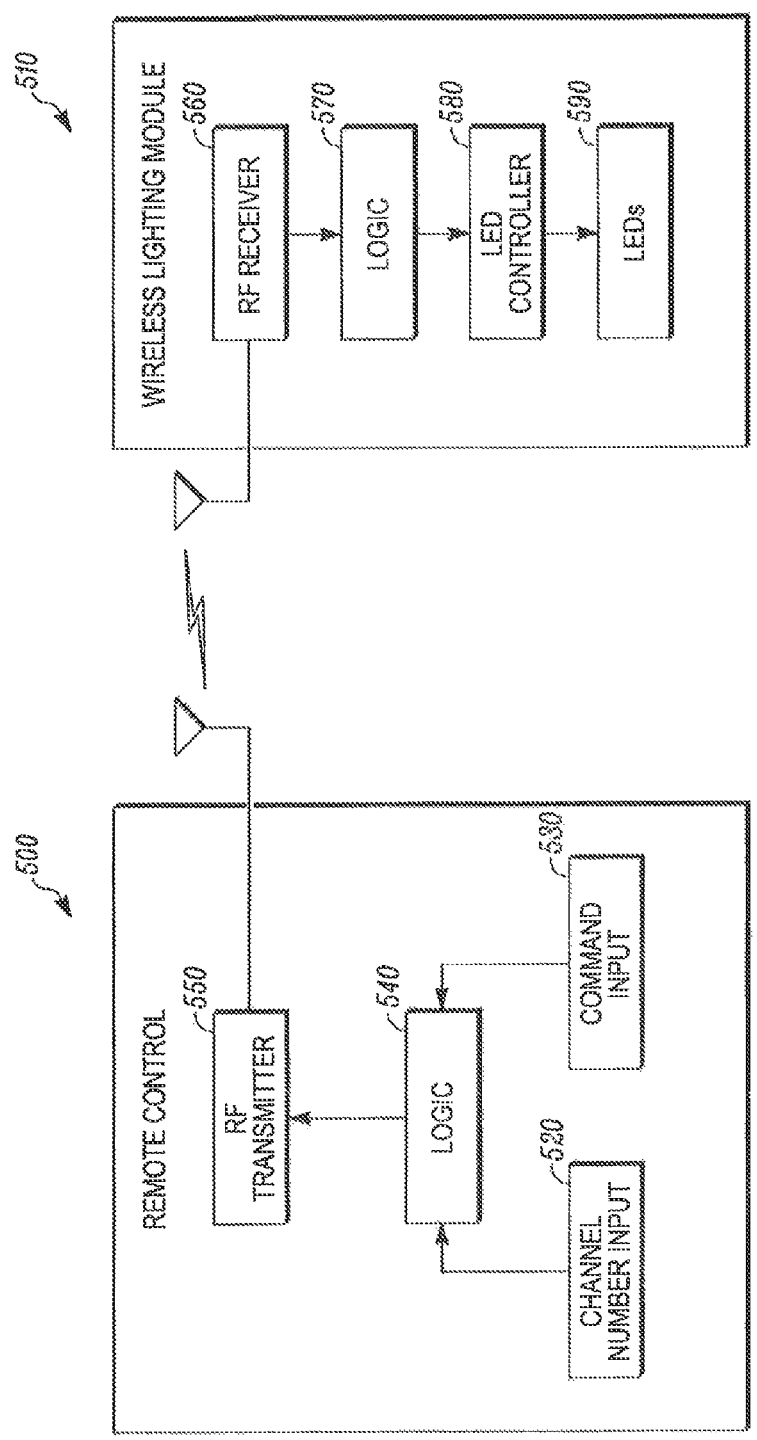
FIG. 5 shows a simplified schematic drawing of an RF communication system for controlling a light.

FIG. 5 is a schematic drawing of one embodiment of a remote control 500 in communication with a wireless lighting module 510. In the illustrated embodiment, the user selects a channel number on the remote control 500 through a channel number input 520. Exemplary channel number inputs 520 include DIP switches, buttons, dials, knobs, a keypad, an LED touch-screen, or any other known input device. In an alternative embodiment, a user may select more than one channel number to communicate with a plurality of wireless lighting modules. In other alternative embodiments, the channel number may be preprogrammed, randomly generated, or previously stored in a memory. The user then enters a command through a command input 530. Exemplary command inputs 530 include buttons, switches, dials, knobs, a keypad, an LED touch-screen, or any other known input device. The command may be an "on/off" toggle command, an "on" command, an "off" command, a "dim" command, a "brightness" command, a "color change" command, or a timer command.

After a user inputs a command through the command input 530, logic 540 encodes the channel number and the command and instructs an RF transmitter 550 to transmit an RF signal that includes the encoded channel number and command. In one embodiment, the RF transmitter 550 transmits RF signals at a frequency of 433 MHz. In alternative embodiments, the RF transmitter may transmit at a user selected-frequency or at any predetermined frequency.

In one embodiment, the RF signal is transmitted once. In an alternative embodiment, the RF signal is transmitted a predetermined number of times, or for a predetermined time period. If more than one RF signal is transmitted, each transmission may be separated by a predetermined interval.

With continued reference to FIG. 5, the wireless lighting module 510 includes an RF receiver 560 that monitors for RF signals at a predetermined frequency. In one embodiment, the RF receiver 560 periodically monitors for RF signals. In an alternative embodiment, the RF receiver 560 continuously monitors for RF signals. When an RF signal is received, the signal is transmitted to logic 570, where the signal is decoded. In one embodiment, the logic 570 reads the decoded channel number and compares the decoded channel number to a module channel number. The module channel number may be selected by a user via a channel input device (not shown), or it may be pre-programmed.

If the decoded channel number matches the module channel number, the logic 570 processes the decoded command. For example, if the command is an on/off toggle command, the logic 570 will instruct an LED controller 580 to toggle a plurality of LEDs 590. If the command is an "on" command, the logic 570 will determine if the plurality of LEDs 590 are in an "on" state. If the LEDs 590 are not in an "on" state, the logic 570 will instruct the LED controller 580 to activate the plurality of LEDs 590.

In an alternative embodiment (not shown), the RF transmitter 550 and the RF receiver 560 are replaced with RF transceivers, thus allowing two-way communication. In this embodiment, the remote control is programmed to repeatedly transmit a command signal until a confirmation signal is received. Additionally, the lighting module is programmed to transmit a confirmation signal upon receipt of an RF signal, or upon a decoded channel number matching a module channel number. According to another example, RF transceivers can enable providing the remote control 500 with feedback concerning a state associated with the wireless lighting module 510 (e.g., whether the LEDs 590 are in an "on" state, an "off" state, a color of the LEDs 590, an intensity of the LEDs 590.), battery life, and so forth. Moreover, RF transceivers can allow the wireless lighting module 510 to communicate with disparate wireless lighting module(s) (e.g., to repeat signals).

Figure 6:
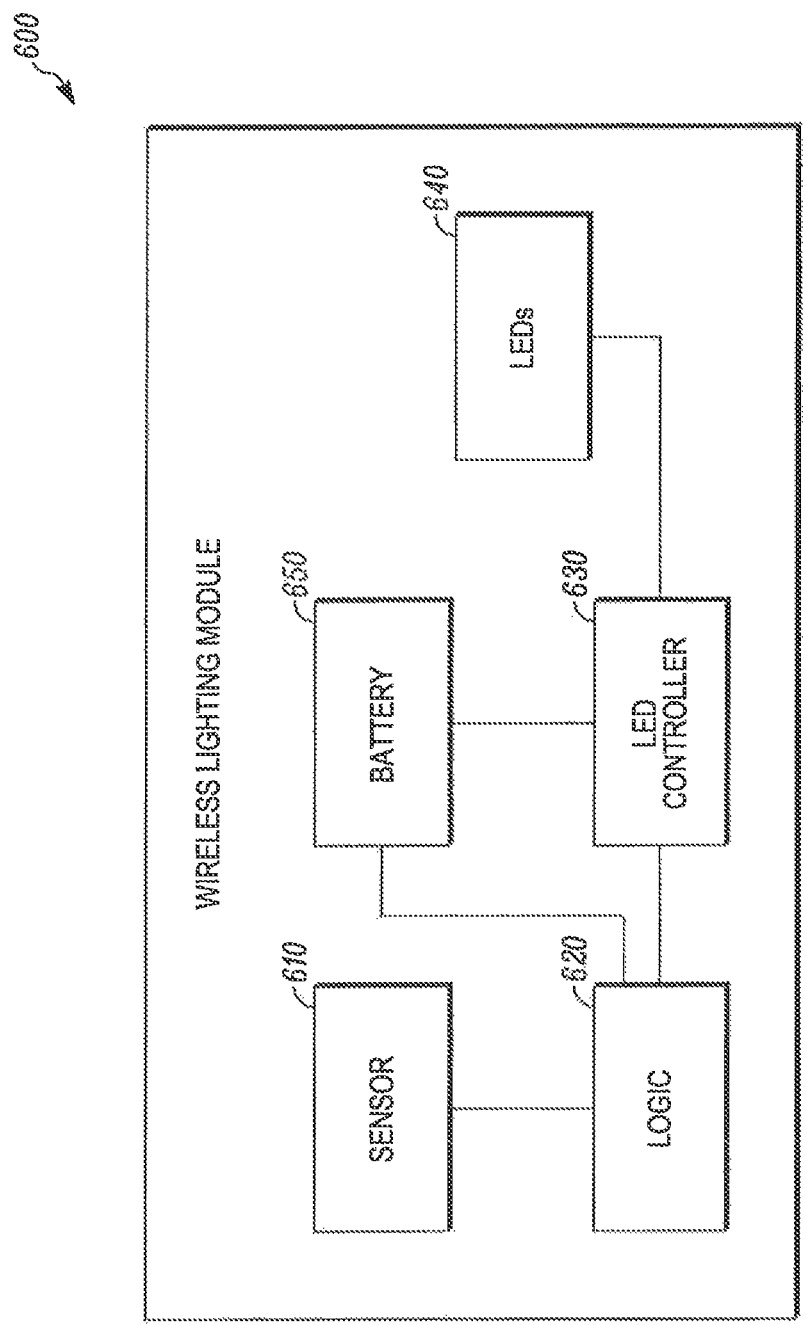
FIG. 6 shows a simplified schematic drawing of an alternative embodiment of a wireless lighting module.

FIG. 6 is a schematic drawing of an alternative embodiment of a wireless lighting module 600. In this embodiment, the wireless lighting module 600 is not controlled by a remote control, but is instead motion-controlled. The wireless lighting module 600 includes a passive infrared sensor 610 configured to detect motion. In one embodiment, the passive infrared sensor 610 has a range of approximately 5 feet and a viewing angle of 110 degrees. In alternative embodiments, the passive infrared sensor 610 may have a range and viewing angle of any known passive infrared sensor. In one alternative embodiment, the passive infrared sensor 610 is removably connected to the wireless lighting module 600 so that a user may connect any appropriate sensor. In some embodiments, the passive infrared sensor 610 may be replaced or enhanced by a radar sensor, an ultrasound sensor, or any and all other form of motion sensor.

In embodiments, any and all sensors may include a detection threshold or false detection rate that can be configured according to a user's preference. For example and without limitation, a light sensor may be configured to detect when incoming light crosses a user-preferred intensity threshold. A variety of other such examples will be appreciated, all of which are within the scope of the present disclosure.

In embodiments, a Fresnel lens may enable motion detection. Some motion detectors may include a Fresnel lens that guides infrared light over a pyroelectric material in a substantially repeating pattern as a heat source (such as a person, vehicle, and so on) passes in front of the lens. In embodiments, the Fresnel lens may be selected to provide a desired zone of coverage. It will be understood that a variety of embodiments of motion detectors including the Fresnel lens are possible.

With continued reference to FIG. 6, when the passive infrared sensor 610 detects motion, logic 620 determines if the motion is above a predetermined threshold. If the motion is above the predetermined threshold, the logic 620 instructs an LED controller 630 to turn on at least one LED 640. After the at least one LED 640 is turned on, the logic 620 starts a timer. The logic 620 will then instruct the LED controller 630 to turn off the at least one LED 640 if no motion is detected before the timer reaches a predetermined threshold.

The wireless lighting module 600 further includes at least one battery 650. The battery 650 supplies power to the logic 620, the LED controller 630, the at least one LED 640, and any other additional electric components. Further, the battery 650 can supply power to the passive infrared sensor 610. In one embodiment, the at least one battery 650 includes 3 "AAA" alkaline batteries. In an alternative embodiment, the at least one battery 650 includes 3 "C" alkaline batteries. In other embodiments, the at least one battery 650 may be any number of known batteries, including without limitation all known alkaline and nickel-cadmium batteries. It is to be appreciated that any number and type of rechargeable and/or non-rechargeable batteries can be utilized in connection with the claimed subject matter.

Figure 7:
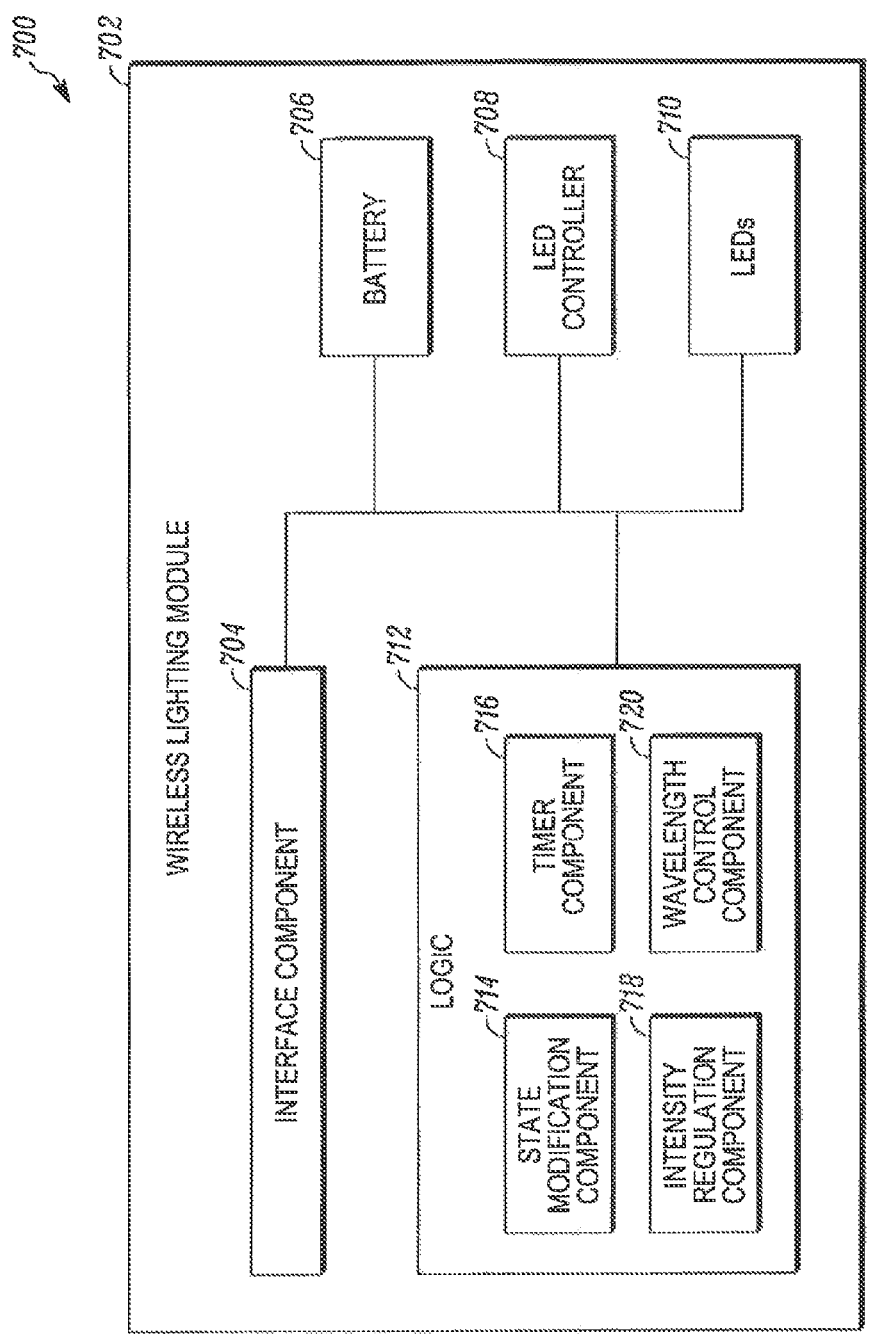
FIG. 7 shows a block diagram of a system that provides illumination with a wireless light.

With reference to FIG. 7, illustrated is a block diagram of a system 700 that provides illumination with a wireless light. System 700 includes a wireless lighting module 702 that can further comprise an interface component 704, a battery 706, an LED controller 708, LEDs 710, and/or logic 712. The wireless lighting module 702 can be incorporated into a housing (not shown). It is contemplated that any size and/or shape housing can be employed with the wireless lighting module 702. According to another illustration, the housing can include at least a portion that is moveable (e.g., manually by a user, automatically with a motor or the like) to allow for directing emitted light. For example, a remote control can provide a signal to manipulate a moveable portion of the housing. Moreover, the housing can orient the LEDs 710 in substantially any manner to provide general lighting (e.g., illuminating an indoor or outdoor area), task lighting (e.g., reading), accent lighting, and so forth.

The interface component 704 can receive an input from a disparate device (e.g., the remote control 500 of FIG. 5, the passive infrared sensor 610 of FIG. 6). The interface component 704 can provide various adaptors, connectors, channels, communication paths, etc. to enable interaction with the disparate device. Pursuant to an illustration, the input can be wirelessly transmitted (e.g., via an RF signal, an IR signal) from the disparate device to the interface component 704; thus, the interface component 704 can be a receiver and/or a transceiver that obtains the wirelessly transferred signal. By way of example, an infrared sensor or motion sensor can monitor occupancy in an environment and, upon detecting presence within the monitored environment, the sensor can transmit a wireless input to the interface component 704. It is to be appreciated that any type of sensors can be utilized in connection with the claimed subject matter such as, but not limited to, infrared sensors, light sensors, proximity sensors, acoustic sensors, motion sensors, carbon monoxide and/or smoke detectors, thermal sensors, electromagnetic sensors, mechanical sensors, pressure sensors, chemical sensors, and the like. According to another example, any type of remote control can wirelessly communicate with the interface component 704. For instance, the remote control can be a stand-alone remote control (e.g., the remote control 300 of FIG. 3) and/or incorporated into a disparate device (e.g., incorporated into a key fob, a programmable wireless transceiver integrated in an automobile.). Moreover, the remote control can be a personal computer, a cellular phone, a smart phone, a laptop, a handheld communication device, a handheld computing device, a global positioning system, a personal digital assistant (PDA), and/or any other suitable device; such devices can communicate directly with the interface component 704 and/or via a network (e.g., local area network (LAN), wide area network (WAN), cellular network). In accord with another example, radio frequency identification (RFID) can be utilized to provide the input to the interface component 704. As such, an RFID tag associated with a user can be detected when in range of the interface component 704, and lighting preferences of the particular user (e.g., retained in memory) can be effectuated in response to his or her detected presence.

Additionally or alternatively, the interface component 704 can be a sensor that can monitor a condition associated with the wireless lighting module 702 to generate the input. According to another example, the interface component 704 can be a connector, port, etc. that couples to such sensor.

Further, the interface component 704 can wirelessly transmit data (e.g., feedback, related to a current and/or anticipated future state) to a remote device and/or sensor. By way of another example, the interface component 704 can wirelessly communicate with an interface component of a disparate wireless lighting module to enable coordinated operation between more than one wireless lighting module. Following this example, an input can be retransmitted within a network of wireless lighting modules, where the network of lighting modules can be dispersed within a geographic area.

An interface component 704 integrated into the wireless lighting module 702 that allows it to be used stand alone, a sensor on the wireless lighting module 702 used for input or by a remote control that provides input wirelessly to the wireless lighting module 702, as described herein (i.e. not connected by wire to the wireless lighting module 702) is defined as wireless control. Wireless control allows the installation of the wireless lighting module 702 in any indoor or outdoor location where light may be desired without the need for a wired connection to control it.

The battery 706 can be any number and/or type of battery. For instance, the battery 706 can be a rechargeable battery. According to another example, the battery 706 can be a non-rechargeable battery. The battery 706 supplies power to the wireless lighting module 702 to enable installing, moving, replacing, etc. the wireless lighting module 702 at substantially any indoor or outdoor location while mitigating the need for expensive and time consuming wiring and/or utilization of aesthetically unpleasing and potentially inconvenient cords commonly associated with conventional lighting.

The LED controller 708 can obtain instructions from the logic 712 to control operation of the LEDs 710. The LED controller 708, for example, can receive and effectuate instructions to switch one or more LEDs 710 on and/or off, change an intensity of illumination (e.g., brightness), switch a wavelength of light emitted from the LEDs 710 (e.g., to change light color), manipulate direction of illumination (e.g., by moving, rotating, etc. one or more of the LEDs 710) and the like. Further, it is contemplated that any number, type, color, arrangement, etc. of LEDs 710 can be utilized with the wireless lighting module 702.

The logic 712 employs the input obtained by the interface component 704. The logic 712 can further include a state modification component 714, a timer component 716, an intensity regulation component 718, and/or a wavelength control component 720; however, it is to be appreciated that the logic 712 can include a subset of these components 714-720. The state modification component 714 utilizes the input obtained via the interface component 704 to generate an instruction to change a state of one of more of the LEDs 710. The state modification component 714 effectuates transitioning one or more LEDs 710 to an on state, an off state, etc. Further, the state modification component 714 can yield commands to strobe one or more LEDs 710 (e.g., periodically turning LED(s) 710 on and off with substantially any periodicity). According to an example, the state modification component 714 can decipher that a received input pertains to one or more of the LEDs 710. Moreover, the state modification component 714 can analyze the input to determine whether to instruct the LED controller 708 to change the state (e.g., compare an input from a sensor to a threshold, evaluate whether a condition has been met, based upon retrieved instructions corresponding to the input retained in memory.).

The timer component 716 can operate in conjunction with the state modification component 714. For instance, the timer component 716 can enable delaying state changes. Thus, turning the LEDs 710 on or off can be delayed for an amount of time by the timer component 716. Further, the amount of time for the delay can be predetermined, randomly selected, included with the input obtained by the interface component 704 (e.g., based on a number of times a button of a remote control is depressed), etc. According to another example, the timer component 716 can conserve battery life by enabling the state modification component 714 to switch the LEDs 710 to an off state at a particular time of day, after an elapsed amount of time subsequent to an input that turned the LEDs 710 to the on state, and so forth. Pursuant to another illustration, the timer component 716 can operate in conjunction with the intensity regulation component 718 and/or the wavelength control component 720 described below.

The intensity regulation component 718 can alter the intensity (e.g., brightness) of the LEDs 710 based upon the received input from the interface component 704. The intensity can be changed by the intensity regulation component 718 adjusting a proportion of LEDs 710 in an on state to LEDs 710 in an off state. Additionally or alternatively, the intensity regulation component 718 can control the intensity of light emitted by each of the LEDs 710. According to an example, the interface component 704 can obtain RFID related input that identifies the presence of a particular user, and this user can have lighting preferences stored in memory (not shown) associated with the wireless lighting module 702. Following this example, the particular user's preferences may indicate that she desires the LEDs 710 to be dimly lit, which can be effectuated by the intensity regulation component 718. Pursuant to another example, upon a smoke detector or carbon monoxide detector sensing smoke or carbon monoxide, respectively, the intensity regulation component 718 can increase the brightness of the illumination of the LEDs 710 to a highest level (e.g., while the state modification component 714 can strobe the LEDs 710, the wavelength control component 720 can change the color). It is to be appreciated, however, that the claimed subject matter is not limited to the aforementioned examples.

The wavelength control component 720 can change the wavelength (e.g., color) of light generated by the LEDs 710 as a function of the input obtained by the interface component 704. For example, the LEDs 710 can be color changing LEDs, and the wavelength control component 720 can yield commands to adjust the color based upon the input obtained by the interface component 704. By way of another example, the LEDs 710 can include subsets of LEDs that yield differing colors, and the wavelength control component 720 can select which of the LEDs 710 to turn to the on state to yield the desired color.

Figure 8:
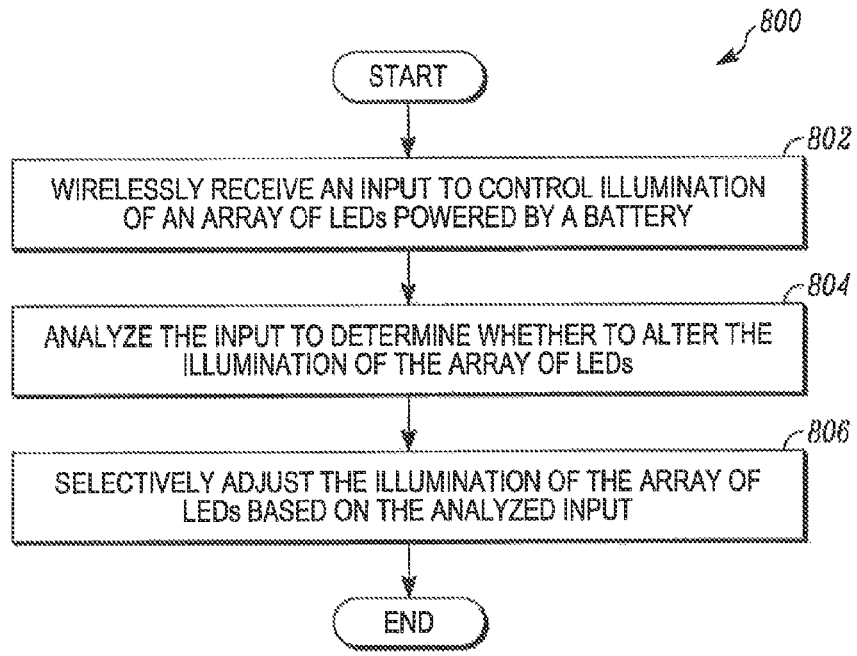
FIG. 8 shows a methodology that facilitates selectively emitting light in accordance with a wireless input.
Figure 9:
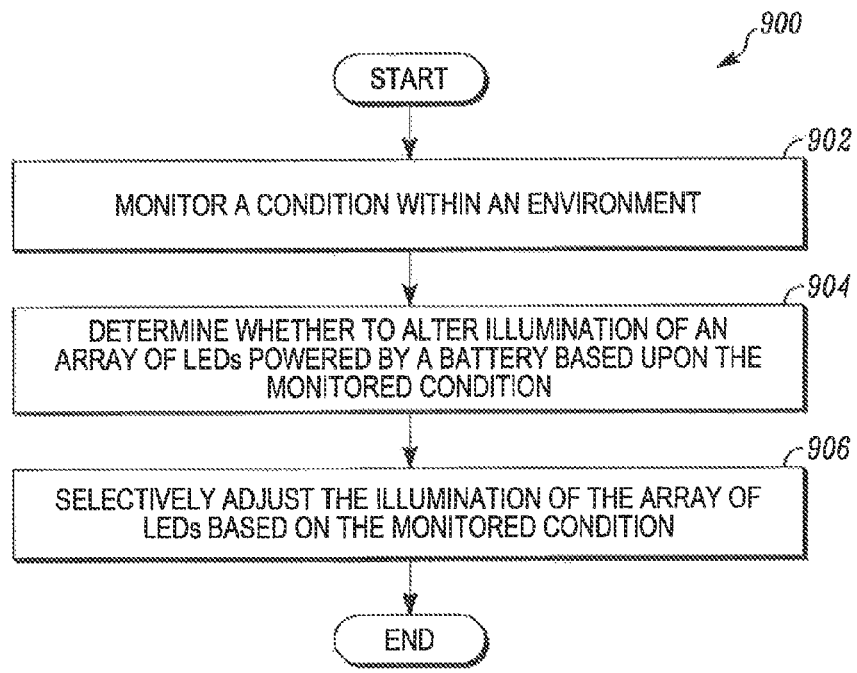
FIG. 9 shows a methodology that facilitates selectively emitting light based upon input from a sensor.

FIGS. 8-9 illustrate methodologies in accordance with the claimed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events.

With reference to FIG. 8, illustrated is a methodology 800 that facilitates selectively emitting light in accordance with a wireless input. At 802, an input can be wirelessly received to control illumination of an array of LEDs powered by a battery. The input can be obtained from any type of source (e.g., remote control, disparate wireless lighting module, differing device, sensor). Moreover, the input can be provided from the source via an RF signal, an IR signal, and so forth. At 804, the input can be analyzed to determine whether to alter the illumination of the array of LEDs. For example, if the input provides a command to change the LEDs to an on state while the LEDs are currently in an off state, an instruction can be yielded to change the LEDs to the on state. According to another illustration, an amount of elapsed time can be tracked to identify when to effectuate a change in illumination. At 806, the illumination of the array of LEDs can be selectively adjusted based on the analyzed input. For example, LEDs can be transitioned to a differing state (e.g., turned on, turned off), intensity of LEDs can be altered, color emitted can be changed, and so forth.

Now referring to FIG. 9, illustrated is a methodology 900 that facilitates selectively emitting light based upon input from a sensor. At 902, a condition within an environment can be monitored. The condition can relate to motion, presence, pressure, temperature, location, sound, chemicals, light, or any condition that can be tracked with a sensor. At 904, a determination can be effectuated relating to whether to alter illumination of an array of LEDs powered by a battery based upon the monitored condition. For example, the determination can be made by comparing the monitored condition to a threshold. Moreover, a current state associated with the array of LEDs can be evaluated to determine whether a change in illumination should be effectuated. At 906, the illumination of the array of LEDs can be selectively altered based on the monitored condition. Thus, for example, LEDs can be transitioned to an on state when motion is detected. By way of further illustration, the LEDs can be turned off when no motion is detected (e.g., for more than a predetermined amount of time).

Figure 10:
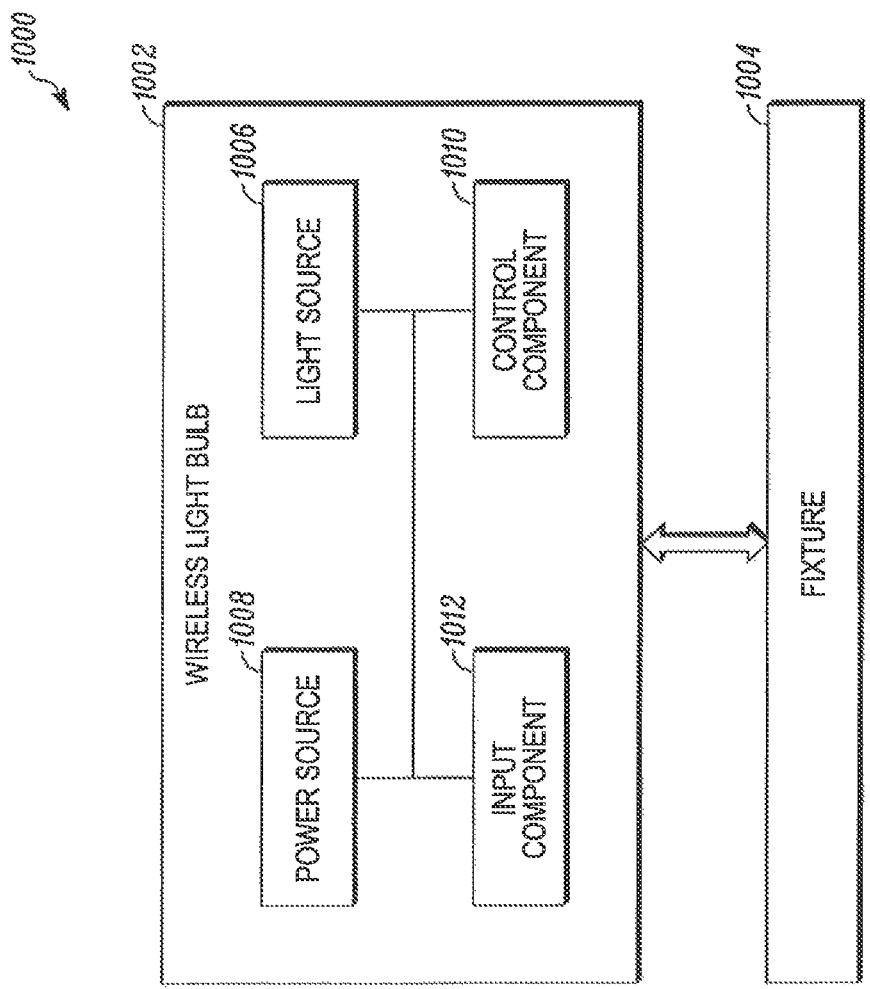
FIG. 10 shows a block diagram of an example wireless lighting system.

Turning to FIG. 10, illustrated is a block diagram of a wireless lighting system 1000. The wireless lighting system 1000 includes a wireless light bulb 1002 that can mechanically couple to any type of fixture 1004. The fixture 1004 can be any size, shape, type, etc. of lighting fixture that can include any size, shape, type, etc. of socket with which the wireless light bulb 1002 can physically connect. Pursuant to an illustration, the fixture 1004 can be a free-standing or portable fixture, a recessed fixture, a surface mounted fixture, a sconce, a track light fixture, a pendant light fixture, an outdoor fixture (e.g., pole mounted, stanchion mounted, pathway lighting fixture), a lamp, and so forth. Thus, for example, the fixture 1004 can include an Edison socket and the wireless light bulb 1002 can comprise a screw base that can be physically coupled with the Edison socket of the fixture 1004. Further, the wireless light bulb 1002 can include any type, size, shape, etc. of fitting that can be compatible with a corresponding socket of the fixture 1004 (e.g., the fitting can include a screw base, a bayonet (push twist) base, wedge base, locking base, pin base). Moreover, it is contemplated that the wireless light bulb 1002 and the fixture 1004 can be electrically coupled when mechanically coupled and/or the wireless light bulb 1002 and the fixture 1004 can be mechanically coupled without electrical coupling.

The wireless light bulb 1002 can further include a light source 1006, a power source 1008, a control component 1010 and/or an input component 1012 (e.g., the light source 1006, the power source 1008, the control component 1010 and/or the input component 1012 can be integrated into a housing (not shown) of the wireless light bulb 1002). The light source 1006 can be any type, number, size, shape, etc. of lamp. For example, the light source 1006 can be one or more of incandescent, halogen, gas discharge, fluorescent, compact fluorescent, fiber optic, induction, light emitting diode (LED), etc. source(s). According to an illustration, the light source 1006 can include a plurality of LEDs that can be positioned at substantially any location with respect to one another. Following this illustration, the plurality of LEDs can be arranged in an array that can disperse light over a desired area; however, the claimed subject matter is not so limited. By way of another example, the wireless light bulb 1002 can include a housing (not shown) constructed of plastic, metal, and/or substantially any matter. For instance, at least a portion of the housing can enable light emitted by the light source 1006 to pass through it (e.g., at least a portion of the housing can be a light-transmitting material that can be transparent, translucent, frosted, colored). Additionally or alternatively, light generated by the light source 1006 need not traverse through the housing (e.g., the light source 1006 can be positioned upon the surface of the housing and/or the light need not propagate through a light-transmitting cover).

Further, the power source 1008 can be coupled to the light source 1006 (and/or disparate components of the wireless light bulb 1002) to supply power for operation of the light source 1006 (and/or the disparate components). For instance, the power source 1008 can provide direct current (DC) power to the light source 1006 (and/or disparate components of the wireless light bulb 1002). According to an example, the power source 1008 can be one or more batteries. For instance, the power source 1008 can be any number, size, and type of rechargeable (e.g., nickel-cadmium) and/or non-rechargeable (e.g., alkaline) batteries. Pursuant to a further illustration, the power source 1008 can be a solar cell. Moreover, the power source 1008 can be a combination of a solar cell and one or more batteries. Thus, for instance, a battery can supplement power supplied by the solar cell (or vice versa) and/or the solar cell can recharge a battery. In accordance with a further illustration, the power source 1008 can wirelessly obtain power (e.g., to be utilized directly, employed to recharge batteries); for instance, power can be wirelessly delivered to the power source 1008 via collecting RF energy from the environment, electromagnetic induction, wave coupling, converting motion or heat to electrical energy, and the like.

In some embodiments, the power source 1008 may include alternating-current circuitry, including an AC/DC converter or a battery recharging circuit. The AC/DC converter may include a capacitor/diode bridge, a fly back converter, or a constant current circuit, and so on. It will be understood that a variety of AC/DC converters are possible.

By way of an example, the wireless light bulb 1002 can physically couple with the fixture 1004 to support the wireless light bulb 1002 in a particular position, yet electrical current need not flow between the fixture 1004 and the wireless light bulb 1002. Thus, the fixture 1004 can be installed at substantially any location without needing to supply power (e.g., via hard-wiring the fixture 1004); hence, the fixture 1004 can be physically placed, secured, mounted, installed, etc. in a locale without being hard-wired to a power source. In contrast, conventional techniques oftentimes employ hard-wired fixtures that can provide alternating current (AC) power to light bulbs coupled therewith.

According to another illustration, the fixture 1004 can provide AC power that can be leveraged by the wireless light bulb 1002 in addition to or instead of the power source 1008. For example, the wireless light bulb 1002 can lack the power source 1008 integrated therein, and the AC power from the fixture 1004 can power the wireless light bulb 1002. Additionally or alternatively, the wireless light bulb 1002 can include the power source 1008, and the power source 1008 can be a battery backup for the wireless light bulb 1002, for instance. Thus, upon detecting an AC power outage, the wireless light bulb 1002 can switch to utilizing the power source 1008 (e.g., one or more batteries) to supply power to the wireless light bulb 1002.

The wireless light bulb 1002 further includes the control component 1010 that manages operation of the light source 1006. For instance, the control component 1010 can switch the light source 1006 to an on state and/or an off state. Moreover, the control component 1010 can alter intensity, brightness, color (e.g., wavelength, frequency), etc. of the light yielded by the light source 1006.

The input component 1012 can obtain any type of input signal that can be leveraged by the control component 1010 to manipulate operation of the light source 1006. Thus, the input component 1012 can be a radio frequency (RF) receiver that can obtain an RF signal communicated from an RF transmitter (not shown) that can be utilized by the control component 1010 to control operation of the light source 1006. According to this example, the RF signal can be deciphered by the control component 1010 to effectuate switching the light source 1006 to an on or off state, changing a light color or a light intensity provided by the light source 1006, and the like. Additionally or alternatively, the input component 1012 can be one or more sensors that monitor a condition, and monitored information yielded by such sensor(s) can be utilized to effectuate adjustments associated with the light source 1006. According to another example, the input component 1012 can be a connector, port, etc. that couples to a disparate device, sensor, etc. to receive the input signal.

According to an example, the light source 1006, the power source 1008, the control component 1010 and the input component 1012 can be integrated into the housing of the wireless light bulb 1002. Thus, the wireless light bulb 1002 can be mechanically coupled with the fixture 1004 and the wireless light bulb 1002 can be utilized regardless whether the fixture 1004 provides power (e.g., AC power and/or DC power). Moreover, conventional lighting systems can include a typical light bulb that can couple with an adapter that can sense motion, where the adapter can further couple to a socket of a light fixture, for example; however, such common sensors are oftentimes not integrated into the light bulb (e.g., due to a typical light bulb lifespan) and rather are stand alone devices. Pursuant to another illustration, the light source 1006, the control component 1010 and the input component 1012 can be integrated into the housing of the wireless light bulb 1002, and power (e.g., AC power) can be provided from the fixture 1004 when coupled thereto.

The housing of the wireless light bulb 1002 or the light source 1006 may include any number of optical elements. The optical elements may serve to focus, diffuse, filter, collimate, or otherwise affect light produced by the light source 1006. In embodiments, the optical elements may include one or more lenses, reflectors, optical filters, apertures, and so on. The lenses may be fixed, a multiple lens array, adjustable, and so on. In some embodiments, the optical elements may be electrically adjustable. For example, an electric motor may be coupled to the aperture in order to adjust the aperture in response to a control signal (e.g. an RF signal, an IR signal, a signal generated by a logic circuit, and so on). For another example, the lens may be a liquid lens whose focus can be changed by direct application of an electrical potential. Generally, the direction, brightness, beam characteristics, or the like of the wireless light bulb 1002 may be variably affected by the optical elements that are responsive to the control signals. Numerous other such examples will be readily appreciated, and all such examples are within the scope of the present disclosure.

The following provides an illustration related to the wireless lighting system 1000. For instance, any type of fixture 1004 can be obtained and installed at substantially any location without needing to wire the fixture 1004. Rather, the fixture 1004 can be mounted, positioned, etc. and can thereafter be utilized to physically hold the wireless light bulb 1002. Therefore, if a fixture is lacking in a particular location where substantial difficulty can be encountered in connection with wiring the fixture to provide power thereto if installed, the fixture can instead be physically placed, mounted, attached, etc. in the location without electrically wiring the fixture (and/or without electrically wiring a switch to control operation of the fixture). Moreover, the wireless light bulb 1002 can be mechanically coupled to the fixture 1004 (e.g., a fitting of the wireless light bulb 1002 can be attached to a socket of the fixture 1004) and can leverage the power source 1008 (e.g., one or more batteries) and input component 1012 incorporated therein as described above.

Figure 11:
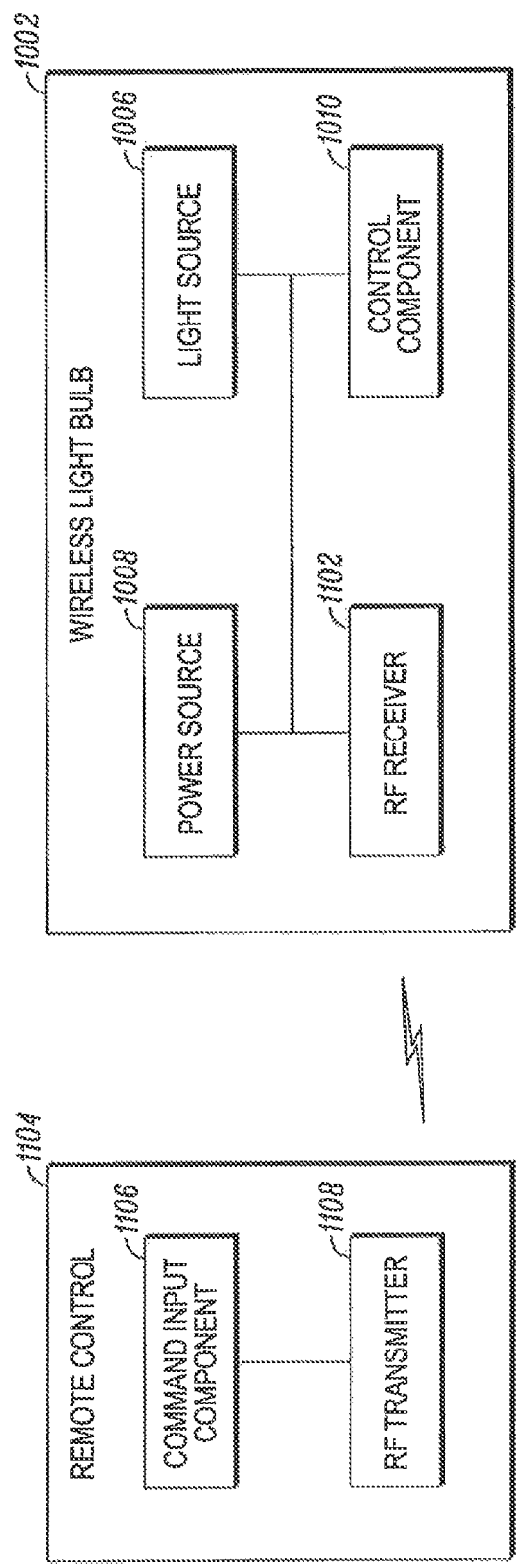
FIG. 11 shows a block diagram of an example wireless lighting system that utilizes RF signaling to control lighting.

Turning to FIG. 11, illustrated is a block diagram of a wireless lighting system 1100 that utilizes RF signaling to control lighting. The system 1100 includes the wireless light bulb 1002, which can further comprise the light source 1006 (e.g., LED(s)), the power source 1008, and the control component 1010 as described above (e.g., which can be integrated in the wireless light bulb 1002). Moreover, the wireless light bulb 1002 can include an RF receiver 1102 that can obtain a data stream of RF signals that can be decoded and employed by the control component 1010.

The RF receiver 1102 can monitor for RF signals at a predetermined frequency. For instance, the RF receiver 1102 can periodically monitor for RF signals. Alternatively, the RF receiver 1102 can continuously monitor for RF signals. When an RF signal is received, the signal can be decoded (e.g., by the control component 1010, a processor (not shown)).

The RF receiver 1102 can receive RF signals communicated by a remote control 1104. The remote control 1104 can be positioned at substantially any location (e.g., within range of the RF receiver 1102). Moreover, the remote control 1104 can be employed by a user to operate the wireless light bulb 1002 from a distance. For instance, the remote control 1104 can be located at the top of a stairway and can transmit RF signals to the wireless light bulb 1002 positioned at the bottom of the stairway, where the wireless light bulb 1002 can be mechanically coupled to a fixture located downstairs with or without electrical coupling to a power source (e.g., AC power source). The remote control 1104 can further include a command input component 1106 and an RF transmitter 1108. Moreover, although not depicted, it is contemplated that the remote control 1104 can include a power source (e.g., one or more batteries). It is also contemplated that the remote control can use AC power as its power source. For example, the remote control function could be a replacement for a traditional light switch such that instead of a toggle switch that makes or breaks AC power to a socket or fixture, the remote control is a wall switch plate that replaces the traditional light switch plate and contains an AC to DC circuit along with an RF transmitter that controls a wireless light bulb with an RF receiver as an input component.

According to an example, the remote control 1104 can be attachable to a surface such as a wall. Pursuant to another illustration, the remote control 1104 can be attachable to a keychain. However, it is contemplated that the claimed subject matter is not limited to the aforementioned examples.

The command input component 1106 can be one or more buttons, dials, toggles, switches, levers, knobs, an LED touch screen, a keypad, or any such controls that can obtain user input commands. According to another illustration, the command input component 1106 can be a touch screen device with which a user can interact. The command input component 1106 can receive commands to switch the light source 1006 on, switch the light source 1006 off, toggle whether the light source 1006 is on or off, dim or brighten light generated by the light source 1006, change the color of the light yielded by the light source 1006, and so forth.

Moreover, the RF transmitter 1108 can transfer command(s) obtained via the command input component 1106 to the RF receiver 1102 of the wireless light bulb 1002. It is contemplated, however, that an infrared (IR) receiver and transmitter can be employed in addition to or instead of the RF receiver 1102 and RF transmitter 1108. Moreover, it is to be appreciated that the RF receiver 1102 and/or RF transmitter 1108 can be transceivers that can receive and transmit data. Such transceivers can enable two-way communication. Thus, for instance, the remote control 1104 can be configured to repeatedly transmit a command signal until a configuration signal is received from the wireless light bulb 1002. Additionally, the wireless light bulb 1002 can transmit a confirmation signal upon receipt of an RF signal. According to another example, RF transceivers can enable providing the remote control 1104 with feedback concerning a state associated with the wireless light bulb 1002 (e.g., whether the light source 1006 is in an on state, an off state, a color and/or intensity of light yielded by the light source 1006), battery life, and so forth. Moreover, RF transceivers can allow the wireless light bulb 1002 to communicate with disparate wireless light bulb(s) (e.g., to repeat signals, coordinate actions). Pursuant to a further example, the transceiver can enable sending power usage data corresponding to the wireless light bulb 1002 to a disparate device (e.g., for storage, tracking, statistical analysis, billing).

According to another illustration, the remote control 1104 can manipulate any number of wireless light bulbs similar to the wireless light bulb 1002. For instance, similar changes in operation of any number of wireless light bulbs can be effectuated by the remote control 1104 and/or the remote control 1104 can communicate respective commands specific for any number of subsets of the wireless light bulbs. Pursuant to a further example, the remote control 1104 can encrypt data communicated to the wireless light bulb 1002 to provide security; therefore, the wireless light bulb 1002 (e.g., the control component 1010, a processor (not shown)) can decrypt the data received from the remote control 1104 via the RF receiver 1102.

Figure 12:
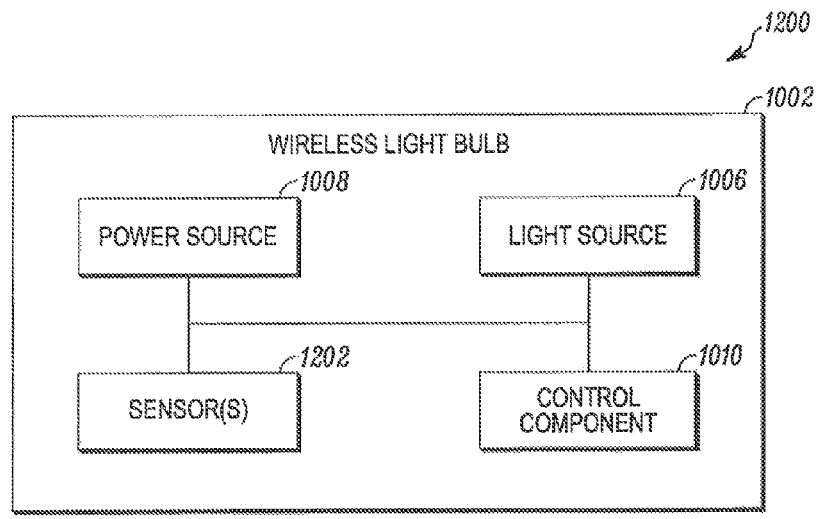
FIG. 12 shows another block diagram of an example system that provides wireless lighting.

Now referring to FIG. 12, illustrated is another block diagram of a system 1200 that provides wireless lighting. The system 1200 includes the wireless light bulb 1002 that can be removably attachable to any type of lighting fixture. Moreover, the lighting fixture can, but need not, provide power to the wireless light bulb 1002. The wireless light bulb 1002 can include the light source 1006 (e.g., LED(s)), the power source 1008, and the control component 1010. Moreover, the wireless light bulb 1002 can include any number of sensor(s) 1202. In addition to the sensor(s) 1202, the wireless light bulb 1002 can comprise a receiver that can obtain wireless control signals (e.g., the RF receiver 1102) or can lack such a receiver. According to a further example, the sensor(s) 1202 can be separate from the wireless light bulb 1002 and can wirelessly transmit information to the wireless light bulb 1002 to control operation thereof while lacking a wired connection to the wireless light bulb 1002; however, the claimed subject matter is not so limited.

It is to be appreciated that any type of sensor(s) 1202 can be utilized in connection with the claimed subject matter. For example, the sensor(s) 1202 can be one or more of infrared sensors, light sensors, proximity sensors, acoustic sensors, motion sensors, carbon monoxide and/or smoke detectors, thermal sensors, electromagnetic sensors, mechanical sensors, chemical sensors, and the like. According to an illustration, the wireless light bulb 1002 can include a passive infrared (PIR) sensor that can detect motion. The control component 1010 can determine if the motion detected by the PIR sensor is above a predetermined threshold. If the motion is above the predetermined threshold, the control component 1010 can switch the light source 1006 to an on state. Moreover, the control component 1010 can enable the light source 1006 to emit light for a period of time (e.g., predetermined, dynamically adjusted, as long as the detected motion remains above the threshold) prior to switching the light source 1006 to an off state. By way of another illustration, the sensor 1202 can be a light sensor that can monitor an amount of light in an environment (e.g., outside during differing times of day); thus, the control component 1010 can enable the light source 1006 to switch on when the amount of light monitored in the environment drops below a threshold (e.g., the light source 1006 can turn on at night and turn off during the day). In accord with another example, the wireless light bulb 1002 can be utilized in connection with providing an alarm (e.g., the wireless light bulb 1002 can yield a visual alarm indication) such that the sensor 1202 can detect a temperature of an environment or a temperature of the bulb itself, and the control component 1010 can enable operating the light source 1006 based upon the observed temperature (e.g., transition the light source 1006 to an on state when the temperature exceeds a threshold). However, the claimed subject matter is not limited to the aforementioned examples.

Figure 13:
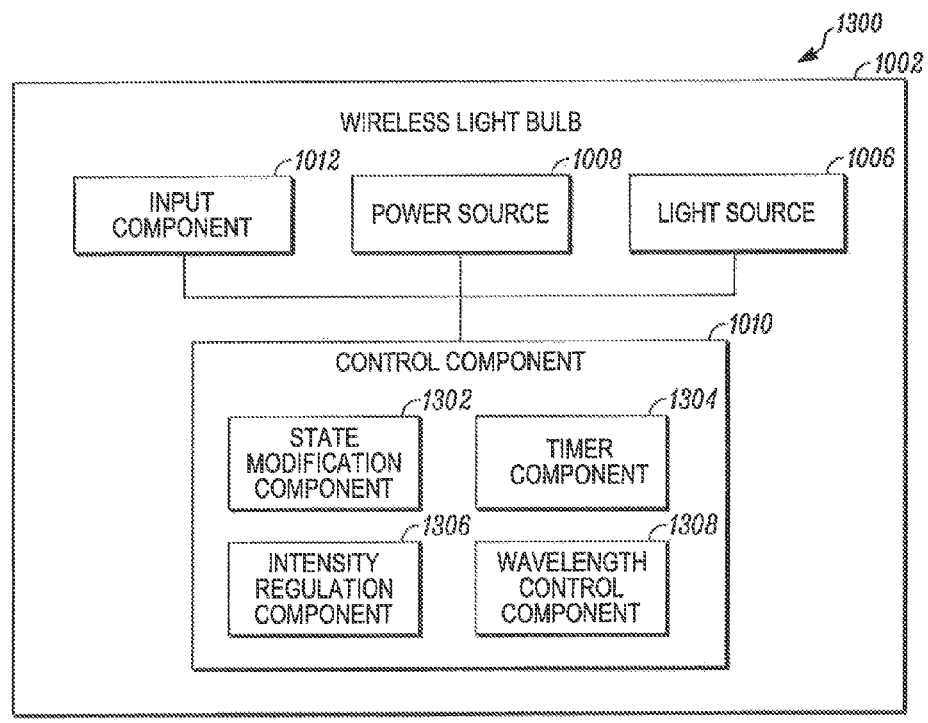
FIG. 13 shows a block diagram of an example system that provides illumination with a wireless light.

With reference to FIG. 13, illustrated is a block diagram of a system 1300 that provides illumination with a wireless light. The system 1300 includes the wireless light bulb 1002 that can further comprise the light source 1006 (e.g., one or more LEDs), the power source 1008, the control component 1010, and/or the input component 1012. The wireless light bulb 1002 can be incorporated into a housing (not shown). It is contemplated that any size and/or shape housing can be employed with the wireless light bulb 1002. According to another illustration, the housing can include at least a portion that is moveable (e.g., manually by a user, automatically with a motor or the like) to allow for directing emitted light. For example, a remote control can provide a signal to manipulate a moveable portion of the housing. Moreover, the housing can orient the light source 1006 in substantially any manner to provide general lighting (e.g., illuminating an indoor or outdoor area), task lighting (e.g., reading), accent lighting, and so forth.

The input component 1012 can receive an input from a disparate device (e.g., the remote control 1104 of FIG. 11, a stand-alone sensor). The input component 1012 can provide various adaptors, connectors, channels, communication paths, etc. to enable interaction with the disparate device. Pursuant to an illustration, the input can be wirelessly transmitted (e.g., via an RF signal, an IR signal) from the disparate device to the input component 1012; thus, the input component 1012 can be a receiver and/or a transceiver that obtains the wirelessly transferred signal. By way of example, an infrared sensor or motion sensor can monitor occupancy in an environment and, upon detecting presence within the monitored environment, the sensor can transmit a wireless input to the input component 1012. It is to be appreciated that any type of sensors can be utilized in connection with the claimed subject matter such as, but not limited to, infrared sensors, light sensors, proximity sensors, acoustic sensors, motion sensors, carbon monoxide and/or smoke detectors, thermal sensors, electromagnetic sensors, mechanical sensors, chemical sensors, and the like.

According to another example, any type of remote control can wirelessly communicate with the input component 1012. For instance, the remote control can be a stand-alone remote control (e.g., the remote control 1104 of FIG. 1) and/or incorporated into a disparate device (e.g., incorporated into a key fob, a programmable wireless transceiver integrated in an automobile). Moreover, the remote control can be a personal computer, a cellular phone, a smart phone, a laptop, a handheld communication device, a handheld computing device, a global positioning system, a personal digital assistant (PDA), and/or any other suitable device; such devices can communicate directly with the input component 1012 and/or via a network (e.g., local area network (LAN), wide area network (WAN), cellular network). By communicating via a network, the wireless light bulb 1002 can be controlled from a remote location (e.g., an individual can control the wireless light bulb 1002 in her home by utilizing a device in her office). Moreover, the aforementioned devices can be utilized to wirelessly program the wireless light bulb 1002. For instance, operation of a plurality of wireless light bulbs can be programmed from a personal computer (e.g., an RF transmitter can be coupled to a USB port of the computer to communicate with the input component 1012, the wireless light bulbs can be programmed to switch on and off at certain times of day).

In accord with another example, radio frequency identification (RFID) can be utilized to provide the input to the input component 1012. As such, an RFID tag associated with a user can be detected when in range of the input component 1012, and lighting preferences of the particular user (e.g., retained in memory) can be effectuated in response to his or her detected presence. By way of illustration, when an individual walks into a room in her house with an RFID tag, presence of the RFID tag can be observed by the input component(s) 1012 and the wireless light bulb(s) in the room can switch on, intensity, color, and/or direction of the light(s) can be altered, and so forth; however, the claimed subject matter is not so limited. It is also appreciated that the RFID tag can be read by a RFID reader, the identification of the individual can processed by a software program running on a computer or server and subsequently the computer or server can switch on, intensity, color, and/or direction of the light(s) can be altered, and so forth based on a stored profile for that individual.

Additionally or alternatively, the input component 1012 can be a sensor that can monitor a condition associated with the wireless light bulb 1002 to generate the input as described in connection with FIG. 12. According to another example, the input component 1012 can be a connector, port, etc. that couples to such sensor.

Further, the input component 1012 can wirelessly transmit data (e.g., feedback, related to a current and/or anticipated future state) to a remote device and/or sensor. By way of another example, the input component 1012 can wirelessly communicate with an input component of a disparate wireless light bulb to enable coordinated operation between more than one wireless light bulb. Following this example, an input can be retransmitted within a network of wireless light bulbs, where the network of light bulbs can be dispersed within a geographic area.

The power source 1008 can be any number and/or type of batteries. For instance, the battery can be a rechargeable battery. According to another example, the battery can be a non-rechargeable battery. The battery supplies power to the wireless light bulb 1002 to enable installing, moving, replacing, etc. the wireless light bulb 1002 in a fixture at substantially any indoor or outdoor location while mitigating the need for expensive and time consuming wiring and/or utilization of aesthetically unpleasing and potentially inconvenient cords commonly associated with conventional lighting. Pursuant to a further example, the wireless light bulb 1002 can obtain AC power from the fixture, and the AC power can supplement the power provided by the power source 1008 and/or be employed instead of power from the power source 1008.

According to an example, the light source 1006 can be one or more LEDs. It is contemplated that any number, type, color, arrangement, etc. of LEDs can be utilized with the wireless light bulb 1002. Further, the control component 1010 can provide instructions to manage operation of the LED(s). For instance, the control component 1010 can yield instructions to switch one or more LEDs on and/or off, change an intensity of illumination (e.g., brightness), switch a wavelength of light emitted from the LEDs (e.g., to change light color), manipulate direction of illumination (e.g., by moving, rotating, etc. one or more of the LEDs) and the like. However, the claimed subject matter is not limited to the light source 1006 including LED(s); rather, it is contemplated that any disparate type of light source 1006 can be employed.

The control component 1010 employs the input obtained by the input component 1012. The control component 1010 can further include a state modification component 1302, a timer component 1304, an intensity regulation component 1306, and/or a wavelength control component 1308; however, it is to be appreciated that the control component 1010 can include a subset of these components 1302-408. The state modification component 1302 utilizes the input obtained via the input component 1012 to generate an instruction to change a state of the light source 1006. The state modification component 1302 effectuates transitioning the light source 1006 to an on state, an off state, etc. Further, the state modification component 1302 can yield commands to strobe the light source 1006 (e.g., periodically turning the light source 1006 on and off with substantially any periodicity). According to an example, the state modification component 1302 can decipher that a received input pertains to the light source 1006 and/or a portion thereof (e.g., a subset of LED(s) in an LED array). Moreover, the state modification component 1302 can analyze the input to determine whether to yield instructions to modify operation of the light source 1006 (e.g., compare an input from a sensor to a threshold, evaluate whether a condition has been met, based upon retrieved instructions corresponding to the input retained in memory).

The timer component 1304 can operate in conjunction with the state modification component 1302. For instance, the timer component 1304 can enable delaying state changes. Thus, turning the light source 1006 on or off can be delayed for an amount of time by the timer component 1304. Further, the amount of time for the delay can be predetermined, randomly selected, included with the input obtained by the input component 1012 (e.g., based on a number of times a button of a remote control is depressed), etc. Moreover, the timer component 1304 can enable turning the light source 1006 on and off at certain times (e.g., to create an appearance of someone being in a house when the owner is out of town); for instance, the timer component 1304 can enable the state modification component 1302 to switch the state at preprogrammed times, at times determined according to a random pattern (e.g., randomly switch the light source 1006 on at different times during the day for differing lengths of time), and so forth. Additionally, the timer component 1304 can include a clock that provides an understanding of time of day, day, month, year, etc. for the wireless light bulb 1002; by way of illustration, the wireless light bulb 1002 can be synchronized with an individual's calendar to enable randomly turning the light source 1006 on and off when the individual is known to be away from home (e.g., a vacation, meeting, and the like can be scheduled on the calendar), switching the light source 1006 on when the individual is due to return home or guests are scheduled to arrive, and so forth. According to another example, the timer component 1304 can conserve battery life by enabling the state modification component 1302 to switch the light source 1006 to an off state at a particular time of day, after an elapsed amount of time subsequent to an input that turned the light source 1006 to the on state, and so forth. Pursuant to another illustration, the timer component 1304 can operate in conjunction with the intensity regulation component 1306 and/or the wavelength control component 1308 described below.

The intensity regulation component 1306 can alter the intensity (e.g., brightness) of the light source 1006 based upon the received input from the input component 1012. The intensity can be changed by the intensity regulation component 1306 adjusting a proportion of LEDs in an on state to LEDs in an off state when the light source 1006 includes an LED array. Additionally or alternatively, the intensity regulation component 1306 can control the intensity of light emitted by each of the LEDs in such an array. Pulse width modulation can be used to adjust the intensity of light of any or all LEDs to the desired intensity. In addition, the intensity regulation component in conjunction with the timer component, functions such as fade to off or fade to a low level of light until an input component detect a condition to transition to a full on state can also be implemented. According to an example, the input component 1012 can obtain RFID related input that identifies the presence of a particular user, and this user can have lighting preferences stored in memory (not shown) associated with the wireless light bulb 1002. Following this example, the particular user's preferences may indicate that she desires dim lighting, which can be effectuated by the intensity regulation component 1306. Pursuant to another example, upon a smoke detector or carbon monoxide detector sensing smoke or carbon monoxide, respectively, the intensity regulation component 1306 can increase the brightness of the illumination of the light source 1006 to a highest level (e.g., while the state modification component 1302 can strobe the light source 1006, the wavelength control component 1308 can change the color). It is to be appreciated, however, that the claimed subject matter is not limited to the aforementioned examples.

The wavelength control component 1308 can change the wavelength (e.g., color) of light generated by the light source 1006 as a function of the input obtained by the input component 1012. For example, the light source 1006 can include color changing LEDs, and the wavelength control component 1308 can yield commands to adjust the color based upon the input obtained by the input component 1012. By way of another example, subsets of LEDs included in the light source 1006 can yield differing colors, and the wavelength control component 1308 can select which of the LED subsets to turn to the on state to yield the desired color.

By way of further illustration, the control component 1010 can include memory (not shown) that can retain instructions, commands, settings, preferences, calendar data, etc. associated with the wireless light bulb 1002; additionally or alternatively, the memory can be separate from the control component 1010 (e.g., the wireless light bulb 1002 can include the memory and/or the memory can be separate from the wireless light bulb 1002). Pursuant to an example, a user can create a lighting profile that regulates operation of the wireless light bulb 1002; the lighting profile can be stored in memory and thereafter retrieved (e.g., upon receipt of input via the input component 1012) for use by the control component 1010 (and/or the state modification component 1302, the timer component 1304, the intensity regulation component 1306, the wavelength control component 1308). The memory can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), SYNCHLINK DRAM (SLDRAM), RAMBUS direct RAM (RDRAM), direct RAMBUS dynamic RAM (DRDRAM), and RAMBUS dynamic RAM (RDRAM). The memory of the subject systems and methods is intended to comprise, without being limited to, these and any other suitable types of memory. In addition, it is to be appreciated that the memory can be a server, a database, a hard drive, and the like. Further, the control component 1010 (and/or the wireless light bulb 1002) can include a processor (not shown) to execute instructions described herein.

Figure 14:
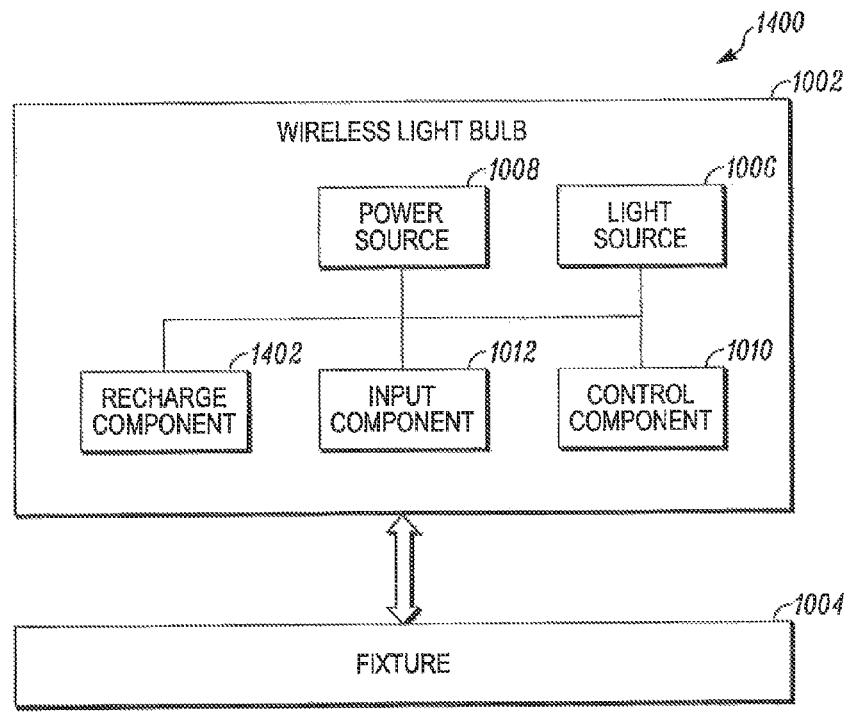
FIG. 14 shows a block diagram of an example system that recharges a power source integrated within a wireless light bulb.

Now referring to FIG. 14, illustrated is a system 1400 that recharges a power source (e.g., the power source 1008) integrated within a wireless light bulb (e.g., the wireless light bulb 1002). The system 1400 can include the wireless light bulb 1002 and the fixture 1004. The wireless light bulb 1002 can further include the light source 1006 (e.g., LED(s)), the power source 1008, the control component 1010, and/or the input component 1012. The wireless light bulb 1002 can also include a recharge component 1402 that can recharge the power source 1008. For example, the recharge component 1402 can enable recharging the power source 1008 when the power source 1008 comprises one or more rechargeable batteries. The light source 1006 can generate light while the recharge component 1402 recharges the power source 1008 (e.g., the wireless light bulb 1002 can be a battery backed up AC light bulb), for instance; however, the claimed subject matter is not so limited.

In accordance with an illustration, extended use of the wireless light bulb 1002 can decrease a charge of the power source 1008. For instance, the wireless light bulb 1002 can be utilized with a fixture (e.g., the fixture 1004) that lacks a connection to a power source (e.g., electrically wired to an AC power source); hence power for operation of the wireless light bulb 1002 can be provided by the power source 1008. To replenish the charge of the power source 1008, the wireless light bulb 1002 can be removed from the fixture 1004 and can be coupled to a charger (not shown), for example. When connected to the charger, the recharge component 1402 can increase the charge of the power source 1008. Following another example, the recharge component 1402 can increase the charge of the power source 1008 when the wireless light bulb 1002 is coupled to a fixture (e.g., the fixture 1004) that is electrically connected to an AC power source. Therefore, upon charge depletion of the power source 1008 of the wireless light bulb 1002 when connected to a fixture that lacks a connection to an AC power source, the wireless light bulb 1002 can be moved to a fixture that is hard-wired to an AC power source to enable recharging. Additionally, where the fixture 1004 is a lamp, the lamp can be unplugged (e.g., when it is desired to utilize the lamp positioned at a distance from an outlet longer than a length of a cord of the lamp) and the wireless light bulb 1002 can operate by leveraging the power source 1008, and thereafter, the lamp can be plugged into an outlet to allow the recharge component 1402 to increase the charge of the power source 1008. According to another illustration, the recharge component 1402 can be a solar cell (or a plurality of solar cells) that can increase the charge of the power source 1008.

Figure 15:
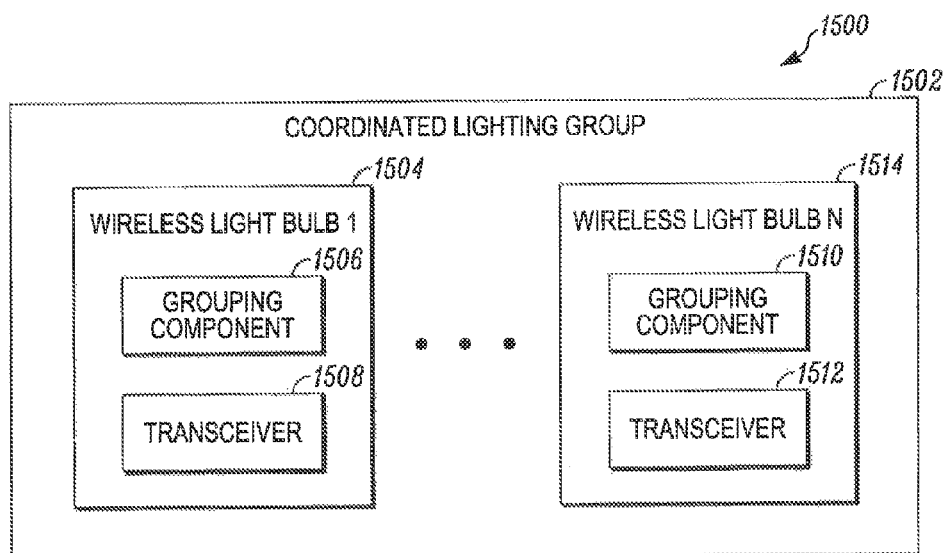
FIG. 15 shows a block diagram of an example system that coordinates operation of a set of wireless light bulbs.

Turning to FIG. 15, illustrated is a system 1500 that coordinates operation of a set of wireless light bulbs. The system 1500 includes a coordinated lighting group 1502 which can include any number N of wireless light bulbs (as shown by the series of wireless light bulbs from wireless light bulb 1504 through wireless light bulb 1514), where N can be substantially any integer. The N wireless light bulbs 1504-1514 can each be substantially similar to the wireless light bulb 1002 described above. Moreover, each of the wireless light bulbs 1504-1514 can include a respective grouping component and transceiver (e.g., wireless light bulb 1 1504 can include a grouping component 1506 and a transceiver 1508 and wireless light bulb N 1506 can include a grouping component 1510 and a transceiver 1512).

The wireless light bulbs 1504-1514 in the coordinated lighting group 1502 can be controlled with a common remote control (e.g., the remote control 1104 of FIG. 11) and/or sensor(s), for instance. According to another example, operation of the wireless light bulbs 1504-1514 or a subset thereof can be coordinated. Thus, at least a subset of the wireless light bulbs 1504-1514 can concurrently switch from an on state to an off state, or vice versa, when the respective transceivers 1508, 1512 obtain such an input signal from the common remote control and/or sensor(s). It is to be appreciated that the coordinated lighting group 1502 can be programmed in substantially any manner to manage operations of the wireless light bulbs 1504-1514 as a group.

The grouping components 1506, 1510 can enable the coordinated lighting group 1502 to be assembled. For instance, the grouping components 1506, 1510 can allow each of the wireless light bulbs 1504-1514 to be assigned to operate upon a particular RF frequency (e.g., channel). Thus, the grouping components 1506, 1510 can select the channel corresponding to the coordinated lighting group 1502 for each respective wireless light bulb 1504-1514. For example, the channel can be user selected, preprogrammed, randomly generated, previously stored in memory, etc. According to another illustration, the grouping components 1506, 1510 can learn the channel related to the coordinated lighting group 1502. Following this illustration, when initializing the wireless light bulb 1 1504, the transceiver 1508 can obtain a setup signal from a remote control, sensor, etc. associated with the coordinated lighting group 1502, and the grouping component 1506 can utilize the setup signal to learn the channel associated with the remote control, sensor, etc. However, it is contemplated that the claimed subject matter is not limited to the aforementioned examples.

Figure 16:
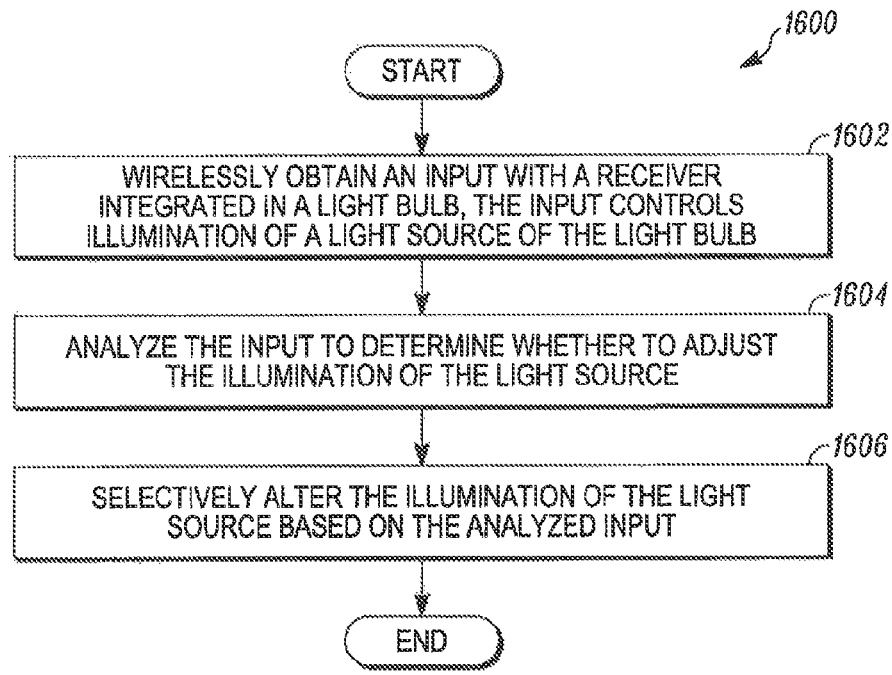
FIG. 16 shows a methodology that facilitates selectively emitting light in accordance with a wireless input.

FIGS. 15-16 illustrate methodologies in accordance with the claimed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events.

With reference to FIG. 16, illustrated is a methodology 1600 that facilitates selectively emitting light in accordance with a wireless input. At 1602, an input can be wirelessly obtained with a receiver integrated in a light bulb. The input can control illumination of a light source of the light bulb. Further, the input can be obtained from any type of source (e.g., remote control, disparate wireless light bulb, differing device, sensor). Moreover, the input can be provided from the source via an RF signal, an IR signal, and so forth. At 1604, the input can be analyzed to determine whether to adjust the illumination of the light source. For example, the light source can include one or more LEDs. Following this example, if the input provides a command to toggle the state of the LEDs, then an instruction can be yielded to switch the LEDs from an on state to an off state (or vice versa). At 1606, the illumination of the light source can be selectively altered based on the analyzed input. For example, the light source can be switched to an on state or an off state, the intensity or color of light emitted by the light source can be modified, and the like.

Figure 17:
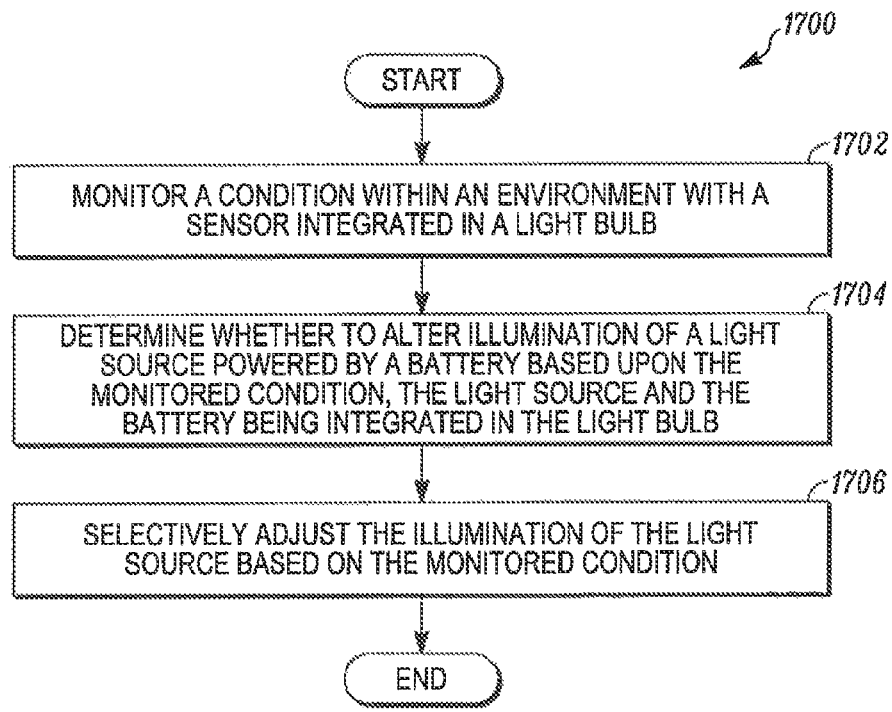
FIG. 17 shows a methodology that facilitates selectively emitting light based upon input from a sensor.

Turning now to FIG. 17, illustrated is a methodology 1700 that facilitates selectively emitting light based upon input from a sensor. At 1702, a condition within an environment can be monitored with a sensor integrated in a light bulb. The sensor, for example, can be one or more infrared sensors, light sensors, proximity sensors, acoustic sensors, motion sensors, carbon monoxide and/or smoke detectors, thermal sensors, electromagnetic sensors, mechanical sensors, chemical sensors, and the like. At 1704, a determination can be effectuated regarding whether to alter illumination of a light source powered by a battery based upon the monitored condition, where the light source and the battery can be integrated in the light bulb. For example, the determination can be made by comparing the monitored condition to a threshold. Additionally, the determination can be based at least in part upon considerations related to a current state associated with the light source, a charge level of the battery, and so forth. At 1706, the illumination of the light source can be selectively adjusted based on the monitored condition. Pursuant to an illustration, the light source can be switched to an on state when a darkness level exceeds a threshold (e.g., at night) and thereafter the light source can be transitioned to an off state when the amount of light increases (e.g., during the day); it is contemplated, however, that the claimed subject matter is not so limited.

Figure 18:
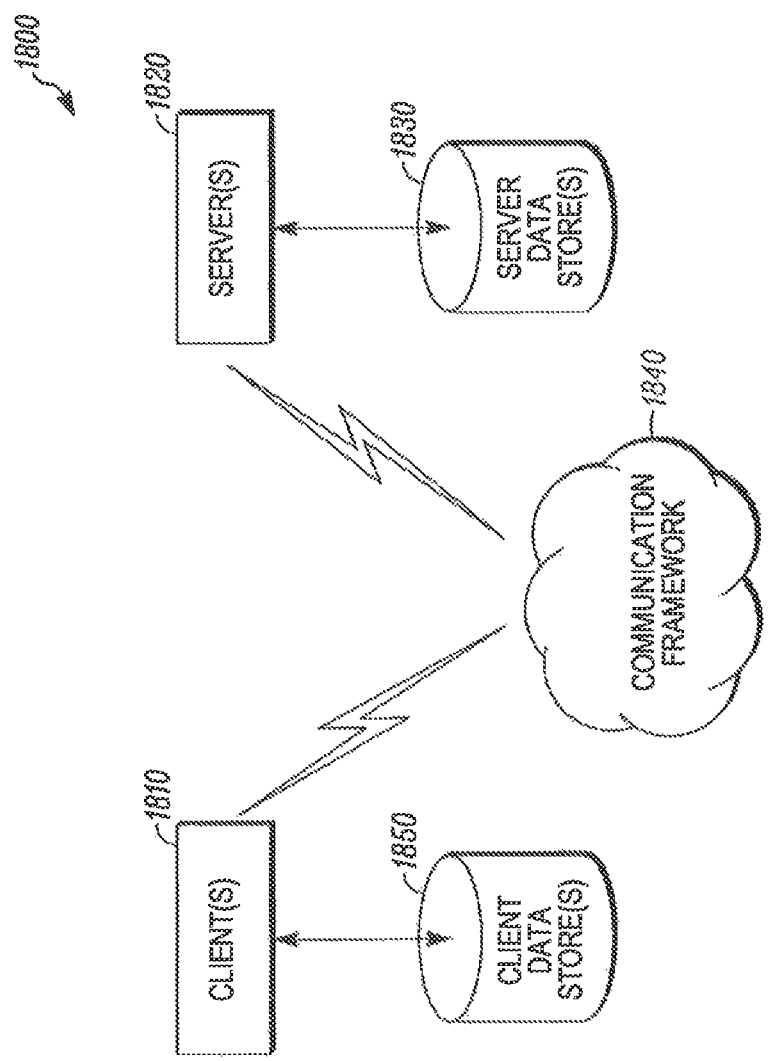
FIG. 18 shows an example networking environment, wherein the novel aspects of the claimed subject matter can be employed.
Figure 19:
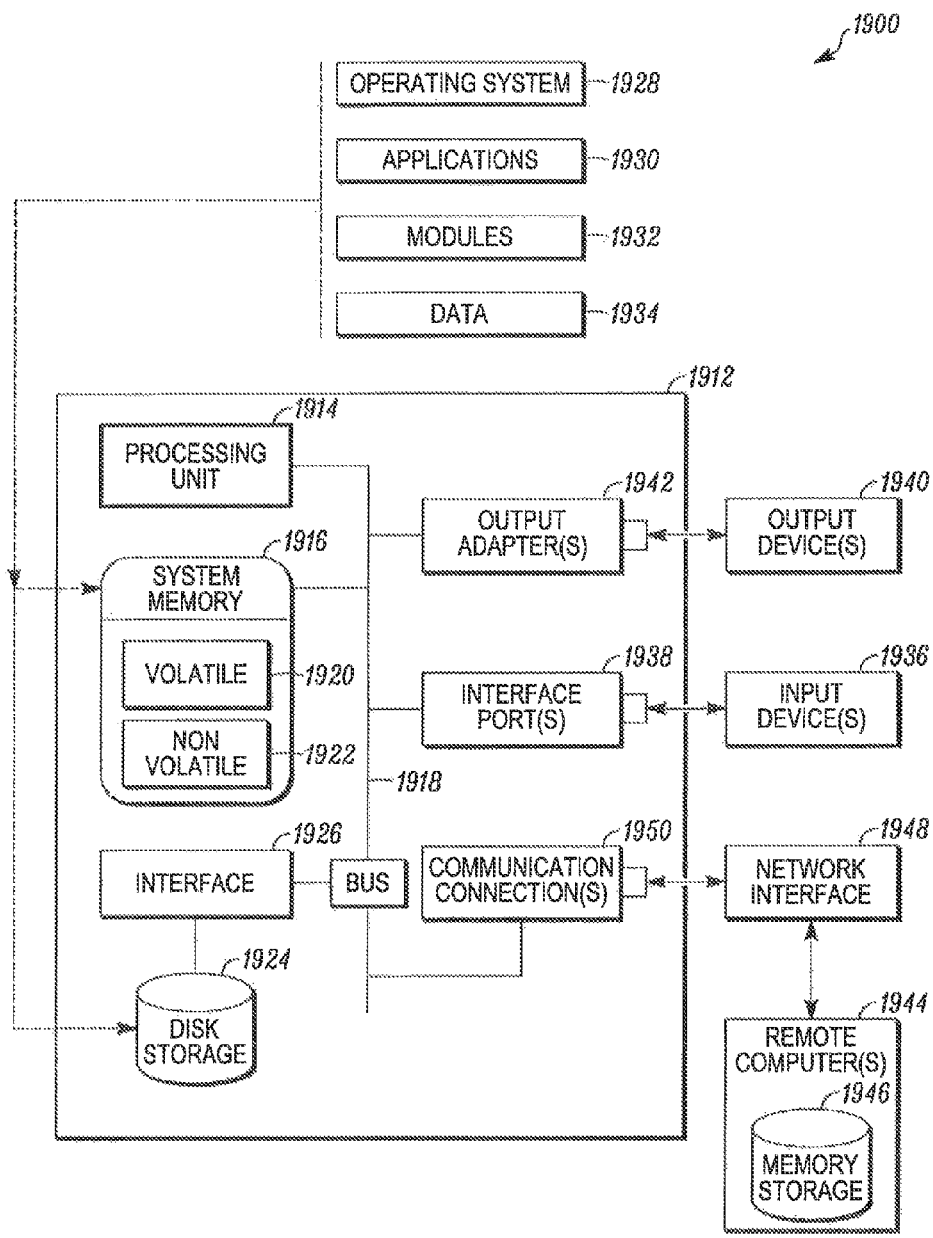
FIG. 19 shows an example operating environment that can be employed in accordance with the claimed subject matter.

In order to provide additional context for implementing various aspects of the claimed subject matter, FIGS. 18-19 and the following discussion is intended to provide a brief, general description of a suitable computing environment in which the various aspects of the subject innovation may be implemented. For instance, FIGS. 18-19 set forth a suitable computing environment that can be employed in connection with programming, controlling, coordinating, monitoring, etc. one or more wireless light bulbs described herein. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types. It is to be appreciated, however, that the claimed subject matter is not limited to being employed in connection with the example computing environment set forth in FIGS. 18-19.

Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 18 is a schematic block diagram of a sample-computing environment 1800 with which the claimed subject matter can interact. The sample-computing environment 1800 includes one or more client(s) 1810. The client(s) 1810 can be hardware and/or software (e.g., threads, processes, computing devices). The sample-computing environment 1800 also includes one or more server(s) 1820. The server(s) 1820 can be hardware and/or software (e.g., threads, processes, computing devices). The servers 1820 can house threads to perform transformations by employing the subject innovation, for example.

One possible communication between a client 1810 and a server 1820 can be in the form of a data packet adapted to be transmitted between two or more computer processes. The sample-computing environment 1800 includes a communication framework 1840 that can be employed to facilitate communications between the client(s) 1810 and the server(s) 1820. The client(s) 1810 are operatively connected to one or more client data store(s) 1850 that can be employed to store information local to the client(s) 1810. Similarly, the server(s) 1820 are operatively connected to one or more server data store(s) 1830 that can be employed to store information local to the servers 1820.

With reference to FIG. 19, an exemplary environment 1900 for implementing various aspects of the claimed subject matter includes a computer 1912. The computer 1912 includes a processing unit 1914, a system memory 1916, and a system bus 1918. The system bus 1918 couples system components including, but not limited to, the system memory 1916 to the processing unit 1914. The processing unit 1914 can be any of various available processors. Dual microprocessors and other multiprocessor architectures also can be employed as the processing unit 1914.

The system bus 1918 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), FIREWIRE (IEEE 1394), and Small Computer Systems Interface (SCSI).

The system memory 1916 includes volatile memory 1920 and nonvolatile memory 1922. The basic input/output system (BIOS), containing the basic routines to transfer information between elements within the computer 1912, such as during start-up, is stored in nonvolatile memory 1922. By way of illustration, and not limitation, nonvolatile memory 1922 can include read only memory (ROM), programmable ROM (PROM), electrically programmable ROM (EPROM), electrically erasable programmable ROM (EEPROM), or flash memory. Volatile memory 1920 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), SYNCHLINK DRAM (SLDRAM), RAMBUS direct RAM (RDRAM), direct RAMBUS dynamic RAM (DRDRAM), and RAMBUS dynamic RAM (RDRAM).

Computer 1912 also includes removable/non-removable, volatile/non-volatile computer storage media. FIG. 19 illustrates, for example a disk storage 1924. Disk storage 1924 includes, but is not limited to, devices like a magnetic disk drive, floppy disk drive, tape drive, JAZ drive, ZIP drive, LS-100 drive, flash memory card, or memory stick. In addition, disk storage 1924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1924 to the system bus 1918, a removable or non-removable interface is typically used such as interface 1926.

It is to be appreciated that FIG. 19 describes software that acts as an intermediary between users and the basic computer resources described in the exemplary environment 1900. Such software includes an operating system 1928. Operating system 1928, which can be stored on disk storage 1924, acts to control and allocate resources of the computer 1912. System applications 1930 take advantage of the management of resources by operating system 1928 through program modules 1932 and program data 1934 stored either in system memory 1916 or on disk storage 1924. It is to be appreciated that the claimed subject matter can be implemented with various operating systems or combinations of operating systems.

A user enters commands or information into the computer 1912 through input device(s) 1936. Input devices 1936 include, but are not limited to, a pointing device such as a mouse, trackball, stylus, touch pad, keyboard, microphone, joystick, game pad, satellite dish, scanner, TV timer card, digital camera, digital video camera, web camera, and the like. These and other input devices connect to the processing unit 1914 through the system bus 1918 via interface port(s) 1938. Interface port(s) 1938 include, for example, a serial port, a parallel port, a game port, and a universal serial bus (USB). Output device(s) 1940 use some of the same type of ports as input device(s) 1936. Thus, for example, a USB port may be used to provide input to computer 1912, and to output information from computer 1912 to an output device 1940. Output adapter 1942 is provided to illustrate that there are some output devices 1940 like monitors, speakers, and printers, among other output devices 1940, which require special adapters. The output adapters 1942 include, by way of illustration and not limitation, video and sound cards that provide a means of connection between the output device 1940 and the system bus 1918. It should be noted that other devices and/or systems of devices provide both input and output capabilities such as remote computer(s) 1944.

Computer 1912 can operate in a networked environment using logical connections to one or more remote computers, such as remote computer(s) 1944. The remote computer(s) 1944 can be a personal computer, a server, a router, a network PC, a workstation, a microprocessor based appliance, a peer device or other common network node and the like, and typically includes many or all of the elements described relative to computer 1912. For purposes of brevity, only a memory storage device 1946 is illustrated with remote computer(s) 1944. Remote computer(s) 1944 is logically connected to computer 1912 through a network interface 1948 and then physically connected via communication connection 1950. Network interface 1948 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1950 refers to the hardware/software employed to connect the network interface 1948 to the system bus 1918. While communication connection 1950 is shown for illustrative clarity inside computer 1912, it can also be external to computer 1912. The hardware/software necessary for connection to the network interface 1948 includes, for exemplary purposes only, internal and external technologies such as, modems including regular telephone grade modems, cable modems and DSL modems, ISDN adapters, and Ethernet cards.

Some embodiments may include an auto shutoff feature. This feature may be set by toggling or setting a switch, may be programmable, may be responsive to a battery's level, may include fade-to-off effect, and so on.

A variety of products and applications in accordance with the foregoing are possible. Without limitation, these products and applications include a closet light, a sconce, an under cabinet light, a pendant light, a track light, a night light, a spotlight (indoor or outdoor), a stair light, a path light, a deck light, a porch light, an address marker light, a mailbox light, a picture light, a plant light, a tree light, a flower bed light, a cove light, a light bulb (e.g. PAR30, PAR38, MR16, A19, A26, and so on), and so forth. In embodiments, the light bulb may be AC powered (e.g. an incandescent replacement); may include a motion sensor; may include a light sensor; may include an RF or IR receiver, transmitter, or transceiver, may include an embedded battery; may include an embedded programmable timer control; may include a charger base and battery embedded bulb; and so on. In embodiments having an embedded battery products and applications may include a "fixture anywhere" battery powered bulb; a "lamp anywhere" battery powered bulb; an "uninterruptible power supply-type bulb" that is AC powered, switches over to battery power when the AC power fails, and can be toggled on/off regardless of whether the AC power has failed; an "emergency light bulb" that is battery powered and switches on when AC power fails; an "emergency battery backed LED down light/florescent light", which is similar to the emergency light bulb except that the batteries are mounted in the down light fixture or fluorescent bulb, fixture or ballast. In embodiments having an embedded programmable timer control, the light bulb may turn on and off at certain times and may operate in an "at home" mode, an "away" mode, and so on.

Further products and applications may include a for sale sign, a light adapted for boating or water sports, a street lamp, a driveway light, a reading light, a pool light (e.g. a waterproof or water resistant light), an LED "throwie" (e.g. an LED lamp that can be placed by hand), a camping light, a warning light, a light adapted for a signage application, a light for non-automotive vehicles (e.g. a personal vehicle such as a bicycle, scooter, skateboard, SEGWAY, stroller, or the like), a light adapted for automotive vehicles (e.g. an interior or exterior retrofit light, an RV light, a bus light, and so on), a campus light, a parking garage light, a light adapted for emergency responder applications, a battery-backed industrial fixture (e.g. hallway or stairwell lights, downlighting, and so on), and so forth.

Embodiments may be suitable for a variety of use scenarios. Use of embodiments in integrated systems may, without limitation, include automotive lighting systems, military lighting systems, emergency response systems, campus lighting, parking garage lighting systems, outdoor lighting systems, and so on. Embodiments may be sold in a kit that includes instructions for use. Such kits may be directed at residential use, including without limitation a basketball court lighting kit, a playground lighting kit, a hot tub lighting kit, a fall-prevention lighting kit (indoor or outdoor), a front walkway lighting kit, a garage lighting kit, a shed lighting kit, a gazebo lighting kit, a deck and patio lighting kit, a dock lighting kit, a dock lighting kit, an animal deterrent kit, a power outage lighting kit, a boat lighting kit, a house perimeter lighting kit, a tennis court lighting kit, a dorm room lighting kit, and so on. Such kits may be directed at commercial and industrial applications including, without limitation, a new construction lighting kit, an office night ext lighting kit, a warehouse supplemental lighting kit, a storage unit facility lighting kit, a stair emergency lighting kit, and so on.

Without limitation, embodiments may include an RF-controlled closet light, an RF-controlled spotlight, an RF-controlled stair light, an RF-controlled deck light, a motion-responsive closet light, a motion-responsive spotlight, a motion-responsive stair light, a motion-responsive sensor light, a motion light bulb, an RF-controlled light bulb, a light-responsive light bulb, and so on.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

Figure 20:
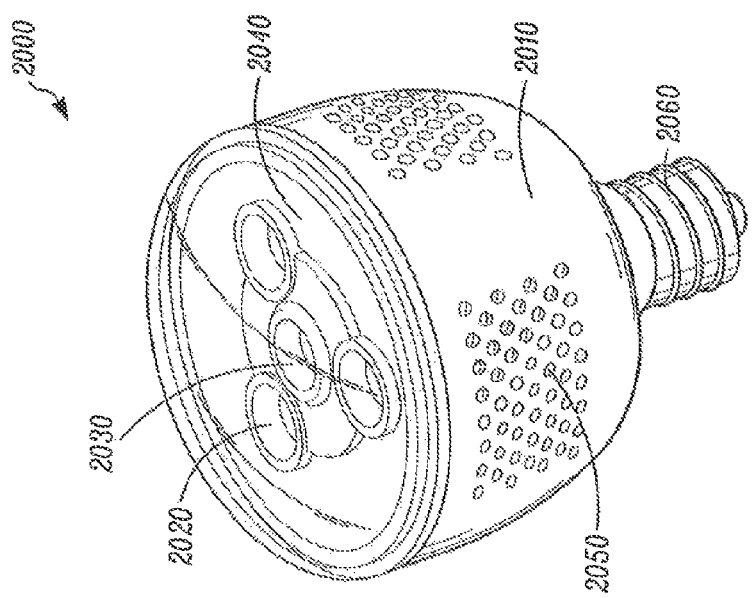
FIG. 20 shows a perspective view of an embodiment of a motion wireless light bulb.

In a second illustrative embodiment, a version of the wireless light bulb is a motion controlled, light sensor activated LED light bulb. With reference to FIG. 20, illustrated is a perspective view of an embodiment of a motion wireless light bulb 2000. In the illustrated embodiment, the motion wireless light bulb 2000 includes a housing 2010, a plurality of LEDs 2020, a motion sensor 2030, logic 2040, power circuitry 2050 and a light socket adapter 2060. In the illustrated embodiment, the motion wireless light bulb 2000 includes 3 LEDs. In alternative embodiments, a motion wireless light bulb 2000 may include more LEDs 2020 to provide greater illumination or fewer LEDs 2020 to use less power. It is to be appreciated that the motion wireless light bulb 2000 can include any number of LEDs 2020, and the LEDs 2020 can be positioned at substantially any locations with respect to one another as well as in comparison to the housing 2010. It is noted that the motion wireless light bulb 2000 can be designed in any size or shape so that the housing 2010 meets the requirements of any standard size bulb (PAR30, PAR38, A19, R30, MR16, and so on), non-standard size bulb, fixture, fluorescent bulb or lamp (T4, T5, T8, circular, and so on) or down light assembly (recessed fixtures, fluorescent fixtures or down light fixtures for residential or industrial lighting), or the like. In alternate embodiments, any type of wireless light bulb mentioned herein can be designed in any size or shape housing to meet the requirements of any standard size bulb (PAR30, PAR38, A19, R30, MR16 etc), non-standard size bulb, fixture, fluorescent bulbs or lamps (T4, T5, T8, circular, and so on) or down light assembly (recessed fixtures, fluorescent fixtures or down light fixtures for residential or industrial lighting), or the like. It is also to be appreciated that the light socket adapter 2060 can be designed to interface electrically and mechanically with any standard size or non-standard size bulb socket including screw thread bases, bayonet bases, pin bases and any other kind of special lamp base that can be used. In the illustrated embodiment, the motion wireless light bulb 2000 illuminates an area of approximately twenty square feet when above the ground ten feet pointing directly down. Alternate embodiments may include but are not limited to any known light source including LEDs, compact fluorescent, fluorescent, induction, halogen, gas discharge, organic LEDs (OLED), plasma, radio generated plasma and incandescent bulbs and can illuminate any size area.

In the illustrated embodiment, the housing 2010 is constructed of plastic. Alternatively, the housing 2010 can be constructed of metal or any other known material. In one embodiment the housing can be waterproof, shatterproof, UV resistant and/or corrosion resistant for use outdoors or difficult environments. The material of the housing can serve as a heat sink and can be constructed of a material to dissipate or conduct heat away from the LEDs to improve the performance and extend the life of the LEDs.

In the illustrated embodiment the housing 2010 includes a reflector for each LED to reflect the light from the LEDs to provide a distinct area of coverage. In other embodiments, an optical lens or lenses or reflectors can direct the light, reflect the light or change the viewing angle of the LEDs. The housing of the bulb may include any number of optical elements. The optical elements may serve to focus, diffuse, filter, collimate, or otherwise affect light produced by the LEDs 2020. In embodiments, the optical elements may include one or more lenses, reflectors, optical filters, aperture, and so on. The lenses may be fixed, a multiple lens array, adjustable, and so on. The lenses or reflectors may be manually adjustable, motorized with direct control with switches on the unit for adjusting the direction or characteristics of the light source, motorized with a remote control for adjusting the direction or characteristics of the light source through RF or IR control or it may detect motion and automatically adjust the lenses or reflectors to aim the light in the direction of the motion. An example use of the embodiment where the lenses or reflectors are automatically adjusted based on the direction in which motion is detected is several light bulbs can adjust to direct light in the direction of the motion adding illumination to the object in motion thereby allowing the individual light bulbs to be smaller and require less power but still resulting in a necessary amount of light on the object in motion. In some embodiments, there may be an array of optical elements that are pointed in fixed directions such that the light may be redirected by turning on LEDs pointing in a desired direction with a desired light output and turning off LEDs that may not point in the desired direction or provide the desired light output. Thus, the directionality of the light is achieved based on which LEDs are on and which LEDs are off in the embodiment.

With continued reference to illustrated embodiment shown in FIG. 20 one input component is a motion sensor. When the motion sensor 2030 detects motion, logic 2040 determines if the motion is above a predetermined threshold. If the motion is above the predetermined threshold, the logic 2040 instructs an LED controller to turn on at least one LED. The motion sensor will only be operational if a second input component, a light sensor, detects that detected light is at a low enough level to allow the motion sensor 2030 to control the LEDs to turn on (i.e. the bulb will only work in the dark or whatever low light level is set by the light sensor and its detection circuitry). In an alternate embodiment the light sensor is not present and the bulb works only based on the state of the motion sensor 2030.

In the illustrated embodiment, after the LEDs are turned on, the logic 2040 starts a timer. The logic will then instruct the LED controller to turn off the LEDs if no motion is detected before the timer reaches a predetermined timer threshold. If motion is detected before the timer reaches the timer threshold, the LEDs will remain on and the timer will reset to the timer starting point. The illustrated embodiment includes this auto shutoff feature to provide efficient energy usage by shutting off or limiting power consumption by the light source when motion is not detected. This feature is factory set via a timer that expires such that after turn on, if there is no reactivation of the control to turn the LEDs on, the unit will automatically turn the LEDs off when the timer expires. In alternate embodiments, there may be more than one auto shutoff timer, there may be an adjustable auto shutoff timer with a method to select the desired auto shutoff time, and the like. This feature may be set by toggling or setting a switch or switches, may be dial selectable, may be set by a potentiometer, may be programmable directly or by remote, and so on.

In the illustrated embodiment, the timer consists of an RC electrical circuit that discharges to the factory set voltage threshold over some period of time at which time, if not retriggered, will automatically shut off the LEDs. Other embodiments may have a timer built in any known timer circuit and allow features based on the timer value that automatically shut off the LEDs, automatically turn on the LEDs or automatically change the light intensity level. This feature may be set by toggling or setting a switch, may be dial selectable, may be set by a potentiometer, may be programmable directly or by remote, may include a fade-to-off effect, fade-to-dim effect, fade-to-glow effect, fade from one light intensity level to another light intensity level and so on. In some embodiments, the feature may include an increase in light intensity over time which may include an off-to-glow effect, glow-to-dim, glow-to-some light intensity level, an increase from one light intensity level to a higher light intensity level and so on. It is to be appreciated that the change from one light intensity level to another light intensity level may happen over any period of time that may be implemented with the timers. A second feature may have two or more auto shutoff levels set by multiple timers. For example the auto shutoff feature may control the light from bright to dim when the first timer expires and from dim to off when the second timer expires and so on. It is to be appreciated that any form of control by a wireless light bulb or wireless lighting module may trigger the feature of changing the lighting intensity level from one level to another including wireless control, direct control or intelligent programming to change the state.

Other embodiments can include a circuit that allows the unit to glow at a level such that the unit can be a marker in a dark environment and when motion is detected it turns on to a bright level for illumination to a level that a user can find their way. An alternate embodiment would include a circuit that allows the bulb to be on at a low light level to illuminate an area with enough light to see the area from a distance and when motion is detected the LEDs turns on to a bright level for illumination to a level that a user can accomplish any task desired. In another embodiment, the low light level blinks at some rate to provide a marker until a sensor triggers transitioning to a bright level. In some embodiments, the control of the brightness level at glow, low, bright or any brightness level the user may desire is controlled by a dial, buttons, switches, RF/IR remote or any other known control to allow the user to set the different light levels to the individual user preference.

In another embodiment, the light can be programmed to fade over time such that the light is activated and slowly fades until it reaches either a glow level or a low light level. An example of this application is a wireless light bulb plugged into a light socket or lamp in the bedroom of a child that is on when they go to bed at night, but fades over time to a glow level or a low light level as they fall asleep. The design can include any controls, methods and circuits by which to achieve multiple light levels. In addition the design may include methods and circuits to achieve constant current control to achieve consistent brightness at the different light levels.

In the illustrated embodiment, the motion wireless light bulb 2000 includes a passive infrared sensor configured to detect motion. In one embodiment, the passive infrared sensor has a range of approximately 10 feet and a viewing angle of 45 degrees. In alternative embodiments, the passive infrared sensor may have a range and viewing angle of any known passive infrared sensor. In one alternative embodiment, the passive infrared sensor is removably connected to the unit so that a user may connect any appropriate sensor. In some embodiments, the passive infrared sensor may be replaced or enhanced by a radar sensor, an ultrasound sensor, or any and all other form of motion sensor.

In other embodiments, any and all sensors may include a detection threshold or false detection rate that can be configured according to a user's preference. For example and without limitation, a light sensor may be configured to detect when incoming light crosses a user-preferred intensity threshold. The light sensor may contain many thresholds that can be detected. In such an example, the light source may be controlled in a different way upon each crossing of a threshold. For example, between any two thresholds detectable by the light sensor, the light source may be set to a particular brightness level. In such a case, as the ambient light increases or decreases (during dawn or dusk for example), the light source may slowly decrease or increase its brightness level based on preset levels. It is to be appreciated that hysteresis may be built in at the crossing of a threshold. It is also to be appreciated that there may be no thresholds and the light intensity is set based on the ambient light level detected such that the ambient light plus the light generated by the light source maintain a constant light level as set in the design or as set by the user. Control of this function may be done in the electrical circuit, done by a microcontroller, may include programmable thresholds, etc. A variety of other such examples will be appreciated, all of which are within the scope of the present disclosure.

In the illustrated embodiment, a Fresnel lens enables motion detections. The motion detector includes a Fresnel lens that guides infrared light over the PIR sensor in a substantially repeating pattern as a heat source (such as a person, vehicle, and so on) passes in front of the lens. The combination of the passive infrared sensor and Fresnel lens has a range of 15 feet and a viewing angle of 90 degrees. In embodiments, the Fresnel lens may be selected to provide a desired zone of coverage. It will be understood that a variety of embodiments of motion detectors including or excluding the Fresnel lens are possible.

With continued reference to FIG. 20, when the motion sensor 2030 detects motion, logic 2040 determines if the motion is above a predetermined threshold. If the motion is above the predetermined threshold, the logic 2040 instructs an LED controller to turn on at least one LED 2020. After the at least one LED 2020 is turned on, the logic 2040 starts a timer. The logic 2040 will then instruct the LED controller to turn off the at least one LED 2020 if no motion is detected before the timer reaches a predetermined threshold. In an alternate embodiment, the logic will control at least one LED 2020 to revert to a glow or low light level when the timer reaches a predetermined threshold to conserve energy but also provide a low level of light until motion is detect to turn on to the bright light level. In an alternate embodiment, the logic 2040 can maintain the bright light level for some period of time, but then can control the light to fade to off, to a glow or to a low light level by slowly dimming the at least one LED through pulse width modulation or any other known method over some preset or programmable period of time until it reaches off, the glow or the low light level.

A wireless light bulb can be controlled by any type of input signal that can be leveraged by the logic to manipulate operation of the LEDs. Thus, the input component can be a radio frequency (RF) or infrared (IR) receiver that can obtain an RF or IR signal communicated from an RF or IR transmitter that can be utilized by the logic to control operation of the LEDs. The RF or IR transmitter can come in the form of remote control, key fob, wall switch or any other controller that can house the RF or IR circuitry and user control mechanism. According to this example, the RF or IR transmission can be deciphered by the input component to effectuate switching the LEDs to an on or off state, changing a light color or a light intensity provided by the LEDs, and the like. By way of an example, dimming commands can control the wireless light bulb to specific levels in response to commands received from the RF or IR transmitter in a remote control or wall switch. Controls (mode buttons, control wheel, etc) on a remote control or wall switch can increase or decrease the light level, set the level to glow, low, high light level or the like directly. By way of an example, a PAR30 type AC powered wireless light bulb can be controlled by RF or by the wall switch with the light source AC powered. This type of wireless light bulb can be installed in a porch light fixture. The porch light can be controlled by a wall switch inside of a house, but also be controlled by a RE remote control. This is useful because it allows the porch light to be turned on from a car as the car enters a driveway. This may eliminate the need to keep the porch light on all of the time that the user is away from the house, but still allowing them to use the porch light to illuminate the area when needed.

In an alternate embodiment, a network of wireless light bulbs can be created by embedding an RF transceiver with intelligence (microcontroller, microprocessor, integrated circuit etc.) in the wireless light bulbs and using a communication protocol between the bulbs to control any size group of bulbs to accomplish any task described herein. Other control sources designed to communicate through the network such as wall switches, key fobs, remote controls, RF adapters that can plug into a computer and be controlled by a software program, etc. can also connect to the network and control wireless light bulbs in the network. By way of an example, the wireless light bulbs are a combination of RF transceiver and motion sensor. If one bulb detects motion, it sends out a message to all bulbs via its RF transmitter to turn all of the bulbs on to a specific brightness level. Bulbs can also receive a message via its RF receiver and retransmit it via its RF transmitter to extend the range of lights beyond what is within the range of the initial unit that detected motion. In an alternate example, the control source may be one or more remote controls with a push button that is pressed to turn the lights on and a push button, that is pressed to turn the lights off with a unique identifier that can be set that can select the wireless light bulbs to control, and the like. When either button is pressed, a command is transmitted by a remote control to the network to control the bulbs that receive it. The command may also be propagated through the network of bulbs via the RF transceiver in each bulb to control a portion of or the entire network of wireless light bulbs. It is to be appreciated that the bulbs can use any type of networking protocol (routing, flooding etc.) that may effectively distribute state information through the network of bulbs. When the auto shutoff timer of the originating wireless light bulb times out, it can send an off command which is also propagated through the network of light bulbs to shut them all off. The triggering method can be any method sensor described herein and the sending of signals from one wireless light bulb to another can be RF/IF, wired or wireless network (WIFI, ZIGBEE, X10 etc.) or wired with any electrical control mechanism between wireless light bulbs that can be defined.

Additionally or alternatively, the input component can be one or more sensors that monitor a condition, and monitored information yielded by such sensor(s) can be utilized to effectuate adjustments associated with the LEDs. It is to be appreciated that any type of sensor(s) can be utilized in connection with the claimed subject matter instead of or in conjunction with a motion sensor. For example, the sensor(s) can be one or more of infrared sensors, light sensors, proximity sensors, magnetic switch sensor, acoustic sensors, voice activated sensor, motion sensors, radar sensors, sonar sensors, carbon monoxide and/or smoke detectors, thermal sensors, electromagnetic sensors, mechanical sensors, chemical sensors, pressure sensor, RFID tag reader or detection circuit and the like. According to another example, the input component can be a connector, port, etc. that couples to a disparate device, sensor, etc. to receive the input signal. It is also appreciated that any combination of sensors can be utilized in connection with the claimed subject matter. The characteristics of the light output (off, glow, on at low level, on at bright level, color etc) and the transition between those characteristics can be controlled by any detectable state of the sensor or sensors. It is also to be appreciated that intelligence in the form of logic, electrical circuitry, microcontrollers, microprocessors, memory devices etc. contained in the bulb can leverage the sensors to monitor patterns of RF, IR or sensor inputs, keep the patterns in memory over time if necessary and adjust individual light characteristics based on the patterns detected. Thus the wireless light bulb has the ability to learn from inputs from its environment and change behavior accordingly.

The illustrated embodiment is a combination of a light sensor that will minimize power consumption by only allowing the LEDs to turn on when there is a low level of light in the environment and a motion sensor. When there is enough light in the environment, the motion sensor will control the LEDs to turn on when motion is detected. An alternate embodiment includes an RF receiver and motion sensor in the wireless light bulb and separate RF transmitter remote control that can override motion sensor control of the bulb when a user desires that it is turned on for an extended period of time or controlled remotely rather than by motion. One or more wireless light bulbs are controlled by either the motion sensors on the bulbs, by a separate RF remote control, RF wall switch or the like. The RF control element is used to turn on, turn off, control dimming, program timers for automatic control etc. in the wireless light bulbs. In an alternate embodiment, the remote control element contains a motion sensor and an RF transmitter to transmit commands based on motion detection or switches, buttons, dials or other controls on the remote control element to the one or more wireless light bulbs. The wireless light bulbs have an RF receiver but may or may not have a motion sensor.

In an alternate embodiment, the wireless light bulb can be controlled by only a light sensor. In this embodiment, the light will only turn on in a low level of light. Thus, when AC power is applied to the bulb and the level of ambient light is low enough, the bulb will turn on, otherwise it will remain off. Alternately, the light source can be controlled based on the amount of light detected from the light sensor such that it turns on slowly in the evening as it gets darker outside and fades to off in the morning as the amount of ambient light increases slowly. For example, a pulse width modulation circuit or other brightness control can be set based on the state of the light sensor. In some embodiments a daylight harvesting function may be implemented where the light intensity is set based on the ambient light level detected such that the ambient light plus the light generated by the light source maintain a constant light level as set in the design or as set by the user. The light sensor light bulb can be used outside such that power on the wired circuit can be turned on all of the time, but the light sensor light bulb will not consume power from the wired circuit other than to power the light sensor associated circuit until the light sensor enables the bulb for operation.

Another alternative embodiment includes one or more wireless light bulbs with an RF receiver and a light sensor as input components controlling the light source and an RF transmitter remote combined with a motion sensor. The one or more wireless light bulbs may or may not glow all through the night. An example use of this embodiment is a driveway sensor that detects a car triggering the motion sensor to send an RF transmission to the light when the car enters the driveway. The light can stay on for some user set amount of time, for example ten minutes, then auto shutoff or revert to glow mode. In alternate embodiments, the RF transmitter and motion sensor may contain additional controls. For example, the RF transmitter and motion sensor may contain an on switch, off switch, toggle switch, dimmer control switches, motion sensitivity controls, a light sensor with and without sensitivity controls, shutoff timer controls, and the like, or any other type of control mentioned herein. By way of an example, an RF transmitter and motion sensor may contain an OFF push button. The unit may send an ON control message to a wireless light bulb or battery powered wireless lighting fixture when motion is detected to turn the light on. It may contain an auto-shutoff timer that may send an OFF control message when the auto-shutoff timer expires. In addition, if the user is leaving an area, rather than wait for the auto-shutoff timer to expire, an OFF push button on the unit may be pressed to send an OFF control message to the wireless light bulb or battery powered wireless lighting fixture to shut the light off. In some examples, the motion sensor may be briefly disabled for some period of time to allow the user to leave the area such that their motion when exiting does not retrigger the light immediately. For example, if the motion sensor is disabled for five seconds after the OFF push button is pressed, the user may be able to exit the area without retriggering the light. This function may allow the user to save power consumption in the wireless light bulb or battery powered wireless lighting fixture by providing the means to turn the light off manually when they know it will not be used. In some embodiments, the RF transmitter and motion sensor may mount to a bracket that can be mounted to a wall, ceiling, stake or the like such that the bracket may can be articulated to allow the motion sensor to be pointed in the direction that the motion needs to be detected. This may allow the ability to optimize the area of detection given the characteristics of the motion detector and the desired area where motion is to be detected. In alternate embodiments, multiple motion detectors may be built into the same housing to allow motion to be detected from more than one direction. For example, a motion detector with three sensors each with 120 degree coverage may cover 360 degrees of motion detection allowing a stake or pole mount sensor to detect motion from any direction. This stake may be mounted in an open area to detect motion from any direction and turn on the light source to illuminate an area.

As shown in the illustrated embodiment, the wireless light bulb power source is alternating current (AC) typical of hard-wired fixtures that can provide AC power to light bulbs. The wireless light bulb includes AC circuitry, including an AC/DC converter to generate DC power for the circuitry and light source contained in the wireless light bulb. The AC/DC converter may include line capacitors, a diode bridge, a fly back converter, a constant current circuit, DC regulator and so on to convert AC power from the line to DC power. It will be understood that a variety of AD/DC converters are possible. In one known embodiment, a diode bridge, a constant current buck converter, a linear voltage regulator and protection circuitry are used to provide power to the control circuitry and light source.

In some embodiments the wireless light bulb may be powered directly from a DC input. In other embodiments the wireless light bulb can be powered off of a nominal 12V AC source. For example, an MR16 type wireless light bulb can be designed to take the 12V AC provided at the pin base and convert it to DC. In another example, the MR16 type wireless light bulb can include a full wave rectifier circuit to accept 12V AC or 12V DC input to power the circuitry and light source. It is appreciated that any AC or DC input can be converted to an operating power source for the circuitry and light source.

Wireless light bulbs powered from AC power with wireless control in the form of an embedded sensor or RF or IR receiver allow for individual wireless light bulbs on the same wired circuit to be controlled independently. In one example, individual wireless light bulbs with an embedded RF receiver and intelligence to process commands received over an RF communication link are on the same wired circuit and can be controlled by an RF wall switch. An RF transmitter circuit embedded in the wall switch can control individual bulbs on the wired circuit to turn them on or off, send dimming commands, program functionality to change state based on time of day, program on times, off times and brightness levels based on billing rates from the power company at different times of the day etc. The RF transmitter circuit may be combined with one or more other wireless control methods to implement additional functionality. For example, a motion sensor could be used in addition to the RF transmitter to control the light based on motion detection. The RF transmitter circuit can be battery powered and therefore offer the convenience of allowing it to be installed anywhere or the RF transmitter circuit can be part of an assembly that can replace or modify the wall light switch controlling the entire wired circuit to provide greater control of the lights on that wired circuit. In the case where the wall light switch is replaced by an RF transmitter wall light switch assembly, the RF transmitter circuitry may be battery powered, but it also may use AC as its power source and thus contain and AC/DC circuit. In one example, the RF transmitter wall light switch assembly may use the existing on/off switch of the wall light switch (i.e. be installed inside the wall light switch) or in another example the assembly may be installed to replace the wall light switch altogether. In another example, motion sensor controlled wireless light bulbs on a wired circuit can be installed to conserve power by detecting occupancy and only turn on when the light is needed. All of the bulbs can be motion sensor wireless light bulbs or there can be a mix of motion sensor wireless light bulbs and traditional light bulbs to conserve power when the additional light is not needed. It is to be appreciated that any sensor described herein can be used to individually control wireless light bulbs on a wired circuit.

In another embodiment, the power source can be one or more batteries embedded in the wireless light bulb instead of AC power. For instance, the power source can be any number, size, and type of rechargeable (e.g., nickel-cadmium) and/or non-rechargeable (e.g., alkaline) batteries. Pursuant to a further illustration, the power source can be a solar cell. Moreover, the power source can be a combination of a solar cell and one or more batteries. Thus, for instance, a battery can supplement power supplied by the solar cell (or vice versa) and/or the solar cell can recharge a battery. In accordance with a further illustration, the power source can wirelessly obtain power (e.g., to be utilized directly, employed to recharge batteries); for instance, power can be wirelessly delivered to the power source via collecting RF energy from the environment, electromagnetic induction, wave coupling, converting motion or heat to electrical energy, wireless power transmission, and the like. It is to be appreciated that any wireless power source or any combination of wireless power sources can be used to supply power to or recharge energy storage in the wireless light bulb. For example, a wireless light bulb can contain circuitry to collect RF energy from the environment and also contain rechargeable batteries to store the collected energy. In alternate embodiments the power source may include a fuel cell, such as and without limitation a hydrogen fuel cell, a reformed methanol fuel cell, or the like. In other alternate embodiments, the power source may include a capacitor, array of capacitors, super capacitors to store energy to be used as a power source similar to a battery, and the like.

By way of an example, the wireless light bulb can physically couple with a fixture to support the wireless light bulb in a particular position, yet electrical current need not flow between the fixture and the wireless light bulb. Thus, the fixture can be installed at substantially any location without needing to supply power (e.g., via hard-wiring the fixture); hence, the fixture can be physically placed, secured, mounted, installed, etc. in a locale without being hard-wired to a power source. A battery powered wireless light bulb allows for a fixture to be installed anywhere. Any type of fixture design (size, shape, style etc.) can be installed at any location suitable for installation of the fixture and using a battery embedded wireless light bulb it can be done without the need for wiring. Power is embedded in the bulb and control is provided by a sensor and/or RF/IR receiver that is also embedded in the bulb As another example, the battery embedded wireless light bulb allows for a lamp (table lamp, floor lamp, desk lamp etc.) to be placed anywhere independent of a need to be placed close to an electrical outlet, using an extension cord to cable power to the lamp or having an electrician wire power to a point where the lamp can be plugged into an AC power source. Alternately, a battery powered wireless light bulb can be used in an existing fixture or lamp to take advantage of wireless power and wireless control in that location. In an alternate embodiment, to use the switch control on the lamp that would control on and off when plugged into an AC socket, the lamp remains unplugged, however an electrically conducting cap or connector is placed on the end between the two AC prongs of the connector to short the two prongs together. Inside the wireless light bulb, a short circuit can be detected. When detected as a short circuit, the switch control is in the on position and the battery powered wireless light bulb is turned on. When it is detected as an open circuit, the switch is in the off position and the battery powered wireless light bulb is turned off.

In another example, a motion sensor wireless light bulb powered only by embedded batteries can replace one or more incandescent light bulbs on a wired circuit. By way of an example, there are six recessed fixtures containing six R30 incandescent bulbs controlled by a single wall switch. One of the incandescent bulbs is replaced by an R30 motion sensor wireless light bulb powered only by embedded batteries or one of the incandescent bulbs is replaced by a recessed fixture motion sensor wireless light bulb that mechanically replaces the entire recessed fixture and is powered only by embedded batteries. There are several advantages to this use scenario for the battery embedded wireless light bulb. First, the motion sensor wireless light bulb will work even in a power outage so it offers an emergency or safety lighting function. Second, even when the wall switch is turned off and the incandescent bulbs are off, the motion sensor wireless light bulb will still provide enough light when motion is detected to find a path to the wall switch to activate all of the lights. Third, there may be enough light from the motion sensor wireless light bulb such that the additional lighting is not necessary therefore the incandescent bulbs would not be used. This provides some savings in power consumption as well as a dim light level which may be preferable sometimes to the bright light offered by too much lighting in an area. In an alternate embodiment, the motion sensor wireless light bulb can have multiple light levels. For example, it can have a bright light level but revert to a glow or low light level when the timer reaches a predetermined threshold to conserve energy but also provide a low level of light until motion is detect to turn on to the bright light level. In an alternate embodiment, logic can maintain the bright light level for some period of time, but then can control the light to fade to a glow or low light level by slowly dimming the at least one LED through pulse width modulation or other brightness control method over some preset or programmable period of time until it reaches the glow or low light level. In an alternate embodiment, a light sensor may provide a measurement of the ambient light level to set the light intensity level for a daylight harvesting function where the light intensity is set based on the ambient light level detected such that the ambient light plus the light generated by the light source maintain a constant light level.

By way of another example, the one replacement wireless light bulb contains an RF receiver and can be controlled by RF via a remote control. The remote control can be kept in a convenient location, a bedside table for example, to turn on the replacement bulb that would provide enough light to get to the wall switch to turn on the brighter incandescent lights or it could turn on one or more RF controlled battery embedded wireless light bulbs that provide adequate light. Alternatively, the battery embedded wireless light bulb can be controlled by any combination of RF, IR, or any sensors mentioned herein.

In other embodiments, the battery powered wireless light bulb will contain rechargeable batteries such that the bulb can be recharged by connecting the bulb to an AC power source such as plugging the bulb into a recharging base, plugging the bulb into an AC light socket and the like. For example, a battery powered wireless light bulb containing rechargeable batteries can be used with a fixture or lamp. When the capacity of the rechargeable batteries dips below a level that the light output is no longer acceptable, a user can unscrew the battery powered wireless light bulb and screw it into a recharging base. The recharging base is comprised of the circuitry necessary to charge the batteries to capacity. When battery charging is complete, the user can remove the bulb from the recharging base and return it to the fixture or lamp. In another example, the bulb can be plugged into a standard light socket to charge the batteries. In one embodiment, the bulb can also be connected to a DC power source for recharging and as such would have circuitry to make use of the DC power source for recharging the batteries. In an alternate embodiment, the bulb has a USB connector on it that allows for charging by connection to a USB port. In other alternate embodiments any form of wireless power mentioned herein may be used for recharging a battery powered wireless light bulb. It is to be appreciated that any combination of charging approaches can be included in the same battery powered wireless light bulb.

In such a case when there is a USB connector on the bulb, the USB connector may also be used as a communication interface to program the bulb. An AC powered wireless light bulb or battery powered wireless light bulb may be able to attach to a computer via USB directly or over a USB cable to connect the bulb for programming. In other embodiments, different interface types on the bulb such as Ethernet, IEEE 1394 Fire Wire, Serial Port or the like can be used to connect to a computer directly or by cable to program the bulb. In another example, a programming adapter connected to the computer that the wireless light bulb can plug into or connect to electrically and mechanically in any known manner may serve as the interface to program the bulb. In other embodiments, an RF or IR adapter that can plug into a computer directly or via a cable using any of the interface types listed may send programming information to one or more wireless light bulbs containing an RF or IR receiver or transceiver to program the wireless light bulbs. In some embodiments, an RF or IR interface to the wireless light bulb may be provided by any device (remote control, keypad, PDA, computer, laptop, custom circuit etc.) with the RF or IR interface and the ability to communicate with the wireless light bulbs can be used to program the wireless light bulbs. A software program that allows a user to set the state of the bulb based on timer or time of day, auto shut-off times, color temperature, light strength (glow levels, low light levels, dimming/fading functions), motion sensitivity and listening on times, light sensitivity, level of ambient light controlled by a photocell, energy usage control to control light output based on a desired amount of energy usage over time, network parameters (unique IDs, network IDs, multicast IDs, broadcast IDs, IP address, routing and forwarding information for the network, WIFI SSIDs, ZIGBEE PAN IDs and network IDs, X10 four bit house code, INSTEON address or the like), sensor parameters (detection thresholds for setting the state of the bulb, timer and time of day settings for when the sensor is active and the like) etc. is used to connect to and program the state of the bulb. It is to be appreciated that the AC powered or battery powered wireless light bulb may contain the intelligence necessary to implement the programmable functions.

Batteries in a battery powered wireless light bulb can also be removable and replaceable. In one embodiment, the bulb may have a battery compartment with a cover that can be removed to access the batteries. In an alternate embodiment, the bulb may have batteries that are accessible by unscrewing the top of the bulb and removing an assembly that contains the circuitry, light source and a battery holder containing the batteries. In another alternate embodiment, the batteries may be installed in a tray that may slide in and out of the battery powered wireless light bulb such that a user may slide out the battery tray, replace the batteries and slide the battery tray back into the battery powered wireless light bulb. In an alternate embodiment, the bulb may be a recessed fixture wireless light bulb with the ability to remove and replace the exposed face of the recessed fixture to access of battery holder inside the fixture. In an alternate embodiment, the bulb may be a fluorescent tube replacement with an LED or other type of light source where the batteries are embedded in the fluorescent tube replacement housing and may be removable and replaceable. Alternate embodiments may include but are not limited to any known method of accessing a wireless light bulb to remove and replace the batteries. The batteries can be non-rechargeable batteries that can be replaced or removed or can be rechargeable batteries that can be removed and recharged when capacity drops below a usable level then returned to the bulb. The batteries may be off the shelf batteries of standard sizes (e.g. AA, C, 18650, etc) or the batteries may be a custom size and shape. The non-rechargeable or rechargeable batteries also can be embedded in the bulb permanently with no method for removal and replacement. By way of an example, a battery powered wireless light bulb may be designed with a method allowing removal and replacement of the embedded batteries. The batteries may be rechargeable and the battery powered wireless light bulb may include battery charging circuitry that charges the embedded batteries when connected to an external power source.

According to another illustration, a light socket or fixture can provide AC power that can be leveraged by the wireless light bulb in addition to one or more alternate power sources embedded in the wireless light bulb. The alternate power sources can be non-rechargeable or rechargeable batteries, solar cell, fuel cell (such as and without limitation a hydrogen fuel cell, a reformed methanol fuel cell, or the like), collecting RF energy from the environment, electromagnetic induction, wave coupling, converting motion or heat to electrical energy, wireless power transmission, capacitors and any other form of wireless power mentioned herein. It is to be appreciated that the AC powered with alternate power source wireless light bulb can contain the intelligence and control circuitry necessary to make use of any disparate wireless power source or sources in addition to or instead of the AC power source. It is to be appreciated that the AC powered with alternate power source wireless light bulb can be in the form of any bulb type, fixture, down light assembly, and the like, such as mentioned herein.

In one embodiment, rechargeable or non-rechargeable batteries are embedded into the wireless light bulb such that the light source and control circuitry can use either the AC power source or the embedded battery power source. In one example, there is circuitry inside the wireless light bulb that may detect that AC power is no longer present (power failure) or some other characteristic that makes AC power no longer desirable to use (brownout conditions, electrical surges, overvoltage conditions, voltage sag or flickers, line noise, frequency variations, switching transients, harmonic distortion etc.) at the light socket, fixture or down light assembly. In this case the wireless light bulb can switch over to battery power automatically to power the control circuitry and light source. This application, the uninterruptable power supply light bulb, or UPS light bulb, provides emergency or safety lighting during a power outage. Additional intelligence may be designed into the UPS light bulb to provide features or extend the amount of time usable light may be available when powered by the embedded battery power source. The UPS light bulb may contain a colored LED that blinks when the battery source is being used to provide an indication that the UPS light bulb is being powered by the embedded battery source. The UPS light bulb may contain a method to indicate the battery capacity level. By way of an example, there may be a push button integrated on the bulb such that when it is pushed, an LED illuminates providing an indication of the battery capacity. By way of an example, a green indication may indicate that the charge level is acceptable, a yellow indication may indicate that it is low and a red indication may indicate that there is not enough battery capacity for the bulb to operate in an acceptable manner. In an alternate example, the push button may be remote from the bulb and communicate to the bulb through wires, RF, IR or another method to command the bulb to show the capacity level indication when the push button is pressed. In some embodiments, the UPS light bulb may contain intelligence to detect the battery capacity level and adjust the light intensity level to extend the amount of time there is usable light out of the UPS light bulb. This may take advantage of the characteristic of batteries that at lower continuous current levels the rate of battery drain will be lower. By way of an example, if there is a short power outage, the initial light intensity level may be a high level, however after some amount of battery drain over some period of time, the light intensity level may be dropped to a lower level requiring less continuous current from the batteries, extending the amount of time the light source may run on batteries (anticipating that the power outage may last a long period of time). In an alternate example, several UPS light bulbs may be installed in an area to provide egress lighting for emergency situations. The UPS light bulbs may revert in an emergency situation to a low level of light that meets requirements for emergency lighting in both light intensity and duration of time that the UPS light bulb may provide an acceptable level of illumination. By way of an example, the UPS light bulbs may provide emergency illumination for more than ninety minutes when normal lighting is not operational. By way of an example, the installed set of UPS light bulbs may provide an initial illumination of approximately one foot-candle and at any point a −9 minimum of 0.1 foot-candle measured at floor level in the egress path. The levels may decrease to a minimum of 0.6 foot-candle average and 0.06 foot-candle at any point at the end of ninety minutes. It is to be appreciated that any number of light intensity levels may be set based on any number of detected battery capacity levels. In alternate embodiments, the change in light intensity level may be controlled by time (timer, time of day clock etc) instead of monitoring battery capacity levels. In such a case, the UPS bulb may contain intelligence to use the timer or time source and adjust the light intensity level to extend the amount of time there is usable light out of the UPS light bulb. By way of an example, the UPS light bulb may have a short outage mode and a long outage mode. In short outage mode, the UPS light bulb may operate for fifteen minutes at 100% light intensity, then the UPS light bulb may change to long outage mode automatically reducing the light intensity to 25% for the remainder of the outage. In another example, the end user has a method to change from short outage mode to long outage mode for example by switches on the bulb, remote control to change modes or provide a capability to dim the light intensity to any desired level or any other control mentioned herein. It is to be appreciated that the length of time and light intensity may be any amount required by the application and any number of light levels that may be used. In an alternate embodiment, a light sensor may be present in the UPS light bulb to sense the amount of ambient light present and adjust the light intensity appropriately. In this embodiment, the light sensor may extend the amount of time there is usable light when the embedded battery power source is used by optimizing the amount of light output based on the detected light level. Using the light sensor as a day/night sensor or to set the output light intensity based on detected light level may optimize the drain on the embedded battery power source. In alternate embodiments, the UPS light bulb contains one or more methods of wireless control that may be used to provide additional functionality. By way of an example, a motion sensor may be added to the bulb such that it will only operate when motion is detected. By way of another example, the UPS light bulb may contain a receiver to allow a remote control to turn it on, off, change light intensity, select the power source (allowing the UPS light bulb to be turned on or off independent of AC power) or control any feature that may be present the UPS light bulb. The UPS bulb may use a sensor as an alarm indication and in some cases use that sensor information to select the power source. By way of an example, a thermal sensor may detect heat and when the temperature level rises above a threshold it may cause the UPS bulb to switch to battery power and blink the light source in a way to indicate an alarm situation. In alternate embodiments of the UPS bulb or any wireless light bulb, they may contain one or more thermal sensors and be able to transmit via an RF or IR transmitter temperature information back to a thermostat or any device that may display or make use of temperature information in any way.

The UPS light bulb may include circuitry to detect at the UPS light bulb conditions that may allow an intelligent decision on which power source to use. The UPS light bulb may need to detect whether the controlling switch or breaker applying power to the UPS light bulb is open or closed, if input AC power is present, if the quality of the input AC power is acceptable, and the like. The UPS light bulb may monitor the presence and quality of the input AC power with circuitry in the bulb to detect the presence of AC power and make a measurement of the characteristics of the AC power. It may also measure the impedance, resistance, and/or capacitance across the AC power input and return or may measure any other electrical characteristic of the AC power input and return to determine whether the controlling switch or breaker is open or closed (or if electricity has been turned off at any point up to the AC input of the UPS light bulb).

It is to be appreciated that the switch or breaker may be any type of switch or breaker used to control an electrical or lighting circuit such as but not limited to toggle switches, dimmer switches, three way or multi-way switches, timer controlled switches, motion sensor switches, push button or touch switches, paddle switches, solid state switches, slide switches, rotary switches, switches with specialized intelligence built in, open fuses in the electrical or lighting circuit, poly fuses or poly switches, low, medium or high voltage circuit breakers, magnetic circuit breakers, thermal magnetic circuit breakers, common trip circuit breakers, residual current circuit breakers, earth leakage circuit breakers and the like. In some embodiments, the UPS light bulb may store information such that the bulb may be able to operate as it was when the outage occurred. For example, the UPS light bulb may be controlled by a dimmer switch, the UPS light bulb may store the dim level and when there is a power outage, the UPS light bulb may switch to PWM dimming that is similar to the light intensity level that had been set by the dimmer switch, and the like. By way of an example, if the controlling switch or breaker is open, there may be a high impedance detected across the input AC power and return. If the controlling switch or breaker is closed, there may be a measurable impedance, resistance and/or capacitance or electrical characteristic different from when the controlling switch or breaker is open. A threshold may be set in the bulb such that if the measurement is above or below the threshold, the switch or breaker is closed, and if the measurement is on the opposite side of the threshold, the switch or breaker is open. The UPS light bulb may be controlled by the state of the controlling switch or breaker (on or off), but may also detect the condition when the controlling switch or breaker is closed but AC input power is not present or is not acceptable and may be able to switch over to the rechargeable or non-rechargeable batteries that are embedded as the power source. Thus, the UPS light bulb may be able to switch to embedded battery power without directly knowing whether the switch is open or closed, but rather by measuring the electrical characteristics of the AC input. In some embodiments, the UPS bulb may have circuitry to be able to detect the switch transition from on to off or off to on. By way of an example, in a power outage, the wall switch may still be used to control the UPS bulb that is powered by battery to on or off such that even when AC is not applied, a transition from switch closed to switch open will turn off the UPS bulb that is powered by the embedded power source.

In some embodiments, the UPS light bulb may perform an impedance discontinuity check to determine if the controlling switch or breaker is open or closed. In some embodiments, the UPS light bulb may generate a signal onto the line and monitor the electrical response of the line to determine if the response indicates an impedance discontinuity typical of an open circuit that may be indicative of a switch or breaker open in the lighting circuit or if the response indicates a closed circuit typical of a switch or breaker closed in the lighting circuit. By way of an example, the UPS bulb may perform a function typical of a time domain reflectometer by generating a short rise time pulse at the connection to input and monitor the input for a reflected signal that would be indicative of an open or closed circuit. If the reflected signal exceeds a set threshold, it may indicate an open circuit. In some embodiments, the UPS bulb may need to learn where such a threshold should be set. The UPS bulb may be installed in many variations of lighting circuits where the amount, length, gauge or type of wiring to the switch or breaker may vary and where there may be many other sources of loads on the lighting circuit (such as other bulbs, multiple switches or controls etc.) therefore it may have to adjust its detection circuitry to operate properly. It is to be appreciated that the setting of the threshold may be done automatically by the UPS bulb or manually by a user through any process that may allow the bulb to be set to a threshold where one side of the threshold indicates the switch or breaker is open and the other side of the threshold indicates the switch or breaker is closed. It is to be appreciated that when the switch sense functionality is implemented, the switch or breaker may still be able to turn on and off power to the UPS light bulb or wireless light bulb even when running off of the embedded battery power source because the UPS light bulb or wireless light bulb may be able to determine if the switch is on or off and apply power or not apply power to the UPS light bulb or wireless light bulb based on the switch position. In such a case, the switch sense circuitry may still need to be powered along with any other necessary circuitry to implement this function even when the light source is not being powered. In some embodiments, a device may be designed that may be electrically and mechanically attached to an existing switch or breaker of any type mentioned herein such that it may have electrical characteristics that may be easily detected by the UPS light bulb in an outage. The device, a UPS light switch detection module, may be an electrical circuit that may monitor the state of the switch, open or closed, and whether power is present at the input side of the switch. If there is no input power, whether the switch is open or closed, the device may insert a circuit with the electrical characteristics that may be easily detected by the one or more UPS light bulbs on the lighting circuit. This allows the UPS light bulb to be able to detect an outage even when the controlling switch or switches are open by allowing it to be electrically connected to the input side of the switch. There may be control on the device such that the user may enable the UPS light bulb to turn on when the light switch is open and there is no power at the input of the switch. If this function is disabled, the user may control the UPS light bulb by the controlling switch, but if the function is enabled, the UPS light bulb may be capable of switching to battery power whether the controlling switch is open or closed. In alternate embodiments, the device is not a device that attached to a switch or breaker, but is the switch or breaker itself thus the function may be installed by replacing an existing switch or breaker. In alternate embodiments, the device may physically and electrically be connected anywhere in a lighting or electrical circuit that it would be desirable to detect a power outage. In some cases, the UPS light bulb or bulbs may not be able to reliably detect the state of the switch in which case the device may added to make the detection of the switch state reliable. In alternate embodiments, the switch sense mechanism or command to switch to battery power is not by detection of an electrical characteristic on the lighting circuit, but rather is communicated on the lighting circuit from the switch or breaker to the one or more UPS light bulbs on a circuit on the power lines (e.g. X10, INSTEON, Broadband over Power Lines, proprietary communication scheme etc). By way of an example, a circuit inside a light switch detects whether power is present on the input of the switch. If power is not present at the input, the circuit may send a command over the power lines to the UPS light bulb or bulbs to switch to battery power. In some embodiments, the communication may be bidirectional such that the UPS light bulb or UPS light switch detection module may initiate the communication or respond to the communication. It is to be appreciated that the UPS light switch detection module may be a passive circuit, may be an active circuit that derives power from the AC or DC line depending on what type of power is on the lighting circuit, may be an active circuit that contains an embedded power source such as a battery allowing it to be powered in the absence of input power.

In some embodiments the UPS bulb may be removed from the socket such that it may be carried around as a light source. As such the UPS bulb may detect a different set of electrical characteristics of the AC input of the UPS bulb when it is removed from the socket. Alternatively, the UPS bulb may be able to detect the switch transition from on to off, off to on or be able to detect that neither transition happened but there was a change in the electrical characteristics and as such determine that the bulb was removed from the socket. The removed bulb may become a "flashlight" when carried around by itself, plugged into a base unit that has a handle or handheld in any manner conceivable such that it can be carried around. The base unit may have a switch on it with a circuit connected to the socket where the UPS bulb plugs in and can detect electrical characteristics of the switch and circuit (similar to the measurement of impedance, resistance and/or capacitance mentioned herein) such that the switch may be used to turn the UPS bulb on and off. It is to be appreciated that the functionality described for the UPS light bulb may be designed in any size or shape housing to meet the requirements of any standard size bulb (e.g. PAR30, PAR38, A19, R30, MR16 etc), non-standard size bulb, fixture, compact fluorescent bulb, fluorescent bulb or lamp (e.g. T4, T5, T8, circular etc.) or down light assembly (e.g. recessed fixtures, fluorescent fixtures or down light fixtures for residential, commercial or industrial lighting), or the like.

In one embodiment where rechargeable batteries are the alternate power source, circuitry can also be present in the bulb to control the recharging of the batteries while AC power is applied (trickle charge, slow charge, fast charge etc.) and under what conditions the recharging will happen (time of day, battery capacity level, any time AC power is applied etc.). It is also to be appreciated that the batteries can be recharged through an alternate interface such as a USB connector or any form of wireless power on the wireless light bulb mentioned herein.

In such a case when there is a USB connector on the bulb, the USB connector may also be used as a communication interface to program the bulb. The AC powered battery embedded wireless light bulb can attach to a computer via USB directly or over a USB cable to connect the bulb for programming. In other embodiments, different interface types on the bulb such as Ethernet, IEEE 1394 Fire Wire, Serial Port or the like can be used to connect to a computer directly or by cable to program the bulb. In another example, a programming adapter connected to the computer that the wireless light bulb can plug into or connect to electrically and mechanically in any known manner may serve as the interface to program the bulb. In other embodiments, an RF or IR adapter that can plug into a computer directly or via a cable using any of the interface types listed may send programming information to one or more wireless light bulbs containing an RF or IR receiver or transceiver to program the wireless light bulbs. In some embodiments, an RF or IR interface to the wireless light bulb can be provided by any intelligent device (remote control, keypad, PDA, computer, laptop, custom circuit design etc.) with the RF or IR interface and the ability to communicate with the wireless light bulbs can be used to program the wireless light bulbs.

A software program or other device that allows a user to set the state of the bulb based on timer or time of day, auto shut-off times, color temperature, light strength (glow levels, low light levels, dimming/fading functions), motion sensitivity and listening on times, light sensitivity, level of ambient light controlled by a photocell, energy usage control to control light output based on a desired amount of energy usage over time, network parameters (unique IDs, network IDs, multicast IDs, broadcast IDs, IP address, routing and forwarding information for the network, WIFI SSIDs, ZIGBEE PAN IDs and network IDs, BLUETOOTH, X10 four bit house code, INSTEON address or the like), sensor parameters (detection thresholds for setting the state of the bulb, timer and time of day settings for when the sensor is active and the like) etc. is used to connect to and program the state of the bulb. It is to be appreciated that the AC powered battery embedded wireless light bulb may contain the intelligence necessary to implement the programmable functions.

In addition to controlling the lighting installation, the sensors and intelligence that are designed into wireless light bulbs and communication interface implemented in the wireless light bulbs may allow the wireless light bulbs installed to also perform functions in addition to lighting. This applies to AC powered, battery embedded, AC powered battery embedded or any combination of power source wireless light bulbs mentioned herein. The embedded sensors and intelligence together with the communication interface may allow a single wireless light bulb to implement functionality beyond just lighting. Multiple wireless light bulbs may form a sensor network to add useful functions to a lighting installation where multiple wireless light bulbs may be individually controlled or work as a network to implement one or more functions in addition to lighting. A software program or intelligent device may allow a user to gather status from a sensor in the wireless light bulb or from intelligence designed into the wireless light bulb over the communication interface such as but not limited to temperature, ambient light levels, battery capacity levels, energy usage statistics, on and off time records, sensor detection data and statistics (motion detections per some unit of time, switch actuation information to generate an alarm, smoke detector alarm signals etc.), network usage statistics or information that can be gathered from any sensor or intelligence built into the wireless light bulb. A software program or intelligent device may also receive a stream of data collected by a sensor of the wireless light bulb over the communication interface such as but not limited to audio from a microphone, a video stream from a camera, pictures from a digital camera, RFID tag read information (i.e. an RFID tag reader), etc. A software program or intelligent device may also control a device inside the wireless light bulb over the communication interface to implement any function such as but not limited to a speaker to make announcements or generate sound, a horn to generate alarms, enable a circuit to energize or de-energize a relay or other switch control, turn on or off a motor, etc.

In one use case, the design is a par30 motion sensor wireless light bulb or a 6" recessed fixture motion sensor wireless light bulb. They are installed in office space in 50 different locations in addition the lighting that is installed. Software running on a computer allows a security guard to communicate with and receive status from the wireless light bulbs. When a wireless light bulb detects motion, it sends a message to the security guard's computer that motion has been detected and which bulb has detected the motion (i.e. the location where the motion is). The security guard receives a message or an alarm that motion has been detected in one of 50 locations which may provide an indication of a security issue or that someone is not where they are supposed to be. In some embodiments, a software application may send an e-mail, XML message or any other type of message to provide alerts to the end user based on the message received from a wireless light bulb or wireless lighting module. In some cases, a software application may store in memory or a database a record of the motion detections over time. In an alternate use case, the wireless light bulbs record a statistic called "number of motion detections since last read". A software application can read that statistic from each wireless light bulb and determine how to most efficiently use the lighting by time of day and usage profile. It can be used not only to control lighting but for occupancy studies in building management, used to record the flow of traffic past a certain point, and the like. In one possible use, the sensor may not control lighting, but is used for the information provided by the sensor in addition to the light that is used for illumination.

In another use case, the design is a recessed fixture RFID reader wireless light bulb. They are installed in office space in 50 different locations in addition the lighting that is installed. Employees and guests are issued identification, such as badges that are RFID tags or access cards that can be read by the RFID reader or the access card reader in the wireless light bulb. In addition, RFID tags can be attached to assets for operational efficiency and theft prevention. Software running on a computer receives the reads of the identifications badges or asset tags and can provide an indication of current or last know location within the building with respect to the location of the RFID reader wireless light bulbs. This provides the building manager the ability to find, track or review the real time or historical movements of employees, guests or assets. This functionality can be used for safety, security, operational efficiency, etc.

In another use case, a wireless light bulb has a speaker or alarm horn in it that allows announcements to be made (like an intercom system which could be two way if the units had a microphone on them also) or alarm sounds to be generated in certain emergency situations. In an alternate use case, a wireless light bulb is installed as a porch light with a microphone and speaker built in. A user can push a button on an intercom box inside of their house to talk or listen to a visitor through the porch light microphone and speaker.

In another use case, a wireless light bulb or battery powered wireless lighting fixture may have a motion sensor and RF transmitter in addition to the light source. When motion is detected, the light source may be turned on and an indication that motion was detected may be transmitted to an RF receiver. The RF receiver may be connected to an intelligent device such as a computer that may allow the motion indication to be interpreted. For example, in a health care application, a wireless light bulb or battery powered wireless light fixture may be installed in the bathroom of a hospital room or in the hallway of the hospital floor. When motion is detected in the bathroom or hallway, the light may be turned on and an indication that motion was detected may be received at the nurse's station. If there is a reason that a patient should not be moving, then that indication may be an alarm indication providing allowing the nurse to take action immediately. Unique IDs may be set in each of the wireless light bulbs or battery powered wireless lighting fixtures such that, by knowing the location of the installed wireless light bulb or battery powered wireless lighting fixture, the location of the source of motion may be known.

Batteries in an AC powered battery embedded wireless light bulb can also be removable and replaceable. In one embodiment, the bulb may have a battery compartment with a cover that can be removed to access the batteries. In an alternate embodiment, the bulb may have batteries that are accessible by unscrewing the top of the bulb and removing an assembly that contains the circuitry, light source and a battery holder containing the batteries. In another alternate embodiment, the batteries may be installed in a tray that may slide in and out of the AC powered battery embedded wireless light bulb such that a user may slide out the battery tray, replace the batteries and slide the battery tray back into the AC powered battery embedded wireless light bulb. In an alternate embodiment, the bulb is a recessed fixture wireless light bulb with the ability to remove and replace the exposed face of the recessed fixture to access of battery holder inside the fixture. In an alternate embodiment, the bulb may be a fluorescent tube replacement with an LED or other type of light source (ie uninterruptable power supply tube) where the batteries are embedded in the uninterruptable power supply tube housing. Alternate embodiments may include but are not limited to any known method of accessing a wireless light bulb to remove and replace the batteries. The batteries can be non-rechargeable batteries that can be replaced or removed or can be rechargeable batteries that can be removed and recharged when capacity drops below a usable level then returned to the bulb. The batteries may be off the shelf batteries of standard sizes (e.g. AA, C, 18650 etc) or the batteries may be a custom size and shape. The non-rechargeable or rechargeable batteries also can be embedded in the bulb permanently with no method for removal and replacement. By way of an example, a UPS light bulb may be designed with a method allowing removal and replacement of the embedded batteries. The batteries may be rechargeable and the UPS light bulb may include battery charging circuitry that charges the embedded batteries when connected to a power source. Power may be received through the input at the Edison base or it may be received through an alternate connection to the UPS light bulb. A battery charging circuit may be present that detects when rechargeable batteries of one or more types are installed and when non-rechargeable batteries are installed such that the UPS light bulb may use rechargeable or non-rechargeable batteries based on user preference. This allows the battery power source to be changed in the field to extend the life of the product beyond the life of the embedded battery. The UPS light bulb may only accept non-rechargeable batteries and may not contain a battery charging circuitry such that when the non-rechargeable batteries capacity is below a level where they may power the UPS light bulb to an acceptable light output, the user may remove and replace the batteries.

In one embodiment, a PAR30 AC powered battery embedded wireless light bulb contains a single battery cell and a charge pump LED driver to generate the necessary drive voltage and current for the LED light source. In this example, the single battery cell is a NiMH rechargeable D cell battery. Using a single battery cell allows the design to fit within the design constraints of the PAR30 bulb type. It is to be appreciated that any number or type of battery can be used. A charging circuit that supports NiMH charging in circuit is also part of the electronics inside the bulb. There is also circuitry inside the bulb to allow each power source to be used independently or to share the load depending on whether each power source is present and able to supply power to the wireless light bulb. It is to be appreciated that any form of wireless control mentioned herein can be used in conjunction with this embodiment.

In an alternate example, the UPS light bulb also contains an RF receiver that allows the UPS light bulb to receive control commands over an RF communication link. In one example, an RF transmitter can be coupled with an AC detection circuit such that when it detects that AC power has dropped out (i.e. there is a power outage) or some other characteristic that makes AC power no longer desirable to use (brownout conditions, electrical surges, overvoltage conditions, voltage sag or flickers, line noise, frequency variations, switching transients, harmonic distortion, etc.) it will send a command to the UPS light bulb to switch it over to battery power. Upon detection that AC power is back on or is desirable to use, the RF transmitter can send a command to switch over to AC power. It is to be appreciated that the power outage module may detect a drop out of any type of power source that may be required by the application including but not limited to AC power, DC power, an energy harvesting power source and the like. This power outage module in the form of an RF transmitter and AC detection circuitry in a housing can be designed to operate plugged into an electrical wall socket, hardwired into or as a replacement for an AC wall light switch to allow detection of the state of AC power prior to the switch independent of the on/off position of the wall switch, can be hardwired directly into a breaker box to determine the state of power where it enters a residence or building, can be wired into an emergency circuit and respond to an emergency on signal or can be wired into any point in a power distribution system that a user may want to detect a drop out in AC power. The RF transmitter and AC detection circuitry can be powered off of AC power or powered by batteries. In addition to controlling a AC powered battery embedded wireless light bulb, it is to be appreciated that the RF transmitter and AC detection circuitry can control battery or AC powered fixtures that may not be wireless light bulbs, but rather stair lights, spotlights, path lights, exit signs and lighting, stair well lights, floor lights, ceiling lights etc to provide lighting in an emergency situation. It is to be appreciated that a network of wireless light bulbs and fixtures with RF transceivers may be created to propagate control messages through the network to control any installed lights from one or more RF transmitter and AC detection circuits. It is to be appreciated that any command can be sent as it relates to the state of AC power as detected by the detection circuitry. For example, to conserve energy or save money on an energy bill, the RF transmitter and AC detection circuitry may monitor power usage on a wired circuit and send a dimming command or a command to set the brightness of the lights on the wired circuit to a lower level when power usage exceeds some threshold, but at some later time send a second command returning the lights on the wired circuit to a brighter level thus allowing power usage on that wired circuit to stay below some average usage level. In some embodiments, the RF transmitter and AC detection circuitry contains circuitry to act as a load control switch receiving a load control command from the power company and transmitting to one or more wireless light bulbs to turn off, change light intensity, switch over all or a portion of the load to battery power etc. In alternate embodiments, the unit does not contain AC detection circuitry and is just a load control switch with an RF transmitter that may control the wireless light bulbs in an installation in a demand response energy efficiency system, for load control purposes and the like. This wireless lighting load control switch may contain a timer such that after it receives a command from the power company to change to a lower energy consumption state, the wireless lighting load control switch may start a timer and when the timer expires the wireless lighting load control switch will send a command returning to the original state of operation or to another state of operation.

In some embodiments the power outage module may be connected to an emergency lighting circuit such that if the emergency lighting circuit forces a switch to emergency lighting, the emergency lighting power outage module will detect the emergency lighting circuit turning on and will transmit a message to the UPS light bulbs, wireless light bulbs and battery powered wireless lighting fixtures to switch on or to some dedicated emergency lighting function. For example, the UPS light bulbs, wireless light bulbs and battery powered wireless lighting fixtures may switch to a lower light level when switched over to battery power in an emergency situation to extend battery life during the emergency. In another example, the UPS light bulbs, wireless light bulbs and battery powered wireless lighting fixtures may blink the lights to indicate the emergency situation.

In some embodiments, the power outage module may contain a light source such that in cases where it is detachable, it may be removed and used as a light source powered by batteries. In such a case, a user may detach the power outage module and walk around using it in a manner similar to a flashlight. In some embodiments, the RF transmitter and AC detector circuit may contain forms of wireless controls such as sensors to control the lights during a power outage but also in normal operation. By way of an example, a power outage module may work as described, but also contain a motion sensor such that when motion is detected under normal circumstances, a control message is transmitted to the wireless light bulbs and wireless lighting modules within range to control them, but in a power outage situation would transmit a different control message. In alternate embodiments, sensors may be modules that plug into the power outage module. In such a case, the power outage module may contain a connector to allow a sensor module to be installed. By way of an example, a user may plug in a light sensor module such that a measurement of the amount of ambient light detected by the light sensor may be transmitted to the wireless light bulbs and wireless lighting modules. It is to be appreciated that the sensor may be plugged in permanently or plugged in temporarily. In the example using the light sensor module, the light sensor module may be used to make a one-time measurement of ambient light in an area to adjust the light, then removed or it may be permanently installed to allow the wireless light bulbs and wireless lighting modules to continuously adjust light intensity to match the ambient light detected to maintain some net light level. In some embodiments, the power outage module may send any type of message to control the wireless light bulbs and wireless lighting modules to achieve any functionality mentioned herein. By way of an example, the power outage module may send a message setting the light intensity level, programming an auto shutoff time, changing the way the controlled lights manage power and the like. It is to be appreciated that the power outage module may control UPS light bulbs, wireless light bulbs with integrated power sources, battery powered wireless lighting fixtures etc.

In some embodiments the power outage module may be a removable module and may act as a remote control such that a user may be able to remove the module or a part of the module from where it is installed and walk around with a remote control to control the wireless light bulbs and battery powered wireless lighting fixtures. In such an embodiment, the remote control power outage module may have button, switches, dials and the like to allow it to select and control lights on, off, the light intensity level etc. In some embodiments, the remote control power outage module may have an LCD touch screen or the like that would allow the user to control the lighting. In some cases, the remote control power outage module may be a control panel mounted to a wall that monitors the AC input and allows a user to control the lighting installation. In one embodiment, the power outage module remains in place, but an alternate remote control may be used to control the lighting. By way of an example, an IPHONE running an application and with a communication interface that may communicate with the wireless light bulbs and wireless lighting modules may allow control of the lights. It is to be appreciated that the remote control may use any communication interface and may contain any type of control mentioned herein. In some embodiments, the remote control power outage module or any other remote control mentioned herein may automatically detect when a bulb or fixture has been powered on.

In some embodiments, a power outage module may contain wireless power source such as a battery. Thus, the power outage module may be able to continue operation in the absence of AC power. The power outage module may draw its power from AC, its embedded wireless power source or both. It is to be appreciated that the power outage module will contain the circuitry and/or intelligence to manage which power source to use. In alternate embodiments, the power outage module may not contain an embedded wireless power source. In this embodiment, the power outage module may send regular messages ("keep alives") to the wireless light bulbs and wireless lighting modules such that as long as the wireless lights continue to receive the messages on a regular interval, the wireless lights should continue to operate normally. If the power outage module detects a problem with the AC power or its AC power is no longer present (i.e. it shuts off and hence stops transmitting), the wireless light bulbs and wireless lighting modules will not receive these keep alive messages from the power outage module for some period of time and as such determine that there is a problem with detected AC power and change state as necessary. By way of an example, the wireless light bulbs and wireless lighting modules may switch to an emergency mode and change their behavior in some way. Using a mechanism such that the wireless light bulbs and wireless lighting modules are required to hear the transmission of the power outage module at regular intervals prevents the case where the power outage module is disabled or blocked from transmitting in an emergency situation.

In some embodiments, a power outage module may be designed as a current loop that may detect the flow of current in wires inside the loop by detecting the magnetic field created by the electrical current. The current loop power outage module may contain a wireless transmitter. The current loop power outage module may contain a power source such as a battery that may power the current loop power outage module. In such an embodiment, the current loop power outage module may be installed on the power lines entering a house, on an individual circuit etc such that when a power outage is detected, the current loop power outage module may transmit on, off, dim, test or other commands to wireless light bulbs and battery powered wireless lighting fixtures. In some embodiments, the current loop power outage module may transmit a measurement of the amount of electric current detected flowing through the wires it is monitoring. In alternate embodiments, the current loop power outage module may contain a small display such as an LCD display to show the amount of current flowing through the loop or to show the amount of power consumed on the measured circuit.

In some embodiments, a wireless transmitter remote module may detect a power outage or disruption in input power and transmit control to wireless light bulbs or battery powered wireless lighting fixtures where the wireless transmitter remote module allows any external device to interface to the wireless transmitter remote module to transmit ON, OFF, DIM UP, DIM DOWN, TEST or any other control that may be implemented. It is to be appreciated that the external device may provide the indication to the wireless transmitter remote module that a power outage has occurred. In some embodiments, the wireless transmitter remote module is removable and replaceable from the external device. The wireless transmitter remote module may contain an LED to allow wireless transmitter remote module to act as a light source during a power outage or to allow the wireless transmitter remote module to be used in a manner similar to a flashlight. In some embodiments, the wireless transmitter remote module may emit sound to indicate where it is. In some embodiments, the wireless transmitter remote module contains an communication interface to a network, such as a Zigbee, Ethernet, Wifi, Bluetooth, which allows it to send an email, text message, make a phone call, make a phone call by Skype etc when a power outage or power disruption occurs. The wireless transmitter remote module may have on/off controls such as one or more pushbuttons such that lights that the device controls may be controlled during outage. The wireless transmitter remote module may have a test button to provide an indication of battery capacity level of battery powered wireless lighting fixtures where the indication is displayed on the wireless transmitter remote module. In such a case, the wireless transmitter remote module may require a wireless receiver such that it may receive the results of the test command back such that it may indicate the results. In embodiments containing a wireless receiver, the wireless transmitter may receive commands, data etc from any type of device that it may be able to communicate with. In embodiments, the wireless transmitter remote module may have an indicator that displays the battery life of each separate wireless light bulb or battery powered wireless lighting fixture.

In some embodiments, a power outage module may be designed as a wall switch plate replacement that has a light source integrated and may be connected to the switch electrically to allow it to detect a disruption in power at the switch. In such an embodiment, the wall switch plate replacement may also contain a wireless transmitter to allow it to control wireless light bulbs or battery powered wireless lighting fixtures upon the detection of a disruption in power. By way of an example, a power outage system may be created using a wall switch plate replacement that has a light source integrated for illumination and a number of battery powered wireless lighting fixtures that may receive control as transmitted from the wall switch plate replacement.

In some embodiments, a power outage lighting socket module may be contemplated in which the module may be connected to a light socket and controlled by a wall switch. The power outage lighting socket module may transmit on, off, dim, test or other commands to wireless light bulbs and battery powered wireless lighting fixtures. In embodiments with a dimming capability, the power outage lighting socket module may transmit a dim up, dim down or specific dim level to the receiving bulbs or fixtures. By way of an example, a power outage lighting socket module may be designed to screw into an Edison socket and may contain a wireless transmitter to allow the transmission of commands to one or more wireless light bulbs or battery powered wireless lighting fixtures upon the detection of a power outage. In some embodiments the power outage lighting socket module may be integrated into another device such as an LED light bulb, for example a UPS light bulb, and may transmit the same control delivered to the device it is integrated into. In some embodiments it may transmit different control than the control delivered to the device it is integrated into. In alternate embodiments, the power outage lighting socket module may be an adapter such that a bulb, lamp, tube or other lighting source may plug into the adapter but the adapter may also contain a transmitter to allow for commands to be transmitted to wireless light bulbs and battery powered wireless lighting fixtures. In embodiments of the power outage lighting socket module the device may have an integrated power source such as a battery or super capacitor such that it may be able to transmit while power to the outlet or socket is off. By way of an example, a large capacitor may be integrated into the module such that when the power is turned off at the wall switch, the logic and transmitter will still be able to transmit one or more commands such as an off command for some period of time.

In some embodiments, a power outage module may contain an interface that may allow it to be connected to an external device that may trigger the power outage module to transmit commands. In one embodiment, the power outage module is connected to a smoke detector or a system of smoke detectors. When a state change is detected in the smoke detector such as an alarm condition occurs, the smoke detector may trigger the power outage module over the interface to transmit an on command, an off command or some other command to control the wireless light bulbs and battery powered wireless lighting fixtures as needed. In another embodiment, a power outage module is integrated into an emergency light such as a stairwell or hallway light with a function of illuminating the area in an emergency. The power outage module may contain an interface that may allow the emergency light to control it to transmit such that when the emergency light goes on, the power outage module may transmit a command to turn on one or more battery powered wireless lighting fixtures. By way of an example, when an emergency light in a stairwell turns on, the power outage module transmitter sends a command to stair lights that are mounted in the stairwell where there is less light from the emergency light thus providing greater illumination during an emergency situation. Another advantage is that an battery powered wireless light fixture used only for emergency situation may have a much longer run time than 90 minutes or similar typical of emergency lights. By way of an example, a stair light powered by 3 C batteries and generating 50 lumens of light may have a continuous ON time of 40 hours. In another embodiment, the power outage module may interface to or be integrated with a home security system such that the security system may trigger the power outage module to transmit commands to the wireless light bulbs or battery powered wireless lighting fixtures. In such an embodiment, the home security system may turn on or blink the emergency lights upon the detection of an intruder. The home security system may communicate with the power outage module over the interface to implement any control of the wireless lighting bulbs or battery powered wireless lighting fixtures that may be required. It is to be appreciated that the power outage module may be integrated into the housing of any device that may desire to control the wireless lighting installation or the power outage module may be external to the device in which case the power outage module may contain its own housing and mounting mechanism. It is to be appreciated that the control over the interface may be for any purpose including purposes other than lighting during a power outage or emergency. By way of an example, the home security system may turn on the lights periodically as a method of security to provide an appearance that a residence is occupied while the residents are away.

In embodiments, a Wireless Emergency Lighting System may be controlled by a power outage module. In such an embodiment, battery powered wireless lighting fixtures containing a wireless receiver may be controlled by a power outage module such that upon detecting a disturbance in the power input, the power outage module may transmit a command to any number or type of battery powered wireless lighting fixtures to turn the light sources on. When power is restored, the power outage module may transmit a command to turn the light sources off. The battery powered wireless lighting fixtures may be stair lights, spotlights, path lights, exit signs and lighting, stair well lights, floor lights, ceiling lights etc to provide lighting in an emergency situation. It is to be appreciated that the fixtures are battery powered and wirelessly controlled therefore they may be mounted anywhere without the need for a connection to the grid or a wired power source. The battery powered wireless lighting fixtures may contain one or more indicators such as an LED to represent the battery capacity level of the battery powered wireless lighting fixture. The indicator may be any color and may represent the status of the battery in any way such as a green LED may indicated that the battery is healthy, a yellow LED may indicate a low battery level, a red LED may indicate a need to change the battery, a multicolor LED may allow several indications in the same LED. Battery powered wireless lighting fixtures may have an icon with light bars. The light bars may show the battery life of each light fixture. The indicators may always be illuminated or illuminated when button on the fixture or on a remote is pressed. The battery powered wireless lighting fixture may contain a push button such that a user may test the battery by pushing the button rather than containing an always on indication. The push button may be an illuminated push button to provide the indication. The command to test the light may come wirelessly from the power outage module or a separate remote control. In either scenario, the power outage module or remote control may have a mechanism to initiate the test such as a push button to trigger an indication of the status of the battery powered wireless lighting fixtures used in the Wireless Emergency Lighting System. In some embodiments, the battery powered wireless lighting fixtures may be used for general illumination and not just during an emergency. By way of an example, the battery powered wireless lighting fixtures may have a glow mode or low light level mode such that they may be used at night for general illumination. The fixture may be used in a child's room to provide additional lighting in an emergency or power outage but also may be used as a night light. In an alternate example, a user may have a separate remote control in addition to the power outage module that may be used to control the battery powered fixtures independent of the power outage module. It is to be appreciated that any functionality previously described for battery powered wireless lighting fixtures may be used in the Wireless Emergency Lighting System including auto shutoff functionality, environmental sensors capability, embedded programming of microcontrollers, microprocessors or the like to implement intelligent functionality and so on. It is to be appreciated that the battery powered wireless lighting fixture may be able to reconcile inputs from multiple control sources to make a decision on any input or combination of inputs to provide lighting as needed. In some embodiments, the power outage module is a module that contains the circuitry and a defined interface that may be connected to physically and electrically by an external device. Thus, the module may be integrated into or connected to any device that may interface physically and electrically and may be required to transmit control to installed lighting devices or lighting control devices. In some embodiments the power outage module may be an electrical circuit on a printed circuit board that may be integrated into another device. In some embodiments the power outage module may be removable and replaceable.

In one use case of an Wireless Emergency Lighting System, the battery powered wireless lighting fixtures consists of an RF ceiling light and an RF nightlight that are off grid and may receive transmission from a power outage module that contains an RF transmitter, plugs into a wall outlet and directly monitors AC power such that a detected condition that would require a switchover to emergency lighting, such as a power outage or disruption in power, would initiate a transmission to the RF ceiling light and RF nightlight to turn them on. When the power outage module detects that power is acceptable again, the power outage module may initiate a transmission to the RF ceiling light and RF nightlight to turn them off. The power outage module may contain a light source that provides light during the emergency condition. The power outage module may contain controls such as push buttons for on and off that allow a user to initiate control of the battery powered lighting fixtures. Alternatively, the power outage module may contain controls to provide a dimming capability such that a user may be able to adjust the light intensity of the battery powered wireless lighting fixtures. The power outage module may contain environmental sensors such as a motion sensor that may be used for control of the Wireless Emergency Lighting System. The power outage module may contain a power source such as a battery that may allow it to be removed and operated as a remote control. In some embodiments, the power outage module is an adapter that plugs into the wall outlet and contains an outlet allowing a device to plug into it and receive power. In some embodiments, the power outage module contains surge suppression or protection circuitry to protect its own circuitry and to protect any device plugged into it in the case that it is configured as an adapter. It is to be appreciated that RF controlled battery powered wireless lighting fixtures such as stair lights, spotlights, path lights, exit signs and lighting, stair well lights, floor lights, ceiling lights etc may be added to the Wireless Emergency Lighting System and controlled by the same power outage module. In embodiments, there may be a channel number or other method of addressing specific battery powered wireless lighting fixtures so that multiple Wireless Emergency Lighting Systems may be installed within range of each other but may operate independently.

In an alternate embodiment, a device similar to the power outage control module may be used as a switch wireless lighting control module rather than for power outage control. By way of an example, a switch wireless lighting control module may be plugged into a power outlet that is controlled by a wall switch. The wall switch may turn the power outlet on and off. When the power outlet is on, ie power is present, the switch wireless lighting control module may transmit an on command to one or more wireless light bulbs and battery powered wireless lighting fixtures. When the power outlet is off, ie power is not present, the switch wireless lighting control module may transmit an off command to one or more wireless light bulbs and battery powered wireless lighting fixtures. In this scenario, the wall switch may be used to control wireless lights not connected to the grid. In an alternate embodiment, a lighting socket lighting control module may be contemplated in which the lighting control module may be connected to a light socket and controlled by a wall switch. The lighting socket lighting control module may transmit on, off, dim, test or other commands to wireless light bulbs and battery powered wireless lighting fixtures. In embodiments with a dimming capability, the lighting socket control module may transmit a dim up, dim down or specific dun level to the receiving bulbs or fixtures. In some embodiments, the lighting socket control module may detect the dim level as represented by the waveform, for example a triac chopped AC waveform, and transmit an appropriate command such as a specific dim level to bulbs and fixtures if dimming is implemented. By way of an example, a lighting socket lighting control module may be designed to screw into an Edison socket and may contain a transmitter to allow the transmission of commands to one or more wireless light bulbs or battery powered wireless lighting fixtures. In some embodiments the lighting socket lighting control module may be integrated into another device such as an LED light bulb such as the UPS light bulb and may transmit the same control delivered to the device it is integrated into. In some embodiments it may transmit different control than the control delivered to the device it is integrated into. In alternate embodiments, the lighting socket lighting control module may be an adapter such that a bulb, lamp, tube or other lighting source may plug into the adapter but the adapter may also contain a transmitter to allow for commands to be transmitted to wireless light bulbs and battery powered wireless lighting fixtures. In embodiments of the switch lighting control module or lighting socket lighting control module the device may have an integrated power source such as a battery or super capacitor such that it may be able to transmit while power to the outlet or socket is off. By way of an example, a large capacitor may be integrated into the module such that when the power is turned off at the wall switch, the logic and transmitter will still be able to transmit one or more off commands for some period of time.

In another embodiment, the AC powered battery embedded wireless light bulb can be controlled by a motion sensor. It may or may not also be controlled by a light sensor to enable operation only in a low level of ambient light. The batteries can be rechargeable or non-rechargeable. The motion sensor controls the AC powered battery embedded wireless light bulb such that when motion has not been detected, the light source is set to a glow or a low light level powered by the embedded batteries. When motion is detected and a brighter light is required, the light will be turned on powered by the AC power source and it will be turned on to a bright level. The motion sensor can be powered by the batteries or by the AC power source. In one embodiment, the AC powered battery embedded wireless light bulb can work even when the AC power switch is off. For example, at night the AC wall light switch can be turned off, but the motion sensor and light source will still work using the embedded batteries as a power source. By way of an example, an R30 type AC powered battery embedded wireless light bulb can be controlled by motion sensor or by the wall switch with the light source powered by AC when AC power is applied and can be controlled by a motion sensor with the light source powered by the batteries when AC power is not present. The motion sensor is powered by the batteries in this example. In another example, the motion circuitry and low level light are powered by battery power, but when AC is applied, the light is set to it bright level independent of the motion sensor.

In an alternate embodiment, the AC powered battery embedded wireless light bulb can have multiple light levels that are controlled by the motion sensor. For example, it can have a bright light level but revert to a glow or low light level when the timer reaches a predetermined threshold to conserve energy but also provide a low level of light until motion is detect to turn on to the bright light level. In an alternate embodiment, logic can maintain the bright light level for some period of time, but then can control the light to fade to a glow or low light level by slowly dimming the light source over some preset or programmable period of time until it reaches the glow or low light level. In another alternate embodiment, the motion sensor can control the bulb if it is operating using the AC power source or if it is operating using the embedded battery power source. For example, there are two operational modes. First, if AC power is on the motion sensor and associated logic controls whether the light source is on or off and what brightness level it is on at. Second, if AC is off, the motion sensor operates with the light powered by the battery power source. The brightness level may or may not be different whether power is from the AC source or the battery source.

In another embodiment, the AC powered battery embedded wireless light bulb can be controlled by RF or IR. Thus, the input component can be an RF or IR receiver that can obtain an RF or IR signal communicated from an RF or IR transmitter that can be utilized by logic inside the bulb to control operation of the light source. The RF or IR transmitter can come in the form of remote control, keyfob, wall switch or any other controller that can house the RF or IR circuitry and user control mechanism. According to this example, the RF or IR signal can be deciphered by the input component to effectuate switching the light source to an on or off state, changing a light color or a light intensity, and the like. By way of an example, dimming commands can be sent to control the AC powered battery embedded wireless light bulb to specific levels in response to commands received from the RF or IR transmitter in a remote control or wall switch. Controls (switches, push buttons, dials, control wheel, etc) on a remote control or wall switch can increase or decrease the light level, set the level to glow, low or high light level directly etc. The wireless light bulb can be commanded to use AC power, battery power, switch from on to the other at various times as set by timers, time of day or sunrise/sunset calendar information maintained by intelligence in the bulb, can be commanded to switch over when an AC outage is detected, can be commanded to energy conservation modes automatically switching to different light levels upon any detectable state of the power or controls of the bulb etc. By way of an example, a PAR38 type AC powered battery embedded wireless light bulb can be controlled by RF or IR or by the wall switch with the light source powered by AC when AC power is applied and can be controlled by RF or IR with the light source powered by the batteries when AC power is not present.

Additionally or alternatively, the input component of the AC powered battery embedded wireless light bulb can be one or more sensors that monitor a condition, and monitored information yielded by such sensor(s) can be utilized to effectuate adjustments associated with the light source and the selection of which power source to use and under what conditions. It is to be appreciated that any type of sensor(s)

can be utilized in connection with the claimed subject matter. For example, the sensor(s) can be one or more of infrared sensors, light sensors, proximity sensors, magnetic switch sensor, acoustic sensors, voice activated sensor, motion sensors, radar sensors, sonar sensors, carbon monoxide and/or smoke detectors, thermal sensors, electromagnetic sensors, mechanical sensors, chemical sensors, pressure sensor, RFID tag reader or detection circuit and the like. According to another example, the input component can be a connector, port, etc. that couples to a disparate device, sensor, etc. to receive the input signal. It is also appreciated that any combination of RF, IR, motion or the sensors listed herein can be utilized in connection with the claimed subject matter. It is also appreciated that the light (off, glow, on at low level, on at bright level etc) and the transition between light levels can be controlled by any detectable state of the sensor or sensors. It is also to be appreciated that intelligence in the form of logic, electrical circuitry, microcontrollers, microprocessors, memory devices etc. contained in the bulb can leverage the sensors to monitor patterns of RF, IR or sensor inputs, keep the patterns in memory over time if necessary and adjust individual lights based on the pattern. Thus the AC powered battery embedded wireless light bulb has the ability to learn from inputs from its environment and change behavior accordingly.

In an alternate embodiment, the wireless light bulb can take commands from a communication interface from an external source by wired connection over a power distribution network, for example on the AC power lines (X10, INSTEON, Broadband over Power Lines, proprietary communication scheme etc), or wirelessly through a wireless interface (dedicated RF communication link, ZIGBEE, WIFI, ENOCEAN, BLUETOOTH etc). For example, the electric company can control or gather status from AC powered battery embedded wireless light bulbs throughout its power distribution network to remotely offload power usage at times when power demand is high by commanding some portion or the entire distributed network of wireless light bulbs to switchover to battery backup. Rechargeable batteries can be charged for some period of time to store power when power usage is off peak, then be used to off load some of the demand by supplying power for the bulb when power usage is on peak. Non-rechargeable batteries can also be used for emergency power requirements. In an alternate example, the control of wireless light bulbs can be local in a residence or commercial building through a central source controlling building lighting to optimize energy consumption. The control and gathering of status may be done by an intelligent electrical meter, smart meter, and the like. In such a case the meter may directly communicate with one or more wireless light bulbs over an appropriate communication interface using a protocol that allows the wireless light bulbs and meter to exchange information. By way of an example, the wireless light bulb may measure the amount of power consumed over a period of time and an intelligent electrical meter, smart meter, a remote device, and the like, through an intelligent electrical meter, smart meter, and the like (for example via the smart grid), may retrieve that information to provide that information for any purpose. In another example, an intelligent electrical meter, smart meter, a remote device, and the like, through an intelligent electrical meter, smart meter, and the like, may control the wireless light bulb to turn it on, off, set the light intensity level, control which power source or sources are used (battery, AC and/or a wireless power source), retrieve any information from a wireless light bulb or control any sensor or intelligence present in a wireless light bulb in the lighting installation. In addition to controlling a switchover to battery power, other applications are possible. Information or a record of usage can also be stored and retrieved. The stored data may pertain to power usage however it may also pertain to sensor gathered information. For example, the bulb can contain an occupancy sensor, like a motion sensor, that can record times and levels of occupancy in an area that can later be retrieved.

In embodiments, a building management unit in the form of a separate piece of equipment may communicate with the installed wireless light bulbs with existing power lines, tapping onto existing power lines or through a wireless interface such as a dedicated RF communication interface in residential or commercial buildings. This unit may send commands using one of the possible communication interfaces such that wireless light bulbs in the lighting installation can be programmed, controlled, and information or status can be retrieved for energy control and conservation, emergency functions, for safety and security, for convenience and any other functionality desired by a user. The building management unit may be controlled to implement the desired functionality via any method mentioned herein. By way of an example, the building manager unit with an RF communication interface may communicate to a network of wireless light bulbs that allows it to communicate with any wireless light bulb in the network. The unit may also have an Ethernet interface on the unit and have an IP address assigned to the interface. A software program running on the unit may allow a user to open a web browser and type in the IP address assigned to the unit. A graphical user interface served by the building management unit may open up providing a method for the user to implement the desired functionality. The building management unit may communicate with a an intelligent electrical meter, smart meter, and the like, over an appropriate communication interface using a protocol that allows the building management unit, which controls the installation of wireless light bulbs, and meter to exchange information. For example, the building management unit may communicate over a communication interface with an intelligent electrical meter, smart meter and the like by wired connection over a power distribution network, for example on the AC power lines (X10, INSTEON, Broadband over Power Lines, proprietary communication scheme etc), or wirelessly through a wireless interface (dedicated RF communication link, ZIGBEE, Wi-Fi, ENOCEAN, BLUETOOTH etc). By way of an example, the building management unit may measure the amount of power consumed over a period of time and an intelligent electrical meter, smart meter, a remote device, and the like, through an intelligent electrical meter, smart meter, and the like (for example via the smart grid), may retrieve that information to provide that information for any purpose. In another example, an intelligent electrical meter, smart meter, a remote device, and the like, through an intelligent electrical meter, smart meter, and the like, may control the building management unit to control the lighting installation to turn lights on, off, set the light intensity level, control which power source or sources are used (battery, AC and/or a wireless power source), retrieve any information from the wireless light bulbs in the lighting installation or control any sensor or intelligence present in the wireless light bulbs in the lighting installation.

In an alternate embodiment, a lighting circuit control unit may be attached to one or more electrical circuits within a residential or commercial building and implement building management unit functionality on the circuit or circuits it is connected to. The lighting circuit control unit may attach electrically to the circuit at any point or communicate through an RF or IR communication interface. It may come in any form that allows it to use those communication interfaces. For example, it can be an RF transceiver with keypad, a hard wired box etc. retrofit into the wall switch, connected elsewhere in the circuit or as a standalone unit. The unit can control all wireless light bulbs it can communicate with or through a network of wireless light bulbs for energy control and conservation, emergency functions, for safety and security, for convenience and any other functionality as desired by a user based on an input from a sensor, time of day clock, human input, etc. Unique or group IDs may be assigned to multiple circuits, individual circuits or individual wireless light bulbs such that a user can control the lighting installation one wireless light bulbs, distinct groups of wireless light bulbs or the entire lighting installation from one or more lighting circuit control units. By way of an example, a wall switch is retrofit with a lighting circuit control unit that is electrically inserted in line with AC power to a lighting circuit consisting of six R30 AC powered battery backed wireless light bulbs inserted into recessed fixtures. The lighting circuit control unit has an LCD display and push buttons that allow a user to scroll through a list of configuration items that can program the wireless light bulbs or a list of status that can be gathered from the lighting circuit working much like a thermostat for the lighting installation. The lighting circuit control unit communicates with the wireless light bulbs using a proprietary communication over power lines method to implement the functionality set by the user. The lighting circuit control unit may communicate with a smart meter over an appropriate communication interface using a protocol that allows the lighting circuit control unit, which controls the installation of wireless light bulbs, and meter to exchange information. For example, the lighting circuit control unit may communicate over a communication interface with an intelligent electrical meter, smart meter and the like by wired connection over a power distribution network, for example on the AC power lines (X10, INSTEON, Broadband over Power Lines, proprietary communication scheme etc), or wirelessly through a wireless interface (dedicated RF communication link, ZIGBEE, Wi-Fi, ENOCEAN, BLUETOOTH etc). By way of an example, the lighting circuit control unit may measure the amount of power consumed over a period of time and an intelligent electrical meter, smart meter, a remote device, and the like, through an intelligent electrical meter, smart meter, and the like (for example via the smart grid), may retrieve that information to provide that information for any purpose. In another example, an intelligent electrical meter, smart meter, a remote device, and the like, through an intelligent electrical meter, smart meter, and the like, may control the lighting circuit control unit to control the lighting circuit to turn lights on, off, set the light intensity level, control which power source or sources are used (battery, AC and/or a wireless power source), retrieve any information from the wireless light bulbs on the lighting circuit or control any sensor or intelligence present in the wireless light bulbs on the lighting circuit.

In an alternate embodiment, a direct personal control ability exists such that a user may control one or more wireless light bulbs and wireless lighting modules from their computer, handheld, remote control etc. In such a case, there may be a building management unit or larger software control system in place, but direct personal control may allow a user direct control of the lighting that affects that user. It is to be appreciated that the building management unit or larger software control system may contain the intelligence to identify that a user locally changed the configuration and update its configuration appropriately or notify a system administrator of the change implemented locally. The direct personal control ability may allow a user to configure one light or a group of lights to implement a coordinated function. By way of an example, an employee in an office may have a software application running on their computer and an adapter connected to the computer that allows the software application to communicate with the group of lights associated with the employee office and the hallway outside of the employee office. That employee has knowledge of when they will be in their office and when they will not. They may arrive early and leave early during the day, have multiple meetings such that they will not be in the office and so forth. That employee may also have preferences for the lighting in their office. The employee may use the software application to configure the wireless light bulbs and wireless lighting modules in their office and hallway outside of their office for any of the functionality offered by the wireless light bulbs and wireless lighting modules. In this case, the direct personal control system may be implemented using the communication interface from the computer on the employee's desk to the wireless light bulbs and wireless lighting modules. Because the intelligence in the wireless light bulbs and wireless lighting modules is distributed, the employee may configure the units locally no matter what the state of the larger system is.

In embodiments containing a coordinated lighting group, there may be individually addressable lights as well as groups of lights (multicast and broadcast groups). Thus, a light may need to have multiple addresses assigned to it and as such may need to respond to control and return status based on every address assigned to it whether it is an individual address or group address. It is also to be appreciated that multiple individual addresses may be assigned to the same light such that the controlling sources may use different addresses to communicate with a light. By way of an example, direct personal control coming from a user's computer may communicate with a light on a different address than the building management system. This may be done so that there are different levels of access to the bulb from a security perspective. The system administrator may have access to more functionality than the user therefore multiple addresses may be used to define privileges. In some embodiments, a light may listen to commands intended for another lights and respond accordingly. By way of an example, a light may be the master and the other lights in a coordinated lighting group may be slaves. When the master is commanded to implement a daylight harvesting change, for example it is commanded to change its light intensity based on a new configuration, the slave lights may receive that command. After some period of time when the master has completed adjusting its light intensity change, the slave lights will then change their light intensity to also implement the daylight harvesting change. In this manner, the lights may gracefully implement daylight harvesting in a sequence that they will not be adjusting against each other.

In another embodiment, the AC powered battery embedded wireless light bulb contains rechargeable batteries. The light source can be powered by AC power, battery power or both. For example, power to the light source can be diode or-ed such that AC power and battery power share the load. The battery power can be charged all of the time or can contain the intelligence to be programmed to charge only when billing rates from the electric company are low. The sharing of the load between AC power and battery power given that the batteries will charge at least some of the time at off peak billing rates from the electric company and the light source will be on for at least some of the time that billing rates are higher or at their peak will result in energy savings and conservation. The bulb can contain the intelligence (microcontroller, microprocessor, real time clock etc.) such that it can be programmed to charge the battery power at the times when the billing rates are at their lowest the energy savings and conservation can be maximized. Thus, the AC powered battery embedded wireless light bulb has the ability of "moving power in time" by storing power at some time and using the power at another time. The AC powered battery embedded bulb may or may not contain a sensor to control operation. The intelligence may use a real time clock and be programmed to use the AC input and charge the batteries during off peak billing times and use battery power during on peak billing times such that there is an overall cost savings in energy usage. By way of an example, the AC powered battery embedded bulb may be programmed for operation based on a Time of Use (TOU) price plan from the energy company. The rechargeable battery capacity may or may not be enough to power the light source for the entire duration of the on peak billing time. In such a case, the intelligence may be able to switch between power sources or control a sharing of the load between battery power and AC input power based on a measurement of battery capacity level, power use from the embedded batteries and from the AC input, by measuring the current draw or power consumed from one or more of the sources of power that may power the bulb and adjusting the amount of power consumed from the one or more sources, such as by PWM or other known method of controlling the power consumed from a source or any other measurable parameter that allows for an optimization for cost or minimize power consumption of the combined use of embedded batteries and AC input power.

In embodiments, the electric company may implement load shedding or load leveling using AC powered battery embedded wireless light bulbs, building management units and/or lighting control units throughout its power distribution network by remotely offloading power usage at times when power demand is high by commanding some portion or the entire distributed network of wireless light bulbs to switchover to battery power. In some embodiments, the wireless light bulbs, building management units and/or lighting control units may receive a load control signal from the electric company or end user to implement load shedding. The control may force a reduction in power consumption from the AC input by either reducing power usage (by dimming light levels for example) or by switching some portion of or all of the power source to battery power. In some embodiments, the wireless light bulbs, building management units and/or lighting control units may respond to supply conditions to implement demand response during peak or critical times or based on market prices by adjusting usage or by switching some portion or all of the power source to battery power. In some embodiments, load shedding or demand response may happen without an explicit command from the electric company. By way of an example, the power source for the wireless light bulb may be shared by the AC input and embedded rechargeable batteries all of the time. The rechargeable batteries may be charging all of the time or only during off peak times. Thus, during peak times, by having the AC input and rechargeable batteries share the load, the average power drawn from the AC input will be significantly lower dining peak times if the AC input supplied all of the power. In alternate embodiments, the embedded batteries may always be the power source and the AC input power is used to charge the battery. Thus, the power required from the AC input will only be as much as is required to charge the battery and at its peak will only be as much as the battery charging cycle requires. The functionality to manage power and distribute the load during peak times may be programmed into an intelligent wireless light bulb and not require an external command to enter the load shedding mode. The intelligence may also be embedded in the wireless light bulb to receive commands to perform further load shedding functions if needed. For example, the percentage load from the AC input and from the embedded battery may be programmable based on time of day if there is a particular knowledge of when the peak demand times are, the light intensity level may be programmable to further reduce power consumption, a sensor such as a motion sensor may be enabled to switchover to occupancy sensing to reduce power consumption etc.

In alternate embodiments, the AC powered battery embedded wireless light bulb contains rechargeable batteries and can return power to the grid. The rechargeable battery is charged when AC is on or can be programmed to charge at specific times or under specific conditions. The bulb can return power to grid when the bulb is off or when power can be returned because power stored exceeds power usage by some level. The result, as more bulbs are installed, is a distributed power network that allows power to be "stored" in every home, office building, retails space etc. that the bulbs are installed in and the stored energy can be returned to the grid when needed by the electric company. Backup storage capabilities that can be used to feed the grid during peaks in energy demand can offload the burden of power generation on the grid and can provide revenue or savings on the energy bill to end users. It is to be appreciated that any form of wireless power can be present in the bulb to harvest energy from the environment and charge the embedded batteries to form an energy generation source to send power from the environment to the grid. In some embodiments, the electric company may perform load shedding or load leveling by commanding an end user to use some local stored energy or the electric company may make use of the returned stored power to meet peak demand requirements. This may be done independently as determined by intelligence in the wireless light bulb, may be commanded by the user or may be commanded by the electric company (for example through a load control signal or a new type of signal that triggers the return of stored power to the grid).

In another embodiment, battery backup is built into AC powered recessed fixtures or down light assemblies for residential or industrial lighting. The battery backup can be switched over to if there is a dropout of AC power or some other characteristic is detected that makes AC power no longer desirable to use (brownout conditions, electrical surges, overvoltage conditions, voltage sag or flickers, line noise, frequency variations, switching transients, harmonic distortion, etc.) to the fixture for emergency or safety applications or for energy efficiency purposes. In addition, a sensor or RF control may be built into the fixture or down light assembly such that they can be wireless controlled or programmed. For example, an RF receiver can be built into the fixture or down light assembly. In alternate embodiments, the fixtures or down light assemblies may contain and use as a power source any combination of AC power and/or wireless power sources mentioned herein.

Figure 21:
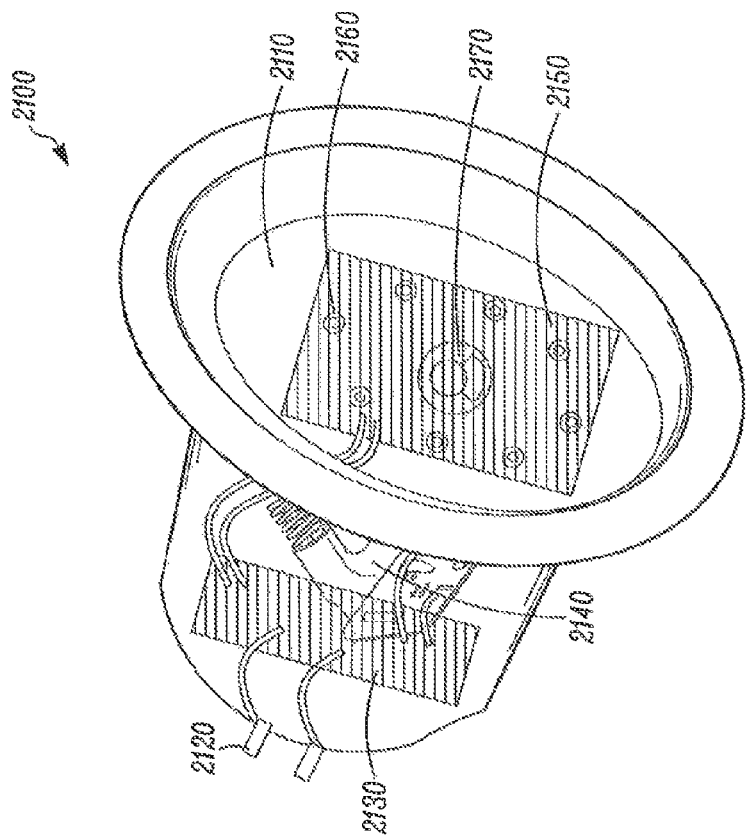
FIG. 21 shows a perspective view of the recessed fixture version of a wireless light bulb.

In another illustrative embodiment, a version of the wireless light bulb may provide for AC powered battery embedded LED recessed fixture 2100 applications. With reference to FIG. 21, illustrated is a perspective view of an embodiment of an AC powered battery embedded LED recessed fixture 2100. In the illustrated embodiment, the AC powered battery embedded LED recessed fixture 2100 includes a housing 2110, an AC input 2120, a printed circuit for AC/DC conversion and battery management functions 2130, a battery holder 2140, a printed circuit for a motion sensor circuit and LED drive circuitry 2150, a plurality of LEDs 2160 and a motion sensor 2170. In an alternate embodiment, the AC input is not used and the unit is solely powered by the embedded batteries thus elements 2120 and 2130 are not present or are not used.

By way of an example, an LED based 2×2, 2×4, and the like fluorescent replacement wireless light bulb may be designed with rechargeable or non-rechargeable batteries embedded and a circuit that makes the LED replacement bulb look like a fluorescent bulb to the ballast controller or otherwise allows the LED replacement bulb to operate with the ballast in place. An LED based 2×2, 2×4 and the like fluorescent replacement wireless light bulb with batteries embedded then may allow for the replacement of a fluorescent bulb with an LED battery backed bulb. This may allow a retrofit for battery backup for the consumer such that rather than incur the expense of the battery backed ballast controller (or battery backup elsewhere) and an electrician to do the electrical work to wire it in, the retrofit with battery backup can be done by the replacement of the fluorescent bulb. In alternate embodiments, the LED based 2×2, 2×4, and the like fluorescent replacement bulb may contain and use as a power source any combination of AC power and/or wireless power sources mentioned herein. In alternate embodiments, the LED based 2×2, 2×4, and the like fluorescent replacement bulb may contain and use any wireless control method mentioned herein.

Alternate embodiments of the wireless light bulb may be designed with a different housing that allows installation in a suspended grid ceiling system in locations typically occupied by 1×1, 2×2, 2×4 size ceiling tiles or the like. In this embodiment, the housing may contain any of the features of the wireless light bulb, but is designed in a ceiling tile form factor. In alternate embodiments, the housing may be designed in any form factor to be used in place of a fluorescent fixture such as but not limited to high bay fixtures, layin fixtures, strip fixtures, under cabinet fixtures, wall mount fixtures, wrap around fixtures, and the like. In these embodiments, the wireless light bulb may be designed to fit into place in the socket of the fixture (e.g. as a compact fluorescent lamp, fluorescent lamp or fluorescent bulb replacement) or the entire wireless light bulb fixture may be the same form factor as the fluorescent fixtures listed and be applicable for use in similar applications. The wireless light bulb may contain non-rechargeable or rechargeable batteries. In alternate embodiments, the wireless light bulb may have any type of connector on it that allows for charging by connection to a mating connector and that provides an AC or DC power source. In some embodiments the wireless light bulb may allow a connection to an AC input and may contain the required circuitry to convert AC to DC for the light source and wireless control. In some embodiments, the wireless light bulb may replace a fluorescent lamp or fixture that is connected to a resistive, reactive, or electronic ballast in which case the wireless light bulb may also contain circuitry to take the output of the ballast and convert it to DC power suitable for the light source and wireless control. By way of an example, a version of the wireless light bulb containing an RF receiver and a motion sensor may be designed into a housing that fits into a 2×2 ceiling grid. The wireless light bulb may also contain rechargeable batteries, an AC to DC converter and ballast conditioning circuit to connect to a ballast in the case where the wireless light bulb is a retrofit of a fluorescent fixture, and the like. It is to be appreciated that the ballast conditioning circuit may operate the wireless light bulb whether the wireless light bulb is connected to a ballast or not. There may also be intelligence (microcontroller, microprocessor, integrated circuit etc.) inside the wireless light bulb such that is can be programmed to draw power from the AC input, from the rechargeable batteries or both. The intelligence may use a real time clock and be programmed to use the AC input and charge the batteries during off peak billing times and use battery power during on peak billing times such that there is an overall cost savings in energy usage. The unit may be programmed for operation based on a Time of Use (TOU) price plan from the energy company. The rechargeable battery capacity may or may not be enough to power the light source for the entire duration of the on peak billing time. In such a case, the intelligence may be able to switch between or control a sharing of the load between battery power and AC input power based on a measurement of battery capacity level, power use from the embedded batteries and from the AC input or any other measurable parameter that allows for an optimization for cost or minimizes power consumption of the combined use of embedded batteries and AC input power.

Alternate embodiments of the wireless light bulb may be designed with a housing that allows installation in a 2 or 4 pin plug-in fluorescent socket. In this embodiment, the housing may contain any of the features of a wireless light bulb and is designed with a 2 or 4 pin plug that allows it to be installed in a plug in fluorescent light fixture. By way of an example, the 2 or 4 pin wireless light bulb retrofit may be powered by the AC input but contain an LED light source, wireless control and/or wireless power functionality as mentioned herein for any wireless light bulb product such as a UPS light bulb, a motion wireless light bulb, a RF controlled wireless light bulb with a transceiver and the capability to form a mesh network, a programmable wireless light bulb etc. The wireless light bulb may physically couple with the fixture to support the wireless light bulb, yet electrical current may or may not flow between the fixture and the wireless light bulb. In such a case where electrical current does not flow between the fixture and the wireless light bulb, the wireless light bulb may contain one or more wireless power sources that provides power to the bulb. The wireless light bulb may contain one or more wireless control sources. In some embodiments, the wireless light bulb may replace a fluorescent light that is connected to a resistive, reactive or electronic ballast in which case the wireless light bulb may also contain circuitry to take the output of the ballast and convert it to DC power suitable for the light source and wireless control. The wireless light bulb may also contain non-rechargeable or rechargeable batteries. In the case where the bulb contains rechargeable batteries it may contain the circuitry to charge the batteries. There may also be intelligence (microcontroller, microprocessor, integrated circuit etc.) inside the wireless light bulb such that it can be programmed to draw power from the AC input, from the rechargeable batteries or both. The intelligence may use a real time clock and be programmed to use the AC input and charge the batteries during off peak billing times and use the battery power during on peak billing times such that there is an overall cost savings in energy usage. The wireless light bulb may be programmed for operation based on a Time of Use (TOU) price plan from the energy company. The rechargeable battery capacity may or may not be enough to power the light source for the entire duration of the on peak billing time. In such a case, the intelligence may be able to switch between battery power and AC input power based on a measurement of battery capacity level, power use from the embedded batteries and from the AC input or any other measurable parameter that allows for an optimization for cost or power consumption of the combined use of embedded batteries and AC input power.

In an alternate embodiment, an adapter may be designed that plugs into the 2 or 4 pin connector and has an Edison socket that a wireless light bulb may plug in to. It is to be appreciated that any power conditioning circuitry required to convert the AC input from the 2 or 4 pin connector to the appropriate input for the wireless light bulb will reside in the socket. In some embodiments, bulbs other than a wireless light bulb, for example any off the shelf incandescent, LED or CFL bulb, may plug into the 2 or 4 pin adapter. In such cases, the adapter may contain any form of wireless control, wireless power, intelligence or networking capability to provide wireless light bulb functionality to the installed off the shelf bulb.

Alternate embodiments of the wireless light bulb may be installed into a housing that allows installation in a fluorescent troffer, high bay fixtures, layin fixtures, strip fixtures, under cabinet fixtures, wall mount fixtures, wrap around fixtures, and the like. In this embodiment, the housing may contain one or more sockets such that wireless light bulbs in any standard size bulb (e.g. PAR30, PAR38, A19, R30, MR16 etc) or non-standard size bulb form factor may plug in. By way of an example, the housing may contain multiple Edison sockets such that PAR30 bulbs may be screwed in. Thus, with a housing that supports wireless light bulbs that screw or plug in, any type of wireless light bulb may be installed in the fixture. The housing may also have a connection to an AC input, wiring from the input to the sockets and any external circuitry to condition the AC input for use by the wireless light bulbs. In an alternate embodiment, a fluorescent retrofit LED bulb may be designed to be a retrofit in fluorescent tube applications where it is not designed in traditional fluorescent tube housing. A flat housing may be designed that contains LEDs and electronics down the length of the housing with pins allowing it to be installed in a socket for fluorescent tubes. In some embodiments, the shape of the flat housing and orientation of the LEDs may be such that two of the flat housings may be installed in a dual troffer such that they are geometrically opposed. In such a case, when both fluorescent LED retrofit bulbs are installed, there is an even pattern of LEDs installed in the troffer. By way of an example, two L-shaped fluorescent retrofit LED bulbs are designed such that the bottom part of the L contains an array of LEDs. When the two L-shaped fluorescent retrofit LED bulbs are installed, the two arrays of LEDs fill the entire space to provide the appearance of evenly spaced LEDs in the housing. It is to be appreciated that any shape of LED bulb and number of LED bulbs may be designed to fit into the space of a fluorescent troffer. In an alternate embodiment, a multiple fluorescent tube retrofit LED bulb may be designed such that the distance between the multiple tubes may be adjusted. Thus a single multiple fluorescent tube retrofit LED bulb may be designed such that it may be used in multiple troffers. It is to be appreciated that the multiple fluorescent tube retrofit LED bulb may be designed such that the width, length or both may be adjusted to fit into the troffer and plug into the socket. By way of an example, a dual fluorescent tube retrofit LED bulb is designed that is adjustable such that it may be installed in a number of common troffers that may be installed in fluorescent lighting applications.

In an alternate embodiment, the recessed fixtures or down light assemblies are completely battery powered. In addition, a sensor or RF control may be built into the fixture or down light assembly to control the unit. Wireless power and wireless control built into wireless lighting module fixtures or down lights allows them to be installed anywhere without the need for wires. In alternate embodiments, the fixtures or down light assemblies may contain and use as a power source any combination of wireless power sources mentioned herein.

In embodiments, a wireless light bulb may provide functionality equivalent to a "Three Way" light bulb by making use of the external communication interface and multiple light levels managed inside the bulb. Any number of light levels may be implemented in the wireless light bulb. An RF remote or other control method sends commands to change light levels in the wireless light bulb. By way of an example, an AC powered wireless light bulb is designed with an RF receiver inside. An RF remote with a single push button allows control of the light levels. From off, the first time the button is pushed, the light output goes to a low brightness level. The second time the button is pressed, the light output goes to a medium brightness level. The third time the button is pressed, the light output goes to a high brightness level. The fourth time the button is pressed, the light turns off. Any number of light levels, any brightness levels or sequence of brightness levels or method of control is possible. In an alternate embodiment, the number of light levels, brightness levels and sequence of brightness levels may be programmable by the user based on user preference. In alternate embodiments, the "Three Way" light bulb may respond to a switch on a lamp such that there are four levels—off and three light intensity levels. When the switch is turned once, the light intensity level goes from its first light intensity state to its next. By way of an example, the "Three Way" light bulb starts in the off position. When the switch is turned to the next position, the bulb detects the switch transition and changes the light intensity level from off to on at the lowest intensity level. When the switch is turned again to the next position, the bulb detects the switch transition and changes the light form the lowest intensity level to the next higher intensity level and so on. It is to be appreciated that the number of light levels, brightness levels and sequence of brightness levels that the "Three Way" light bulb may have in any of its embodiments may be factory set or programmable by the user based on user preference.

A plurality of use cases are possible in the use of AC power, wireless power sources and any combination thereof. In one use case, an AC powered battery embedded wireless light bulb contains an RF energy harvesting circuit. In this case, there may be a broadband antenna and circuitry to collect RF energy and charge the embedded batteries. In an alternate use case, a PAR30 type battery embedded wireless light bulb may contain a wireless power transmission receiver circuit and rechargeable batteries. The wireless power transmission circuit may allow the batteries to be charged off line, then have the wireless light bulb returned to the light socket for use.

Figure 22:
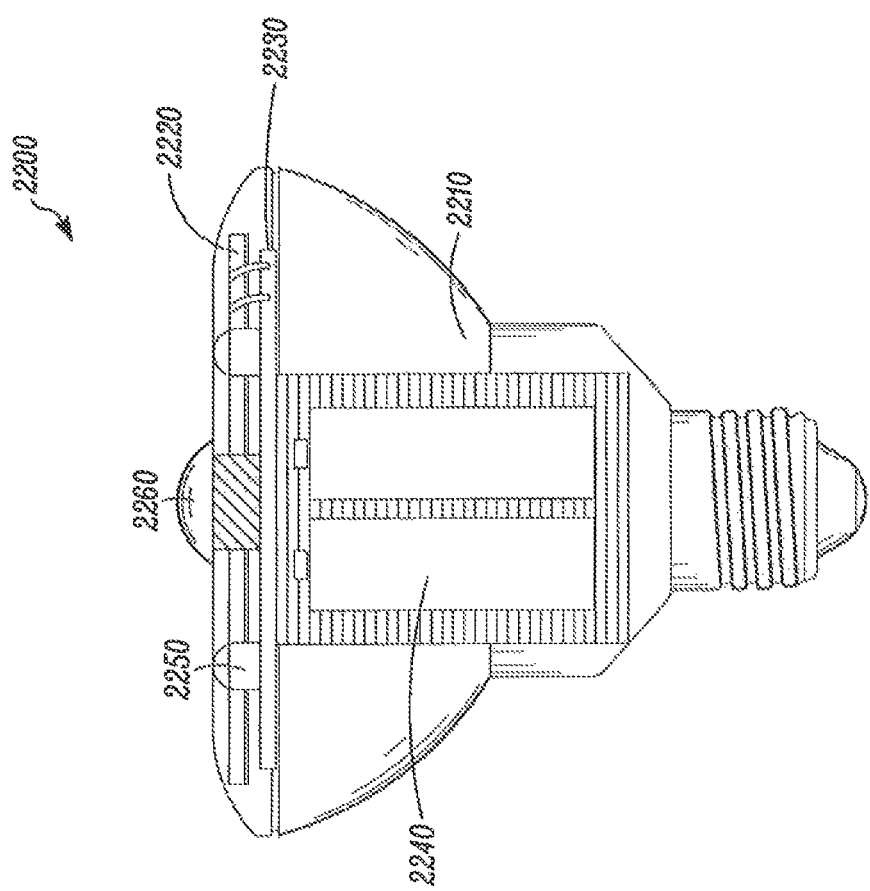
FIG. 22 shows a perspective view of an embodiment of a battery embedded solar recharged PAR30 wireless light bulb.

In another illustrative embodiment, a battery embedded wireless light bulb may contain solar cells on its surface and rechargeable batteries to power the wireless control and light source. With reference to FIG. 22, illustrated is a perspective view of an embodiment of a battery embedded solar recharged PAR30 wireless light bulb 2200. In the illustrated embodiment, the battery embedded solar recharged PAR30 wireless light bulb 2200 includes a housing 2210, one or more solar cells 2220, a printed circuit for interfacing to the solar cell or cells and battery management functions, motion and light sensor circuitry 2230, a battery holder 2240, a plurality of LEDs 2250 and a motion sensor 2260 and light sensor. The size of the solar cells can be set to match the anticipated amount of LED on time per the number of expected motion sensor triggers per some period of time. Note that there is some power consumption from the circuitry on the PCB to charge the batteries, for the motion detector, for the LED drive circuit etc., so it is to be appreciated that the power consumption and on time the battery embedded solar recharged PAR30 wireless light bulb can sustain every evening is equal to the amount of recharge that can be done by the solar cells and rechargeable batteries. It is to be appreciated that any form of wireless control or wireless power mentioned herein can be used in conjunction with this embodiment. It is to be appreciated that any size and shape of the solar cells can be used and they be placed on the housing in any manner conceivable. It is also to be appreciated that any size or type of rechargeable battery can be used in conjunction with this embodiment. In an alternate embodiment, there is a method to replace the batteries designed in, thus if the amount of on time exceeds the recharge rate, the rechargeable batteries can be removed, recharged to full or close to full capacity and then returned to the wireless light bulb. In this use case, the motion sensor provides for a highly efficient use of the power consumption such that for a limited amount of recharging (e.g. small solar cells used on the bulb), an appropriate amount of light can be provided for short periods of time such that the average power consumption is low over time, but power consumption is high for brief periods of time only when the light is needed.

In references to battery embedded, AC powered battery embedded, or any combination of power source wireless light bulbs, it is to be appreciated the chargeable and rechargeable batteries can be replaced by any energy storage element mentioned herein. For example, a battery embedded wireless light bulb can be a fuel cell embedded wireless light bulb. An AC powered battery embedded wireless light bulb can use one or more super capacitors as a power source to power a glow mode in certain applications.

An external light socket adapter may be designed with batteries embedded to battery backup any kind of light bulb that plug into a socket. The external light socket adapter can be designed as an adapter for any type of socket to provide the described functionality for any of the plurality of bulb types mentioned herein. By way of an example, an adapter plugs into an Edison socket and also has an Edison socket that accepts an A19 type bulb. An incandescent, compact fluorescent, and LED type light bulb can plug into the socket adapter. The socket adapter may contain embedded rechargeable or non-rechargeable batteries, the circuitry to switch over to the embedded batteries, an AC/DC converter, a DC/AC inverter, a charging circuit to charge the embedded batteries, and the intelligence to implement a switchover between AC power and backup power. In embodiments, this function can match that of the UPS wireless light bulb but with the batteries external to the bulb such that any standard bulb could be used. It is to be appreciated that the same functionality provided by the UPS wireless light bulb mentioned herein may be implemented by the external light socket adapter and a standard bulb plugged in.

An AC outlet adapter or an AC outlet replacement may be designed with batteries embedded to provide power to any kind of electrical device that plugs into the outlet. By way of an example, an adapter may plug into an AC wall outlet and also have an AC socket that an electrical device that plugs into an AC outlet can plug into. In this example, the adapter that plugs into an AC wall outlet may have more than one AC socket that electrical devices may plug into. In an alternate example a cable with an AC plug on one end and the adapter at the end of the cable may be designed similar to an electrical extension cord or power strip where the assembly adapter at the end may contain the embedded batteries. An AC powered device of any kind such as a lamp, television, television peripheral, computer, appliance, washer, clothes dryer, refrigerator, freezer, electric range, microwave oven, electric water heater, vacuum cleaner, cell phone charger, stereo, air conditioner, HVAC devices, electric or hybrid vehicles, electric motors, industrial and manufacturing machinery etc, may plug into the AC outlet adapter or an AC outlet replacement. In alternate embodiments, the AC powered device of any kind may be designed with the batteries embedded inside the device to provide power to the device. In alternate embodiments, an external light socket adapter may be designed with the batteries embedded inside the device to provide power to any light source or device connected to it. The AC powered device, socket adapter, outlet adapter or outlet replacement may contain embedded rechargeable or non-rechargeable batteries, the circuitry to switch over to the embedded batteries, an AC/DC converter, a DC/AC inverter, a charging circuit to charge the embedded batteries, and the intelligence to implement a switchover between AC power and battery power. In embodiments, power may be switched over to battery if there is a dropout of AC power or some other characteristic is detected that makes AC power no longer desirable to use (brownout conditions, electrical surges, overvoltage conditions, voltage sag or flickers, line noise, frequency variations, switching transients, harmonic distortion, etc.) to the outlet, socket or AC powered device. Power may be switched to AC power, battery power or both power sources may be used for emergency or safety applications, for energy efficiency, for energy cost savings or peak load reduction (load leveling) purposes. In addition, a sensor or RF control may be built into the AC powered device, socket adapter, outlet adapter or outlet replacement such that they can be wireless controlled, status can be gathered from it, commands may be sent to switch to a different power source, it may be remotely programmed, and the like. For example, an RF transceiver can be built into the AC powered device, socket adapter, outlet adapter or outlet replacement and a device such as a wall switch, remote control, RF transceiver that can plug into a computer and be controlled by a software program, etc. may communicate with the AC powered device, socket adapter, outlet adapter or outlet replacement. In alternate embodiments, the AC powered device, socket adapter, outlet adapter or outlet replacement may contain and use as a power source any combination of AC power and/or wireless power sources mentioned herein. In alternate embodiments, an AC circuit with battery embedded device performing the same function of the AC outlet adapter with embedded batteries may be installed to support multiple AC outlets or connected AC powered devices by inserting the device in-line at the point of entry for AC power for that electrical circuit. By way of an example, in a residence, the battery embedded device can be installed in-line after the circuit breaker that can provide battery power on multiple AC drops such that the embedded batteries inside the device may supply power to all of the devices that may be drawing AC power on the circuit in a manner as described for the AC powered device, external light socket adapter, AC outlet adapter or AC outlet replacement.

A wall switch or lighting control component of any kind may be designed with batteries embedded to allow battery power to be the power source for the lighting circuit or any AC powered device connected to the circuit controlled by the wall switch (for example a device plugged into an AC outlet controlled by the switch). The wall switch or lighting control component may be designed any size or shape for any type of wall switch or lighting control component to provide the described functionality for any of the plurality of bulb types mentioned herein. By way of an example, a wall switch with three switches may be used to control multiple light sockets or wall outlets in a residential or commercial application. In addition to the three switches, internally the housing of the wall switch may have embedded batteries. An incandescent, compact fluorescent, LED type light bulb or AC powered device of any kind may derive power from the AC input, embedded batteries or both. It is to be appreciated that any size or shape wall switch or lighting control component may have any size or shape embedded batteries. The wall switch or lighting control component may contain embedded rechargeable or non-rechargeable batteries, the circuitry to switch over to the embedded batteries, an AC/DC converter, a DC/AC inverter, a charging circuit to charge the embedded batteries, and the intelligence to implement a switchover between AC power and battery power. In embodiments, this function may match that of the UPS wireless light bulb but with the batteries external to the bulb such that any standard bulb could be used. It is to be appreciated that the same functionality provided by the UPS wireless light bulb mentioned herein may be implemented by the wall switch or lighting control component and any type of bulb plugged in or AC powered device connected. In addition, monitoring the sense of the wall switch (open or closed) and the ability to monitor whether AC power is present and acceptable before the switch allows intelligence in the switch to select the power source. For example, if the switch is closed and AC power is not present, the wall switch may be able to switchover to battery power because it may assume there is a power outage. In addition, intelligence in the wall switch may need to detect changes in the state of switch or the AC power input to switch back over to AC power when it is present and acceptable again and may need electrical circuitry, a relay, an optoisolator etc. to allow the sharing of the load by power sources or the switching from one power source to another power source. In alternate embodiments, additional intelligence, wireless controls and wireless power sources may be embedded in the wall switch or lighting control component to implement any of the functionality mentioned herein. By way of an example, a wall switch plate with two positions for wall switches may be replaced with a wall switch plate with one switch installed and an embedded power source such as one or more rechargeable or non-rechargeable batteries in the position where the second switch may be installed. In an alternate example, both switches may be there, but the rechargeable or non-rechargeable batteries may occupy any available space within the depth of the switch plate. In an alternate embodiment, there may be a battery door, battery tray or custom hot pluggable battery that may allow a user to replace the embedded battery or remove to test and replace. It is to be appreciated that the unit, a UPS wall switch, may be designed in any size, shape or with any electrical interface necessary to provide the UPS functions as described herein for the lights and/or devices on the lighting and/or electrical circuits the one or more switches control. It is also to be appreciated that any type of switch may be replaced such as a toggle switch, push button switch, dimmer switch and the like such that the UPS functionality may be incorporated. In an alternate example, the grid shifting functions mentioned herein may be implemented using the battery embedded wall switch plate such that intelligence built into the embedded wall switch replacement may store and use power from the grid for optimal use for power savings, cost savings, safety and security or convenience.

In embodiments, an external light socket adapter, AC outlet adapter, an AC outlet replacement, an AC powered device, an AC circuit with embedded battery device designed with batteries embedded, wall switch or lighting control component and the like, may include intelligence (microcontroller, microprocessor, integrated circuit etc.) designed in such that it may be programmed to draw power from the AC input, from the rechargeable batteries, or both. In alternate embodiments, an external light socket adapter, AC outlet adapter, AC outlet replacement, AC powered device, AC circuit with embedded battery device, wall switch or lighting control component and the like, may contain and use as a power source any combination of AC power and/or wireless power sources (batteries, fuel cells, super capacitors, solar cells, RF energy harvesting circuit etc.) mentioned herein and the included intelligence may be used to make decisions when and how to use the power sources. The intelligence may use a real time clock and be programmed to use the AC input and charge the batteries during off peak billing times and use battery power during on peak billing times such that there is an overall cost savings in energy usage. The intelligence may use a real time clock and be programmed in any way to implement load leveling such as to use the AC input and charge the batteries during off peak times and use battery power during on peak times such that there is an reduction in energy usage during peak times. Thus, the external light socket adapter, AC outlet adapter, AC outlet replacement, AC powered device, AC circuit with embedded battery device, wall switch or lighting control component and the like have the ability of "moving power in time" by storing power at some time and using the power at another time. By way of example, the device may be programmed for operation based on a Time of Use (TOU) price plan from the energy company. The rechargeable battery capacity may or may not be enough to power the device plugged in for the entire duration of the on peak billing time. In such a case, the intelligence may be able to switch between or control a sharing of the load between battery power and AC input power based on a measurement of battery capacity level, power use from the embedded batteries and from the AC input or any other measurable parameter that allows for an optimization for cost or minimize power consumption of the combined use of embedded batteries and AC input power. The control and gathering of status from an external light socket adapter, an AC outlet adapter, an AC outlet replacement, an AC powered device, an AC circuit with embedded battery device, wall switch or lighting control component and the like, may be done by an intelligent electrical meter, smart meter, control software and the like. In such a case the meter or control software may directly communicate with one or more of the adapters or devices over an appropriate communication interface using a protocol that allows the adapters or devices and smart meter or control software to exchange information. By way of an example, the adapters or devices may measure the amount of power consumed over a period of time and an intelligent electrical meter, smart meter, a remote device, control software and the like, through an intelligent electrical meter, smart meter, and the like (for example via the smart grid), may retrieve that information to provide that information for any purpose. In another example, an intelligent electrical meter, smart meter, a remote device, control software and the like, through an intelligent electrical meter, smart meter, and the like, may control the adapters or devices to turn them on, off, set the light intensity level, control which power source or sources are used (battery, AC and/or a wireless power source), retrieve any information from adapters or devices or control any sensor or intelligence present in adapters or devices. In addition to controlling a switchover to battery power, other applications are possible. Information or a record of usage from each power source may be stored and retrieved. The stored data may pertain to power usage, however it may also pertain to sensor gathered information. For example, an external light socket adapter, an AC outlet adapter, an AC outlet replacement, an AC powered device, an AC circuit with embedded battery device, wall switch or lighting control component and the like may contain an occupancy sensor, like a motion sensor, that can record times and levels of occupancy in an area that can later be retrieved.

In embodiments of an external light socket adapter, AC outlet adapter, an AC outlet replacement, an AC powered device, an AC circuit with embedded battery device designed with batteries embedded, wall switch or lighting control component and the like, the electric company may implement load shedding or load leveling using these components throughout its power distribution network by remotely offloading power usage at times when power demand is high by commanding some portion or the entire distributed network of components to switchover to battery power. In some embodiments, the external light socket adapter, AC outlet adapter, an AC outlet replacement, an AC powered device, an AC circuit with embedded battery device designed with batteries embedded, wall switch or lighting control component and the like may receive a load control signal from the electric company or end user to implement load shedding. The control may force a reduction in power consumption from the AC input by either reducing power usage (by turning AC powered devices such as appliances off for example) or by switching some portion of or all of the power source to battery power. In some embodiments, external light socket adapter, AC outlet adapter, an AC outlet replacement, an AC powered device, an AC circuit with embedded battery device designed with batteries embedded, wall switch or lighting control component and the like, may respond to supply conditions (demand response) during peak or critical times or based on market prices by adjusting usage or by switching some portion or all of the power source to battery power. In some embodiments, load shedding or demand response may happen without an explicit command from the electric company. By way of an example, a clothes dryer may be plugged into an AC outlet adapter with the capabilities mentioned herein. In response to a load shedding command, the AC outlet adapter may turn off power to the clothes dryer or alternatively transfer some or all of the load to the battery power source. In an alternate example, when run during peak billing times, the AC outlet adapter the clothes dryer is plugged into may draw some or all of the load from the battery power source to reduce the cost of usage of the clothes dryer. In some embodiments, the electric company may perform load shedding by commanding an end user to use some local stored energy or the electric company may make use of the returned stored power to meet peak demand requirements. This may be done independently as determined by intelligence in the external light socket adapter, AC outlet adapter, an AC outlet replacement, AC powered device, an AC circuit with embedded battery device designed with batteries embedded, wall switch or lighting control component and the like, may be commanded by the user or may be commanded by the electric company (for example through a load control signal or a new type of signal that triggers the return of stored power to the grid). In embodiments of an external light socket adapter, AC outlet adapter, an AC outlet replacement, an AC powered device, an AC circuit with embedded battery device designed with batteries embedded, wall switch or lighting control component and the like that may use an AC power input and embedded battery power with an intelligent, programmable controller may also contain grid tie inverter circuitry to allow the stored battery power to be converted to AC. The grid tie inverter circuitry may allow the external light socket adapter, AC outlet adapter, an AC outlet replacement, an AC powered device, an AC circuit with embedded battery device designed with batteries embedded, wall switch or lighting control component and the like to be directly connected to the grid and to supply power back to the grid. The grid tie inverter may allow stored battery power to be used locally or to be sold back to the utility in the case that there is surplus power. The control of the return of energy to the grid may be based on battery capacity level, time of day, the (TOU) billing plan from the energy company, commands received over the communication interface to return or stop returning energy to the grid either from local intelligence (intelligent electrical meter, smart meter, and the like) or from the energy company, known or learned energy consumption patterns where the additional energy may be needed or any other reason that it may be desired to return energy to the grid.

In embodiments of an external light socket adapter, AC outlet adapter, an AC outlet replacement, an AC powered device, an AC circuit with embedded battery device designed with batteries embedded, wall switch or lighting control component and the like, a function similar to the UPS light bulb may exist such that there is circuitry inside the device that may detect that AC power is no longer present (power failure) or some other characteristic that makes AC power no longer desirable to use (brownout conditions, electrical surges, overvoltage conditions, voltage sag or flickers, line noise, frequency variations, switching transients, harmonic distortion etc.) at the device power input. In this case the device may switch over to battery power automatically to power the control circuitry and to continue providing power to the device. This application, the uninterruptable power supply external light socket adapter, AC outlet adapter, an AC outlet replacement, an AC powered device, an AC circuit with embedded battery device designed with batteries embedded, wall switch or lighting control component and the like, provides power during a power outage using the embedded battery power source. Additional intelligence may be designed into the device to provide features or extend the amount of time usable power may be available when powered by the embedded battery power source. The device may also measure the impedance, resistance, and/or capacitance across the AC power input and return or may measure any other electrical characteristic of the AC power input and return to determine whether the controlling switch or breaker is open or closed (or if electricity has been turned off at any point up to the AC input of the device). By way of an example, if the controlling switch or breaker is open, there may be a high impedance detected across the input AC power and return. If the controlling switch or breaker is closed, there may be a measurable impedance, resistance and/or capacitance or electrical characteristic different from when the controlling switch or breaker is open. A threshold may be set in the device such that if the measurement is above or below the threshold, the switch or breaker is closed, and if the measurement is on the opposite side of the threshold, the switch or breaker is open. The device may be controlled by the state of the controlling switch or breaker (on or off), but may also detect the condition when the controlling switch or breaker is closed but AC input power is not present or is not acceptable and may be able to switch over to the rechargeable or non-rechargeable batteries that are embedded as the power source. In some embodiments, the UPS light bulb may perform an impedance discontinuity check to determine if the controlling switch or breaker is open or closed. In some embodiments, the device may generate a signal onto the line and monitor the electrical response of the line to determine if the response indicates an open circuit that may be indicative of a switch or breaker open in the lighting circuit. By way of an example, the device may perform a function typical of a time domain reflectometer by generating a short rise time pulse at the connection to input and monitor the input for a reflected signal that would be indicative of an open circuit. If the reflected signal exceeds a set threshold, it may indicate an open circuit. In some embodiments, the device may need to learn where such a threshold should be set. The device may be installed in many variations of power distributions circuits where the amount or type of wiring to the switch or breaker may vary and where there may be many other sources of loads on the circuit (such as other devices, multiple switches or controls etc.) therefore it may have to adjust its detection circuitry to operate properly. It is to be appreciated that the setting of the threshold may be done automatically by the device or manually by a user through any process that may allow the device to be set to a threshold where one side of the threshold indicates the switch or breaker is open and the other side of the threshold indicates the switch or breaker is closed. It is to be appreciated that when the switch sense functionality is implemented, the switch or breaker may still be able to turn on and off power to the device even when running off of the embedded battery power source because the device may be able to determine if the switch is on or off and apply power or not apply power to the device based on the switch position. In such a case, the switch sense circuitry may still need to be powered along with any other necessary circuitry to implement this function even when the device is not being powered.

Figure 23:
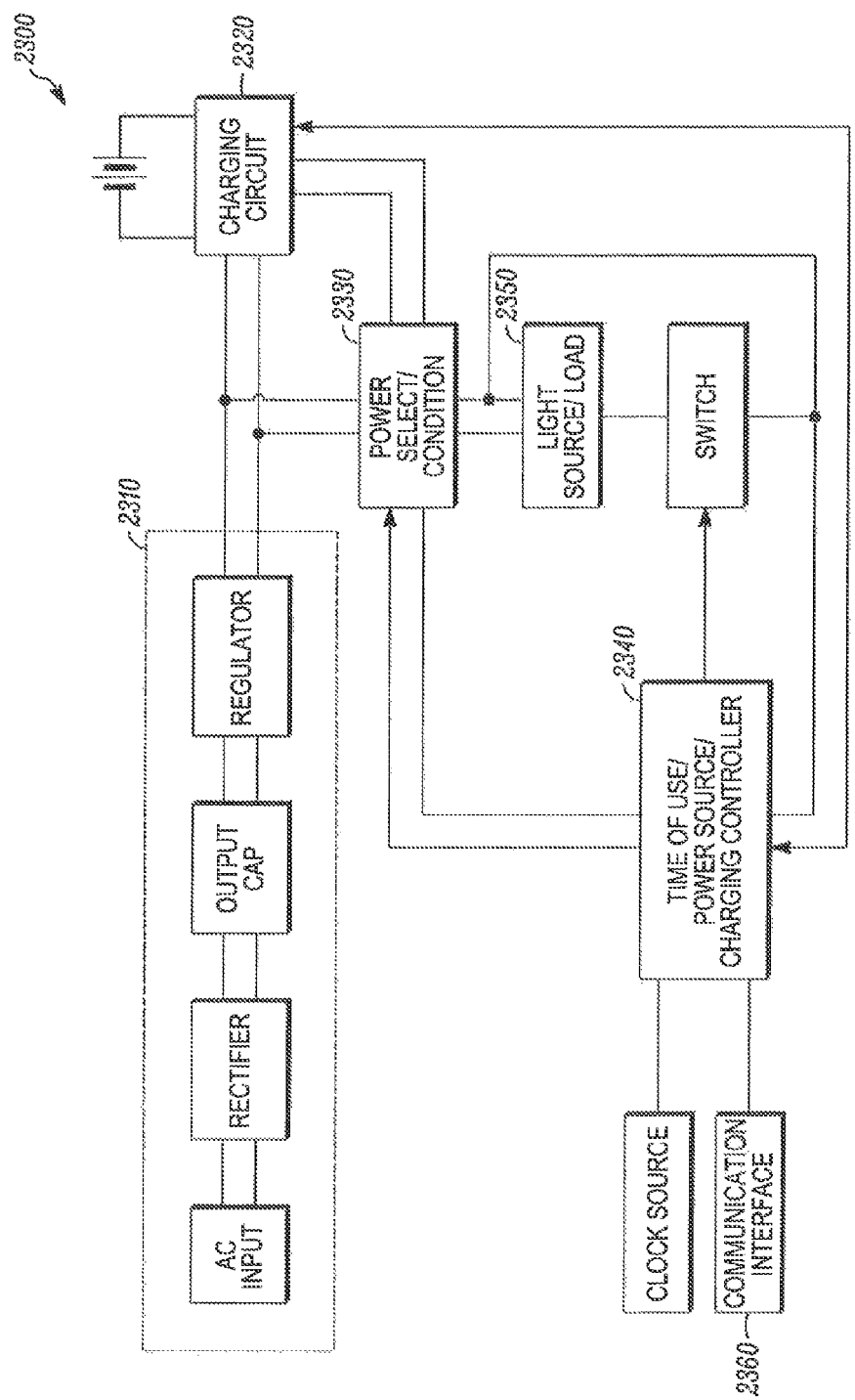
FIG. 23 shows a block diagram of an example system that uses an AC power and embedded battery power with an intelligent, programmable controller.

In an illustrative embodiment shown in FIG. 23, the block diagram shows an example AC powered battery embedded wireless light bulb system 2300 that may use an AC power input and embedded battery power with an intelligent, programmable controller to provide cost savings, security and convenience benefits to a lighting installation. In the illustrated embodiment, the AC powered battery embedded wireless light bulb system 2300 may include an AC/DC converter 2310, a charging circuit with rechargeable batteries 2320, power selection and conditioning circuitry 2330, an intelligent, programmable time of use and power source/charging controller 2340, a light source or load 2350 and a communication interface 2360, and the like. The AC input may be connected to the AC powered battery embedded wireless light bulb system 2300 by a light socket, wall outlet, terminal block, connector, hardwired connection or any common connection that a device requiring AC power may have to an AC power input. The AC input block may contain a transformer, line cap, fuse, inrush limiter or other type of power circuitry commonly found at the input of an AC/DC converter or an AC powered device. The output of the AC/DC converter 2310 may be a regulated DC source such as a DC/DC converter circuit. It may be a constant current source to the load for example to provide constant current to a chain of LEDs in series. In some embodiments there may be multiple circuits at the output of the AC/DC converter such that one circuit may provide a power source for low current draw circuitry such as the an intelligent, programmable time of use and power source/charging controller 2340 and communication interface 2360 and a second circuit may provide a power source for high current draw circuitry such as the light source or load 2350. It is to be appreciated that any number power sources may be created at the output of the AC/DC converter to meet the needs of the application.

The output of the AC/DC converter may be connected to a charging circuit with rechargeable batteries 2320. In one embodiment, the charging circuit includes an integrated circuit, such as a Microchip MCP73838 battery charge management controller with some external components to monitor and charge one or more Li-Ion rechargeable batteries embedded in the AC powered battery embedded wireless light bulb system 2300. It is to be appreciated that any charging circuit or type of rechargeable battery may be used in the AC powered battery embedded wireless light bulb system 2300. The intelligent, programmable time of use and power source/charging controller 2340 may be a microcontroller, microprocessor, integrated circuit, electrical circuit or the like. In the embodiment using a MCP73838 and Li-Ion batteries, a microcontroller such as the FREESCALE SEMICONDUCTOR MC68HC908QT microcontroller may be used to monitor the charge status of the Li-Ion batteries, control the charge current to the Li-Ion batteries, put the charging circuit in standby mode, detect when charging is complete, detect a battery temperature fault, start a timer to time the duration of charging or any other status or control function relevant to charging circuitry or rechargeable batteries.

Power selection and conditioning circuitry 2330 may be used to select the power source for the internal circuitry and light source or load 2350. The power selector and conditioning circuitry 2330 may be configured to select AC power as the power source, the embedded batteries as the power source with the selection controlled by the intelligent, programmable time of use and power source/charging controller 2340, and the like. In one embodiment, the selection may be done with a pair of MOSFETs that can be controlled by the controller such that either the AC source is selected or the embedded battery power source is selected. With the addition of diodes, the AC source and embedded battery power source may share the load of the light source or load 2350. In an alternate embodiment, the selection of power source may be done automatically with a single MOSFET and a Schottky diode such that if the AC source is present, the power source will automatically be the AC source however if the AC source is not present, the power source will automatically switch to the embedded battery power source. The Schottky diode provides protection to prevent reverse current from flowing to the AC power source. When the AC power source is present the embedded battery may or may not be in a charging mode. In another alternate embodiment, there is an additional wireless power source on the AC powered battery embedded wireless light bulb system 2300 that may provide a power source or battery charging source (energy harvesting methods such as solar cells, wireless power transfer, capturing radio frequency energy etc.). In this case, the power selection and conditioning circuitry 2330 would be expanded to allow for selection and use of all of the power sources. It is to be appreciated that any number of wireless power sources may be used in conjunction with the claimed subject matter.

In one embodiment, the light source or load 2350 may be one or more LEDs. The power selection and conditioning circuitry 2330 may also include any driving circuit required to power the light source or load 2350. In the embodiment where LEDs are used as the light source and the one or more LEDs are arranged in series, the AC power source or embedded battery power source may require an LED driver circuit at the output of the power selection and conditioning circuitry 2330 to generate a constant current source or to generate the required DC voltage to turn on all of the LEDs in the series. In an alternate embodiment, the output of the AC/DC converter may have the proper characteristics to drive the LEDs, however the embedded battery power source may require an LED driver circuit to generate a constant current source and/or to step of the DC voltage to the required DC voltage to turn on all of the LEDs in the series. In alternate embodiments, the light source may be a compact fluorescent lamp or fluorescent lamp and the block diagram shown constitutes an electronic ballast integrated into the lamp. In this case, there may also be an inverter circuit (DC/AC circuit) in the power selection and conditioning circuitry 2330 to create the proper starting and operating electrical condition for the fluorescent light source. In alternate embodiments the load may be an external light socket adapter or a device connected to an AC outlet adapter or an AC outlet replacement. In any of these embodiments, there may be a DC/AC inverter circuit to create the proper AC output power for the attached device. In some embodiments, the AC/DC converter may only be used to charge the batteries and power local circuitry. The AC power source may be switched to the load via a relay, solid stated device, or other switching device or the embedded battery power source may be selected by the intelligent, programmable time of use and power source/charging controller 2340 to supply power to the load. In the case where the embedded battery power source is a chosen power source, the DC/AC inverter would take the embedded battery DC output and convert to AC power to create the proper AC output power for the attached device. In some embodiments, there may be a very large, super or ultra capacitor in or before the power selection and conditioning circuitry 2330 for energy storage in addition to the rechargeable batteries. This may take advantage of some characteristics of capacitors to offset limitations in rechargeable batteries such as the fast charging time of capacitors.

In the illustrated embodiment, an intelligent, programmable time of use and power source/charging controller 2340, a light source or load 2350 and a communication interface 2360 may be used to control the operation of the AC powered battery embedded wireless light bulb system 2300. In the embodiment containing a MC68HC908QT microcontroller and an LED light source, the microcontroller may be used to control the light source based on firmware programmed into flash memory on the microcontroller. The microcontroller may control the light source to turn it on or off, control the intensity of one or more LEDs via pulse-width modulation or other methods to control the current through the light source to provide power savings, provide dimming functionality, multiple light levels, a glow function, and so on, control which power source or sources are used (battery, AC and/or a wireless power source), control state changes based on time of day, set specific on times, off times and brightness levels based on billing rates from the power company at different times of the day (for example based on time of use, TOU billing plans), automatic shut-off times or timers, automatic turn on times or timers, change color or may be programmed in substantially any manner to control the light source. The microcontroller may also control the selection of the power source or sources based on a program that can set state and change state based on the inputs to the microcontroller. The microcontroller may also be used to gather status on any of the power sources, the light source or the usage there of. For example, with additional circuitry necessary to gather the information, the microcontroller may record power usage, temperature of the components in the system, battery capacity level, light output, light color etc.

A communication interface 2360 may be used by an external computer-related entity, either hardware, software (e.g., in execution), and/or firmware to communicate with the intelligent, programmable time of use and power source/charging controller 2340. The external entity may use the communication interface such that the intelligence in the AC powered battery embedded wireless light bulb system 2300 in the lighting installation may be programmed, controlled and information or status can be retrieved for energy control and conservation, emergency functions, for safety and security, for convenience and any other functionality desired by a user. It is to be appreciated that the AC powered battery embedded wireless light bulb system 2300 may contain processing resources and computer program such that it can implement a wide range of functionality or the AC powered battery embedded wireless light bulb system 2300 may contain only a few functions and the processing resources and computer program reside in the external entity. In this way the intelligence may either be distributed in the AC powered battery embedded wireless light bulbs that are installed or be centralized in the external computer-related entity.

It is to be appreciated that the AC powered battery embedded wireless light bulb system 2300 may be designed in any size or shape housing to meet the requirements of any standard size bulb (e.g. PAR30, PAR38, A19, R30, MR16 etc), non-standard size bulb, fixture, compact fluorescent bulb, fluorescent bulb or lamp (e.g. T4, T5, T8, circular etc.) or down light assembly (e.g. recessed fixtures, fluorescent fixtures or down light fixtures for residential, commercial or industrial lighting), or the like. It is also to be appreciated that the AC powered battery embedded wireless light bulb system 2300 may be designed in any size or shape housing to meet the requirements of any external light socket adapter, AC outlet adapter, an AC outlet replacement or an AC circuit with embedded battery device designed with batteries embedded application.

Figure 24:
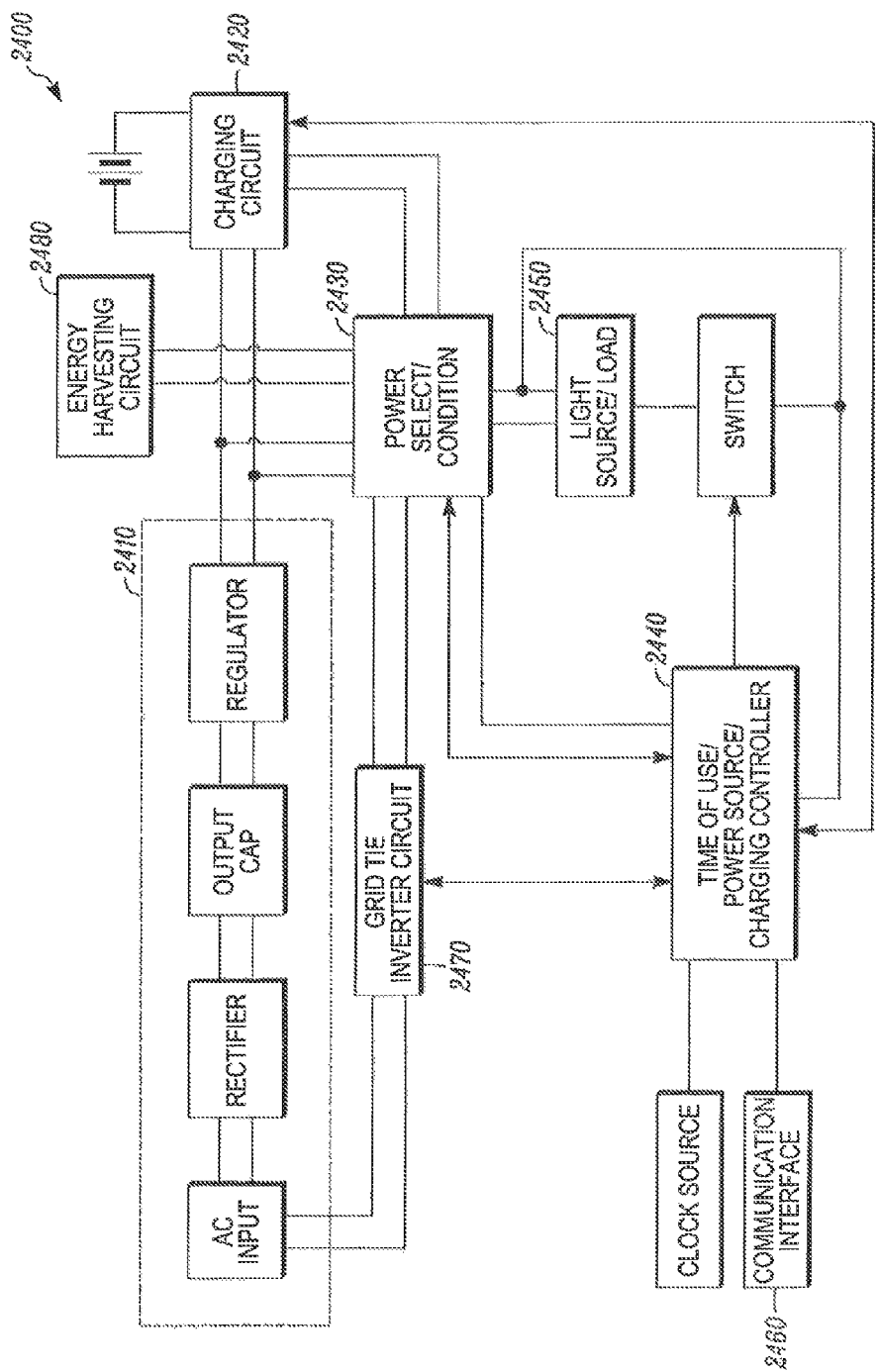
FIG. 24 shows a block diagram of an example system that uses an AC power and embedded battery power with an intelligent, programmable controller and a grid tie inverter to deliver power to the grid.

In an illustrative embodiment shown in FIG. 24, the block diagram shows an example AC powered battery embedded wireless light bulb system that may use an AC power input and embedded battery power with an intelligent, programmable controller but also contains grid tie inverter circuitry to allow the stored battery power to be converted to AC. The grid tie inverter circuitry may allow the AC powered battery embedded wireless light bulb system to be directly connected to the grid and to supply power back to the grid. The grid tie inverter may allow stored battery power to be used locally or to be sold back to the utility in the case that there is surplus power. In the illustrated embodiment, the grid tied AC powered battery embedded wireless light bulb system 2400 may include an AC/DC converter 2410, a charging circuit with rechargeable batteries 2420, power selection and conditioning circuitry 2430, an intelligent, programmable time of use and power source/charging controller 2440, a light source or load 2450, a communication interface 2460, a grid tie inverter 2470, and the like. In alternate embodiments there may be one or more additional energy harvesting circuits 2480 (including energy harvesting methods such as solar cells, wireless power transfer, capturing radio frequency energy, etc.) that may provide power for the light source or load 2450, charge the embedded batteries or may provide power to the grid tie inverter to return to the grid. The grid tied AC powered battery embedded wireless light bulb system 2400 may provide all of the functionality described for the AC powered battery embedded wireless light bulb system 2300, but the intelligent, programmable time of use and power source/charging controller 2440 may also control the return of energy to the grid (for local use and/or to be sold back to the utility). The control of the return of energy to the grid may be based on battery capacity level, time of day, the (TOU) billing plan from the energy company, commands received over the communication interface to return or stop returning energy to the grid either from local intelligence (intelligent electrical meter, smart meter, and the like) or from the energy company, known or learned energy consumption patterns where the additional energy may be needed or any other reason that it may be desired to return energy to the grid.

In an alternate embodiment, there may not be a grid tie inverter in the grid tied AC powered battery embedded wireless light bulb system 2400 but rather wires into the housing that allow for an electrical connection to the grid tied AC powered battery embedded wireless light bulb system 2400 such that multiple grid tied AC powered battery embedded wireless light bulb systems can be connected externally to an inverter to provide power for local use or to a grid tie inverter to provide power to the power grid. There may be a typical AC power input to the grid tied AC powered battery embedded wireless light bulb system 2400, but also two or more wires that can be chained or connected separately to an inverter, to a grid tie inverter or to a connection panel that can combine and condition the inputs to then connect to an inverter or grid tie inverter. In this way, one electrical circuit containing multiple grid tied AC powered battery embedded wireless light bulb systems or an entire lighting installation containing multiple grid tied AC powered battery embedded wireless light bulb systems can be fed back to one or more inverters or grid tie inverters to implement similar functionality as if the inverter or grid tie inverter was located in the grid tied AC powered battery embedded wireless light bulb system 2400. It is to be appreciated that the output onto the two or more wires may be AC or DC in nature. For example, the output may be 12 VDC and ground, the output may be 48 VDC and ground, the output may be 12 VAC and ground etc. In the case where DC power is output, there may be no inverter and there may be a DC/DC converter to generate the required DC output voltage. It is also to be appreciated that the grid tied AC powered battery embedded wireless light bulb system 2400 may include circuitry to allow chaining of the wiring (diodeored for example) or may connect to independent wiring back to an inverter, to a grid tie inverter or to a connection panel that can combine and condition the inputs to then connect to an inverter or grid tie inverter. In some embodiments, there may be an additional charge controller and external battery or batteries for additional energy storage outside of the grid tied AC powered battery embedded wireless light bulb systems.

In embodiments, the grid tie inverter may need to ensure that the power supplied by the grid tie inverter will be in phase with the grid power. To synchronize phase with grid power, there may be circuitry in the grid tied AC powered battery embedded wireless light bulb system 2400 to monitor the AC input power and lock to the phase with a phase locked loop, an AC power zero crossing detector circuit or the like. This may be used to set the phase of the output of the grid tie inverter to be in sync with the grid. In alternate embodiments, the phase of grid power may not be directly detected in the grid tied AC powered battery embedded wireless light bulb system 2400 but may be detected in an external device that can communicate the phase of the grid power to the grid tied AC powered battery embedded wireless light bulb system 2400 via the a communication interface 2460. A grid tie inverter may also ensure that the voltage of the grid tie inverter output is slightly higher than the grid voltage to enabling current to flow out to the grid. The detection of the grid voltage may be done with circuitry inside the grid tied AC powered battery embedded wireless light bulb system 2400 or in some embodiments the grid voltage may be detected in an external device that can communicate the grid voltage to the grid tied AC powered battery embedded wireless light bulb system 2400 via the a communication interface 2460. By way of an example, a separate device connected to grid power (at an AC outlet, at the circuit breaker box etc.) may detect the phase of grid power and/or the grid voltage. It may also contain an RF transmitter that can transmit wirelessly to the grid tied AC powered battery embedded wireless light bulb system 2400 enough information to know the phase of the grid power (analog to digital representation of the waveform, times of zero crossing etc.) and/or the grid voltage such that embedded intelligence, such as a microcontroller, could control the grid tie inverter such that it is in sync with grid power and the output voltage is slightly higher than the grid voltage. There may be a mechanism to allow the grid tie inverter to be disconnected from the power grid. The disconnect from the grid may be automatically controlled allowing a disconnect from the grid if the grid voltage is turned off, if the phase of grid power cannot be synchronized with, if there is no information from an external source about the phase of grid power, etc, or it is not appropriate to supply power back to the grid via the grid tie inverter for any reason. It may also disconnect anytime the grid tied AC powered battery embedded wireless light bulb system 2400 may not be supplying power back to the grid. Embedded intelligence may be programmed based on battery capacity level, time of day, the (TOU) billing plan from the energy company, commands received over the communication interface to return or stop returning energy to the grid either from local intelligence (intelligent electrical meter, smart meter, and the like) or from the energy company, known or learned energy consumption patterns where the additional energy may be needed or any other reason that it may be desired to return energy to the grid. By way of an example, multiple grid tied AC powered battery embedded wireless light bulb systems on the same circuit or in the same residence, commercial or industrial building or geographical area may or may not return power to the grid at the same time. An intelligent device such as a computer running a software program, a remote control, a building management unit, a lighting circuit control unit etc. may implement a scheme to enable the grid tied AC powered battery embedded wireless light bulb systems such as time division multiplexing algorithm, an algorithm to control which grid tie inverter is on and which grid tie inverter is off to make sure there is no or limited contention, an algorithm to control which grid tie inverters are on based on a knowledge of the energy needs of the consumer or billing plan of the consumer, an algorithm based on the battery capacity level of the grid tied AC powered battery embedded wireless light bulb systems, etc.

It is to be appreciated that the grid tied AC powered battery embedded wireless light bulb system 2400 may be designed in any size or shape housing to meet the requirements of any standard size bulb (e.g. PAR30, PAR38, A19, R30, MR16, etc), non-standard size bulb, fixture, compact fluorescent bulb, fluorescent bulb or lamp (e.g. T4, T5, T8, circular etc.) or down light assembly (e.g. recessed fixtures, fluorescent fixtures or down light fixtures for residential, commercial or industrial lighting), or the like. It is also to be appreciated that the grid tied AC powered battery embedded wireless light bulb system 2400 may be designed in any size or shape housing to meet the requirements of any external light socket adapter, AC outlet adapter, an AC outlet replacement or an AC circuit with embedded battery device designed with batteries embedded application.

In embodiments containing rechargeable batteries, a charge management controller and intelligence, the intelligence may be used to optimize rechargeable battery life by controlling recharge cycles in such a way to optimize the usable life of the batteries. By way of an example, a microcontroller built into a wireless light bulb may monitor the depth of discharge of the rechargeable battery. Based on the status of the battery depth of discharge, the microcontroller may start a recharge cycle early rather than allow the rechargeable batteries to be deeply discharged. The usable capacity of rechargeable batteries may depend on the rate of discharge and the allowable voltage at the end of discharge. An intelligent program running on a microcontroller may adjust the charge cycles to optimize the usable life of the rechargeable batteries. In the example of the AC powered battery embedded wireless light bulb, the end result is the ability to extend battery life such that with either an optimization of the recharge cycles or sizing battery capacity to lessen the depth of the discharge needed, the limiting factor of an AC powered battery embedded wireless light bulb when the light source is LEDs may be the life of the LEDs rather than the expected usable life of the rechargeable batteries.

Figure 25:
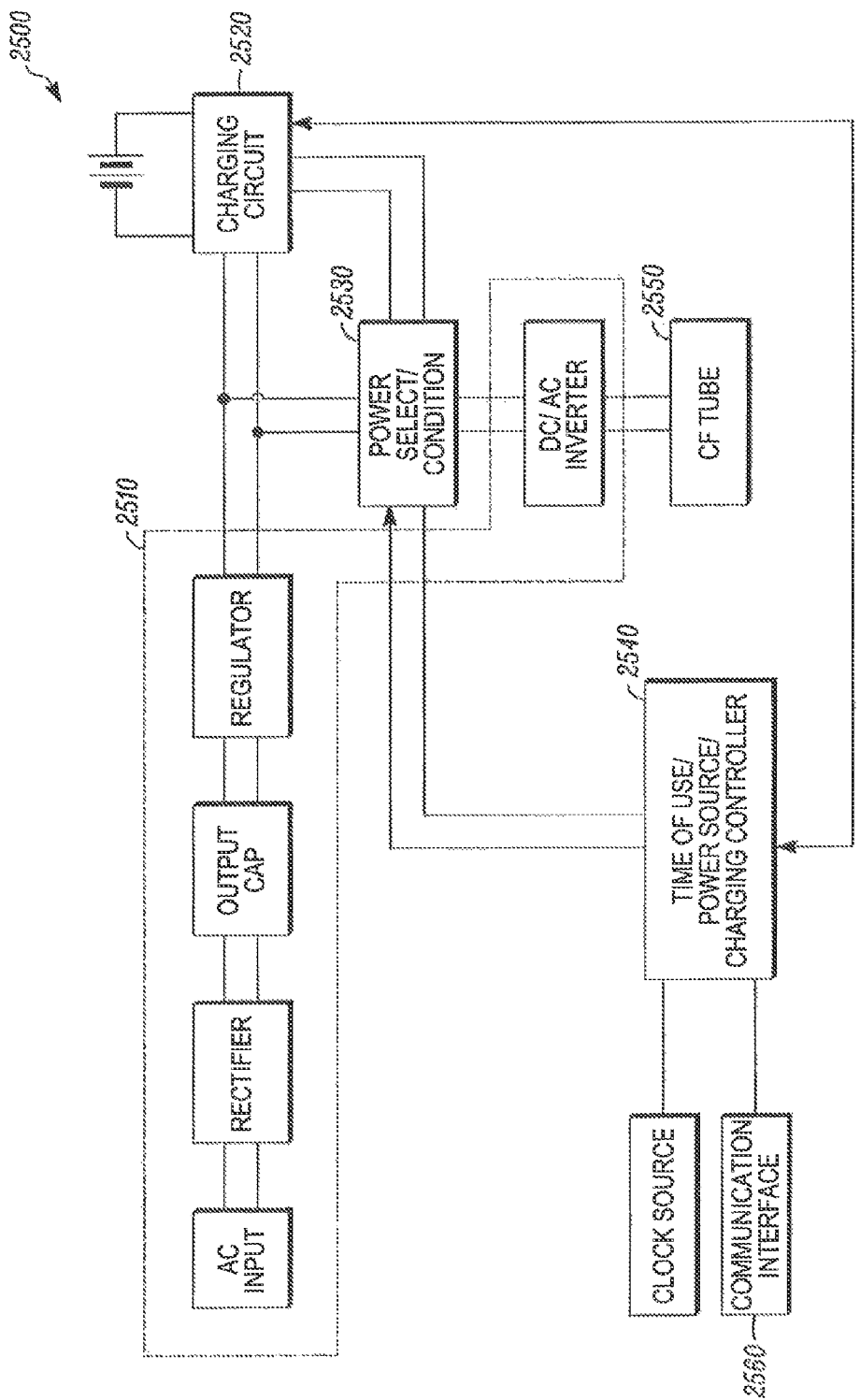
FIG. 25 shows a block diagram of an example system that uses an electronic ballast and embedded battery power in a compact fluorescent lamp with an intelligent, programmable controller.

In an illustrative embodiment shown in FIG. 25, the block diagram shows an example system that uses an electronic ballast and embedded battery power in a compact fluorescent lamp with an intelligent, programmable controller. In the illustrated embodiment, the AC powered battery embedded CFL wireless light bulb 2500 may include an electronic ballast 2510, a charging circuit with rechargeable batteries 2520, power selection and conditioning circuitry 2530, an intelligent, programmable time of use and power source/charging controller 2540, a fluorescent tube 2550, a communication interface 2560, and the like. The functionality is very similar to the AC powered battery embedded wireless light bulb system 2300, however in this case, a charging circuit with rechargeable batteries 2520 is connected prior to the DC/AC inverter in the electronic ballast. The power selection and conditioning circuitry 2530 may be used by the an intelligent, programmable time of use and power source/charging controller 2540 to select the power source for the fluorescent tube 2550 or to supply no power to the fluorescent tube 2550 to turn it off. It is to be appreciated that the intelligent functions described AC powered battery embedded wireless light bulb system 2300 for the intelligent, programmable time of use and power source/charging controller 2540 and that may be done over the communication interface 2560 are applicable to the AC powered battery embedded CFL wireless light bulb 2500. In one embodiment, the AC powered battery embedded CFL wireless light bulb 2500 may be designed to operate similar to or the same as a UPS wireless light bulb. In an alternate embodiment, the CFL wireless light bulb is only AC powered and has no embedded power source. In such a case, the AC powered CFL wireless light bulb may contain wireless control and/or wireless power as well as be able to implement any of the intelligent functionality as mentioned herein for any wireless light bulb product such as a motion wireless light bulb, a RF controlled wireless light bulb with a transceiver and the capability to form a mesh network, a programmable wireless light bulb etc. In an alternate embodiment, the AC powered battery embedded CFL wireless light bulb 2500 may not have an AC input and runs off of power supplied by an embedded rechargeable or non-rechargeable battery and with a DC/AC inverter to convert to AC power to create the proper AC output power for the fluorescent tube. In an alternate embodiment, the AC powered battery embedded CFL wireless light bulb 2500 may contain a grid tie inverter. In such a case where the AC powered battery embedded CFL wireless light bulb 2500 contains a grid tie inverter, it is to be appreciated that the intelligent functions described grid tied AC powered battery embedded wireless light bulb system 2400 for the intelligent, programmable time of use and power source/charging controller 2540 and that may be done over the communication interface 2560 along with the functionality gained by having the grid tie inverter in the bulb are applicable to the AC powered battery embedded CFL wireless light bulb 2500.

It is to be appreciated that the AC powered battery embedded CFL wireless light bulb 2500 may be designed in any size or shape housing to meet the requirements of any standard size bulb (e.g. PAR30, PAR38, A19, R30, MR16 etc), non-standard size bulb, fixture, compact fluorescent bulb, fluorescent bulb or lamp (e.g. T4, T5, T8, circular etc.) or down light assembly (e.g. recessed fixtures, fluorescent fixtures or down light fixtures for residential, commercial or industrial lighting), or the like.

Figure 26:
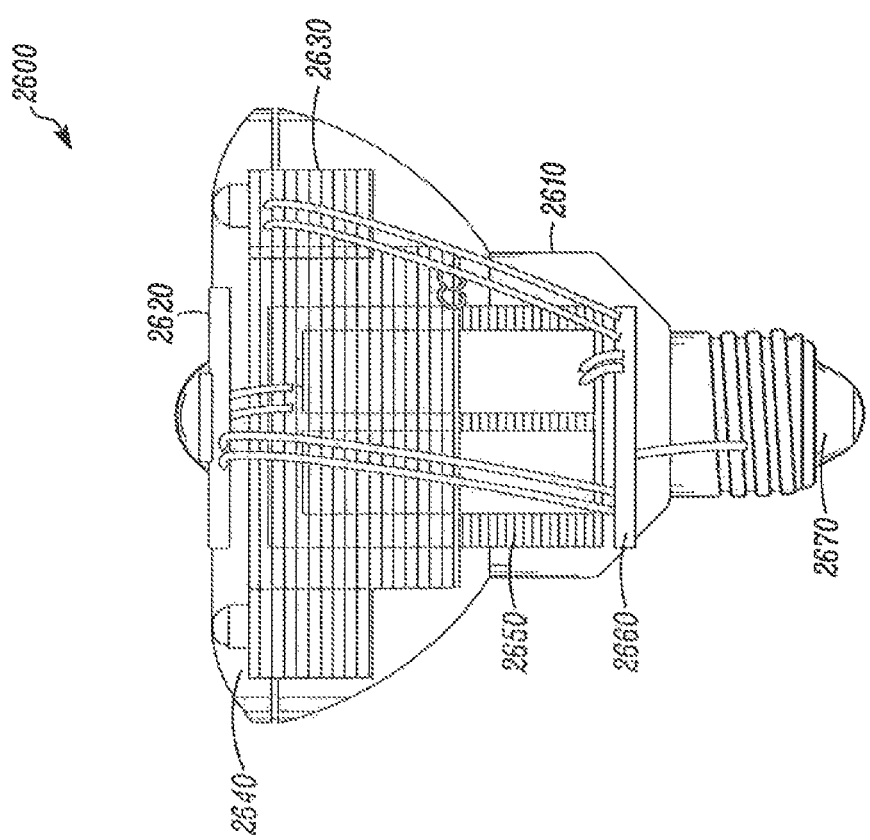
FIG. 26 shows a perspective view of an embodiment of an AC powered battery embedded PAR30 wireless light bulb.

In another illustrative embodiment, an AC powered battery embedded PAR30 wireless light bulb may be AC powered and may contain rechargeable batteries to power the wireless control and light source. With reference to FIG. 26, illustrated is a perspective view of an embodiment of an AC powered battery embedded PAR30 wireless light bulb 2600. In the illustrated embodiment, the AC powered battery embedded PAR30 wireless light bulb 2600 may include a housing 2610, a wireless control module 2620, a thermal heat sink 2630, a plurality of LEDs 2640, a battery holder 2650, an AC/DC converter and power management circuitry 2660, a socket connector 2670, and the like. The size of the embedded battery may be set to match the anticipated power consumption based on the application. The illustrated embodiment is an example of an AC powered battery embedded wireless light bulb system 2300 as described herein. The housing 2610 shown may be a standard PAR30 housing. In an alternate embodiment, the housing may be a custom housing that is larger than the PAR30 housing to accommodate a larger a battery holder 2650 and significantly more battery capacity but still may plug via a socket connector 2670 into any fixture that can accommodate the size of the housing. By way of an example, the housing may be designed to fit into a six inch recessed fixture to use the entire volume of the fixture such that the most battery capacity possible can be used in the application. It is to be appreciated that the disclosed functionality may be designed in any size or shape housing mentioned herein. A wireless control module 2620 may be present. The wireless control module 2620 may be an electrical circuit that contains any type of sensor mentioned herein, an RF/IR receiver or transceiver and/of intelligence to change the state of the AC powered battery embedded PAR30 wireless light bulb 2600. In one example, the wireless control module 2620 may contain a motion sensor and a light sensor and control the light source based on the state of the motion sensor and light sensor. In another example, the wireless control module 2620 may contain an RF receiver and a microcontroller to receive commands from an external entity like a computer, remote control, building management unit, lighting circuit control unit etc. and control the light source based on the commands received. In another example, the wireless control module 2620 may contain an acoustic sensor that controls the light source based on any sound detected.

In the illustrated embodiment, the wireless control module 2620 is shown above the thermal heat sink 2630. In the embodiment, the wireless control module 2620 may be an electrical circuit on a printed circuit board mounted to the thermal heat sink 2630 with screws, nails, fixing posts, flanged heads of fasteners, and other known mounting devices. The wireless control module 2620 may be mounted to a cover that is mounted to the heat sink. In the illustrated embodiment, the cover may be constructed of plastic. Alternately, the cover may be constructed of metal or any other known material. The advantage to mounting the wireless control module 2620 above the heat sink is that the position allows the sensor or antennas of an RF transceiver to be exposed above the heat sink. The AC powered battery embedded PAR30 wireless light bulb 2600 may contain a method to shield or insulate the wireless control module 2620 from heat from the thermal heat sink 2630. The wireless control module 2620 may have diminished performance or reduced usable life when used at a higher operating temperature. For example, in the example where the AC powered battery embedded PAR30 wireless light bulb 2600 contains a motion sensor and a light sensor, the passive infrared (PIR) sensor that can detect motion may have diminished performance if operated at a higher temperature. The heat shield or insulator may be mounted to the heat sink or plastic cover such that it is situated between the wireless control module 2620 and thermal heat sink 2630. The heat shield or insulator may be constructed of ceramic, fiberglass or any other known material. In an alternate example, the wireless control module 2620 may be mounted to the cover with some space left between wireless control module 2620 and the thermal heat sink 2630. The cover may also have some ventilation holes or other methods to allow the heat to escape and keep the temperature of the wireless control module 2620 and the heat sink as low as possible. The wireless control module 2620 may also be mounted below the heat sink and in such a case the sensor or antennas may need to be separated from the printed circuit board and with some components above the heat sink and some wiring through or around the heat sink to those components. There may also be a heat shield or insulator through the heat sink and above the heat sink to shield or insulate the components above the heat sink and the wiring to the components. By way of an example, a passive infrared (PIR) sensor may need to be located on the face of the AC powered battery embedded PAR30 wireless light bulb 2600 however the accompanying circuitry to amplify the output of the PIR sensor and detect threshold crossing may be done by circuitry on a printed circuit board below the heat sink. In this case, the leads or wires to the PIR sensor may be shielded or insulated through the heat sink and the PIR sensor itself may also be shielded or insulated from heat by a heat shield or insulator as mentioned herein to keep the operating temperature of the PIR sensor as low as possible such that there is no diminished performance because of higher temperature. It is to be appreciated that the wireless control module 2620 can be mounted in any location within the AC powered battery embedded PAR30 wireless light bulb 2600. In alternate embodiments where there is a power source embedded in the AC powered battery embedded PAR30 wireless light bulb 2600, such as in a UPS light bulb or grid shifting light bulb, the bulb may contain a method to shield or insulate the battery holder 2650 from heat from the thermal heat sink 2630 and/or from the AC/DC converter and power management circuitry 2660. Power sources, for example rechargeable or non-rechargeable batteries, may have diminished performance or reduced usable life when used at a higher operating temperature. In the example where the AC powered battery embedded PAR30 wireless light bulb 2600 contains one or more Li-Ion rechargeable batteries, the L-Ion batteries will have diminished performance over time if operated or stored at a higher temperature. For example, Li-Ion batteries will irreversibly lose capacity over time and the loss in capacity will happen at a faster rate when operated or stored at a higher temperature. Heat shields or insulators may be mounted to the heat sink or plastic cover such that it is situated between the battery holder 2650 and thermal heat sink 2630 and/or may be mounted between the battery holder 2650 and AC/DC converter and power management circuitry 2660. The battery holder 2650 may be isolated from the heat sources in this manner. By way of an example, the batteries may be located between the thermal heatsink and the AC power circuitry with a thermal shield or insulator above and below such that the batteries are isolated from both sources of heat. In some embodiments there may be ventilation or some other means to allow the heat to be released from this thermally isolated area. The heat shield or insulator may be constructed of ceramic, fiberglass or any other known material. In some embodiments, a heat sink may be attached to the battery to remove heat from the battery. In some embodiments, a thermistor or other temperature measurement device may be attached to the battery or near the battery to detect the temperature level of the battery and adjust the operation of the device to lower the temperature level of the battery.

In the illustrated embodiment, the AC/DC converter and power management circuitry 2660 may contain an AC/DC converter, a charging circuit with rechargeable batteries and power selection and conditioning circuitry implementing functionality as described for the AC powered battery embedded wireless light bulb system 2300. In an alternate embodiment, the AC powered battery embedded PAR30 wireless light bulb 2600 may also contain a grid tie inverter and implement functionality as described for the grid tied AC powered battery embedded wireless light bulb system 2400.

Figure 27:
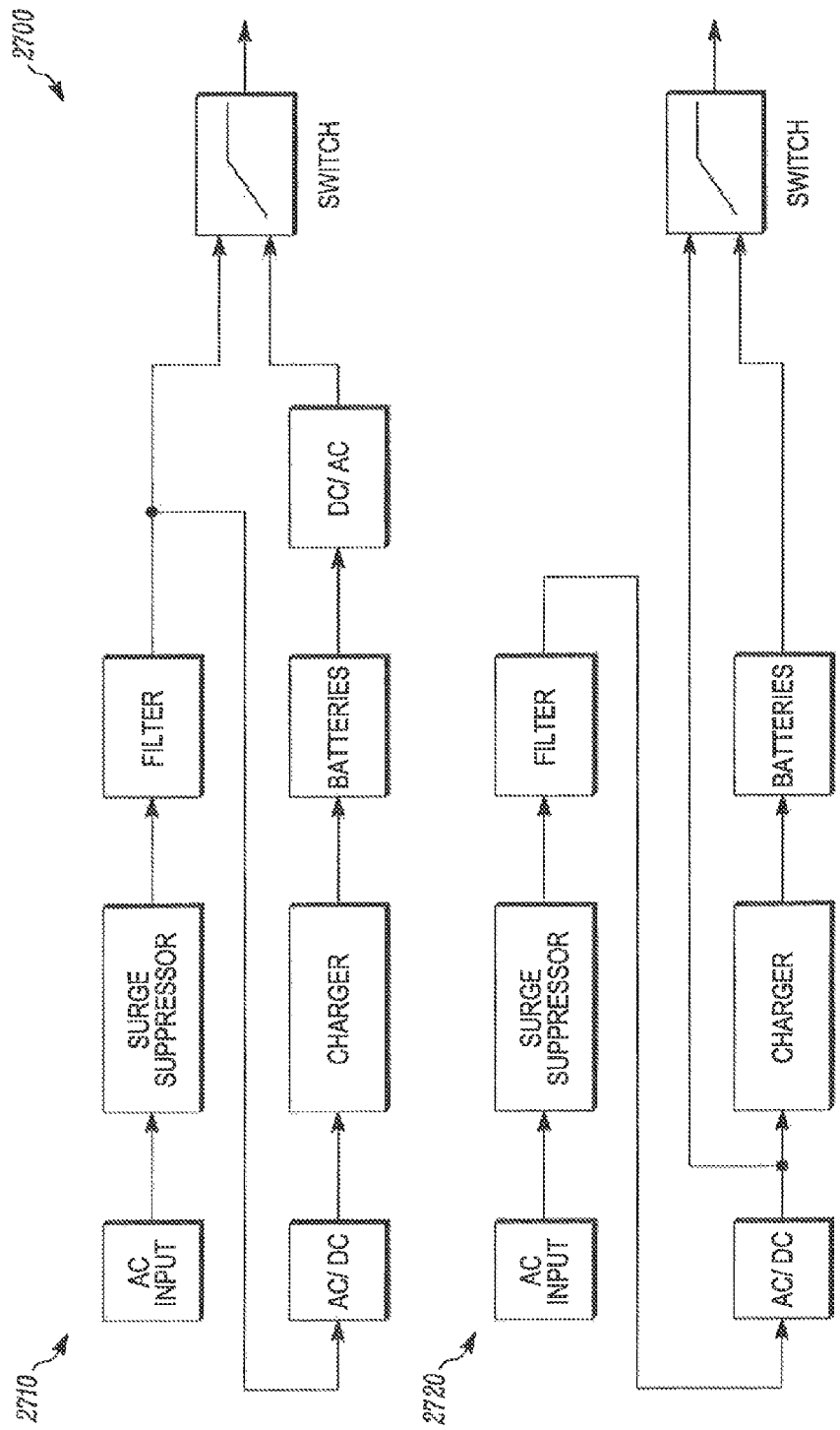
FIG. 27 shows a block diagram of example architectures for an on line wireless light bulb.

In alternate embodiments, an AC powered battery embedded wireless light bulb system may be implemented such that the primary power source is the embedded battery and the AC input is the secondary power source. Under normal conditions, the embedded battery may always be providing power for the wireless light bulb through a DC/AC inverter and the AC input is used to charge the embedded batteries continuously. In some embodiments the wireless light bulb may include electrical circuitry, a relay, an optoisolator etc. to allow the AC input to be switched in to be used as the power source. With reference to FIG. 27, the block diagram shows an embodiment of an on line wireless light bulb 2700 architecture where the battery may be selected at the primary source and the AC input path may be selected as the power source (on line wireless light bulb AC switched 2710). In an alternate embodiment, DC power may be present at the switch. In this embodiment, there may be no DC/AC inverter after the battery and where there may be an AC/DC converter in the AC input path after the filter (on line wireless light bulb DC switched 2720). In another embodiment, there may be a grid tie inverter at the output of the battery to allow stored energy to be returned to the line.

In embodiments of the AC powered battery embedded wireless light bulb system, there may be a step up DC/DC converter after the one or more battery to step up the voltage such that the output of the one or more batteries may drive one or more chains of LEDs that may have a higher voltage drop requirement than the one or more batteries may provide. In alternate embodiments, there may be a circuit present to provide a constant current supply for the one or more chains of LEDs. In some embodiments, the AC powered battery embedded wireless light bulb may contain circuitry to allow for the shutdown of power from the AC source, the shutdown of charging, the shutdown of drive to the LEDs and/or the control of the current supplied through the LEDs to set light intensity (pulse width modulation, adjustable resistor value etc.). It is to be appreciated that any combination of controls may be implemented. By way of an example, power supplied from the input AC source may be shutdown, but the drive to the LEDs from the battery may be enabled and the current through the LEDs may be adjusted to an intensity level as required by the application. It is to be appreciated that any architecture mentioned here in for an AC powered battery embedded wireless light bulb may contain a DC/DC converter to step up the voltage to the proper level to drive a chain of LEDs. By way of an example, a 6" recessed fixture AC powered battery embedded wireless light bulb retrofit may contain batteries and a DC/DC converter to step up the voltage to drive the one or more LED chains. In another example, a fluorescent tube AC powered battery embedded wireless light bulb may contain batteries and a DC/DC converter to step up the voltage to drive the LEDs. In another example, an External Power Supply with Battery LED recessed fixture may be designed with a DC/DC converter to step up the voltage to drive the required voltage to the recessed fixture. In another example, a DC powered wireless light bulb such as an MR16 with a 12 VDC input, may contain one or more embedded batteries and also contain a DC/DC converter to step up the voltage to drive a chain of LEDs. In embodiments of the an external light socket adapter, AC outlet adapter, an AC outlet replacement, an AC powered device, an AC circuit with embedded battery device designed with batteries embedded, wall switch or lighting control component and the like containing embedded batteries, the device may contain a DC/DC converter to step up the DC voltage to a level required to output a higher DC voltage at its output or to improve the efficiency of the DC/AC inverter at the output.

In an alternate embodiment of a wireless light bulb powered from only AC power or powered only by battery power, the wireless light bulb may contain intelligence to control the light source based on time of day and may contain a communication interface to communicate with an external device. In this case, the intelligence may be programmed to set the times of day that the AC powered or battery powered wireless light bulb is on or off and what the intensity of the light output is. By way of an example, an AC powered wireless light bulb with a microcontroller containing a real time clock may be programmed to set the intensity of the light output to fifty percent of maximum light intensity during daylight hours when there is some ambient light and to set the intensity of the light output to maximum light output during evening hours when there is little ambient light. This will provide some cost savings in energy usage when lighting needs to be on most or all of the day. It is to be appreciated that there may be any number of changes in the light output and the light intensity may be set to any level from off to maximum light intensity of the wireless light bulb. The communication interface may be any communication interface mentioned herein. The external device communicating with and controlling or programming the wireless light bulb may be a computer running a software program, a custom remote control, a building management unit, a lighting circuit control unit etc. and may have the communication interface allowing it to communicate with the wireless light bulb. In the example that is only powered by battery power, the intelligence may also use battery capacity level to set the light intensity output. In such an example, battery power may be rechargeable or non-rechargeable batteries or fuel cells. It is to be appreciated that any wireless power source or any combination of wireless power sources may be used to supply power to or recharge energy storage in the wireless light bulb in connection with the battery powered wireless light bulb controlled based on time of day.

In wireless light bulb embodiments containing an AC power source and an embedded battery power source, there may need to be a mechanism in place to communicate to the wireless light bulb when to use AC power and when to use embedded power. By way of an example, the UPS wireless light bulb may operate off of AC power. When AC power is turned off, whether intentionally by a user turning the light switch off or unintentional when there is a power outage etc., the UPS wireless light bulb may automatically switch over to battery power. In an alternate use case, the user may desire that at times the UPS wireless light bulb does not automatically switch over to battery power but rather that the on/off wall switch operates the light and that there be a method to select that the UPS wireless light bulb is enabled to operate in a mode that automatically switch over to battery power. In this alternate case, a slide switch on the UPS wireless light bulb that enables or disables automatic switch over may accommodate this function however it may be inconvenient for a user to change the slide switch position (because of the installation location for example in a recessed fixture in the ceiling). An alternate method to enable or disable automatic switch over to battery is by including an RF receiver in the UPS wireless light bulb such that a command enabling or disabling the automatic switch over can be sent via RF to the UPS bulb. Another alternate method to enable or disable automatic switch over to battery is to create a mechanism such that the wireless light bulb detects a sequencing of the power applied to it. By way of an example, if the on/off wall switch is turned on, then off in less than one second, the automatic switch over to battery function is enabled the next time the wireless light bulb is turned on. If the on/off wall switch is turned on, then off in less than one second, then on in less than one second or if the unit is turned on then left on for greater than one second the automatic switch over to battery function is disabled and control of the wireless light bulb is by the on/off wall switch. In such a case, battery power may be used to power the wireless light bulb during the power sequencing or a large capacitor is charged enough that an electrical circuit is powered and can latch the state of the on-off power sequencing such that it may change the mode of the bulb appropriately even in the absence of AC power or if the embedded battery power is discharged and is not usable. It is to be appreciated that any number of power cycles may be done to put the wireless light bulb in any number of modes it may operate in and any type of wireless power source or sources in the wireless light bulb may be controlled. The on/off wall switch may contain circuitry and an alternate way to select the mode such that the power sequencing is transparent to the user. For example, there may be a slide switch on an on/off wall switch that selects the mode. When the user turns the on/off wall switch on, the electrical circuit inside the on/off wall switch sequences the power appropriately to set the mode of operation. In an alternate embodiment, there may be a real time clock and intelligence inside the UPS light bulb such that it may be programmed to use one mode of operation during certain times of the day and another mode of operation during other times of the day. By way of an example, the user may program the UPS light bulb to be in UPS mode during the day when the user knows the light needs to be on even in a power outage, however it may change modes to switch control or automatically shut off and enter switch control mode during times of the day when the user knows the lights should be off.

In wireless light bulb embodiments containing an AC power source and a sensor or RF/IR control, there may need to be a mechanism in place to communicate to the wireless light bulb when to use the sensor or RF/IF control the wireless light bulb and when to use the on/off wall switch to control the wireless light bulb. By way of an example, the AC powered wireless light bulb may have a motion sensor that may turn the bulb on when motion is detected. In an alternate use case, the user may desire that at times the AC powered wireless light bulb does not automatically turn on when motion is detected but rather that the on/off wall switch operates the light and that there is a method that the AC powered wireless light bulb may be enabled to operate in a mode that uses the motion sensor to control the light. In this alternate case, a slide switch on the AC powered wireless light bulb that enables or disables motion detection control (and that when the bulb is turned on it is always on) may accommodate this function however it may be inconvenient for a user to change the slide switch position (because of the installation location for example in a recessed fixture in the ceiling). An alternate method to enable or disable motion detection control is by including an RF receiver in the AC powered wireless light bulb such that a command enabling or disabling the motion detection may be sent via RF to the AC powered wireless light bulb. Another alternate method to enable or disable motion detection control is to create a mechanism such that the wireless light bulb detects a sequencing of the power applied to it. By way of an example, if the on/off wall switch is turned on, then off in less than one second, then on in less than one second motion detection is enabled. If the unit is turned on and left on for greater than one second, the control of the wireless light bulb is by the on/off wall switch (i.e. it remains on whether there is motion or not and is turned of by the on/off wall switch). When the unit is turned off and left off for a period of time, the next time the on/off wall switch is used, it can again set the mode of the wireless light bulb. In such a case, it may be required that a small amount of power storage exists in the wireless light bulb, for example small battery is present or a large capacitor is charged enough that an electrical circuit is powered and can latch the state of the on-off power sequencing such that it may change the mode of the bulb appropriately even in the absence of AC power briefly. It is to be appreciated that any number of power cycles may be done to put the wireless light bulb in any number of modes it may operate in and any type of sensor or sensors in the wireless light bulb may be controlled. The on/off wall switch may contain circuitry and an alternate way to select the mode such that the power sequencing is transparent to the user. For example, there may be a slide switch on an on/off wall switch that enables or disables motion detection. When the user turns the on/off wall switch on, the electrical circuit inside the on/off wall switch sequences the power appropriately to set the mode of operation. In an alternate embodiment, there may be a real time clock and intelligence inside the wireless light bulb such that it may be programmed to use one mode of operation during certain times of the day and the other mode of operation during other times of the day. By way of an example, the user may program an AC powered motion sensor wireless light bulb to be controlled by a motion sensor during the evening hours when the user knows there is typically low occupancy, however it may change modes to wall switch control during times of the day when the user knows the lights should always be on due to typically high occupancy. In another example, the AC powered motion sensor wireless light bulb may have an embedded battery such that the user may also be able to select the power source based on time of day.

In wireless light bulb embodiments containing an AC power source, an embedded battery power source and/or other wireless power sources, there may be many reasons to switch from one power source to another or to have power sources share the load. The reasons to switch from one power source to another or to have power sources share the load may be sensor or RF/IR controlled, controlled by intelligent decision and/or controlled by power management functions. In the case of sensor or RF/IR control, the switch over may be based on motion detection, light detection, power consumption measurements or any other sensor parameter that may necessitate a switch to a different power source. For example, an AC powered battery embedded wireless light bulb may have a glow or low light function that is powered by battery, but when motion is detected, the bulb turns on to full brightness and is powered by AC power. In the case of control by intelligent decision, intelligence in the wireless light bulb (microcontroller, microprocessor, integrated circuit etc.) may control the bulb based on time of day or timers, knowledge gained over time based on monitoring of sensors, a user program based on a knowledge of the use patterns required for a particular wireless light bulb, an individual profile based on an identification from the area (detect an RFID personnel tag on an individual for example) etc. For example, an AC powered battery embedded wireless light bulb may have a motion sensor in it and a real time clock. Over a number of days a microprocessor may build a profile of occupancy based on motion detections recorded at particular times of the day that it may plug into an algorithm to automatically set the light intensity to a very low level running off of battery power when it is apparent that there should be no motion detected or it may anticipate when it should detect motion and switch to AC power and turn on to full intensity prior to that time (for example first thing in the morning at an office a few minutes prior to when the first employee is expected to show up based on the profile of occupancy built by the microprocessor). In the case of switch over controlled by power management functions, the control of power source to use may be due to low battery capacity, AC not being present or not being usable, whether a wireless power source is present and is usable (solar cells collecting enough energy to share the load), depth of discharge thresholds to manage the life cycle of rechargeable batteries, the sharing of the load by power sources to optimize energy use for cost savings or conservation purposes etc. By way of an example, solar cells in a wireless light bulb may generate enough power to share the load at any time. If the wireless light bulb monitors the solar power source and determines that it is an appropriate power source to use based on the power consumption requirements, it may use the solar power source exclusively or may share the load between multiple power sources including the solar power source.

In wireless light bulb embodiments containing an AC power source, an embedded battery power source and/or other wireless power sources, there are a number of methods by which the load is shared by the sources (i.e. some amount of power required by the load is supplied by more than one source). It has been mentioned that the sources may be diode ored prior to the load as one method of placing power sources in parallel. Other methods of paralleling power sources to source power to the load may include circuits with diodes, FETs, transistors, op amps, power converters and the like. Once the power sources are paralleled such they may independently supply power to the load, there may also be control to determine the amount of power each source may deliver. By way of an example, there may be two power sources for a light source (chain of LEDs etc.)—an AC power source and an embedded battery power source. The output of the AC power source and the embedded battery power source are diode ored prior to the light source such that they may both supply power to the light source. The output of the embedded battery power source may be followed by a constant current source circuit that may be adjusted to any current level required from zero percent of the power supplied to the light source to one hundred percent of the power supplied to the light source. There may be circuitry to measure the amount of current flowing through the LEDs and there may be circuitry to measure the amount of current flowing through the constant current at the output of the embedded battery source. If the application requires that fifty percent of the load is delivered by the embedded battery source, the constant current supplied by the embedded battery source may be adjusted until the amount of current supplied is fifty percent of the measurement of current flowing through the chain of LEDs. By way of an example, a microcontroller with the ability to take an analog to digital measurement at the constant current circuit at the output of the embedded battery source and at some point in the chain of LEDs, then adjust the amount of current at the constant current circuit (by setting the value of a digital potentiometer or the like) until the desired ratio of load sharing is achieved. In an alternate embodiment, the output of the embedded battery source is connected to an LED driver circuit that may drive a chain of LEDs and also has the capability of control by pulse width modulation that controls the percentage of current supplied from the embedded battery source. In alternate embodiments, the amount of power supplied by the AC power source is controlled. The AC power source may have a constant current circuit at the output, may be a constant current source by design and have the ability to adjust the amount of current supplied by pulse width modulation and the like. The embedded battery power source would supply the remainder of the power to the load. It is to be appreciated that any number of power sources may be used in connection to the claimed subject matter.

Figure 28:
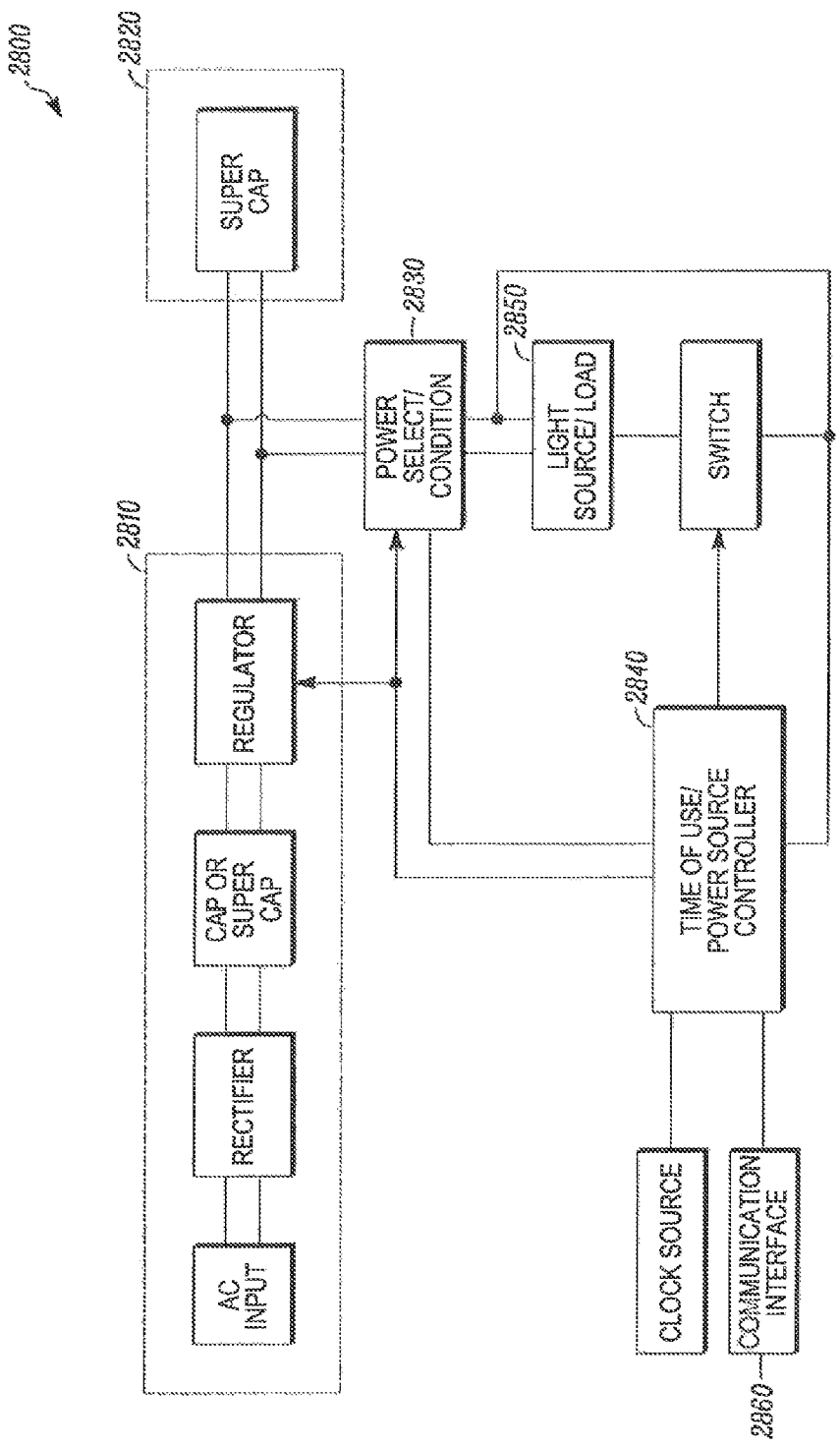
FIG. 28 shows a block diagram showing an example AC powered super capacitor embedded wireless light bulb system.

In an illustrative embodiment shown in FIG. 28, the block diagram shows an example AC powered super capacitor embedded wireless light bulb system 2800 that may use an AC power input and a super or ultra capacitor power source with an intelligent, programmable controller to provide cost savings, security and convenience benefits to a lighting installation. In the illustrated embodiment, the AC powered super capacitor embedded wireless light bulb system 2800 may include an AC/DC converter 2810, one or more super or ultra capacitors 2820, power selection and conditioning circuitry 2830, an intelligent, programmable time of use and power source controller 2840, a light source or load 2850, a communication interface 2860, and the like. The AC input may be connected to the AC powered super capacitor embedded wireless light bulb system 2800 by a light socket, wall outlet, terminal block, connector, hardwired connection or any common connection that a device requiring AC power may have to provide an AC power input. The AC input block may contain a transformer, line cap, fuse, inrush limiter or other type of power circuitry commonly found at the input of an AC/DC converter or an AC powered device. By way of an example, an inrush limiter may be used to guarantee that the inrush current does not exceed a certain threshold especially with a large capacitance potentially charging when AC power is first applied. The output of the AC/DC converter 2810 may be a regulated DC source such as a DC/DC converter circuit. It may be a constant current source to the load for example to provide constant current to a chain of LEDs in series. In some embodiments there may be multiple circuits at the output of the AC/DC converter such that one circuit may provide a power source for low current draw circuitry such as for an intelligent, programmable time of use and power source controller 2840 communication interface 2860, and the like, and where a second circuit may provide a power source for high current draw circuitry such as the light source or load 2850. It is to be appreciated that any number power sources may be created at the output of the AC/DC converter to meet the needs of the application.

The output of the AC/DC converter may be connected to one or more super or ultra capacitors 2820. The large capacitance at the output of the regulator may provide power to the light source or load 2850 in the absence of AC input power. The larger that the capacitance in the capacitor or bank of capacitors, the longer that the capacitance at the output of the regulator may power the circuit. It is to be appreciated that the one or more super or ultra capacitors 2820 may be in series, parallel or any combination as required by the application. The one or more super or ultra capacitor 2820 may charge when AC input is available. The power source controller may control the regulator to disable it such that even if the AC input is available, the circuitry will be powered by one or more super or ultra capacitor 2820. The power source may pulse width modulate the control of the regulator to accomplish any amount of load sharing between the AC input and the one or more super or ultra capacitor 2820. In an alternate embodiment, the one or more super or ultra capacitors may be in the AC/DC controller prior to the regulator and there may or may not be one or more super or ultra capacitors 2820 after the regulator. In this case, the capacitance in the AC/DC controller may provide the filtering for the output of the rectifier circuit but will also be able to provide a power source to the circuit in the absence of AC input power for some period of time. In alternate embodiments, there may also be a rechargeable battery and charging circuit after the regulator in addition to the one or more super or ultra capacitors 2820. The combination of a rechargeable battery and large capacitance as a rechargeable power source may allow the design to contain the positive aspects of both approaches. The capacitive energy storage will charge and be available quickly whereas rechargeable batteries will provide a lot of storage for a low cost.

In some RF or IR transmitter embodiments, the RF or IR transmitter may rely on energy harvesting techniques to power or charge the device. For example, a transmitter in a housing that can mount to a wall may contain one or more solar cells, a large capacitor, a microcontroller, an RF transmitter, and the like. The microcontroller and RF transmitter may typically be in a low current sleep mode. The solar cells and capacitor may be sized to provide enough energy storage and recharge capability such that the switches on the RF transmitter may be pressed several times sending commands to a wireless light bulb or battery powered wireless light fixture before the capacitor cannot supply enough energy to transmit the command. Under normal usage, the solar cells and capacitor may contain enough power and recharge capability such that there may not be an instance that the button would be pushed and not transmit a command. In an alternate embodiment, instead of a solar cell, a piezoelectric device may be designed on a handheld transmitter such that energy is harvested from the motion of the device. In this case, when the user waves the piezoelectric powered device in the direction of the light with a button pressed, the device may transmit a command to turn the light on or off. In another example, perhaps a button does not need to be pushed and that the waving of the device may transmit a toggle command when enough energy is harvested from the motion to toggle the state of the light. It is to be appreciated that any form of energy harvesting may be used in conjunction with the RF or IR transmitter concepts mentioned herein.

In another RF or IR transmitter embodiment, a wireless light bulb or battery powered wireless lighting fixture may be controlled by a remote light sensor with an RF transmitter. The measured light level may be periodically transmitted to one or more wireless light bulbs or battery powered wireless lighting fixtures. The wireless light bulb or battery powered wireless lighting fixture may contain an RF receiver and an intelligent device such as a microcontroller that may allow the measured light level to be interpreted and such interpretation may lead to a state change. By way of an example, a wireless light bulb or battery powered wireless light fixture may be installed in a hallway that receives some ambient light from windows or other lights in the area. The desired light level may be programmed into the wireless light bulb or battery powered wireless lighting fixture. The remote light sensor may be placed on the floor or wall of the hallway below the light that is to be controlled. Every five seconds, the light sensor with an RF transmitter may transmit the measured light level to the wireless light bulb or battery powered wireless lighting fixture. When received, the light intensity may be left unchanged, adjusted up or adjusted down automatically to set the light intensity to be at a preprogrammed level or range. In an alternate embodiment, the remote light sensor is a handheld device that a user may use to set the light intensity level for the daylight harvesting function where the light intensity is set based on the ambient light level detected such that the ambient light plus the light generated by the light source maintain a constant light level. In this embodiment, the user may walk into a room with the remote light sensor handheld device and press a button to take a reading. The remote light sensor handheld device may have a transmitter such that it may transmit the reading to the wireless light bulb battery powered wireless lighting fixture. The wireless light bulb or battery powered wireless lighting fixture may be programmed by the transmission or it may use the detected light level information to set its light intensity level appropriately. Alternately, the user may use an alternate method to enter the detected lux reading into the wireless light bulb or battery powered wireless lighting fixtures. For example, the user may open a graphical user interface with a software application that would allow the user to enter the settings for the daylight harvesting functions as well as the detected light levels. There may be net light values based on time of day or any other input to the unit that user may desire a different net light value. In another example, the user may manually adjust the constant light level using a control, such as a dial, on the RF transmitter, on the wireless, light bulb or on the battery powered wireless lighting fixtures based on the reading. In alternate embodiments, the remote light sensor with an RF transmitter device may have multiple light sensors pointing in different directions out of the housing to allow the receiving bulbs or modules to change light intensity based on multiple light sensor readings. The housing of the remote light sensor with an RF transmitter device may be designed with the light sensors designed into the housing in a way that they are reading light intensity in different directions.

In some embodiments, there may be multiple remote light sensors and multiple wireless light bulbs or battery powered wireless lighting fixtures in the same area. By way of an example, in a conference room, multiple PAR38 wireless light bulbs may be installed in recessed fixtures. In this example, three remote light sensors are placed in the conference room on top of each end of and on top of the center of the conference room table. The multiple wireless light bulbs may receive the light intensity measurements and adjust the light intensity output as programmed. Unique IDs may be set in each of the wireless light bulbs such that all wireless light bulbs may receive all remote light sensor transmissions or the wireless light bulbs and remote light sensors may be grouped in areas by setting the unique IDs to create operational groups. In some embodiments, the user may have a separate remote controller that may allow programming the wireless light bulbs or battery powered wireless lighting fixture to respond in different ways to the remote light sensor input. The remote controller may have multiple scenes programmed in. In the conference room example, there may be a presentation scene where there are different light intensities in different parts of the room or there may be a meeting scene where the lights are set to high light intensity throughout the room. The remote controller may allow methods to create scenes and program the details (light intensity, timing, time of day response, groups of lights etc) into the wireless light bulbs. The remote controller may have a method to override the use of the remote light sensors and allow a user to directly control the light intensity of one or more wireless light bulbs or battery powered wireless lighting fixtures.

A daylight harvesting kit may be constructed consisting of an AC powered wireless light bulb with a receiver and a remote light sensor transmitter. There may be a control on the AC powered wireless light bulb or on the remote light sensor transmitter to set the net light level that a user desires or it may be programmed in some other manner over the communication interface. A user may install the wireless light bulb and place the remote light sensor transmitter in a location where the user wants a net light value to be maintained. The user then turns on the wireless light bulb and sets the net light value through the means of control provided. Thereafter the wireless light bulb may receive periodic transmissions from the remote light sensor transmitter and adjust its light intensity appropriately.

In some embodiments a wireless light bulb or wireless lighting module may be controlled by a light sensor designed into the unit. In such a case a daylight harvesting function may be implemented where the light intensity generated by the light source is set based on the ambient light level detected such that the ambient light plus the light generated by the light source maintain a constant light level. In some embodiments, the net amount of light may be set by a user either by programming the net light value into the wireless light bulb or wireless lighting module through a programming method over the communication interface or it may be set directly on the unit through a method of control such as a dial, push buttons, slide switches and the like where a user may set the net light they desire directly and thereafter the wireless light bulb or wireless lighting module will adjust the output light intensity to maintain the detected light level at the user setting. In alternate embodiments, there may be more than one net light setting where the selection of which light intensity setting to use is based on time of day, inputs from other forms of wireless control designed into the bulb, intelligent decisions made based on inputs to the wireless light bulb or wireless lighting module such as battery charge level and the like. In order to measure the amount of ambient light in the area, the wireless light bulb or wireless lighting module may turn off the light source or prior to the light source being turned on initially, read and analyze the ambient light measurement, then set the light intensity of the light source. In alternate embodiments, the wireless light bulb or wireless lighting module may change the light intensity slightly, find the delta of change of measured light, then adjust the light intensity. The wireless light bulb or wireless lighting module may make several readings and adjustments in this manner to set the light intensity to the configured light level. The wireless light bulb or wireless lighting module may store the net light setting in memory inside the unit such that when power is turned off the user setting is not lost. In the case where there is a dial, push buttons, switches and the like on the unit, the unit may read and analyze those inputs as needed to set the desired net light value. It is to be appreciated that the daylight harvesting function may be used in conjunction with any form of wireless control or any intelligent function mentioned herein. A daylight harvesting wireless light bulb or wireless lighting module housing may be designed to isolate the light sensor from the light sources such that the detected light level is not influenced significantly by the daylight harvesting wireless light bulb or wireless lighting module light source or sources. By way of an example, the housing may be designed such that the light sensor is recessed in the housing, is inside a plastic tube directed toward where the light is to be detected or is designed in any way necessary to obscure the light sensor from the bulb or module light source or sources. It is to be appreciated that the housing design may take any size or shape to isolate the light sensor from the light sources. In alternate embodiments, a daylight harvesting wireless light bulb or wireless lighting module may have multiple light sensors pointing in different directions out of the housing to allow the bulb or module to change light intensity or light direction in a way to generate light output in the desired manner. In some embodiments, the daylight harvesting wireless light bulb or wireless lighting module may have an RF transceiver such that several bulbs or modules in an area may transmit and receive the light sensor information to allow bulbs or modules to use light sensor information from other units to adjust their light output appropriately or to allow multiple bulbs or modules to work in a coordinated fashion to illuminate an area.

By way of an example, a wireless light bulb may contain a light sensor and a dial on the light sensor to set the net amount of light. The user may install the wireless light bulb, turn it on, then turn the dial on the bulb until the amount of light generated is what the user desires. Thereafter, whatever amount of ambient light that is detected, the bulb will automatically set the light intensity to provide the desired light output. In another example, a battery powered RF controlled LED spotlight contains a light sensor and a slide switch that allows multiple net light settings to be selected. The spotlight may then set the light output based on the desired net light value and the detected ambient light level. When the user turns on the spotlight via a remote control, the spotlight may then read and analyze the input from the light sensor, then set the light intensity of the output appropriately to meet the net light value. In another example, an AC powered battery embedded wireless light bulb designed to retrofit into a 6" fixture contains a light sensor. Intelligence in the unit may store energy in the rechargeable battery during off peak hours and use the battery to power the light source during on peak hours. If the unit implements a daylight harvesting function, battery life may be extended and the user may then continue to get the desired net light, thus the lighting installation may operate as necessary and there may be a cost savings through controls.

In another embodiment, a wireless light bulb or wireless lighting module may contain a light sensor and the ability to adjust the light output to compensate for the deterioration of LED performance over the life of the bulb. It is known that LED performance may deteriorate over time. The light sensor may be used to help ensure that the light output remains consistent, such as by increasing the drive current to the LEDs based on the detected light level. In an alternate embodiment, the wireless light bulb or wireless lighting module may contain only a timer or real time clock internally and may keep a record of the number of hours the wireless light bulb or wireless lighting module has been used. Based on the number of hours the LED light source has been illuminated, the wireless light bulb or wireless lighting module may contain the intelligence to increase the drive current to the LEDs based on an algorithm that predicts the rate of deterioration in the performance of the LEDs. In some embodiments, the user may have access to the stored information of number of hours of on time and drive level such that a user may determine the health or level of performance of the LEDs at any time. In an alternate embodiment, the wireless light bulb or wireless lighting module may contain a transmitter such that it may transmit the performance information to a processor to keep a record of the performance and/or for analysis.

In one embodiment, a wireless light bulb or wireless lighting module may contain an array of light sensors (CdS or photodiodes) sensitive to different bands of light wavelength such that it may be used to create a "spectrum analyzer" of light in the desired band. This may be designed into a wireless light bulb, wireless lighting module or it may be a separate unit with a transmitter that may detect the information of the spectrum and transmit the information to a wireless light bulb or wireless lighting module containing a receiver. The wireless light bulb or wireless lighting module may use the information to adjust the color of the output light to meet a specific light or wireless lighting module spectrum envelope. By way of an example, an array of eight CdS sensors occupying consecutive parts of the band of visible light from 2800K to 4400K, with the first sensor measuring lux from 2800K to 3000K, the second sensor measuring lux from 3000K to 3200K and so on. The measured spectrum of light may then be used to set the mix of red, green and blue LEDs to create the desired spectrum of light output. In some embodiments, this sensor may be used to provide the user with different light options, such as tungsten, natural light, candle light, fluorescent, and such, to match the user's preference, or to match the other lights in the vicinity.

Figure 29:
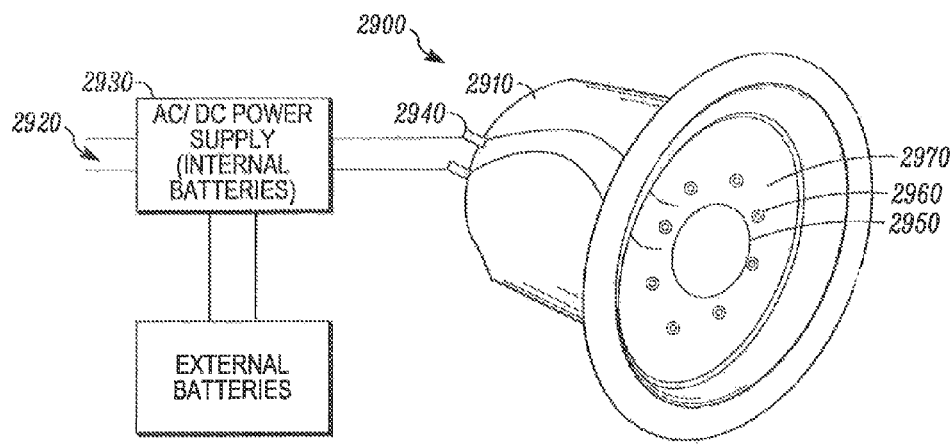
FIG. 29 shows a perspective view of the recessed fixture version of a wireless light bulb with an external power supply with battery.

In another illustrative embodiment, a version of the wireless light bulb is used in External Power Supply with Battery LED recessed fixture 2900 applications. With reference to FIG. 29, illustrated is a perspective view of an embodiment of an External Power Supply with Battery LED recessed fixture 2900. In the illustrated embodiment, the External Power Supply with Battery LED recessed fixture 2900 includes a housing 2910, an AC input 2920, an external power supply for AC/DC conversion and battery management functions 2930, a DC input 2940, a printed circuit for wireless control and LED drive circuitry 2950, a plurality of LEDs 2960 and a heatsink 2970. In this embodiment, the AC/DC power supply and batteries are external to the housing, electronics, thermal management and light source. The batteries may be rechargeable or non-rechargeable and may be internal to the housing of the AC/DC power supply. In alternate embodiments, the batteries may be external to the housing of the AC/DC power supply and are electrically connected to the power supply. In alternate embodiments, the AC/DC power supply and batteries may be external to the recessed fixture and may both be connected to the fixture. In such an embodiment, electronics for wireless control and LED drive circuitry 2950 may make an intelligent decision on which power source to use. It is noted that the External Power Supply with Battery LED recessed fixture 2900 may be designed in any size or shape housing 2910 to meet the requirements of any standard size bulb (PAR30, PAR38, A19, R30, MR16 etc), non-standard size bulb, fixture, fluorescent bulb or lamp (T4, T5, T8, circular etc.) or down light assembly (recessed fixtures, fluorescent fixtures or down light fixtures for residential or industrial lighting), or the like. It is noted that the external power supply may be designed in any size or shape to meet the requirements with typical characteristics of an AC input, DC output and in the case where external batteries are used a connection to those batteries. The external power supply may have intelligence built in to make a decision to use the AC input, internal or external batteries or both to power the External Power Supply with Battery LED recessed fixture 2900. In alternate embodiments, the external power supply may have a grid tie inverter and associated circuitry designed in such that it may return stored energy to the grid as described herein. In alternate embodiments, the external power supply is replaced by a ballast for fluorescent lighting applications. In such a case there may be rechargeable or non-rechargeable batteries internal to the housing of the ballast. In alternate embodiments, the batteries may be external to the housing of the ballast and are electrically connected to the ballast where the ballast contains the intelligence to select the power source. In an alternate embodiment, there is a controller separate from the ballast that works in conjunction with the ballast to control the lighting. In such a case there may be rechargeable or non-rechargeable internal to the housing of the controller. In alternate embodiments, the batteries may be external to the housing of the controller and are electrically connected to the controller. In such an embodiment, the controller may contain wireless control or an intelligent device in the form of a microcontroller, microprocessor, integrated circuit etc to make an intelligent decision on storing power in the batteries and which power source to use.

In some wireless light bulb or battery powered wireless lighting fixture embodiments, there may be an LED on the bulb or fixture that the battery capacity is below a threshold (battery low indication) or that there may be a fault condition in the bulb or fixture. An LED may be a colored LED and it may display status in by being on solid or blinking in some manner that may provide an indication of the nature of the fault condition. An LED may provide a positive indication also. By way of an example, a green LED may be on a bulb or fixture to indicate that the battery level is good. A multicolored LED may be used to provide multiple indications. By way of an example, when the LED is green, the battery level is good, when the LED is yellow the battery level is marginal and when the LED is red the battery level is too low. In alternate embodiments, there may be a transmitter on the wireless light bulb or battery powered wireless lighting fixture that may transmit an indication of the status of the bulb or fixture to a receiver that can process and make use of the indication. By way of an example, in a safety lighting system that contains battery embedded power, the bulb or fixture may transmit an indication of a low battery level to a central controller to allow the battery to be changed or guarantee that the battery may be recharged. A network of bulbs or fixtures may be used to forward the transmitted indications back to a central controller to process the information.

In some embodiments, a wireless light bulb may be connected an AC input that is triac dimmer controlled. In this case, the wireless light bulb may detect a zero crossing of the AC waveform, may be able to determine the amount of the waveform that has been shut off by the triac and may adjust a PWM dimming control to one or more LEDs such that the triac dimmer control that is in a wall switch or similar device may still control the intensity of the light output. In a triac dimmer control, the power delivered to the wireless light bulb may be enough to power the wireless light bulb even if a portion of the power delivered to the wireless light bulb is eliminated by the triac. By way of an example, the dimming function for the wireless light bulb may work down to a level where only twenty percent of the power is delivered to the wireless light bulb because the power after the diode bridge and prior to a regulator circuit may still be enough to provide power to the light source and circuitry in the wireless light bulb. In this example, the light intensity controlled by the PWM control of the one or more LEDs may set the light intensity to zero output when only twenty percent of the AC input waveform is detected by the wireless light bulb. From twenty percent to one hundred percent of the waveform, the dimming levels will be set in the PWM control to provide a full dimming range for the wireless light bulb. In alternate embodiments, there may be also an alternate power source available in the wireless light bulb such as batteries or a super capacitor that allows the AC input detection circuitry and intelligence in the wireless light bulb to operate even when the AC input is below a threshold that would power the wireless light bulb. In such a case, the wireless light bulb may use the AC input as long as it has determined that it is acceptable for use, but then switch over to the alternate power source when it is not acceptable to use. The alternate power source may be used to power the light source and control circuitry all of the time and the AC input with triac dimmer control may only used to allow the wireless light bulb to detect the waveform to set the PWM control of the LEDs to achieve the desired light intensity and to recharge the batteries. In some embodiments, the triac dimming control wall switch plate may be replaced by an RF transmitter wall switch plate with dimming controls that send dim up and dim down commands to one or more wireless light bulbs with RF receivers allowing them to perform the PWM dimming control to set the light intensity. In other embodiments, the dimming function is implemented by amplitude modulation of the AC power input. In such a case, the wireless light bulb may measure the amplitude of the input and generate the PWM control of the LEDs to create a light intensity level that reflects the amplitude level. In some embodiments, the wireless light bulb may contain an embedded power source such as a non-rechargeable battery, a rechargeable battery, a super capacitor or the like such that the wireless light bulb may power an embedded microcontroller or similar circuitry that may contain the light intensity level even when power to the wireless light bulb is removed. In such a case, the wireless light bulb may continue to generate light at the dimmed light intensity level power the wireless light bulb from the embedded power source. In alternate embodiments, the embedded power source provides internal power to remember the state of the dimmed light intensity level such that when the light is turned back on it will start out at the previous light intensity level. For example, if the dimming function is performed by sending a command to the bulb over the power lines or by a wireless input such as RF communications or the like, the bulb may be able to return to the remembered light intensity immediately when power is applied the next time. In alternate embodiments, the dim level is stored in non-volatile memory in the wireless light bulb when the dim level is set or when the bulb is powered down.

Preset lighting zones and scenes may be programmed into a wireless light bulb or battery powered wireless lighting fixture to allow a user to select a specific light intensity or setting. The lighting zones and scenes may be preprogrammed (as part of a specific embodiment of a bulb or fixture with settings that a user would typically require for certain applications) or they may be setup and programmed by the user. Lighting zones may be set up using unique IDs such that some of the bulbs or fixtures in a certain area may operate similarly.

In some battery powered wireless light bulb or battery powered wireless lighting fixture embodiments, there may be energy harvesting methods employed to supplement and recharge embedded battery power. In one use case, a wireless light bulb parking lot light or street lamp may be designed that may harvest wind power to power the light source and control circuitry and/or charge embedded battery power. In the example use case, a small wind mill is built inside the housing of the parking lot light or street lamp. The housing has openings to allow wind to turn the mechanism, but the wind mill is not visible. In some embodiments, the wind mill may be visible. The wind energy is converted to electrical energy and either directly powers the light or is stored in the embedded battery. The parking lot or street lamp may or may not have an AC power source in addition to the wind power and embedded battery power sources. In alternate use cases, energy is harvested from a turnstile, for example at a subway station or sporting event. The spinning motion of the turnstile generates electricity that powers the light source and control circuitry and/or charges embedded battery power. In another use case, the wireless lighting module is similar to a collar that opens and closes. When closed it may be locked onto whatever it closes on. The inside portion spins and the outside portion remains fixed. By way of an example the wireless lighting module may be affixed to the roof of a revolving door with screws or another attachment mechanism and the inner portion is attached to the spinning part of the revolving door. The outside portion has the light in it, the inside portion spins with whatever it is attached to and generates electricity as it spins. In this use case, the wireless lighting module may be attached to anything that is spinning to generate electricity for use by the wireless lighting module. This may be used in revolving doors, carousels, turnstiles etc. In alternate use cases, the wireless lighting module may mount to a pole and blades may be attached to the spinning portion to allow for wind energy to be converted to electrical energy to power and/or charge batteries in the wireless lighting module.

In some use cases the wireless lighting module may be designed to harvest energy from the opening and closing of a door. When the door is opened or closed, a porch light that is outside of the door stores energy via electromagnetic induction or any other energy harvesting method from the opening and closing of the door. In another use case, a computer keyboard may be designed with a piezoelectric device under each key such that when the key is pressed, electricity is generated. An electrical circuit may be wired from the keyboard along with the keyboard connection to the computer to a wireless lighting module in the form of a desk lamp that may be powered from the electricity harvested from the key presses. The desk lamp may contain rechargeable batteries to store the energy generated by the key presses. In another use case, a wireless lighting module may be designed such that a portable water mill may be place in flowing water and cabled to a wireless lighting module in the form of a path light or spotlight mounted to the ground with a stake. The wireless lighting module may contain rechargeable batteries to store energy for later use. The wireless lighting module may contain an RF receiver such that it may be controlled with a remote control to turn the light on or off as needed. In alternate use cases, a similar wireless lighting module may be used on a boat as a power source and charging source for wireless lighting modules on the boat. As the boat moves through the water, electricity may be created to power the light on the boat.

In some wireless light bulb or battery powered wireless lighting fixture embodiments, there may be a receiver control module such that the same design of light source, thermal management, AC/DC circuit, regulator circuitry, housing, battery management etc may be used, but the wireless control and embedded intelligence may change to use different communication interfaces, different types of sensors, different types of embedded intelligence or different types of LED control and power management. This may allow changing from one control type to another (LEDs, thermal, AC/DC etc stay same, lighting control module changes to allow the bulb or fixture to be part of different control topologies). By way of an example, a receiver control module may be a printed circuit board containing intelligence (microcontroller, microprocessor, integrated circuit etc.), a communication interface, battery charging and control circuitry, light source drive and control circuitry, and the like. For example, one module may be designed for a wireless light bulb that uses ZIGBEE as a communication interface. An alternate module may be designed for a wireless light bulb that uses BLUETOOTH as a communication interface in a printed circuit board that may be the same form factor as the ZIGBEE based receiver control module. An alternate module may be designed for a wireless light bulb that uses the ENOCEAN protocol as a communication interface in a printed circuit board that may be the same form factor as the ZIGBEE based or BLUETOOTH based receiver control module. In those three cases, the base wireless light bulb design may remain the same, but the receiver control module may be changed to create three wireless light bulb options that could be integrated with different system architectures. In another example, the receiver control module with a real time clock embedded may be installed to control the light source based on time of day. Alternately, the receiver control module that may receive and forward commands in a mesh network may be installed to create a mesh network of wireless light bulb or battery powered wireless lighting fixture. It is to be appreciated that the receiver control module may contain any combination of intelligence, communication interfaces, sensors, battery charging and control circuitry and light source drive and control circuitry mentioned herein. In some embodiments the module may be referred to as a sensor control module as it may provide sensor functions that may operate with or without a communication interface. In some embodiments, the module may be referred to as a transceiver control module as it would contain a transmitter and receiver such that the module may transmit, receive and in some embodiments be part of a network of wireless light bulbs or battery powered wireless lighting fixtures. In other embodiments, the module may be an intelligent control module that may provide intelligent function such as programmable time of day control. It is to be appreciated that a module may be designed that contains any mix of functionality of the modules mentioned herein.

In some embodiments, the receiver control module may be built into the wireless light bulb or battery powered wireless lighting fixture. In other embodiments, the receiver control module may be replaceable by opening the wireless light bulb or battery powered wireless lighting fixture, removing receiver control module and replacing it with a different receiver control module. In this case, the receiver control module may have a connector to allow it to make electrical and mechanical connection to the bulb or fixture. In other embodiments, the receiver control module is external to the bulb or fixture and is in its own housing of any size or shape as required by the application. In this case, there may be a connector on the bulb or fixture and on the receiver control module to allow it to be plugged into or unplugged from the bulb or fixture. It is to be appreciated that the receiver control module may be changeable in place (i.e. it may be reprogrammed over the communication interface such that the same hardware provides a different set of functionality).

In embodiments of the wireless light module or apparatus where there is a wireless power source, there may exist the capability that the wireless lighting module or apparatus may be removed from its installed location and used as a mobile light source (i.e. carried around, attached to a vehicle etc). In some embodiments, the entire wireless lighting module or apparatus may be a mobile light source, but in other embodiments some part of the wireless lighting module or apparatus may be removed and used as a mobile light source. By way of an example, an LED spotlight with any type of wireless power and wireless control source may be installed at any location. If desired, a user may remove the LED spotlight or a portion of the LED spotlight from its installed location and walk around with the spotlight using it as a light source. In one example, the LED spotlight is attached to a tree without driving into the tree to mount the spotlight.

In embodiments, a wireless lighting module or wireless light bulb may use a real time clock to maintain timer or time of day information for use by intelligent functions. In alternate embodiments, a wireless lighting module or wireless light bulb may maintain timer or time of day information through the use of a microcontroller, microprocessor, integrated circuit etc. that may keep track of time independently or with an associated crystal oscillator, clock oscillator, electrical circuit that oscillates or the like. An external time source may be used to calibrate or update the timer or time of day clock to synchronize with the external time source to set the internal time source and/or compensate for clock drift of the internal time source. In alternate embodiments, a module or bulb may use an atomic clock receiver inside the module or bulb to receive accurate and reliable time of day clock from a clock source provided by a radio transmitter. By way of an example, the transmitting clock source may be the WWV or WWVB radio controlled clocks that are transmitted by the NIST time signal radio station or the like. In such a case, a user may not need to set the time of day. It may be set automatically by receiving a radio signal containing clock information that may be used to update the time of day information kept in the module or bulb. In such a case, the module or bulb will be able to regularly update its internal clock to keep it as accurate as possible. It may also be able to automatically adjust for daylight savings time changes. In some embodiments, a module or bulb that may be able to receive atomic clock information may retransmit it to other stations that cannot receive the atomic clock information for any reason. In this case, a network of wireless lighting modules or wireless light bulbs may benefit from the distribution of time of day information that is distributed though the network. In alternate embodiments, Network Time Protocol (NTP) or any other time distribution protocol may be used to distribute timer and/or time of day information in a network of wireless lighting modules and wireless light bulbs. By synchronizing modules and bulbs to a common clock, complete lighting installations will be able to operate synchronized in time. In addition, in a case where intelligence inside the modules and bulbs will be used to change state at particular times or times of day, a synchronized clock across the network may allow them to do so independently, but still synchronized in time. In alternate embodiments, the wireless light module or wireless light bulb may contain an astronomical time clock that maintains day, date, sunrise, sunset and daylight savings information to allow the module or bulb state to be changed based on the information from the astronomical time clock.

In another embodiment, a version of the wireless lighting module may target wireless LED spotlight applications where there is a mounting mechanism to mount the spotlights to support bars of a drop ceiling. In an alternate embodiment, there is a mounting mechanism to mount the spotlights directly to the ceiling, wall or under cabinet. In either case, the spotlight has the ability to have the direction of the light source changed. Thus, one or more wireless LED spotlights may be used to be installed similar to track lights but use wireless power therefore they may be installed in any location the user desires ("wireless track light"). By way of an example, a wireless track light may be created by one or more wireless LED spotlights that illuminate an area of approximately one hundred fifty square feet. Alternate embodiments may include but are not limited to any known light source including LEDs, compact fluorescent, incandescent bulbs, and the like, and can illuminate any size area required by the application.

The wireless track light may include one or more wireless power sources such as a battery. By way of an example, the wireless track light may consist of one or more spotlights powered by 3 D batteries. It should be understood that in alternate embodiments any number and type of known batteries may be used, including without limitation all known alkaline and nickel-cadmium batteries, depending on size and power requirements. According to another example, the power source may be any number and type of rechargeable batteries and/or non-rechargeable batteries. Pursuant to a further illustration, the power source may be a combination of a solar cell and one or more batteries (e.g., rechargeable, non-rechargeable). Thus, for instance, a battery can supplement the power supplied by the solar cell (or vice versa) and/or the solar cell can recharge a battery.

In embodiments, the wireless power source may supply power to the spotlights to enable installing, moving, replacing, etc. the wireless track light at substantially any indoor or outdoor location while mitigating the need for expensive and time consuming wiring and/or utilization of aesthetically unpleasing and potentially inconvenient cords commonly associated with conventional lighting. In alternate embodiments the power source may include a fuel cell, such as and without limitation a hydrogen fuel cell, a reformed methanol fuel cell, or the like. In alternate embodiments, the power source may include a capacitor, array of capacitor, super capacitor, and the like, to store energy to be used as a power source similar to a battery. There may exist a charging mechanism such as a connector that allows the lights to plug into a charging base, a DC jack such that a wall transformer may be plugged into a normal AC outlet and into the DC jack to charge the unit or the light may contain a battery door allowing the rechargeable batteries to be removed, charged and replaced and the like.

In embodiments, it is to be appreciated that the wireless LED spotlight used to create the wireless track light may use RF or IR control, sensor control or any form of wireless control mentioned herein. By way of an example, the wireless track light with multiple RF controlled wireless spotlights may be controlled by a remote control RF transmitter. It is to be appreciated that the wireless LED spotlight may contain the intelligence necessary to implement the programmable functions for a wireless light module or apparatus mentioned herein. In some embodiments, the housing may not be similar to a spotlight but rather it may be similar to the ceiling light or any other form of housing for a wireless lighting module or apparatus mentioned herein. In some embodiments, there may be a rail or bar that mounts to the ceiling, wall or under cabinet and the wireless lights that make up the wireless track light attach to the rail or bar. In an alternate embodiment, the rail or bar may contain a wireless power source such as batteries such that the wireless lights are powered by that power source and may not contain a power source internally. In such a case, there may be electrical wiring from the power source within the rail or bar to the individual wireless lights. In an alternate embodiment, the rail or bar contains one or more connector that the lights plug in to that provide a power source and control. In some embodiments, the rail or bar may also contain a wireless control source that is wired to the wireless lights or is available at the connectors the lights plug into such that a single point of wireless control may control all of the wireless lights used with the wireless track light. In the embodiment where there is a mounting mechanism to mount the spotlights to support bars of a drop ceiling, there may be wireless power or wireless control installed above the support bar (i.e. hidden from sight) and wired to the wireless lights via wires that enter the wireless light at the mounting mechanism above the support bars of the drop ceiling.

In embodiments of the ceiling light, there may exist in the ceiling light module a carbon monoxide, smoke detectors, heat detector, flame detector and/or thermal sensors in addition to any other form of wireless control or wireless power that may be present. In some embodiments there may be an indication of an alarm when the detector crosses some threshold. In such a case, the alarm may be audible through a bell, buzzer, horn, speaker etc. The ceiling light may also provide a visible indication of the alarm for example by blinking the light, illuminating a different color light source like a red LED or the like. In some embodiments, the ceiling light may contain a transmitter that may transmit a message to indicate an alarm and a disparate device may take action based on the alarm. By way of an example, the ceiling light may include a smoke detector that may transmit a message to a fire alarm system. In an alternate example, the ceiling lights may form a mesh network such that the detection of an alarm in one location may be propagated through the network such that other ceiling lights installed in the area may provide an alarm indication even if they do not directly detect the alarm situation. In one use case of this example, a set of eight ceiling lights with one or more of the sensors mentioned herein work as a group such that when one ceiling light detects the alarm, all of the ceiling lights generate an alarm automatically. In this case, there may be no need for a central controller and the distributed intelligence in the ceiling lights provides a standalone safety system. In an alternate embodiment, the ceiling light may contain a motion sensor such that it may be able to transmit a message to a home alarm system to provide an indication of an intruder. There may also be a button on the ceiling lights that allow a user to push the button to test the one or more ceiling lights such that when the button is pushed, the alarm message is propagated through the network. In alternate embodiments the unit is in the form of a night light or sensor light that may be mounted anywhere, there may exist in the night light or sensor light module a carbon monoxide, smoke detectors, heat detector, flame detector and/or thermal sensors in addition to any other form of wireless control or wireless power that may be present and the indication of an alarm may be as mentioned herein. By way of an example, a motion sensor night light that is battery powered may operate under normal conditions as a night light that may be installed anywhere, however it may also contain a smoke detector such that when smoke is detected, an alarm indication of some type is asserted such as a buzzer to provide an audible indication of the alarm condition.

In another embodiment, a version of the wireless lighting module may target wireless LED spotlight applications where a UV or IR light source is present in the spotlight. When motion is detected, the LED spotlight turns on the UV or IR light source such that a detector (security camera etc) may be able to see the area illuminated by the UV or IR light without the light being visible to anyone or anything in the area. By way of an example, this application for safety and security may allow a user to see an intruder without the intruder knowing that they have been detected.

A number of methods have been mentioned herein by which a wireless light bulb or wireless lighting module may be programmed or configured for operation. The methods in embodiments of the programmable wireless light bulb or programmable wireless lighting module may include direct configuration or control of the unit through one or more buttons, dials, toggles, switches, levers, knobs, an LED touch screen, a keypad, or any such controls on the unit, configuration of the unit via the communication interface, configuration of the unit by design, configuration of the unit by factory pre-programming, configuration of the unit through processing the inputs and adjusting state appropriately, configuration of the unit through some sequence of action to indicated to the unit a configuration and the like. It is to be appreciated that any combination of programming or configuration method is possible in embodiments of a wireless light bulb or wireless lighting module.

In a direct configuration example, configuration and programming is controlled by the setting and use of one or more input devices accessible to the user on the unit itself. By way of an example, an AC powered wireless light bulb with a light sensor may have a dial on the unit that allows the user to set the net light level directly. To do this, the user may turn the light on in an environment with any amount of ambient light and turn the dial until the light intensity provided by the light plus the amount of ambient light is at a level desired by the user. Intelligence within the AC powered wireless light bulb with light sensor will thereafter monitor the detected light level from the light sensor and adjust the light intensity output to match the user setting. In an alternate direct configuration example, an AC powered wireless light bulb in a PAR30 form factor the user may have access to a slide switch with multiple positions each position representing a light output level. Intelligence, electrical circuitry etc in the bulb may detect the switch position and adjust the light intensity level based on the switch setting. For example, the light output level of the bulb in one setting may be equivalent in light output to a typical 40 W incandescent light bulb, in a second switch setting it may be equivalent to a 60 W incandescent light bulb and in a third switch setting it may be equivalent to 75 W incandescent light bulb. Thus the user may have one PAR30 light bulb that, by changing the switch position on the bulb, have available to them three different light bulb types. In an alternate example, the slide switch is replaced by a dial and the user may turn the dial to a more exact brightness level. In this example, when the dial is turned to the lowest setting, the bulb may have a light output equivalent to a typical 20 W incandescent light bulb and when the dial is turned to the highest setting, the bulb may have a light output equivalent to a typical 75 W incandescent bulb. Thus, the light output may be adjusted using the dial from equivalent to a 20 W incandescent bulb to the equivalent of a 75 W incandescent bulb. This function may be used a dimmer switch for bulbs that are used in applications where the bulb is within reach of the user, for example a desk lamp, a reading lamp, an interior automotive lamp etc where the dimmer switch is in effect located on the bulb itself.

In a configuration of the unit via the communication interface example, a wired or wireless connection to the unit may allow a user to configure or program a wireless light bulb or wireless lighting module by sending and receiving messages over the communication interface to program any functionality mentioned herein. It is to be appreciated that the wireless light bulb or wireless lighting module may contain volatile and/or non-volatile memory to store the configuration or program information. In the example of the light bulb that may be set to a 40 W, 60 W or 75 W incandescent bulb equivalent, a command may be sent to the bulb over a communication interface to select the light intensity level for operation. In another example, the unit has a connector on the unit that a user may plug a cable with the other end plugged into some type of programming apparatus (computer, handheld etc.) such that a user may configure or program the unit using the programming apparatus. In a configuration of the unit by design or by configuration of the unit by factory pre-programming example, a wireless light bulb or wireless lighting module may have a level preset such that the user may expect the functionality to operate as such. For example, there may be a single auto-shutoff timer in a motion sensor controlled product where the auto-shutoff time is set in the design or pre-programmed at the factory based on a customer order. In an alternate example, a daylight harvesting wireless light bulb is preset such that the output light intensity plus the measurement of the ambient light level is maintained at a constant light level. In this case, a daylight harvesting bulb that maintains the equivalent ambient light level as a 60 W incandescent bulb by setting its output light intensity to meet the preprogrammed light detection level equivalent to the 60 W incandescent bulb.

In a configuration of the unit through processing the inputs and adjusting state appropriately or configuration of the unit through some sequence of action to indicate to the unit a configuration, the unit may learn its configuration and in effect program itself for operation. For example, a motion sensor controlled wireless light bulb or wireless lighting module that also contains a time of day clock may detect a lot of motion at certain times of the day. If the motion statistics exceed a certain level, the unit may program itself to turn on automatically at that time of day just prior to when the detections would indicated the expected motion. In an alternate example, power sequencing may be used to configure the operation of a wireless light bulb. If the power is sequenced on, then off, then on again in durations of time understood by the wireless light bulb, the bulb may be configured for a specific operation. For example, if a motion controlled wireless light bulb is turned on and left on, the motion sensor may be disabled. If the power is sequenced in the manner described, the motion sensor may be enabled and controls the wireless light bulb until power is turned off.

In an embodiment, a wireless AC outlet may be designed with batteries embedded to provide power to any kind of electrical device that plugs into the outlet. The adapter may contain an integrated wireless power source (batteries for example), a DC/AC inverter and control that is either wireless control or manual control such as a switch on the wireless AC outlet that may turn it on or off. The user may then plug in AC powered devices to the wireless AC outlet to power that device. By way of an example, a wireless AC outlet may be mounted to a wall in any location the user desires or it may be mounted to a post that may be driven into the ground. It is to be appreciated that the wireless AC outlet may be designed in any housing and contain any mounting mechanism as required by a particular application. It is to be appreciated that the power supplied by the wireless AC outlet may be limited to the energy delivery capacity of the integrated power source. By way of an example, a wireless AC outlet with a single AC socket and 4 C alkaline batteries may be limited to the power that the C batteries may be able to provide to an AC powered device. In embodiments that are powered by batteries, the wireless AC outlet may contain a battery door that allows the batteries to be removed and replaced with fresh batteries. In an alternate embodiment, the wireless AC outlet may contain rechargeable batteries and a method to charge the batteries. The wireless AC outlet may contain a connector that allows it to plug into a charging base, it may contain a DC jack such that a wall transformer may be plugged into a normal AC outlet and into the DC jack on the wireless AC outlet, it may contain a battery door allowing the rechargeable batteries to be removed, charged and replaced and the like. In alternate embodiments, the wireless AC outlet may contain an energy harvesting wireless power source and integrated rechargeable batteries such that the energy harvesting source may provide power to the wireless AC outlet and/or charge the batteries as necessary. By way of an example, a wireless AC outlet contains solar cells and an electrical circuit necessary to take the energy received from the solar cells and provide power for the wireless AC outlet, charge the batteries and/or share the load between the solar cells and batteries.

In embodiments containing a grid tie inverter, the capability for a user to explicitly command a return of power to the grid may exist. For example, a user may have a control mechanism that may detect the battery charge levels in a device containing a grid tie inverter and if the user desires to return power to the grid the ability to command such a return exists. It may exist through software control or the like, but it may also exist through direct control on the device itself. In some embodiments, the user may have the ability to command the return of power to the grid based on battery capacity level such that there will be some reserve energy storage if needed. The user may set an upper threshold of battery capacity level to begin the return of power to the grid and a lower threshold of battery capacity level where the return of power to the grid may stop to maintain a reserve energy storage level or to prevent over discharge of the battery to optimize rechargeable battery life. Thus the user may be able to control the return of energy to the grid such that there is not a situation when a battery is fully charged when it is advantageous to be charging the battery (for example some time prior to off peak hours when the battery may start charging again). In alternate embodiments, the explicit command to return energy to the grid may come from the power company, from a smart meter, from a remote connection where the user may access such controls over the Internet and so on.

In an embodiment of a wireless lighting apparatus, a book light consisting of a book with circuitry embedded, integrated power source such as a battery, switch and one or more LEDs may be designed such that when a reader opens the book, a switch opens or closes with the opening the book and the LED is illuminated. When the book is closed, the LED is turned off. In some embodiments, there may be another switch to enable or disable the LED light if the user desires. In some embodiments, the one or more LEDs may be attached to an arm that elevates as the book opens. In this case, the one or more LEDs may be directed in a way that they would point toward the area where the illumination is needed. By way of an example, the book light may be used in a restaurant check book such that when a diner opens the book to view their check, the LED illuminates the check area. When they close the check book, the LED shuts off. In this example, the check book light consists of a coin cell battery, a push button that disables the light by pressing the button while the check book is closed and an LED to illuminate the check book when open.

In an embodiment, an AC outlet adapter may be designed with batteries embedded to provide power to an alarm clock when there is a power outage. By way of an example, the adapter may plug into an AC wall outlet and also have an AC socket that the alarm clock plugs into. In an alternate embodiment, the AC outlet adapter that the alarm clock plugs into provides backup power for the alarm clock but also contains an LED reading light that is powered by the AC outlet adapter. The LED reading light may be attached to a flexible arm such that the user may be able to articulate the light in the direction needed to provide illumination as necessary. There may be a control mechanism, such as an on/off switch, at any point on the LED reading light such that the user may turn the LED reading light on or off as desired without affecting the battery backup for the alarm clock.

In embodiments of the wireless light bulb or wireless lighting module where one communication interface is WIFI, the wireless light bulb or wireless lighting module may also be able to act as a WIFI repeater device. In such a case, the wireless light bulb or wireless lighting module is capable of operating on a single channel and receive then transmit packets on WIFI. In alternate embodiments, the wireless light bulb or wireless lighting module may operate on multiple WIFI channels such that the unit may be able to receive traffic on one channel and transmit that traffic on a different channel. It is to be appreciated that as a WIFI repeater, the wireless light bulb or wireless lighting module operate on any number of channels as required.

In embodiments of the wireless light bulb or wireless lighting module, the light source may be LED, compact fluorescent, fluorescent, induction, halogen, gas discharge, organic LED (OLED), plasma, radio generated plasma or incandescent. In one example, a wireless light bulb may be designed with one or more OLED panels as the light source. The OLED wireless light bulb may be designed in any type of housing mentioned for a wireless light bulb. In one example, the OLED wireless light bulb is designed to mount to a ceiling or replace a ceiling panel. The OLED wireless light bulb may contain any form of wireless control, power source and/or intelligence control typical of a wireless light bulb. In another example, wireless light bulb may be designed with a radio generated plasma light source. The radio generated plasma wireless light bulb may be designed in any type of housing mentioned for a wireless light bulb. In one example, the radio generated plasma wireless light bulb is designed in an A19 bulb housing. The radio generated plasma wireless light bulb may contain any form of wireless control, power source and/or intelligence control typical of a wireless light bulb.

The previously mentioned wireless lighting modules can be grouped into kits to meet specific user applications. A residential or commercial power saver kit can be constructed of any mix of wireless lighting module light bulbs in a kit to allow installation in a residential or commercial building for savings on energy bills. For example, a home power saver kit that includes ten AC powered, battery backed wireless lighting module light bulbs can be used by a consumer to replace the R30 incandescent bulbs in their house that would typically be used in recessed lighting fixtures at substantial savings on power consumption.

A residential or commercial emergency lighting kit can be constructed of any mix of wireless lighting module light bulbs in a kit to allow installation in a residential or commercial building for switching over automatically to battery backup when an AC power outage is detected. For example, an emergency lighting kit that includes twenty AC powered, battery backed wireless lighting module light bulbs can be used by a consumer to replace the R30 incandescent bulbs in their house that would typically be used in recessed lighting fixtures at substantial savings on power consumption.

In embodiments of wireless light bulbs or battery powered wireless lighting fixtures containing a PIR device for motion sensing, a thermal sensor may be present to provide a measurement of temperature to allow temperature compensation of the threshold for motion detection. In some embodiments, a temperature dependant voltage may be generated using a thermistor, a resistor network and a supply voltage where the output voltage is dependent on the resistance of the thermistor and that output voltage may be used to derive the threshold voltage used for motion detection.

Thus, the change in sensitivity of the motion sensor over temperature may be compensated for by changing the threshold of the motion detection circuit. By way of an example, an operational amplifier used as a comparator at the output of the motion sensing circuitry has a threshold that the voltage that is a representation of the detected motion is compared against. Over temperature, the amplified output of the PIR sensor may vary to the point that false triggers may occur which would turn the light on when motion is not detected or has not been detected sufficiently to turn the light on. If the threshold at the comparator varies with temperature, the threshold may move higher or lower compensating for the changes in performance of the PIR sensor and motion detector circuitry. In an alternate embodiment, the temperature is measured, converted from analog to digital, read by a microcontroller and the microcontroller may set a threshold value through a digital to analog conversion based on the temperature reading. In such a case, to determine the proper threshold level the microcontroller may have an algorithm programmed in it to calculate the required threshold based on the measured temperature, the microcontroller may contain a lookup table such that stored in memory a lookup using the read temperature will return the required threshold value and the like. In another embodiment, the wireless light bulb or battery powered wireless lighting fixture may have a communication interface such that a processor that has a measurement of temperature may send a command to the bulb or fixture to set the motion detection threshold for compensation. It is to be appreciated that any method of measuring temperature and using that information to modify the threshold based on the input temperature may be used.

In embodiments of wireless light bulbs or battery powered wireless lighting fixtures containing any type of sensor, power circuitry, LED driver circuit or LED device that may change performance over temperature, a thermal sensor may be present to provide a measurement of temperature to allow the behavior of the sensor, power circuitry, LED driver circuitry or LED device to be adjusted over temperature. The adjustment based on detected temperature may be measured using any type of temperature measuring mechanism mentioned herein. An electrical circuit, microcontroller, microprocessor, ASIC etc may be present to process the measured temperature make an adjustment based on the measurement. By way of an example, one or more thermal sensors may be connected to the heatsink which the one or more LED devices are attached to. A measurement of the heatsink temperature may be used to adjust the LED driver circuit current to a lower or higher drive level based on the temperature reading. For example, if there is a maximum heatsink temperature allowable, when the detected temperature is read at or close to that level, an electrical circuit, microcontroller, microprocessor, ASIC etc may reduce the drive current such that there is less heat generated by the LEDs and subsequently the temperature will remain the same or start to lower due to the change in drive current. It is to be appreciated that the drive current may be adjusted based on the temperature measurement of any one or more components of a wireless light bulb or battery powered wireless lighting fixture or a measurement of the ambient temperature inside or outside of the wireless light bulb or battery powered wireless lighting fixture. By way of another example, a light sensor may be used for daylight harvesting such that the detected value of the ambient light level may be used to set the light intensity of the light source such that the total light maintains some constant level. A thermal sensor may be used for compensation of the light sensor over temperature such that the ambient light measurement is adjusted over temperature. For example, a microcontroller may read a voltage level at the output of a light sensor circuit through an analog to digital converter. The microcontroller may also read a temperature dependant voltage that is generated using a thermistor, a resistor network and a supply voltage. The microcontroller may control the light intensity of the light source based on the reading of the ambient light level adjusted based on the temperature measurement. In another example, the measured temperature may be used to change the gain of a receiver circuit for better operation over the operating temperature range. It is to be appreciated that the measured temperature may be used to adjust any sensor, power circuitry, LED driver circuit or LED device with preset temperature curves that determine a lookup table to provide the adjustment, an algorithm to derive the adjustment to be done based on temperature and/or time, an automatic adjustment done by an electrical circuit designed to make the adjust based on the temperature reading, an adjustment received over a communication interface and the like.

In one embodiment, an AC powered battery embedded motion wireless light bulb contains rechargeable batteries and a PIR motion sensor. In some embodiments, there may be a light sensor inside the bulb to enable the motion sensor for operation or to be used for daylight harvesting. A charging circuit that supports recharging the batteries in circuit may be inside the bulb. There may be circuitry to allow either power source to be used independently or to share the load depending on whether each power source is present and able to supply power to the wireless light bulb. An electrical circuit, microcontroller, microprocessor, ASIC etc may be present to perform the selection of which power source to use. The selection of which power source to use may be programming into the wireless light bulb through preprogramming at the factory or the like, through a programming method over a communication interface that may be present in the bulb or it may be set directly on the unit through a method of control such as a dial, push buttons, slide switches and the like where a user may set whether to use the AC power source, the battery power source or a sharing of the load between AC and battery power, to enable or disable the motion sensor, to set the auto-shutoff time period, to set the light intensity level in a mode of operation or to enable or disable the light sensor. In some embodiments, there may be a time of day clock or timer present to control state changes or change the configuration based on time of day. By way of an example, the AC powered battery embedded motion wireless light bulb may be enabled during daytime hours to be controlled by the AC wall switch where the unit is AC powered. During evening hours or during a detected power outage, the AC powered battery embedded motion wireless light bulb is powered by battery power and is controlled by the motion sensor to turn the light source on and off. In some embodiments, the AC powered battery embedded motion wireless light bulb may include a fade-to-off effect, fade-to-dim effect, fade-to-glow effect, fade from one light intensity level to another light intensity level and so on. In some embodiments, the AC powered battery embedded motion wireless light bulb may include an increase in light intensity over time which may include an off-to-glow effect, glow-to-dim, glow-to-some light intensity level, an increase from one light intensity level to a higher light intensity level and so on. It is to be appreciated that the change from one light intensity level to another light intensity level may happen over any period of time that may be implemented with the timers. In some embodiments, the AC powered battery embedded motion wireless light bulb may include a daylight harvesting function which allows for the light intensity level of the light source to be set based on the detected ambient light level.

In some embodiments, the AC powered battery embedded motion wireless light bulb may sense the state of one or more switches or breakers in the controlling circuit and switch over to battery power if the detected switch state indicates that the AC power should be present, but AC power is not present. The device may also measure the impedance, resistance, and/or capacitance across the AC power input and return or may measure any other electrical characteristic of the AC power input and return to determine whether the controlling switch or breaker is open or closed (or if electricity has been turned off at any point up to the AC input of the device). By way of an example, if the controlling switch or breaker is open, there may be a high impedance detected across the input AC power and return. If the controlling switch or breaker is closed, there may be a measurable impedance, resistance and/or capacitance or electrical characteristic different from when the controlling switch or breaker is open. A threshold may be set in the device such that if the measurement is above or below the threshold, the switch or breaker is closed, and if the measurement is on the opposite side of the threshold, the switch or breaker is open. The device may be controlled by the state of the controlling switch or breaker (on or off), but may also detect the condition when the controlling switch or breaker is closed but AC input power is not present or is not acceptable and may be able to switch over to the rechargeable or non-rechargeable batteries that are embedded as the power source. In some embodiments, the AC powered battery embedded motion wireless light bulb may perform an impedance discontinuity check to determine if the controlling switch of breaker is open or closed. In some embodiments, the AC powered battery embedded motion wireless light bulb may generate a signal onto the line and monitor the electrical response of the line to determine if the response indicates an open circuit that may be indicative of a switch or breaker open in the lighting circuit. It is to be appreciated that when the switch sense functionality is implemented, the switch or breaker may still be able to turn on and off power to the AC powered battery embedded motion wireless light bulb even when running off of the embedded battery power source because the AC powered battery embedded motion wireless light bulb may be able to determine if the switch is on or off and apply power or not apply power to the AC powered battery embedded motion wireless light bulb based on the switch position. In such a case, the switch sense circuitry may still need to be powered along with any other necessary circuitry to implement this function even when the AC powered battery embedded motion wireless light bulb is not being powered.

In embodiments of wireless light bulbs or battery powered wireless lighting fixtures containing a motion sensing capability, there may be a number of methods by which motion is detected. There may be a radar based motion sensor where a transmitter exists in the wireless light bulb or battery powered wireless lighting fixture to transmit pulses of radio frequency or microwave. The wireless light bulb or battery powered wireless lighting fixture may contain a receiver to receive the reflected waves allowing it to determine if there is an object in range, how far away the object is, the velocity of the object and other characteristics of the object. Thus, using a radar based motion sensor may allow detection of an object in the detection area, not just that the object is moving. A radar based motion sensor may provide information about the range to the object which may allow for intelligent decisions to be made about whether the object that is detected should trigger a change of state of the wireless light bulb or battery powered wireless lighting fixture. By way of an example, a wireless light bulb may turn on only when an object is within 20 feet of the wireless light bulb. A radar based motion sensor may determine that an object is 30 feet away and thereby, even though the object is detected, still not turn the light on or turn the light on to a lower light intensity until the object moves within 20 feet. It is to be appreciated that the transmitter may be disparate meaning that the transmitter may not be built into the bulb or fixture but rather may be a separate standalone unit where a receiver in the bulb or fixture may receive the transmitted pulses and reflections of the transmitted pulses that were generated by the disparate transmitter device and react based on the reception without having to have transmitted the pulses. It is to be appreciated that a radar wireless light bulb or battery powered wireless lighting fixture may operate in any radio band with any form of modulation where a radar based motion sensor may be operate.

In other embodiments of wireless light bulbs or battery powered wireless lighting fixtures containing a motion sensing capability, there may a sonar based motion sensor where sound propagation is used by the wireless light bulb or battery powered wireless lighting fixture to detect objects in the field of view. An acoustic transmitter that may transmit any frequency acoustic wave creates the wave and a receiver listens for the echo return of the transmission. Intelligence in the wireless light bulb or battery powered wireless lighting fixture may analyze the received signal and determine if an object is in the field of view and the distance to that object. Thus, using a sonar based motion sensor may allow detection of an object in the detection area, not just that the object is moving. A sonar based motion sensor may provide information about the range to the object which may allow for intelligent decisions to be made out whether the object that is detected should trigger a change of state of the wireless light bulb or battery powered wireless lighting fixture. It is to be appreciated that the acoustic transmitter may be disparate meaning that the transmitter may not be built into the bulb or fixture but rather may be a separate standalone unit where a receiver in the bulb or fixture may receive the echo return of the transmissions that were generated by the disparate transmitter device and react based on the reception without having to have transmitted the pulses.

In some embodiments of wireless light bulbs or battery powered wireless lighting fixtures there may be a disparate magnetic switch and an RF or IR transmitter that detects when the magnetic switch is open, closed or has just changed state and may transmit the state information to a wireless light bulb or battery powered wireless lighting fixture containing a receiver. Thus, a magnetic switch sensor may be placed anywhere (where the magnet and magnetic switch may be separate housings) to detect a make or break of the magnet and magnetic switch. By way of an example, the magnetic switch may be attached to a door or window frame and the magnet may be attached to the door or window. When the door or window is closed, the magnetic switch may be actuated. When the door or window is opened, the magnetic switch changes state and the disparate magnetic switch and transmitter transmits the change of state information to one or more wireless light bulbs or battery powered wireless lighting fixtures that may be controlled by the disparate sensor. It is to be appreciated that the magnetic switch and magnet may be attached to any two items that a user may desire a separation of the two items to change the state of one or more wireless light bulbs or battery powered lighting fixtures. In alternate embodiments the magnetic switch is not a disparate device but rather is located in or on the housing of the wireless light bulb or battery powered wireless lighting fixture and the magnet is external to the housing such that the wireless light bulb or battery powered fixture receives a direct indication of the state or change in state of the magnetic switch with respect to the magnet.

In some embodiments of wireless light bulbs or battery powered wireless lighting fixtures there may be a disparate pressure switch and an RF or IR transmitter that detects when the pressure switch is open, closed or has just changed state and may transmit the state information to a wireless light bulb or battery powered wireless lighting fixture containing a receiver. Thus, a pressure switch sensor may be placed anywhere to detect when an actuating force is applied to the switch. By way of an example, a pressure switch may be embedded in flooring such that when an object is detect on the flooring, for example a person walking across the floor, the pressure switch changes state and transmits the state information to one or more wireless light bulbs or battery powered wireless lighting fixtures that may be controlled by the disparate sensor. It is to be appreciated that the pressure switch may be attached to any item that a user may desire a detection of pressure applied to the item to control the state of one or more wireless light bulbs or battery powered lighting fixtures. In alternate embodiments the pressure switch is not a disparate device but rather is located in or on the housing of the wireless light bulb or battery powered fixture such that the wireless light bulb or battery powered fixture receives a direct indication of the state or change in state of the pressure switch. In alternate embodiments, more than one pressure switch is monitored and the result of a state change of any of the pressure switches may be transmitted by the RF or IR transmitter. By way of an example, a large mat of pressure switches may be installed under carpeting such that any pressure switch change of state may be transmitted to the wireless light bulb or battery powered wireless lighting fixture. This way the pressure switches may cover an area and it would be less likely that someone or something may pass the pressure switch mat without being detected.

In some embodiments of wireless light bulbs or battery powered wireless lighting fixtures there may a disparate infrared beam or laser beam created by a transmitter and receiver and an RF or IR transmitter that detects when the infrared beam or laser beam between the infrared or laser transmitter and receiver is present or broken or has just changed state and may transmit the state information to a wireless light bulb or battery powered wireless lighting fixture containing a receiver. Thus, an infrared beam or laser beam break may be detected by placing the infrared or laser transmitter and separate receiver anywhere. By way of an example, an infrared transmitter and receiver may be installed at the end of a driveway such that when an automobile drives into the driveway, it breaks the infrared transmission that is detected by the receiver. The infrared beam changes state due to the beam break and the infrared receiver device transmits the state information to one or more wireless light bulbs or battery powered wireless lighting fixtures that may be controlled by the disparate infrared beam break. It is to be appreciated that the infrared or laser transmitter and receiver may be attached to any two items that a user may desire a detection of an object between the infrared or laser transmitter or receiver to control the state of one or more wireless light bulbs or battery powered lighting fixtures. In alternate embodiments the infrared receiver is not a disparate device but rather is located in or on the housing of the wireless light bulb or battery powered fixture such that the wireless light bulb or battery powered wireless lighting fixture receives a direct indication of the state or change in state of the infrared or laser transmitter and receiver beam break.

In embodiments of wireless light bulbs or battery powered wireless lighting fixtures containing a motion sensing capability, there may be a number of mechanisms to control how the motion sensing is used to control the wireless light bulb or battery powered wireless lighting fixtures. In some embodiments, the motion sensor may be enabled or disable through the use of a time of day or timer control such that the motion sensor will be enabled or disabled based on a time setting that is programmed into the bulb or fixture. In some embodiments, there may be an external control mechanism that allows a user to enable or disable the motion sensor. By way of an example, a motion sensor wireless light bulb may be controlled by a wall switch that has an additional switch on it allowing a user to enable or disable the motion sensor (i.e. override the motion sensor) such that the primary control mechanism will be the wall switch or some other mechanism when the switch is in one position and the primary control mechanism will be the motion sensor when the switch is in the other position. By way of another example, there may be an RF or IR receiver in the wireless light bulb or battery powered wireless lighting fixture that would allow a user to enable or disable motion sensor control using a remote control that may transmit the control to the bulb or fixture. The remote control may be have controls such as pushbuttons, switches, dials etc that enables, disables or changes the sensitivity of the motion sensor control. The remote control may set time of day or timer control of when the motion sensor control is active. A light sensor may be used to enable or disable the motion sensor. The light sensor may be used to disable the motion sensor during the daytime when the amount of ambient light that is detected is above a threshold. The light sensor may be used to determine which other control mechanisms may be used instead of motion sensing. By way of an example, in an embodiment of the wireless light bulb, the light sensor may enable motion detection during the night, but during the daytime the wall switch will control power to the wireless light bulb.

In embodiments of wireless light bulbs or battery powered wireless lighting fixtures containing a motion sensing capability, there may be an ability to change the field of view of the motion sensor by positioning the motion sensor to change the field of view. By way of an example, a wireless light bulb or battery powered wireless lighting fixture may contain a PIR sensor that is mounted to a mechanical apparatus that may allow for "telescoping" the sensor such that it may be pointed in any direction required for motion detection. In an alternate embodiment, a radar or sonar transmitter and/or receiver may be capable of pointing in any direction required for a field of view where motion is to be detected. Thus, the capability to telescope or point the motion sensor in any direction allows the motion sensor to be placed in the optimal position for motion detection.

In some embodiments of wireless light bulbs or battery powered wireless lighting fixtures there may be an ability to detect sound or spoken commands and change the state of the bulb or fixture based on the sound or spoken commands. By way of an example, a wireless light bulb or battery powered wireless lighting fixture may contain a microphone and the intelligence to process speech such that if a user speaks commands such as "Bulbs on", "Bulbs off", "Dim up", "Dim down" or the like the bulb or fixture may change state based on the command detected by speech.

In an embodiment of a wireless light bulb powered from only AC power or powered only by battery power or in embodiments of a battery powered wireless lighting fixtures, the wireless light bulb or battery powered wireless lighting fixture may contain intelligence to control the light source based on time of day and may be programmed by controls on the housing of the bulb or fixture. Those controls may be in the form of pushbuttons, switches, dials etc. By way of an example, the time of day wireless light bulb or battery powered wireless lighting fixture may contain ON, OFF and PROGRAM pushbuttons. At the specific time of day that the user desires the bulb or fixture to automatically turn on, the user presses the ON and PROGRAM buttons simultaneously. A microcontroller, microprocessor, ASIC etc may contain a time source, such as a real time clock, free running timer or the like, and may contain the intelligence to record that time and a state change based on that time such that every day at that time or on regular intervals of the free running timer, the time of day wireless light bulb or battery powered wireless lighting fixture will automatically turn on. At another specific time during the day that the user desires the bulb or fixture to turn off, the user presses the OFF and PROGRAM buttons simultaneously. In alternate embodiments, there may be controls to set the light intensity of the bulb or fixture. In such embodiments, there may be a DIM UP and DIM DOWN pushbutton, dial switch or the like control and a method to use the PROGRAM button or similar to record the change in light intensity at that time. By way of an example, the user may desire to reduce the light intensity during the day due to the higher ambient light levels and therefore may use the DIM DOWN control to set the new light intensity level first thing in the morning, then use the PROGRAM button in some manner to program that light intensity level change at that time of the day every day. The user may then set a higher intensity level at night time by using the DIM UP control to increase the light intensity level and then use the PROGRAM button to program that light intensity level at that time every day. There may be a CLEAR control mechanism that may allow a user to clear programmed state changes. It is to be appreciated that the user may program as many on, off and light intensity setting at different times of day as may be programmed into the device. Programming by time of day may provide some cost savings in energy usage when lighting needs to be on most or all of the day. It is to be appreciated that there may be any number of changes in the light output and the light intensity may be set to any level from off to maximum light intensity. In alternate embodiments, the same control may be provided by a communication interface in the bulb or fixture such that similar ON, OFF, DIM UP, DIM DOWN, PROGRAM and the like controls are on a remote control. The external device communicating with and controlling or programming the bulb or fixture may be a computer running a software program, a custom remote control, a building management unit, a lighting circuit control unit etc. and may have the communication interface allowing it to communicate with the bulb or fixture. It is to be appreciated that settings programmed in the bulb or fixture may be stored in non-volatile memory such that when the device is powered down, the programming is not lost. It is to be appreciated that there may be an integrated power source that may allow the real time clock or timers to continue running when power to a wireless light bulb is turned off. In embodiments that are only powered by battery power, the intelligence may also use battery capacity level to set the light intensity output. In such an example, battery power may be rechargeable or non-rechargeable batteries or fuel cells. It is to be appreciated that any wireless power source or any combination of wireless power sources may be used to supply power to or recharge energy storage in the bulb or fixture in connection with the battery powered bulb or fixture controlled based on time of day.

In an embodiment of the UPS light bulb, the UPS light bulb is not in a typical housing such as a standard size bulb, non-standard size bulb, fixture, fluorescent bulb, fluorescent lamp or down light assembly, but is rather an adapter that plugs into an existing fixture that a standard size bulb, non-standard size bulb, fluorescent bulb or lamp would plug into such that this UPS light bulb adapter may provide all of the functionality of the UPS light bulb including a light source in the UPS light bulb adapter in addition to the off the shelf bulbs or lamps plugged into it. By way of an example, the UPS light bulb adapter has a light source in the adapter. The UPS light bulb adapter typically will pass power through to the bulb or lamp plugged into it such that the bulb or lamp may be the light source. When the UPS light bulb adapter detects that power has dropped out (i.e. there is a power outage) or some other characteristic that makes power no longer desirable to use (brownout conditions, electrical surges, overvoltage conditions, voltage sag or flickers, line noise, frequency variations, switching transients, harmonic distortion, etc.), the adapter may turn on its embedded light source powered by the power source integrated into the UPS light bulb adapter. Thus, a UPS light bulb adapter may typically consist of a connector allowing it to plug into a socket, a socket connector allowing a bulb or lamp to plug into it, a housing allowing it to fit into the fixture where it will be installed, a light source, an integrated power source and charging circuitry if needed, power circuitry such as an AC/DC converter, input from a ballast controller or the like, circuitry to monitor the power input and any wireless control that may be used to control the UPS light bulb adapter such as a receiver allowing a remote transmitter to control the UPS light bulb adapter. It is to be appreciated that the light source may be located in a manner to direct light out of an existing fixture to provide light coming out of the existing fixture with the bulb or lamp plugged into it. For example, if a PAR30 light bulb plugs into the UPS light bulb adapter in a fixture and the UPS light bulb adapter contains an LED light source, the one or more LEDs may be mounted on UPS light bulb adapter housing such that the light emitted from the one or more LEDs is pointed to the outer edge of the PAR30 light bulb. When the LED light source of the UPS light bulb adapter is turned on, the light emitted by the LED light source will be from behind the PAR30 light bulb, but will be directed toward the opening between the edge of the PAR30 light bulb and the fixture such that the PAR30 light bulb would obstruct as little of the light as possible. By way of an example, in a six inch recessed fixture, the UPS light bulb adapter is plugged into the Edison socket. An R30 bulb is plugged into the UPS light bulb adapter. The UPS light bulb adapter may switch on the backup light source and integrated power source for any reason. For example, the UPS light bulb adapter may have the circuitry present to monitor the input AC power at the Edison socket. If the UPS light bulb adapter detects that power is not present at the Edison socket, the light source may be turned on. The UPS light bulb adapter may contain a relay or switching circuit such that power to the bulb or lamp plugged in may be opened by the UPS light bulb adapter whether power is present or not. In such a case, the UPS light bulb adapter may make intelligent decisions based on programming, wireless control or sensors on the adapter to switch to the backup light source or a user may explicitly switch over to the backup light source. The UPS light bulb adapter may contain the circuitry to sense the state of the one or more controlling switches or breakers in the lighting circuit in any manner mentioned here in (measuring the impedance, resistance, and/or capacitance at the AC power input, testing for an impedance discontinuity in the path to the AC input etc).

In one use case of an emergency lighting system, the lighting consists of wireless light bulbs or battery powered wireless lighting fixtures that are off grid and may receive transmission from a power outage module or an emergency lighting power outage module such that a detected condition that would require a switchover to emergency lighting, such as a power outage, would trigger a transmission to a detached emergency lighting system consisting of wireless light bulbs or battery powered wireless lighting fixtures containing one or more wireless power sources. They may have a connection to grid power, but typically the detached emergency lighting system will be entirely off grid. The wireless light bulbs or battery powered wireless lighting fixtures may have one or more forms of wireless control. The bulbs or fixtures may have a transceiver that would allow them to wirelessly communicate with one or more disparate wireless light bulbs and battery powered wireless lighting fixtures to enable coordinated operation between more than one bulb and/or fixture. Following this example, an input can be retransmitted within a network of wireless light bulbs and battery powered wireless lighting fixtures, where the network of lighting modules can be dispersed within a geographic area to create a detached emergency lighting system over a large area. By way of an example, an outdoor emergency lighting system may be created that is detached by using battery powered wireless lighting fixtures and a power outage module. Because the battery powered wireless lighting fixtures may be installed anywhere, a user may install them where there are no on grid power connections and still get lighting in an emergency situation. The battery powered wireless lighting fixtures may come in the form of stair lights, spotlights, path lights, exit signs and lighting, stair well lights, floor lights, ceiling lights, hallway lights, sconces etc to provide lighting in an emergency situation. If all of the battery powered wireless lighting fixtures are within range, the power outage module may directly turn them on during an emergency situation. If all of the battery powered wireless lighting fixtures are not in range, a network may be formed to propagate the emergency lighting commands to all of the lights in the detached emergency lighting system. In another example, the emergency lighting system provides egress or exit lighting to meet emergency lighting requirements using wireless light bulbs and/or battery powered wireless lighting fixtures that may be on and/or off grid and directly detect a power outage by monitoring the power connection by detecting a loss of power, by using the switch sense capability or other methods for determining that a switchover to the internal power source is necessary and switching to its internal power source in the emergency situation. In some cases, the bulbs and fixtures may have a transceiver that would allow them to wirelessly communicate with one or more disparate wireless light bulbs and battery powered wireless lighting fixtures to enable coordinated operation between more than one bulb and/or fixture such that some devices may detect the emergency condition and a network of wireless light bulbs and battery powered wireless lighting fixtures may propagate the emergency indication through the network. In an alternate example, the bulbs and/or fixtures used for egress or exit lighting may receive transmission from a power outage module or an emergency lighting power outage module such that a detected condition that would require a switchover to emergency lighting, such as a power outage, would trigger a transmission to the elements of the emergency lighting system consisting of wireless light bulbs or battery powered wireless lighting fixtures containing one or more wireless power sources.

In some embodiments, a wireless light bulb or battery powered wireless lighting fixture may be built into an explosion proof or flame proof housing. The wireless light bulbs or battery powered wireless lighting fixtures may have a connection to on grid power and also have an integrated power source such as rechargeable batteries. In an emergency situation, such as an explosion or a fire in an industrial environment, the wireless light bulb or battery powered wireless lighting fixture may switch over to the integrated power source to continue to provide lighting after the emergency situation for an extended period of time. It is to be appreciated that there may be one or more lenses, reflectors, optical filters, aperture, and so on that are integrated into the housing of the explosion or flame proof wireless light such that the light source may be protected from the cause of the hazard.

In some embodiments, a wireless light bulb or a battery powered wireless lighting fixture used may have an indication of a low battery level. There may be a method to test the bulb or fixture, such as a button that may be pressed to briefly test that the light output powered by an integrated power source is healthy, that may provide an indication of the battery level. In some embodiments where there is an external power source, a button or switch may be used to break the connection of external power into the wireless light bulb or battery powered wireless lighting fixture to perform a test of the operation of the bulb or fixture when powered by the internal power source. In alternate embodiments, the button or switch may be replaced by a remote control and wireless receiver that provides the same operation when the button or switch on the remote control is actuated. By way of an example, a user may walk under a wireless light bulb or battery powered wireless lighting fixture and press a button on the remote control forcing a test of the light, forcing an indication of the battery level to become active or alternately forcing a break in the connection of external power into the bulb or fixture so that the user may determine that the light is operating properly using the integrated power source. In alternate embodiments, the wireless light bulb or battery powered wireless lighting fixture may have a transmitter designed in that may transmit a representation of the battery charge level to allow an external system such as a computer, laptop, handheld computer, dedicated hardware etc. to provide a user with a status on whether the battery power is at an acceptable level. By way of an example, in an emergency lighting system, a battery powered wireless lighting fixture may transmit its battery charge level to a central controlling station that would then provide an alarm to a user when the battery charge level is below a threshold. The user may then replace the batteries. In alternate embodiments, there is one or more colored LEDs or a multicolor LED on the wireless light bulb or wireless lighting module that may provide a visual indication of the battery charge level.

In some embodiments of wireless light bulbs and battery powered wireless lighting fixtures there may be a receiver that may receive an emergency broadcast such as a radio broadcast of the emergency broadcast system. In such embodiments, the bulbs or fixtures that detect the broadcast switch over to a mode to indicate to the users that there is an emergency situation such as blinking the lights. In alternate embodiments, the bulbs or fixtures may receive a local broadcast that a user may make to provide a visual indication provided by the lighting of an event. For example, a user may blink the lights three times to indicate that it is the end of break time and that workers on a break need to return to their stations. In another example, a school may blink lights some number of times in certain areas to indicate that the end of a period or session. In another example, an office building may blink some number of lights continuously to indicate an emergency situation. It is to be appreciated that wireless light bulbs or battery powered wireless lighting fixtures may receive a command and control the light output, color and intensity in any way possible to communicate a message to an audience. Any type of remote control can wirelessly communicate with the wireless light bulbs or battery powered wireless lighting fixtures to control or program this functionality into them. For instance, the remote control can be a stand-alone remote control and/or incorporated into a disparate device (e.g., incorporated into a key fob, a programmable wireless transceiver integrated in an automobile.). Moreover, the remote control can be a personal computer, a cellular phone, a smart phone, a laptop, a handheld communication device, a handheld computing device, a global positioning system, a personal digital assistant (PDA), and/or any other suitable device.

In some embodiments of an emergency lighting system, there may be a UPS light bulb, wireless light bulb or battery powered wireless lighting fixture with a receiver and a remote light sensor transmitter. The remote light sensor transmitter may be configured to detect the level of light and transmit to the UPS light bulb, wireless light bulb or battery powered wireless lighting fixture to turn them on or off. A user may install one or more bulbs or fixtures and place the remote light sensor transmitter in a location where the user knows it should detect a high amount of ambient light. If the remote light sensor transmitter is no longer detecting light, it may mean there is a power outage and the lighting is disabled. The remote light sensor transmitter would then transmit to the UPS light bulb, wireless light bulb or battery powered wireless lighting fixture a command to change state such as switch to back up power, turn on, change the light intensity etc. It is to be appreciated that the remote light sensor transmitter may be detecting lighting that is not a UPS light bulb, wireless light bulb or battery powered wireless lighting fixture. In such a case, the remote light sensor transmitter may be used to switch to an alternate light source for example for the purpose of emergency lighting. In other embodiments, the light sensor is built into the UPS light bulb or wireless light bulb and detects when the lights go off due to a power outage or other reason. In such a case, the light sensor is powered by the integrated power source. When input power is lost, the UPS light bulb or wireless light bulb may detect this because the light sensor will no longer detect light coming out of the UPS light bulb or wireless light bulb at which point the bulb may switch over to the integrated power source until it may detect that input power is restored. Thus, the light sensor, whether remote or built directly into a light, will provide an indication when there is not light coming out and may effect a state change based on that information. In one use case, a remote light sensor transmitter is installed at a six inch recessed fixture where there is an R30 bulb and battery powered wireless lighting path lights are installed around the perimeter of the area. The remote light sensor transmitter is installed in the recessed fixture where it may detect whether light is coming out of that recessed fixture. If the remote light sensor transmitter detects that light is not coming out, it may transmit a command to the path lights installed around the perimeter to turn on. It is to be appreciated that the remote light sensor transmitter may have controls built in such as buttons, switches, dials etc to configure it for operation. For example, a dial may be present to set the threshold ambient light level that would trigger the transmitter to send a message to the lights it is controlling to turn them on, change light intensity etc. In another example, the remote light sensor transmitter may be disabled with a push button to turn off detection when a user does not wish it to be active. In some embodiments, the remote light sensor transmitter has multiple levels of ambient light that it may detect. By way of an example, it may detect when a high intensity discharge (HID) light is on (level 1), a backup or emergency light is on but the HID light is off (level 2) and when all light is off (level 3).

An embodiments of the wireless light bulb may take the form of an exit sign retrofit LED wireless light bulb such that the housing of the bulb is designed to fit into an exit sign (T5 tube, T6 tube etc), but the exit sign retrofit LED wireless light bulb also has a battery embedded in it such that an exit sign may operate without the need for an emergency lighting power circuit or a local power source. When power to the bulb is not detected, the exit sign retrofit LED wireless light bulb will automatically switch to battery power. Battery power may be rechargeable or non-rechargeable. If the battery power is rechargeable, there may be a charging circuit that manages the rechargeable batteries to maintain the charge level at an acceptable level for the exit sign. In alternate embodiments, the integrated power source is a super capacitor or the like. The exit sign retrofit LED wireless light bulb may contain red, green, white or any other color LED that may be desired for illumination.

In embodiments of the wireless light bulb or wireless lighting fixture containing batteries, there may be a heat shield or insulator mounted in a way to keep the temperature generated by the other components in the bulb or fixture, such as the heat sink, from increasing the temperature of the batteries. The heat shield or insulator may be constructed of ceramic, fiberglass or any other known material. In an alternate example, the shield or insulator separating the batteries from the other components may be mounted to the cover with some space left between the batteries and the thermal heat sink. The cover may have some ventilation holes or other methods to allow the heat to escape and keep the temperature of the batteries as low as possible. There may also be a heat shield or insulator through the heat sink and above the heat sink to shield or insulate the batteries from the heat sink and components. In alternate embodiments, there may be a thermal sensor connected to a point where a measurement of the battery temperature may be made and a change in the use of or charging of the batteries may be made. For example, if the battery temperature exceeds some set limit, a measurement of the temperature of the battery may trigger a reduction of the light intensity which would subsequently lower the battery temperature by lowering the current draw on the batteries and the amount of heat generated by the LEDs. In another example, the battery charging current may be reduced in response to the measurement of the battery temperature exceeding some set limit. This is important to optimize the usable life of the batteries in a wireless light bulb or wireless lighting fixture. By way of an example, a thermistor such as an NTC or PTC device or similar temperature measurement method may be attached to the battery to measure the temperature of the battery. Based on the temperature measurement, a change to the operation of the wireless light bulb or wireless lighting fixture may be made to reduce the effect of some heat generating device in the wireless light bulb or wireless lighting fixture such as the current supplied to the LEDs may be reduced, reducing the light intensity but also reducing the amount of heat generated by the LEDs. A change may be made and some time may need to elapse before checking for a subsequent change in temperature before a decision may be made to make another change to reduce temperature. It is to be appreciated that an algorithm may be implemented to optimize the storage and operating temperature of the embedded batteries by changing the behavior of any heat source within the wireless light bulb or wireless lighting fixture. In alternate embodiments, active cooling may be implemented such that the measurement of the temperature of the batteries triggers the use of active cooling. Examples of active cooling are an embedded fan that may be turned on to provide airflow when needed or a thermoelectric cooling device that may convert a temperature difference into a voltage difference such that the heat may be removed from the batteries to their environment based on this conversion.

In one use case of an AC outlet adapter, the AC outlet adapter may be designed with a real time clock and a method that a user may program times during the day when the adapter will turn on and off as well as when the plugged in device will use battery power versus AC input power. The adapter may operate off of and pass through AC power, may contain an integrated wireless power source (batteries for example), a DC/AC inverter and control that is either wireless control or manual control such as a switch on the wireless AC outlet that may turn it on or off. The user may then plug in AC powered devices to the AC outlet adapter to power that device. By way of an example, the time of day AC outlet adapter may contain ON, OFF and PROGRAM pushbuttons. At the specific time of day that the user desires the adapter to automatically turn on, the user presses the ON and PROGRAM buttons simultaneously. A microcontroller, microprocessor, ASIC etc may contain a time source, such as a real time clock or the like, and may contain the intelligence to record that time and a state change based on that time such that every day at that time, the time of day wireless light bulb or battery powered fixture will automatically turn on. At another specific time during the day that the user desires the bulb or fixture to turn off, the user presses the OFF and PROGRAM buttons simultaneously.

In some embodiments, a virtual load control switch may be designed which contains circuitry to act as a load control switch receiving a load control or demand response command from the power company and may transmit over a communication interface to one or more wireless light bulbs or battery powered wireless lighting fixtures to turn off, change light intensity, switch over all or a portion of the load to battery power etc. In some embodiments, the unit may control the wireless light bulbs or battery powered wireless lighting fixtures in an installation in a demand response energy efficiency system, for load control purposes and the like. This virtual load control switch may contain a timer such that after it receives a command from the power company to change to a lower energy consumption state, the virtual load control switch may start a timer and when the timer expires the virtual load control switch will send a command returning to the original state of operation or to another state of operation. The virtual load control switch may communicate with the power company infrastructure in a manner similar to a load control switch containing a relay that the power company may remotely control to cut power to devices that draw a lot of power like appliances, HVACs etc however the load control command would be received by the virtual load control switch and instead control any wireless light bulbs or battery powered wireless lighting fixtures that may be desired. In such a case, the virtual load control switch may be programmable. By way of an example, the virtual load control switch with an RF communication interface may communicate to a network of wireless light bulbs or battery powered fixtures that allows it to communicate with any wireless light bulb or battery powered fixture in the network. In one example, the virtual load control switch may be programmable over the RF communication interface. In another example, the virtual load control switch may have an Ethernet interface on the unit and have an IP address assigned to the interface. A software program running on the unit may allow a user to open a web browser and type in the IP address assigned to the unit. A graphical user interface served by the virtual load control switch may open up providing a method for the user to implement the desired functionality. The virtual load control switch may communicate with a an intelligent electrical meter, smart meter, energy gateway, lighting control software and the like, over an appropriate communication interface using a protocol that allows the virtual load control switch, which controls the installation of wireless light bulbs and battery powered wireless lighting fixtures and meter etc. to exchange information. The virtual load control switch may allow a user to configure that the lighting turns off, that the lighting-changes intensity levels, that the lighting switch some or all of the energy that is used over to an integrated power source in a wireless light bulb. By way of an example, a typical response to a load control command in lighting is to turn off or reduce the light intensity in either case reducing power consumption at the cost of a reduction in the light output. A wireless light bulb with an integrated power source, for example rechargeable batteries, allows a response to the load control command where the wireless light bulb uses stored power to power the light source partly or entirely. If the load control command intended to reduce the light intensity levels, the wireless light bulb may reduce the power consumption from the power company, but maintain the normal light intensity levels (the light intensity level prior to receipt of the load control command) by supplying some power from stored power in the wireless light bulb. In another example, the wireless light bulb turns off all power consumption from the power company and powers the light source only from stored power in the integrated power source. In some embodiments, the virtual load control switch may be designed into a wireless light bulb such that it receives the load control command directly from the power company. In some cases, a wireless light bulb in a network of or a coordinated group of wireless light bulbs may propagate the load control information to other wireless light bulbs such that groups of wireless light bulbs may change state based on the load control command without having to have received it directly.

In alternate embodiments, a virtual load control switch may be designed which contains circuitry to act as a load control switch receiving a load control command from the power company and may transmit over a communication interface to one or more external light socket adapters, AC outlet adapters, AC outlet replacements, AC powered devices, AC circuit with embedded battery device designed with batteries embedded, wall switch or lighting control component and the like to turn off or switch over all or a portion of the load to battery power in the devices. In some embodiments, the virtual load control switch may be designed into a external light socket adapters, AC outlet adapters, AC outlet replacements, AC powered devices, AC circuit with embedded battery device designed with batteries embedded, wall switch or lighting control component and the like such that it receives the load control command directly from the power company.

In some embodiments, demand response may be implemented in wireless light bulbs by designing a receiver into the bulbs that may receive a load shed signal from a lighting panel over existing electrical wiring that the wireless light bulbs may use to either turn off lights, change lighting intensity levels or that the wireless light bulb switch some or all of the energy that is used over to an integrated power source in a wireless light bulb. In one example, the wireless light bulb may reduce the power consumption from the power company, but maintain the normal light intensity levels (the light intensity level prior to receipt of the load control command) by supplying some power from stored power in the wireless light bulbs.

In embodiments of the wireless light bulb or battery powered wireless lighting fixture, the devices may be able to receive commands from smart grid devices (smart meters, energy gateways, lighting control panels, software control systems and the like) and have the intelligence built inside the bulbs or fixtures to implement load control, receive pricing signals and manage demand based on dynamic pricing, reduce usage based on pricing or load reduction signals, allow access remotely to control the lighting installation, allow customers to manage the lighting locally and the like. By way of an example, a pricing signal may be received by one or more wireless light bulbs. A wireless light bulb with an integrated power source may have a pricing threshold set such that below that threshold when the pricing is such that it is advantageous to buy power, the wireless light bulb will consume power in addition to that necessary to power the light source and will charge the integrated power source. The stored power in the integrated power source may then be used at a later time when energy pricing is higher. In some cases, the wireless light bulb will have an upper pricing threshold that triggers the use of stored power and a lower price threshold that triggers the storage of power. In alternate embodiments, the wireless light bulbs contain a grid tie inverter and there is a net metering capability that allows the bulbs to return power to the grid. This ability to control the use of and return of stored power to the grid may be controlled by a smart meter, energy gateway, lighting control panel, software control systems and the like. In one use case, a wireless light bulb is designed as a six inch recessed fixture retrofit with rechargeable batteries embedded. A smart meter may communicate using ZIGBEE with the six inch recessed fixture retrofit wireless light bulb to implement any control mentioned herein. It is to be appreciated that any type of wireless light bulb or any communication interface type herein may be used in conjunction with the claimed subject matter.

In embodiments of external light socket adapters, AC outlet adapters, AC outlet replacements, AC powered devices, AC circuit with embedded battery device designed with batteries embedded, wall switch or lighting control component and the like, the devices may be able to receive commands from smart grid devices (smart meters, energy gateways, lighting control panels, software control systems and the like) and have the intelligence built inside to implement load control, receive pricing signals and manage demand based on dynamic pricing, reduce usage based on pricing or load reduction signals, allow access remotely to control the devices, allow customers to manage the device locally and the like. By way of an example, a pricing signal may be received by one or more devices. A device with an integrated power source may have a pricing threshold set such that below that threshold when the pricing is such that it is advantageous to buy power, the device will consume power in addition to that necessary to power the device and will charge the integrated power source. The stored power in the integrated power source may then be used at a later time when energy pricing is higher. In some cases, the devices will have an upper pricing threshold that triggers the use of stored power and a lower price threshold that triggers the storage of power. In alternate embodiments, the devices contain a grid tie inverter and there is a net metering capability that allows the devices to return power to the grid. This ability to control the use of and return of stored power to the grid may be controlled by a smart meter, energy gateway, lighting control panel, software control systems and the like.

Figure 30:
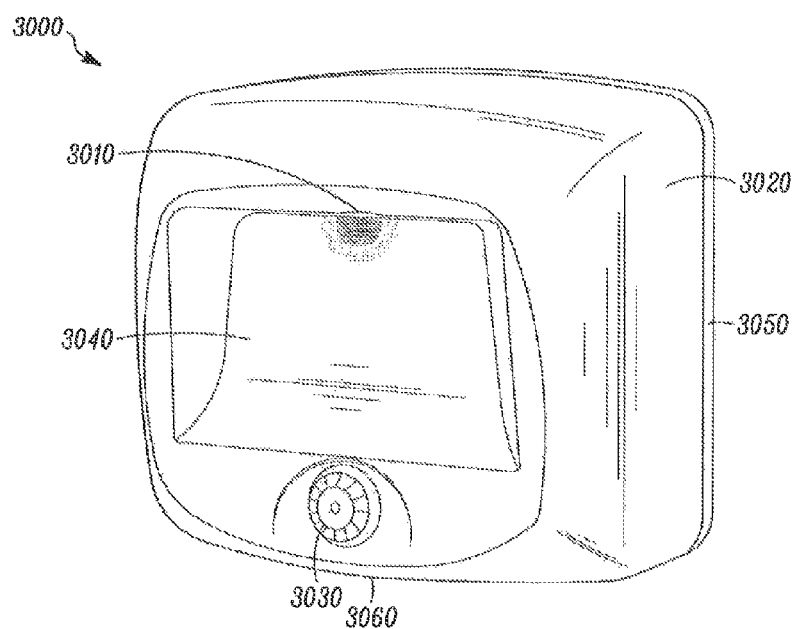
FIG. 30 shows a perspective view of the stair light embodiment of a wireless lighting module.

In another illustrative embodiment, a version of the wireless lighting module targets stair light 3000 applications. With reference to FIG. 30, illustrated is a perspective view of an embodiment of a stair light 3000. In the illustrated embodiment, the stair light 3000 includes a housing 3010, a plurality of LEDs 3020, a motion sensor 3030, logic 3040, a power source 3050 and a light sensor 3060. In the illustrated embodiment, the stair light 3000 includes 1 LED. In alternative embodiments, the stair light may include more LEDs 3020 to provide greater illumination or fewer LEDs 3020 to use less power. It is to be appreciated that the stair light 3000 can include any number of LEDs 3020, and the LEDs 3020 can be positioned at substantially any locations with respect to one another as well as in comparison to the housing 3010. It is noted that the stair light 3000 can be used in a many applications including a step light, a night light, a path light, a deck light and any other application that may benefit from the features and form factor of the stair light 3000. In the illustrated embodiment the LED is the light source and is directed toward the ground to provide light to illuminate a dark area for walking up stairs, in a room to guide a user safely to a desired location, on the posts of a deck to illuminate a deck or in any area where a user needs additional light however alternate embodiments may point the LEDs in any direction that may be required for the application. In the illustrated embodiment, the stair light 3000 illuminates an area of approximately ten square feet. Alternate embodiments may include but are not limited to any known light source including LEDs, compact fluorescent and incandescent bulbs and can illuminate any size area required by the application.

In the illustrated embodiment, the housing 3010 is constructed of plastic. Alternatively, the housing 3010 can be constructed of metal or any other known material. In one embodiment the housing can be waterproof, UV resistant and/or corrosion resistant for use outdoors or difficult environments. In one embodiment (not shown), the housing 3010 includes a mounting device for mounting the stair light, step light or nightlight to a wall, stair well, deck post, or other surface. Exemplary mounting devices include screws, nails, adhesive, suction cups, magnets, VELCRO, fixing posts, flanged heads of fasteners, and other known mounting devices. In this embodiment, the housing 3010 is configured to be mounted on a wall of a room, stairwell, closet, attic, basement, garage, storage area, shed, hallway, stairway, emergency exit path, alley or porch, or in any other indoor or outdoor location where light may be desired. It is to be appreciated that the housing 3010 can be any size and/or shape and is not limited to the depicted illustration (e.g., the housing 3010 can be dome shaped, pyramid shaped, cylindrical, rectangular, square).

Figure 32:
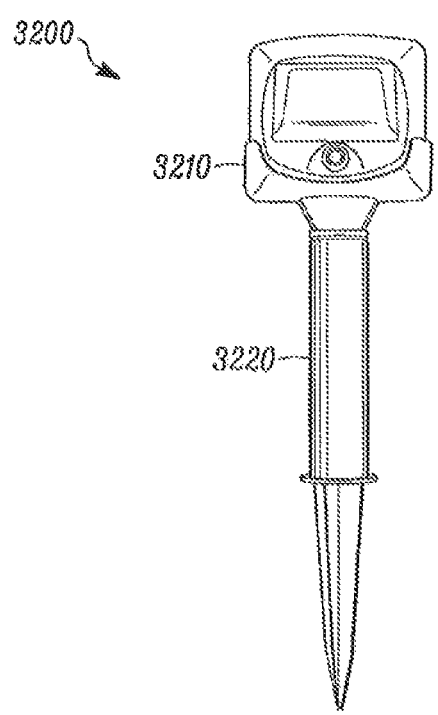
FIG. 32 shows a use scenario of the stair light as a path light.

In one embodiment the housing is mounted on an articulating bracket mounted to a surface that allows the user to mount the light to any angle wall or surface and articulate the light straight up, down or at any angle desired. In another embodiment, the housing can be mounted to a stake or post made of plastic, metal or any other known material allowing any of the mounting devices described to be used to mount the light onto the stake or post. The stake or post can be driven into the ground, can be on a tripod or stand to be free standing or fixed to the area or can be attached to an area in any possible way to create a path light that can illuminate walkways, sidewalks, alleys, or in any other indoor or outdoor location where light might be desired. FIG. 32 shows an example of path light created by mounting the stair light 3210 to a stake 3220 that can be driven into the ground.

Figure 31:
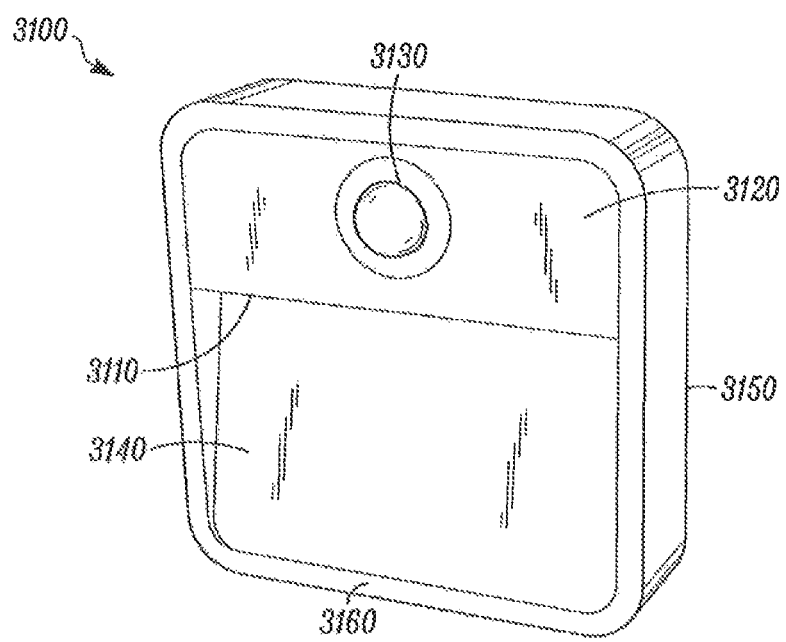
FIG. 31 shows a perspective view of the sensor light embodiment of a wireless lighting module.

As shown in the illustrated embodiment, the stair light 3000 includes a power source 3050, such as a battery. In the illustrated embodiment, the stair light is powered by 3 C batteries. In another illustrated embodiment, as shown in FIG. 31, the sensor light 3100, a smaller version of the stair light that emits less light and is in a smaller housing, three "AA" size alkaline batteries are used as a power source. In the illustrated embodiment, the sensor light 3100 includes a housing 3110, a plurality of LEDs 3120, a motion sensor 3130, logic 3140, a power source 3150, and a light sensor 3160. It should be understood that any number and type of known batteries may be used, including without limitation all known alkaline and nickel-cadmium batteries, depending on size and power requirements. According to another example, the power source can be any number and type of rechargeable batteries and/or non-rechargeable batteries. Pursuant to a further illustration, the power source can be a combination of a solar cell and one or more batteries (e.g., rechargeable, non-rechargeable, . . . ). Thus, for instance, a battery can supplement the power supplied by the solar cell (or vice versa) and/or the solar cell can recharge a battery. In some embodiments of the foregoing arrangement, a solar cell may be diode or-ed with a battery and the battery may be non-rechargeable.

The battery 3050 supplies power to the stair light 3000 to enable installing, moving, replacing, etc. the unit at substantially any indoor or outdoor location while mitigating the need for expensive and time consuming wiring and/or utilization of aesthetically unpleasing and potentially inconvenient cords commonly associated with conventional lighting.

In alternate embodiments the power source may include a fuel cell, such as and without limitation a hydrogen fuel cell, a reformed methanol fuel cell, or the like.

In some embodiments the power to the unit may be powered directly from AC or from a DC input that comes from an external AC to DC converter. In other embodiments, the unit will contain rechargeable batteries such that the unit can be recharged by connecting the unit to an AC power source, cabling to an AC power source or plugging the unit into a recharging base.

With continued reference to illustrated embodiment shown in FIG. 30 the input component is a motion sensor. When the motion sensor 3030 detects motion, logic 3040 determines if the motion is above a predetermined threshold. If the motion is above the predetermined threshold, the logic 3040 instructs an LED controller to turn on at least one LED. The motion sensor will only be operational if the light sensor 3060 detects that detected light is at a low enough level to allow the unit to turn on (i.e. the unit will only work in the dark or whatever low light level is set by the light sensor and its detection circuitry). After the at least one LED is turned on, the logic starts a timer. The logic will then instruct the LED controller to turn off the at least one LED if no motion is detected before the timer reaches a predetermined timer threshold. If motion is detected before the timer reaches the timer threshold, the LED will remain on and the timer will reset to the timer starting point. The illustrated embodiment includes this auto shutoff feature to extend battery life. This feature is factory set via a timer that expires such that after turn on, if there is no reactivation of the control to turn the LEDs on, the unit will automatically turn the LEDs off when the timer expires.

In the illustrated embodiment, the timer consists of an RC electrical circuit that discharges to the factory set voltage threshold over some period of time at which time, if not retriggered, will automatically shut off the LEDs. Other embodiments may have a timer built in any known timer circuit. This feature may be set by toggling or setting a switch, may be dial selectable, may be set by a potentiometer, may be programmable directly or by remote, may be responsive to a battery's level, may include fade-to-off effect and so on. A second feature may have two or more auto shutoff levels set by multiple timers. For example the auto shutoff feature may control the light from bright to dim when the first timer expires and from dim to off when the second timer expires and so on.

The illustrated embodiment includes a circuit that allows the unit to glow at a level such that the unit can be a marker in a dark environment and when motion is detected it turns on to a bright level for illumination to a level that a user can find their way on stairs, steps or where a night light would be desirable. An alternate embodiment would include a circuit that allows the unit to be on at a low light level to illuminate an area with enough light to see the area from a distant and when motion is detected it turns on to a bright level for illumination to a level that a user can find their way on stairs, steps or where a night light would be desirable. In another embodiment, the low light level blinks at some rate to provide a marker until a sensor triggers transitioning to a bright level. In some embodiments, the control of the brightness level at glow, low, bright or any brightness level the user may desire is controlled by a dial, buttons, switches, RF/IR remote or any other known control to allow the user to set the different light levels to the individual user preference.

In the illustrated embodiment, the shape of the hollowed out face in the housing 3010 is designed to enhance the appearance of the glow level of the LEDs as well as better reflect the light when the light is turned to a bright light level. In other embodiments, an optical lens or lenses or reflectors to direct the light, reflect the light or change the viewing angle of the LEDs. The housing of the unit may include any number of optical elements. The optical elements may serve to focus, diffuse, filter, collimate, or otherwise affect light produced by the LEDs 3020. In embodiments, the optical elements may include one or more lenses, reflectors, optical filters, aperture, and so on. The lenses may be fixed, a multiple lens array, adjustable, and so on. The lenses or reflectors may be manually adjustable, motorized with direct control with switches on the unit for adjusting the direction or characteristics of the light source, motorized with a remote control for adjusting the direction or characteristics of the light source through RF or IR control or it may detect motion and automatically adjust the lenses or reflectors to aim the light in the direction of the motion either to illuminate an area or as a deterrent for security reasons or as a deterrent for animals.

In another embodiment, the light can be programmed to fade over time such that the light is activated and slowly fades until it reaches either a glow level or a low light level. An example of this application is a light in the bedroom of a child that is on when they go to bed at night, but fades over time to a glow level or a low light level as they fall asleep. The design can include any controls, methods and circuits by which to achieve multiple light levels. In addition the design may include methods and circuits to achieve constant current control to achieve consistent brightness at the different light levels.

A feature can be added such that when the batteries are detected to reach a predetermined low level of charge, the light will blink to indicate to the user that the batteries need to be replaced. In an alternate embodiment, the light may include a push button with a light bar that would show the battery level when the button is pushed.

The stair light may also include an on/off switch, a push button to disable the sensor from activating the light for some period of time or a push button providing a sleep function that will shut the light off until the next time the light is enabled to operate when the light sensor senses a transition from light to dark. An alternate embodiment could include a sleep/awake button or buttons such that the light can be put into sleep mode either until that button or another button is pushed to transition back to operational or until the next time the light is enabled to operate when the light sensors senses a transition from light to dark. Alternate embodiments may also allow for control of the light by time of day or timer controls such as dials to set when the light is enabled and when it is disabled. The time of day or timer to control the light can be set in any manner can be conceived of.

In the illustrated embodiment, the stair light 3000 includes a passive infrared sensor configured to detect motion. In one embodiment, the passive infrared sensor has a range of approximately 30 feet and a viewing angle of 110 degrees. In alternative embodiments, the passive infrared sensor may have a range and viewing angle of any known passive infrared sensor. In one alternative embodiment, the passive infrared sensor is removably connected to the unit so that a user may connect any appropriate sensor. In some embodiments, the passive infrared sensor may be replaced or enhanced by a radar sensor, an ultrasound sensor, or any and all other form of motion sensor.

In other embodiments, any and all sensors may include a detection threshold or false detection rate that can be configured according to a user's preference. For example and without limitation, a light sensor may be configured to detect when incoming light crosses a user-preferred intensity threshold. A variety of other such examples will be appreciated, all of which are within the scope of the present disclosure.

In the illustrated embodiment, a Fresnel lens enables motion detections. The motion detector includes a Fresnel lens that guides infrared light over the PIR sensor in a substantially repeating pattern as a heat source (such as a person, vehicle, and so on) passes in front of the lens. In embodiments, the Fresnel lens may be selected to provide a desired zone of coverage. It will be understood that a variety of embodiments of motion detectors including the Fresnel lens are possible.

With continued reference to FIG. 30, when the motion sensor 3030 detects motion, logic 3040 determines if the motion is above a predetermined threshold. If the motion is above the predetermined threshold, the logic 3040 instructs an LED controller to turn on at least one LED 3020. After the at least one LED 3020 is turned on, the logic 3040 starts a timer. The logic 3040 will then instruct the LED controller to turn off the at least one LED 3020 if no motion is detected before the timer reaches a predetermined threshold.

The unit can be controlled by any type of input signal that can be leveraged by the logic 3040 to manipulate operation of the LEDs 3020. Thus, the input component can be a radio frequency (RF) receiver that can obtain an RF signal communicated from an RF transmitter (not shown) that can be utilized by the logic 3050 to control operation of the LEDs 3020. According to this example, the RF signal can be deciphered by the input component to effectuate switching the LEDs 3020 to an on or off state, changing a light color or a light intensity provided by the LEDs 3020, and the like. Additionally or alternatively, the input component can be one or more sensors that monitor a condition, and monitored information yielded by such sensor(s) can be utilized to effectuate adjustments associated with the LEDs 3020.

It is to be appreciated that any type of sensor(s) can be utilized in connection with the claimed subject matter instead of or in conjunction with a motion sensor. For example, the sensor(s) can be one or more of infrared sensors, light sensors, proximity sensors, acoustic sensors, motion sensors, carbon monoxide and/or smoke detectors, thermal sensors, electromagnetic sensors, mechanical sensors, chemical sensors, and the like. According to another example, the input component can be a connector, port, etc. that couples to a disparate device, sensor, etc. to receive the input signal.

It is also appreciated that any combination of sensors can be utilized in connection with the claimed subject matter. The illustrated embodiment is a combination of a light sensor that will conserve battery life by only allowing the LEDs to turn on when there is a low level of light in the environment. When there is enough light in the environment, the motion sensor will control the LEDs to turn on when motion is detected. An alternate embodiment includes an RF receiver and motion sensor in the light with an RF transmitter remote that can override motion sensor control of the unit when a user desires that it is turned on for an extended period of time or controlled remotely rather than by motion. In one embodiment, the sensor light 3100 is designed with a motion sensor and an RF receiver. One or more sensor lights 3100 are controlled by either the motion sensors on the lights, by an RF remote control or alternately by an RF wall switch. The RF control element is used to turn on and off both sensor lights. In an alternate embodiment, the remote control element contains a motion sensor and an RF transmitter to send the on and off command to the two sensor lights. In the alternate embodiment, the sensor lights have an RF receiver but may or may not have a motion sensor.

Another alternative embodiment includes one or more units used as stair lights or path lights with an RF receiver as the input component controlling the light source and an RF transmitter remote combined with a motion sensor. An example use of this embodiment is a driveway sensor that detects a car triggering the motion sensor to send an RF transmission to the light when the car enters the driveway. The light can stay on for some user set amount of time, then auto shutoff.

The combination of sensors can also be used to communicate between units and network the units together. For example, the units are a combination of RF transceiver and motion sensor. If one unit detects motion, it sends out a message to all units via its RF transmitter to turn all of the units on. Units can also receive a message via its RF receiver and retransmit it via its RF transmitter to extend the range of lights beyond what is within the range of the initial unit that detected motion. The triggering method can be any method sensor described and the sending of signals from one unit to another can be RF/IF, wired or wireless network or wired with any electrical control mechanism between lights.

In an alternate embodiment, a group of lights that have a light sensor and are controlled by RF/IR are used as path lighting. When the light sensor detects low light levels, the light will be turned on to a glow level marking the path. When the user wants to illuminate the path, expecting visitors for example, an RF remote control or RF wall switch can be used to transmit a signal or control message to the group of lights to turn on to a bright level. The user can also transmit a signal or control message to the light to return them to glow mode or turn them off. An auto shutoff feature can also be included such that after some period of time at the bright level, the light will automatically return to glow mode.

In another embodiment, the stair lights or path lights are used for emergency purposes to light up a walkway when there is a power outage. The stair light or path light has a light source and RF receiver to control the light source. A circuit that can detect when AC power is not present is combined with an RF transmitter in a housing. The RF transmitter unit can be plugged into an electrical socket, hardwired to an AC wall switch prior to the switch, wired directly in at the breaker box or at any point in a power distribution system that a user may want to detect a drop out in power. Upon detecting the loss of AC power at the monitor point, a signal is sent to the lights turning them on, emergency lighting is provided and the path to a safe area is illuminated. In an alternate embodiment, the RF transmitter unit is connected to the residential or commercial building security or safety system. If an alarm is present in the security or safety system that requires emergency lighting, the system will send a command to the lights to turn them on.

In another embodiment, the LEDs or OLEDs are designed into a strip that can be attached to the floor, wall, ceiling, sidewalk, pathway, stairwell or any known walkway or structure. The strip can be attached with screws, nails, adhesive, suction cups, magnets, VELCRO or in any other known way. The strip can be battery powered and have a motion sensor built in such that the light strip will glow all of the time until motion is detected, then turn on brighter. After some period of time, the light strip will go back into glow mode. The light strip can also contain a light sensor such that the light will only turn on if the level of ambient light drops below a certain level. In an alternate embodiment, the light strip contains an RF receiver and is controlled by an RF transmitter remote control. It is to be appreciated that any type of sensor(s) can be utilized in connection with the claimed subject matter instead of or in conjunction with a motion sensor. It should be understood that any type of wireless power defined can be used in connection with the light strip.

An example application is for use in a hallway to light up a path for children during the night to the bathroom. It should also be understood that the strip can be designed such that multiple separate light strips can light up to illuminate an entire path if one strip is activated. In this case, the light strips would need to be networked together and the first activated light strip would need to communicate to the other strips to turn on to a bright level. Another example application is that the light strips have a smoke detector or thermal sensor integrated or receive a message from an alarm system to light up a path to a fire exit. Note that in addition to illumination, the light strips may also use different color LEDs to identify different paths. For example, a path of green LEDs leads to a bathroom and a path of red LEDs leads to a fire exit. It is to be appreciated that the LED strip can be made of multicolor LEDs such that a user can select the color upon installation. In the previous example, there are two identical light strips and there is a switch on the light strip allowing the user to set the light strip to be a green light strip if the switch is in one position or a red light switch if the switch is in another position.

An alternate application is for a media room environment in which either stair lights or strip lights are used and are controlled by RF/IR. The user can allow the lights to glow when the television is on and use the remote to turn on the lights to a brighter level when desired. Alternatively, in addition to RF/IR control directly, the lights can also respond to controls from the television or media system remote control such that when the television is off, the recording is paused or stopped. Upon any other detectable state of the media system, the lights will turn on to a bright light but under normal television viewing conditions, the lights will be in glow mode. It is appreciated, that the media room lighting system can be programmed in any manner it is capable of in response to any detectable state of the media system. It is also to be appreciated that instead of for illumination, the lighting system can be constructed of any color lights possible and the control system can set the color of light. For example, the user can hold down a button on the remote and the lighting system will cycle through the possible light colors until the light is the desired colored at which time the user releases the button on the remote leaving the lighting system at the desired color of light.

Figure 33:
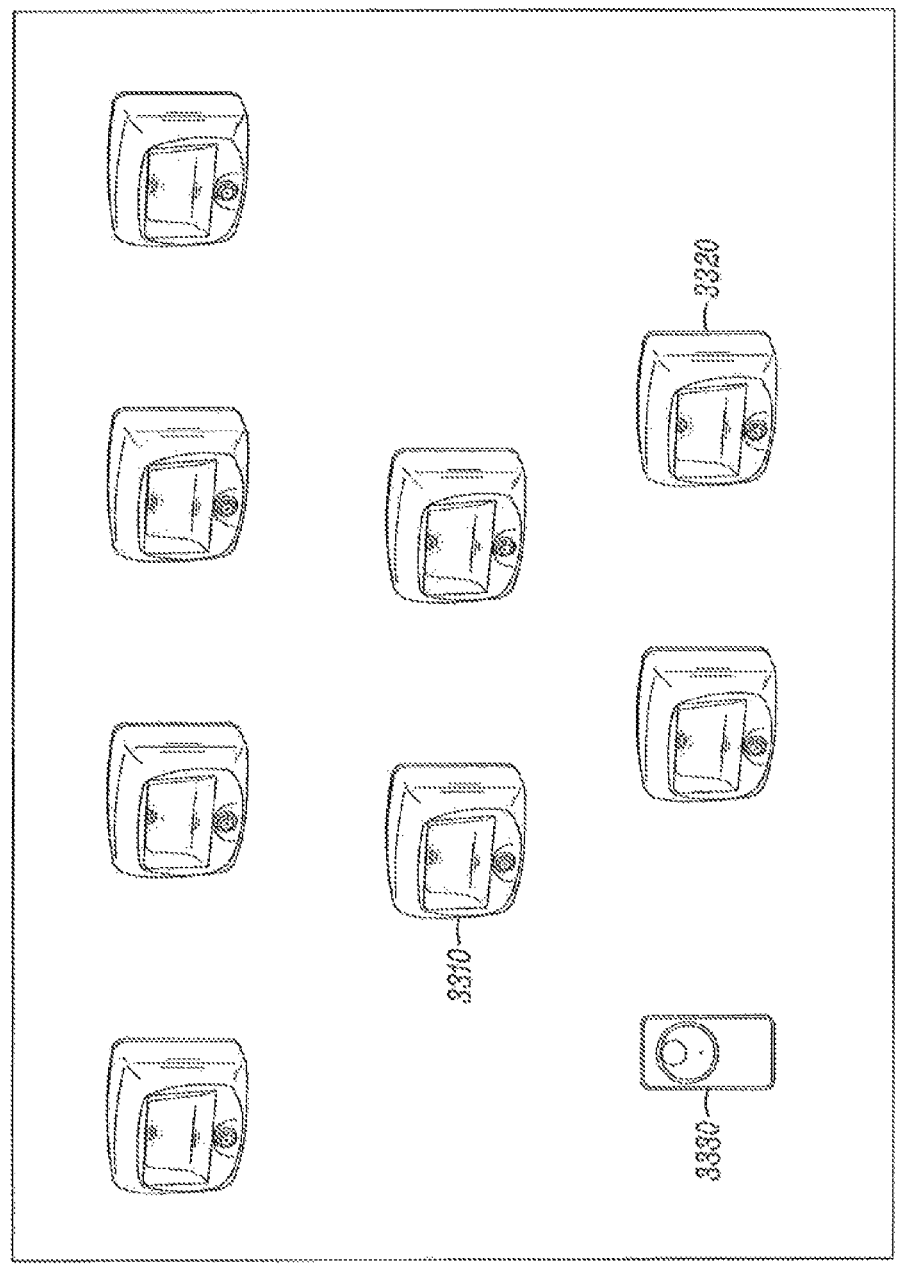
FIG. 33 shows a kit description of a fall prevention kit.

The previously mentioned lights and lighting systems can be grouped into kits to meet specific user applications. A fall prevention kit can be constructed of any mix of stair lights, step lights, night lights, path lights or strip lights in a kit to allow installation in a residential or commercial building to prevent falls. The target market for such a kit is the elderly, but it can be used by any consumer or business motivated to prevent injurious falls. FIG. 33 shows the components of an example fall prevention kit 3300. An example fall prevention kit includes six motion sensor stair lights 3310, two RF controlled stair lights 3320 with one RF remote control 3330 and associated mounting hardware.

A deck lighting kit can also be constructed or assembled. This kit allows a user to install battery powered, RF controlled lights to the posts of the deck such that installation included no AC wiring. An example of this kit would include eight RF controlled stair lights with one RF wall mount switch and associated mounting hardware.

A power outage kit can also be sold. The power outage kit can include all of the lights, batteries and temporary or permanent installation hardware to allow the user to install battery powered lighting throughout their house or business in the event that there is a power outage. An example power outage kit would include a plastic case containing sixteen motion sensor stair lights with batteries that have adhesive on the back to allow it to stick to a wall. In the event of a power outage, the user can quickly walk through their house, for example, and install the lights by remove the backing to the adhesive and attaching the light to the wall.

FIG. 34 shows an example use scenario 3400 of the stair light 3410 on a deck at the top stair to the deck. The motion sensor in the stair light is designed with a wide angle of motion detection such that it will trigger the stair light to turn on when motion is detected on the stairs or on the deck. The stair light also contains a light sensor such that during the day it is turned off but through the night, in low levels of light, the stair light will glow at a low level. This is a key to providing a marker light such that there is enough light for a user to identify the stairs or the edge of the deck where the stairs start. As the user approaches the stairs, the stair light will turn on illuminating to a brighter level enough for the user to see their way. The glow mode 3420 provides additional safety to mark the location of the stairs and edge of the deck and when the stair light turns on to the brighter level as in 3410, the stair light provides additional illumination of the area for the user to see their way.

FIG. 35 shows an example use scenario 3500 of three RF controlled stair lights 3510 mounted on a stair way and an RF remote control 3520 that can be handheld, mounted to the wall by bracket or mounted on two wall screws or nails that controls the three stair lights. An RF remote control with an on button and an off button is shown. When the on button is pushed, a message containing timing and synchronization information, a command and a unique identifier (channel number, unit address number etc.) is transmitted via the RF transmitter circuit. The message transmission can be modulated in any manner known in RF communication (on off keyed, OOK, amplitude shift keyed ASK etc.). That message is received by all three RF controlled stair lights. The stair lights receive the message, demodulate it, process the command and unique identifier and either ignore the command or change state appropriately. In this use scenario, the two commands are turn on and turn off. The unique identifier is hard coded into the remote control and the three stair lights such that the remote controls the three stair lights. The unique identifier can be set by dip switch, rotary switch etc on both the remote control and stair lights. The three stair lights can also learn the unique identifier of the remote control and thereafter respond to that unique identifier. For example, after the batteries are inserted into the stair lights, the unique identifier in the first message received will be stored in the stair lights. Thereafter, that remote control will control those stair lights.

The use scenario can be expanded such that there is no remote control but rather only the three stair lights 3510. In this use scenario, the stair lights contain a motion sensor, RF transmitter and RF receiver. FIG. 35 shows three stair lights. The stair lights can be controlled either by motion detection or by a message received by the RF receiver. Thus, in this use scenario, if motion is detected by one stair light, it can turn its light on and also send a message by it RF transmitter to turn on the other stair lights. The other stair lights will receive a message to turn on by their RF receivers and will subsequently turn on. They can also then send a message by their RF transmitters to turn on other stair lights. This message will also contain an indication that this is a retransmitted message (not from the original source of the motion detection). Thus, a single motion detection by one stair light can turn on many stair lights even those not within range of its RF transmitter. When the originating stair light reaches its auto shutoff time, it can turn its light off and send a message by its RF transmitter to turn off the other stair lights. There are many use scenarios that can result from this function. For example, the stair light can be mounted to a stake as in FIG. 32 to become a path light. Path lights can be installed throughout a large garden or backyard such that motion detection by any of the path lights will result in a flood of messages through the network of path lights to ultimately turn any on any path light within range of any other path light. As another example, several path lights can be installed along a long driveway perhaps several hundred yards long. The path lights can glow and when any path light detects motion, it can send a message to turn on or off the other path lights that will be flooded through the network of path lights. In another example, the stair light can be used and mounted on the perimeter of a large building every 25 feet. If motion is detected at any point around the perimeter of the building all of the stair lights will be illuminated. It is to be appreciated that the scope of messages and how the networking of the lights works can be as sophisticated or simple as is required by the application. It is also to be appreciated that any control mentioned herein can be built into messages and be transmitted through the network of lights.

In alternate embodiments, a network of wireless lighting modules may be created by embedding an RF transceiver with intelligence (microcontroller, microprocessor, integrated circuit etc.) in the wireless lighting modules and using a communication protocol between the modules to control a plurality of modules to accomplish a task, such as described herein. In embodiments there may be other control sources designed to communicate through the network, such as wall switches, key fobs, remote controls, RF adapters, and the like, that can plug into a computer and be controlled by a software program, etc. that may also connect to the network and control wireless lighting modules in the network. By way of an example, the wireless lighting modules may be a combination of RF transceiver and motion sensor. For instance, if one module detects motion, it may send out a message to other modules via its RF transmitter to turn other modules on to a specific brightness level. Modules may also receive a message via its RF receiver and retransmit the message via its RF transmitter to extend the range of lights beyond what is within the range of the initial unit that detected motion. In an alternate example, the control source may be one or more remote controls with a push button that is pressed to turn the lights on and a push button that may be pressed to turn the lights off with a unique identifier that can be set that may select the wireless lighting modules to control, and the like. When either button is pressed, a command may be transmitted by a remote control to the network to control one or more modules that receive it. The command may also be propagated through the network of modules via the RF transceiver in each module to control a portion of or the entire network of wireless lighting modules. It is to be appreciated that the modules may use other types of networking protocol (e.g. routing, flooding, etc.) that may effectively distribute state information through the network of wireless lighting modules. In embodiments, when an auto shutoff timer of the originating wireless lighting module times out, it may send an off command which may also be propagated through the network of light modules to shut them all off. The triggering method may utilize any sensor described herein, the type of control of the wireless lighting module may be any control mentioned herein, and the sending of signals from one wireless light module to another may be RF/IR, wired or wireless network (e.g. WIFI, ZIGBEE, X10 etc.) wired with an electrical control mechanism between wireless lighting modules that can be defined, and the like. It is also to be appreciated that any standard or proprietary protocol (e.g. networking protocols such as IP, TCP, UDP, routing protocols etc. and physical layer protocols such as WIFI, Ethernet, ZIGBEE etc.) may be used to communicate between wireless lighting modules. In embodiments, a unique identifier of a wireless lighting module may be the identifier used in a standard protocol (e.g. IP address, Ethernet or WIFI MAC address, PAN ID, House Code, etc.), a proprietary protocol (set at dip switch, identifier programmed into the wireless lighting module etc.), and the like. It is to be appreciated that the network of lights in the lighting installation may be comprised of wireless lighting modules, wireless light bulbs, a lighting fixture, any mix of these, and the like.

In addition to wireless lighting modules, a repeater device that can communicate with the network of wireless lighting modules may be designed to extend the range of the network. This device may or may not have a light source. The repeater device may be installed in locations with a primary function of extending the range of the network of wireless lighting modules or filling in areas with poor or no coverage. The repeater device may be powered by any form of wireless power mentioned herein or may be designed to connect to AC power. The repeater device may also contain an RF/IR, wired or wireless network (WIFI, ZIGBEE, X10 etc.) or wired with any electrical control mechanism that it requires to be communicate with wireless lighting modules. It is also to be appreciated that any standard or proprietary protocol (e.g. networking protocols such as IP, TCP, UDP, routing protocols etc. and physical layer protocols such as WIFI, Ethernet, ZIGBEE etc.) may be used to communicate between repeaters and wireless lighting modules. The repeater device may communicate with wireless lighting modules, wireless light bulbs or any mix of the two.

In another illustrative embodiment, a version of the wireless lighting module may target wireless remote controlled LED spotlight applications. With reference to FIG. 36, illustrated is a perspective view of an embodiment of an RF Spotlight 3600. In the illustrated embodiment, the RF Spotlight 3600 includes a housing 3610, an adjustable base 3620, a plurality of LEDs 3630, an RF receiver 3640, logic 3650, a power source 3660, a motion sensor 3670 and RF transmitter 3680. In the illustrated embodiment, the RF Spotlight 3600 includes 1 LED. In alternative embodiments, the RF Spotlight may include more LEDs 3630 to provide greater illumination or fewer LEDs 3630 to use less power. It is to be appreciated that the RF Spotlight 3600 can include any number of LEDs 3630, and the LEDs 3630 may be positioned at substantially any locations with respect to one another as well as in comparison to the housing 3610. In the illustrated embodiment the LED is the light source and the housing may be articulated using the adjustable base 3620 then locked in place to direct the light output to illuminate a dark area where a user needs additional light, to direct the motion sensor toward the area where motion needs to be detected or both. Alternate embodiments may point the housing or LEDs in any direction that may be required for the application. In the illustrated embodiment, the RF Spotlight 3600 illuminates an area of approximately three hundred fifty square feet. Alternate embodiments may include but are not limited to any known light source including LEDs, compact fluorescent, incandescent bulbs, and the like, and can illuminate any size area required by the application.

As shown in the illustrated embodiment, the RF Spotlight 3600 includes a power source 3660, such as a battery. In the illustrated embodiment, the spotlight is powered by 3 D batteries. It should be understood that in alternate embodiments any number and type of known batteries may be used, including without limitation all known alkaline and nickel-cadmium batteries, depending on size and power requirements. According to another example, the power source may be any number and type of rechargeable batteries and/or non-rechargeable batteries. Pursuant to a further illustration, the power source may be a combination of a solar cell and one or more batteries (e.g., rechargeable, non-rechargeable, and the like). Thus, for instance, a battery can supplement the power supplied by the solar cell (or vice versa) and/or the solar cell can recharge a battery. In some embodiments of the foregoing arrangement, a solar cell may be diode or-ed with a battery and the battery may be non-rechargeable.

In embodiments, the power source 3660 may supply power to the RF Spotlight 3600 to enable installing, moving, replacing, etc. the unit at substantially any indoor or outdoor location while mitigating the need for expensive and time consuming wiring and/or utilization of aesthetically unpleasing and potentially inconvenient cords commonly associated with conventional lighting.

In alternate embodiments the power source may include a fuel cell, such as and without limitation a hydrogen fuel cell, a reformed methanol fuel cell, or the like. In alternate embodiments, the power source may include a capacitor, array of capacitor, super capacitor, and the like, to store energy to be used as a power source similar to a battery. It should be understood that any type of or combination of wireless power sources described herein may be used in connection with the RF Spotlight 3600.

The illustrated embodiment may include an RF receiver 3640 and motion sensor 3670 in the RF Spotlight 3600 with an RF transmitter 3680 remote that may override motion sensor control of the unit when a user desires that it is turned on for an extended period of time or controlled remotely rather than by motion. In the illustrated embodiment, there is also a light sensor that may disable the RF Spotlight 3600 during the day time. In one alternate embodiment, there may be no light sensor and the RF Spotlight 3600 contains only an RF receiver 3640 and motion sensor 3670. In another alternate embodiment, there may be no motion sensor and the RF Spotlight 3600 contains only an RF receiver 3640. In another alternate embodiment, there may be no RF receiver 3640 and the Spotlight only contains a motion sensor and may contain a light sensor. It is to be appreciated that any combination of wireless control mentioned herein may be used in conjunction with the RF Spotlight 3600.

The illustrated embodiment includes an RF transmitter 3680. The RF transmitter 3680 may send commands to the RF Spotlight 3600 via the RF receiver 3640 to control the logic 3650 to control the light source to turn it on or off, modify the brightness, modify the color or modify any other characteristic of the light source. In the illustrated embodiment, the user may select a channel number on the RF transmitter 3680 and RF Spotlight 3600 through a dip switch on each unit. It is to be appreciated that the channel number may be set by any method mentioned herein. When a button is pushed on the RF transmitter 3680, a message containing the command and channel number may be sent. Any RF Spotlight 3600 within range of the RF transmitter 3680 may receive and respond to the command. In alternate embodiments, the RF Spotlight 3600 may also contain an RF transmitter circuit designed in the spotlight such that a network of RF Spotlights can be created allowing spotlights to be controlled beyond the range of the originating RF transmitter.

Figure 37:
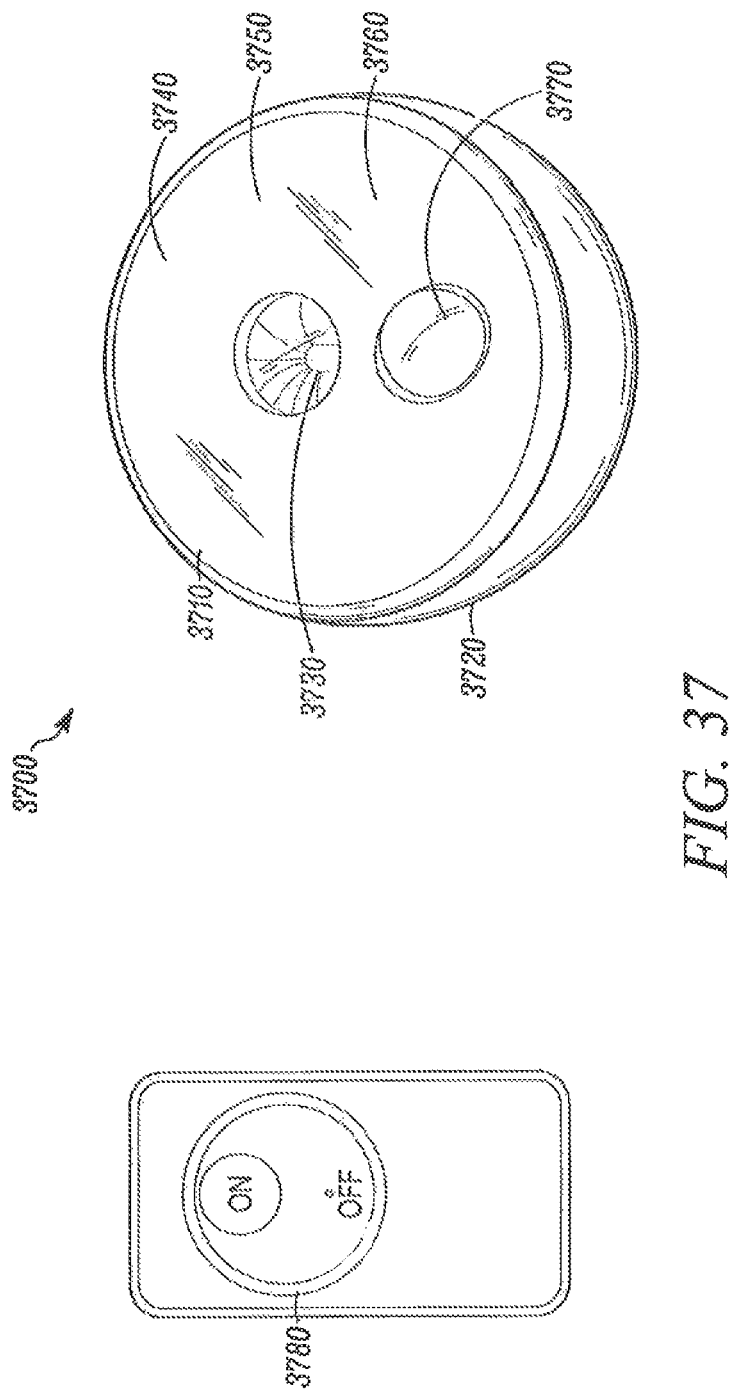
FIG. 37 shows a perspective view of the RF Ceiling Light embodiment of a wireless lighting module.

In another illustrative embodiment, a version of the wireless lighting module may target wireless remote controlled LED ceiling light applications. With reference to FIG. 37, illustrated is a perspective view of an embodiment of an RF Ceiling Light 3700. In the illustrated embodiment, the RF Ceiling Light 3700 may include a housing 3710, a mounting bracket 3720, a plurality of LEDs 3730, an RF receiver 3740, logic 3750, a power source 3760, a motion sensor 3770, RF transmitter 3780, and the like. In the illustrated embodiment, the RF Ceiling Light 3700 may include an LED. In alternative embodiments, the RF Ceiling Light 3700 may include more LEDs 3730 to provide greater illumination or fewer LEDs 3730 to use less power. It is to be appreciated that the RF Ceiling Light 3700 may include any number of LEDs 3730, and the LEDs 3730 may be positioned at substantially any locations with respect to one another as well as in comparison to the housing 3710. In the illustrated embodiment the LED is the light source and the housing 3710 may be removed from a mounting bracket 3720, to replace the batteries for example, then locked back in place for normal operation. It is to be appreciated that there may or may not be a mounting bracket 3720 and that the housing 3710 may be mounted directly to the mounting surface (ceiling, wall etc.) with any mounting mechanism mentioned herein. In alternate embodiments, the mounting bracket 3720 may be an articulating bracket that allows the ceiling light to be mounted to the bracket which may be mounted to the mounting surface. The bracket and thus the ceiling light may be pointed in any direction the user may require to point the LEDs 3730, point the motion sensor 3770 in the desired direction to detect motion or to point the unit in any desired direction as required by the application. In the illustrated embodiment, the RF Ceiling Light 3700 illuminates an area of approximately ninety square feet. Alternate embodiments may include but are not limited to any known light source including LEDs, compact fluorescent, incandescent bulbs, and the like, and may illuminate any size area required by the application.

As shown in the illustrated embodiment, the RF Ceiling Light 3700 includes a power source 3760, such as a battery. In the illustrated embodiment, the ceiling light is powered by 4 C batteries. It is to be appreciated that in alternate embodiments any number and type of known batteries may be used, including without limitation all known alkaline and nickel-cadmium batteries, depending on size and power requirements. According to another example, the power source may be any number and type of rechargeable batteries and/or non-rechargeable batteries. Pursuant to a further illustration, the power source may be a combination of a solar cell and one or more batteries (e.g., rechargeable, non-rechargeable, . . . ). Thus, for instance, a battery may supplement the power supplied by the solar cell (or vice versa) and/or the solar cell can recharge a battery. In some embodiments of the foregoing arrangement, a solar cell may be diode or-ed with a battery and the battery may be non-rechargeable.

In embodiments, the battery 3760 may supply power to the RF Ceiling Light 3700 to enable installing, moving, replacing, etc. the unit at substantially any indoor or outdoor location while mitigating the need for expensive and time consuming wiring and/or utilization of aesthetically unpleasing and potentially inconvenient cords commonly associated with conventional lighting.

In alternate embodiments the power source may include a fuel cell, such as and without limitation a hydrogen fuel cell, a reformed methanol fuel cell, or the like. In alternate embodiments, the power source may include a capacitor, array of capacitor, super capacitors, and the like, to store energy to be used as a power source similar to a battery. It should be understood that any type of wireless power described herein may be used in connection with the RF Ceiling Light 3700.

The illustrated embodiment may include an RF receiver 3740 and motion sensor 3770 in the RF Ceiling Light 3700 with an RF transmitter 3780 remote that may override motion sensor control of the unit when a user desires that it is turned on for an extended period of time, controlled remotely rather than by motion, and the like. In the illustrated embodiment, there may also be a light sensor that disables the RF Ceiling Light 3700 during the day time. In one alternate embodiment, there may be no light sensor and the RF Ceiling Light 3700 may contain only an RF receiver 3740 and motion sensor 3770. In another alternate embodiment, there may be no motion sensor and the RF Spotlight 3700 may contain only an RF receiver 3740. In another alternate embodiment, there may be no RF receiver 3740 and the ceiling light may only contain a motion sensor and may or may not contain a light sensor. It is to be appreciated that any combination of wireless control mentioned herein may be used in conjunction with the RF Ceiling Light 3700.

The illustrated embodiment may include an RF transmitter 3780. The RF transmitter 3780 may send commands to the RF Ceiling Light 3700 via the RF receiver 3740 to control the logic 3750 to control the light source to turn it on or off, modify the brightness, modify the color, or modify any other characteristic of the light source. In the illustrated embodiment, the user may select a channel number on the RF Transmitter 3780 and RF Ceiling Light 3700 through a dip switch on each unit. It is to be appreciated that the channel number may be set by any method mentioned herein.

Alternate embodiments of the RF Ceiling Light may be designed with a different housing that allows installation in a suspended grid ceiling system in locations typically occupied by 1×1, 2×2, 2×4 size ceiling tiles or the like. In this embodiment, the housing may contain any of the features of the RF Ceiling Light, but is designed in a ceiling tile form factor. In alternate embodiments, the housing may be designed in any form factor to be used in place of a fluorescent fixture such as but not limited to high bay fixtures, lay-in fixtures, strip fixtures, under cabinet fixtures, wall mount fixtures, wrap around fixtures, and the like. In embodiments, the wireless lighting module may be designed to fit into place in the socket of the fixture (i.e. as a bulb replacement) or the entire wireless lighting module fixture may be the same form factor as the fluorescent fixtures listed and be applicable for use in similar applications. The ceiling light may contain non-rechargeable or rechargeable batteries. In alternate embodiments, the wireless lighting module may have any type of connector on it that allows for charging by connection to a mating connector and that provides the AC or DC power source. In some embodiments the ceiling light may also allow a connection to an AC input and may contain the required circuitry to convert AC to DC for the light source and wireless control. In some embodiments, the RF Ceiling Light may replace a fluorescent light that is connected to a resistive, reactive, or electronic ballast in which case the ceiling light may also contain circuitry to take the output of the ballast and convert it to DC power suitable for the light source and wireless control. By way of an example, a version of the RF Ceiling Light containing an RF receiver and a motion sensor may be designed into a housing that fits into a 2×2 ceiling grid. The RF Ceiling Light may also contain rechargeable batteries and an AC-to-DC converter and ballast conditioning circuit to connect to a ballast in the case where the RF Ceiling Light is a retrofit of a standard fluorescent fixture. There may also be intelligence (microcontroller, microprocessor, integrated circuit etc.) inside the RF Ceiling Light such that is can be programmed to draw power from the AC input, from the rechargeable batteries, or both. The intelligence may use a real time clock and be programmed to use the AC input and charge the batteries during off peak billing times and use battery power during on peak billing times such that there is an overall cost savings in energy usage. The unit may be programmed for operation based on a Time of Use (TOU) price plan from the energy company. The rechargeable battery capacity may or may not be enough to power the light source for the entire duration of the on peak billing time. In such a case, the intelligence may be able to switch between or control a sharing of the load between battery power and AC input power based on a measurement of battery capacity level, power use from the embedded batteries and from the AC input or any other measurable parameter that allow for an optimization for cost or minimize power consumption of the combined use of embedded batteries and AC input power.

In an alternate embodiment the RF Ceiling Light 3700 may include an RF transmitter built into the ceiling light such that there is both an RF transmitter and RF receiver. In addition, there may or may not be a motion sensor, light sensor, or any other form of wireless control or sensor mentioned herein. A network of RF Ceiling Lights 3700 may be created by embedding an RF transceiver with intelligence (microcontroller, microprocessor, integrated circuit etc.) in the ceiling light and using a communication protocol between the ceiling lights to control any size group of ceiling lights to accomplish any task described herein. Other control sources designed to communicate through the network such as wall switches, key fobs, remote controls, RF adapters, and the like, that can plug into a computer and be controlled by a software program, etc. may also connect to the network and control the ceiling lights in the network. By way of an example, if one ceiling light detects motion, it may send out a message to all ceiling lights via its RF transmitter to turn all of the ceiling lights on to a specific brightness level. When that ceiling light reaches an auto shutoff time, it may then send out a message to one or more ceiling lights via its RF transmitter to turn one or more of the ceiling lights off, set them to a glow, set them to a low level of light, and the like. Ceiling lights may also receive a message via its RF receiver and retransmit it via its RF transmitter to extend the range of lights beyond what is within the range of the initial unit that detected motion. In an alternate example, the control source may be one or more remote controls with a push button that is pressed to turn the lights on and a push button, that is pressed to turn the lights off with a unique identifier that can be set that may select the ceiling light or lights to control, and the like. When either button is pressed, a command may be transmitted by a remote control to the network to control the ceiling lights that receive it. The command may also be propagated through the network of ceiling lights via the RF transceiver in each ceiling light to control a portion of or the entire network of ceiling lights. It is to be appreciated that the ceiling lights may use any type of networking protocol (e.g. routing, flooding etc.) that may effectively distribute state information through the network. In embodiments, when an auto shutoff timer of the originating ceiling light times out, it may send an off command which is also propagated through the network of ceiling lights to shut one or more ceiling lights off. In embodiments, the triggering method may utilize any sensor described herein, the type of control of the ceiling lights may be any control mentioned herein, and the sending of signals from one ceiling light to another may be RF/IR, wired or wireless network (WIFI, ZIGBEE, X10 etc.) or wired with any electrical control mechanism between ceiling lights that can be defined. It is also to be appreciated that any standard or proprietary protocol (e.g. networking protocols such as IP, TCP, UDP, routing protocols etc. and physical layer protocols such as WIFI, Ethernet, ZIGBEE etc.) may be used to communicate between ceiling lights.

By way of an example, the ceiling lights may contain any of the functionality described herein, but also contain a ZIGBEE transceiver and the networking stack necessary to create a ZIGBEE mesh network of ceiling lights. In this case, the RF transmitter and receiver may be compliant to ZIGBEE standards. The networking stack allows for the creation of a mesh network that provides all of the routing and forwarding capabilities found in a typical ZIGBEE network. In addition, a ceiling light may act as a ZIGBEE access point allowing ZIGBEE compliant wireless sensors and devices to connect to the mesh network of ceiling lights. Thus a user may install lighting and a ZIGBEE network with the installation of the ZIGBEE capable ceiling lights. A ZIGBEE compliant adapter that can be plugged into a computer, for example into a USB port of a computer directly or by cable, may allow a software program running on the computer to program functionality into, control, or gather status from the network of ceiling lights. Intelligence designed into the ceiling light (microcontroller, microprocessor, integrated circuit etc.) and use of the ZIGBEE communication protocol between the ceiling lights and with the ZIGBEE adapter connected to the computer may allow software to communicate with the ceiling lights to implement the desired functionality. Thus, the intelligent control may be distributed (e.g. each ceiling light may contain a microprocessor running specific software to implement functionality) or centralized (e.g. software running on the computer can contain most of the intelligence and can control the ceiling lights as required). It is to be appreciated that the ZIGBEE capable ceiling lights may be individually addressable such that the control may be from a single ceiling light up to the entire network of ceiling lights. In addition, if ZIGBEE compliant wireless devices or sensors are also installed, the software program may interface with those devices and provide additional functionality independent of the lighting installation. It is to be appreciated that any wireless lighting module or wireless light bulb may be designed to provide this functionality. In alternate embodiments, the ZIGBEE functionality may be replaced by WIFI, Z-Wave, BLUETOOTH, or any other network that may be useful in a deployment in addition to the lighting installation.

In other embodiments, the wireless lighting module may contain rechargeable batteries such that the module may be recharged by connecting the module to an AC power source such as plugging the module into a recharging base, plugging the module into an AC outlet directly, connecting the module to an AC outlet by cable, plugging a wall transformer to the wall then connecting a DC jack to the wireless lighting module, and the like. In some embodiments, the wireless lighting module may contain circuitry to convert the AC power source to DC and charge the batteries and may or may not power the light source while charging the batteries. In some embodiments, the wireless lighting module may be connected to a DC power source for recharging and as such would have circuitry to make use of the DC power source for recharging the batteries and may or may not power the light source while charging the batteries. By way of an example, an RF ceiling light containing rechargeable batteries may be mounted to the ceiling or wall. When the capacity of the rechargeable batteries dips below a level that the light output is no longer acceptable, a user may unscrew the RF ceiling light and connect it to a charging base. The charging base may be comprised of the circuitry necessary to charge the batteries to capacity as well as the electrical and mechanical configuration necessary to electrically and physically connect a ceiling light to the base. When battery charging is complete, the user may remove the ceiling light from the charging base and return it to the ceiling or wall. In another example, a motion spotlight containing rechargeable batteries that contains a 2.5 mm jack and accepts a DC input can be connected to a wall transformer with a 2.5 mm jack. The DC output of the wall transformer falls within the range of the DC input to charge the batteries. The motion spotlight may contain circuitry required to recharge the batteries and may or may not power the motion spotlight during the charging of the batteries.

In alternate embodiments, the wireless lighting module may have any type of connector on it that allows for charging by connection to a mating connector and that provides the AC or DC power source. In an alternate embodiment, the module may have a USB connector on it that allows for charging by connection to a USB port. In other alternate embodiments any form of wireless power mentioned herein may be used for recharging a wireless lighting module. By way of an example, one or more external thin film solar cells may be connected to the wireless lighting module by cable and provide a DC input to recharge the batteries. It is to be appreciated that any combination of charging approaches may be included in the same wireless lighting module.

In embodiments of a wireless lighting module, there may be a USB connector on the wireless lighting module. The USB connector may also be used as a communication interface to program the wireless lighting module. The wireless lighting module may attach to a computer via USB directly or over a USB cable to connect the module for programming. In other embodiments, different interface types on the module such as Ethernet, IEEE 1394 Fire Wire, Serial Port, or the like, may be used to connect to a computer directly or by cable to program the module. In another example, a programming adapter connected to the computer that the wireless lighting module can plug into or connect to electrically and mechanically in any known manner may serve as the interface to program the module. In other embodiments, an RF or IR adapter that can plug into a computer directly or via a cable using any of the interface types listed may send programming information to one or more wireless lighting modules containing an RF or IR receiver or transceiver to program the wireless lighting modules. In some embodiments, an RF or IR interface to the wireless lighting module may be provided by any intelligent device (e.g. remote control, keypad, PDA, custom circuit design, etc.) with the RF or IR interface, and the ability to communicate with the wireless lighting modules may be used to program the wireless lighting modules. A software program or other device that allows a user to set the state of the module based on timer or time of day, auto shut-off times, color temperature, light strength (glow levels, low light levels, dimming/fading functions), motion sensitivity and listening on times, light sensitivity, level of ambient light controlled by a photocell, energy usage control to control light output based on a desired amount of energy usage over time, network parameters (unique IDs, network IDs, multicast IDs, broadcast IDs, IP address, routing and forwarding information for the network, WIFI SSIDs, ZIGBEE PAN IDs and network IDs, X10 four bit house code, INSTEON address or the like), sensor parameters (detection thresholds for setting the state of the module, timer and time of day settings for when the sensor is active and the like), etc. may be used to connect to and program the state of the module. It is to be appreciated that the wireless lighting module may contain the intelligence necessary to implement the programmable functions.

In addition to controlling the lighting installation, the sensors and intelligence that are designed into wireless lighting modules and communication interface implemented in the wireless light modules may allow the wireless lighting modules installed to also perform functions in addition to lighting. This applies to any type of wireless lighting module mentioned herein. The embedded sensors and intelligence together with the communication interface may allow a single wireless lighting module to implement functionality beyond just lighting. Multiple wireless lighting modules may form a sensor network to add useful functions to a lighting installation where multiple wireless lighting modules may be individually controlled or work as a network to implement one or more functions in addition to lighting. A software program or intelligent device may allow a user to gather status from a sensor in the wireless lighting module or from intelligence designed into the wireless lighting module over the communication interface such as but not limited to temperature, ambient light levels, battery capacity levels, energy usage statistics, on and off time records, sensor detection data and statistics (motion detections per some unit of time, switch actuation information to generate an alarm, smoke detector alarm signals etc.), network usage statistics, information that can be gathered from any sensor or intelligence built into the wireless lighting module, and the like. A software program or intelligent device may also receive a stream of data collected by a sensor of the wireless lighting module over the communication interface such as but not limited to audio from a microphone, a video stream from a camera, pictures from a digital camera, RFID tag read information (i.e. an RFID tag reader), etc. A software program or intelligent device may also control a device inside the wireless lighting module over the communication interface to implement any function such as but not limited to a speaker to make announcements or generate sound, a horn to generate alarms, enable a circuit to energize or de-energize a relay or other switch control, turn on or off a motor, etc.

An intelligent device (microcontroller, microprocessor, integrated circuit etc.) inside the wireless lighting module may also be reprogrammed in the field. By way of an example, a microcontroller may contain flash memory that can be reprogrammed. A new program may be transferred to the microcontroller, for example by an RF communication interface on the wireless lighting module. The new program may then be burned into flash memory by code running on the microcontroller and after programming the wireless lighting module may have a new or added function. In one embodiment, the RF with motion sensor stair light may contain a microcontroller that responds to RF and motion inputs. In embodiments, new microcode may be written for the RF with motion sensor stair light with an additional time of day clock that can be programmed to turn the light on or off at set times during the day. By programming the new microcode into flash memory on the RF with motion sensor stair light, the time of day function may be added.

In one use case, the design may be a battery powered, RF controlled ceiling light wireless lighting module that also contains a motion sensor. For instance, the ceiling lights may be installed in office space, such as in 50 different locations, in addition the lighting that is installed. Software running on a computer may allow a security guard to communicate with and receive status from the ceiling lights. When a ceiling light detects motion, it may send a message to the security guard's computer that motion has been detected and which module has detected the motion (i.e. the location where the motion is). In embodiments, the security guard may receive a message or an alarm that motion has been detected in one of 50 locations which may provide an indication of a security issue or that someone is not where they are supposed to be. In an alternate use case, the ceiling lights may record a statistic called "number of motion detections since last read". A software application may read and compile that statistic from each ceiling light and determine how to most efficiently use the lighting by time of day and usage profile. It may be used not only to control lighting but for occupancy studies in building management, used to record the flow of traffic past a certain point, control the entire lighting installation beyond just the ceiling lights, and the like. In one possible use, the sensor may not control lighting, but may be used for the information provided by the sensor in addition to the light that is used for illumination.

In another use case, the design may be a recessed fixture RFID reader wireless lighting module. In embodiments, they may be installed in office space, such as in 50 different locations, in addition the lighting that is installed. Employees and guests may be issued identification, such as badges that are RFID tags or access cards that can be read by the RFID reader or the access card reader in the wireless lighting module. In addition, RFID tags may be attached to assets for operational efficiency and theft prevention. Software running on a computer may receive the reads of the identifications badges or asset tags and may provide an indication of current or last known location within the building with respect to the location of the RFID reader wireless lighting modules. For example, this may provide the building manager the ability to find, track or review the real time or historical movements of employees, guests or assets. In embodiments, this functionality may be used for safety, security, operational efficiency, etc.

In another use case, a wireless lighting module targeting a porch light application may have a speaker or alarm horn in it that allows announcements to be made (such as in the case of an intercom system which could be two way if the units had a microphone on them) or alarm sounds to be generated in certain emergency situations. In an alternate use case, the porch light may be designed with a microphone and speaker built in. In embodiments, a user may push a button on an intercom box inside of their house to talk or listen to a visitor through the porch light microphone and speaker.

It is to be appreciated that the programmability, ability to gather status or control the lighting, installation, and the like, may apply to wireless lighting modules, wireless light bulbs, wireless lighting fixtures, and the like, or a combination thereof. By way of an example, a lighting installation that includes RF controlled wireless light bulbs, RF ceiling lights, RF path lights and RF spotlights may be installed, and an intelligent lighting control software capable of communicating with all of the lighting components for programming, may gather status and/or control the entire mix of components in the lighting installation.

Alternate embodiments of the wireless lighting module may be designed with a housing that allows installation in a 2 or 4 pin plug-in fluorescent socket, or the like. In this embodiment, the housing may contain any of the features of a wireless lighting module, and in embodiments, designed with a 2 or 4 pin plug that allows it to be installed in a plug in fluorescent light fixture. The wireless lighting module may physically couple with the fixture to support the wireless lighting module, yet electrical current need not flow between the fixture and the wireless lighting module. In such a case, the wireless lighting module may contain one or more wireless power sources that provides power to the module. In embodiments, the wireless lighting module may contain one or more wireless control sources. In some embodiments, the wireless lighting module may replace a fluorescent light that is connected to a resistive, reactive, or electronic ballast in which case the wireless lighting module may also contain circuitry to take the output of the ballast and convert it to DC power suitable for the light source and wireless control. The wireless lighting module may also contain non-rechargeable or rechargeable batteries. In the case where the module contains rechargeable batteries it may contain the circuitry to charge the batteries. There may also be intelligence (microcontroller, microprocessor, integrated circuit etc.) inside the wireless lighting module such that it can be programmed to draw power from the AC input, from the rechargeable batteries, or both. In embodiments, the intelligence may use a real time clock and be programmed to use the AC input and charge the batteries during off peak billing times and use the battery power during on peak billing times such that there is an overall cost savings in energy usage. The unit can be programmed for operation based on a Time of Use (TOU) price plan from the energy company. The rechargeable battery capacity may or may not be enough to power the light source for the entire duration of the on peak billing time. In such a case, the intelligence may be able to switch between battery power and AC input power based on a measurement of battery capacity level, power use from the embedded batteries and from the AC input or any other measurable parameter that allow for an optimization for cost or power consumption of the combined use of embedded batteries and AC input power.

In embodiments, the present invention may provide a power uninterruptable led light with sensor-based control for transferring to internal power in the event of an ac power disruption. As shown in FIG. 38, a system may provide an uninterruptable lighting source, comprising an uninterruptable lighting facility 3802 containing an LED lighting source 3804, a remote control device 3808, and a control facility 3810 for manipulating the light output of the LED lighting source, where the uninterruptable lighting facility provides the LED lighting source in response to a disruption of AC power 3812. A rechargeable energy storage device 3814 integrated with the uninterruptable lighting facility may be capable of supplying power to the uninterruptable lighting facility independent of the AC power, where the recharging may be provided internal to the uninterruptable lighting facility at a time when the AC power may be available. The uninterruptable lighting facility may be disconnected from the AC power and used as a portable lighting device. The rechargeable energy storage device internal to the uninterruptable lighting facility may be a battery, fuel cell, super capacitor, and the like. The uninterruptable lighting facility may provide the lighting source based on information related to a switch setting sensing. The switch setting sensing may be through electrical impedance sensing. The switch setting sensing may be through a detection of AC power at a light switch. The detection may be provided through an RF transmitter embedded into the light switch that detects AC power prior to the switch and detects the state of the switch. The information may be transmitted to the uninterruptable lighting facility to switch over to the rechargeable energy storage device integrated with the uninterruptable lighting facility. The uninterruptable lighting facility may take the form of a light bulb that mounts into a standard lighting fixture. The uninterruptable lighting facility takes the form of a lighting fixture, a retrofit light bulb, a retrofit lighting fixture, a fluorescent tube, a fluorescent lamp, and the like. The remote control device may be an RF receiver for remote control signal input, IR receiver for remote control signal input, wireless communications receiver, a wireless communications transceiver, a wireless network interface device, and the like. The control facility may utilize a control input from an input device, internal timer, internal clock, internal program, and the like, to manipulate the light output of the LED lighting source. The control facility may select a power source for the light source from between AC power and the rechargeable energy storage device. The selection may be controlled by an internal timer or time of day clock, a light sensor sensing the level of ambient light, a motion sensor sensing motion, a stored command received from the remote control device, switches on the housing, detection of power sequencing, commands received over the power lines, and the like. The manipulating may be controlled by at least one of an internal timer or time of day clock, by a light sensor sensing the level of ambient light, by a motion sensor sensing motion, by a command received from the remote, by switches on the housing, by detecting power sequencing, by commands over the power lines, and the like. The control facility controls when the rechargeable energy storage device may be charging. In addition there may be an input device. The input device may be a sensor device. The sensor device may sense IR, temperature, light, motion, acoustic, vibration, and the like. The sensor device may be an electrical power condition sense device. The input device may be an energy input device, including a solar cell, wind turbine, and the like. The manipulating may be switching on the light output, changing the illumination level of the light output, flashing the light output, changing the color content of the light output, and the like. The change to the illumination level of the output to a lower level may consume less power and provides longer battery life.

In embodiments, as shown in FIG. 39, a system may provide an uninterruptable lighting source, comprising an uninterruptable lighting facility 3902 containing an LED lighting source 3904, and a control facility 3908 for manipulating the light output of the LED lighting source. The uninterruptable lighting facility may provide the LED lighting source in response to a disruption of AC power 3910, and a replaceable battery 3912 integrated with the uninterruptable lighting facility may be capable of supplying power to the uninterruptable lighting facility independent of the AC power. The battery may be a rechargeable battery. The battery may be a non-rechargeable battery. There may be a low battery indication on the uninterruptable lighting source.

In embodiments, as shown in FIG. 40, a system may provide an uninterruptable lighting source, comprising an uninterruptable lighting facility 4002 containing an LED lighting source 4004, an input device 4008, an electrical switch condition sense device 4012, and a control facility 4010 for manipulating the light output of the LED lighting source, where the uninterruptable lighting facility provides the LED lighting source in response to a disruption of AC power 4014. A rechargeable energy storage device 4018 may be integrated with the uninterruptable lighting facility that may be capable of supplying power to the uninterruptable lighting facility independent of the AC power, where the recharging may be provided internal to the uninterruptable lighting facility at a time when the AC power may be available. The electrical switch condition sense device may determine the position of an electrical switch through electrical impedance sensing of the electrical switch.

In embodiments, as shown in FIG. 41, a system may provide an uninterruptable lighting source, comprising an uninterruptable lighting facility 4102 containing an LED lighting source 4104, a sensor device 4108, and a control facility 4110 for manipulating the light output of the LED lighting source, where the uninterruptable lighting facility provides the LED lighting source in response to a disruption of AC power 4112. A replaceable battery 4114 may be integrated with the uninterruptable lighting facility that is capable of supplying power to the uninterruptable lighting facility independent of the AC power. The sensor device may sense IR, temperature, light, motion, acoustic, vibration, and the like.

In embodiments, as shown in FIG. 42, a system may provide an uninterruptable lighting source, comprising an uninterruptable lighting facility 4202 containing an LED lighting source 4204, a sensor device 4208, and a control facility 4210 for manipulating the light output of the LED lighting source, where the uninterruptable lighting facility may provide the LED lighting source in response to a disruption of AC power 4212. A rechargeable energy storage device 4214 may be integrated with the uninterruptable lighting facility that is capable of supplying power to the uninterruptable lighting facility independent of the AC power, where the recharging may be provided internal to the uninterruptable lighting facility at a time when the AC power may be available. The sensor device may sense IR, temperature, light, motion, acoustic, vibration, and the like.

In embodiments, as shown in FIG. 43, a system may provide an uninterruptable lighting source, comprising an uninterruptable lighting facility 4302 containing an LED lighting source 4304 and a control facility 4308 for manipulating the light output of the LED lighting source, where the uninterruptable lighting facility may provide the LED lighting source in response to a disruption of AC power 4310. A rechargeable energy storage device 4312 may be integrated with the uninterruptable lighting facility that is capable of supplying power to the uninterruptable lighting facility independent of the AC power, where the recharging may be provided internal to the uninterruptable lighting facility at a time when the AC power may be available. The uninterruptable lighting facility may take the form of a light bulb that mounts into a standard lighting fixture, a fluorescent tube that mounts into a standard fluorescent lighting fixture, a fluorescent lamp that mounts into a standard lighting fixture or a standard fluorescent lighting fixture, and the like. The uninterruptable lighting facility may be disconnected from the AC power and used as a portable lighting device. The rechargeable energy storage device internal to the uninterruptable lighting facility may be a battery, fuel cell, super capacitor, and the like. In addition there may be an input device. The input device may be a sensor device. The sensor device may sense IR, temperature, light, motion, acoustic, vibration, and the like. The sensor device may be an electrical power condition sense device. The input device may be an energy input device, including a solar cell, wind turbine, and the like. The control facility may utilize a control input from an input device, internal timer, internal clock, internal program, and the like, to manipulate the light output of the LED lighting source. The manipulating may be controlled by at least one of an internal timer or time of day clock, a light sensor sensing the level of ambient light, a motion sensor sensing motion, a command received from the remote, switches on the housing, detecting power sequencing, commands over the power lines, and the like. The control facility may select a power source for the light source from between AC power and the rechargeable energy storage device. The selection may be controlled by an internal timer or time of day clock. A light sensor may sense the level of ambient light, motion sensor sensing motion, from the remote control device, by switches on the housing, by detection of power sequencing, by commands received over the power lines, and the like. The control facility may control when the rechargeable energy storage device may be charging. The manipulating may be switching on the light output, changing the illumination level of the light output, flashing the light output, changing the color content of the light output, and the like. The change to the illumination level of the output to a lower level may consume less power and provides longer battery life.

In embodiments, as shown in FIG. 44, the present invention may provide for an externally controllable LED light. A method may be provided for power management in a lighting source, comprising providing an LED lighting facility 4402, where the LED lighting facility includes an LED lighting source 4404, an external control device 4408 for communicating between the LED light facility and an external control source 4418, an internal control facility 4410, an energy storage device 4414, and a connection to AC power 4412. Power usage may be shifted between the AC power and the energy storage device as controlled by the internal control facility and as a result of information received from the external control source. In addition there may be a remote control input device. The energy storage device may be a rechargeable battery, fuel cell, super capacitor, and the like. The internal control device may control a charging of the energy storage device from AC power. The external control source may communicate an external control signal to the external control device that provides light output, time-based, a trigger for a memory-based pre-programmed, a trigger for sensor-based preprogrammed, and the like, control of the LED lighting facility. The external control source may be generated by a utility company, a networked software application, and the like. The external control source may be communicated wirelessly from a network, through the power lines, through a wired network connection, and the like. The LED lighting facility may take the form of a light bulb that mounts into a standard lighting fixture, a lighting fixture, a lighting fixture that has no electrical connection to AC power, a fluorescent tube, a fluorescent lamp, and the like. The energy storage device may be capable of supplying the source of power for the LED lighting facility to provide power management, where power management may be due to AC power being interrupted, to improve energy efficiency, to provide cost savings, due to a need to reduce energy demand, and the like. The energy demand may be a peak energy demand, at predetermined times, at a time when new energy demand may be required at an energy provider, and the like. In addition there may be an internal control facility utilizing a control input from an input device, internal timer, internal clock, internal program, and the like, to manage the power usage. The management of power usage may be through selection of the power source, through control of when a power source may be charging, through the amount of load shared by the power sources, and the like.

In embodiments, the present invention may provide a method of power management of a lighting source, including providing a lighting facility, wherein the lighting facility includes the lighting source, an external control device for communicating between the lighting facility and an external control source, an internal control facility, an energy storage device, and a connection to external power, such as DC power or AC power, and shifting power usage between the external power and the energy storage device as controlled by the internal control facility and as a result of information received from the external control source. In embodiments, the energy storage device may be a rechargeable battery, fuel cell, super capacitor, and the like. The shifting may include sharing power usage between the external power and the energy storage device. Shifting power may be a partial shifting of power from the external power to the energy storage device, where both the external power and the energy storage device as a result of the information received from the external control source would supply power. The lighting facility may take the form of a light bulb that mounts into a standard lighting fixture, a lighting fixture, a retrofit lighting fixture, a fluorescent tube, a fluorescent lamp, and the like. Power management may utilize the energy storage device that is capable of supplying the source of power for the lighting facility to at least one of external power being interrupted and need to reduce energy demand, where the energy demand may be a peak energy demand, at predetermined times, at a time when new energy demand is required at an energy provider. Power management may utilize the energy storage device that is capable of supplying the source of power for the lighting facility to at least one of improve energy efficiency and provide cost savings. Further, the internal control facility may utilize a control input from an input device, internal timer, internal clock, internal program, and the like, to manage the power usage, where the management of power usage may be through selection of the power source, through control of when a power source is charging, through the amount of load shared by the power sources, and the like.

In embodiments, as shown in FIG. 45, a method may provide for the power management in a lighting source, comprising providing an LED lighting facility 4502, where the LED lighting facility may include an LED lighting source 4504, an external control device 4508 for communicating between the LED light facility and an external control source 4520, an internal control facility 4510, an electrical switch condition sense device 4512, an energy storage device 4518, and a connection to AC power 4514. Power usage may be shifted between the AC power and the energy storage device as controlled by the internal control facility and as a result of information received from the external control source. The electrical switch condition sense device may determine the position of an electrical switch through electrical impedance sensing of the electrical switch. In addition there may be an internal control facility utilizing a control input from an input device, internal timer, internal clock, internal program, and the like, to manage the power usage. The management of power usage may be through selection of the power source, through control of when a power source may be charging, through the amount of load shared by the power sources, and the like. The external control source may be generated by a utility company, a networked software application, and the like.

In embodiments, as shown in FIG. 46, a method may be provided for power management in a lighting source, comprising providing an LED lighting facility 4602, where the LED lighting facility includes an LED lighting source 4604, a sensor device 4608, an external control device 4610 for communicating between the LED light facility and an external control source 4620, an internal control facility 4612, an energy storage device 4618, and a connection to AC power 4614. Power usage may be shifted between the AC power and the energy storage device as controlled by the internal control facility and as a result of information received from the external control source. The sensor device may sense IR, temperature, light, motion, acoustic, vibration, and the like.

In addition there may be an internal control facility utilizing a control input from an input device, internal timer, internal clock, internal program, and the like, to manage the power usage. The management of power usage may be through selection of the power source, through control of when a power source may be charging, through the amount of load shared by the power sources. The external control source may be generated by a utility company, a networked software application, and the like.

In embodiments, as shown in FIG. 47, a method may be provided for power management in a lighting source, comprising providing an LED lighting facility 4702, where the LED lighting facility includes an LED lighting source 4704, an input device 4708, an internal control facility 4710, an energy storage device 4714, and a connection to AC power 4712. Power usage may be shared between the AC power and the energy storage device as controlled by the internal control facility and as a result of a program resident with the internal control facility and an external control signal received by the input device. The input device may receive a program control input to alter the program. The sharing may provide power to the LED lighting facility from both the AC power and the energy storage device. The external control signal may be generated by a utility company, a networked software application, and the like. The external control signal may be communicated wirelessly from a network, through the power lines, through a wired network connection, and the like. In addition there may be the internal control facility utilizing a control input from an input device, internal timer, internal clock, internal program, and the like, to manage the power usage. The management of power usage may be through selection of the power source, through control of when a power source may be charging, through the amount of load shared by the power sources, and the like.

Figure 48:
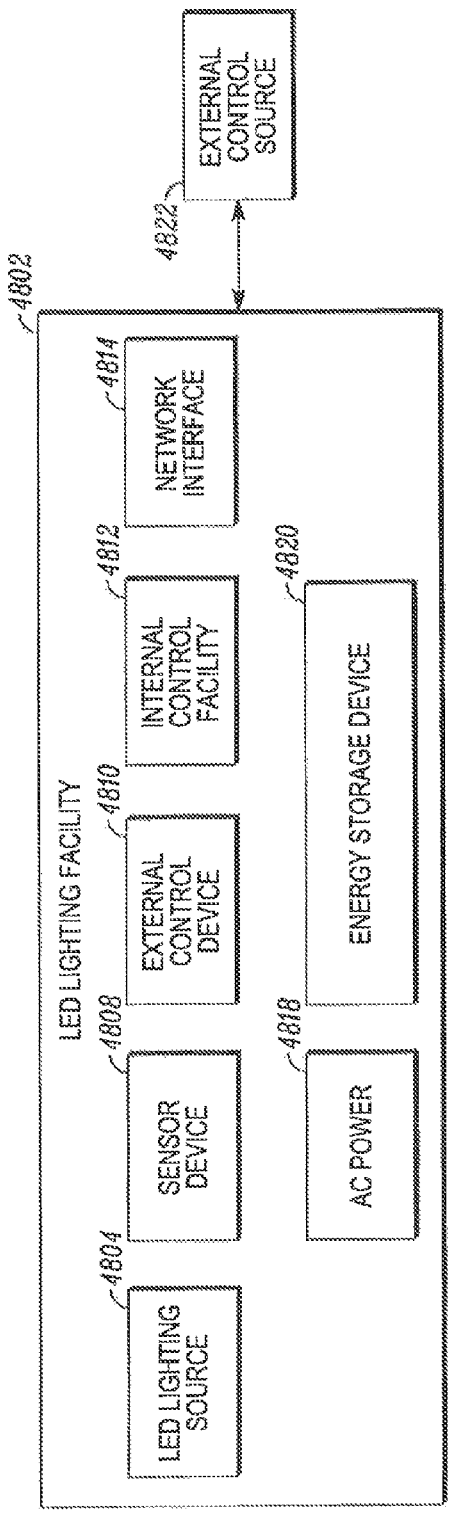
FIG. 48 shows an embodiment for an externally controllable light with external control, internal control, sensor, AC power, battery, and network interface.

In embodiments, as shown in FIG. 48, a method may be provided for a method of power management in a lighting source, comprising providing an LED lighting facility 4802, where the LED lighting facility may include an LED lighting source 4804, a sensor device 4808, an external control device 4810 for communicating between the LED light facility and an external control source 4822, an internal control facility 4812, a network interface 4814, an energy storage device 4820, and a connection to AC power 4818. Power usage may be shifted between the AC power and the energy storage device as controlled by the internal control facility and as a result of information received from the external control source. The sensor device may sense IR, temperature, light, motion, acoustic, vibration, and the like. In addition there may be an internal control facility utilizing a control input from an input device, internal timer, internal clock, internal program, and the like, to manage the power usage. The management of power usage may be through selection of the power source, through control of when a power source may be charging, through the amount of load shared by the power sources, and the like. The external control source may be generated by a utility company, a networked software application, and the like. The network interface may be a wireless network interface, wired network interface, interface to the Internet, local area network interface, and the like. The network may be embodied by a network of appliances, where at least one appliance in the network may be an LED lighting facility. The LED lighting facility may receive control and programming over the network. The LED lighting facility may receive data destined for another LED lighting facility or the external control device and may transmit data to route or forward that data through the network to the destination LED lighting facility or external control device.

Figure 49:
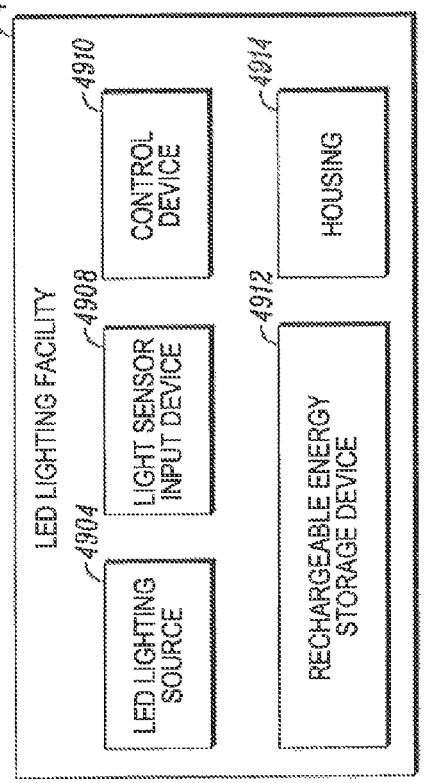
FIG. 49 shows an embodiment for remote control wireless light with daylight harvesting, control, and battery.

In embodiments, the present invention may provide for a remote control wireless LED light bulb. As shown in FIG. 49, a lighting system may be provided, comprising a wireless LED lighting facility 4902 containing an LED lighting source 4904, a light sensor input device 4908, an internal rechargeable energy storage device 4912, and a control facility 4910 for manipulating the light output of the LED lighting source, where the wireless LED lighting facility may be powered by the internal rechargeable energy storage device. A housing 4914 may be provided for the wireless LED lighting facility that takes the form of a light bulb that mounts into a standard lighting fixture. The light sensor input device may provide a measurement of the amount of ambient light in an area. The wireless LED lighting facility may take the form of a light bulb that mounts into a standard lighting fixture, a fluorescent tube that mounts into a standard fluorescent lighting fixture, a fluorescent lamp that mounts into a standard lighting fixture or a standard fluorescent lighting fixture, and the like. The LED lighting facility may take the form of battery powered lighting fixture. The wireless LED lighting facility may be provided AC power to recharge the internal rechargeable energy storage device through a wired AC connection of the standard lighting fixture. The wireless LED lighting facility may be provided DC power to recharge the internal rechargeable energy storage device through a wired DC connection of the standard lighting fixture. The wireless LED lighting facility may be removed from the standard lighting fixture to become a portable wireless LED lighting facility. The input device may be an energy input device that provides energy to recharge the internal rechargeable energy storage device. The input device may be a solar cell, wind turbine, and the like. The control facility may utilize a control input from an input device, internal timer, internal clock, internal program, and the like, to manipulate the light output of the LED lighting source. The control input may be the reading of the ambient light level from the light sensor. The light output of the LED light source may be manipulated to maintain a constant value of light intensity based on the measurement of ambient light level plus light output level. The control facility may select a power source from between AC power and the rechargeable energy storage device. The control facility may control when the rechargeable energy storage device is charging. The control facility may control how power is shared between the rechargeable energy storage device and AC power. The manipulating may be switching on the light output, changing the illumination level of the light output, flashing the light output, changing the color content of the light output, and the like. In addition there may be a remote control facility.

Figure 50:
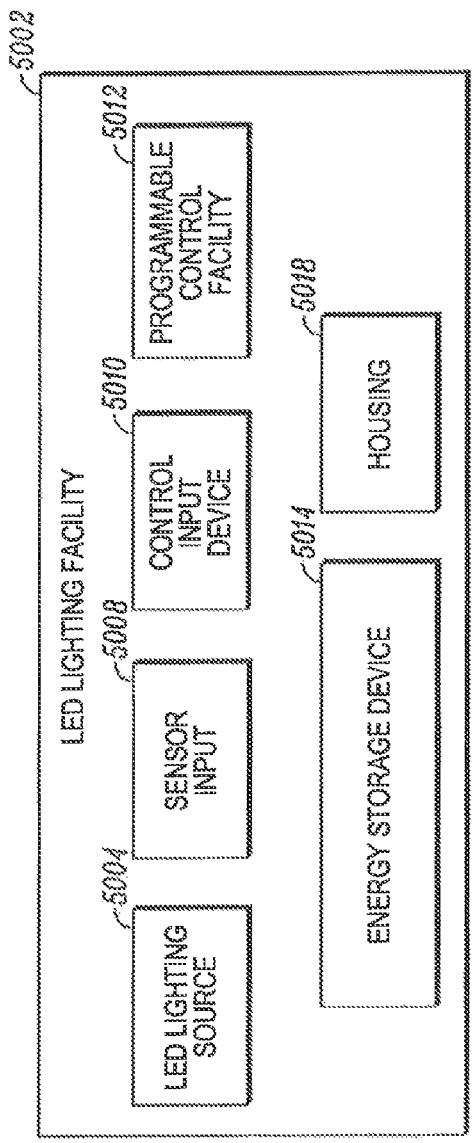
FIG. 50 shows an embodiment for remote control wireless light with sensor, programmable control, and battery.

In embodiments, as shown in FIG. 50, a lighting system may be provided, comprising a wireless LED lighting facility 5002 containing an LED lighting source 5004, a sensor input 5008, a control input device 5010, an internal energy storage device 5014, and a programmable control facility 5012 for manipulating the light output of the LED lighting source. A housing 5018 may be provided for the wireless LED lighting facility that takes the form of a light bulb that mounts into a standard lighting fixture. The wireless LED lighting facility may take the form of a light bulb that mounts into a standard lighting fixture, a fluorescent tube that mounts into a standard fluorescent lighting fixture, a fluorescent lamp that mounts into a standard lighting fixture or a standard fluorescent lighting fixture, and the like. The programmable control facility may be programmed through the control input device. The input device may be a remote control, a wireless input device, a network input device, and the like. The programmable control facility may utilize the sensor input in programmable control. A programmability of the programmable control facility may be through the user. The programmable control facility may incorporate learned behavior as part of its operational control. The control input device may be a remote control input device. The sensor device may sense IR, temperature, light, motion, acoustic, vibration, and the like.

Figure 51:
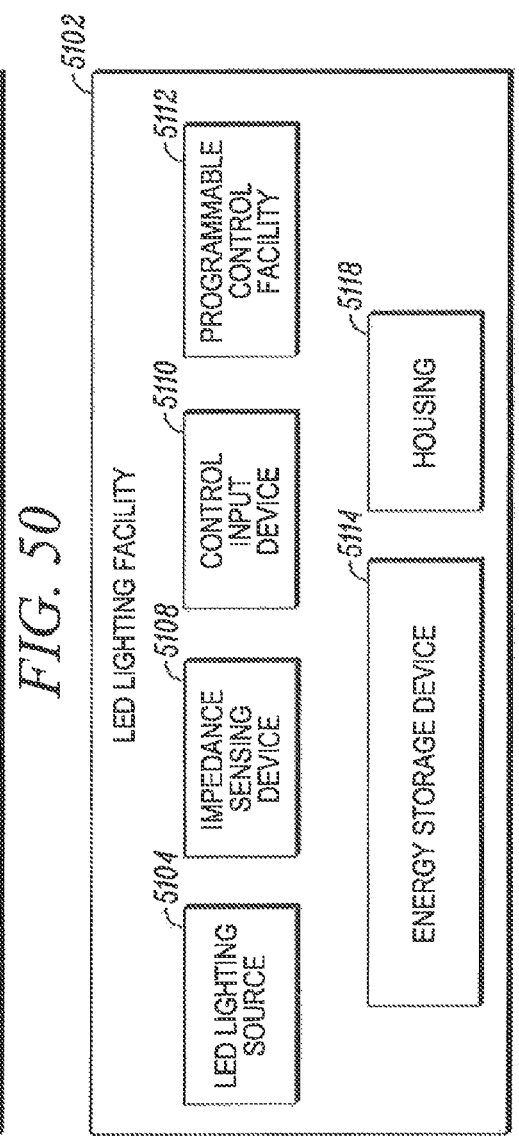
FIG. 51 shows an embodiment for remote control wireless light with impedance sensing, control, programmability, and battery.

In embodiments, as shown in FIG. 51, a lighting system may be provided, comprising a wireless LED lighting facility 5102 containing an LED lighting source 5104, an impedance sensing device 5108, an control input device 5110, an internal energy storage device 5114, and a programmable control facility 5112 for manipulating the light output of the LED lighting source. A housing 5118 may be provided for the wireless LED lighting facility that takes the form of a light bulb that mounts into a standard lighting fixture. The wireless LED lighting facility may take the form of a light bulb that mounts into a standard lighting fixture, a fluorescent tube that mounts into a standard fluorescent lighting fixture, a fluorescent lamp that mounts into a standard lighting fixture or a standard fluorescent lighting fixture, and the like. The programmable control facility may be programmed through the control input device. The input device may be a remote control, a wireless input device, a network input device, and the like. The programmable control facility may utilize the sensor input. A programmability of the programmable control facility may be through the user. The programmable control facility may incorporate learned behavior as part of its operational control. The control input device may be a remote control input device. The sensor device may sense IR, temperature, light, motion, acoustic, vibration, and the like.

In embodiments, as shown in FIG. 52, a system may be provided for power management of a lighting facility 5202, comprising an LED lighting source 5204, a remote control input device 5208 for communicating between the lighting facility and a user, an input device 5210 for receiving information to aid in the power management of the lighting facility, a programmable control facility 5212 for manipulating the light output of the lighting source to decrease the energy usage of the lighting facility, and a source of power 5214 for the LED lighting facility, where the lighting facility may include the LED lighting source, the remote control input device, the control facility, and the source of power. The programmable control facility may utilize a control input from an input device, internal timer, internal clock, internal program, learned behavior, and the like, to manipulate the light output of the LED lighting source. The decrease in energy usage may be due to an increase in energy efficiency. The decrease in energy usage may be due to a change in an energy usage profile of the LED lighting facility. The energy usage profile may be energy usage of the LED lighting facility over time. The change in an energy usage profile may be due to an input from the input device. The input may be a sensor input, a control signal from a user, a control signal from a network, a signal from a second LED lighting facility, and the like. The LED lighting facility may take the form of a light bulb that mounts into a standard lighting fixture. The LED lighting facility may take the form of a light bulb that mounts into a standard lighting fixture, a fluorescent tube that mounts into a standard fluorescent lighting fixture, a fluorescent lamp that mounts into a standard lighting fixture or a standard fluorescent lighting fixture, and the like. The LED lighting facility may take the form of a lighting fixture. The lighting fixture may have no electrical connection to AC power. The lighting facility may take the form of battery powered lighting fixture. The source of power may be AC power. The source of power may be DC power. The source of power may be a rechargeable energy storage device that may be internal to the LED lighting facility. The rechargeable energy storage device may be a battery, fuel cell, super capacitor, and the like. The source of power may be AC or DC power, where the AC or DC power provides charge to a rechargeable energy storage device integrated within the LED lighting facility. The rechargeable energy storage device may be capable of supplying the source of power for the LED lighting facility if AC power may be interrupted. The input device may be a control input device, including an RF receiver for remote control signal input, IR receiver for remote control signal input, wireless communications receiver, a wireless communications transceiver, a wireless network interface device, a sensor (such as an IR, temperature, motion, acoustic, vibration, sensor), a switch, an electrical power condition sense device, and the like. The input device may be an energy input device, including a solar cell, wind turbine, and the like.

In embodiments, as shown in FIG. 53, a lighting system may be provided, comprising a wireless LED lighting facility 5302 containing an LED lighting source 5304, a energy harvesting input device 5308, an internal rechargeable energy storage device 5314, a control input device 5310 and a control facility 5312 for manipulating the light output of the LED lighting source, where the wireless LED lighting facility may be powered by the internal rechargeable energy storage device which is recharged by the energy harvesting input device. A housing 5318 may be provided for the wireless LED lighting facility that takes the form of a light bulb that mounts into a standard lighting fixture. The wireless LED lighting facility may take the form of a light bulb that mounts into a standard lighting fixture, a fluorescent tube that mounts into a standard fluorescent lighting fixture, a fluorescent lamp that mounts into a standard lighting fixture or a standard fluorescent lighting fixture, and the like. The energy harvesting input device may be a solar cell, a device that capture radio frequency energy, a device that converts kinetic energy to electrical energy, a device that converts thermal energy to electrical energy, a device that converts wind to electrical energy, and the like. The wireless LED lighting facility may be provided power to recharge the internal rechargeable energy storage device through the energy harvesting input device. The wireless LED lighting facility may be removed from the standard lighting fixture to become a portable wireless LED lighting facility. The input device may be an energy input device that provides energy to recharge the internal rechargeable energy storage device. The input device may be a solar cell, wind turbine, and the like. The control input device may be a remote control input device. The control input device may be a sensor device that senses IR, temperature, light, motion, acoustic, vibration, and the like. The control facility may utilize a control input from an input device, internal timer, internal clock, internal program, and the like, to manipulate the light output of the LED lighting source. The control facility may select a power source from between energy harvesting power source and the rechargeable energy storage device. The control facility may controls when the rechargeable energy storage device is charging. The control facility may control how power may be shared between the rechargeable energy storage device and energy harvesting power source. The manipulating may be switching on the light output, changing the illumination level of the light output, flashing the light output, changing the color content of the light output, and the like. The control input device may be a remote control input device. The control input device may be a sensor device that senses IR, temperature, light, motion, acoustic, vibration, and the like.

In embodiments, as shown in FIG. 54, a system may be provided for power management of a lighting facility 5402, comprising an LED lighting source 5404, a remote control input device 5408 for communicating between the lighting facility and a user, an input device 5410 for receiving information to aid in the power management of the lighting facility, a programmable control facility 5412 for manipulating the light output of the lighting source to decrease the energy usage of the lighting facility, where the program of the programmable control facility utilizes learned behavior in executing control. A source of power 5414 may be provided for the LED lighting facility, where the lighting facility includes the LED lighting source, the remote control input device, the input device, the programmable control facility, and the source of power. The learned behavior may be behavior learned from inputs to at least one of the remote control input device and the input device. The learned behavior may be incorporated into a program uploaded to the programmable control facility. The programmable control facility utilizes a control input from an input device, an internal timer, internal clock, internal program, learned behavior, and the like, to manipulate the light output of the LED lighting source. The decrease in energy usage may be due to an increase in energy efficiency. The decrease in energy usage may be due to a change in an energy usage profile of the LED lighting facility. The energy usage profile may be energy usage of the LED lighting facility over time. The change in an energy usage profile may be due to an input from the input device. The input may be a sensor input, a control signal from a user, a control signal from a network, a second LED lighting facility, and the like. The input device may be a control input device, including an RF receiver for remote control signal input, IR receiver for remote control signal input, wireless communications receiver, a wireless communications transceiver, a wireless network interface device, a sensor (e.g. IR, temperature, motion, acoustic, vibration sensor), a switch, an electrical power condition sense device, and the like.

In embodiments, as shown in FIG. 55, a lighting system may be provided, comprising a wireless LED lighting facility 5502 containing an LED lighting source 5504, a motion sensor 5508, an internal rechargeable energy storage device, an AC power connection, and a control facility, where the control facility 5510 may be programmable. A housing 5514 may be provided for the wireless LED lighting facility that takes the form of a light bulb that mounts into a standard lighting fixture, wherein the source of power 5512 to the wireless lighting facility may be determined through programming in the control facility. The light bulb may take the form of a standard light bulb, where a standard light bulb may be at least one of a standard size light bulb, such as a PAR30, PAR38, A19, R30, MR16, and the like. The programmability may be through switches integrated with the housing. The programmability may be stored in a program internal to the LED lighting facility. The programmability may enable the LED lighting facility to operate as a smart night light that may have multiple light intensity levels as determined by programming. The programmability may control the source of power. The source of power may be a shared power between the internal rechargeable energy storage device and the AC power. The determining may be automatic.

Figure 56:
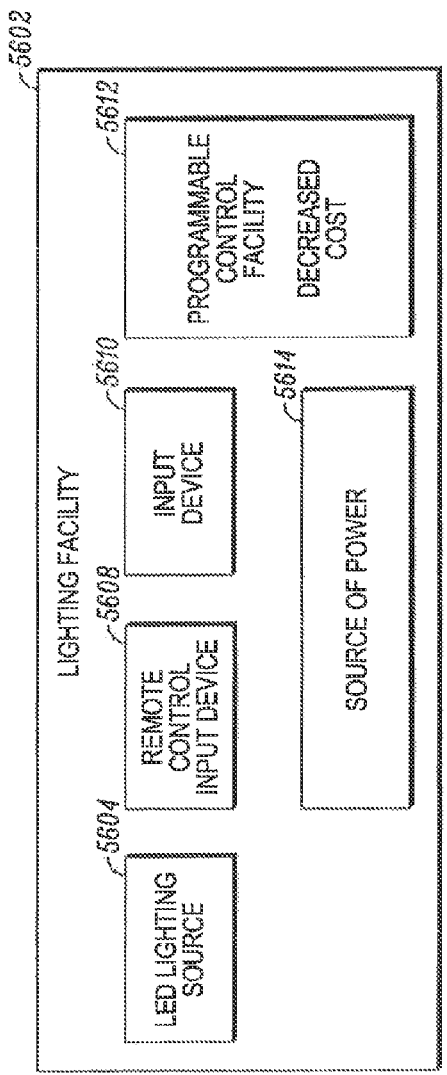
FIG. 56 shows an embodiment for remote control wireless light with power management control, programmability with learned behavior, remote, and battery.

In embodiments, as shown in FIG. 56, a system may be provided for power management of a lighting facility 5602, comprising an LED lighting source 5604, a remote control input device 5608 for communicating between the lighting facility and a user, an input device 5610 for receiving information to aid in the power management of the lighting facility, a programmable control facility 5612 for manipulating the light output of the lighting source to decrease the cost of using the lighting facility, where the program of the programmable control facility utilizes learned behavior in executing control. A source of power 5614 may be provided for the LED lighting facility, where the lighting facility may include the LED lighting source, the remote control input device, the input device, the programmable control facility, and the source of power. The learned behavior may be behavior learned from inputs to at least one of the remote control input device and the input device. The learned behavior may be incorporated into a program uploaded to the programmable control facility.

Figure 57:
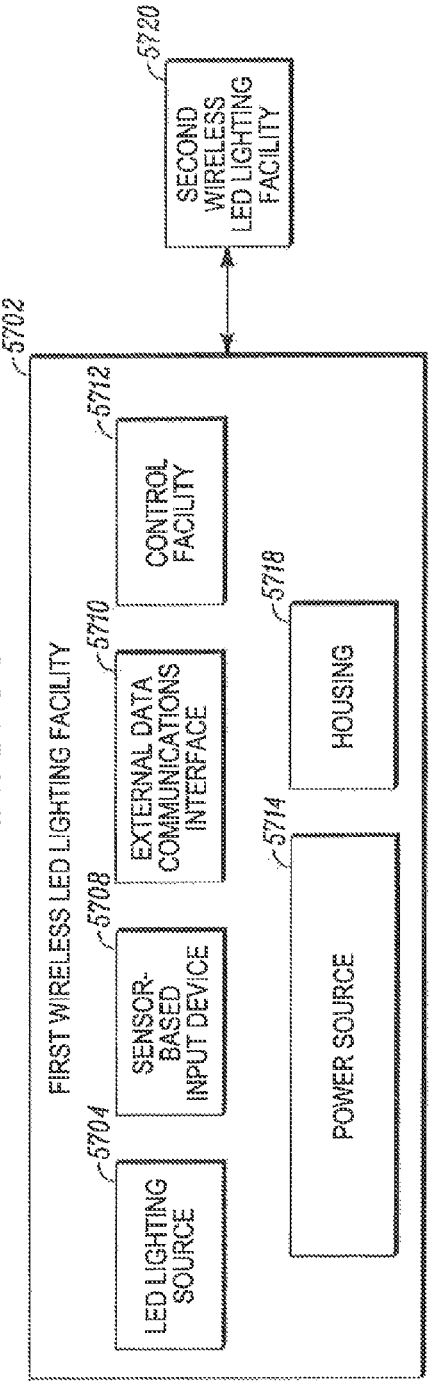
FIG. 57 shows an embodiment for a networked light with sensor input.

In embodiments, the present invention may provide a wireless networked LED light with sensor-based control. As shown in FIG. 57, a system may be provided for coordinating the operation of a plurality of wireless lighting sources, comprising a first of a plurality of wireless LED lighting facilities 5702 containing an LED lighting source 5704, a sensor-based input device 5708, an external data communications interface 5710, a power source 5714, and a control facility 5712 for manipulating the light output of the LED lighting source, where the manipulating may be in part determined by data received from a second of the plurality of wireless LED lighting facilities 5720 through the external data communications interface. A housing 5718 may be provided for each of the plurality of wireless LED lighting facilities that takes the form of a light bulb that mounts into a standard lighting fixture. The wireless LED lighting facility may take the form of a light bulb that mounts into a standard lighting fixture, a fluorescent tube that mounts into a standard fluorescent lighting fixture, a fluorescent lamp that mounts into a standard lighting fixture or a standard fluorescent lighting fixture, and the like. The power source may be AC power through the standard lighting fixture. The wireless LED lighting facility may take the form of a lighting fixture. The power source may be AC power hardwired to the lighting fixture. The wireless LED lighting facility may take the form of battery powered lighting fixture. The power source may be an internal energy storage device. The energy storage device may be a battery. The energy storage device may be a rechargeable energy storage device. The rechargeable energy storage device may be recharged by an AC power connection through the standard lighting fixture.

Figure 58:
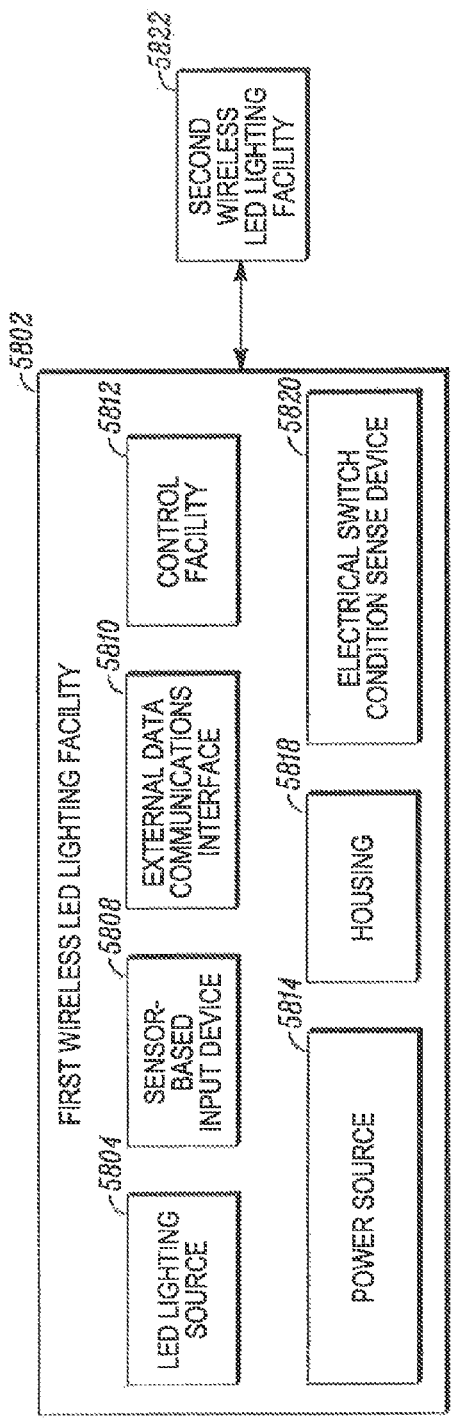
FIG. 58 shows an embodiment for a networked light with sensor input and impedance sensing.

In embodiments, as shown in FIG. 58, a system may be provided for coordinating the operation of a plurality of wireless lighting sources, comprising a first of a plurality of wireless LED lighting facilities 5802 containing an LED lighting source 5804, a sensor-based input device 5808, an electric switch condition sense device 5820, an external data communications interface 5810, a power source 5814, and a control facility 5812 for manipulating the light output of the LED lighting source, where the manipulating may be in part determined by data received from a second of the plurality of LED lighting facilities 5822 through the external data communications interface. A housing 5818 may be provided for each of the plurality of wireless LED lighting facility that may take the form of a light bulb that mounts into a standard lighting fixture. The wireless LED lighting facility may take the form of a light bulb that mounts into a standard lighting fixture, a fluorescent tube that mounts into a standard fluorescent lighting fixture, a fluorescent lamp that mounts into a standard lighting fixture or a standard fluorescent lighting fixture, and the like. The wireless LED lighting facility may take the form of a lighting fixture. The power source may be AC power hardwired to the lighting fixture. The electrical switch condition sense device may determine the position of an electrical switch through electrical impedance sensing of the electrical switch. The control facility may manipulate the LED lighting source as a result of the electrical impedance sensing.

Figure 59:
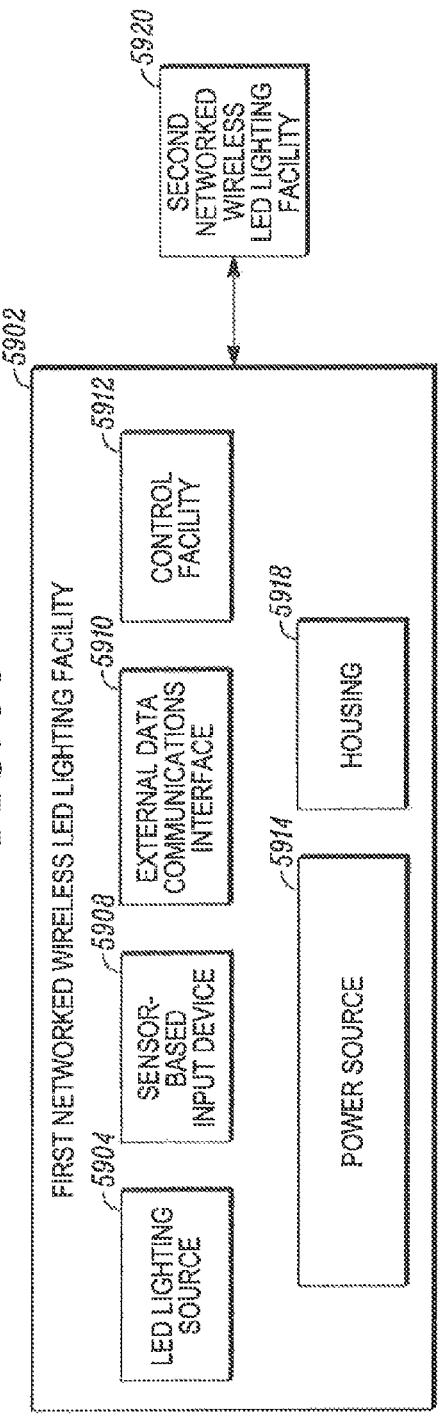
FIG. 59 shows an embodiment for a networked light with sensor input and external control source.

In embodiments, as shown in FIG. 59, a system may be provided for coordinating the operation of a plurality of wireless lighting sources, comprising a first of a plurality of networked wireless LED lighting facilities 5902 each containing an LED lighting source 5904, a sensor-based input device 5908, an external data communications interface 5910, a power source 5914, and a control facility 5912 for manipulating the light output of the LED lighting source, where the manipulating may be determined by a combination of environmental sensing input by the sensor-based input device, information received from a second of the plurality of networked wireless LED lighting facilities 5920, and data received from an outside control source. A housing 5918 may be provided for each of the plurality of wireless LED lighting facility that may take the form of a light bulb that mounts into a standard lighting fixture. The wireless LED lighting facility may take the form of a light bulb that mounts into a standard lighting fixture, a fluorescent tube that mounts into a standard fluorescent lighting fixture, a fluorescent lamp that mounts into a standard lighting fixture or a standard fluorescent lighting fixture, and the like. The power source may be AC power through the standard lighting fixture. The wireless LED lighting facility may take the form of a lighting fixture. The power source may be AC power hardwired to the lighting fixture. The wireless LED lighting facility may take the form of battery powered lighting fixture. The outside control source may be a network. The network may be embodied in a network of appliances, where at least one appliance may be a lighting facility. The networked wireless LED lighting facility may receive control and programming over the network. The LED lighting facility may receive data destined for another networked wireless LED lighting facility or other device connected to the network and may transmit data to route or forward that data through the network to the destination LED lighting facility or other device. The networked wireless LED lighting facility may contain the next hop routing information in memory such that it may be able to propagate data through the network to the destination for the data even if it is not directly connected to the destination.

In embodiments, as shown in FIG. 60, an LED illumination system 6002 may be provided, comprising an LED light source 6004 mounted within a housing 6014, where the LED may be positioned to provide illumination from the housing, a transceiver 6010 associated with the housing such that the transceiver can receive and transmit wireless control signals from and to external sources 6018, a wireless power system 6012 for powering the LED illumination system, and a processor 6008, coupled to the transceiver, for interpreting received wireless control signals from a controller external source and transmitting wireless control signals for another LED illumination systems in accordance with the received wireless control signals.

In embodiments, as shown in FIG. 61, an LED illumination system 6102 may be provided, comprising an LED light source 6104 mounted within a housing 6114, where the LEDs are positioned to provide illumination from the housing; a receiver 6112 associated with the housing such that the receiver can receive wireless control signals from an external source 6122, where the control signals control a function of the LED illumination system. A wireless power system 6118 may be provided for powering the LED illumination system. A sensor 6108 may be provided for monitoring an environmental condition and controlling the function of the LED illumination system, where the wireless power system includes a circuit to periodically cycle 6120 the power of the receiver during a sleep period to increase the lifespan of the wireless power system. In addition there may be a processor for keeping a time of day, wherein the processor uses the time of day to regulate the power provided by the wireless power system. There may be a memory location for storing a value reflective of an LED illumination system auto shut-off period, wherein the value may be set by measuring a duration that a set control signal may be received by the receiver. There may be a memory location for storing a value reflective of an LED illumination system auto shut-off period, wherein the value may be set by measuring available power from the wireless power system. There may be a processor, coupled to the receiver, for interpreting the wireless control signals from the external source for a channel indication, wherein if the channel indication indicates that the wireless control signals are intended for the LED illumination system, the processor will control the LED illumination system in accordance with the wireless control signals. There may be a processor, coupled to the transceiver, for interpreting received wireless control signals from a controller external source and transmitting wireless control signals for another LED illumination systems in accordance with the received wireless control signals.

Figure 62:
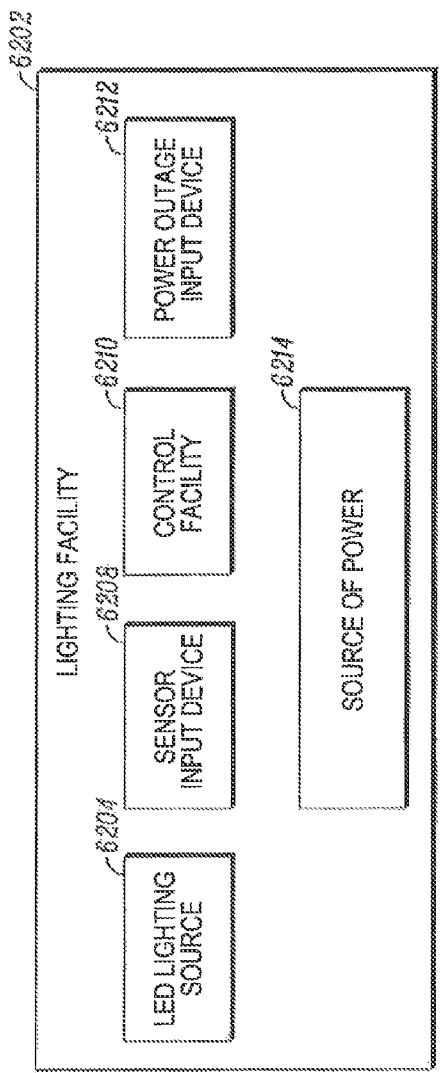
FIG. 62 shows an embodiment for a centralized power outage light with sensor, outage input, and control.

In embodiments, the present invention may provide a centralized power outage bridging to a networked lighting system. As shown in FIG. 62, a system may be provided for power outage management for a plurality of lighting sources, comprising at least one of a plurality of lighting facilities 6202 containing an LED lighting source 6204, a sensor input device 6208, a power outage input device 6212, a power source 6214, and a control facility 6210 for manipulating the light output of the LED lighting source, where the lighting facility provides light in response to a signal received by the power outage input device indicating a power outage and an environmental input from the sensor input device. The signal may be transmitted from a centralized controller. The centralized controller may be a power outage module monitoring power at some point in power distribution to detect a disruption in power. The power outage module may plug into an AC outlet and monitor power at the outlet to determine if there is a disruption in AC power. The power outage module may communicate wirelessly to one or more lighting facilities. The one or more lighting facilities may contain a wireless receiver to receive commands from the power outage module. The centralized controller may be running a software control program. The signal may be received from a web-based source. The web-based source may be on a local network, on the internet, and the like. The power source may be an energy storage device integrated with each of the lighting facilities that may be capable of supplying power to the lighting facility independent of the AC power, and where the recharging may be provided internal to the lighting facility at a time when the AC power may be available. The lighting facility may be disconnected from the AC power and used as a portable lighting device. The energy storage device may be a rechargeable energy storage device. The rechargeable energy storage device internal to the lighting facility may be a battery, fuel cell, super capacitor, and the like. The lighting facility may take the form of a light bulb that mounts into a standard lighting fixture, of a lighting fixture, of a retrofit light bulb, of a retrofit lighting fixture, of battery powered lighting fixture, and the like. The sensor may sense IR, temperature, light, motion, acoustic, vibration, and the like. The manipulating may be switching on the light output, changing the illumination level of the light output, flashing the light output, changing the color content of the light output, and the like.

Figure 63:
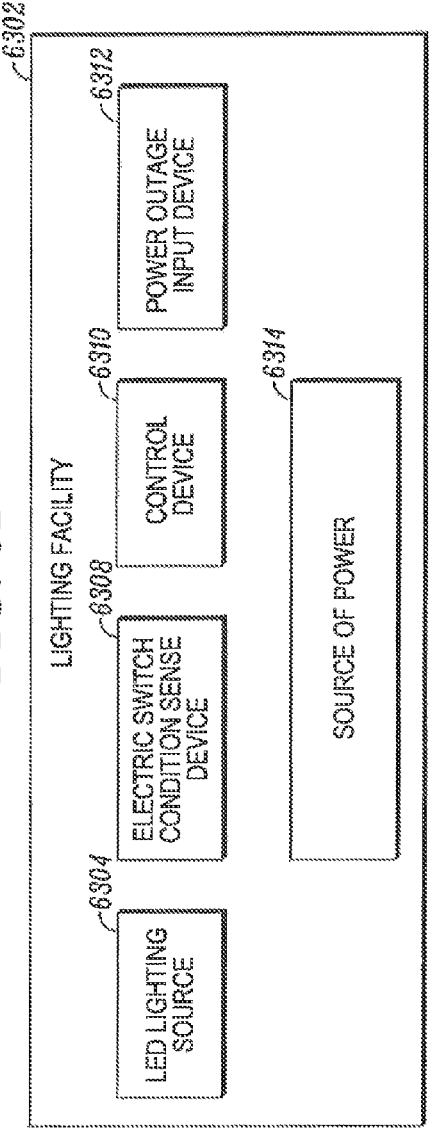
FIG. 63 shows an embodiment for a centralized power outage light with impedance sensing, outage input, and control.

In embodiments, as shown in FIG. 63, a system may be provided for power outage management for a plurality of lighting sources, comprising at least one of a plurality of lighting facilities 6302 containing an LED lighting source 6304, an electric switch condition sense device 6308, a power outage input device 6312, a power source 6314, and a control facility 6310 for manipulating the light output of the LED lighting source, where the lighting facility provides light in response to a signal received by the power outage input device indicating a power outage and an input from the electric switch condition sense device. The electrical switch condition sense device may determine the position of an electrical switch through electrical impedance sensing of the electrical switch. The control facility may manipulate the LED lighting source as a result of the electrical impedance sensing. There may be an electrical switch condition sensing capability in the power outage module to determine the position of au electrical switch through electrical impedance sensing of the circuit it is connected to. The power outage module may manipulate the LED lighting source as a result of the electrical impedance sensing.

Figure 64:
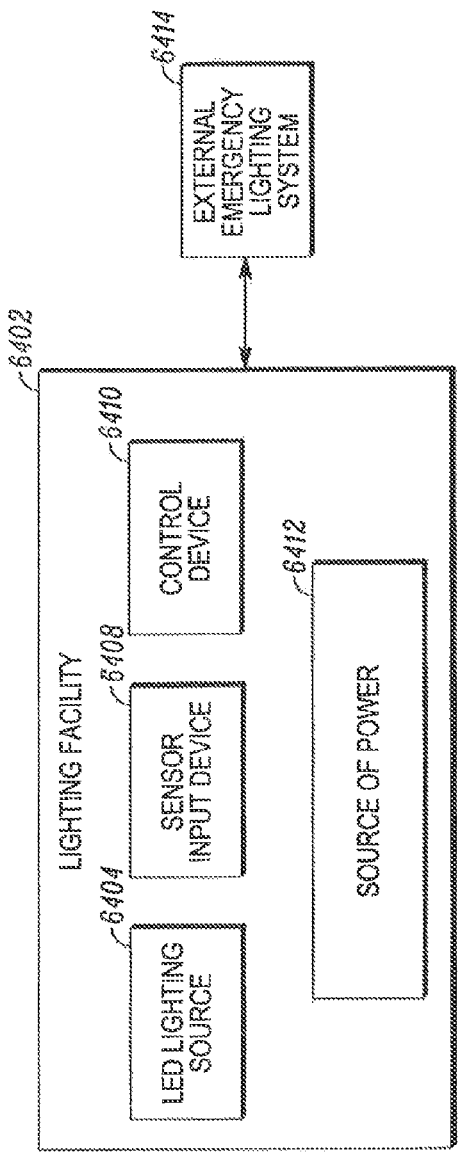
FIG. 64 shows an embodiment for a centralized power outage light with sensor, outage input, control, and connection to emergency lighting system.

In embodiments, as shown in FIG. 64, a system may be provided for power outage management for a plurality of lighting sources, comprising at least one of a plurality of lighting facilities 6402 containing an LED lighting source 6404, a sensor input device 6408, a connection to an external emergency lighting system 6414, a power source 6412, and a control facility 6410 for manipulating the light output of the LED lighting source, where the lighting facility provides light in response to a signal received by the power external emergency lighting system indicating a power outage and an environmental input from the sensor input device. The signal may be transmitted from a centralized controller. The centralized controller may be an emergency lighting system module monitoring a command from the emergency lighting system to switchover to emergency power. The emergency lighting system module may communicate wirelessly to one or more lighting facilities. The one or more lighting facilities may contain a wireless receiver to receive commands from the emergency lighting system module.

Figure 65:
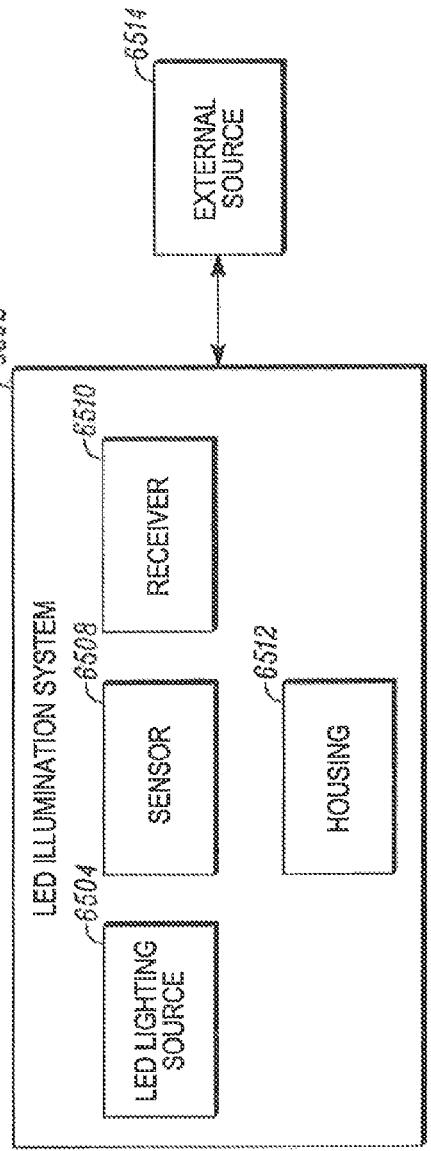
FIG. 65 shows an embodiment for a sensor-based wirelessly controlled light with wireless control, remote sensor, and power management.

In embodiments, the present invention may provide a sensor-based wirelessly controlled LED light bulb. As shown in FIG. 65, an LED illumination system 6502 may be provided, comprising an LED light source 6504 mounted within a housing 6512, where the LEDs are positioned to provide illumination from the housing, a receiver 6510 associated with the housing such that the receiver can receive wireless control signals from an external source 6514, where the control signals control a function of the LED illumination system. A sensor 6508 may be provided for monitoring an environmental condition and controlling the function of the LED illumination system. In addition there may be a processor, coupled to the receiver, for interpreting the wireless control signals from the external source for a channel indication, where if the channel indication indicates that the wireless control signals are intended for the LED illumination system, the processor will control the LED illumination system in accordance with the wireless control signals. There may be a remote sensor transmitter that may transmit sensor information to the illumination system. The remote sensor may sense IR, temperature, light, motion, acoustic, vibration, and the like. The sensor may be a motion sensor that transmits to the illumination system when motion may be detected. The sensor may be a light sensor that transmits the detected light level to the illumination system. The light output of the LED light source may be manipulated to maintain a constant value of light intensity based on the measurement of ambient light level plus light output level. The light sensor may be used to provide a regular update of ambient light level to manipulate the light output. The light sensor may be used to calibrate the light output of the LED light source where the remote light sensor does not have to be present to maintain the calibrated light output level. The LED illumination system may receive power via a standard light fixture. The control facility may control the amount of power drawn from the standard light fixture.

In embodiments, as shown in FIG. 66, a lighting system may be provided, comprising a wireless LED lighting facility 6602 containing an LED lighting source 6604, a light sensor input device 6608, and a control facility 6610 for manipulating the light output of the LED lighting source, where the wireless LED lighting facility receives power via a standard light fixture. A housing 6612 may be provided for the wireless LED lighting facility that takes the form of a light bulb that mounts into a standard lighting fixture 6614. The light sensor input device may provide a measurement of the amount of ambient light in an area. The light bulb may take the form of a standard light bulb, where a standard light bulb may be at least one of a standard size light bulb, such as a PAR30, PAR38, A19, R30, MR16, and the like. The light bulb may take the form of a non standard light bulb, where a non standard light bulb may be any size or shape of bulb for custom application. The light bulb may take the form of a fluorescent tube, a fluorescent lamp, and the like. The control facility may utilize a control input from an input device, internal timer, internal clock, internal program, and the like, to manipulate the light output of the LED lighting source. The control input may be the reading of the ambient light level from the light sensor. The light output of the LED light source may be manipulated to maintain a constant value of light intensity based on the measurement of ambient light level plus light output level. The control facility may control the amount of power drawn from the standard light fixture. The manipulating may be switching on the light output, changing the illumination level of the light output, flashing the light output, changing the color content of the light output, and the like.

In embodiments, as shown in FIG. 67, a lighting system may be provided, comprising a wireless LED lighting facility 6702 containing an LED lighting source 6704, and a control facility 6708, where the control facility may be programmable. A housing 6712 may be provided for the wireless LED lighting facility that takes the form of a light bulb that mounts into a standard lighting fixture 6714. In addition, there may be an input device. The input device may be a sensor device. The sensor device may sense IR, temperature, light, motion, acoustic, vibration, and the like. The input device may be a switch, pushbutton, dial, a knob on the housing, and the like. The programmability may be through switches integrated with the housing. The programmability may be stored in a program internal to the LED lighting facility. The light bulb may take the form of a standard light bulb, where a standard light bulb may be at least one of a standard size light bulb, such as a PAR30, PAR38, A19, R30, MR16, and the like. The light bulb may take the form of a non standard light bulb, where a non standard light bulb may be any size or shape of bulb for custom application. The light bulb may take the form of a fluorescent tube, a fluorescent lamp, and the like. The lighting system may receive power via a standard light fixture. The control facility may have an internal timer, time of day clock, and the like. The schedule of manipulating the light output may be stored in the internal program. The control facility may take input from a light sensor input device sensing the level of ambient light. The light output of the LED light source may be manipulated to maintain a constant value of light intensity based on the measurement of ambient light level plus light output level. The manipulating of the light output may be configured by switches on the housing. The control facility may control the amount of power drawn from the standard light fixture. The control facility may manipulate the light output of the LED lighting source where the manipulating may be switching on the light output, changing the illumination level of the light output, flashing the light output, changing the color content of the light output, and the like.

In embodiments of the wireless light bulb, an automatic grid shifting wireless light bulb may be designed to store and use power from the embedded power source. The functionality may be pre-programmed, factory set, designed in a custom electrical circuit or the like to respond to sensors on the bulb and a pre-programmed algorithm to implement the grid shifting function. The functionality may be learned using sensors on the bulb and an intelligent program that may change the behavior of the bulb based on the feedback received from the one or more sensors on the bulb. The sensors may include a light sensor, motion sensor, an atomic clock or time receiver, temperature sensor or any other sensor mentioned herein that may allow the grid shifting function to meet the requirements of an application. In some embodiments, there may not be a sensor on the bulb and the grid shifting function is performed based on an intelligent program internally. The intelligent program may contain a real time clock that may be set by the user such that the intelligent program may use time of day or a calendar to perform the grid shifting functionality. The grid shifting function may be used for cost savings, energy efficiency, convenience and safety/security. An automatic grid shifting wireless light bulb may have switches, dials, knobs etc on the bulb to set time of day or sensor thresholds such that a user may be able to control how the intelligent program manages the automatic grid shifting wireless light bulb. Once set, the automatic grid shifting wireless light bulb may act autonomously based on those settings and/or the pre-programmed or designed function. The settings may be changed on occasion by the user.

By way of an example, an automatic grid shifting wireless light bulb may be designed in as a PAR38 bulb with embedded rechargeable batteries and a connection to power through the Edison socket. Intelligence in the form of logic, electrical circuitry, microcontrollers, microprocessors, memory devices etc. contained within the bulb may control the rate of charging, time of charging or any other aspect of the charging of the embedded power source, may control the consumption of power from the input and/or embedded power source including when to use each source or what the level of sharing of the load is on each source, may control the amount of power consumption by controlling the drive to the LEDs through PWM control or the like or may control any other function of charging and power consumption. The intelligence may also leverage sensors on the bulb to monitor patterns of sensor inputs by which the bulb may adjust the charging and use of the power source to optimize the bulbs use of power for cost savings, energy efficiency, convenience, safety/security, and the like. The intelligence may keep the patterns in memory over time if necessary and adjust grid shifting functionality based on the pattern. In the example, the PAR38 grid shifting wireless light bulb may be plugged into a recessed socket by an end user. A time of day clock in the PAR38 grid shifting wireless light bulb may start storing energy in the embedded power source during a time interval preset for example in the evening hours when the energy rates are low. In the daytime, the PAR38 grid shifting wireless light bulb may use the embedded power source entirely while capacity is available, share the electrical load with the AC input or not be used at all. The bulb may be pre-programmed to work based on the TOU rate plan offered by a particular power company and the intelligence in the bulb may be optimized to save as much money on the energy bill of a customer as possible. Alternately, the bulb may be pre-programmed with a time of day clock and a calendar such that the bulb may grid shift on days known to be peak energy usage days for a particular power company reducing the peak usage of a customer on those days and times of day when it is desirable to reduce peak energy usage.

In some embodiments of the wireless light bulb, sensor control circuitry, receiver control circuitry, transceiver control circuitry or the like may be designed physically on a printed circuit board along with one or more LEDs. In one embodiment, an LED light bulb may have six LEDs mounted to a metal core printed circuit board in a circular pattern with six LEDs around the outside and a PIR based motion sensor circuit in the center of the metal core printed circuit board. The printed circuit board may be designed such that the PIR based motion sensor circuit may be isolated thermally from the heat generated by the LEDs. Additional circuitry such as voltage regulator circuitry, control circuitry to switch on, off or PWM control the LEDs, circuitry to implement an auto shutoff function etc may also be present on the metal core printed circuit board. In an alternate embodiment, an RF receiver circuit may be designed onto a metal core printed circuit board along with the LEDs. It is to be appreciated that any functionality mentioned herein may be designed onto the same printed circuit board as the LEDs. It is also appreciated that any printed circuit board type such as FR-1, FR-2, CEM-1, CEM-2, FR-4, and the like as well as flexible circuits and printed circuit boards may be used to implement the combined LED and control module printed circuit design.

In some embodiments of the wireless light bulb, a sensor control module, receiver control module, transceiver control module or the like may be designed to electrically and/or physically interface to an LED circuit footprint. In such a case, the control module may be designed with a printed circuit board connection that matches the LED printed circuit footprint such that the control module may be directly soldered to the LED footprint. Therefore, a control module may be added to a product by replacing a single LED with the control module. By way of an example, an LED light bulb may have seven LEDs mounted to a metal core printed circuit board in a pattern with six LED around the outside and a seventh LED in the center. The seventh LED may be removed and in its place a motion sensor control module may be soldered to the printed circuit board to add motion sensor control to the LED light bulb. In such an example the motion sensor control module may require an electrical connection to power and for control of the bulb. Control may include on/off control, light intensity control and the like. In an alternate embodiment, the control module may not have an electrical connection to the LED driver circuitry for control (ie it would only have an electrical connection to the LED driver circuitry to power the control module), but rather may control the on/off state of the bulb by controlling a switch that opens and closes the connection across the LED that it replaces. By way of an example, in the case of seven series LEDs where the seventh LED has been replaced by a control module, when the control module closes the switch, current will flow through the series chain of LEDs turning the LEDs on. When the control module opens the switch, current will not flow through the series chain of LEDs turning the LEDs off. It is to be appreciated that the switch may take the form of a relay, FET, transistor, solid state switch or the like. In an alternate embodiment, the control module may insert a resistance into the path to alter the light intensity and as such provide a method to have multiple light levels or dimming functionality. By way of an example, an RF receiver control module may be capable of receiving commands for "dim up" and "dim down" such that it may alter the resistance in the path to change the light intensity of the LEDs by limiting current through the chain of LEDs. In some embodiments, the control module may replace more than one LEDs. In alternate embodiments, the control module does not replace any LEDs, but rather is electrically connected across one or more LEDs such that the control module may use the one or more LEDs as a voltage reference to power the control module. In such a case, the control board may be physically mounted in any manner with respect to the LED board or boards. It is to be appreciated that the housing may include bulb housings, such as PAR30, PAR38, A19, MR16 etc, tube housings, such as T4, T8 etc, fixture retrofits, such as 6" recessed fixtures, fluorescent fixtures etc., battery powered fixtures such as a spotlight, stair light, ceiling light, night light, undercabinet light, parking garage light etc. In some embodiments, the control module may include a power source such as a rechargeable battery, non-rechargeable battery, capacitor, supercapacitor or the like to allow the control module to be powered locally. It may have a method to recharge the power source when power is applied to the LED chain.

Figure 68:
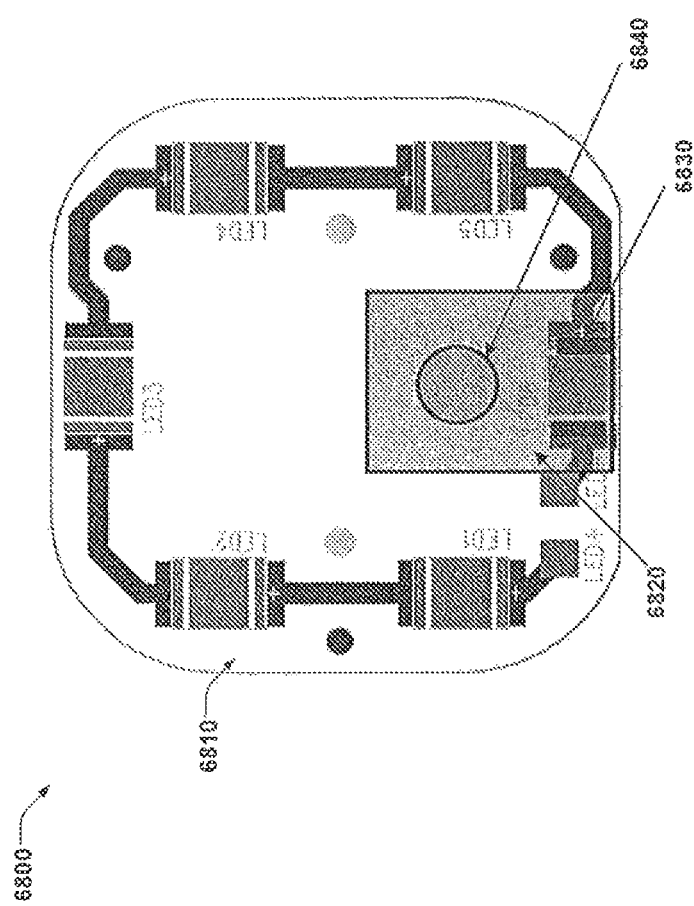
FIG. 68 shows an embodiment for a motion sensor LED module.

In an illustrative embodiment shown in FIG. 68, the figure shows an example Motion Sensor LED Module 6800 that may be a module containing a motion sensor that physically and electrically mounts to an LED location on a circuit board with six LED locations. In the illustrated embodiment, the Motion Sensor LED Module 6800 may include an LED circuit board 6810, a motion sensor circuit board 6820, an electrical connection to an LED 6830 and a PIR sensor 6840. The motion sensor circuit board may have wires connecting it electrical to a power source and a method to control the operation of the light based on the state of the motion sensed.

Figure 69:
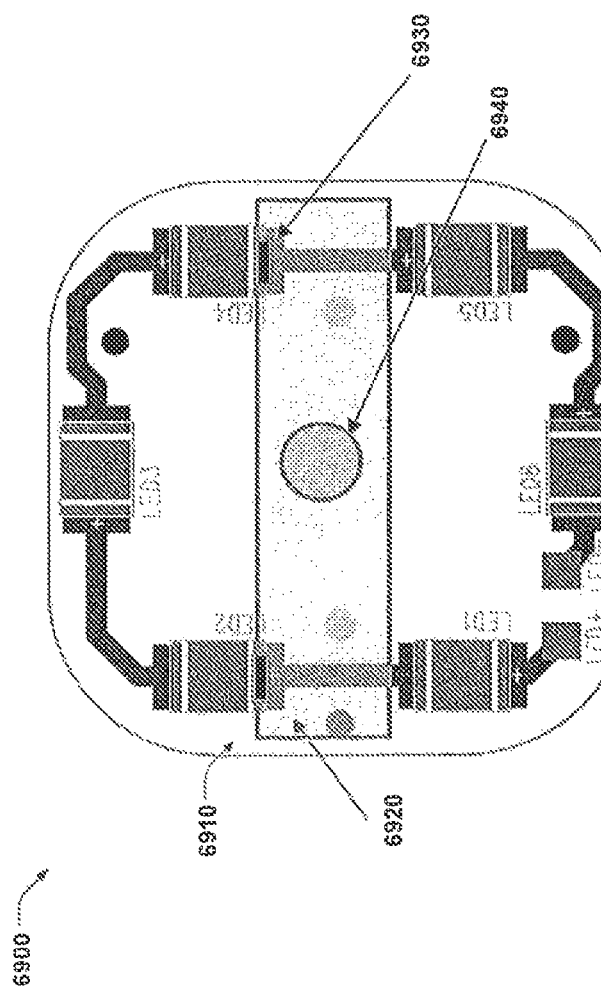
FIG. 69 shows an embodiment for a motion sensor LED powered module.

In an illustrative embodiment shown in FIG. 69, the figure shows an example Motion Sensor LED Powered Module 6900 that may be a module containing a motion sensor that physically and electrically mounts to a circuit board with six LED locations. In the illustrated embodiment, the Motion Sensor LED Powered Module 6900 may include an LED circuit board 6910, a motion sensor circuit board 6920, an electrical connection across multiple LEDs 6930 and a PIR sensor 6940. The motion sensor circuit board may have a connection to the LED circuit board such that it may use the LEDs as a power source and a method to control the operation of the light. The motion sensor circuit board may include a method to store power such that when power is applied it may recharge a capacitor, super capacitor, rechargeable battery or the like which will power the Motion Sensor LED Powered Module 6900 when power is not applied to the LEDs. In such a case, the motion sensor would be able to turn on the light when motion is sensed. The motion sensor circuit board may control the light levels to allow multiple light levels or dimming based on the state of the motion sensor and timer circuits that control a change of state of the light.

In embodiments of wireless lighting fixtures or wireless light bulbs containing a sensor, a remote control may be designed to transmit a datastream to the fixture or bulb to control or configure the fixture or device by creating a signal that the sensor may detect and such that the fixture or bulb may decode the datastream. In one embodiment, a wireless lighting fixture or wireless light bulb may contain a light sensor. The light sensor may be connected to a microcontroller, microprocessor, digital circuit or the like that is capable of detecting the light level and changes in the light level. A remote control may be designed that contains a light source that may be modulated or blinked at a rate such that control or a configuration command may be detected by the microcontroller, microprocessor, digital circuit or the like which the light sensor is connected to. The remote control may contain a method to control or configure the fixture or bulb with switches, dials, buttons etc. such that the setting of the switches, dials, buttons etc. on the remote control will be used to create the datastream to control or configure the fixture or bulb. By way of an example, the remote control may contain a narrow angle LED and buttons, dials, switches and other similar controls. In an example, a remote control may contain a pushbutton and a dial. The dial setting may be translated into the net light output of a daylight harvesting capable fixture or bulb. The dial setting may configure a wireless light bulb to set the light intensity of its light source in response to a light level detected at its light sensor to be a particular level. Different dial settings may configure the wireless light bulb to set the light intensity in response to the detected light level to an associated level. When the push button is pressed, the remote control may read the dial setting and subsequently control the light source on the remote control to transmit a command. In some embodiments, the command may consist of a preamble, sync word, one or more bytes to configure the fixture or bulb and error checking. It is to be appreciated that the command may take any form that may be detected by the fixture or bulb and be used to control or configure the fixture or bulb. It is also to be appreciated that the user may need to direct the light source of the remote control toward light sensor on the fixture or bulb. In this example, the datastream transmitted by the remote control may be detected by measuring differences in the light level detected by the light sensor. In alternate embodiments, other sensors that are resident on the fixture or bulbs may be used with a remote control to control or configure the fixture or bulb. By way of an example, a fixture or bulb with a motion sensor may be used with a remote control containing an infrared device that may be capable of transmitting an infrared signal that the motion sensor may detect and an attached microcontroller, microprocessor, digital circuit or the like may be able to decode a datastream as transmitted by the remote control.

Figure 70:
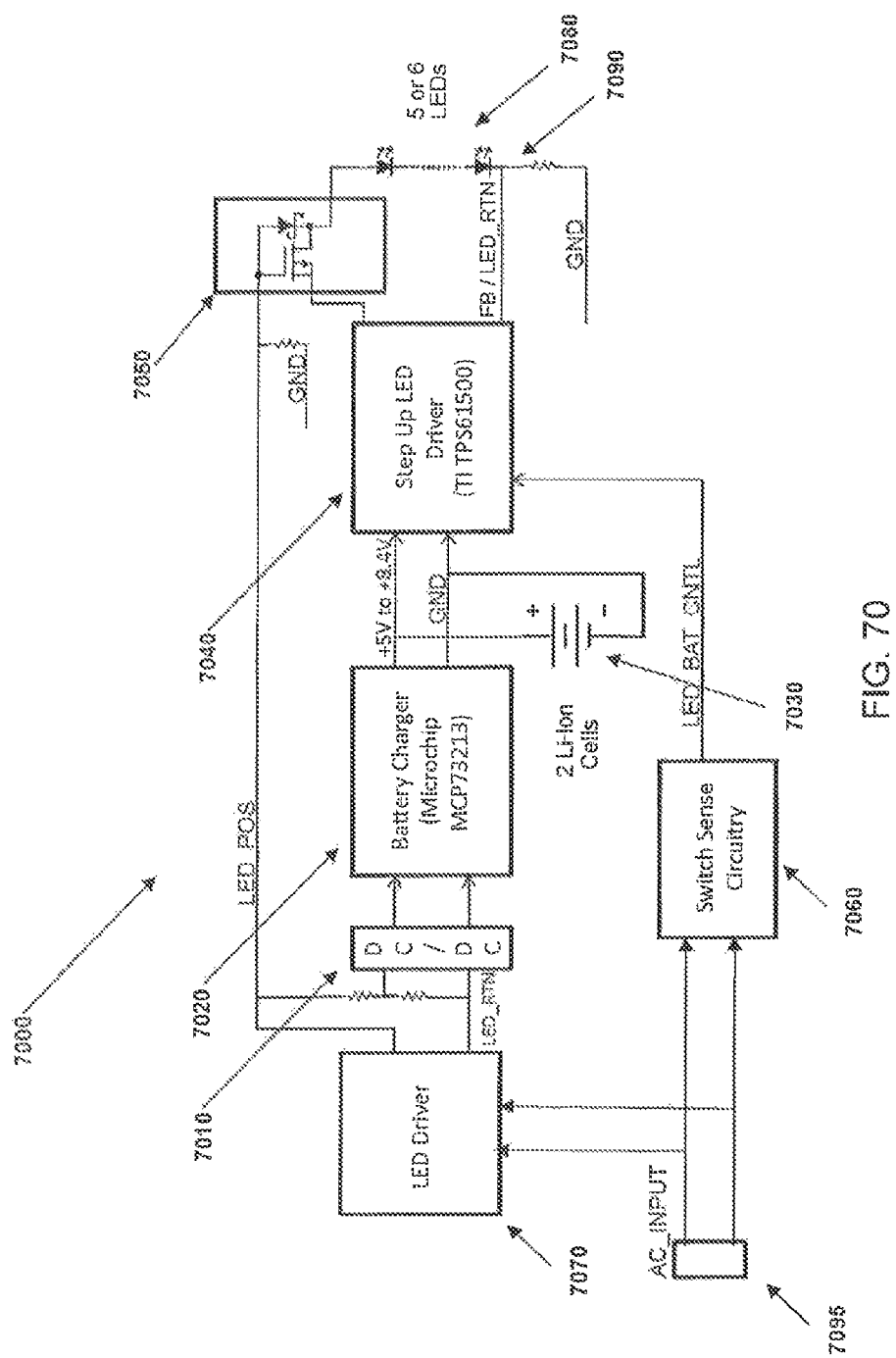
FIG. 70 shows a block diagram for an embodiment for a battery embedded LED controller module.

In an illustrative embodiment shown in FIG. 70, the block diagram shows an example Battery Embedded LED Controller Module 7000 that may be used in a UPS light bulb, grid shifting light bulb or any type of externally powered battery embedded wireless light bulb. The Battery Embedded LED Controller Module 7000 may include a DC/DC converter 7010, battery charger circuitry 7020, an embedded battery supply 7030, a step up LED driver 7040, switching circuitry 7050, switch sensing circuitry 7060, an LED driver 7070, one or more LEDs 7080, an LED return 7090, an input connection 7095, and the like. In a traditional LED light bulb, an LED driver 7070 is connected to one or more LEDs 7080 in series and/or parallel and may provide a constant current drive to the LEDs. A Battery Embedded LED Controller Module 7000 may be designed with switching circuitry 7050 such that when external power is applied, the LED driver 7070 supplies power to the one or more LEDs 7080. When the external power is no longer present the switching circuitry 7050 may automatically switch such that the embedded battery supply 7030 and step up LED driver 7040 may supply power to the one or more LEDs 7080 thus the bulb is powered from embedded battery supply 7030. In the illustrated embodiment, the external power supplied at the input connection 7095 is AC power. In alternate embodiments, the external power supplied at the input connection 7095 may be DC power. The switching circuitry 7050 in the illustrative embodiment consists of a p-channel FET and a schottky diode. In an alternate embodiment, the switching circuitry may consist of two diodes to diode-or the power sources together and a p-channel FET between the battery and step up LED driver such that when power is supplied by the LED driver 7070, the battery is disconnected from the step up LED driver 7040 and when power is not supplied by the LED driver 7070 the p-channel FET connects the battery to the step up LED driver 7040 and the step up LED driver 7040 supplies power to the one or more LEDs 7080. In alternate embodiments the switching circuitry may consist of a relay, solid state switch, discrete circuitry and the like such that the desired power source may be supplied to the one or more LEDs 7080. It is to be appreciated that several methods of selecting and switching the power source to the one or more LEDs 7080 will be readily apparent to those skilled in the art. In the illustrated embodiment, the step up LED driver 7040 is a TI TPS61500 step up LED driver. It is to be appreciated that any type of step up DC/DC converter and/or LED constant current driver circuit may be used to drive the one or more LEDs 7080 with the desired drive characteristics. In an alternate embodiment, the LED driver 7040 is an AC/DC converter and the switching circuitry 7050 may be connected to the input of the TPS61500 LED driver. In this embodiment, the switching circuitry 7050 switches between the AC/DC supply and the embedded battery supply 7030 therefore the only constant current driver is the TPS61500 LED driver. It is to be appreciated that any alternate LED driver may be used instead of the TPS61500 and that driver may be a step up driver, a step down driver, a buck boost driver or the like.

In the illustrated embodiment, the embedded battery supply 7030 is a dual cell Li-Ion battery pack. It is to be appreciated that the embedded battery supply 7030 may be any rechargeable battery type mentioned herein. In alternate embodiments, the embedded battery supply 7030 may be non-rechargeable such as one or more alkaline batteries. In other embodiments, the embedded battery supply 7030 may be a capacitor, super capacitor, fuel cell etc. In the illustrative embodiment, the dual cell Li-Ion battery pack is charged with dual cell Li-Ion charging circuit based on the Microchip MCP73213 battery charger. It is to be appreciated that any type of battery charger circuit may be used to charge the desired type rechargeable battery used as the embedded battery supply 7030. The DC/DC converter 7010 may be required to provide the required voltage to the battery charger circuit if the battery charger circuit is not be capable of being powered directly from the output of the LED driver 7070. In the illustrated embodiment, there may be a resistor divider circuit or a resistive drop to set the voltage at the input of the DC/DC converter 7010. In an alternate embodiment, there may not be a DC/DC converter 7010 but rather the LED driver 7070 may provide the proper input for the battery charger and other circuit. In alternate embodiments, the Battery Embedded LED Controller Module 7000 may receive DC power from an external source. There may be a power and ground input and may be one or more control lines such that the Battery Embedded LED Controller Module 7000 may be able to control the operation of the LED driver 7070 with the control lines.

In the illustrative embodiment, there is switch sensing circuitry 7060 may be used to detect the state of a controlling light switch or breaker. The switch sensing circuitry 7060 may measure capacitance, impedance or any other electrical characteristic of the input that may provide an indication of the state of the controlling circuit to allow the controller to make a decision on which power source to use or not to apply power to the one or more LEDs 7080 at all. The switch sensing circuitry 7060 may detect impedance discontinuities through a time domain reflectometry (TDR) method by transmitting an electrical signal on the input and evaluating the return to make a determination whether the controlling switch or break is open or closed. In alternate embodiments, the switch sensing circuitry 7060 is replaced by an RF or IR receiver. In such an embodiment, the determination of which power source the Battery Embedded LED Controller Module 7000 should use may be made external to the Battery Embedded LED Controller Module 7000 and is transmitted to the device to module to control the switch to select the source or no source at all. In alternate embodiments, the switch sensing circuitry 7060 is replaced by a transceiver and the Battery Embedded LED Controller Module 7000 has the ability to communicate control to disparate Battery Embedded LED Controller Module 7000, wireless light bulbs and/or battery powered wireless fixtures. In such a case, a network of bulbs and fixtures may be created to propagate commands, control and status throughout the network to coordinate operation or transport commands, control, status and responses to devices on the network. In alternate embodiments, the switch sensing circuitry 7060 is replaced by or augmented with a sensor such as a motion sensor, light sensor etc to control the bulb. It is to be appreciated that any combination of switch sensing, receiver, transceiver and sensor functionality may be used in conjunction with the Battery Embedded LED Controller Module 7000. It is to be appreciated that the switch sensing circuitry 7060 or any alternate in its place may be powered from the LED driver 7070 directly or indirectly through a DC/DC converter 7010 or it may be powered by the embedded battery supply 7030. In some embodiments, the Battery Embedded LED Controller Module 7000 may include an adjustable resistor, adjustable transformer, PWM controllable FET or transistor, PWM control of the step up LED driver 7040 or similar device to allow the light source to be dimmable or to support more than one light level if the application benefits from dimming or multiple light levels or for the purpose of extending battery life. In such an embodiment, the Battery Embedded LED Controller Module 7000 may use any combination of switch sensing, receiver, transceiver and sensor functionality to set the light intensity level.

In the illustrated embodiment, the LED return 7090 is connected to the feedback input of the TPS61500 to allow the TPS61500 to maintain the desired drive characteristics and the feedback input is connected through a resistor to the battery return. The LED return 7090 is also connected to the LED driver 7070 thus whether the LED driver 7070 is the power source or the embedded battery supply 7030 is the power source there exists a return for the power source. In alternate embodiments, the returns may be switched with a switching circuit along with the switching circuitry 7050 such that whichever power source may be switched to the one or more LEDs 7080, the return is switched back to the power source with no connection between the embedded battery supply 7030 and return for the LED driver 7070. In some embodiments, the feedback mechanism may be modified such that when the battery is charging and is thus drawing additional current from the LED driver 7070, the current delivered to the LED circuitry may be less thus producing less light output while the battery is charging. One feedback resistor value may be inserted into the feedback path to accommodate the charging current in addition to the LED current. When charging is complete, a second feedback resistor may be inserted to maintain constant current through the LEDs and thus constant brightness. In alternate embodiments, the feedback mechanism may allow for any resistance to be set in response to the charging and LED drive current requirements. By way of an example, a digital potentiometer may be inserted in the feedback path and logic may adjust the value of the potentiometer based on the requirements. For example, this may be necessary if the current drawn by the charging of the battery changes over time. In the embodiment that uses an AC/DC converter and switches power as an input to the TPS61500, a constant current will be maintained without having to adjust the feedback in any way.

In an alternate embodiment targeting a HID retrofit lamps or recessed fixture retrofit, the Battery Embedded LED Controller Module 7000 may contain a high voltage step up LED driver such as the Linear Technology LT3755 to drive a higher voltage and thus a longer series chain of LEDs which would put out a higher light intensity. In such an embodiment, the output drive requirements are higher but otherwise the architecture is similar to the described architecture. Thus, the Battery Embedded LED Controller Module 7000 may be integrated into any standard size bulb (PAR30, PAR38, A19, R30, MR16, and so on), non-standard size bulb, fixture, fluorescent bulb or lamp (T4, T5, T8, circular, and so on), down light assembly (recessed fixtures, fluorescent fixtures or down light fixtures for residential or industrial lighting), HID lamp or the like to provide a battery backup, grid shifting capability or for any other benefit that an embedded battery would provide in the device.

In embodiments of the wireless light bulb, if an auxiliary power supply is required for the control circuitry it may be provided by placing a resistor divider tapping off of the drive to the light sources and using that divided down voltage to power the control circuitry. In some embodiments, this resistor divider may be connected to the feedback or LED return. In this case, the LED driver will continue to supply current to the control circuitry even when the LEDs are off. The resistor divider may provide enough of a drop in voltage such that the feedback voltage is maintained at a level to keep the LED driver supplying current to the control circuitry even when the LEDs are off thus the LED driver will supply power for the control circuitry even when the LEDs are not on. In some embodiments, the resistor divider may connect to a DC/DC converter to provide a supply voltage to the control circuitry. In some embodiments, a transistor, FET or a similar switching mechanism may be used to disconnect power to the LEDs while power is still applied to the control circuitry. In some embodiments, the control circuitry may set or alter the light intensity of the LEDs using pulse width modulation or similar method by controlling the transistor, FET or a similar switching mechanism. By way of an example, in a typically LED light bulb, the light is turned off by disconnecting power to the bulb by a light switch or similar. In this example, by allowing the control circuitry to disconnect the power source from the LEDs but still draw power from the LED driver, the control circuitry may control the bulb thus keeping the light switch or similar on, the control circuitry may still be able to control the state of the bulb. The control circuitry may include a motion sensor; may include a light sensor; may include an RF or IR receiver, transmitter, or transceiver; may include an embedded battery; may include an embedded programmable timer control; and so on to control the operation of the wireless light bulb. In some embodiments, the control circuitry may be powered using the LEDs as a reference. By way of an example, the control circuitry may connect to the LEDs in a series chain of LEDs at a point where the forward voltage drop may be used as a reference. In a series chain of LEDs of more than two LEDs, the forward voltage drop across the final two LEDs may provide a stable reference voltage for the control circuitry. In an example, the control circuitry contains an embedded battery and battery charging circuit. When the LEDs are on, the embedded battery may charge. When the LEDs are off, the embedded battery may provide power to the control circuitry that may include other control circuitry to control the state of the LED light source.

In embodiments of wireless light bulbs and battery powered wireless fixtures that contain rechargeable batteries, the batteries or battery packs may be organized such that the bulb or fixture may use multiple batteries and battery packs for increased reliability or to increase battery life in the product. Reliability may be increase with multiple batteries or battery packs by allowing for architectures such as N+1 redundancy such that a single battery that has failed or reached the end of its usable life through capacity loss or similar degradation may be tolerated by switching out the failed cell. Battery life in the product may be increased with multiple batteries or battery packs by increasing the number of charge cycles by alternating between batteries and battery packs. By way of an example, a UPS light bulb or grid shifting wireless light bulb may contain two dual cell Li-Ion battery packs. The UPS light bulb or grid shifting wireless light bulb may contain the intelligence and a switching mechanism to alternate between the battery packs over a period of time. For example, on one day, the bulb may use battery pack #1 and on the next day it may use battery pack #2. The total number of charge cycles that the bulb may allow is increased by alternating the battery pack used. In some embodiments, the architecture may allow the battery or battery pack to be charged more slowly when it is not being used because instead of needing to be charged for everyday use, it may only need to be charged for use every other day. In some embodiments, the battery or battery pack may be kept at a lower capacity level when not being used, then charged as rapidly as possible. This may decrease the capacity loss of Li-Ion cells, for example, by keeping the Li-Ion cells at a lower capacity level when the storage temperature is high.

In embodiments of the wireless light bulb and battery powered wireless lighting fixtures containing an embedded power source, a statistical record of the usage of the embedded power source, input power source, on time of the light source etc. may be made and stored in the bulb or fixture.

This record may be used to improve the performance of the use of the battery, to have a knowledge of the usage pattern of the product, for warranty or refurbishment purposes to know the amount of usage of the battery, for maintenance purposes for battery replacement etc. By way of an example, a count in number of seconds of light source ON time from the input power source, light source ON time from the embedded power source, OFF time and the like may be maintained by a microcontroller and may be stored in memory. The counts may be retrieved in the field or at the factory as a means to determine product usage over time. The counts may also be used to determine how often the embedded power source has been used for purpose of maintenance or to determine the availability of the input power. In some embodiments, the stored information may be retrieved over a communication interface into the device. By way of an example, the use level of the embedded power source may be retrieved from a central location over a network, for example over the Internet, such that an organization may be able to determine when the embedded power source may need to be replaced in a number of locations. In this example, a retail chain may be able to query individual locations and gather maintenance information to allow it to warehouse replacement parts at a central location.

Figure 71:
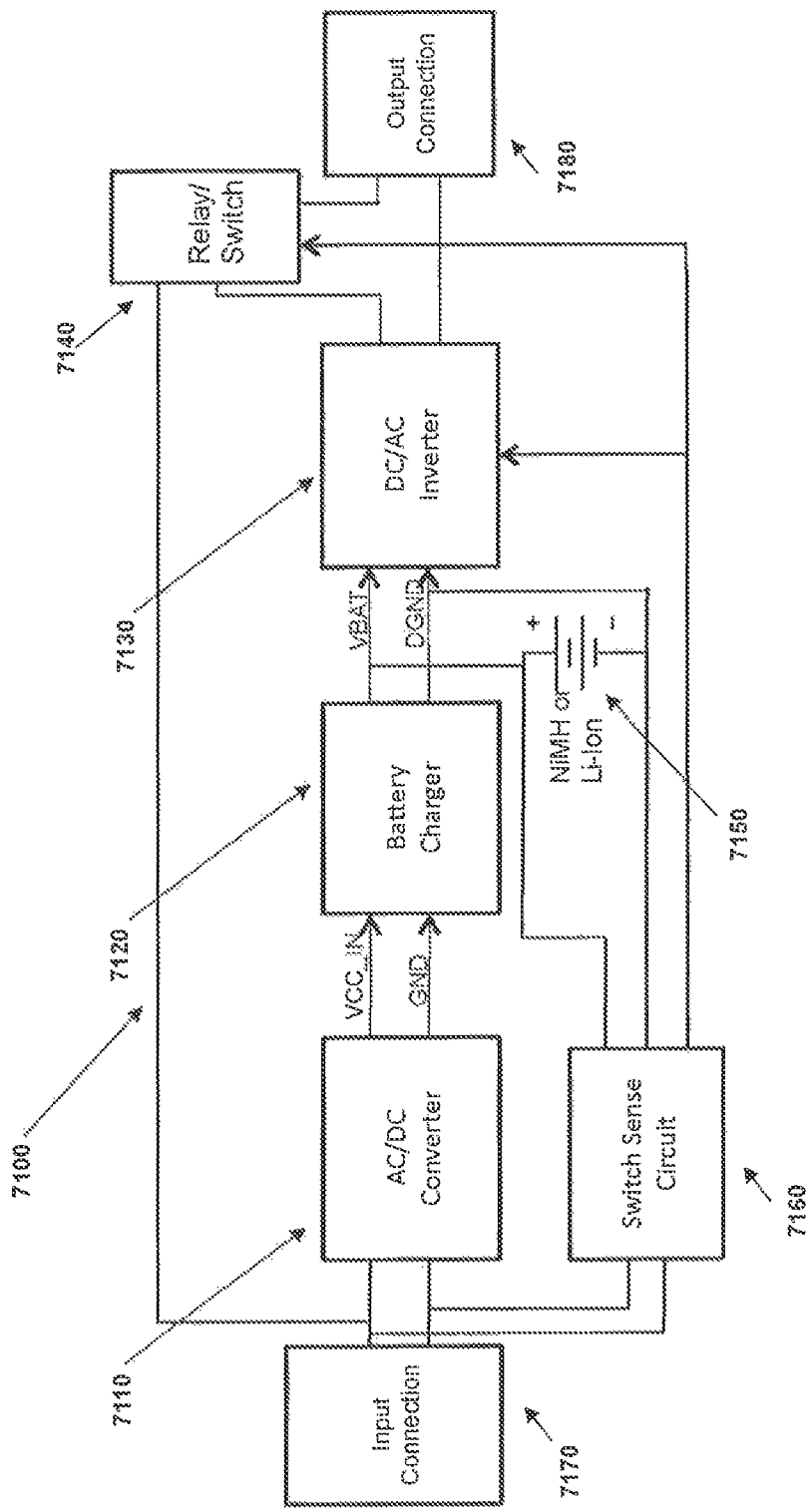
FIG. 71 shows a block diagram an embodiment for a UPS Lighting Adapter.

In an illustrative embodiment shown in FIG. 71, the block diagram shows an example UPS Lighting Adapter 7100 that may be used to connect into a lighting socket of any type where it will receive input power with any type of bulb, tube, lamp or light source connected to the output connection of the UPS Lighting Adapter 7100 (incandescent, compact fluorescent, LED, fluorescent, HID etc) and either pass input power through if it is available or provide output power to the bulb, tube, lamp or light source using an embedded power source in the absence of input power. The UPS Lighting Adapter 7100 may include a AC/DC converter 7110, battery charger circuitry 7120, a DC/AC inverter 7130, switching circuitry 7140, an embedded battery supply 7150, switch sensing circuitry 7160, an input connection 7170 and an output connection 7180. A UPS Lighting Adapter 7100 may be designed with switching circuitry 7140 such that when external power is applied, the input connection 7170 supplies power to the output connection 7180. When the external power is no longer present the switching circuitry 7140 may automatically switch such that the embedded battery supply 7150 is the power source. The DC/AC inverter 7130 may supply power to the output connection 7180 thus the bulb, tube, lamp or light source plugged into the output connection 7180 is powered from embedded battery supply 7150. The switching circuitry 7140 in the illustrative embodiment consists of a relay capable of switching DC or AC power to the output connection 7180. In alternate embodiments the switching circuitry 7140 may consist of a FET, transistor, solid state switch, discrete circuitry and the like such that the desired power source may be supplied to the output connection 7180. The input connection 7170 may consist of any type of connector used by standard size bulb (PAR30, PAR38, A19, R30, MR16, and so on), non-standard size bulb, fixture, fluorescent bulb or lamp (T4, T5, T8, circular, and so on) or down light assembly (recessed fixtures, fluorescent fixtures or down light fixtures for residential or industrial lighting), or the like such that the UPS Lighting Adapter 7100 may electrically and mechanically couple the input connection to the mating connection to mimic the connection on the bulb, fixture, lamp, assembly or the like that would connect to the output connection 7180. It is to be appreciated that several methods of selecting and switching the power source to the output connection 7180 will be readily apparent to those skilled in the art.

In the illustrated embodiment, the embedded battery supply 7150 is a dual cell Li-Ion battery pack. It is to be appreciated that the embedded battery supply 7150 may be any rechargeable battery type mentioned herein. In alternate embodiments, the embedded battery supply 7150 may be non-rechargeable such as one or more alkaline batteries. In other embodiments, the embedded battery supply 7150 may be a capacitor, super capacitor, fuel cell etc. In the illustrative embodiment, the dual cell Li-Ion battery pack is charged with dual cell Li-Ion charging circuit based on the Microchip MCP73213 battery charger. It is to be appreciated that any type of battery charger circuitry may be used to charge the desired type rechargeable battery used as the embedded battery supply 7150. The output of the AC/DC converter 7110 may provide the required input power to the battery charger circuitry 7120. In alternate embodiments, the UPS Lighting Adapter 7100 may receive DC power from the input connection 7170. In such an embodiment, the AC/DC converter 7110 may be replaced by a DC/DC converter for charging the embedded battery supply 7150 and the DC/AC inverter 7130 may be replaced by a DC/DC converter that may be a step up converter, step down converter, buck boost converter or the like as needed to produce the required power at the output connection 7180.

In the illustrative embodiment, there is switch sensing circuitry may be used to detect the state of a controlling light switch or breaker. The switch sensing circuitry 7160 may measure capacitance, impedance or any other electrical characteristic of the input that may provide an indication of the state of the controlling circuit to allow the controller to make a decision on which power source to use or not to apply power to the output connection 7160. The switch sensing circuitry 7160 may detect impedance discontinuities through a time domain reflectometry (TDR) method by transmitting an electrical signal on the input and evaluating the return to make a determination whether the controlling switch or break is open or closed. In some embodiments, the decision on which power source to use may be made based on a control input that may be used in place of the switch sense circuitry 7160. By way of an example, wiring may be run from a controlling source such as a light switch to the control input such that the control input may detect when power is no longer available or should not be used based on the state of the controlling source. In one example, a connection to AC power prior to the light switch may be brought into the control input such that the unswitched AC power will be available whether the controlling source is set to turn the light on or not. In alternate embodiments, the switch sensing circuitry 7160 is replaced by an RF receiver. In such an embodiment, the determination of which power source the UPS Lighting Adapter 7100 should use may be made external to the UPS Lighting Adapter 7100 and is transmitted to the device to module to control the switch to select the source or no source at all. In alternate embodiments, the switch sensing circuitry 7160 is replaced by an RF transceiver and the UPS Lighting Adapter 7100 has the ability to communicate control to disparate UPS Lighting Adapters 7100, wireless light bulbs and/or battery powered wireless fixtures. In such a case, a network of adapters, bulbs and fixtures may be created to propagate commands, control and status throughout the network to coordinate operation or transport commands, control, status and responses to devices on the network. In alternate embodiments, the switch sensing circuitry 7160 is replaced by a sensor such as a motion sensor, light sensor etc to control the power source to utilize.

It is to be appreciated that any combination of switch sensing, receiver, transceiver and sensor functionality may be used in conjunction with the UPS Lighting Adapter 7100. It is to be appreciated that the switch sensing circuitry 7160 or any alternate in its place may be powered from the input connection 7170 directly or indirectly through an AC/DC converter 7110 or it may be powered by the embedded battery supply 7130.

In the illustrated embodiment, a DC/AC inverter 7130 may provide an output with the desired electrical characteristics of the power delivered to the device attached to the UPS Lighting Adapter 7100. In the illustrated embodiment, the input connection 7170 is an screw shell typical of a light bulb that would screw into an Edison socket such that the adapter connects to the existing Edison socket where the electrical connection delivers AC power typical on a lighting circuit and an LED bulb, Compact Fluorescent bulb, incandescent bulb etc. may screw into the UPS Lighting Adapter 7100. It is to be appreciated that the electrical input may be AC or DC and with whatever electrical characteristics are required to allow any type of bulb, tube, lamp or light source to connect at the output and operate properly. In some embodiments, the UPS Lighting Adapter 7100 may include a triac, thyristor, adjustable resistor, adjustable transformer, PWM controllable FET or transistor or similar device to allow the bulb, tube, lamp or light source connected to the UPS Light Adapter 7100 to be dimmable or to allow the adapter to support more than one light level if the application benefits from dimming or multiple light levels or for the purpose of extending battery life. In such an embodiment, the UPS Lighting Adapter 7100 may use any combination of switch sensing, receiver, transceiver and sensor functionality to set the light intensity level. In one embodiment, the UPS Lighting Adapter 7100 contains a light sensor that may be used for a daylight harvesting function as described herein. Based on the detected light level, the UPS Lighting Adapter 7100. In an alternate embodiment, there is no embedded battery supply and the primary function of the device is daylight harvesting and the device is a daylight harvesting lighting adapter.

In some embodiments of the UPS Lighting Adapter, the lighting adapter is used as a grid shifting device rather than for backup power. In such an embodiment the Grid Shifting Lighting Adapter may be designed to store power from the input power source and use power from the embedded power source. The functionality may be pre-programmed, factory set, designed in a custom electrical circuit or the like to respond to sensors on the adapter and/or a pre-programmed algorithm to implement the grid shifting function. The functionality may be implemented in conjunction with sensors on the adapter and an intelligent program that may change the behavior of the adapter based on the feedback received from the one or more sensors on the adapter. The sensors may include a light sensor, motion sensor, an atomic clock or time receiver, temperature sensor or any other sensor mentioned herein that may allow the Grid Shifting Lighting Adapter to make a decision on which power source to use. In some embodiments, there may not be a sensor on the adapter and the grid shifting function is performed based on an intelligent program internally. The intelligent program may contain a real time clock that may be set at the factory or set by the user such that the intelligent program may use time of day or a calendar to perform the grid shifting functionality. The grid shifting function may be used for cost savings, energy efficiency, convenience and safety/security.

A Grid Shifting Lighting Adapter may have switches, dials, knobs etc on the adapter to set time of day or sensor thresholds such that a user may be able to control how the intelligent program manages the adapter. Once set, the Grid Shifting Lighting Adapter may act autonomously based on those settings and/or the pre-programmed or designed function. The settings may be changed on occasion by the user. In some embodiments, the Grid Shifting Lighting Adapter may contain a wireless receiver such that it may receive commands and/or be controlled remotely. By way of an example, the Grid Shifting Lighting Adapter may receive a load control signal, may receive a command to change behavior based on a need to implement demand response, may receive a command shifting power to or from the embedded power source for cost savings reasons or the like. In some embodiments, the Grid Shifting Lighting Adapter may contain a transceiver such that it may be part of a network allowing control to be received and/or propagated through the network as mentioned herein.

By way of an example, a Grid Shifting Lighting Adapter may be designed with embedded rechargeable batteries and a connection to power through an Edison socket as well as a second Edison socket that would allow a bulb to plug into the adapter. Intelligence in the form of logic, electrical circuitry, microcontrollers, microprocessors, memory devices etc. contained within the adapter may control the rate of charging, time of charging or any other aspect of the charging of the embedded power source, may control the consumption of power from the input and/or embedded power source including when to use each source or what the level of sharing of the load is on each source, may control the amount of power consumption by controlling the drive to the light source by dimming it using a triac, amplitude modulation or the like or may control any other function of charging and power consumption. The intelligence may also leverage sensors on the adapter to monitor patterns of sensor inputs by which the adapter may adjust the charging and use of the power source to optimize the adapter's use of power for cost savings, energy efficiency, convenience, safety/security, and the like. The intelligence may keep the patterns in memory over time if necessary and adjust grid shifting functionality based on the pattern. In the example, the Grid Shifting Lighting Adapter may be plugged into a recessed socket by an end user and an R30 LED light bulb may be plugged into the adapter. A time of day clock in the adapter may start storing energy in the embedded power source during a time interval preset for example in the evening hours when the energy rates are low. In the daytime, the adapter may use the embedded power source entirely while capacity is available, share the electrical load with the input power or may use the embedded power source. The adapter may be pre-programmed to work based on the TOU rate plan offered by a particular power company and the intelligence in the adapter may be optimized to save as much money on the energy bill of a customer as possible. Alternately, the adapter may be pre-programmed with a time of day clock and a calendar such that the adapter may grid shift on days known to be peak energy usage days for a particular power company reducing the peak usage of a customer on those days and times of day when it is desirable to reduce peak energy usage. It is to be appreciated that the input and output connections of the Grid Shifting Lighting Adapter may consist of any type of connector used by standard size bulb (PAR30, PAR38, A19, R30, MR16, and so on), non-standard size bulb, fixture, fluorescent bulb or lamp (T4, T5, T8, circular, and so on) or down light assembly (recessed fixtures, fluorescent fixtures or down light fixtures for residential or industrial lighting), ballast, power supply or the like such that the Grid Shifting Lighting Adapter may electrically and mechanically couple the input connection to the mating connection to mimic the connection on the bulb, fixture, lamp, assembly or the like that would connect to the output connection and accept any type of bulb, fixture, lamp, assembly etc at the output connection. In alternate embodiments, the Grid Shifting Lighting Adapter contains a grid tie inverter and may return power to the grid as mentioned herein.

In some embodiments, the grid shifting adapter may be used for applications other than lighting. By way of an example, a grid shifting module may be designed to mount inside of a refrigerator or freezer. In such a case, the same functionality as described for grid shifting lighting applications may apply where there may be a need to shift power use to the embedded power source for cost savings, convenience or backup power purposes. In the example of the refrigerator or freezer, the embedded power source may provide cost savings by storing energy when the electric rates are low and using the stored energy when the rates are high. In that example, it may also be used to power the refrigerator or freezer when there is a power outage thus providing power to the refrigerator or freezer for some period of time during the power outage. It is to be appreciated that a device of any kind such as a lamp, television, television peripheral, computer, servers, network equipment, storage devices, appliance, washer, clothes dryer, refrigerator, freezer, electric range, microwave oven, electric water heater, vacuum cleaner, cell phone charger, stereo, air conditioner, HVAC devices, electric or hybrid vehicles, electric motors, portable generators and backup power sources, uninterruptable power supplies (UPS), inverters, industrial and manufacturing machinery etc may contain a module in the path of power that may allow the grid shifting functionality to be implemented. In some embodiments, the grid shifting module may be removable and replaceable. In some embodiments, the grid shifting module contains a grid tie inverter and may return power to the grid as mentioned herein.

In some embodiments, a wireless light bulb with an embedded power source such as a battery may be dimmable by a typical dimmer switch. Switch sensing functionality may be able to detect the setting of the dimmer switch and control the current drawn from the embedded power source to set the light intensity level accordingly. In an alternate embodiment, the wireless light bulb may store the last dim level setting as detected from the input and when the bulb is switched over to the embedded power source set the light intensity level to the closest level possible as the last detected level. By way of an example, the wireless light bulb may detect the dim level by either detecting the average current level through the light source and when switched over to the embedded power source adjust the average current level to the closest level possible to the dim level set by the line. In another example, a triac dimmable wireless light bulb may detect the amount of the waveform that the triac setting is active and when switched over to the embedded power source adjust the average current level through PWM control or any known method to set the light intensity level to the closest level possible to the dim level set by the triac. In some embodiment, light intensity of the UPS light bulb may be controlled through the wall switch using the switch sense function. By way of an example, if the power is no longer present, the UPS light bulb may set the light intensity to 100 lumens which it may be able to maintain for some period of time. If the light intensity needs to be higher, the light switch may be turned off and then on again. The switch sense function detects the change in the controlling switch and resets the light intensity to 250 lumens. Turning the light switch off and on again sets the light intensity to 400 lumens and so on until the light intensity reaches the maximum level. Turning the light switch off and on again will then turn the light off. Turning the light switch off and on again will set the light intensity to 100 lumens. In this way, the light intensity is controllable when the UPS light bulb is powered by the embedded power source. It is to be appreciated that any number of light intensity levels at any light intensity may be implemented.

In an embodiment of a battery powered wireless lighting fixture, a high intensity battery powered flood light may be designed that mounts on a stand with a base containing a battery pack for commercial, industrial or security applications that can generate a light output, such as of 1,500 lumens and be controlled by RF. The high intensity battery powered flood light may be turned on to full brightness for a short period of time, then it may dim down to a much lower level as needed. By way of an example, road construction crews that have very bright flood lights aimed at their work area rely on high intensity standing lights. This would be a portable version that would not need a generator and allow RF control that would provide the convenience to turn on, turn off, dim, change a different light intensity level etc. The battery pack in the base may be a large battery providing continuous light for days. The battery pack may be rechargeable or non-rechargeable. At the top of the stand, the housing for the flood light may allow the light to be adjusted or articulated in the desired direction, then locked into place. In some embodiments, the light may contain an RF transceiver such that a network of flood lights may be controlled from one source. In some embodiments, the light may contain any type of sensor. By way of an example, a motion sensor may be on the flood light to allow motion control. In another example, a light sensor may be used as a day night controller such that the light will automatically turn on as necessary as the ambient light decreases. The detected ambient light level that the high intensity battery powered flood light is enabled may be adjustable by a potentiometer or similar means on the flood light. In some embodiments a daylight harvesting function may be implemented such that the light intensity slowly increases to the maximum level as it gets darker at night and slowly decreases as it gets the light gets brighter in the morning. In some embodiments, the electronics are in the base of the unit with the battery pack and the only device on the stand is the light source. By way of an example, a small LED light source, optics and a housing may be mounted at the top of the flood light and the only two wires that may need to be nm from the base to the flood light housing through the stand are the LED drive and LED return lines. This allows the flood light housing to be as small as possible.

Figure 72:
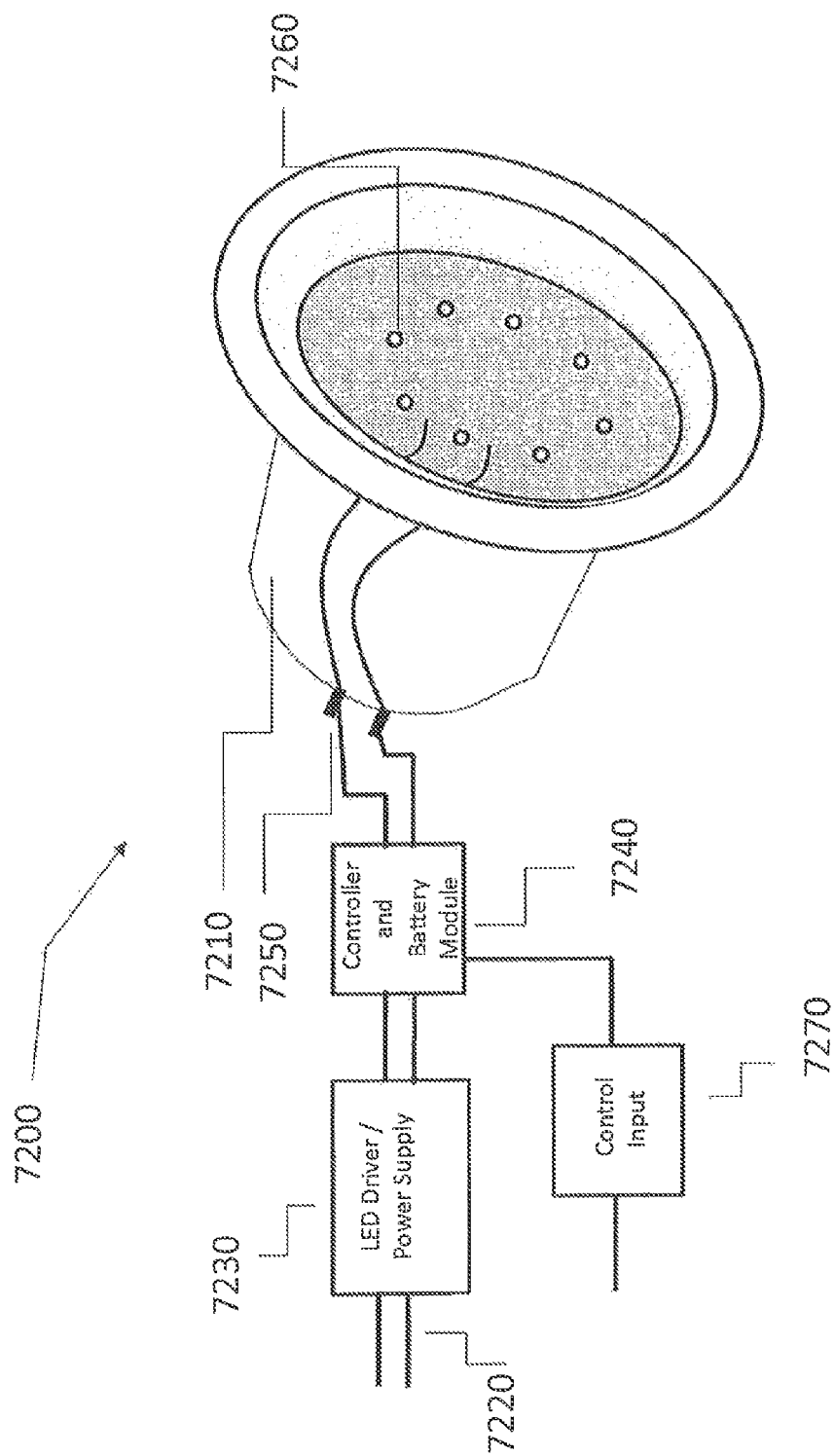
FIG. 72 shows a perspective view of the recessed fixture version of a wireless light bulb with a battery backup between the power supply and light source.

In another illustrative embodiment, a recessed fixture version of a wireless light bulb with a battery backup between the power supply and light source is described for use in Battery Backed LED Recessed Fixture 7200 applications. With reference to FIG. 72, illustrated is a perspective view of an embodiment of a Battery Backed LED Recessed Fixture 7200. In the illustrated embodiment, the Battery Backed LED Recessed Fixture 7200 includes a fixture housing 7210, a power input 7220, a power supply 7230, a controller and battery module 7240, a power input to the fixture housing 7250, a plurality of LEDs 7260 and a control input 7270. In this embodiment, the power supply 7230 is external to the housing, electronics, thermal management and light source. The power supply 7230 may provide power to the plurality of LEDs 7260, to the fixture housing 7210, to the control input 7270 and/or to the controller and battery module 7240. In the illustrated embodiment, the power input 7220 is an AC input and the power supply 7230 is a constant current LED driver that may supply power to a series chain of LEDs. It is to be appreciated that the input may be AC or DC and the power supply may provide power to the Battery Backed LED Recessed Fixture 7200 as needed. The LEDs may be configured in series, parallel or any other configuration typical of LED lighting. The controller and battery module 7240 may be connected to the power supply 7230 and light source such that the controller and battery module 7240 may supply power to the plurality of LEDs 7260. The embedded battery supply in the controller and battery module 7240 may be recharged from the power supply 7230. In some embodiments, the power supply 7230 and/or the controller and battery module 7240 may allow the drive level to be adjustable by using a dial, toggle switch, rotary switch, push buttons or the like to allow the user to adjust the drive current to the light source. Thus the power consumption and light intensity may be adjusted based on the requirements of the application. In alternate embodiments, intelligence in the Battery Backed LED Recessed Fixture 7200 may adjust the drive level automatically based on programming or in a preconfigured manner in response to a condition detected by the fixture. In embodiments, the controller and battery module 7240 may make an intelligent decision on which power source, external power or internal battery, to use. The controller and battery module 7240 may monitor the power input and if the power input is no longer available or should not be used, the controller and battery module 7240 may switch to the internal power source. In some embodiments, the decision on which power source to use may be made based on a control input 7270 to the controller and battery module 7240. By way of an example, wiring may be run from a controlling source such as a light switch to the control input 7270 such that the control input 7270 may detect when power is no longer available or should not be used based on the state of the controlling source. In the example using a light switch, a circuit may monitor the power input prior to the switch and may monitor the state of the switch. If the switch is closed and power is present and usable at the controller and battery module 7270, power is by the power supply 7230. If the switch is closed and power is not present or not usable, the controller and battery module 7270 may switch to battery power. If the switch is open and power is present and usable prior to the switch, power may not be supplied by the power supply 7230 because the switch is open and the controller and battery module 7270 will not supply power from the battery because the intent is for the light to be off. If the switch is open and power is not present or not usable prior to the switch, the controller and battery module 7270 may switch to battery power because there is an indication that there is a problem with power even though the switch is open. In some embodiments, the control input 7270 may consist of a wireless receiver that receives an indication of the state of the controlling circuit and input power allowing the controller and battery module 7270 to decide which power source to use or not to power the light source. In some embodiments, the control input 7270 may receive an input from over the wires such that it receives an indication of the state of the controlling circuit and input power by some form of communication over the power input 7220. In some embodiments, the control input 7270 may sense the state of the switch by measuring difference in impedance with the switch open or closed, using a TDR circuit to detect an impedance discontinuity at the switch or any other method of switch sensing mentioned herein. In some embodiments, a device may be attached to the controlling source such that the switch sensing function may detect the sense of the controlling source by being able to detect measurable electrical characteristics of the attached device. In such a case, the switch sense function along with a device attached to the controlling source would allow the Battery Backed LED Recessed Fixture 7200 to be installed without the need for extra wiring to be run between the controlling source and fixture.

Figure 73:
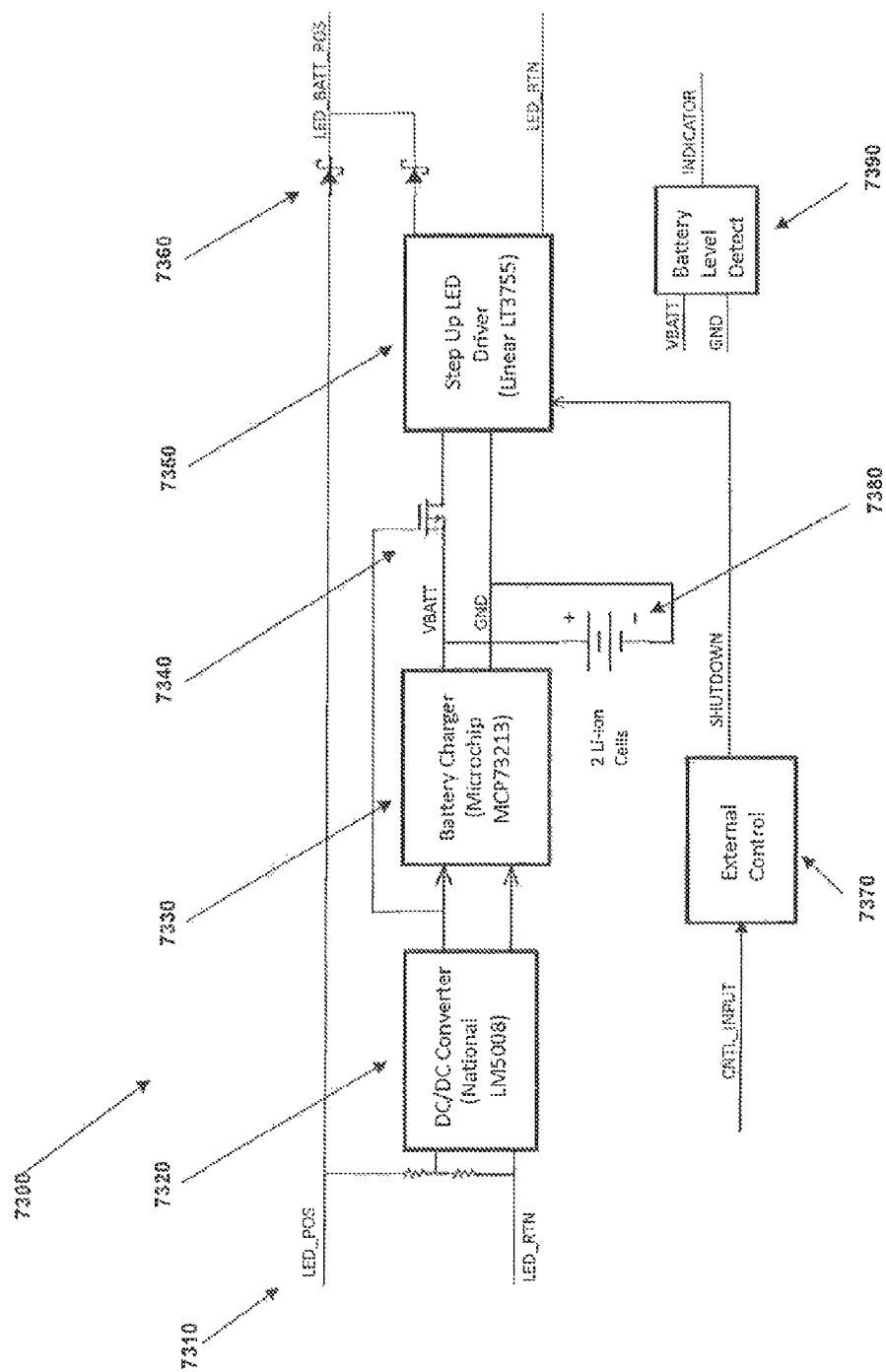
FIG. 73 shows a block diagram of the backup controller and battery module in the recessed fixture version of a wireless light bulb with a battery backup between the power supply and light source.

FIG. 73 shows a block diagram of the backup controller and battery module in the Battery Backed LED Recessed Fixture 7200 between the power supply and light source. The Backup Controller and Battery Module 7300 may include a LED driver input 7310, DC/DC converter 7320, battery charger circuitry 7330, an embedded battery supply 7340, a step up LED driver 7350, ORing circuitry 7360, external control input 7370, switching circuitry 7380, a battery level detector 7390 and the like. A Backup Controller and Battery Module 7300 may be designed with switching circuitry 7380 such that when external power is applied, the LED driver input 7310 supplies power to the light source. When the external power is no longer present the switching circuitry 7380 may automatically switch such that the embedded battery supply 7340 and step up LED driver 7350 may supply power to the light source thus the unit is powered from embedded battery supply 7340. In the illustrated embodiment, the external power supplied is the output of a constant current LED driver. In alternate embodiments, the power supplied at the input may have any characteristics required by the light source and circuitry powered by the supply. In the embodiment, the switching circuitry 7360 consists of two diodes to diode-or the power sources together as shown in the ORing circuitry 7360 and a p-channel FET between the battery and step up LED driver 7350 such that when power is supplied at the input, the battery is disconnected from the step up LED driver 7350 and when power is not supplied at the input the p-channel FET connects the embedded battery supply 7340 to the step up LED driver 7350 and the step up LED driver 7350 drives the light source. In alternate embodiments the switching circuitry may consist of a relay, solid state switch, discrete circuitry and the like such that the desired power source may be supplied. It is to be appreciated that several methods of selecting and switching the power source will be readily apparent to those skilled in the art. In the illustrated embodiment, the step up LED driver 7350 is a Linear Technology LT3755 step up LED driver 7350. It is to be appreciated that any type of step up DC/DC converter and/or LED constant current driver circuit may be used to supply power with the desired drive characteristics. In an alternate embodiment, input power is provided by an AC/DC converter and the switching circuitry may connect input power to the input of the step up LED driver. In this embodiment, the switching circuitry switches between the AC/DC supply and the embedded battery supply therefore the only constant current driver is the step up LED driver. It is to be appreciated that any alternate LED driver may be used and that driver may be a step up driver, a step down driver, a buck boost driver or the like.

In the illustrated embodiment, the embedded battery supply 7340 is a dual cell Li-Ion battery pack. It is to be appreciated that the embedded battery supply 7340 may be any rechargeable battery type mentioned herein. In alternate embodiments, the embedded battery supply 7340 may be non-rechargeable such as one or more alkaline batteries. In other embodiments, the embedded battery supply 7340 may be a capacitor, super capacitor, fuel cell etc. In the illustrative embodiment, the dual cell Li-Ion battery pack is charged with dual cell Li-Ion charging circuit based on the Microchip MCP73213 battery charger. It is to be appreciated that any type of battery charger circuit may be used to charge the desired type rechargeable battery used as the embedded battery supply 7340. The DC/DC converter 7320 may be required to provide the required voltage to the battery charger circuit if the battery charger circuit is not be capable of being powered directly from the input power. In the illustrated embodiment, the DC/DC converter 7320 is a National Semiconductor LM5008 switching regulator. In the illustrated embodiment, there may be a resistor divider circuit or a resistive drop to set the voltage at the input of the DC/DC converter 7320. In the illustrated embodiment, the LM5008 and LT3755 are high voltage devices allowing the Backup Controller and Battery Module 7300 to operate at a high voltage (up to 75 VDC).

As mentioned herein, the external control input 7370 may receive an input or detect a condition that allows the Backup Controller and Battery Module 7300 to make a decision on which power source to use or not to power the light source. In the illustrated embodiment, the external control input 7370 may receive an input or detect the condition and control the shutdown input to the LT3755 such that the LT3755 will not drive the output thus the embedded battery supply 7340 will not supply power. In alternate embodiment, the external control input may enable or disable the embedded battery supply 7340 to supply power using FETs, relays or any other type of control that would allow the external control input 7370 to enable or disable embedded battery supply 7340 and/or the LED driver input 7310 from supplying power and the switching devices may be at any position in the circuit to implement the required switching function. In alternate embodiments, power may be shared such that intelligence in the Backup Controller and Battery Module 7300 may control both power sources such that they both supply some amount of power. In some embodiments the Backup Controller and Battery Module 7300 contains a a battery level detector 7390 to provide an indication of the capacity remaining in the embedded battery supply 7340. By way of an example, an external LED may be driven when the battery level voltage is below a threshold that may indicate a low battery level. In some embodiments, the Battery Backed LED Recessed Fixture 7200 may be mounted in a ceiling. The external LED may be mounted in the ceiling to provide a visual indication of the battery capacity level. In some embodiments, the external LED is embedded in an illuminated switch such that when the switch is actuated, the battery level detector 7390 may drive the LED in the illuminated switch such that when the switch is actuated an indication of the battery capacity level is provided. It is to be appreciated that an indication of the battery capacity level may be provided in any manner described herein.

In embodiments of lighting fixtures, a fixture may be designed containing any type of connector used for standard size bulb (PAR30, PAR38, A19, R30, MR16, and so on), non-standard size bulb, fixture, fluorescent bulb or lamp (T4, T5, T8, circular, and so on) or the like such that when the bulb, lamp or tube is connected to the socket of the lighting fixture, the lighting fixture may lock the bulb, lamp or tube in place such that the only way to replace the bulb, lamp or tube is to replace the entire fixture. In some embodiments, the locking device may be part of the fixture. In alternate embodiments, the locking device may be a separate assembly that mounts onto a fixture or a bulb, lamp or tube that implements the locking function. In some embodiments, the locking device is irreversible once it locks in place such that the bulb, lamp or tube may not be reasonably removed. In other embodiments, there may be a key that allows the device to be unlocked such that service personnel may unlock the bulb, lamp or tube for replacement. By way of an example, a PAR30 LED bulb with an Edison screw shell may be screwed into a recessed fixture. The recessed fixture has a mechanism built in such that when the PAR30 bulb is screwed into a certain depth and has made an electrical connection with the fixture, the mechanism applies pressure to the stem of the bulb such that bulb may not reasonably be unscrewed from the fixture. It is to be appreciated that the locking mechanism may come in any form that may secure the bulb, lamp or tube in place after it has been installed. In applications where the light source must meet requirements such that an end user should not be able to change the bulb, lamp or tube, this locking mechanism allows the installer to meet this requirement but also use any off the shelf bulb, lamp or tube instead of needing to purchase a fixture with a light source built in.

Figure 74:
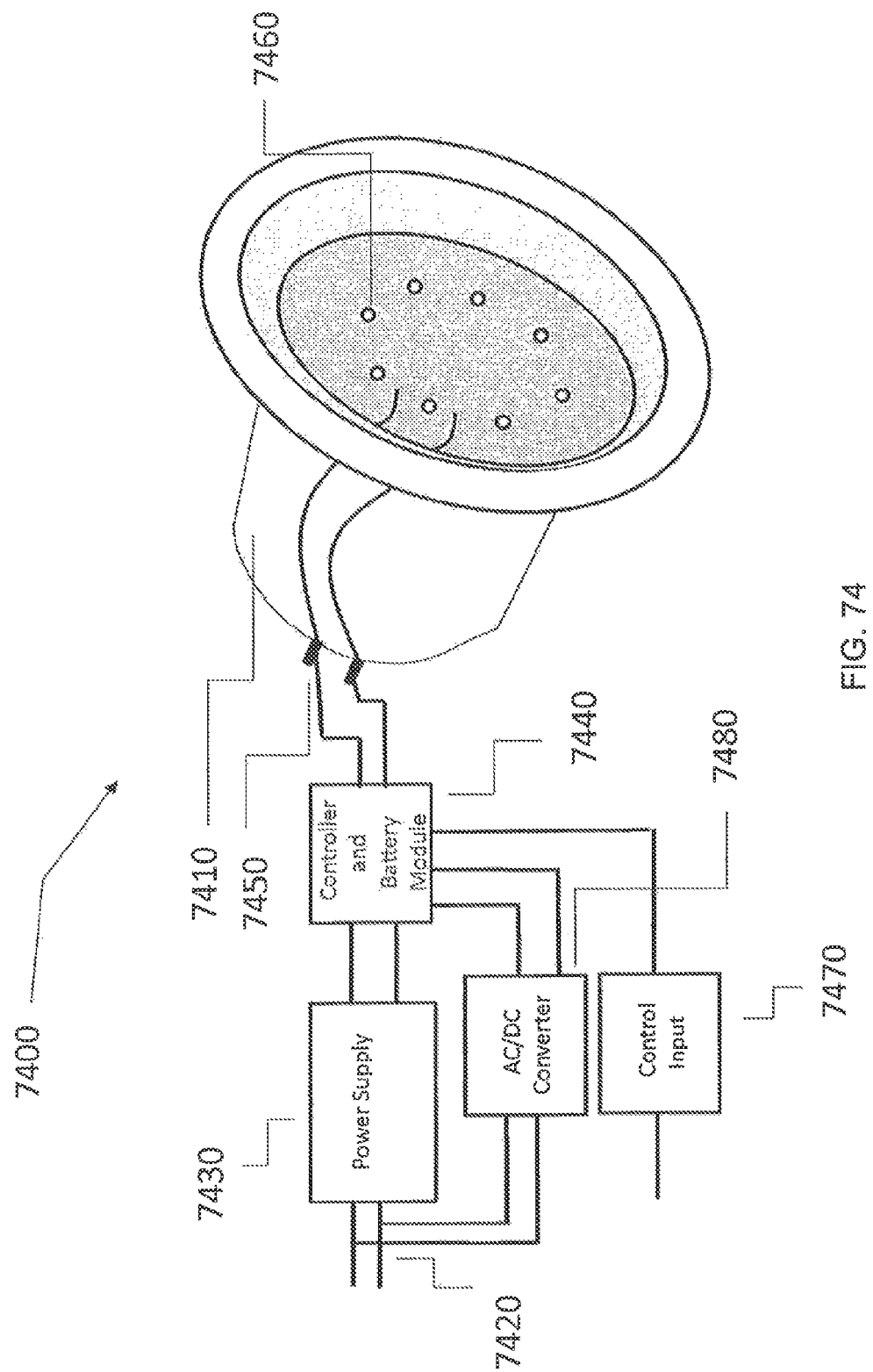
FIG. 74 shows a perspective view of the recessed fixture version of a wireless light bulb with an AC power input with a battery backup between the power supply and light source.

In another illustrative embodiment, a recessed fixture version of a wireless light bulb with a battery backup between the power supply and light source which is powered by the AC input is described for use in AC Input Battery Backed LED Recessed Fixture 7400 applications. With reference to FIG. 74, illustrated is a perspective view of an embodiment of an AC Input Battery Backed LED Recessed Fixture 7400. In the illustrated embodiment, the AC Input Battery Backed LED Recessed Fixture 7400 includes a fixture housing 7410, a power input 7420, a power supply 7430, a controller and battery module 7440, a power input to the fixture housing 7450, a light source 7460, a control input 7470 and an AC/DC converter 7480. In this embodiment, the power supply 7430 is external to the housing, electronics, thermal management and light source. The power supply 7430 may provide power to the light source 7460, to the fixture housing 7410, to the control input 7470 and/or to the controller and battery module 7440. In the illustrated embodiment, the power input 7420 is an AC input and the power supply 7430 is a constant current LED driver that may supply power to a one or more LEDs which serve as the light source 7460. It is to be appreciated that the input may be AC or DC and the power supply may provide power to the light source as needed. The LEDs may be configured in series, parallel or any other configuration typical of LED lighting. The controller and battery module 7440 may be connected to the power supply 7430 and light source 7460 such that the controller and battery module 7440 may supply power to the light source 7460. The embedded battery supply in the controller and battery module 7440 may be recharged from the AC/DC converter 7480. In some embodiments, the power supply 7430 and/or the controller and battery module 7440 may allow the drive level to be adjustable by using a dial, toggle switch, rotary switch, push buttons or the like to allow the user to adjust the drive current to the light source. Thus, the power consumption and light intensity may be adjusted based on the requirements of the application. In alternate embodiments, intelligence in the AC Input Battery Backed LED Recessed Fixture 7400 may adjust the drive level automatically based on programming or in a preconfigured manner in response to a condition detected by the fixture. In embodiments, the controller and battery module 7440 may make an intelligent decision on which power source, external power or internal battery, to use. The controller and battery module 7440 may monitor the power input and if the power input is no longer available or should not be used, the controller and battery module 7440 may switch to the internal power source. In some embodiments, the decision on which power source to use may be made based on a control input 7470 to the controller and battery module 7440. By way of an example, wiring may be run from a controlling source such as a light switch to the control input 7470 such that the control input 7470 may detect when power is no longer available or should not be used based on the state of the controlling source. In one example, a connection to AC power prior to the light switch may be brought into the control input 7470 such that the unswitched AC power will be available whether the controlling source intends to turn the light on or not. In the example using a light switch, a circuit may monitor the power input prior to the switch and may monitor the state of the switch. If the switch is closed and power is present and usable at the controller and battery module 7470, power supplied by the power supply 7430. If the switch is closed and power is not present or not usable, the controller and battery module 7470 may switch to battery power. If the switch is open and power is present and usable prior to the switch, power may not be supplied by the power supply 7430 because the switch is open and the controller and battery module 7470 will not supply power from the battery because the intent is for the light to be off. If the switch is open and power is not present or not usable prior to the switch, the controller and battery module 7470 may switch to battery power because there is an indication that there is a problem with power even though the switch is open. In some embodiments, the control input 7470 may consist of a wireless receiver that receives an indication of the state of the controlling circuit and input power allowing the controller and battery module 7470 to decide which power source to use or not to power the light source. By way of an example, a power outage module that consists of a wireless transmitter and method to detect a power outage may transmit the indication of the state of the controlling circuit to allow the AC Input Battery Backed LED Recessed Fixture 7400 to make an intelligent decision on which power source to use to power the fixture. In some embodiments, the control input 7470 may receive an input from over the wires such that it receives an indication of the state of the controlling circuit and input power by communication over the power input 7420. In some embodiments, the control input 7470 may sense the state of the switch by measuring difference in impedance with the switch open or closed, using a TDR circuit to detect an impedance discontinuity at the switch or any other method of switch sensing mentioned herein. In some embodiments, a device may be attached to the controlling source such that the switch sensing function may detect the sense of the controlling source by being able to detect measurable electrical characteristics of the attached device. In such a case, the switch sense function along with a device attached to the controlling source would allow the AC Input Battery Backed LED Recessed Fixture 7400 to be installed without the need for extra wiring to be run between the controlling source and fixture. In alternate embodiments, this architecture is applied to the UPS light bulb. In alternate embodiments, this architecture is applied to UPS tube replacements. It is to be appreciated that this architecture may be applied to any standard size bulb (PAR30, PAR38, A19, R30, MR16, and so on), non-standard size bulb, fixture, fluorescent bulb or lamp (T4, T5, T8, circular, and so on).

h some embodiments, battery backed LED recessed fixture may have an indication of a low battery level. There may be a method to test the fixture, such as a button that may be pressed to briefly test that the light output powered by an integrated power source is healthy, that may provide an indication of the battery level. In some embodiments where there is an external power source, a button or switch may be used to break the connection of external power into the fixture to perform a test of the operation of the fixture when powered by the internal power source. In alternate embodiments, the button or switch may be replaced by a wireless receiver integrated with the fixture and a separate remote control that provides the same operation when the button or switch on the remote control is actuated. By way of an example, a user may walk under a battery backed LED recessed fixture and press a button on the remote control forcing the indication of the battery level to become active or alternatively forcing a break in the connection of external power into the fixture so that the user may determine that the light is operating properly using the integrated power source. In alternate embodiments, the fixture may have a transmitter designed in that may transmit a representation of the battery charge level periodically to allow an external system such as a computer, laptop, handheld computer, dedicated hardware etc. to provide a user with a status on whether the battery power is at an acceptable level. By way of an example, in an emergency lighting system, a fixture may transmit its battery charge level to a central controlling station that would then provide an alarm to a user when the battery charge level is below a threshold. The user may then replace the batteries. In alternate embodiments, there is one or more colored LEDs or a multicolor LED on the fixture that may provide a visual indication of the battery charge level. In alternate embodiment, a UPS light bulb or UPS lighting adapter may have a method to test the bulb or adapter, such as a button that may be pressed to briefly test that the light output powered by the integrated power source of the bulb or adapter is healthy, that may provide an indication of the battery level. In some embodiments, a button or switch may be used to break the connection of external power into the fixture to perform a test of the operation of the bulb or adapter when power is supplied by the internal power source. In alternate embodiments, the button or switch may be replaced by a wireless receiver integrated with the bulb or adapter and a separate remote control that provides the same operation when the button or switch on the remote control is actuated.

In embodiments of the wireless light bulb with an LED light source, there may be a constant current driver that supplies a constant current drive to the LEDs but in addition an auxiliary power supply that provides a constant DC power source may also be provided. The constant current power source and constant DC power source may be derived from the same circuit or alternatively they may be independently operating circuits. By way of an example, a motion sensor circuit may be powered from the auxiliary power supply that may always be present and has the ability to turn on or off the constant current supply to the LEDs. In this example, the motion sensor circuit is always active and may control the power source to the LEDs independently. In another example, a rechargeable battery inside the wireless light bulb is recharged from the auxiliary power supply independent of the constant current drive to the LEDs. Thus, the rechargeable battery may be recharged without having to consume power from the constant current drive to the LEDs in which case the light output of the LED light source would not be affected while the battery is charging. It is to be appreciated that any type of sensor, wireless input, wired input or power management of an embedded power source may be used in conjunction with the auxiliary power supply to provide operation of the sensor, wireless input, wired input or power management of an embedded power source.

In embodiments of the wireless light bulb containing a motion sensor, the motion sensor may be powered by a capacitor, super capacitor, ultra capacitor or the like independent of the input power. In such an embodiment, the capacitor may be charged from the input power when the light source is on. When the light source is on and receiving power from the input power source, the capacitor may be used to power the motion sensor while that capacitor is being charged by the input power source. By way of an example, the motion sensor circuit powered by the capacitor detects motion and switches on power to the light source. While the light source is on, the capacitor may be charging. If the motion detector detects motion prior to an auto shutoff time, it will continue to switch on power to the light source and reset the auto shutoff timer. If the motion detector does not detect motion prior to the auto shutoff time, it will switch off power to the light source. The capacitor may continue to power the motion sensor such that it may be active but not draw power from the input power source. In alternate embodiments, the sensor powered by the capacitor may be a light sensor. In alternate embodiments, a wireless receiver is powered by the capacitor. In alternate embodiments, a microcontroller, microprocessor or other type of programmable device is powered by the capacitor. It is to be appreciated that any combination of sensor, wireless receiver, programmable device or the like may be powered by the capacitor. The advantage to using a capacitor versus a rechargeable battery is that in a high temperature environment such as an LED light bulb, LED light fixture etc a capacitor may have a considerably higher operating temperature and may not be subject to capacity loss like known types of rechargeable batteries. By way of an example, a motion sensor designed with a PIR sensor, operational amplifier to amplify the signal from the PIR sensor and a threshold detector that triggers when the level detected out of the PIR sensor exceeds some level may require 50 uA of power and may require a minimum operating voltage of 3 VDC. If a 10 F capacitor is used and initially is charged to 5 VDC, the dv/dt=I/C may determine the amount of time the capacitor may power the circuit before the voltage to the motion sensor drops below 3 VDC. In such a case, the dt=dv*C/I=2 VDC*10F/50 uA=400,000 seconds or approximately 4.6 days thus the motion sensor may be operational for an extended period of time using a capacitor rather than using the input power. In alternate embodiments, the capacitor may be used to power the light source or other circuitry inside the bulb. By way of an example, the capacitor may power the light source at a glow level to allow the light to be used as a marker or a low light level to allow the light to be used for illumination at a low light intensity level.

In embodiments of wireless light bulbs or battery powered wireless lighting fixtures containing an integrated battery as a power source, a battery capacity and run time estimation may be performed to determine if a change to the drive level to the light source may be needed to extend the amount of time the light source may generate light. By way of an example, a light source may need to provide light at a minimum intensity level for greater than 90 minutes in emergency lighting applications. A battery capacity and run time estimation may be made by estimating the battery capacity level at an instant then factoring in an estimated capacity loss over time. The estimated capacity loss may be derived from a count of ON time as powered by the battery, ON time as powered by another power source and OFF time all in conjunction with a measurement of temperature. This information along with a knowledge of the current discharge profile of a particular battery may be used to alter the power requirements of the light source to alter the discharge and extend the time that light is available. The estimation of battery capacity level and run time estimation and adjustment in the operation of the bulb or fixture may be implemented in a programmable device such as a microcontroller, microprocessor or the like in the wireless light bulb or battery powered wireless lighting fixture to maintain the counts and temperature measurements over time, maintain a real time estimate of the current discharge profile and a control of the light intensity such that it may reduce the current discharge requirements to fit into a current discharge profile that would meet a time duration as required by an application. In some embodiments, the record of battery operation and adjustments over time may be retrieved by a user over a wired or wireless interface. In some embodiments, a current discharge profile may be reached that indicates that maintenance may be required such as a battery replacement. It is to be appreciated that the record of battery use may be retained in non-volatile memory.

In embodiments of UPS light bulbs, UPS lighting adapters, battery backed LED fixtures or battery powered wireless lighting fixtures a temperature fault indication may be provided when one or more temperatures measured by the device meets or exceeds a threshold. In some embodiments, the temperature fault may inhibit or alter the operation of the unit until the temperatures are measured below a threshold. It is to be appreciated that some hysteresis in the form of multiple thresholds may be used at the temperature fault thresholds to enable and disable operation. The temperature fault indication may be one or more additional indicator lights, an indication by modifying the operation of the device for example blinking the light source, an audible alarm etc. By way of an example, a UPS LED light bulb with a Li-Ion rechargeable battery that has a known maximum operating temperature may contain a red LED that may be turned on when the temperature measure by an NTC or similar device approaches or exceeds the maximum operating temperature of the Li-Ion battery. At the temperature fault, the UPS LED light bulb may turn off the light source to reduce the temperature and turn on the red LED to indicate the fault. In some embodiments, circuitry or intelligence in the UPS LED light bulb may reduce the light intensity to reduce the temperature by reducing the amount of heat generated by components of the UPS LED light bulb.

In embodiments of LED light bulbs, wireless light bulbs, UPS light bulb, UPS lighting adapter, battery backed LED fixtures, external light socket adapters, AC outlet adapters, AC outlet replacements, AC powered devices, AC circuit with embedded battery device designed with batteries embedded, wall switch or lighting control component, there may be protection circuitry built in to protect the device or attached devices from damage in the case of power surges or other disturbances in the power input that may damage the device or attached devices. In some embodiments with an embedded power source, when the protection mechanism is implemented the embedded power source may be used for some period of time to continue operation of the light source or attached device after the detected surge or other disturbance. After some period of time that no problem is detected, the bulb, adapter, fixture or device may switch back to the input power source. The protection circuitry may include metal oxide varistors (MOVs), diodes such as Zener diodes for transient suppression, selenium voltage suppressors, gas discharge tubes and the like. In some embodiments, the surge suppression circuitry may be designed such that the surge suppression circuitry inside the bulb, adapter, fixture or device may provide surge suppression functionality for other devices on the same electrical circuit outside of the bulb, adapter, fixture or device. By way of an example, a UPS lighting adapter may contain protection circuitry such that when a power surge occurs, the UPS lighting adapter detects the surge and protects the attached lighting device. In addition, the protection device in the UPS lighting adapter may protect other circuitry on the lighting circuit. The UPS lighting adapter may disconnect power to the attached lighting device or it may switch over power to its embedded power source. It is to be appreciated that an adapter may protect the device or devices attached to it.

In some embodiments, a wireless lighting control module may be designed to be integrated with other devices that may desire to control wireless lighting. The wireless lighting control module is a module that contains the circuitry and a defined interface that may be connected to physically and electrically by an external device. Thus, the module may be integrated into or connected to any device that may interface physically or electrically and may be required to transmit control to installed lighting devices or lighting control devices. In some embodiments, the wireless lighting control module may include an enclosure and have a mounting mechanism to allow it to be physically integrated with another device. In some embodiments the module may be removable and replaceable. In some embodiments, the module may contain an integrated power source. In some embodiments, the module may receive power from the external device over the interface. In some embodiments the module may be an electrical circuit on a printed circuit board that may be integrated into another device. By way of an example, a wireless lighting control module consists of an RF transmitter and an interface to a programmable logic controller (PLC) that may transmit control based on its programming to control wireless lights installed in an industrial environment. The PLC may have control output that may be wired to the wireless lighting control module such that it may control it to turn on, turn off, dim, test or otherwise control a lighting installation. In another use case, the wireless lighting control module may be integrated into a garage door opener and the transmitter may control battery powered wireless lighting fixtures that supply supplemental light when the garage door light is on. In an alternate example, the wireless lighting control module may be integrated into or plugged into a device such as a personal computer, laptop computer, handheld computer, smart phone or the like such that the wireless lighting control module may receive commands from the device or communicate with the device in some manner and control the installed lighting devices or lighting control devices as needed.

In some embodiments, a wireless lighting control module may be designed to be integrated with lights, fixtures, troffers, lamp bases, ballasts, lighting power supplies, lighting control devices and the like that may desire to control wireless lighting. In such an embodiment, the wireless lighting control module may be controlled over an interface. In some embodiments, the wireless lighting control module may electrically and physically connect to the control source or power input for the lights that the lights, fixtures, troffers, lamp bases, ballast, lighting power supplies, lighting control devices and the like are controlling. By way of an example, a wireless lighting control module may be electrically and physically connected to the Edison socket that is part of a light fixture such that it may determine whether the controlling device or devices for that fixture intend it to be on, off, dimmed etc. The wireless lighting control module may be physically inside the fixture. The wireless lighting control module may consist of an RF transmitter that may allow it to transmit commands based on the state of the lighting fixture to battery powered wireless lighting fixtures. In this way, the battery powered wireless lighting fixtures may provide additional or supplemental light to illuminate an area and those battery powered wireless lighting fixtures would be controlled by the same device that controls the fixture. By way of an example, a wireless lighting control module may be integrated into a fluorescent stairway light such that when the state of the fluorescent stairway light may trigger the wireless lighting control module to transmit control to the wireless light bulbs or battery powered wireless lighting fixtures. In this example, a battery powered stair light that may receive this control may be installed in the stairwell to provide supplemental lighting. In a similar example, the fluorescent stairway light provides emergency functionality such that upon detected an emergency situation, such as a power outage, the stairway light switches to its backup power source but may in addition transmit control to the battery powered stair lights such that they may turn on to provide supplemental light through the emergency.

In embodiments of wireless light bulbs, UPS light bulb, UPS lighting adapter, battery backed LED fixtures, external light socket adapters, AC outlet adapters, AC outlet replacements, AC powered devices, AC circuit with embedded battery device designed with batteries embedded, wall switch or lighting control component implementing the switch sense functionality, the device may measure resistance or capacitance across the input power and return to determine state of the controlling devices. By way of an example, the device may determine whether a controlling switch is open or closed based on the measurement of resistance and capacitance across the input power and return. In this example, a high resistance similar to an open circuit may indicated that one or more controlling switches or breakers are open and a lower resistance may indicate that the controlling switches and breakers are closed. By way of another example, if a triac dimmer or similar is the controlling device, the switch sense circuitry may detect changes in capacitance that represent different dimming levels. In some embodiments, the switch sense function that may detect the dimming level by measuring the capacitance across the input power and return may use the detection to set the dim level of the light source for example by setting the PWM control, embedded triac control, amplitude modulation control or the like of a light source to reflect the measured capacitance. In alternate embodiments, the bulb, adapter, fixture or device may generate a short pulse onto the input power line and monitor the return line for a return of the pulse. In a case where the device may be connected to a transformer at the source of the power, if the controlling devices are set to allow power through, a short pulse generated on the input power line may be received back on the return line. It is to be appreciated that the returning pulse waveform may be attenuated, distorted or altered in a number of ways. It is also to be appreciated that the pulse generator may be AC coupled onto the input power line. If the switch sense circuitry can detect the return pulse, it may allow the bulb, adapter, fixture or device to make a decision as to the state of the controlling devices and input power and switch over or not switchover to an embedded power source. In some embodiments, the switch sense function may trigger any decision to change state by the bulb, adapter, fixture or device as required by the application.

In embodiments, a UPS or Grid Shifting Lighting Fixture may be created integrating the UPS light bulb or UPS or grid shifting lighting adapter functionality into lighting fixture. The UPS or Grid Shifting Lighting Fixture may have an external power input and an embedded power source. Lighting fixtures that may make use of the UPS or grid shifting functionality include but are not limited to recessed cans, troffer lights, cove lights, floor lamps, chandeliers, pendant lights, sconces, track lights, undercabinet lights, emergency lights, exit signs, strip lights, light poles, street lamps, pathway lights, landscape lights, porch lights and the like. In alternate embodiments, the UPS or Grid Shifting Lighting Fixture may contain a grid tie inverter and may return power to the grid as mentioned herein.

Figure 75:
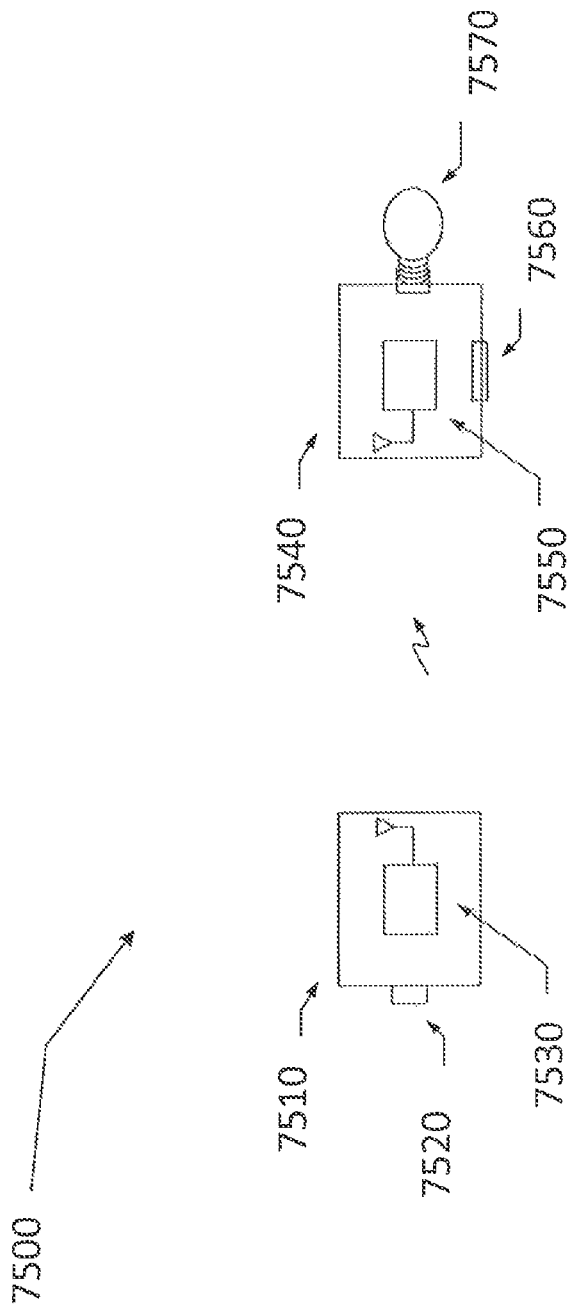
FIG. 75 shows a simplified schematic drawing of an RF communication system for controlling a wireless night light.

In an illustrative embodiment, a wirelessly controlled LED light is described for use in Wireless Night Light 7500 applications. With reference to FIG. 75, illustrated is a perspective view of an embodiment of a Wireless Night Light 7500. In the illustrated embodiment, the Wireless Night Light 7500 includes a transmitter 7510, a pushbutton or switch 7520, a transmitter electronic circuit 7530, a receiver 7540, a receiver electronic circuit 7550, a power plug or battery 7560 and a light source 7570. The Wireless Night Light 7500 allows a user to turn on and off a low intensity light used at night or in a dark area with a wireless signal. The Wireless Night Light 7500 consists of a transmitter and a receiver. The transmitter contains one or more pushbuttons or switches that command the receiver to turn on or off a remote light bulb, fixture or lamp by sending a wireless control signal to the receiver. The receiver receives the control message and turns a light bulb, fixture or lamp on or off based on the content of the message. The receiver, with a light source such as one or more embedded LEDs or a light bulb, fixture or lamp plugged into it, may be powered using a battery, may be plugged into an AC outlet or may have a DC power input. The transmitter is powered using a battery. The transmitter and receiver are electronic circuits mounted in separate enclosures. The transmitter and receiver may operate at a narrowband frequency in the frequency range from 300 MHz to 450 MHz. Data may be modulated using On-Off Keyed (OOK)/Amplitude Shift Keyed (ASK) data. The electronic circuit on the transmitter may build a data message, modulate it into an OOK/ASK data stream and transmit it using an antenna present in the transmitter enclosure. The electronic circuit in the receiver enclosure may receive the wireless signal using an antenna present in the receiver enclosure, de-modulate the OOK/ASK data stream and decode the data message contained in the data stream. The data message format may contain the on or off command and any other information necessary to guarantee that the message received was directed to that receiver. An example of a use of the Wireless Night Light 7500 is to allow a parent the ability to turn off a night light in a child's room without entering the room. A transmitter in the form of a handheld remote control or a wall switch plate mounted to the wall will allow a parent turn the light on or off. A receiver designed to plug into an AC outlet is plugged into the outlet. AC power to the AC outlet is set to be always on. The receiver may be designed to allow a light bulb or lamp to plug into it. When a pushbutton on the transmitter is pushed, the transmitter sends a wireless message to the receiver to command it to connect or disconnect power to the light bulb or lamp.

Figure 76:
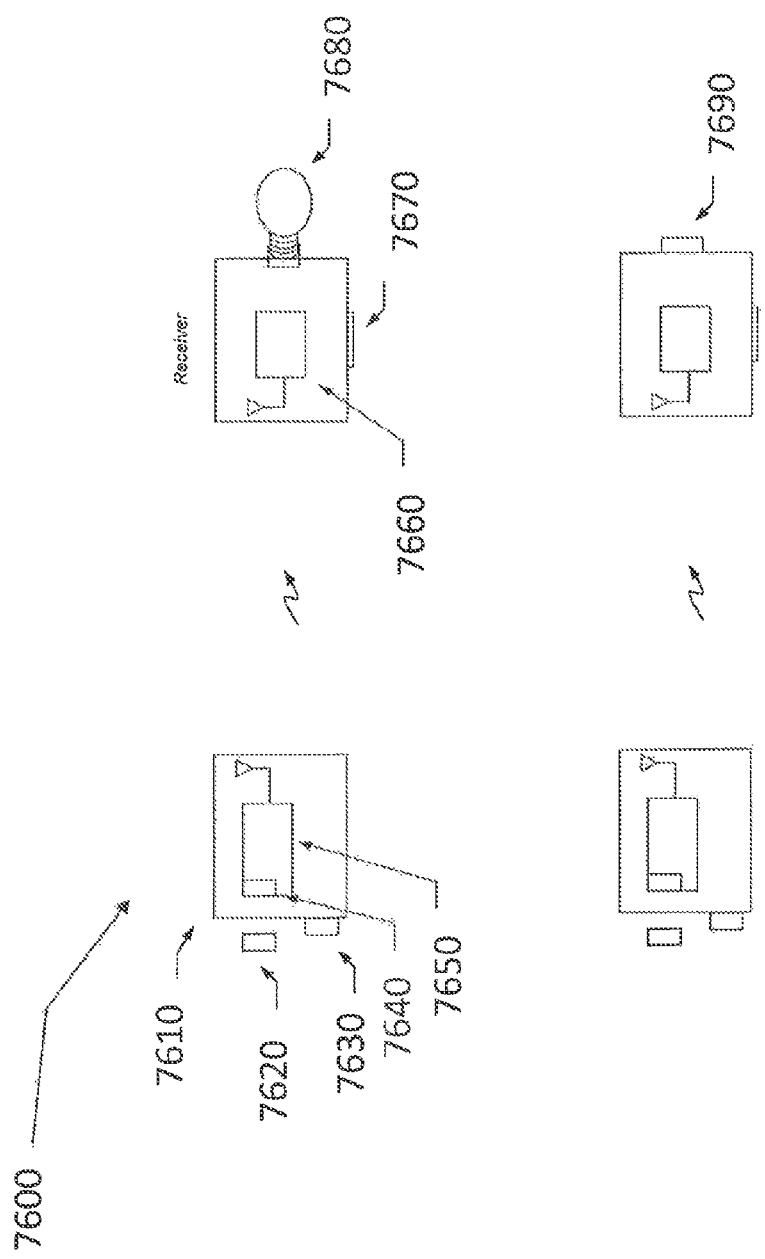
FIG. 76 shows a simplified schematic drawing of an RF communication system for controlling a magnet controlled wireless light switch.

In an illustrative embodiment, a remote sensor wirelessly controlled LED light is described for use in Magnet Controlled Wireless Light Switch 7600 applications. With reference to FIG. 76, illustrated is a perspective view of an embodiment of a Magnet Controlled Wireless Light Switch 7600. In the illustrated embodiment, the Magnet Controlled Wireless Light Switch 7600 includes a transmitter 7610, a magnet 7620, a pushbutton or switch 7630, a magnetic switch 7640, a transmitter electronic circuit 7650, a receiver 7660, a power plug or battery 7670 and a light source 7680. In an alternate embodiment, the light source 7680 may be replaced by a receptacle 7690 such as an AC power receptacle. The Magnet Controlled Wireless Light Switch 7600 allows for the automatic wireless control of lighting based on whether a magnet is within range or outside of the range of a magnet. The Magnet Controlled Wireless Light Switch 7600 consists of a transmitter and a receiver. The transmitter may contain a magnetic switch. If the transmitter is within range of a magnet, the magnetic switch will be closed. If the transmitter is out of range of the magnet, the magnetic switch will be open. When the transmitter senses a change in the magnetic switch from open to closed or closed to open, it may send a wireless control message to the receiver to turn on or off a remote light bulb, fixture or lamp. The receiver may receive the control message and turns a light bulb, fixture or lamp on or off based on the content of the message. The receiver, with a light source such as one or more embedded LEDs or a light bulb, fixture or lamp, turns on or off the light source. By way of an example, if an AC powered bulb is plugged into an Edison socket that is the receptacle, the light may be turned on or off by energizing or de-energizing a relay to connect or disconnect power to the light bulb. The transmitter may also contain an override switch in the form of one or more pushbuttons that would allow control based on the magnetic switch to be disabled and allow for direct control using the pushbutton(s). When the magnetic switch is overridden, the wireless control messages commanding the receiver to turn the light bulb, fixture or lamp on or off will be sent when a pushbutton is depressed. The receiver, as a fixture or with a light bulb or lamp plugged into it, can be powered using a battery, can be plugged into an AC outlet or can be plugged into a standard light bulb socket. The transmitter is powered using a battery. The transmitter and receiver are electronic circuits mounted in separate enclosures. The transmitter and receiver may operate at a narrowband frequency in the frequency range from 300 MHz to 450 MHz. Data may be modulated using On-Off Keyed (OOK)/Amplitude Shift Keyed (ASK) data. The electronic circuit on the transmitter may build a data message, modulate it into an OOK/ASK data stream and transmit it using an antenna present in the transmitter enclosure. The electronic circuit in the receiver enclosure may receive the wireless signal using an antenna present in the receiver enclosure, de-modulate the OOK/ASK data stream and decode the data message contained in the data stream. The data message format contains the on or off command and any other information necessary to guarantee that the message received was directed to that receiver. The intended use of the Magnet Controlled Wireless Light Switch 7600 is to provide automatic wireless control of a light or lights turning on or off in an entryway, closet, drawer, window or door based on whether the condition of the entryway, closet, drawer, window or door is opened or closed. An example of a use of the Magnet Controlled Wireless Light Switch 7600 is for automatic lighting control in a closet. A magnet is attached to the frame of the closet door. A transmitter is attached to the closet door aligned with the magnet. A receiver may be designed as a standalone battery powered wireless lighting fixture or to connect into a standard light bulb socket plugged into a light fixture that provides light inside the closet. The fixture is mounted to the wall as desired or the light bulb is plugged into the receiver. Batteries are installed in the battery powered wireless lighting fixture or AC power to the light fixture is set to be always on. When the closet door is closed, the transmitter will send a signal to the receiver to turn the fixture or light bulb off (disconnect power to the light source). When the closet door is open, the transmitter will send a signal to the receiver to turn the fixture or light bulb on (connect power to the light source).

In some embodiments, an Extendable Wireless Lighting Protocol allows for the wireless control of lighting based on the transmission of a serial data stream from one or more transmitters to one or more receivers. The Extendable Wireless Lighting Protocol may allow wireless lighting receivers to spend an extended time in low power mode without missing control transmitted by a wireless lighting transmitter. The wireless lighting receiver may employ a power sequencing algorithm to conserve power. In this embodiment, the receiver stays in a "hibernation" mode to conserve power. The receiver is activated a few times per second by logic to monitor the receiver. After allowing the receiver some time to wake up from hibernation mode, the logic may begin looking for a preamble. The preamble is a sequence of data that the logic may detect and synchronize with. In some embodiments, the logic may know the data rate of the preamble as well as what the variance in data rate may be from different transmitters and the logic may use that information to determine if a preamble is being received. In some embodiments, the logic may automatically detect the baud rate of the preamble and determine if a valid preamble is being received. If the logic detects the start of a preamble from the receiver, it may continue to monitor the output of the receiver for a preamble. As long as the logic continues to detect a preamble, it will continue to search for the end of the preamble which is indicated by a known change in the sequence such as the reception of a start bit. Once the logic detects the start bit or similar, it may continue to decode the command. If the command is a valid command, the logic will take an action based on the command. If the logic detects that the output of the receiver is not a preamble, it will return to hibernation mode. The receiver will be taken out of hibernation mode per the power sequencing timing. The power sequencing of the receiver extends the battery life of the wireless light. The protocol requires that the preamble is transmitted for a long enough time period that the receiver will be able to receive the preamble during its periodic wake up times. The length of the preamble sent by the transmitter and the wake up frequency of the receiver must be set such that the logic will be guaranteed to detect a preamble. By way of an example, if the receiver wakes up every 100 ms and listens for a preamble, a transmitter preamble must be transmitted at least longer than 100 ms plus some time to make sure the receiver may start to detect the preamble at some point during the transmission. The baud rate of the preamble may affect power consumption of the receiver. By way of an example, if the period of a bit of the preamble is 100 us and the preamble consists of a pattern of ones and zeros similar to a square wave, the receiver may listen for the minimum amount of time required to determine if it might be receiving a preamble. For example, if the receiver listens for 200 us and determines that it is not receiving a preamble, it may return to hibernation mode. The average power consumption of such a case is dominated by the hibernation mode power consumption. The receiver will be powered in ON mode for 0.2 ms and in hibernation mode for 99.8 ms therefore the average power consumption will be close to the power consumption of hibernation mode. It is to be appreciated that the receiver will consume more power when it is receiving a frame or when environmental conditions make the output of the receiver appear to be a preamble.

The logic will read the data and execute commands according to a command protocol. Logic will monitor for received signals at a predetermined frequency. The command may be an "on/off" toggle command, an "on" command, an "off" command, a "dim" command, a "brightness" command, a "color change" command, a timer command or the like. In one embodiment, the logic reads a decoded channel number that is transmitted with the command and compares the decoded channel number to a module channel number. The module channel number may be selected by a user via a channel input device or it may be pre-programmed. In some embodiments, the protocol may include one or more synchronization bits after the preamble to verify the transmission prior to decoding the command. In some embodiments, a base command set is specified along with an indicator in the base command that additional commands are included. By way of an example, an 8-bit command may be transmitted including a 2-bit command and 4-bit channel number. If the last 2-bits of the command are "11", then an additional command byte follows with the bits of the next command byte defined in any way required by the protocol. This type of extension may be implemented any number of times to any length.

In embodiments, a wireless lighting system may be provided such that a wireless signal indicating a detected power outage, alarm condition or emergency condition may be received by a battery powered wireless lighting fixture containing a microprocessor and LED light source. A remote detector may transmit the wireless signal upon detecting the power outage, alarm condition or emergency condition. By way of an example, the remote detector may be comprised of a smoke detector with a wireless transmitter. In another example, the remote detector may be comprised of a security system device and a wireless transmitter. In another example, the remote detector may be comprised of any device capable of detecting a condition related to a power outage, alarm condition or emergency condition that may transmit to and control battery powered wireless lighting fixtures. A protocol comprising of any combination of but not limited to a preamble, synchronization mechanism, command, channel number, data etc may allow the remote detector and battery powered wireless lighting fixture to communicate. Special functions may be present in different types of battery powered wireless lighting fixtures. For example, a night light mode may be included in a ceiling light allowing it to provide a low level of illumination.

In some embodiments, an Ultrasonic Motion Sensing LED Light Module may be designed to provide additional functionality for a stairwell or hallway emergency light. The Ultrasonic Motion Sensing LED Light Module may receive input power from an external source or may be powered by an internal power source such as a battery. In embodiments, the battery may be non-rechargeable or rechargeable. In the case that it is a rechargeable battery, the module may contain the charging circuitry such that it may be capable of charging the battery when input power from the external source is present. The Ultrasonic Motion Sensing LED Light Module may be integrated into a stairwell or hallway emergency light. The Ultrasonic Motion Sensing LED Light Module may be designed in any size or shape housing to meet the requirements of the stairwell or hallway emergency light. The module may have a mounting mechanism to allow it to be mounted to a surface. In some embodiments, the housing and mounting mechanism may be designed to allow the Ultrasonic Motion Sensing LED Light Module to be integrated into the housing of the stairwell or hallway emergency light. In some embodiments, the housing and mounting mechanism may be designed to allow the Ultrasonic Motion Sensing LED Light Module to be mounted external to the housing of the stairwell or hallway emergency light. In alternate embodiments, the Ultrasonic Motion Sensing LED Light Module may be used with any type of emergency light including but not limited to exit signs, emergency lights used for egress lighting in commercial buildings, industrial emergency lighting units and the like. The Ultrasonic Motion Sensing LED Light Module may have an interface that may allow it to connect electrically and physically to the stairwell or hallway emergency light such that the module may be controlled by the stairwell or hallway emergency light to provide motion sensing capabilities and/or an additional light source. In some embodiments, the module may provide indication of motion detections from the ultrasonic motion sensor to the stairwell or hallway emergency light such that the stairwell or hallway emergency light may be able to use the control from the motion sensor for its operation. It is to be appreciated that power and/or control connections between the Ultrasonic Motion Sensing LED Light Module and stairwell or hallway emergency light may be present in the interface. It is to be appreciated that the interface may be implemented using a connector, port, wires etc. that couples to a stairwell of hallway emergency light to connect the signals and power over the interface. The interface may be implemented internal to the stairwell or hallway emergency light. The interface may be implemented externally and as such the connector, port, wires etc may allow the module to interface to the stairwell or hallway emergency light outside of the housing of the light. In some embodiments, the interface may provide status information for the stairwell or hallway emergency light. By way of an example, if a battery or other internal power source is present in the stairwell or hallway emergency light, the interface may provide an indication of the battery capacity level. In this example, the module may provide an indication of the battery capacity level of the emergency light.

In embodiments of the Ultrasonic Motion Sensor LED Light Module, the ultrasonic motion sensor may be implemented using an ultrasonic transmitter, ultrasonic receiver and electronics to transmit and process the signal from the receiver. It may operate at any frequency, may have any viewing angle and may have any range as required by the application. By way of an example, the ultrasonic motion sensor may operate at 40 KHz, have a 180 degree viewing angle and have a range of operation of 7 meters. In alternate embodiments, the motion sensor may be a PIR based motion sensor instead of an ultrasonic motion sensor. It is to be appreciated that any type of sensor or sensors may be utilized in connection with the claimed subject matter of the Ultrasonic Motion Sensing LED Light such as, but not limited to, infrared sensors, light sensors, proximity sensors, acoustic sensors, motion sensors, carbon monoxide and/or smoke detectors, thermal sensors, electromagnetic sensors, mechanical sensors, pressure sensors, chemical sensors, and the like. In embodiments, the LED light source may illuminate in response to control over the interface from the emergency light. In some embodiments, the LED light source may be illuminated independent of the emergency light. By way of an example, the Ultrasonic Motion Sensing LED Light Module may directly monitor the input power or input from the emergency lighting circuit to independently illuminate the light source based on a determination that the light source is required. In some embodiments, the Ultrasonic Motion Sensing LED Light Module may have more than one light level. By way of an example, in the case where the state has changed such that the light source is illuminated, the Ultrasonic Motion Sensing LED Light Module may control the intensity of the light source based on the state of the ultrasonic motion sensor. In one example, when the ultrasonic motion sensor detects motion, the light intensity may be at a bright level, for example greater than 10 lux as detected on the surface of floor directly below the module, however if motion is not detected by the ultrasonic motion detector for some period of time, ie the auto shutoff timer expires without being retriggered by motion, the Ultrasonic Motion Sensing LED Light Module may change the light intensity to a lower level, for example greater than 1 lux as detected on the surface of the floor directly below the module. Using the ultrasonic motion sensor to control the light intensity such that the higher light intensity is only used when occupancy is detected may decrease the power consumption of the module and increase battery life. In some embodiments of the Ultrasonic Motion Sensing LED Light module, the module may contain a processor or other programmable device and run a software or firmware program. The software or firmware program may allows a user to set the state of the module based on timer or time of day, auto shut-off times, color temperature, light intensity level (glow levels, low light levels, dimming/fading functions), motion sensitivity and listening on times, light sensitivity, level of ambient light controlled by a photocell, energy usage control to control light output based on a desired amount of energy usage over time, network parameters (unique IDs, network IDs, multicast IDs, broadcast IDs, IP address, routing and forwarding information for the network, WIFI SSIDs, ZIGBEE PAN IDs and network IDs, X10 four bit house code, INSTEON address or the like), sensor parameters (detection thresholds for setting the state of the module, timer and time of day settings for when the sensor is active and the like) etc., and may allow the user to connect to and program the state of the module. It is to be appreciated that the Ultrasonic Motion Sensing LED Light Module may contain the intelligence necessary to implement the programmable functions.

In alternate embodiments, the Ultrasonic Motion Sensing LED Light Module may include a wireless transmitter, wireless receiver or wireless transceiver. In embodiments containing a wireless transmitter, the Ultrasonic Motion Sensing LED Light Module may transmit control or status to an external device. By way of an example, the Ultrasonic Motion Sensing LED Light Module may transmit control to one or more battery powered wireless lighting fixtures to turn the fixtures on to provide supplemental light in the case that emergency lighting is required. Thus, when the emergency light turns on and the module detects it, the module may control its own LED light source to turn on and additional transmit an ON command to battery powered wireless lighting fixtures. In embodiments containing a wireless receiver, a remote device may control the Ultrasonic Motion Sensing LED Light Module. In some embodiments, a wireless transmitter may be integrated into the stairwell or hallway emergency light such that a wireless interface may be implemented between the emergency light and Ultrasonic Motion Sensing LED Light Module. In such an embodiment, the module may operate independently off of its integrated power source and the emergency light may transmit status and control to the module. In some embodiments, the Ultrasonic Motion Sensing LED Light Module may be connected to an external power source such as AC power. In embodiments containing a wireless transceiver, the Ultrasonic Motion Sensing LED Light Module may communicate with an external device such that it may respond to requests for status, receive control and acknowledge that the control was received, transmit unsolicited status and alarms to an external device and so on. By way of an example, the Ultrasonic Motion Sensing LED Light Module may contain a wireless transceiver, a processor and implement a software protocol stack and application to allow it to communicate with a building management system that controls and monitors the mechanical and electrical equipment of the building such as lighting, emergency lighting, power systems, security systems etc. In this example, the Ultrasonic Motion Sensing LED Light Module may report to the building management system the battery capacity level of the module, the battery capacity level of the emergency light, status of the battery, status of the lamp including light output and number of hours in use, alarm indications when the emergency lights are activated, alarm indications when the battery capacity is too low, counts of the amount of time the battery has been used etc. In some embodiments, the Ultrasonic Motion Sensing LED Light Module may be removable and replaceable. By way of an example, in an embodiment containing a rechargeable battery, a user may replace the entire module in the case that the internal rechargeable battery is no longer capable of meeting emergency backup lighting requirements.

In some embodiments, a Switch Sense Module may be designed to be integrated with other devices that may desire to implement the switch sensing functionality to detect the state of a controlling switch or device remotely. The Switch Sense Module may be a module that contains the circuitry and a defined interface that may be connected to physically and electrically by an external device. The module may be integrated into or connected to any device that may interface physically or electrically and may be required to detect the state of one or more controlling switches or devices. In some embodiments, the Switch Sense Module may be designed to be integrated with lights, fixtures, troffers, lamp bases, ballasts, lighting power supplies, lighting control devices and the like that may desire to detect the state of controlling switches or devices connected to them. In alternate embodiments, the Switch Sense Module may be used with any type of device that may desire to detect the state of controlling switches or devices. In some embodiments, the Switch Sense Module may include an enclosure and have a mounting mechanism to allow it to be physically integrated with another device. In some embodiments the module may be removable and replaceable. In some embodiments, the module may contain an integrated power source. In some embodiments, the module may receive power from the external device over the interface. In some embodiments, the module may have a connection to input power that is controlled by the one or more switches or devices of which the Switch Sense Module may need to detect the state. In some embodiments the module may be an electrical circuit on a printed circuit board or the like that may be integrated into another device. By way of an example, a Switch Sense Module may be used to detect the state of an on/off wall switch controlling power to an Edison socket with a light bulb plugged in. The light bulb that may be plugged in is an LED light bulb with an embedded power source such as a rechargeable battery. The Switch Sense Module consists of a printed circuit board with five connections. Two connections are made to the AC power input. Two connections are made to local rechargeable battery power. One control connection provides two voltage levels to indicate whether the switch is open or closed. The Switch Sense Module would be integrated with the LED light bulb. If the switch is detected as closed as detected by the Switch Sense Module and provided at the control connection and AC power is not present at the input, the LED light bulb may use the integrated battery to power the light source. It is to be appreciated that the control connection may be one or more lines and may use any method required to indicated the state of the controlling switches or devices that the Switch Sense Module is monitoring.

In one embodiment of grid shifting, a peak shedding module may be designed with an integrated power source, such as a rechargeable battery, to store and use power from the integrated power source, an input power connection, an output power connection and may contain the ability to identify a peak in power usage and transition some or all of the power required by a connected load to the integrated power source. The functionality may be pre-programmed, factory set, designed in a custom electrical circuit or the like to respond to sensors on the module or measurements of power usage made by the module and may contain a pre-programmed algorithm to implement the peak shedding function. The functionality may be learned using sensors on the module or measurements of power usage made by the module and an intelligent program that may change the behavior of the module based on the feedback received from the sensors or measurement devices on the module. The sensors or measurements may include a light sensor, motion sensor, an atomic clock or time receiver, temperature sensor or any other sensor mentioned herein, a measurement of power usage, a record of power usage over time, or any other measurement of the characteristics of the power that may be detected by the module that may allow the peak shedding function to meet the requirements of an application. In some embodiments, there may not be a sensor on the module and the peak shedding function is performed based on an intelligent program internally. The intelligent program may contain a real time clock that may be set by the user such that the intelligent program may use time of day or a calendar to perform the peak shedding functionality. The peak shedding function may be used for cost savings, energy efficiency or a reduction in demand. The peak shedding module may allow the power usage of an electrical circuit to be averaged over time so that an individual peak in the use of power no longer occurs or is reduced. A peak shedding module may have switches, dials, knobs etc on the module to set time of day, sensor or measurement thresholds such that a user may be able to control how the intelligent program manages the peak shedding module. Once set, the peak shedding module may act autonomously based on those settings and/or the pre-programmed or designed function. The settings may be changed on occasion by the user.

In some embodiments, the peak shedding module may record a moving average of the power usage on the electrical circuit it is connected to. The peak shedding module may make an instantaneous measurement of power consumption of the electrical circuit. If the instantaneous measurement of power consumption of the electrical circuit exceeds some threshold, the peak shedding module may automatically transition some amount of power consumption to the integrated power source. It is to be appreciated that the peak shedding module may be able to transition power consumed on the electrical circuit quickly enough that it may reduce the subsequent peak in power consumption that may have occurred. In some embodiments, the peak shedding module may make adjustments over time based on the average power consumption such that it may adjust the threshold at which the peak shedding module begins to adjust power consumption.

To implement the sharing of power, the peak shedding module may monitor the power consumed by the electrical circuit from the input power. By way of an example, a very small resistor may be inserted in-line with the input power to output power connection in the peak shedding module and a voltage drop across the resistor may allow the peak shedding module to measure power being drawn from the input. The peak shedding module may have a diode OR connection to the power output such that the input power and power sourced from the integrated power source, such as a rechargeable battery, may be shared. A constant current circuit may be connected at the output of the rechargeable battery. By way of an example, an LM317 configured as a constant current source may be connected at the output of the battery with a programmable resistor in the circuit such that an external device, such as a microcontroller or microprocessor, may be able to change the amount of current sourced from the battery. By way of an example, a microcontroller that may be able to measure the power being drawn from the input power source may contain a program such that when the measured input power exceeds a programmed threshold, the microcontroller may adjust the resistance of the programmable resistor to set the current supplied from the battery. In supplying current from the battery, the amount of power required from the input source will reduce. By way of an example, in providing one hundred percent of the power to the electrical circuit, the input power consumption exceeds the threshold set in the microcontroller. The microcontroller may adjust the resistor in the constant current circuit as supplied from the battery to assume five percent of the power supplied. In response the input power consumption will be reduced. The microcontroller may make another measurement of the input power consumption and adjust the supply from the battery and so on. It is to be appreciated that the frequency of the measurements and adjustments may be any rate as required by the application. In an alternate embodiment, the sharing of power is done by FETs which may be PWM controlled from a device such as a microcontroller such that the power supplied from the input power source and the integrated power source may be adjusted using PWM to change the amount of power drawn from each source.

In some embodiments of the peak shedding module, there may be a communication interface such that the module may communicate with an external source by wired connection over a power distribution network, for example on the AC power lines (X10, INSTEON, Broadband over Power Lines, proprietary communication scheme etc), or wirelessly through a wireless interface (dedicated RF communication link, ZIGBEE, WIFI, ENOCEAN, BLUETOOTH etc). By way of an example, the electric company may control or gather status from peak shedding modules throughout its power distribution network to remotely offload power usage at times when power demand is high or is peaking by commanding some portion or the entire distributed network of peak shedding modules to battery backup. It is to be appreciated that a peak shedding module may be used with one or more devices on an electrical circuit such that the module may monitor and supply power to the one or more devices as determined by the peak shedding module. In embodiments, the one or more devices may be a lighting device, lighting adapter, lighting fixture, troffer, lamp or lamp base, ballast, lighting power supplies, lighting control device and the like, television, television peripheral, computer, servers, network equipment, storage devices, appliance, washer, clothes dryer, refrigerator, freezer, electric range, microwave oven, electric water heater, vacuum cleaner, cell phone charger, stereo, air conditioner, HVAC devices, electric or hybrid vehicles, electric motors, portable generators and backup power sources, uninterruptable power supplies (UPS), inverters, industrial and manufacturing machinery etc. In some embodiments, the peak shedding module may be connected to one or more electrical circuits in a facility. By way of an example, a lighting circuit controlled by a peak shedding module at a circuit breaker for the lighting circuit may receive a command from an external source such as a building management system to shift some amount of power required by the circuit to the integrated rechargeable battery. It is to be appreciated that the embedded power source of the peak shedding module may be any size required by the devices that it may be doing peak shedding for. By way of an example, a peak shedding module may contain an AC input, an AC output, an embedded rechargeable battery and the circuitry required to supply power from the AC input, the integrated power source or both.

In embodiments using the peak shedding module, a peak shedding system may be created using several peak shedding modules to distribute the implementation of peak shedding throughout a facility. By way of an example, a residence may contain a peak shedding module on every electrical circuit in the residence. Each individual peak shedding module may make adjustments as required by the electrical circuit it is performing the peak shedding function on. In such a manner, the distributed peak shedding function implemented by the peak shedding system may reduce or eliminate a peak power condition from the electric company. In some embodiments, the peak shedding modules may be designed into a single control panel. In alternate embodiments, the peak shedding modules may be integrated into the circuit breaker panel. In some embodiments a peak shedding module may be used on multiple electrical circuits simultaneously. It is to be appreciated that a peak shedding module may be any size and may use a rechargeable battery of any size to meet the requirements of the application.

Figure 77:
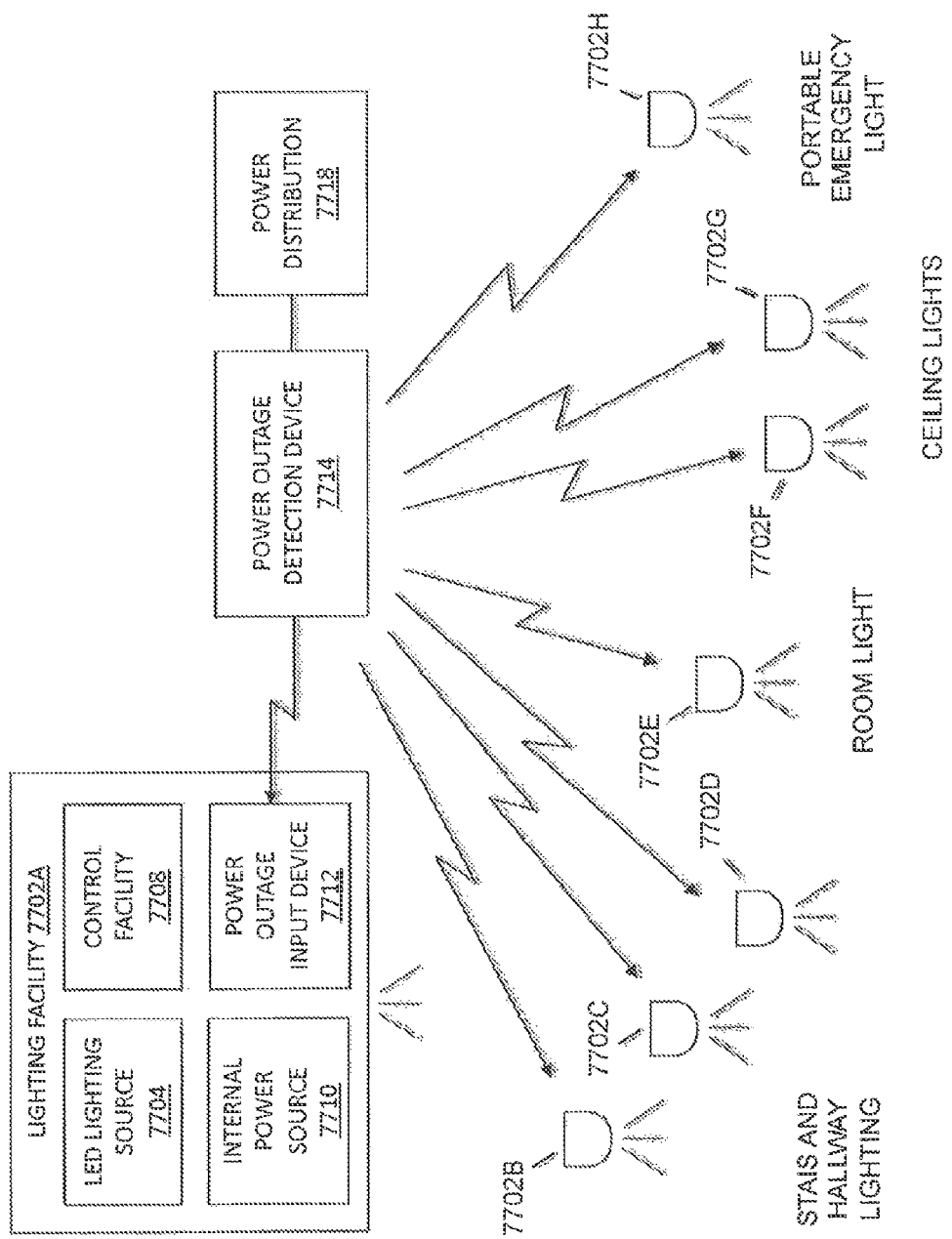
FIG. 77 depicts an embodiment of an emergency lighting system.
Figure 78:
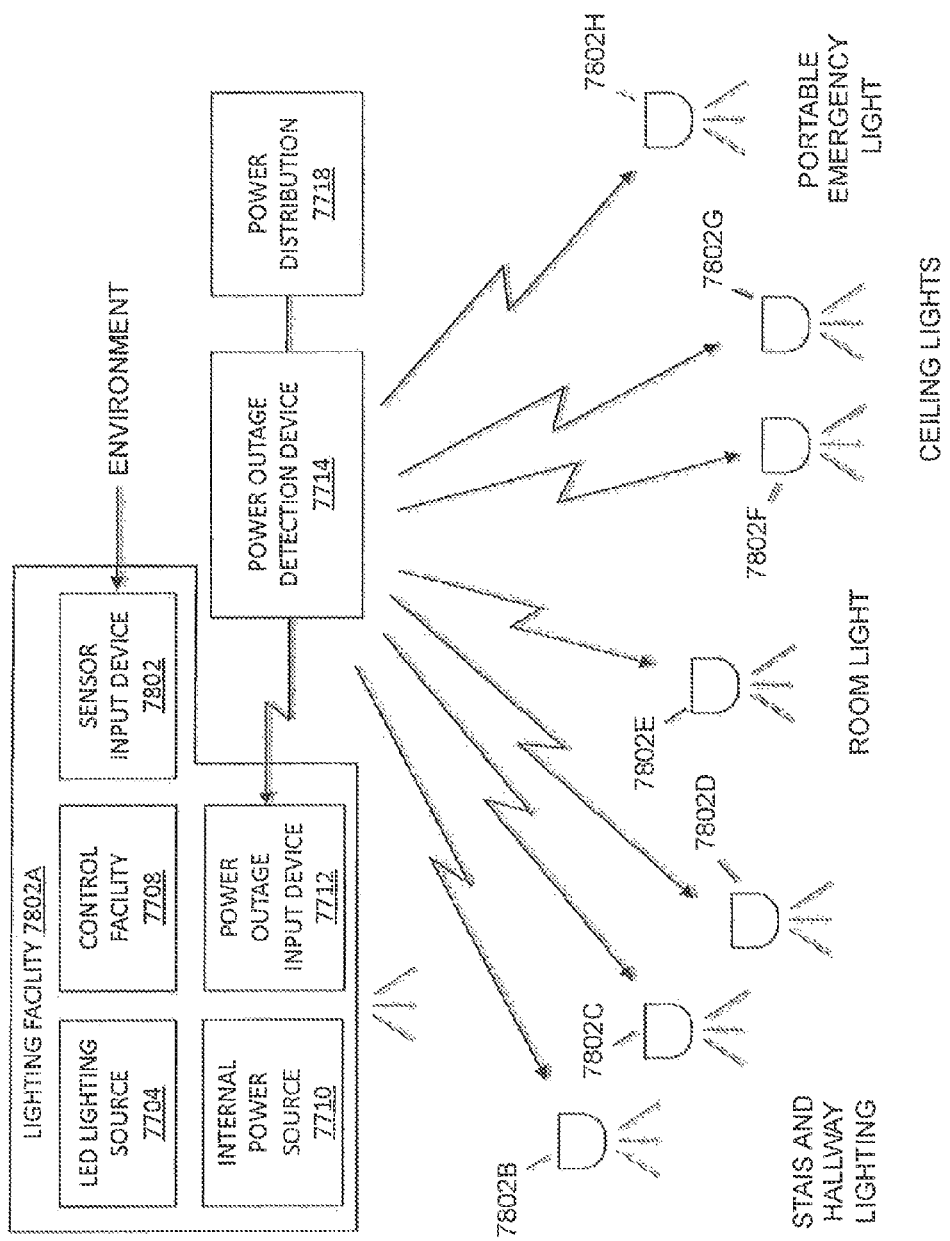
FIG. 78 depicts an embodiment of an emergency lighting system with an integrated sensor.

Referring to FIG. 77, the present invention may provide for power outage management through a lighting facility 7702A-H and a power outage detection device 7714 connected to power distribution 7718, where the lighting facility 7702A-H may include an LED lighting source 7704, a control facility 7708, an internal power source 7710, a power outage input device, and the like. In embodiments, the power outage detection device 7714 may detect a power outage in the power distribution 7717, and as a result, transmit a power outage signal to the power outage input device 7712 of the lighting facility 7702A-H. The control facility 7702 may then manipulate the LED lighting source 7704, such as turning on, turning on in a dimmed state, flashing, flashing momentarily, changing the spectral output, and the like. In addition, in the case when the lighting facility 7702A-H also has a connection to AC power, such as through the power distribution 7718, the control facility 7708 may switch power to the internal power source 7710. In embodiments, each of the lighting facilities 7702A-H may be set to respond differently, or in groups. For instance, a group of lighting facilities 7702B-D may be located in a hallway or stairway, and they may respond together in a way that provides pathway lighting in those areas; a pair of ceiling lights 7702F-G may respond together, or separately per their different positions in the room; an individual room light 7702E may be controlled separately; a portable emergency light 7702H may be set to glow when responding to help an individual find it during the power outage; and the like. Referring to FIG. 78, the lighting facility 7802A-H may additionally include a sensor input device 7802, where the sensor input device 7802 receives input from the environment, and where the control facility 7708 uses both the inputs to the power outage input device 7712 and the sensor input device 7802 to determine how to manipulate the LED lighting source 7704 and power source selection, as described herein. In embodiments, the sensor input device may include a motion sensor, illumination sensor, temperature sensor, CO2 sensor, CO sensor, or any sensor described herein, and may be different for each of the lighting facilities 7802A-H.

In embodiments, the present invention may provide for a power outage lighting management within an environment, comprising a power outage detection device adapted to detect a power outage condition and to wirelessly transmit power outage indication data to a plurality of lighting systems within the environment, where at least one of the plurality of lighting systems include an LED light source that is powered by an internal power source. In embodiments, at least one of the plurality of lighting systems may include a light source that is powered selectively by either the internal power source or an external power source. In response to receiving the power outage power indication data, the lighting system including the LED light source that is powered by the internal power source may regulate a light intensity of the LED light source in accordance with the power outage indication data, such as the light intensity as a dimmed light condition, the light intensity as a full brightness light condition, and the like.

In embodiments, the present invention may provide for a power outage management for a plurality of lighting sources, comprising at least one of a plurality of lighting facilities containing an LED lighting source, a power outage input device, an internal power source, a control facility for manipulating the light output of the LED lighting source, and the like, wherein the lighting facility may provide light in response to a power outage signal received by the power outage input device indicating a power outage condition; and a power outage detection device that monitors power at some point in power distribution to detect the power outage condition, where the power outage detection device may wirelessly transmit the power outage signal to the power outage input device of the at least one of the plurality of lighting facilities when the power outage condition is detected. In embodiments, the outage input device may contain a wireless receiver to receive the power outage signal. The response may be provided with an environmental input from a sensor input device in the lighting facility in addition to the signal received by the power outage input device. The lighting facility may take the form of at least one of a light bulb that mounts into a lighting fixture, a lighting fixture, a retrofit lighting fixture, a lighting adapter, a battery powered lighting fixture, and the like. The centralized controller may be running a software control program. The signal may be received from a web-based source. The web-based source may be on a local network, on the Internet, and the like. The internal power source may be a rechargeable energy storage device integrated with the lighting facility that is capable of supplying power to the lighting facility independent of the power distribution, and where the recharging may be provided internal to the lighting facility at a time when the power distribution is available. The rechargeable energy storage device internal to the lighting facility may be a battery, fuel cell, super capacitor, and the like. The lighting facility may be disconnected and used as a portable lighting device. The sensor may sense infrared, temperature, light, motion, acoustic, smoke, electromagnetic, vibration, and the like. The manipulating may be switching on the light output, changing the illumination level of the light output, flashing the light output, changing the color content of the light output, and the like. The power outage module may contain an integral power source. The power outage module may contain a light source, where the power outage module may be disconnected from a power source and used as a portable lighting device. The response may be provided with an environmental input from a sensor input device in the centralized controller. The centralized controller may contain pushbuttons, switches, dials, and the like to control the lighting facilities remotely. The centralized controller may be a power outage module monitoring an emergency lighting circuit to detect an indication that emergency lighting must be activated. In this way, the power outage device may be connected to an emergency lighting circuit (i.e. not part of power distribution) but it would allow a wireless extension of the emergency lighting circuit. In embodiments, the present invention may provide a detached lighting system that could be supplemental to an installed emergency lighting system by propagating the control through a connected power outage device to the lights.

Figure 79:
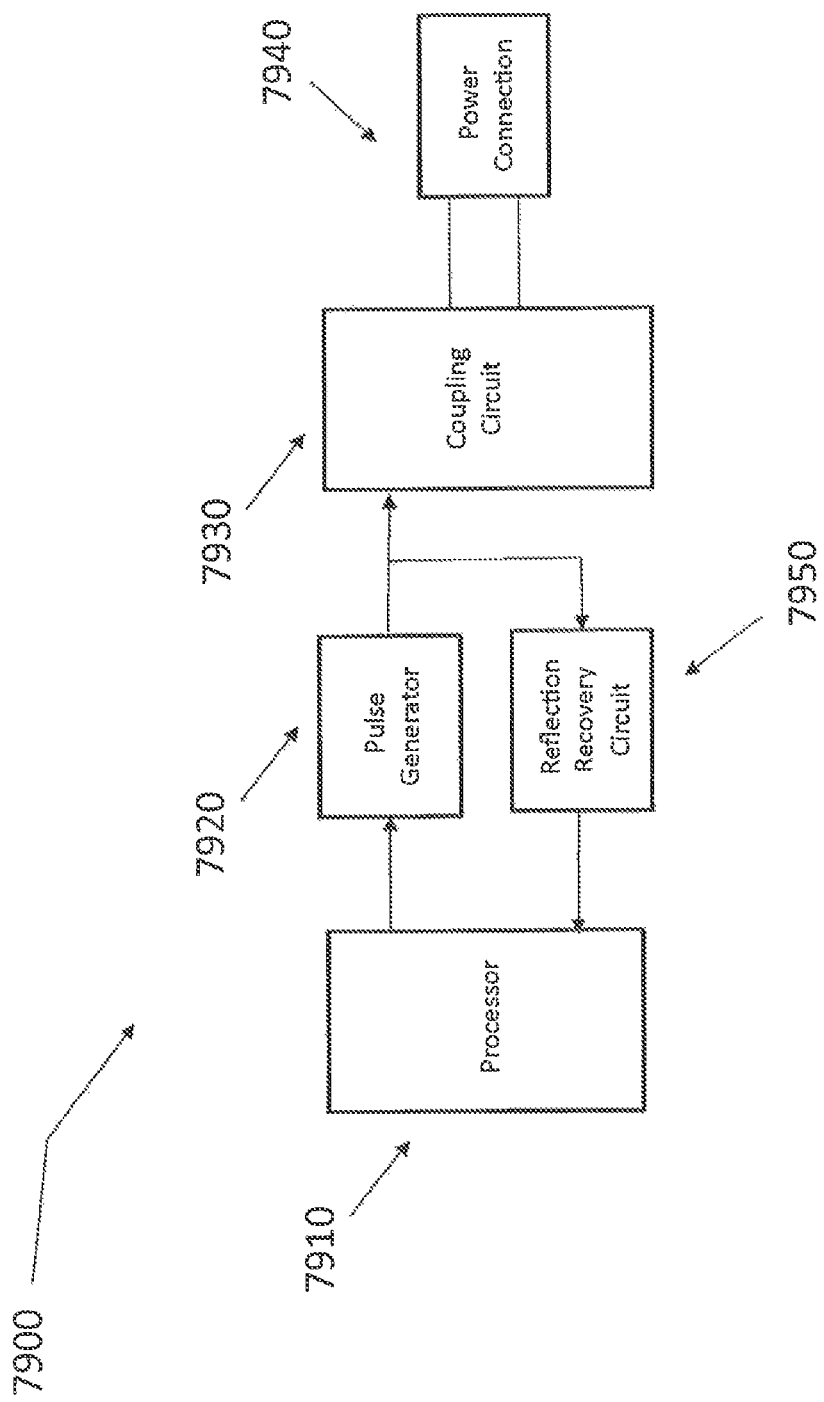
FIG. 79 depicts an embodiment of remote switch sensing based on time domain reflection.

In an illustrative embodiment, a TDR based switch sense circuit is described for use in a Remote TDR Switch Sensing Circuit 7900. With reference to FIG. 79, illustrated is a block diagram view of an embodiment of a Remote TDR Switch Sensing Circuit 7900. In the illustrated embodiment, the Remote TDR Switch Sensing Circuit 7900 includes a processor 7910, a pulse generator 7920, a coupling circuit 7930, a power connection 7940 and a reflection recovery circuit 7950. The Remote TDR Switch Sensing Circuit 7900 may be powered by an integrated power source such as a battery or may be powered from an external power source. The pulse generator 7920 may generate one or more pulses and drive those pulses to the coupling circuit 7930 to couple the one or more pulses onto the power connection. The processor 7910 may enable the pulse generator 7920 to generate the one or more pulses. In one embodiment, on the rising edge of an enable signal from the processor 7910, the pulse generator 7920 may generate a single 10 nanosecond pulse. In alternate embodiments, the pulse generator may generate a number of pulses in a pulse train with any period of on time and off time as required by the application. It is to be appreciated that the pulse generator 7920 may generate any signal that may allow the switch sense detection. In alternate embodiments, the pulse generator 7920 may contain a pulse generator circuit that continuously generates the pulses periodically with or without an enable from the processor 7910. The one or more pulses coupled onto the power connection 7940 will propagate down the line and reflections based on impedance discontinuities will be received through the coupling circuit 7930 such that they may be recovered and processed by the reflection recovery circuit 7950. In one embodiment, the coupling circuit 7930 connects the Remote TDR Switch Sensing Circuit 7900 to an AC power connection at a light socket. The coupling circuit 7930 may contain a coupling capacitor to block AC power from passing through to the Remote TDR Switch Sensing Circuit 7900. The coupling circuit may contain a transformer to isolate the Remote TDR Switch Sensing Circuit 7900 from the line. The coupling circuit 7930 may allow the signal created by the pulse generator 7920 to be coupled onto the AC power line of the light socket. The reflections from impedance discontinuities on the AC power line may pass through the coupling circuit 7930. By way of an example an impedance discontinuity created by an open wall switch controlling the light socket may create a reflection that may pass through the coupling circuit 7930 and be detected by the reflection recovery circuit 7950. The reflection recovery circuit 7950 may contain circuitry to amplify, filter, detect, latch etc the reflected signal such that the processor 7910 may be able to determine if the reflected signal contains information to determine if impedance discontinuities represent a condition that may require a change in state. By way of an example, the processor may detect a wall switch that is open or is closed based on whether a reflection is detected or no reflection is detected. The indication that the switch is closed in addition to an indication that power is not present at the power connection may indicate a power outage condition and action to switch to backup power may be taken.

Figure 80:
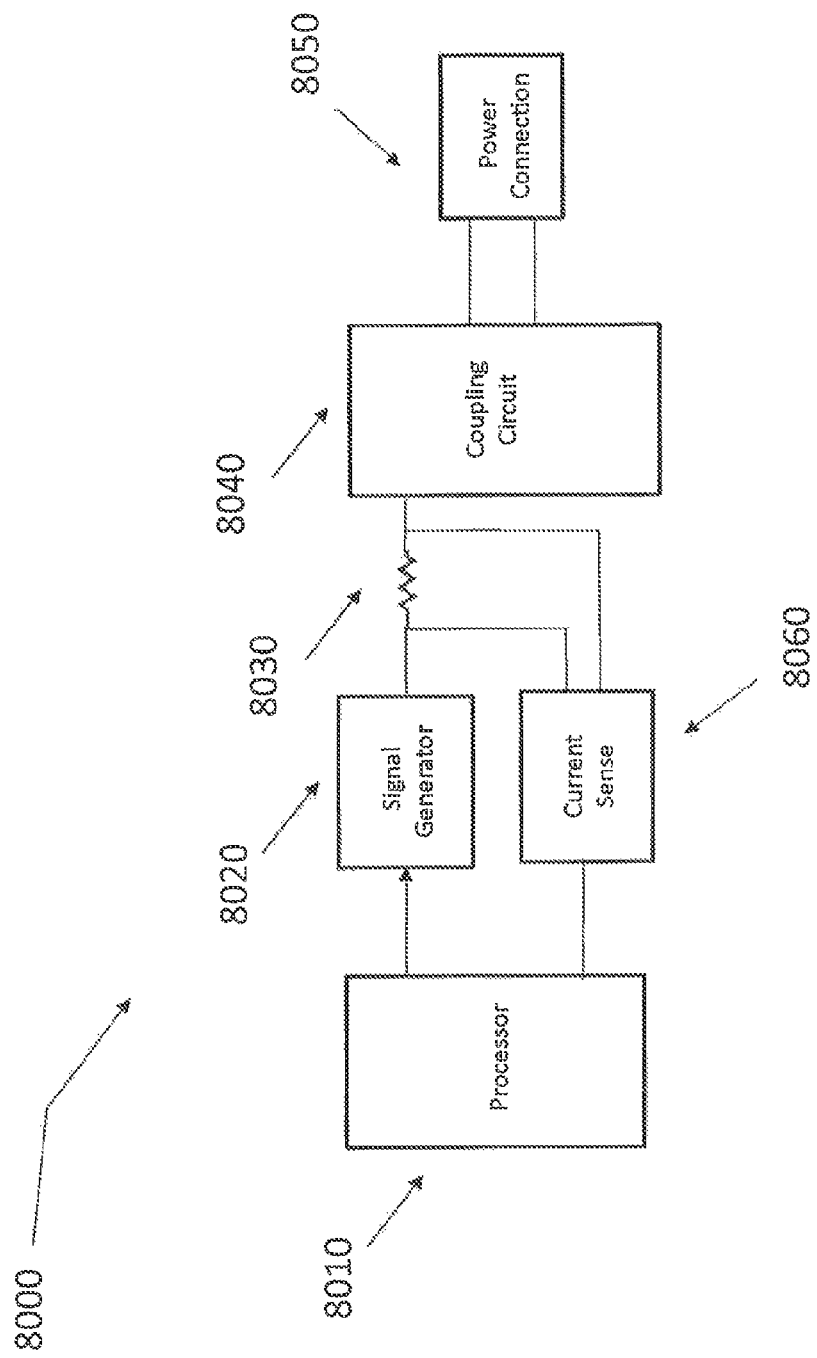
FIG. 80 shows an embodiment of remote switch sensing based on current sensing.

In an illustrative embodiment, a current sensing switch sense circuit is described for use in a Remote Switch Sensing Circuit 8000. With reference to FIG. 80, illustrated is a block diagram view of an embodiment of a Remote Switch Sensing Circuit 8000. In the illustrated embodiment, the Remote Switch Sensing Circuit 8000 includes a processor 8010, a signal generator 8020, a sense resistor 8030, a coupling circuit 8040, a power connection 8050 and a current sense 8060. The Remote Switch Sensing Circuit 8000 may be powered by an integrated power source such as a battery or may be powered from an external power source. The signal generator 8020 may generate one or more pulses and drive those pulses through the sense resistor 8030 to the coupling circuit 8040 to couple the one or more pulses onto the power connection. The processor 8010 may enable the signal generator 8020 to generate the one or more pulses. In one embodiment, on the rising edge of an enable signal from the processor 8010, the signal generator 8020 may generate a single 10 microsecond square pulse. In alternate embodiments, the processor 8010 may contain the signal generator function and generate the one or more pulses directly. By way of an example, the processor 8010 may be a microcontroller with i/o port pins that may be controlled to create a 10 microsecond square pulse. In alternate embodiments, the signal generator 8020 may generate a number of pulses in a pulse train with any period of on time and off time as required by the application. It is to be appreciated that the signal generator 8020 may generate any signal that may allow the switch sense detection mentioned herein. In alternate embodiments, the signal generator 8020 may contain a pulse generator circuit that continuously generates the pulses periodically with or without an enable from the processor 8010. In one embodiment, the coupling circuit 8040 connects the Remote Switch Sensing Circuit 8000 to an AC power connection at a light socket. The coupling circuit 8040 may contain a coupling capacitor to block AC power from passing through to the Remote Switch Sensing Circuit 8000. The coupling circuit may contain a transformer to isolate the Remote Switch Sensing Circuit 8000 from the line. The coupling circuit 8040 may allow the signal created by the signal generator 8020 to be coupled onto the AC power line of the light socket. In alternate embodiments, a coupling circuit may connect the Remote Switch Sensing Circuit 8000 to any type of power connection. To detect whether the controlling devices, such as a wall switch, are open or closed, the Remote Switch Sensing Circuit 8000 may generate a pulse, send it through the sense resistor 8030 and through the coupling circuit 8040 onto the power connection 8050. The current sense 8060 may detect the amount of current flowing through the sense resistor 8030 by measuring the voltage at one or both sides of the sense resistor 8030. The current sense 8060 will measure different amounts of current flowing if the wall switch is open or closed. If the wall switch is open, an open circuit exists and no current or a very small amount of current may flow through the sense resistor 8030. If the wall switch is closed, a low impedance path exists and a larger current will be measured by the current sense 8060. By way of an example, the processor 8010 and current sense 8060 may be implemented in a microcontroller. For example, the processor 8010 and current sense 8060 may be implemented in a commercially available Freescale MC9S08QA2 microcontroller with an analog to digital conversion capability. The microcontroller may convert the analog voltage measured at one or both sides of the sense resistor 8030 to a digital value allowing firmware to determine whether the amount of current flowing through the sense resistor 8030 may be indicative of an open switch or a closed switch. In such an embodiment, the Remote Switch Sensing Circuit 8000 is detecting the electrical characteristics of the circuit by generating a signal and detecting the state of the generated signal without having to receive a return signal or measure characteristics of the power connection directly. The amount of current flowing out of the Remote Switch Sensing Circuit 8000 may provide an indication of the state of controlling devices. By way of an example, a pulse may be generated that is 10 microseconds in duration and has a peak voltage of 3 volts and the sense resistor 8030 has a value of 100 ohms. If the controlling switch is open, the current sense 8060 may detect a voltage of 2.9 volts on one side of the sense resistor 8030 after the voltage drop. If the controlling switch is closed, the current sense 8060 may detect a voltage of 0.1 volts on one side of the sense resistor 8030 after the voltage drop. The additional current flowing through the sense resistor 8030 is there due to the low impedance present when the switch is closed. In alternate embodiments, devices outside of the Remote Switch Sensing Circuit 8000 may present a resistance or impedance that the Remote Switch Sensing Circuit 8000 may detect to determine the state of the controlling devices. By way of an example, an electrical circuit may be attached to a controlling device such that the electrical circuit monitors the input power to the controlling device. If the controlling device is open and no input power is present at the input of the controlling device, the electrical circuit may detect such a state and switch a resistance or impedance into the circuit such that the Remote Switch Sensing Circuit 8000 may detect the switched in resistance or impedance. Thus, in a system with the electrical circuit monitoring the state of the controlling device and input power, the Remote Switch Sensing Circuit 8000 may detect an open switch, closed switch and open switch with no input power as three different levels of current flowing through the sense resistor 8030 and as such may implement a state change based on the detected external condition. In this example, the Remote Switch Sensing Circuit 8000 may be able to detect a power outage when the controlling device or switch is open.

In embodiments of switch sense circuits, the switch sense circuit may need to adjust or learn thresholds based on the electrical characteristics of the wiring, controlling devices or attached devices on the electrical circuit that the switch sense circuit may be monitoring. By way of an example, in a lighting circuit one or more attached devices may be incandescent bulbs, CFL bulbs or LED bulbs which may provide an impedance on the lighting circuit affecting the detection done by a switch sense circuit. One or more incandescent bulbs may present a heavier resistive load as detected by the switch sense circuit. In the case of a Remote Switch Sensing Circuit 8000, the heavier resistive load may change the amount of current detected by the Remote Switch Sensing Circuit 8000. By way of an example, when a controlling switch is open on an AC power circuit, an incandescent bulb will still provide a heavily resistive load to the Remote Switch Sensing Circuit 8000 because the incandescent bulb provides a path from the AC hot to AC neutral. When a controlling switch is closed, the low impedance path through the closed switch may be in parallel with the impedance of the one or more incandescent bulbs such that the Remote Switch Sensing Circuit 8000 may be able to detect a difference in current sensed in the open switch state and the closed switch state however the difference will be less with the incandescent bulbs in parallel. In an alternate example, one or more CFL or LED bulbs may present an impedance that may affect the Remote Switch Sensing Circuit 8000 detection. For example, the one or more CFL or LED bulbs may contain a small filter capacitor at their power input to filter out power line noise. The characteristics of the pulse generated by the Remote Switch Sensing Circuit 8000, such as pulse width or periodicity, may be determined to allow the Remote Switch Sensing Circuit 8000 to operate in the presence of devices such as the filter capacitors. It is to be appreciated that any embodiment of the switch sense circuit may need to operate in the presence of a lighting device, lamp, television, television peripheral, computer, servers, network equipment, storage devices, appliance, washer, clothes dryer, refrigerator, freezer, electric range, microwave oven, electric water heater, vacuum cleaner, cell phone charger, stereo, air conditioner, HVAC devices, electric or hybrid vehicles, electric motors, portable generators and backup power sources, uninterruptable power supplies (UPS), inverters, industrial and manufacturing machinery etc to allow a detection of a disruption of power and enable a change in state to use a backup power source, to provide an alarm or alert to a user or the like.

In embodiments of the switch sense circuit, the circuit may learn or detect the electrical characteristics of the circuit it is monitoring such that the switch sense circuit may set the thresholds at which a change of state is required based on the learned electrical characteristics of the monitored circuit. By way of an example, if the switch sense circuit is powered on with one or more incandescent bulbs in circuit but with the switch turned off, the switch sense circuit may store that state as the "off" state of the circuit. The user may then turn the switch on. When the switch sense circuit detects a change from the "off" state by detecting a change in the electrical characteristics of the circuit it is monitoring, the switch sense circuit may store the second state as the "on" state of the circuit. Then, the switch sense circuit may set a threshold between the "off" state and "on" state such that when the switch sense circuit detects the state of the circuit on one side of the threshold, the "off" state has been detected and when the switch sense circuit detects the state of the circuit on the other side of the threshold, the "on" state has been detected. By way of an example, the Remote Switch Sensing Circuit 8000 detects changes in state by sensing the current draw. If one or more incandescent light bulbs are in the circuit the Remote Switch Sensing Circuit 8000 is monitoring, it may determine the "off" state by determining the amount of current drawn at power on and the "on" state by detecting a change in current draw. The "off" state and "on" state are two levels of current measured in the circuit and from this learned information the Remote Switch Sensing Circuit 8000 may set a threshold allowing it to thereafter determine changes in state. In alternate embodiments, the switch sense circuit may detect that power has been applied and thus determine that the state is "on". In such an embodiment, the switch sense circuit may use power applied as a method to learn and store the electrical characteristics of the "on" state. Thus the switch sense circuit may learn and store what the "normal open" state and "normal closed" state of a controlling device by measuring the electrical characteristics of the circuit in a one of the methods mentioned herein or the like. In some embodiments, the switch sense circuit may take multiple samples and use the statistical characteristics over multiple measurements to determine the state of the controlling device. By way of an example, the Remote Switch Sensing Circuit 8000 may take make several analog to digital conversions over a sampling interval, take an average of the samples and from the average of the samples make a determination of the state of the controlling devices. In an example of the Remote Switch Sensing Circuit 8000 monitoring the state of controlling devices over an AC power line, the AC power may affect the detection at different points based on the voltage of the AC waveform at the point that the sample is taken. In alternate embodiments, a switch sense circuit may select the minimum or maximum level detected over some sampling period and use the minimum or maximum level detected compared against some threshold for the purposes of determining the state of controlling devices. By way of an example, a Remote Switch Sensing Circuit 8000 may detect different levels of current through the sense resistor due to devices in the path between the detector and the controlling devices, due to other devices on the lighting circuit or due to different voltages on the power input such as voltage changes in an AC waveform, voltage changes in the DC voltage (due to a changing voltage from a battery supply for example) or the like. The Remote Switch Sensing Circuit 8000 may take the minimum or maximum level detected over a sample in such a case as the minimum or maximum level may provide the best indication of the state of the controlling devices.

In embodiments of the switch sense circuit generating a pulse or signal and monitoring the response to the pulse or signal to determine the state of the circuit and controlling switches, the pulse or signal generator may dither the pulses or signals if the pulses or signals are generated periodically creating a spread spectrum frequency response to reduce electromagnetic interference generated from the switch sense circuit. It is to be appreciated that the spreading rate, spreading style, modulation rate and modulation waveform may differ based on the switch sense circuit implementation. The short pulses or signals that may be generated to implement the switch sense function may have a wideband frequency response providing electromagnetic interference however the resulting electromagnetic interference may be enhanced by dithering the pulses.

In embodiments of the sensing the state of controlling devices remotely, a switch sense circuit may include protection circuitry to allow the switch sense circuit to monitor the power line in the presence of inrush current, power surges, voltage spikes, overshoot, undershoot and the like on the power lines being monitored. In embodiments, a switch sense circuit may need to monitor the power lines for the response to a stimulus generated by the switch sense circuit. The response may indicate the sense of the controlling devices. The switch sense circuit may need protection circuitry such as inrush limiters, surge suppressors, diode for clamping voltage, TVS devices and the like however these devices must allow the switch sense circuit to detect the response. By way of an example, a Remote Switch Sensing Circuit 8000 may be detecting the state of a wall switch.

When the wall switch is initially switched to the on position, an inrush current may be produced to the circuit. In addition, voltage spikes high and low may be seen by the switch sense circuit even with coupling circuitry in place because the wall switch may be closed at any point in the AC waveform such that some energy may get through the coupling circuit. In an example, the Remote Switch Sensing Circuit 8000 may be connected to a 120 VAC 60 Hz power line. The coupling circuitry may be designed to block the 60 Hz signal in steady state however when the wall switch is switched to the on position, the coupling circuit may not block the signal for a brief period of time due to the initial state of the input power at turn on and any switch bounce that may be present from the wall switch. In such as case, an inrush current may get through the coupling circuit. In addition, voltage spikes as high as 170 volts may be detected after the coupling circuit without any protection circuitry. In this example, the switch sense circuit may include an inrush limiter to limit inrush current, may include a Schottky diode to clamp voltage after the coupling circuit from going below the isolated ground by more than the voltage drop of the Schottky diode and may include a zener diode to clamp voltage after the coupling circuit from going above the maximum operating voltage of any circuitry after the coupling circuit including the detection circuitry.

In an alternate embodiment of sensing the state of controlling devices, a signal generator circuit may be attached to a controlling device and encode a data stream to a receiver circuit inside the detecting device to provide a unidirectional indication of the state of the controlling device. By way of an example, in a lighting circuit, a short pulse generator may be designed using a gated oscillator design and installed in a lighting control device. Circuitry may be present to detect whether the controlling device intends to turn the lights on or off. Circuitry may also be present to detect whether input power is present at the controlling device. The circuitry embedded in the controlling device may be able to send a stream of pulses to the receiving lighting device to indicate that the lighting device should be on, should be off or should be on and powered by a power source integrated in the lighting device or somewhere on the lighting circuit. In the example using a short pulse generator, the receiver may contain the necessary gain, filtering and latching mechanism to detect and recover the pulses as well as decode the information about the state of the controlling device. Different characteristics of the pulse or pulse train may indicate the state of the controlling device. In the lighting circuit example, different separation in the pulses may indicate the state of the controlling device. In an alternate example, the width of the pulse may be changes to indicate the state of the controlling device. It is to be appreciated that the short pulses generated at the controlling device may be encoded in any manner that may allow the receiving device to change state in accordance with the commands from the controlling device. In alternate embodiments, bidirectional communication may be used between the controlling device and controlled device.

In some embodiments, a UPS Switch Sense Module may be designed to be integrated with a device receiving external power to implement a switch sensing function to detect the state of a controlling switches or devices remotely to allow the device to use an integrated or local power source based on the state of the remotely sensed controlling switches or devices. The UPS Switch Sense Module may contain the circuitry and a defined interface that may be connected to physically and electrically by an external device. The module may be integrated into or connected to any device that it may interface physically or electrically to and may be required to detect the state of one or more controlling switches or devices. In some embodiments, the UPS Switch Sense Module may be designed to be integrated with lighting devices, computers, servers, network equipment, storage devices, uninterruptable power supplies (UPS), inverters, appliances, cordless phones, televisions, television peripherals, security cameras, security systems and equipment, alarm clocks, electric or hybrid vehicles, electric motors, portable generators and backup power sources, industrial and manufacturing machinery etc and the like that may desire to detect the state of controlling switches or devices connected to them. In some embodiments, the UPS Switch Sense Module may include an enclosure and have a mounting mechanism to allow it to be physically integrated with another device. In some embodiments the module may be removable and replaceable. In some embodiments, the module may contain an integrated power source. In alternate embodiments, the module may receive power from a second external power source intended to provide a backup power source. In alternate embodiments, the module may receive power from the external device over the interface. In some embodiments, the module may have a connection to input power that is controlled by the one or more switches or devices of which the UPS Switch Sense Module may need to detect the state. In some embodiments the module may be an electrical circuit on a printed circuit board or the like that may be integrated into another device. By way of an example, a UPS Switch Sense Module may be used to detect the state of an on/off wall switch controlling power to a portable generator plugged into a wall outlet providing AC power. As long as the on/off wall switch is in the on position and AC power is available to use, AC power will be used by anything on that circuit. If the on/off wall switch is in the on position and AC power is not available or if the wall switch is in the off position, the portable generator may provide power to devices on the circuit. In alternate examples, the portable generator will be started up or shut down when a transition is sensed from one state to another. By way of another example, a universal power supply (UPS) may detect the state of a controlling switch such that when the switch is in the off position, the UPS may not switchover to battery backup because the user may intend to turn off the attached devices. If the power switch is in the on position and no power is detected, the UPS may then provide power to the attached devices.

In embodiments of the switch sense function, a battery powered power outage alarm may be created for emergency situations that automatically detects a change in switch state of controlling devices or an emergency circuit as well as a disruption in power and creates a visual alarm, audible alarm, transmits an indication of the power outage to an alarm system or derangement panel and the like. By way of an example, a device may be designed integrated into a lighting fixture that contains a speaker to generate an audible alarm. The lighting fixture may be controlled by a wall switch such that under normal operation the lighting fixture may be turned on and off by the wall switch. During a disruption in power such as a power outage, the lighting fixture may generate an audible alarm to indicate that there is a power outage. In some examples, the lighting fixture may have a battery backup in the lighting fixture such that it may still provide light during the outage and would also provide a second indication in the form of an alarm that there is a disruption in power.

In embodiments a switch sense wireless light bulb powered locally by an internal power source containing a switch sense circuit may be designed. The switch sense circuit may be designed into the wireless light bulb such that a controlling device such as a wall switch, may still control turning the wireless light bulb on and off even though the wireless light bulb is not powered by power coming in on the connection to the wall switch. In some embodiments, there may be one or more energy harvesting power sources used in conjunction with the internal power source to power the wireless light bulb or recharge the internal power source of the wireless light bulb. By way of an example, a wireless light bulb with a non-rechargeable battery internal may be controlled by a wall switch via the switch sense circuit. In another example, a wireless light bulb with a rechargeable battery internal and solar cells on the face of the wireless light bulb to recharge the internal battery may be controlled by a wall switch via the switch sense circuit. It is to be appreciated that the switch sense wireless light bulb may be designed in any size or shape housing to meet the requirements of any standard size bulb (e.g. PAR30, PAR38, A19, R30, MR16 etc), non-standard size bulb, fixture, compact fluorescent bulb, fluorescent bulb or lamp (e.g. T4, T5, T8, circular etc.) or down light assembly (e.g. recessed fixtures, fluorescent fixtures or down light fixtures for residential, commercial or industrial lighting), or the like. It is to be appreciated that any combination of wireless control mentioned herein may be used in conjunction with the switch sense wireless light bulb. In alternate embodiments, a dimmer switch may be used to control the light intensity of the switch sense wireless light bulb. In such an embodiment, the switch sense circuit may need to detect the position of the dimmer switch such that it may set the light intensity of the switch sense wireless light bulb as necessary.

In embodiments a switch sense wireless switch powered locally by an internal power source containing a switch sense circuit may be designed along with a wireless transmitter in a housing that plugs into an outlet or connects to power distribution at some point such that a controlling device such as a wall switch, may still control turning remote devices on and off by transmitting wireless control as detected by the switch sense circuit to remote devices. Thus, when the wall switch is on, the switch sense circuit may detect the state and transmit an on command to remote devices and when the wall switch is off, the switch sense circuit may detect the state and transmit an off command to remote devices. In some cases, the switch sense wireless switch may transmit commands on changes in the state of the wall switch. In some embodiments, the switch sense wireless switch may be powered only by an internal power source. In some embodiments, the switch sense wireless switch may be powered or recharged by input power when available. In some embodiments, a wireless receiver may be designed into a device that would be controlled by the switch sense wireless switch. In some embodiments, the wireless receiver may be designed as a standalone module that another device may interface for control and or/power. By way of an example, a wireless lighting system may be constructed using the switch sense wireless switch designed in a housing that may be plugged into an electrical outlet and one or more battery powered wireless lighting fixtures capable of receiving control from the switch sense wireless switch. In another example, a backup power system may be constructed using a switch sense wireless switch and an inverter with battery backup and a wireless receiver that an AC powered device may plug into. Using a wall switch that may control the switch sense wireless switch, the AC powered device may be turned on and off using the wall switch even though it is not directly plugged into the electrical outlet.

In embodiments a hybrid switch sense wireless light bulb powered locally by an internal power source, charged through a connection to an external power source and containing a switch sense circuit may be designed to allow the internal power source to be charged when the external power source is available. In addition, an intelligent wall switch controlling the hybrid switch sense wireless light bulb may be designed containing a timer to allow power to be applied to the bulb for the purposes of charging the battery based on time of day or some other timing mechanism when the user does not intend to illuminate the light source of the wireless light bulb. The intelligent wall switch may close the switch automatically at certain times when the wireless light bulb may be charging. In such an embodiment, the intelligent wall switch may provide a mechanism that may be detected by the switch sense circuit such that the switch sense circuit may know that the wall switch is in charging mode and as such not illuminate the light source. By way of an example, the intelligent wall switch may insert some impedance based on the charge mode approach that the switch sense circuit may detect as a third state that indicates charging mode. In alternate embodiments, the intelligent wall switch may periodically switch to charging mode when it detects that the wall switch is turned to the off position. The intelligent wall switch may learn over time typical times when the intelligent wall switch may be in the off position and create a schedule of charging times. In alternate embodiments, the functionality may be implemented by a controlling device and integrated circuitry or a module into the controlling device to implement the same functionality as the intelligent wall switch. In such embodiments, an existing controlling device may be retrofit with the integrated circuitry or module to allow it to provide the same or similar functionality as the intelligent wall switch. In embodiments, the light source may always be powered by the internal power source and as such the hybrid switch sense wireless light bulb may consume power from the line less than the amount of power required by the light source. In some embodiments, the light source may be powered through the connection to the external power source. The switch sense circuit may be designed into the wireless light bulb such that a controlling device such as the intelligent wall switch, may still control turning the wireless light bulb on and off even though the wireless light bulb is not powered by the external power source. By way of an example, a hybrid switch sense wireless light bulb may contain a rechargeable battery, connection to AC power as the external power source, two watt AC/DC converter, battery charging circuit and a driver allowing the one or more LEDs to be driven from the internal power source. The battery may be charged from the AC/DC converter when in charging mode but at no greater than two watts of power consumption from the external power source at any time. The LED driver powered out of the rechargeable battery may be to full light intensity. The LED driver may be powered from the two watt AC/DC converter when the battery capacity level is measured below some acceptable level to power the light source. At times when power is out, the hybrid switch sense wireless light bulb may still operate. In this example, the power consumption from the external power source may not exceed two watts therefore the power to a light source used sporadically throughout the day would not draw peak power when turned on thereby implementing a form of peak shedding and/or load leveling by balancing the power consumption through the day.

In an embodiment, a zero crossing detector may be designed for detecting the zero crossing point of an AC power waveform by generating a pulse, monitoring the waveform and determining the point on the cycle of the AC power waveform by measuring the response of the outgoing waveform to the generated pulse. As such, the zero crossing may be determined without directly measuring the AC power waveform. In the embodiment, the zero crossing detector includes a processor, a pulse generator, a sense resistor, a coupling circuit, a power connection, an inrush limiter and a current sense. The inrush limiter may change characteristics based on the pulse generated and the point on the AC power waveform at the time the pulse was generated. By creating many pulses through the duration of the AC power waveform and sampling the response, the processor may detect when the response to the pulse corresponds with a zero crossing. A zero crossing detector may be useful in synchronizing operation with an AC power input.

In embodiments of the intelligent wall switch, a wall switch may be designed to include a charging mode that may allow the switch to be closed to allow charging of a rechargeable integrated power source in the devices or on the circuit that it is controlling. The intelligent wall switch may provide a change in the electrical characteristics of the line to allow devices on the circuit to detect different modes. By way of an example, a device with a switch sense circuitry may be able to detect charging mode remotely and change state appropriately. In this example, detecting charging mode may allow a device to charge a rechargeable integrated power source without powering the device for normal operation.

In embodiments containing the ability to grid shift, an intelligent grid shifting system may be constructed using an intelligent wall switch and a device with a rechargeable integrated power source with the ability of the intelligent wall switch to enter a charge mode that the end device may detect or may be programmed to enter into a charge mode simultaneously with the wall switch. In some embodiments, the intelligent wall switch and/or grid shifting device may be programmed directly at the switch or device via some user interface with the configuration maintained on the switch or device. In embodiments, the intelligent grid shifting system may communicate with control systems for status and control of the grid shifting function provided by the intelligent grid shifting system. In some embodiments, the intelligent wall switch includes the ability to communicate via wired or wireless connection as mentioned herein. In alternate embodiments, the intelligent wall switch and/or grid shifting device may be programmed, configured or queried via the wired or wireless communication interface by an external controller. In charge mode, the intelligent wall switch may automatically close the wall switch or bypass the wall switch allowing power to be applied to the circuit at times when power was not intended to be applied to the circuit. If the end device may detect that the power is applied but the mode is charge mode, the end device may use the applied power only for charging purposes. The end device may detect charge mode using switch sense functionality, using a communication mechanism over the circuit, by means of synchronized operation with the intelligent wall switch such that both the switch and end device enter charge mode at the same time or the like. In one embodiment, an intelligent grid shifting lighting system may be developed using an intelligent wall switch and one or more lighting devices with a rechargeable integrated power source, charging circuitry, switch sense functionality and a light source that may be powered by either the external power input or the integrated power source. In such an embodiment, the intelligent wall switch may be programmed to use time of day to enter charging mode when the lighting device may not be used, for example during night hours when there is no occupancy in an office space. At those times, the lighting devices may detect that the intelligent wall switch is in charge mode and also enter charge mode. As such, the lighting devices use the external power source to charge the integrated power source if needed and do not illuminate the light source. The intelligent wall switch may have user control, for example an on/off switch, such that a user may turn the lighting devices on and off as desired. If a user turns the lights on while in charging mode, the lighting devices may detect the change in switch state and illuminate the light source. In alternate embodiments, the lighting devices have a time of day clock and enter charging mode approximately at the same time as the intelligent wall switch. It is to be appreciated that the intelligent wall switch may be any type of switch or controlling device used to control an electrical or lighting circuit such as but not limited to toggle switches, dimmer switches, three way or multi-way switches, timer controlled switches, motion sensor switches, push button or touch switches, paddle switches, solid state switches, slide switches, rotary switches, control panels, lighting control systems, dedicated charge mode devices and the like. The intelligent grid shifting system may be used for grid shifting for energy efficiency, demand response applications, peak shedding, load control, load leveling, backup power or any other use of a hybrid power system mentioned herein.

Figure 81:
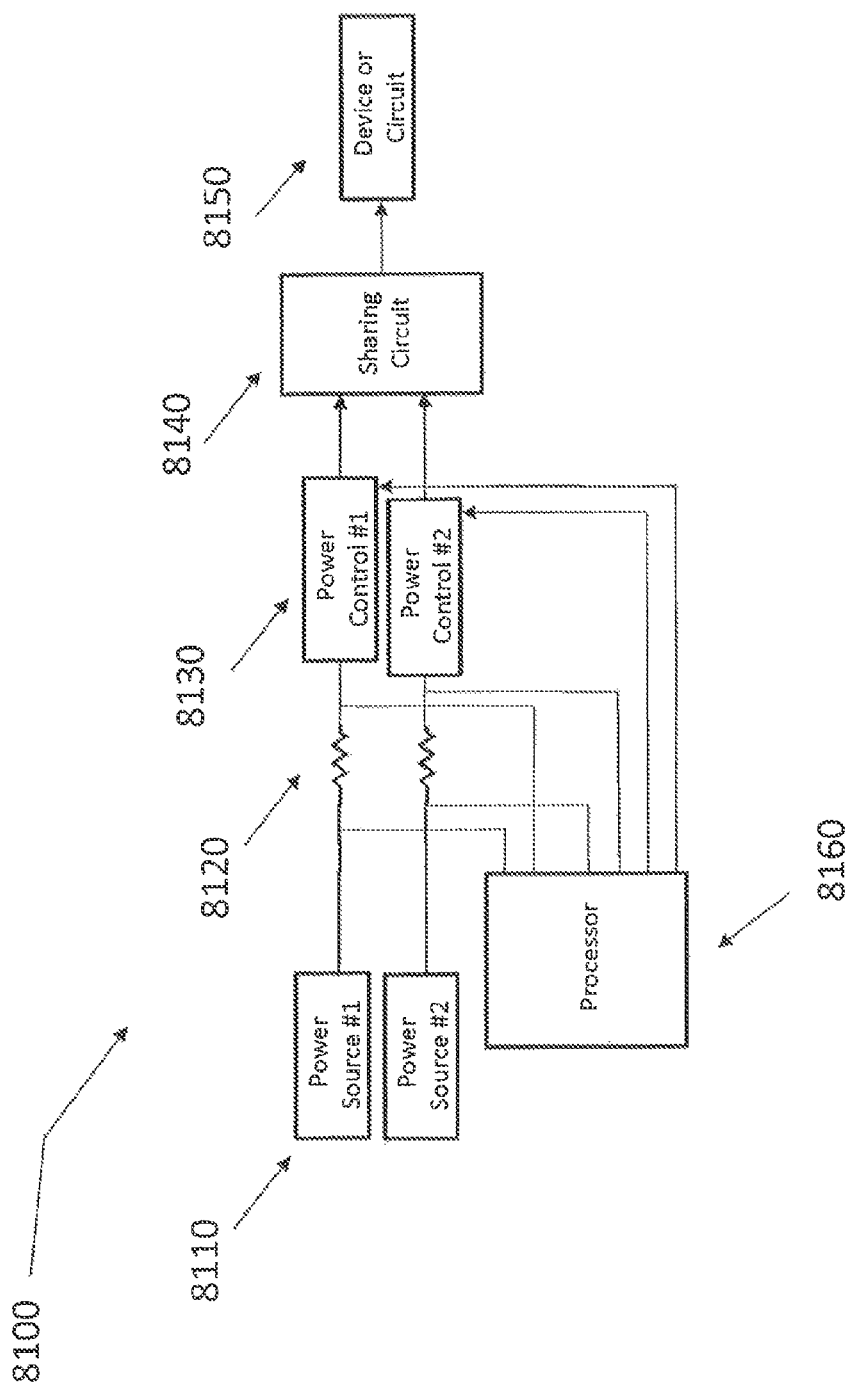
FIG. 81 shows a method of grid shifting that allows the load to be shared between two or more power sources.

In an illustrative embodiment, a method for implementing grid shifting that allows a sharing of the load among one or more power sources is described for use in a Power Sharing Approach for Grid Shifting 8100. With reference to FIG. 81, illustrated is a block diagram view of an embodiment of a Power Sharing Approach for Grid Shifting 8100. In the illustrated embodiment, the Power Sharing Approach for Grid Shifting 8100 includes one or more power sources 8110, a power sensing mechanism 8120, power control 8130, a sharing circuit 8140, end devices 8150 and a processor 8160. The Power Sharing Approach for Grid Shifting 8100 may be implemented inside a device, may be a module that may integrate into a device, may be implemented in a device that controls an electrical circuit where multiple end devices are controlled, may be implemented across multiple electrical circuits (ie at a breaker box or at the building level) etc. The Power Sharing Approach for Grid Shifting 8100 may be implemented by monitoring the amount of power consumed from one or more power sources 8110 via a power sensing mechanism 8120 and a processor 8160, then the processor 8160 may configure a power control 8130 mechanism to adjust the amount of power supplied from different sources. The result, using a sharing circuit 8140, is the ability to control how much power comes from each source to power end devices 8150 connected to the grid shifting solution. In some embodiments, the processor 8160 may be programmed with an algorithm to determine the amount of sharing based on time of day, measurements of power consumed from different power sources, measurements of environmental variables such as battery capacity level or any other purpose that may benefit from the sharing of load by more than one power source. In alternate embodiments, the processor 8160 may be configured via an external communication mechanism to configure or program the processor 8160 to implement a power sharing algorithm. In one embodiment, the power sensing mechanism 8120 may use sense resistors and a microcontroller with the ability to measure the amount of current through the sense resistors. The microcontroller may then use pulse width modulation or similar to implement a mechanism of power control to adjust the draw from the power sources based on the desired amount of sharing between the power sources. In one embodiment targeting LED lighting applications, two power sources may be an external power source such as AC power from the line and an integrated power source such as a rechargeable battery. In such a case, the LED lighting device may contain two LED drivers, one to drive the LEDs from line power and one to drive the LEDs from the integrated power source. The light source is the end device 8150. The power control 8130 mechanism may be the ability to PWM control each of the LED drivers such that the percentage of power drawn from each power source to provide power to the light source may be controlled by using PWM similar to how it is used for dimming purposes but in this case the dimming of the two power sources allows the processor 8160 to control the amount of power from each source. The sharing circuit 8140 may be a simple diode OR of the two power sources after the power control 8130 mechanism and after the output of the LED drivers. In alternate embodiments, the Power Sharing Approach for Grid Shifting 8100 may be implemented with multiple end devices powered by the output. By way of an example, an electrical circuit controlled by a 15 amp circuit breaker may have a device using the Power Sharing Approach for Grid Shifting 8100 method to provide grid shifting among more than one power source to the electrical circuit. In the example, the two power sources may be AC power after the 15 amp circuit breaker and a local backup power device such as an inverter with an integrated battery. In such a case, the power sharing approach applies to AC power as it is distributed on the electrical circuit and some of the load typically supplied by AC power may be supplied by the inverter with an integrated battery. Any end devices on the circuit may benefit from the sharing approach.

Figure 82:
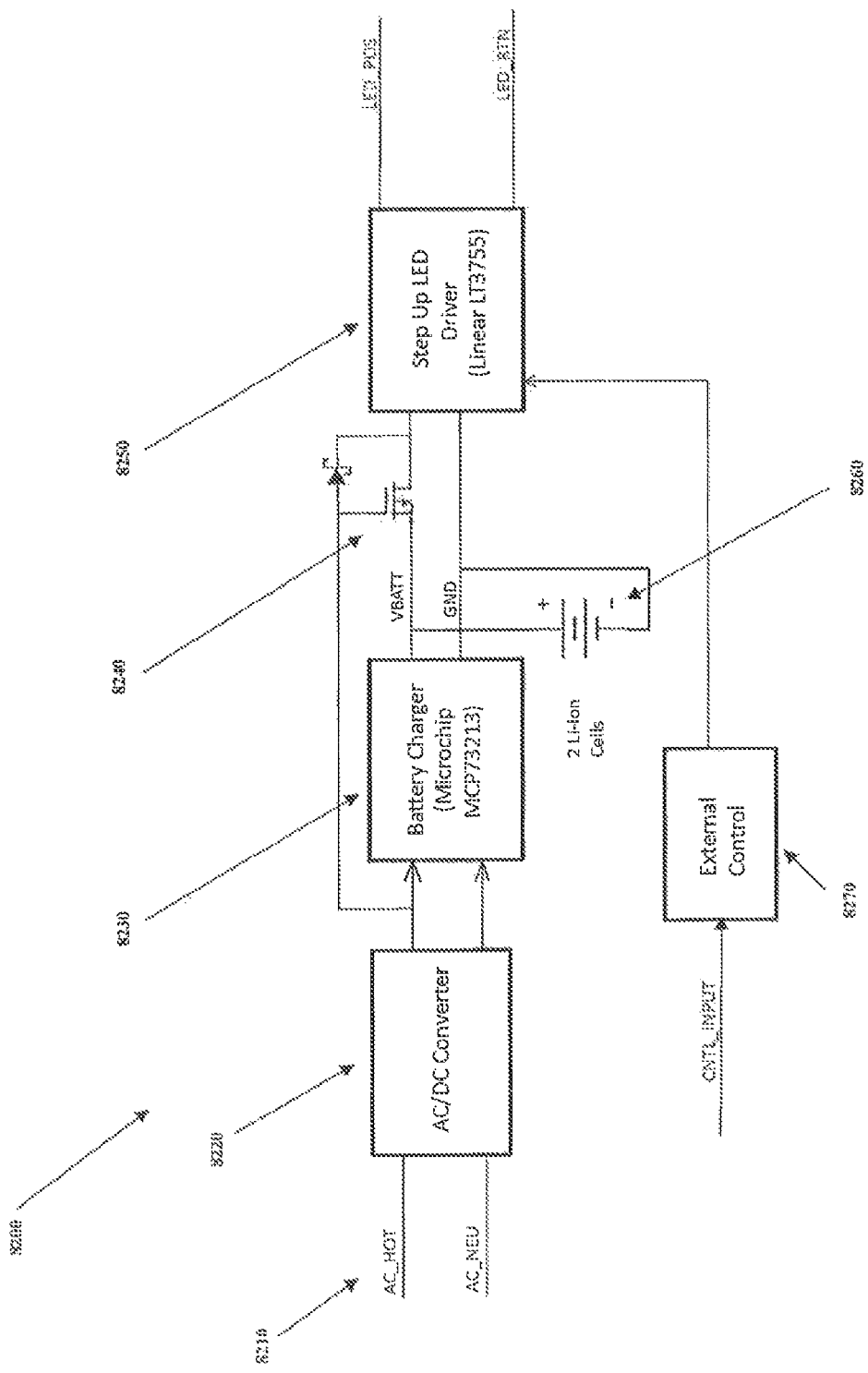
FIG. 82 shows a block diagram of a battery backed LED driver module.

In embodiments, a Battery Backed LED Driver may be constructed. FIG. 82 shows a block diagram of the Battery Backed LED Driver 8200 that may use the external power source or integrated power source if the external power source is not available. The Battery Backed LED Driver 8200 may include an external power input 8210, an AC/DC converter 8220, battery charger circuitry 8230, a power source selection circuit 8240, a step up LED driver 8250, an integrated power source 8260 and an external control input 8270. A Battery Backed LED Driver 8200 may be designed with power source selection circuit 8240 such that when external power is applied, the external power input 8210 supplies power to the light source. When the external power is no longer present the power source selection circuit 8240 may automatically switch such that the integrated power source 8260 may supply power to the light source. In the illustrative embodiment, the light source is driven by the step up LED driver 8250 whether the power source is the external power input 8210 or the integrated power source 8260. In the illustrative embodiment, the power selection circuit 8240 consists of diode and a FET to allow for the automatic selection of the power source into the step up LED driver 8250 such that when power is supplied by the external input, the battery is disconnected from the step up LED driver 8250 and when power is not supplied at the external input the FET connects the integrated power source 8260 to the step up LED driver 8250. In alternate embodiments the switching circuitry may consist of a relay, solid state switch, discrete circuitry and the like such that the desired power source may be supplied. It is to be appreciated that several methods of selecting and switching the power source will be readily apparent to those skilled in the art. In the illustrated embodiment, the step up LED driver 8250 is a Linear Technology LT3755 step up LED driver 8250. It is to be appreciated that any type of step up DC/DC converter and/or LED constant current driver circuit may be used to supply power with the desired drive characteristics. It is to be appreciated that any alternate LED driver may be used and that driver may be a step up driver, a step down driver, a buck boost driver or the like.

In the illustrated embodiment, the embedded battery supply 8260 is a dual cell Li-Ion battery pack. It is to be appreciated that the integrated power source 8260 may be any rechargeable battery type mentioned herein. In alternate embodiments, the integrated power source 8260 may be non-rechargeable such as one or more alkaline batteries. In other embodiments, the integrated power source 8260 may be a capacitor, super capacitor, fuel cell etc. In the illustrative embodiment, the dual cell Li-Ion battery pack is charged with dual cell Li-Ion charging circuit based on the Microchip MCP73213 battery charger. It is to be appreciated that any type of battery charger circuit may be used to charge the desired type rechargeable battery used as the integrated power source 8260. In the illustrated embodiment, the AC/DC converter 8220 may be any AC/DC converter circuit that meets the requirements of the application. In embodiments, the Battery Backed LED Driver 8200 may be designed into a housing to allow it to be integrated into LED lighting devices or used external to LED lighting devices. The housing may have a mounting mechanism to allow it to be physically mounted inside or outside of an LED lighting device. Thus a Battery Backed LED Driver Module may be designed into a singular housing to provide LED drive and battery backup capabilities with the functionality to select the power source and drive the LED light source integrated into the module.

As mentioned herein, the external control input 8270 may receive an input or detect a condition that allows the Battery Backed LED Driver 8200 to make a decision on which power source to use to power the light source. In the illustrated embodiment, the external control input 8270 may receive an input or detect the condition and control the shutdown input to the LT3755 such that the LT3755 will not drive the output. In alternate embodiment, the external control input may enable or disable the integrated power source 8260 to supply power using FETs, relays or any other type of control that would allow the external control input 8270 to enable or disable integrated power source 8240 and/or the external power input 8210 from supplying power. The switching devices may be at any position in the circuit to implement the required switching function. In alternate embodiments, power may be shared such that intelligence in the Battery Backed LED Driver 8200 may control the power sources such that they both supply some amount of power. In some embodiments the Battery Backed LED Driver 8200 contains a battery level detector to provide an indication of the capacity remaining in the integrated power source 8260. By way of an example, an external LED may be driven when the battery level voltage is below a threshold that may indicate a low battery level. The external LED may be mounted in the ceiling to provide a visual indication of the battery capacity level or if the battery is being charged. It is to be appreciated that an indication of the battery capacity level or charging may be provided in any manner described herein.

In embodiments of a battery embedded module for use in retrofit LED fixtures, the battery embedded module may be used for grid shifting applications. In some embodiments, the Grid Shifting Battery Embedded LED Driver Module may contain elements of the Power Sharing Approach for Grid Shifting 8100 and the Battery Backed LED Driver 8200 or the like to allow the integrated power source to be used for grid shifting for energy efficiency, demand response applications, peak shedding, load control, load leveling, backup power or any other use of a hybrid power system mentioned herein. In embodiments, intelligence may be designed into the module to implement a grid shifting algorithm to optimize the use of the device in a retrofit LED fixture.

In one use case, a peak shedding/grid shifting module may be designed that allows grid shifting to occur regularly when battery capacity is available to support grid shifting to achieve cost savings however at certain times when a peak in power usage is expected, for example in the summer months, the module may provide a peak shedding function at those times. In some uses, the module may be integrated into a lighting device to provide this functionality. In other uses, the module may be integrated into any electrical device that may benefit from the peak shedding/grid shifting operation of the module. The module may have intelligence integrated into it to allow the device to hold reserve capacity to guarantee that capacity will be available for the required function. By way of an example, the module may allow grid shifting only down to fifty percent capacity of the integrated power source so that if peak shedding is required, the module may be able to provide that function for a minimum period of time. It is to be appreciated that the module may have similar functionality to the automatic grid shifting wireless light bulb and peak shedding module mentioned herein. It is to be appreciated that grid shifting may be optimized for cost savings and energy efficiency and peak shedding may be optimized for reducing power consumption during peak times.

In embodiments targeting peak shedding, a peak monitoring device may be developed to communicate with devices capable of peak shedding to allow a central detection of a peak in power usage and subsequently control the peak shedding devices to transition power usage to integrated power sources to reduce power consumption during the peak times. When the peak in power usage is over, the peak monitoring device may communicate with the peak shedding devices to transition power back to the external power source. In some embodiments, the peak monitoring device may be electrically and physically connected to the monitored electrical interface. In alternate embodiments, the peak monitoring device may be a current loop to detect the flow of energy on power lines without the need for a direct electrical or physical connection. The method of communication may be wired or wireless and a network of peak shedding devices may allow communication to the devices in a store and forward architecture. In some embodiments, communication between the peak monitoring device and peak shedding devices may be bidirectional such that the peak monitoring device may receive acknowledgements, status, alarms and the like from the peak shedding devices. By way of an example, a peak monitoring device may be attached to the circuit breaker box in a building such that it may monitor power usage at the circuit breaker box. In such a case, the peak monitoring device may be programmed with peak levels such that when it detects a peak level of power usage, the peak monitoring device may communicate control to the peak shedding devices to transition some amount of power to the integrated power source. The communication may include the amount of power to transition to the integrated power source such that the peak monitoring device may control the reduction in load. In another example, the peak shedding devices are lighting devices with integrated power sources. The peak monitoring device may detect a peak in power usage and send a command to the peak shedding lighting devices to move a certain amount of power from the external power input to the integrated power source. One advantage is that the light intensity of the lighting devices does not change but the power consumed from the external power input (and from the source of the power where the peak monitoring device is monitoring) will be reduced during the peak time.

In embodiments of wireless light bulbs and controlling devices using an AC power input, the wireless light bulbs may use the frequency of the AC power input for clocking purposes such that several wireless light bulbs and controlling devices may be synchronized in counting such that local clocks on individual devices may be in sync. By way of an example, an intelligent wall switch that controls one or more wireless light bulbs on the same circuit may use a timer or time of day to determine when to enter charging mode. In embodiments where the wireless light bulbs may use a timer or time of day to enter charging mode, maintaining a count synchronized by the frequency of the AC power input that all devices on the circuit are able to detect provides a mechanism to allow the counts to remain synchronized while the AC power input is applied. In some embodiments, the wireless light bulbs may lock to the frequency provided by the AC power input. In such a case, when AC power is turned off to the wireless light bulbs, they may continue to count based on the last detected frequency. There may be some drift during the time that the wireless light bulb begins to count in the absence of the synchronizing frequency however the wireless light bulbs and controlling devices may be able to account for the drift and compensate for it. In some embodiments, there may be a method independent of the frequency of the AC power input to synchronize the intelligent wall switch and wireless light bulbs at some point in time thereafter the controlling devices and wireless light bulbs may use the frequency of the power to remain in sync.

In embodiments of battery backed LED lighting, a traffic signal may be constructed containing an internal battery backup, charging circuitry, connection to external power for normal operation and charging and the intelligence to switch over to battery backup and continue operation in the event of a power outage. In some embodiments, the battery backed LED traffic signal may continue operation as prior to the outage for example by continuing cycling between red, yellow and green based on the timing previously used. In these embodiments, the battery backed LED traffic light may need to learn the operational timing of the traffic light in terms of timing. In some embodiments, a traffic light may communicate with other traffic lights using wired or wireless communication to allow the timing of the lights to remain in sync during the power outage. In alternate embodiments, the battery backed LED traffic signal may enter a flashing operation such that upon a detected power outage, power for the traffic signal may be transitioned to the battery backup and the signal may flash the yellow light or red light. In these embodiments, the battery backed LED traffic signal may be programmable so the operation of the flashing light may be programmed with characteristics such as flashing color, duration of on and off time, light intensity of the light and the like. In the embodiment where the yellow light or red light are flashing, a battery embedded in the battery backed LED traffic signal allows for the traffic signal to operate autonomously without the need for control to be received from a controller cabinet. In some embodiments, the battery backed LED traffic signal may be pre-programmed with a number of operational scenarios that an end user may select via a user interface to produce the desired operation.

In embodiments of battery embedded LED traffic signals, the traffic signal may use the embedded battery for grid shifting for cost savings, peak shedding, demand response, load leveling etc in addition to providing a battery backup for power outage situations. In such a case, the battery embedded LED traffic signals may be designed to store and use power from the embedded power source. The functionality may be pre-programmed, factory set, designed in a custom electrical circuit or the like to respond to sensors on the traffic light and a pre-programmed algorithm to implement the grid shifting function. In some embodiments, the grid shifting function is performed based on an intelligent program internally that may use a real time clock, sensors or a communication interface to perform grid shifting. The intelligent program that uses a real time clock may be set by the user such that the intelligent program may use time of day or a calendar to perform the grid shifting functionality. The grid shifting function may be used for cost savings, energy efficiency, convenience and safety/security. A battery embedded LED traffic signal may have switches, dials, knobs, USB connector etc on or inside the traffic signal housing to set time of day or sensor thresholds such that a user may be able to control how the intelligent program manages grid shifting. Once set, the battery embedded LED traffic signal may act autonomously based on those settings and/or the pre-programmed or designed function. The settings may be changed on occasion by the user. A battery embedded LED traffic signal may allow battery backup in power outage situation, cost savings by storing energy when the rates are cheap then using the stored energy when it is expensive and peak shedding functionality. In some embodiments of battery embedded LED traffic signals, an energy harvesting power source may be included, such as solar cells, capturing radio frequency energy and the like to allow an additional power source to power the traffic light or recharge the embedded battery. In these embodiments, the energy harvesting method may be directly integrated into the housing of the traffic light. By way of an example, solar cells may be installed on the top of the housing of the traffic light. In another example, an antenna and circuit to capture radio frequency energy may be integrated into the traffic light. In alternate embodiments, an external energy harvesting method may be used. In the example of solar cells, a larger solar panel may be installed and positioned to optimize energy harvesting and a cable over to the battery embedded LED traffic light may allow the power consumption of the traffic light to be partially supplied by the solar panel or the solar panel may be used to charge the embedded battery.

Figure 83:
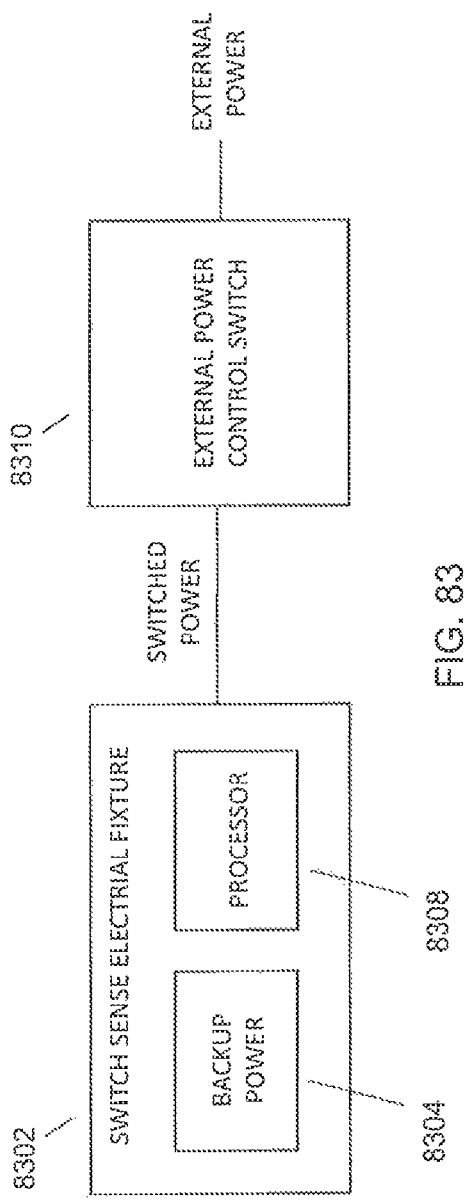
FIG. 83 shows a block diagram of a switch sensing electrical fixture with embedded processing.

Referring to FIG. 83, a switch sense electrical fixture 8302 may contain a processor 8308 and backup power 8304 to external power that is delivered through an external power control switch 8310, where the processor 8308 provides intelligent control of the switch sense electrical fixture 8302 under conditions where the external power has been removed or lost. In embodiments, the processor 8308 may include a microprocessor, a microcomputer, a digital logic circuit, an analog circuit, and the like. In the case where the processor contains a computing device, software for the computing device may fixed at the factory, updated though an external interface to the processor (e.g. though a wired or wireless connection), and the like.

It is to be appreciated that a switch sense capable device may be able to detect the state of any type of switch or controlling device used to control an electrical or lighting circuit such as but not limited to toggle switches, dimmer switches, three way or multi-way switches, timer controlled switches, motion sensor switches, push button or touch switches, paddle switches, solid state switches, slide switches, rotary switches, control panels, lighting control systems, dedicated charge mode devices and the like. In embodiments, a switch sense capable device may be able to detect other characteristics of controlling devices that may indicate a state that the end device may transition to. By way of an example, an end device that is a lighting fixture may be able to detect the state of an on/off or dimming controlling device but in addition may be able to detect settings in the controlling device pertaining to color, mode (e.g., for a light show), color temperature, strobe, programming parameters or operation of the lighting fixture or the like. Thus in this example, the lighting device may be able to maintain state or detect changes in state during a disruption in power for any aspect of the lighting device that may be set at a controlling device using a switch sense mechanism described herein. In embodiments where an electrical fixture may be a switch sense capable device, the device may detect the state of a controlling device to indicate holdover time to run off of a backup power source, changes in power consumption to extend battery life, changes in motor speed, the generation of audible or visual alarms, automatic stop or protection mechanisms and the like. In embodiments, the electrical fixture may detect any aspect of the controlling device that may affect a change in state of the electrical fixture during normal operation or during a disruption in power. It is to be appreciated that the detection may allow the electrical fixture to continue operation during a disruption in power using an internal power source, may allow the electrical fixture to change its mode of operation during a disruption in power and may allow the electrical fixture to detect changes at the controlling device that may determine a change in state of the electrical fixture. In some embodiments the controlling device may contain electrical circuitry, a processor and the like that may allow a switch sense capable device to detect characteristics of the controlling device that may indicate a need for a change of state in the end device.

In embodiments, the terms electrical fixture and lighting fixture are used herein to represent an electrical device or lighting source that may plug into a fixture, or it may refer to the fixture itself, and is not meant to be limiting in any way. For example, a switch sense module may be included in a 'lighting fixture' or 'electrical fixture' that is a lighting source device that is mounted into a mounting electrical fixture. In another example, a switch sense module may be included in a mounting electrical fixture that a light or electrical device plugs into, and thus providing the light or electrical device with the functionality and benefit of the switch sense module. In another example, a switch sense module may be included in an external switch controller, such as a wall switch, where information may be provided to the controlled electrical or lighting device being controlled by the switch. In another example, the switch sense module may be located in a central location that enables the functionality and benefits of the switch sense module to one or more electrical or lighting devices as controlled through at least one external control switch.

Figure 85:
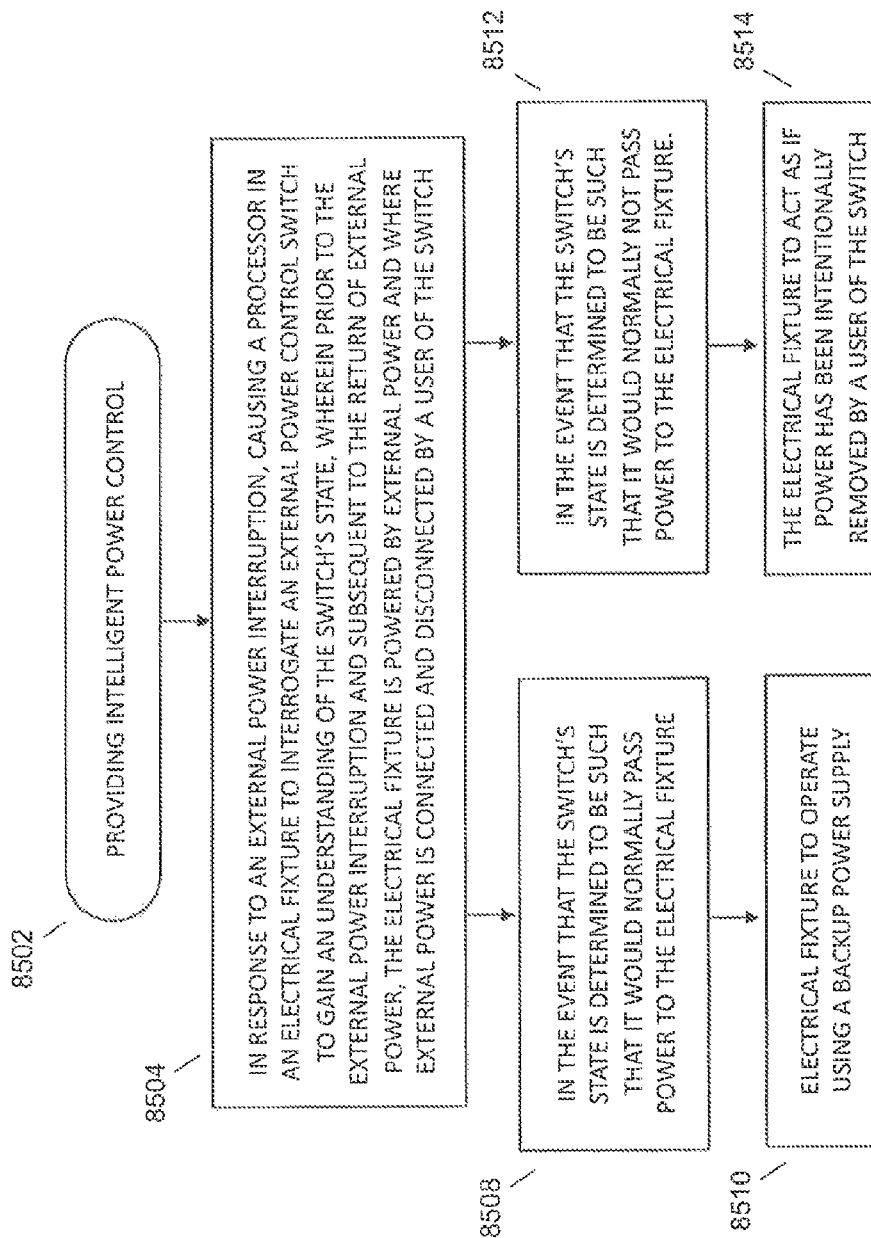
FIG. 85 shows a flow diagram for a switch sensing electrical fixture with embedded processing.

Referring to FIG. 85, a method of providing intelligent power control 8502 may, in response to an external power interruption, cause a processor in an electrical fixture to interrogate an external power control switch to gain an understanding of the switch's state, where prior to the external power interruption the electrical fixture may be powered by external power and where external power may be connected and disconnected by a user of the switch 8504. In the event that the switch's state is determined to be such that it would normally pass power to the electrical fixture 8508, the processor may cause the electrical fixture to operate using a backup power supply 8510. In the event that the switch's state is determined to be such that it would normally not pass power to the electrical fixture 8512, the processor may cause the electrical fixture to act as if power has been intentionally removed by the user of the switch 8514. In response to a return of external power, powering the electrical fixture may then be through external power where the user of the switch switches external power.

In embodiments, the backup power supply may be a battery, where the battery may be provided internal to the electrical fixture or external to the electrical fixture. The external power interruption may be an interruption of AC power. The external power interruption may be an interruption from external DC power. The external power interruption may be detected at the un-switched power side of the switch. The electric fixture may provide protection circuitry to protect against at least one of electrical transients and surges. The electrical fixture may be a lighting fixture. The lighting fixture may be an LED lighting fixture. The lighting fixture may include an internal battery power supply and can dynamically manage consumption of power from an external source associated with the sensed switch and the internal battery power supply. The electrical fixture may be at least one of a computer, server, network equipment, storage device, uninterruptable power supply (UPS), inverter, appliance, cordless phone, television, television peripheral, security camera, security system and equipment, alarm clock, electric or hybrid vehicle, electric motor, portable generator, backup power source, industrial machine, and manufacturing machine.

In embodiments, the switch's state may be determined through a sensing of current in an electrical signal sent by the electrical facility onto an input power connection, where the electrical signal may be generated by a signal generator that generates at least one pulse and drives the pulse through a sense resistor to a coupling circuit to couple the pulse onto the power connection, and where a current sense detects the amount of current flowing through the sense resistor to determine the state of the switch. The detection of the amount of current may be provided by measuring the voltage at the sense resistor. The state of the switch may be determined based on the current measured by the current sense. The switch may be determined to be open if less than a predetermined amount of current flows through the sense resistor. The switch may be determined to be closed if greater than a predetermined amount of current flows through the sense resistor. Sensing of current may utilize taking multiple samples, averaging, statistical determination to determine measured current sense, and the like.

In embodiments, the switch's state is determined through a sensing of reflections from at least one incident electrical pulse sent by the switch sense facility onto the input power connection. The sensing of reflections may utilize the technique of time-domain reflectometry (TDR). The pulse may be coupled onto the input power connection and propagate down the line and produces reflections based on impedance discontinuities, where the reflections may be received through a coupling circuit such that they are recovered and processed by a reflection recovery circuit. The switch's state may be a partially on-state from a dimmer device. The switch's state may be determined from a threshold value. The threshold value may be predetermined. The threshold value may be learned by the electrical fixture. The interrogation may be provided though a switch sense module.

In embodiments, the electrical fixture may go into a battery longevity mode once the electrical fixture is operating using the backup power supply, where the battery longevity mode may consist of a usage profile specifically adapted for the electrical fixture, and where the usage profile may change in time based on the duration of the external power interruption. The electrical fixture may go into a battery-charging mode in the event that there is external power being supplied to the lighting fixture.

In embodiments, the present invention may be an intelligent power control electrical fixture, comprising a processor in the electrical fixture to interrogate an external power control switch to gain an understanding of the switch's state in response to an external power interruption, where prior to and after the external power interruption the electrical fixture is powered by external power and where external power is connected and disconnected by a user of the switch. In the event that the switch's state is determined to be such that it would normally pass power to the electrical fixture, the processor may cause the electrical fixture to operate using a backup power supply. In the event that the switch's state is determined to be such that it would normally not pass power to the electrical fixture, the processor may cause the electrical fixture to act as if power has been intentionally removed by a user of the switch.

In embodiments, the present invention may provide a computer implemented method for providing intelligent power control, which in response to an external power interruption, may cause a processor in an electrical fixture to interrogate an external power control switch to gain an understanding of the switch's state, where prior to the external power interruption the electrical fixture is powered by external power and where external power is connected and disconnected by a user of the switch. In the event that the switch's state is determined to be such that it would normally pass power to the electrical fixture, the processor may cause the electrical fixture to operate using a backup power supply. In the event that the switch's state is determined to be such that it would normally not pass power to the electrical fixture, the processor may cause the electrical fixture to act as if power has been intentionally removed by a user of the switch. In response to a return of external power, the electrical fixture may be powered through external power where the user of the switch switches external power.

Figure 84:
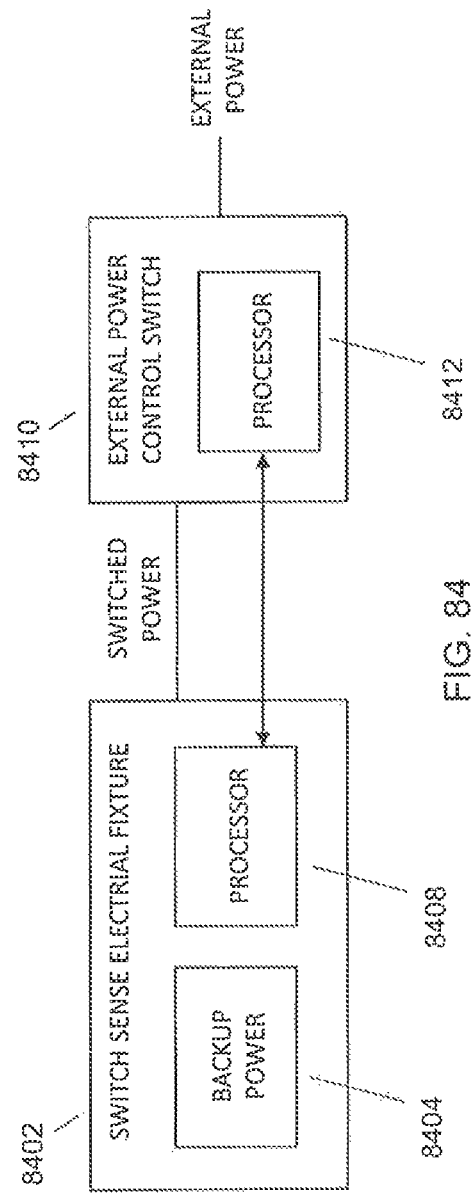
FIG. 84 shows a block diagram of a switch sensing electrical fixture with embedded processing in both the electrical fixture and the external power control switch.

Referring to FIG. 84, a switch sense electrical fixture 8402 may contain a processor 8408 and backup power 8404 to external power that is delivered through an external power control switch 8410 that also may contain a processor 8412, where at least one of the processors 8408, 8412 may provide intelligent control of the switch sense electrical fixture 8402 under conditions where the external power has been removed or lost. In embodiments, the processor 8408, 8412 may include a microprocessor, a microcomputer, a digital logic circuit, an analog circuit, and the like. In the case where the processor contains a computing device, software for the computing device may fixed at the factory, updated though an external interface to the processor (e.g. though a wired or wireless connection), and the like.

Figure 86A:
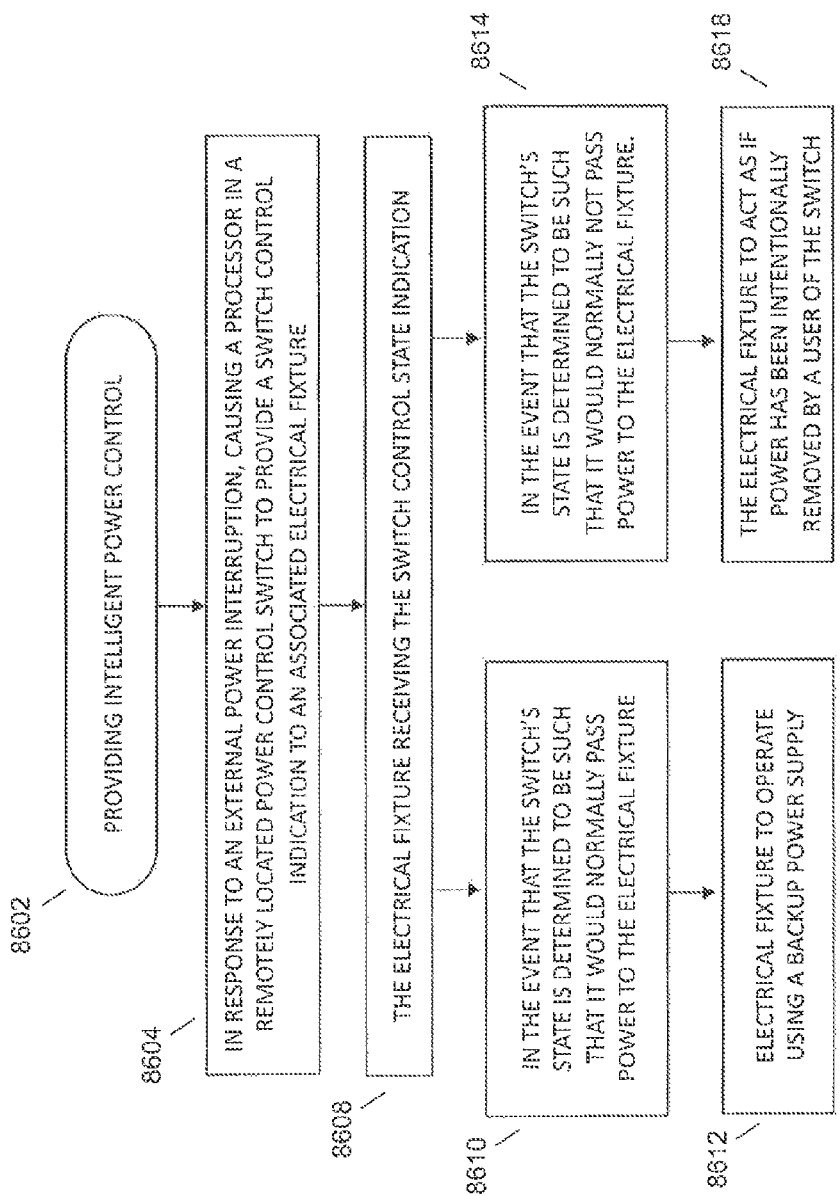
FIG. 86*a* shows a flow diagram for a switch sensing electrical fixture with embedded processing in the external power control switch.
Figure 86B:
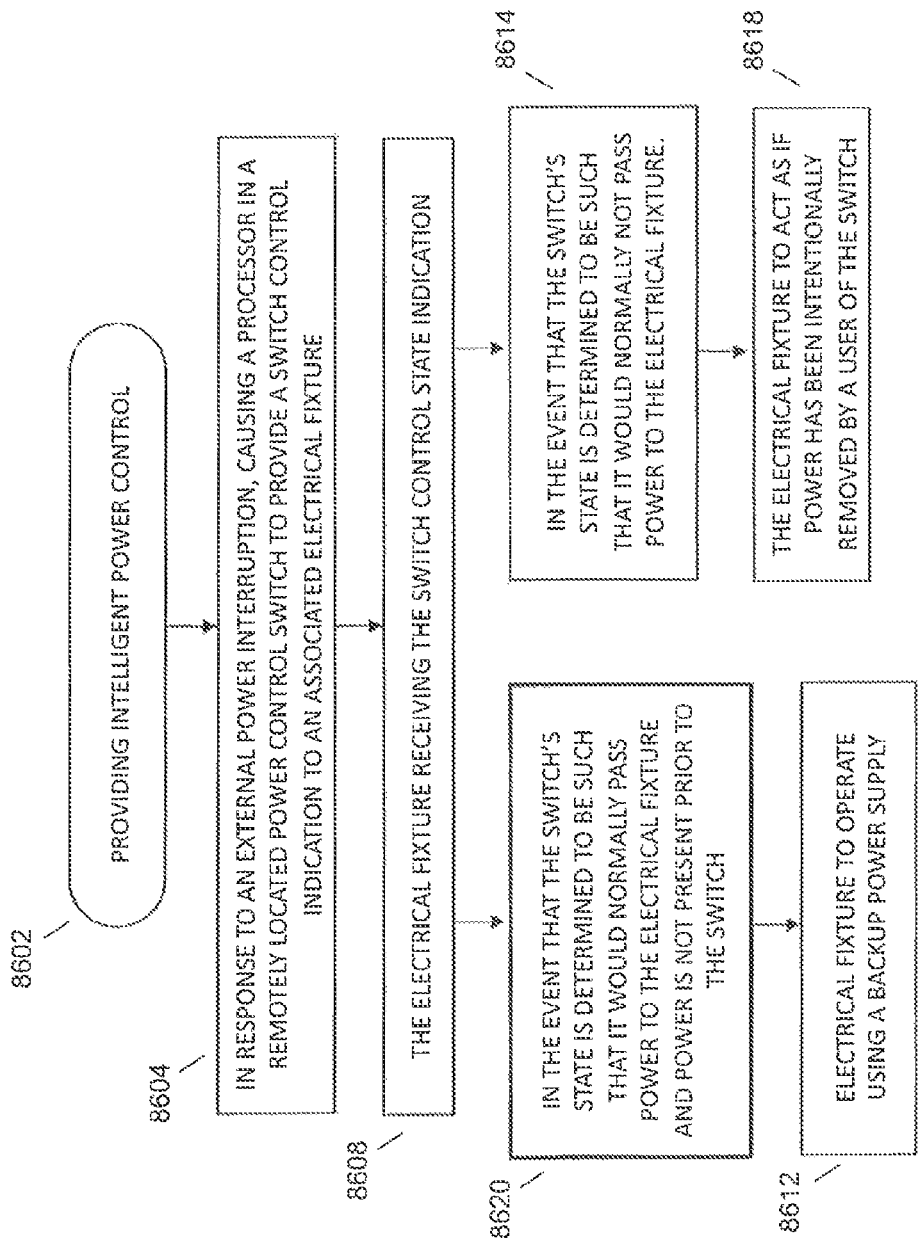
FIG. 86*b* shows a flow diagram for a switch sensing electrical fixture with embedded processing in the external power control switch, where power is sensed prior to the switch.

Referring to FIG. 86a, a method of providing intelligent power control 8602 may, in response to an external power interruption, cause a processor in a remotely located power control switch to provide a switch control state indication to an associated electrical fixture 8604, where the electrical fixture may receive the switch control state indication 8608. In the event that the switch's state is determined to be such that it would normally pass power to the electrical fixture 8610, the electrical fixture may be caused to operate using a backup power supply 8612. In the event that the switch's state is determined to be such that it would normally not pass power to the electrical fixture 8614, the electrical fixture may be caused to act as if power has been intentionally removed by a user of the switch 8618. Referring to FIG. 86*b*, In the event that the switch's state is determined to be such that it would normally pass power to the electrical fixture and power is not present prior to the switch 8620, the electrical fixture may be caused to operate using a backup power supply 8612. In embodiments, the switch control state indication may be provided though a switch sense module, where the switch sense module may be in the power control switch, where the switch sense module may be in the associated electrical fixture, and the like.

In embodiments, the present invention may provide for an intelligent power control electrical switch, including a processor in a remotely located power control switch providing a switch control state indication to an associated electrical fixture in response to an external power interruption, where the electrical fixture may receive the switch control state indication. In the event that the switch's state is determined to be such that it would normally pass power to the electrical fixture, the electrical fixture may be caused to operate using a backup power supply. In the event that the switch's state is determined to be such that it would normally not pass power to the electrical fixture, the electrical fixture may be caused to act as if power has been intentionally removed by a user of the switch.

In embodiments, the present invention may provide a computer implemented method of providing intelligent power control, which, in response to an external power interruption, may cause a processor in a remotely located power control switch to provide a switch control state indication to an associated electrical fixture, where the electrical fixture may receive the switch control state indication. In the event that the switch's state is determined to be such that it would normally pass power to the electrical fixture, the electrical fixture may be caused to operate using a backup power supply. In the event that the switch's state is determined to be such that it would normally not pass power to the electrical fixture, the electrical fixture may act as if power has been intentionally removed by a user of the switch.

Figure 87:
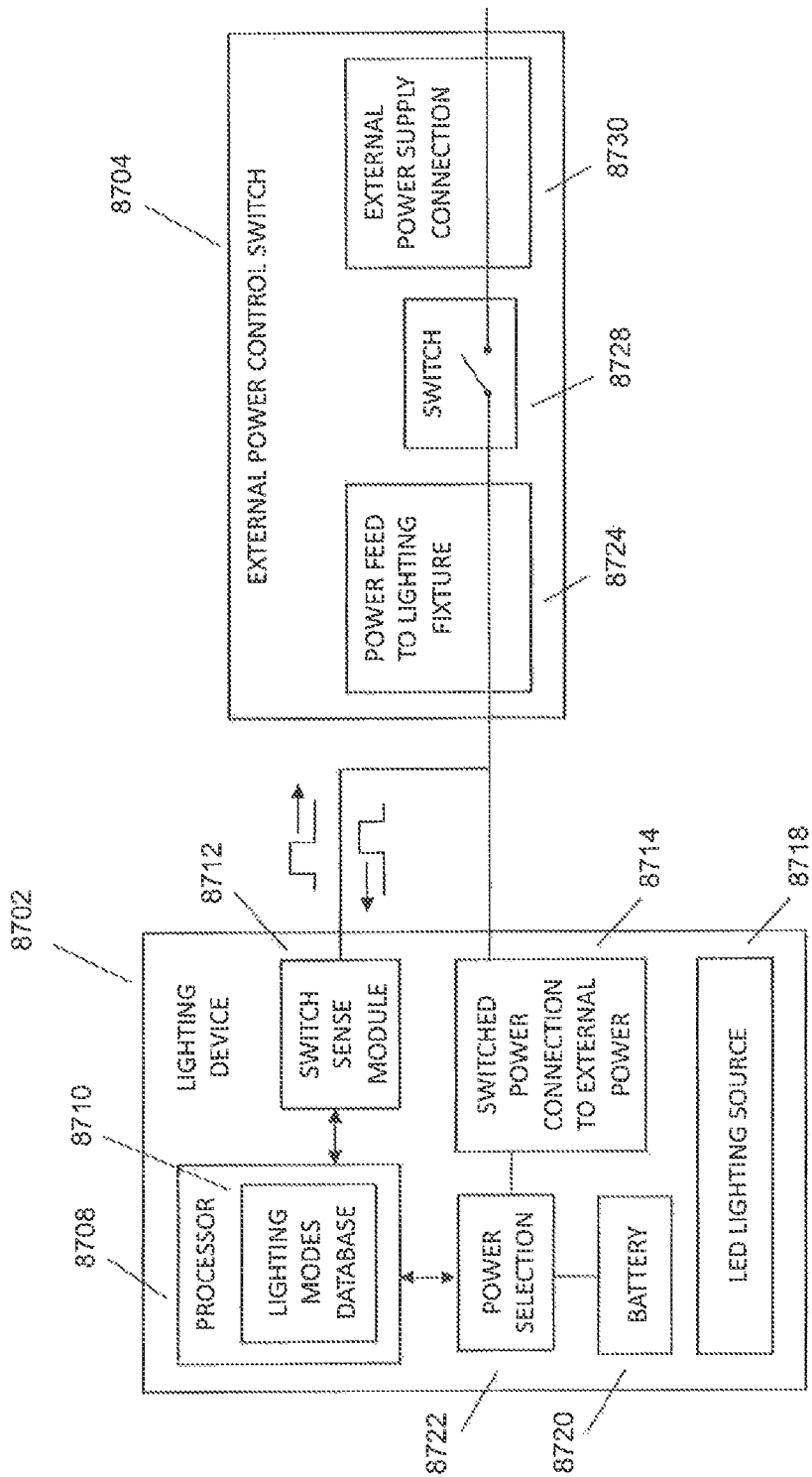
FIG. 87 shows a block diagram for a switch sense lighting device with a switch sense module embedded in the lighting device.

Referring to FIG. 87, the present invention may provide for power outage management through a lighting device 8702 and an external power control switch 8704, where the lighting device 8702 may include a processor 8708 with a lighting-modes database 8710, a switch sense module 8712, a switched power connection to external power 8714, an LED lighting source 8718, an internal power source such as a battery 8720, a power selection device 8722, and the like and where the external power control switch 8704 may include a power feed to the lighting fixture 8722, a switch 8724, a connection to an external power supply 8730, and the like. In embodiments, the lighting device 8702 may detect a disruption in the power distribution by detecting whether external power is present and using a switch sense module 8712 to determine the state of the external power control switch 8704, and as a result, determine whether to power the lighting device 8702 using the internal power source. In a disruption of power, input from the switch sense module 8712 allows the processor 8708 to make a determination if the user intent was to turn the light off or whether there is a disruption in external power and may select the internal power source to power the lighting device 8702. In embodiments, the switch sense module 8712 may use any switch sense technique as described herein to determine the state of the switch 8728.

Figure 88:
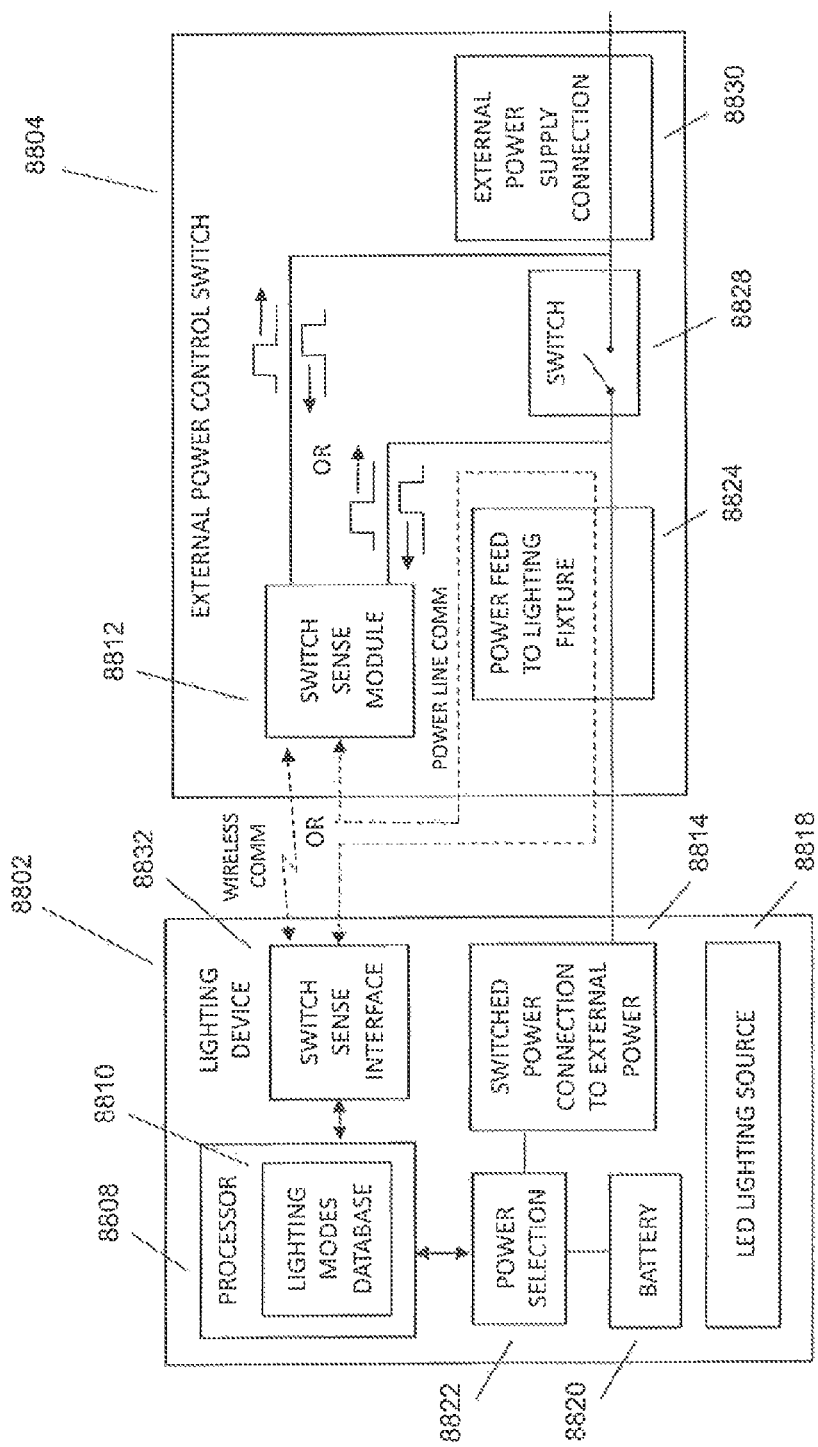
FIG. 88 shows a block diagram for a switch sense lighting device with a switch sense module embedded in the external power control switch.

Referring to FIG. 88, the present invention may provide for power outage management through a lighting device 8802 and an external power control switch 8804, where the lighting device 8802 may include a processor 8808 with a lighting modes database 8810, a switched power connection to external power 8814, an LED lighting source 8818, an internal power source such as a battery 8820, a power selection device 8822, a switch sense interface 8832 and the like and where the external power control switch 8804 may include a switch sense module 8812, a power feed to the lighting fixture 8822, a switch 8828, a connection to an external power supply 8830, and the like. In embodiments, the switch sense module 8812 may detect a disruption in the power distribution by detecting whether external power is present and may determine the state of the switch 8828 and connection to the external power supply 8830, and as a result, communicate the state of the external power control switch 8804 to the switch sense interface 8832 in the lighting device 8802 such that the processor 8808 may determine whether to use the internal power source. In a disruption of power, input from the switch sense module 8812 allows the processor 8808 to make a determination if the user intent was to turn the light off or whether there is a problem with the external power and may select the internal power source to power the lighting device. The switch sense module 8812 may detect the state of the switch 8828 by using the direct electrical connection to both sides of the switch 8828 to determine the state of the switch 8828 and the external power connection 8830. In some embodiments, the switch sense module may use current sensing methods, TDR methods or other methods mentioned herein to determine the state of the switch 8828 and other controlling devices in the power distribution prior to the connection to an external power supply 8830. The switch sense module 8812 may communicate the state of the external power control switch 8804 to the switch sense interface 8832 in the lighting device 8802 via known methods of power line communication, wireless communication, and the like. Input communicated to the switch sense interface 8832 from the switch sense module 8822 may allow the processor 8808 to make a determination that the user intent was to turn the light off but there was a disruption in the external power connection 8830 prior to the switch 8822 and may select the internal power source to power the lighting device. It is to be appreciated that more than one lighting device 8802 may receive communication from a switch sense module 8812 such that a single switch sense module 8812 may control a plurality of lighting devices.

Figure 89:
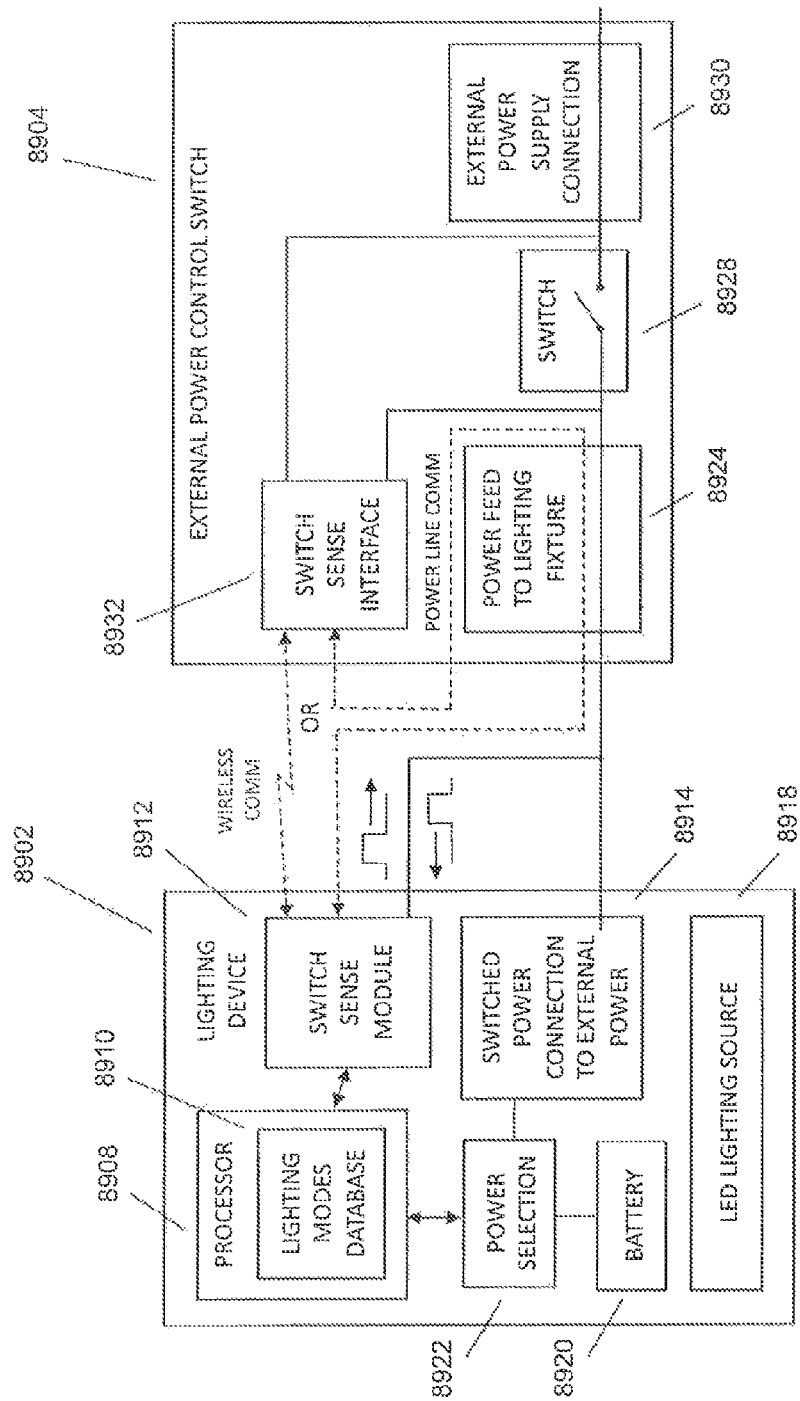
FIG. 89 shows a block diagram for a switch sense lighting device with a switch sense module embedded in the lighting device and a switch sense interface in the external power control switch for detecting power across the switch and interfacing with the lighting device.

Referring to FIG. 89, the present invention may provide for power outage management through a lighting device 8902 and an external power control switch 8904, where the lighting device 8902 may include a processor 8908 with a lighting modes database 8910, a switch sense module 8912, a switched power connection to external power 8914, an LED lighting source 8918, an internal power source such as a battery 8920, a power selection device 8922 and the like and where the external power control switch 8904 may include a power feed to the lighting fixture 8922, a switch 8928, a connection to an external power supply 8830, a switch sense interface 8932, and the like. In embodiments, the lighting device 8902 may detect a disruption in the power distribution by detecting whether external power is present and using a switch sense module 8912 to determine the state of the switch 8928 in the external power control switch 8904, and as a result, determine whether to power the lighting device 8902 using the internal power source. In a disruption of power, input from the switch sense module 8912 may allow the processor 8908 to make a determination if the user intent was to turn the light off or whether there is a problem with external power and may select the internal power source to power the lighting device. In embodiments, the switch sense module 8912 may use current sensing methods, TDR methods or other methods mentioned herein to determine the state of the switch 8928 and other controlling devices in the power distribution prior to the connection to an external power supply 8930. In embodiments, the switch sense interface 8932 may detect the state of the switch 8928 by using the direct electrical connection to both sides of the switch 8928 to determine the state of the switch 8928 and the external power connection 8930. The switch sense interface 8932 may communicate the state of the external power control switch 8904 to the switch sense module 8912 in the lighting device 8902 by changing the electrical characteristics of the power feed to the lighting fixture 8922 such that the switch sense module 8912 may detect the state of the switch 8928 and the state of the external power connection 8930. The switch sense interface 8932 may communicate the state of the external power control switch 8904 to the switch sense module 8912 in the lighting device 8902 via known methods of power line communication, wireless communication, and the like. In a disruption of power, input from the switch sense module 8912 may allow the processor 8908 to make a determination if the user intent was to turn the light off or whether there is a problem with the external power and may select the internal power source to power the lighting device. Input communicated to the switch sense module 8912 from the switch sense interface 8932 may allow the processor 8908 to make a determination that the user intent was to turn the light off but there was a disruption in the external power connection 8930 prior to the switch 8928 and may select the internal power source to power the lighting device. Thus, the lighting device may be able to use switchover to the internal power source in the case of a disruption of power even if the switch 8928 may be open and as such the switch sense module 8912 is not be able to directly detect that the disruption occurred.

In embodiments, the present invention may provide for a power outage lighting management within an environment, comprising a lighting device adapted to detect a power outage condition and power the lighting device by an internal power source. In embodiments, the lighting device may include a light source that is powered selectively by either the internal power source or an external power source. In response to detecting, the lighting device including the LED light source that is powered by the internal power source may regulate a light intensity of the LED light source in accordance with the power outage indication data, such as the light intensity as a dimmed light condition, the light intensity as a full brightness light condition, and the like.

In embodiments, the present invention may provide for a system of power management and control of an electrical facility, comprising the electrical facility that includes an electrical device, an internal power source, a connection to an external power source through an external power control device, a power source management facility, and a switch sense facility that senses the power control state of the external power control device, wherein the power source management facility controls the source of power being delivered to the electrical device based on the switch sense facility detecting at least one of the power control state of the external power control device and the presence of power being received from the external power control device. In embodiments, the electrical facility is a lighting facility and the electrical device is a lighting source, and where the lighting source may be an LED lighting source. The internal power source, the power source management facility, and the switch sense facility may be external to the lighting facility, and the like. The internal power source, the power source management facility, and the switch sense facility may be external to the electrical device. The power control state may be determined through a sensing of current in an electrical signal sent by the switch sense facility onto the input power connection. Sensing of current may utilize taking multiple samples, averaging, statistical determination, and the like, to determine measured current sense. The power control state may be determined through a sensing of reflections from an incident electrical pulse sent by the switch sense facility onto the input power connection. There may be an electrical coupling between the input power connection and the switch sense facility. The power source management facility may place the internal power source in a charge mode when there is power being received by the external power control device. The power source management facility may power the lighting source from the internal power source when the switch sense facility senses that the power control state of the external power control device is on and that there is no power being received by the lighting facility. The external power control device may be a device that is used to apply power to an electrical circuit. The external power control device may be a device that is used to apply power to a lighting circuit. The power control state may be an open switch or a closed switch. The power control state may be a partially on state from a dimmer device. The power control state may be determined from a threshold value, where the threshold value is predetermined, learned by the switch sense facility, and the like. The learning may be based on an electrical signal provided on the input power connection. The external power source may be AC power, DC power, and the like. The switch sense facility may sense the presence of power being received prior to the external power control device through a power sensing circuit in the external power control device. The power sensing circuit may insert impedance on the circuit that the switch sense facility may detect. The power source management facility may change the source of the power being used by the lighting facility based on the state of the power sensing circuit detected by the switch sense facility. The lighting facility may provide protection circuitry to protect against at least one of electrical transients and surges, where the protection may be to protect the switch sense facility.

In embodiments, the present invention may provide for an uninterruptable lighting source, including an uninterruptable lighting fixture containing an LED lighting source and a control facility for manipulating light output of the LED lighting source and selecting which source of power to use, wherein the uninterruptable lighting fixture provides the LED lighting source in response to a disruption of an external power source, and a rechargeable energy storage device capable of supplying power to the uninterruptable lighting fixture independent of the external power source, where recharging is provided to the uninterruptable lighting fixture at a time when the external power source is available.

In embodiments, the external power source may be at least one of an AC and DC external power source. The uninterruptable lighting source may be designed to be a retrofit uninterruptable lighting fixture that replaces an existing lighting fixture. The rechargeable energy storage device and control facility may be integrated with the LED lighting source. The rechargeable energy storage device and control facility may be housed externally to the LED lighting source. The rechargeable energy storage device may be at least one of a battery, fuel cell, and super capacitor. The rechargeable energy storage device may be charged from the external power source. The rechargeable energy storage device may be charged from a constant current drive to the LED light source. The uninterruptable lighting facility may provide illumination based upon a setting of a switch. The switch setting may be sensed by the control facility through at least one of electrical impedance and AC power at the switch. The control facility may receive input through an input component in selecting which source of power to use. The input component may be a switch sense input component that senses at least one of a switch position and the presence of switch power for an external switching facility providing the external power source. The switch position of the external switching facility may be through electrical impedance sensing of the switch. The input component may be an RF input receiving component that receives commands from an external power outage detector. The input component may be a wireless interface from a power sensing facility that may detect a disruption of power. The wireless interface may be a connection to a network. The indication of power outage may be detected over the wired interface. At least one of an internal timer and a time of day clock may control the manipulating. The uninterruptable lighting fixture may include a sensor input device for detecting an environmental condition. The sensor may be a light sensor sensing a level of ambient light. The sensor may be a motion sensor sensing motion. The control facility may control when the rechargeable energy storage device is charging. The manipulating may be switching on the light output, changing an illumination level of the light output, flashing the light output, changing color content of the light output, and the like. The energy storage device may be capable of supplying the source of power for the lighting fixture to provide power management. Power management may be due to external power being interrupted, to improve energy efficiency, to provide cost savings, to reduce energy demand, and the like. The energy demand may be a peak energy demand, at predetermined times, at a time when new energy demand may be required at an energy provider, and the like. The control facility may utilize a control input from an input device, internal timer, internal clock, internal program to manage the power usage, and the like. The management of power usage may be through selection of the power source. The management of power usage may be through control of when a power source is charging. The management of power usage may be through the amount of load shared by the power sources.

In embodiments, the present invention may provide for power management of a lighting source, including providing a lighting facility, where the lighting facility may include the lighting source, an input device, an internal control facility, an energy storage device, a connection to external power, and the like. Sharing power usage between the external power and the energy storage device may be controlled by the internal control facility, where the internal control facility includes an intelligence capability that may utilize a resident program and information received through the input device in the sharing of power usage. In embodiments, the resident program may be stored on memory running on a processor in the internal control facility. Information received through the input device for power sharing may be processed in the internal control facility through dedicated circuitry. The lighting source may be an LED light. The external power may be external AC power. The external power may be external DC power. Sharing of power may be a partial sharing of power between the external power and the energy storage device, where both the external power and the energy storage device as a result of the information received are now supplying power. The input device may receive a program control input to alter the program, input from a remote control, input from a wireless network, input from a sensor, and the like. The input device may receive an external control signal, where a utility company, a networked software application, and the like may generate the external control signal. The external control signal may be communicated from at least one of wirelessly from a network, through the power lines, through a wired network connection, and the like. The energy storage device may be capable of supplying the source of power for the lighting facility to provide power management, where power management may be due to external power being interrupted, to improve energy efficiency, to provide cost savings, to reduce energy demand, and the like. The energy demand may be a peak energy demand, at predetermined times, at a time when new energy demand is required at an energy provider. The internal control facility may utilize a control input from an input device, internal timer, internal clock, internal program, and the like to manage the power usage. The management of power usage may be through selection of the power source, through control of when a power source is charging, through the amount of load shared by the power sources, and the like.

In embodiments containing the switch sense functionality, a method of calibration of the switch sense circuitry such that the one or more thresholds indicating one or more states of the controlling devices may be set manually or automatically through the method of calibration. In embodiments, the device containing the switch sense functionality may have a calibration mode that may be entered via a user interface that may consist of buttons, switches, dials, a wired programming interface such as a USB interface, a wireless programming interface such as an RF receiver, a predetermined sequence of actions after power is applied and the like. By way of an example, a device may contain a pushbutton for detecting the condition that would represent a closed switch and a pushbutton for detecting the condition that would represent an open switch. The user may turn the light switch to the closed position and push the on pushbutton on the device storing the "on" state, then the user may turn the light switch to the open position and push the off pushbutton on the device storing the "off" state. A microcontroller inside the device would store both levels and automatically set the threshold that would allow the microcontroller to detect one state or the other state given the electrical characteristics of the circuit in which the switch sensing device is installed. In some embodiments, an external device may be connected to a circuit to assist the switch sensing device in determining the thresholds that pertain to one or more states. In some embodiments, the external device may be temporary and may be removed after the calibration is completed. In some embodiments, the external device may be permanently installed and may be used in conjunction with the switch sensing device to monitor and adjust the thresholds as required by the application.

In another embodiment, a version of a wireless lighting module containing the switch sensing functionality with a connection to an external power source and containing a backup power source may target emergency lighting applications. In such embodiments, the switch sensing wireless lighting module uses the switch sense function to detect the state of a controlling switch and determine whether to use the backup power source or not. This may allow the wireless lighting module that is normally powered by the external power source to be turned on and off with the controlling switch however when the controlling switch is in the on position and external power is not applied to the wireless lighting module, the wireless lighting module may be able to power the device from a backup power source such as an embedded battery. By way of an example, a bathroom light, ceiling light, sconce, utility light, step light etc. with an AC power input, an embedded battery backup, switch sensing functionality and a light source may be designed such that they may switch to battery backup only when a controlling switch is detected as closed and AC power is not present at the light. In examples in which the light is installed in an area with little or no ambient light such as a windowless room, a user may be in the room with the light on when a power outage occurs and the light would remain on powered by the battery backup (ie if the light was on, it stays on during the disruption of power). In embodiments, the light source may be an LED, fluorescent, incandescent, halogen lights source or the like. The switch sensing wireless lighting module may be a dedicated light or a retrofit battery module may be added to a lighting fixture or device to make it a wireless lighting module with this capability. In some embodiments, an adapter could be used in a fixture to add this functionality to the fixture. In some embodiments, the switch sensing wireless lighting module may have multiple light levels. By way of an example, the switch sensing wireless lighting module may have a bright light level then after some period of time transition to a low light level to extend battery life. In some embodiments, the switch sensing wireless lighting module may be detachable. In some embodiments, the switch sensing wireless lighting module may have alternate forms of control like wireless control, for example sensors such as motion sensors, light sensors, RF or IR control and the like. The switch sensing wireless lighting module may be capable of any functionality of wireless lighting modules described herein.

In one use scenario of the switch sensing wireless lighting module, an LED bathroom light may be designed to mount to the ceiling in a bathroom. The LED bathroom light may be connected to a lighting circuit controlled by a wall switch that supplies AC power to the light. The LED bathroom light may contain an embedded rechargeable battery to provide an off grid power source and may contain a switch sense circuit to detect the state of the wall switch from the LED bathroom light. The LED bathroom light may contain a driver circuit to drive the LEDs from the AC power input, may contain a driver circuit to drive the LEDs from the embedded rechargeable battery and may contain a circuit to select between the two power sources. The LED bathroom light may contain a battery charging circuit and the circuitry to convert the AC power input to provide an input to the battery charging circuit. The LED bathroom light may contain a processor to intelligently control the function of the LED bathroom light. The light source in the LED bathroom light may be dimmable or capable of multiple illumination levels. In the case of a windowless bathroom, when a user is in the bathroom and the wall switch is in the on position and AC power is present, the light source will illuminate. When the wall switch is in the off position, the light will not be illuminated. In the case where the wall switch is in the on position and no AC power is present, the light will illuminate and will be powered by the embedded battery. Thus, if the user is in the bathroom and power goes out, the light will stay on. If the light is off and a user wants to go into the bathroom, they may turn the light on with the wall switch because the light may detect the change in the state of the switch and turn the light on powered by the embedded battery. In another use scenario of the switch sensing wireless lighting module, a fluorescent step light may be designed for applications to illuminate stair ways. In such a scenario, the architecture is similar to the LED bathroom light except the housing may target mounting to a stairway and the light source is fluorescent and therefore would require a ballast or the like to illuminate the fluorescent light source. In another use scenario of the switch sensing wireless lighting module, an equipment room light may be designed for applications in commercial office settings to illuminate equipment rooms in the case of a disruption of power. In an alternate use scenario of the switch sensing wireless lighting module, a retrofit LED fixture or lighting fixture may be designed for applications to illuminate the light source based on the state of a controlling switch as detected by the switch sense function. In the case of a retrofit LED fixture, the LED light source is illuminated and in the case of a lighting fixture, the light source integrated with or plugged into the fixture is illuminated.

In embodiments containing the switch sense functionality, the switch sense function may be used to determine when not to power a device. By way of an example, an electrical circuit powered by a battery inverter or backup generator may have essential and non-essential devices on the same circuit. All non-essential devices may not get powered during an outage allowing emergency power to have priority to certain devices. Thus, the battery inverter or backup generator may not need to have as large of an energy storage device due to the ability of end devices to shut down or enter a low power mode during the emergency situation. This allows the selection of a physically smaller, lower capacity, less expensive energy storage device. In some embodiments, there may be an additional device in the battery inverter, backup generator or on the electrical circuit such that the switch sense function in the end device may be able to detect when power is being provided by the backup power source. Therefore the switch sense function may implement a method to determine when the power source may be a primary power source and when the power source may be a secondary or backup power source and as such allow an end device configured as an essential or non-essential device to determine whether to draw power from the power source. In some embodiments, the switch sense function may be used to detect an outage to attach grid tie inverter to electrical circuit such that stored power may be used or returned to the grid during an outage.

In another embodiment, a version of the switch sense function may be embedded into a battery backed fluorescent ballast targeting emergency lighting applications. In such an embodiment, the switch sense circuitry may detect the state of a controlling device and change state based on the detected state as described herein. By way of an example, an electronic ballast in a CFL bulb may contain an embedded rechargeable battery and a switch sense circuit such that it may detect the state of a controlling device and power the light source from the rechargeable battery based on the detected state of the controlling device. In another example, a battery backed fluorescent ballast powering a fluorescent fixture may contain an embedded rechargeable battery and a switch sense circuit or module that may be used to power the fluorescent light source based on the state of controlling or external devices as detected by an embedded switch sense circuit or module.

In an alternate embodiment, a switch sensing battery inverter or switch sensing uninterruptable power supply may contain a switch sense circuit and be connected to an electrical circuit. Upon detecting a disruption in power on the electrical circuit and detecting that one or more controlling devices intend to apply power to the circuit ie the controlling devices are "turned on", the switch sense battery inverter may turn on and apply power to the electrical circuit until the disruption in power is over or until the one or more controlling devices are "turned off". Thus, a device with a backup power source may be connected to an electrical circuit with one or more controlling devices, it may detect a disruption in power and the state of controlling devices and apply power to the electrical circuit based on the detected state. By way of an example, a switch sensing battery inverter may be plug into an AC outlet and monitor the state of the circuit. In a case where the detected state of the circuit requires the battery inverter to apply power to the circuit, it may apply power to the circuit to power electrical devices on the circuit. The electrical devices may include lighting devices, computers, servers, network equipment, storage devices, appliances, cordless phones, televisions, television peripherals, security cameras, security systems and equipment, alarm clocks, electric or hybrid vehicles, electric motors, portable generators and backup power sources, industrial and manufacturing machinery and the like.

In embodiments of the switch sense module, a module may be designed to mount at a junction box to provide backup power source and switch sense control of a lighting or electrical circuit. In one embodiment, a switch sense junction box module may contain a battery and a switch sense circuit. In an example, a switch sense junction box module may have a connection to AC power with wires after a controlling device (AC switched hot) and a return line (AC neutral). The switch sense junction box module may be able to detect the state of the controlling switch using the switch sense circuit and switch to the backup power source. In an alternate embodiment, a junction box module may provide a backup power source and has a connection to AC power with wires before a controlling device (AC unswitched hot), after a controlling device (AC switched hot) and a return line (AC neutral). When the junction box module detects that power is not present before the controlling device, the junction box module may power the devices on the electrical circuit from the backup power source. In some embodiments, the junction box module may contain a switch sense circuit such that it may detect whether the controlling device intends for the devices on the circuit to be powered and may not apply power to the circuit.

In embodiments containing the switch sense functionality controlling lighting devices, the controlling device may be a triac based. In such an embodiment, the triac may be used for dimming the light source from full intensity to no illumination. In the case where there is no illumination, the switch sensing device may still sense that the switch is closed some small amount of power may be applied to the circuit therefore the light may be seen as off to the user however the switch sensing device may still detect the switch as closed. In such an embodiment, the controlling device appears always on to the switch sensing device however no power is applied to the circuit. When there is a power outage, the switch sense device may continue to detect the switch as closed but power will no longer be applied to the circuit. A system constructed using triac based control allows the system to be placed in an "always on" state that the switch sense module may detect but the lighting devices on the circuit may not be illuminated so the light source would be off. It would also allow the end device to detect when the switch is on but no power is applied because there would no longer be any power applied to the circuit in the form of a chopped waveform that would be typical of triac control. Thus, the switch sense device may detect four states—ON with illuminated, ON with no illumination, ON with no or a small amount of power and off without a need for a direct indication of the state of power prior to the one or more controlling devices.

In embodiments containing the switch sense functionality, a system may be created where a single switch sensing device including a wireless transmitter may detect the state of the controlling devices and wirelessly transmit to one or more end devices the state of the switch. In such embodiments, a switch sensing circuit may be required only in the one or more switch sensing devices and end devices would receive the information about the sensed switch state via a wireless receiver. By way of an example, one or more LED retrofit fixtures may contain an alternate power source and a wireless receiver. When an external switch sensing device detects that the controlling switch is closed and there is no power present, the switch sensing device may transmit a message to the one or more LED retrofit fixtures with a command for them to switch over to the alternate power source. The external switch sensing device may be programmable such that the change of state based on the state of the controlling circuit detected by the switch sensing device may be programmed by a user.

In embodiments containing the switch sense functionality, switch sense circuitry may detect when a device has been removed from an electrical connection to power for any purpose that such detection may be useful. In the case that a device has an internal power source, detection that the device has been removed from an outlet may cause an automatic switchover to an internal power source. By way of an example, a power outage detector with an embedded light source and a transmitter is plugged into an AC outlet to control remote wireless lighting modules when the power outage detector detects there is a disruption of power. During a disruption of power, the power outage detector may illuminate its light source and wirelessly transmit control to wireless lighting modules to illuminate also. The power outage detector may be removable from the outlet and in such a case embedded switch sense functionality may determine that it is not an outage but rather that the power outage device is no longer connected to the AC outlet. In such a case, the power outage device may not turn on or transmit to the remote wireless lighting modules because an outage has not been detected but rather the user intended to remove the power outage module perhaps to use the power outage detector as a light source like a flashlight or to remotely control the light sources. In alternate embodiments, the power outage detector may have a method to disable the transmitting mode that may indicate an emergency when the power outage detector is removed. By way of an example, a user may push the OFF button that controls the remote lights signaling to the power outage detector that it is in flashlight mode. The user may have five seconds to remove the power outage detector from the wall such that the removal will not be seen as a disruption in power (ie the power outage detector will be in flashlight mode and the remote lights will not be turned on). In an alternate embodiment, the switch sense circuitry is replaced on the power outage detector by a physical switch that is open or closed when the power outage detector is plugged into an outlet or is removed from the outlet. Intelligence built into the power outage detector to detect the state of the switch and determine whether the power outage detector is plugged in or not. In one embodiment, a device has retractable blades and the device may detect when the blades are retracted. By way of another example, the switch sense circuit is built into a wall transformer that contains an internal power source. When the wall transformer is removed from the wall, a decision may be made based on the state of the switch sense circuit to use the internal power source. It is to be appreciated that the switch sense functionality or other detection methods may be built into any electrical device that may need to determine whether the electrical device is physically connected to a power source. In electrical devices containing the switch sense functionality that also have an internal power source, the electrical devices may automatically switch over to the internal power source when the removed from its connection to an AC outlet, AC power source, DC power source or any other type of power connection.

In embodiments of the switch sense functionality, an external switch sensing light socket adapter may be designed with a light source, embedded batteries to power the light source, a pass through of power to power a light source plugged into the adapter and switch sense functionality to determine when to illuminate the light source of the adapter. The external switch sensing light socket adapter can be designed as an adapter for any type of socket to provide the described functionality for any of the plurality of bulb types mentioned herein. By way of an example, an adapter plugs into an Edison socket and also has an Edison socket that accepts an A19 type bulb or the like. An incandescent, compact fluorescent, LED type light bulb or the like may plug into the socket adapter. The adapter may contain on its housing an LED light source or the like that may be illuminated during a disruption in power and the detection by switch sense that the switch is closed (ie that the user intended the light to be on). The socket adapter may contain embedded rechargeable or non-rechargeable batteries, the circuitry to switch over to the embedded batteries, an AC/DC and a DC/AC inverter or DC/DC converter, a charging circuit to charge the embedded batteries, and the intelligence to implement a switchover between external power and backup power to power the light source of the adapter. The switch sense function may work in any method mentioned herein to illuminate the light source of the adapter based on the sense of the switch or other external conditions as detected by the adapter.

In some embodiments, a Switch Sense Lighting Module may be designed to be integrated with or installed on the same circuit with other devices that may desire to have the switch sensing functionality implemented in parallel to them to detect the state of a controlling switch or device remotely and the Switch Sense Lighting Module may illuminate independent of the state of those devices based on the state of the switch and power on the circuit. The Switch Sense Lighting Module may be a module that contains a light source, a driver for the light source, a connection to the power circuit, an embedded power source and the ability to sense the state of one or more controlling devices. The module may be integrated into or connected to any device or electrical circuit and may be required to detect the state of one or more controlling switches or devices and illuminate during a disruption in power. In some embodiments, the Switch Sense Lighting Module may be designed to be integrated with lights, light bulbs, light fixtures, fixtures, troffers, lamp bases, ballasts, lighting power supplies, lighting control devices and the like that may desire to have a separate device detect a disruption of power and illuminate during the detected disruption of power. In some embodiments the Switch Sense Lighting Module may be designed as a standalone lighting fixture that may be connected to an electrical or lighting circuit. In some embodiments, the Switch Sense Lighting Module may include an enclosure and have a mounting mechanism to allow it to be physically integrated with another device. The housing may have a design that allows the light source of the Switch Sense Lighting Module to illuminate an area. In some embodiments the module may be removable and replaceable. In some embodiments, the module may contain an integrated power source such as a rechargeable battery. In some embodiments, the module may receive power from the external device or circuit. In some embodiments, the module may have a connection to input power that is controlled by the one or more switches or devices of which the Switch Sense Lighting Module may need to detect the state. In some embodiments the module may be an electrical circuit on a printed circuit board or the like that may be integrated into another device. By way of an example, a Switch Sense Lighting Module may be used to detect the state of an on/off wall switch controlling power to an Edison socket with a light bulb plugged in. The light bulb that may be plugged in is an LED light bulb. The Switch Sense Lighting Module consists of a printed circuit board with four connections, an embedded power source and a light source. Two connections are made to the AC power input. Two connections are made to local rechargeable battery power. The light source of the Switch Sense Lighting Module is positioned to illuminate the desired area during a detected disruption of power. The Switch Sense Lighting Module may be integrated with the LED light bulb. If the switch is detected as closed as detected by the Switch Sense Lighting Module and provided at the control connection and AC power is not present at the input, the Switch Sense Lighting Module may illuminate its light source. It is to be appreciated that the control connection may be one or more lines and may use any method required to indicated the state of the controlling switches or devices that the Switch Sense Lighting Module is monitoring.

In systems containing devices with an embedded power source on an electrical circuit such as grid shifting systems or battery backup systems, an intelligent charging device may be designed to apply power to the electrical circuit for the purpose of charging the embedded power sources. In such a case, the grid shifting or battery backed up devices may be able to detect when the intelligent charging device is in charging mode and when the operation is based on the controlling devices passing power through onto the electrical circuit for normal operation. In some embodiments, switch sense functionality in end devices may be used to determine whether the applied power is for normal operation or for charging mode. By way of an example, a wall switch controlling an electrical circuit may contain a relay in parallel with the controlling device such that intelligence in the wall switch may apply power to the electrical circuit independent of the state of the controlling device (ie in parallel to the controlling device). In the example, the intelligence in the wall switch may use a timer or time of day clock to allow power to be applied to one or more electrical devices for the purposes of charging the battery based on time of day or some other timing mechanism when the user does not intend to power the electrical devices from the external power source for normal operation. In some embodiments, the intelligent charging device may use one or more sensors to determine whether to enter charge mode. By way of an example, a motion sensor may detect occupancy in a room. When no motion has been detected for a period of time, the intelligent charging device may enter charge mode. If motion is detected, the intelligent charging device may exit charge mode and the electrical devices may enter normal operation. In this example, if the electrical devices are lighting devices or lighting fixtures, there may be multiple levels of illumination such that when in charge mode, the illumination level is at a lower level where some of the power delivered may be diverted to charge the embedded power source however when the lights enter normal operation (for example, when motion is detected) the lights set the illumination level to a higher level. In embodiments, the intelligent charging device may close a switch automatically at certain times when the electrical devices may be charging. In some embodiments, the intelligent charging device may monitor current to the circuit to determine if the electrical devices are charging or the rate at which they are charging. In some embodiments, the intelligent charging device may use wired or wireless communication to the electrical devices to communicate whether it is in charging mode or normal operation mode. By way of an example, the intelligent charging device may use a power line communication method to communicate the mode of operation to end devices on an electrical circuit. In some embodiment, the intelligent charging device may provide a mechanism that may be detected by a switch sense circuit such that the switch sense circuit may know that the intelligent charging device is in charging mode and as such not enter its normal operating mode but rather enter a charging mode. By way of an example, the intelligent charging device may insert some impedance based on the charge mode approach that the switch sense circuit may detect as a third state that indicates charging mode. In alternate embodiments, the intelligent charging device may periodically switch to charging mode when it detects that the wall switch is turned to the off position. The intelligent charging device may learn over time typical times when the intelligent charging device may be in the off position and create a schedule of charging times. In alternate embodiments, the functionality may be implemented by a controlling device and integrated circuitry or a module into the controlling device to implement the same functionality as the intelligent charging device. In such embodiments, an existing controlling device may be retrofit with the integrated circuitry or module to allow it to provide the same or similar functionality as the intelligent charging device In one illustrative example, a grid shifting lighting system may be developed controlled by an intelligent charging device such that batteries embedded in the lights may be charged during times when the user intended the lights to be turned off. In this example, the intelligent charging device may charge the embedded batteries by applying power to the circuit but the lights may be placed in charging mode by wired communication, wireless communication or a switch sensing mechanism and remain off during charging mode.

In embodiments of grid shifting systems, an intelligent grid shifting controller may control charging of embedded power sources and control the use of external and embedded power sources. In embodiments, the intelligent grid shifting controller may contain all of the functionality of the intelligent charging device but may communicate to the end devices the use of the external and embedded power sources. The intelligent grid shifting controller may communicate to the grid shifting end devices when to use the external power source, when to use the embedded power source and when to use both power sources sharing the load. The method of communication may be by wired connection over a power distribution network, for example on the AC power lines (X10, INSTEON, Broadband over Power Lines, proprietary communication scheme etc), or wirelessly through a wireless interface (dedicated RF communication link, ZIGBEE, WIFI, ENOCEAN, BLUETOOTH etc).

In embodiments of battery backed ballasts for fluorescent lighting or battery backed LED driver modules, a ballast or driver module may contain a light source or be able to drive a separate light source in the event that a disruption in power is detected. In these embodiments, the light source may be embedded on the housing of the ballast or driver module or the light source may be in a separate housing that may mount in a location to illuminate an area during a disruption of power. In some embodiments, during a disruption of power the ballast or driver module may drive both the separate light source and the primary light source deriving power from the embedded battery. In some embodiments, during a disruption of power the ballast or driver module may drive only the separate light source deriving power from the embedded battery. By way of an example, a battery backed ballast for fluorescent lighting may mount above a drop ceiling and a separate light source may be mounted in a location nearby to illuminate an area during a disruption in power. The battery backed ballast may have a connection to the separate light source to power it from the embedded battery during a power disruption. In such a use case, a battery backed ballast may power both fluorescent lighting and a separate emergency light during an emergency. In an alternate use case, a battery backed ballast may power only the separate emergency light. In this use case, a separate emergency light may have lower power requirements and thus may require a smaller battery reducing the size and cost. In another use case a light source built into the housing for the ballast or driver module may allow the ballast or driver module to act as the emergency light source. By way of an example, the housing may have an LED light source and a method to mount the housing to a drop ceiling such that the housing and LED light source may be positioned to illuminate an area during a disruption of power.

In embodiments of grid shifting systems, the amount of power to shift to an internal power source may be communicated to an end device using a triac or similar device to create a chopped waveform such that the amount of power that comes from the external power source and the amount of power supplied by an internal power source may be provided in proportion to the chopped waveform. In such embodiments, a controlling device may contain a triac or similar device and may be configured to control the waveform such that an end device powered on the circuit may process the waveform and control the amount of power delivered to an end device based on the input power waveform. By way of an example, a triac based dimmer switch that is used to typically control the light intensity level of a light source may be used to control the amount of power shifted to the internal power source. In such an example, a variable resistor may be used to control how much power is drawn from the line. In some embodiments, the end device may need to be designed such that it may use the chopped waveform to manage the amount of power supplied by the external and internal power sources based on the external power waveform. In alternate embodiments, the controller device may use any known method to manipulate or modulate the waveform to communicate the amount of power to shift to the internal power supply. In some embodiments, an intelligent triac based grid shifting controller with the capability of chopping the waveform may be used to control the amount of power shifted to the internal power source. The intelligent triac based grid shifting controller may receive communication from an external device to configure or program the controller. The method of communication may be by wired connection over a power distribution network, for example on the AC power lines (X10, INSTEON, Broadband over Power Lines, proprietary communication scheme etc), or wirelessly through a wireless interface (dedicated RF communication link, ZIGBEE, WIFI, ENOCEAN, BLUETOOTH etc). In some embodiments, the intelligent triac based grid shifting controller may allow direct input through a keypad, LCD screen, computer connected through a USB interface etc and may be programmed to implement the communication to the end device to perform grid shifting. In embodiments, the functionality may be pre-programmed, factory set, designed in a custom electrical circuit or the like to respond to sensor inputs and a pre-programmed algorithm to implement the grid shifting function. The sensors may include a light sensor, motion sensor, an atomic clock or time receiver, temperature sensor or any other sensor mentioned herein that may allow the grid shifting function to meet the requirements of an application. In some embodiments, the grid shifting function is performed based on an intelligent program internally. The intelligent program may contain a real time clock that may be set by the user such that the intelligent program may use time of day or a calendar to perform the grid shifting functionality. The grid shifting function may be used for cost savings, energy efficiency, convenience, safety/security and the like. The controller may have switches, dials, knobs etc to set time of day or sensor thresholds such that a user may be able to control how the intelligent program manages the grid shifting. Once set, the controller may act autonomously based on those settings and/or the pre-programmed or designed function. The settings may be changed on occasion by the user. In alternate embodiments where the external power source is a DC power source, a controlling device may use pulse width modulation, amplitude modulation and the like to communicate to a DC powered end device the amount of power to shift to an embedded power source. In an example of a triac controlled grid shifting system, the end device may be a lighting device with an internal power source and the controller may be a wall switch with a triac as well as some intelligence built in. The controller may be programmed to shift some amount of power to the internal power source during daytime hours for cost savings. In another lighting example, the controller may receive a command from an external device to implement a demand response function where the controller may chop the waveform and shift an amount of power delivered to the end device to the internal power source such that the amount of power drawn from the external power source may be reduced however the light intensity may be maintained because the difference in power consumed from the external power source may be transferred to the internal power source.

In an alternate embodiment, a triac chopped waveform may indicate amount of power to transition to an internal power supply such as a rechargeable battery for grid shifting. A partial inverter grid shifting device may be designed that rebuilds an AC waveform from the triac chopped version such that a connected AC powered end device sees a clean AC waveform for its input power. Thus, the input to the partial inverter grid shifting device may be from no waveform to a full waveform with any chopped waveform in between however the partial inverter grid shifting device may use the internal rechargeable battery converted from DC to AC and combined with the input waveform to output a waveform similar to a full AC waveform. A partial inverter grid shifting system would allow a sharing of power between the external power supply and power stored in the rechargeable battery. In alternate embodiments, the input waveform is a full AC waveform and the partial inverter grid shifting device combine the input from the input power supply and the internal power supply to shift some amount of power to the external device to be provided by the internal power supply. The amount of power supplied by the internal power source may lower the amount of power required from the input power source. In some embodiments, a method may be included in an inverter design that phase aligns the DC to AC waveform generated from the internal power source with the waveform of the input power source. By way of an example, the design may include a phase locked loop to synchronize with the input waveform such that the internally generated waveform may be generated to have a similar cycle as the input waveform. The phase alignment may be used to combine the two power sources to create the output power using relays, solid state switches and the like such that intelligence in the device may control one or more relays or switches to select the source of power. In one embodiment, the opening and closing of the relays to select the power source may be done in proportion to the amount of power that may be needed to be supplied from the input source or the internal power source. By way of an example, a processor may be programmed to provide 40% of the power from the internal power source. In this example, the processor may control a relay (for example a change over relay) such that the input power source may be selected by closing the relay on its connection to the external power path for 60% of the cycle and the internal power source may be connected to the external power path for 40% of the cycle. In an alternate example, the power source may be time division multiplexing between the two power sources on larger timer intervals. By way of an example, the input power source may be connected to the end device for 6 seconds then the internal power source may be connected to the end device for 4 seconds to implement a 60/40 sharing of power. In some embodiments, the input power source may be DC and in such a case the input power source and internal power supply may be combined using a method described herein (diode oring, PWM using FETs to or power sources, controlling solid state switches or relays etc) to shift power to the internal power supply.

In embodiments using a triac to control the amount of power to shift to an internal power source, the device may contain an AC/DC converter that may take a chopped waveform and convert it to DC power to provide a power source to charge rechargeable batteries in the device. Thus, a chopped waveform may be used to deliver some amount of power to a battery charging circuit to increase the charge of the rechargeable batteries. In some embodiments, the battery charging circuit may adjust the charge rate based on the input waveform.

In embodiment of grid shifting lighting devices or lighting devices dedicated to lighting, the lighting device may implement a sharing or shifting of power between the external power supply and power stored in an internal power source such as a rechargeable battery using a processor and relays, solid state switches and the like such that the processor may control one or more relays or switches to select the source of power to implement a time division multiplexing to set the amount of power used from the input power source and from the internal power source. In one embodiment, the opening and closing of the relays to select the power source may be done to in proportion to the amount of power that may be needed to be supplied from the input source or the internal power source. By way of an example, a processor may be programmed to provide 25% of the power from the internal power source for the purpose of reducing the demand from the grid during peak times but to maintain the same intensity level of the lighting devices. In this example, the processor may control a relay (for example a change over relay) such that the external power supply may be selected by closing the relay on its connection to the external power path for 75% of an interval of time and the internal power source may be connected to the external power path for 25% of an interval of time. In some examples, the power source may be time division multiplexing between the two power sources on larger intervals of time. By way of an example, the external power supply may be connected to illuminate the light source for 7.5 seconds then the internal power source may be connected to the end device for 2.5 seconds to implement a 75/25 sharing of power. In some embodiments, the external power supply may be AC power or DC power. In some embodiments, the external power source may be AC power but the power sharing may be implemented after an AC to DC conversion. In some embodiments, the external power supply and internal power supply may be combined using a method described herein (diode oring, PWM using FETs to or power sources, controlling solid state switches or relays etc) to shift power to the internal power supply. In some embodiments, the switchover between power sources may be in response to an outage of power or a low capacity level detected on one of the power supplies. By way of an example, the lighting device may detect a disruption in the external power supply and switch one or more relays to connect power from the internal power source to the load to be driven.

In some embodiments of grid shifting lighting devices, the device may monitor the amount of power consumed from the external power supply and adjust the amount of power supplied from the internal power supply to set the amount of power consumed from each source. In these embodiments, an algorithm may be implemented to manage the power delivered by each of the power sources. By way of an example, an algorithm may be implemented to increase the amount of power supplied by the internal power source in steps monitoring the reduction in power from the external power supply to determine that the desired level of sharing of power between the two sources is achieved. In some examples, the algorithm may be such that a set power consumption level from the external power supply may be desired and power supplied from the internal power source may be adjusted until that level of power consumed from the external power supply is measured at the desired level.

In some embodiments of battery backed devices, a current measurement on an AC power line may be made using magnetic induction. A magnetic induction device consisting of a large conductor with some number of turns may be wrapped around the conductor of the AC power source. The magnetic induction device may have a method to communicate the amount of power to devices such as emergency lighting devices, grid shifting devices and the like to allow those devices to make change state based on the measured power.

In an embodiment of a grid shifting lighting system, a system consisting of one or more lighting devices such as bulbs or fixtures and a grid shifting management device with an integrated power source that may power the one or more lighting devices. The grid shifting management device may have an external power supply such as an AC power source, a DC power source, a method of energy harvesting and the like for providing a source of power to the lighting devices or to recharge the integrated power source. The grid shifting management device may contain a processor for power management and shifting power between an external power supply and integrated power source for the purposes of energy efficiency, demand response applications, peak shedding, load control, load leveling, backup power, local power generation and storage or any other use of a hybrid power system mentioned herein. In some embodiments, the integrate power source may not be in the grid shifting management device but may be distributed into the lighting devices where the grid shifting management device may perform power management and conversion functions with the external power supply and may communicate with the lighting devices to manage the grid shifting operation. In some embodiments, a processor in the grid shifting management device may actively manage grid shifting in the lighting devices. In alternate embodiments, the lighting devices may contain a processor and when configured or programmed may implement grid shifting functions. In such embodiments, the grid shifting management device may provide the configuration or programming. The lighting devices may receive configuration or programming from another source such as an external control source such as a lighting control network. The lighting devices may have the ability to alter their configuration based on power consumption, sensor inputs or the like such that a change in the grid shifting function may be initiated by the lighting device in response to an input. By way of an example, a group of lighting devices may be DC powered lighting devices such as LED light fixtures. A grid shifting wall switch or controller may contain an AC/DC converter with the LED driver circuit capable of driving the light sources with the proper current and voltage as required by the light sources and fixtures. In alternate embodiments, the grid shifting wall switch or controller may contain an AC/DC converter and supply a DC voltage to the light sources and fixtures which may contain the LED driver circuits for the light sources. It is to be appreciated that any type of light source and associated driver circuit may be used with the present invention. The grid shifting wall switch or controller may have integrated or may have an external connection to a energy storage device such as a rechargeable battery that may be used for grid shifting purposes. The grid shifting wall switch or controller may be capable of managing power to use the energy storage device and external power source to implement grid shifting for the purposes of energy efficiency, demand response applications, peak shedding, load control, load leveling, backup power, local power generation and storage or any other use of a hybrid power system mentioned herein. In another example, the lighting devices contain an energy storage device and may recharge or use the energy storage device for grid shifting purposes. In this example, the lighting devices may require a constant current of a certain level. The grid shifting wall switch or controller may initiate a shift to the energy storage device by reducing the amount of current supplied. A lighting device may detect the change and automatically begin to source the amount of current from its energy storage device to maintain the drive to the light source at the required level. It is to be appreciated that the grid shifting wall switch or controller may change any characteristic of the power supplied to the lighting devices or may use any other method of communication mentioned herein to alter the management of power at the lighting devices to implement grid shifting. In alternate embodiments, the end device may not be a lighting device but may be any type of electrical device that may benefit from the grid shifting function described herein.

An embodiment of grid shifting lighting devices or lighting devices with an emergency lighting capability may be a street light, street lamp or street light fixture with an internal power source such as a rechargeable battery that is capable of using the internal power source for grid shifting or emergency lighting purposes. The light source may be fluorescent, LED, HID, incandescent or any known lights source. In some embodiments, a replacement bulb that fits into a street light fixture may allow the fixture to be retrofit with grid shifting or emergency lighting functions. In some embodiments, the street light, street lamp or street light fixture that can grid shift may contain a grid tie inverter to return power to local devices or to the grid. In some embodiments, the street light, street lamp or street light fixture may have a connection to one or more external power sources, may have a connection to one or more energy harvesting power source such as solar, wind and the like and may have a connection to an external energy storage device in addition to or instead of an internal energy storage device. In some embodiments, the street light, street lamp or street light fixture may be controlled by RF or IR control, sensor control or any form of wireless control mentioned herein. By way of an example, a light sensor may be used for daylight harvesting for the purposes of changing the light intensity to conserve power based on the amount of ambient light detected. In another example, a motion sensor may be used to turn the light or change the light level if multiple light levels are implemented. In some embodiments, a coordinated lighting function may be implemented where any form of wireless control in one street light, street lamp or street light fixture may be propagated over a wired or wireless network to a group of street lights, street lamps or street light fixtures such that the group may be controlled in a coordinated manner. By way of an example, a motion sensor triggered in one street lamp may transmit a message to a group of street lamps to turn on even though the other members of the group do not directly detect the motion.

In an embodiment, a battery backed power supply module provide a backup power source and has a connection to AC power which may include wires before a controlling device (AC unswitched hot), after a controlling device (AC switched hot) and a return line (AC neutral) such that the module may be designed to plug into a relay control panel supplying power to lighting or electrical devices. When the battery backed power supply relay module detects that power is not present, the battery backed power supply relay module may power the devices on the circuit from the backup power source. In some embodiments, the battery backed power supply relay module may contain a switch sense circuit such that it may detect whether the controlling device intends for the devices on the circuit to be powered and may not apply power to the circuit. In alternate embodiments, the battery backed power supply relay module may be dedicated to grid switching functions and as such may be used for the purposes of energy efficiency, demand response applications, peak shedding, load control, load leveling, backup power, local power generation and storage or any other use of a hybrid power system mentioned herein.

In embodiments, a power outage controller may be designed such that power may only be supplied to certain devices that require power during a disruption of power. In the embodiment, an electrical circuit may contain devices that may be considered essential during a disruption of power and other devices that may be considered non-essential during a disruption of power. In such an embodiment, power may be applied to the electrical circuit however an alternate mechanism of control may be used to allow essential devices to be powered and non-essential device to not be powered during the disruption in power. By way of an example, a switch sense function may be used to detect from a controlling switch whether a device may be powered. Essential devices may detect control that determines that they should be powered and non-essential devices may detect control that determines that they should not be powered. In another example, any form of wired or wireless communication described herein may communicate to the end devices from the controlling switch or any other device which device may be powered and which devices may not be powered during a disruption in power.

In embodiments where emergency power may be provided during a disruption of power, an alternate form of control may be present to override automatic switchover or to allow another form of control in cases where it is not desirable to run off of the backup power source or where it is desirable to run off of the backup power source. By way of an example, a user may desire to turn the battery backed lighting off but does not want the lighting to switchover to battery power. In such an example, the user may have a remote control that may allow the user to control the power source, light source to illuminate, illumination level and the like.

In embodiments, an LED down light may be designed with a night light mode that may allow the light to be set to one or more light levels. The change in illumination level may be timer based, based one or more integrated sensors, may be programmable and the like. In embodiments where the LED down light contains a battery power source, power from the battery may be dimmed using a method such as PWM control or the like or a reduced LED chain may be driven. In alternate embodiments, a battery module with a programmable nightlight mode may be designed into any type of lighting device. In such embodiments, an OFF—ON sequence or a change in a sensor input may take it out of nightlight mode. In an alternate embodiment, a battery embedded sensor module that may be ceiling mount, wall mount, floor mount and the like containing an integrated power source may be designed in a housing such that external power may be wired into the battery embedded sensor module then from the sensor module to an electrical circuit. The battery embedded sensor module may control and power any lighting or electrical devices on the electrical circuit. In some embodiments, the battery embedded sensor module may contain a relay or the like to allow a processor or the like to turn on and off a light source. In some embodiments, the battery embedded sensor module may contain a triac or similar to control the light intensity of the light source. In some embodiments, the battery embedded sensor module may contain the capability to control color of the light source. It is to be appreciated that the battery embedded sensor module may contain any of the function mentioned herein. By way of an example, a motion sensor and a light sensor may be contained in the module. Based on motion or light detected, the battery embedded sensor module may control the lighting or electrical devices.

In embodiments of the switch sense function, a switch sensing device may be able to determine the difference between a disruption in power based on an open switch and a disruption of power based on a power outage from the grid. Upon detecting a difference the switch sensing device may generate an alarm or transmit a notification of an outage. By way of an example, an electric utility may desire to determine if a power outage is due to a break in the wiring between an end user or an open switch and the secondary coil of the transformer that connects the user to the electric grid. If the electric utility may determine that the outage is before the transformer, they may be able to isolate the source of the disruption more quickly. In another example, an intruder may disconnect power to a residence or commercial building to disable a security system, security cameras or an alarm system. A switch sensing device wired to the electrical distribution intended to be always on may detect the disruption and generate an alarm but in an alternate case when the power outage may be determined to be from a disruption of power from the electric company, the switch sense device may generate no alarm or a different alarm. In an alternate embodiment, the switch sense module may contain a transmitter and turn on battery power wireless lighting fixtures during the outage. In an alternate embodiment, the switch sense module may send a text message or email via a data connection to provide an alert and the details on the detected state.

Referring to FIG. 90, the present invention may provide a grid shifting electrical fixture 9002 which may contain a processor 9008 and an energy storage device 9004 such as a battery and a connection to external power that is delivered through a grid shifting controller 9010, where the processor 9012 provides intelligent control of the grid shifting electrical fixture 9002 for the purposes of energy efficiency, demand response applications, peak shedding, load control, load leveling, backup power, local power generation and storage or any other use of a hybrid power system mentioned herein. In embodiments, processor 9008 and processor 9012 may include a microprocessor, a microcomputer, a digital logic circuit, an analog circuit, and the like. In the case where the processor contains a computing device, software for the computing device may fixed at the factory, updated though an external interface to the processor (e.g. though a wired or wireless connection), and the like. Processor 9008 and/or processor 9012 may make decisions on when and how to recharge the energy storage device, when the grid shifting electrical fixture 9002 should shift or share power, why to shift or share power and how much power should be shifted or shared between the power sources. There may be a wired or wireless communication channel between processor 9008 and processor 9012 for control, status, programming, configuration and the like. In some embodiments, the grid shifting electrical fixture 9002 may be a lighting fixture and as such the power source and light source may be managed by processor 9008 and processor 9012 to implement a grid shifting lighting fixture 9002 containing the energy storage device 9004. In some embodiments, the energy storage device and a controller or processor may be external to the grid shifting electrical fixture 9002.

Referring to FIG. 91, the present invention may provide a grid shifting electrical fixture 9102 which may contain a processor 9108 and a connection to external power that is delivered through a grid shifting controller 9110, where there may be an energy storage device 9104 such as a battery and a processor 9112 that provides intelligent control of the grid shifting electrical fixture 9102 for the purposes of energy efficiency, demand response applications, peak shedding, load control, load leveling, backup power, local power generation and storage or any other use of a hybrid power system mentioned herein. In embodiments, processor 9108 and processor 9112 may include a microprocessor, a microcomputer, a digital logic circuit, an analog circuit, and the like. In the case where the processor contains a computing device, software for the computing device may fixed at the factory, updated though an external interface to the processor (e.g. though a wired or wireless connection), and the like. Processor 9108 and/or processor 9112 may make decisions on when and how to recharge the energy storage device 9104, when the grid shifting electrical fixture 9102 should shift or share power, why to shift or share power and how much power should be shifted or shared between the power sources. There may be a wired or wireless communication channel between processor 9108 and processor 9112 for control, status, programming, configuration and the like. In some embodiments, the grid shifting electrical fixture 9102 may be a lighting fixture and as such the power source and light source may be managed by processor 9108 and processor 9112 to implement a grid shifting lighting system with the grid shifting controller containing the energy storage device 9104. In some embodiments, the energy storage device and a controller or processor may be external to the grid shifting controller 9110. In some embodiments, the grid shifting electrical fixture 9102 may not contain a processor and the grid shifting function may be implemented by the gird shifting controller 9110 for one or more electrical fixture devices on the circuit managed by the controller.

Figure 92:
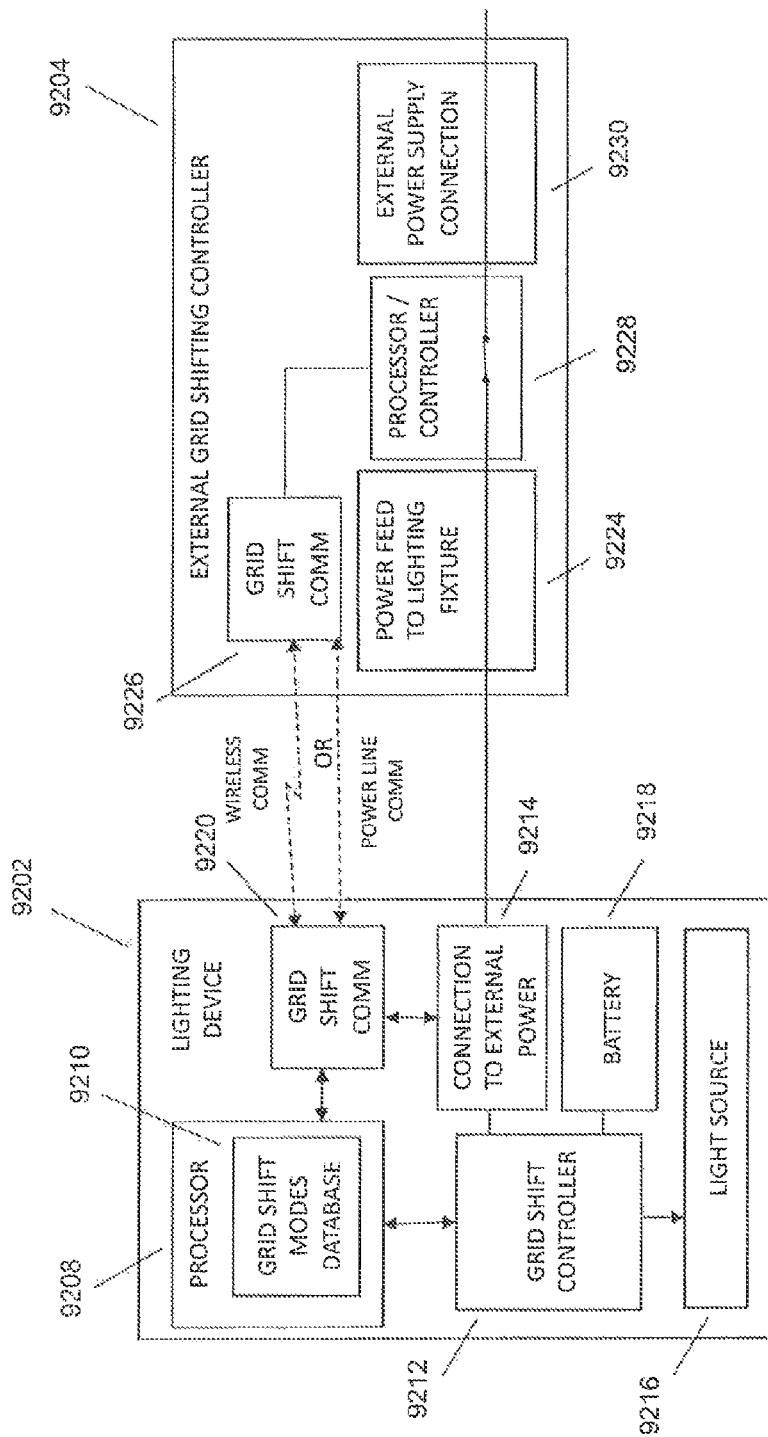
FIG. 92 shows a block diagram of a grid shifting system for lighting devices with an energy storage device in the lighting device.

Referring to FIG. 92, the present invention may provide for grid shifting for one or more lighting devices 9202 and an external grid shifting controller 9204, where the lighting device 9202 may include a processor 9208 with a lighting modes database 9210, a grid shift controller 9212, a power connection to external power 9214, a light source 9216, an internal power source such as a battery 9218, grid shifting communication 9222 and the like and where the external grid shifting controller 9204 may include a power feed to the lighting fixture 9224, grid shifting communication 9226, a processor/controller 9228, a connection to an external power supply 9230, and the like. In embodiments, the lighting device 9202 may use the battery for the purposes of energy efficiency, demand response applications, peak shedding, load control, load leveling, backup power, local power generation and storage or any other use of a hybrid power system mentioned herein and as a result, determine whether to power the lighting device 9202 using the power connection to external power 9214, use the battery 9218 or use some amount of power consumed from both sources. In embodiments, the processor 9208 may include a microprocessor, a microcomputer, a digital logic circuit, an analog circuit, and the like. In the case where the processor contains a computing device, software for the computing device may fixed at the factory, updated though an external interface to the processor (e.g. though a wired or wireless connection), and the like. The processor 9208 may have access to a lighting mode database 9210 that may contain information pertaining to controlling the light source, power management to implement the grid shifting function, use of embedded sensors, wired or wireless interfaces and the like. In embodiments, the grid shift controller 9212 may implement the sharing or shifting of power of the two power sources that may be combined using a method described herein (diode oring, PWM using FETs to or power sources, controlling solid state switches or relays etc). The power connection to external power 9214 may be AC power, DC power or the like. The light source 9216 may be fluorescent, LED, HID, incandescent or any known lights source. The light source 9216 may be integrated into the same housing as the remaining components of the lighting device or may be removable and replaceable like a light bulb. Grid shift communication 9222 may allow the external grid shifting controller 9204 to communicate with the lighting device

9208 to communicate grid shifting operation to the lighting devices, program or configure the processor 9208 or grid shift controller 9212, manage recharging the battery 9218, gather status and the like. The external grid shifting controller 9204 may allow for the control of the grid shifting system by allowing parameters of grid shifting to be entered such that the processor/controller 9228 may make decisions on when and how to recharge the battery 9218, when the lighting device 9202 should shift or share power, why to shift or share power and how much power should be shifted or shared between the power sources. The decision may be based on programming, configuration, external control, sensor inputs, monitoring of power consumption and the like. By way of an example, the external grid shifting controller 9204 may be a control panel that allows user input to program grid shifting operation. The processor/controller 9228 may contain a real time clock that may allow the user to enter times of the day when the external grid shift controller may enter charge mode by communicating to the lighting devices 9202 that they are entering a mode where the battery 9218 is charged but the light source 9216 is not illuminated. The user may program times of day and the percentage of power that will be supplied from the battery 9218 source at those times of day such that the grid shift controller 9212 may manage the two power sources to implement the sharing. It is to be appreciated that the external grid shifting controller 9204 may implement any of the grid shifting functions described herein.

In an alternate embodiment, an autonomous grid shifting lighting device may be programmed or configured to implement grid shifting using its internal battery. Referring to FIG. 92, the present invention may provide for grid shifting of a lighting device 9202 using the processor 9208, lighting modes database 9210 and grid shift controller 9212 to manage the power connection to external power 9214, light source 9216 and battery 9218 such that the lighting device may manage grid shifting operation based on its program. In such an embodiment, there is no external grid shifting controller and the operation of the lighting device is controlled by the components of the lighting device 9202 as programmed or configured to operate.

Figure 93:
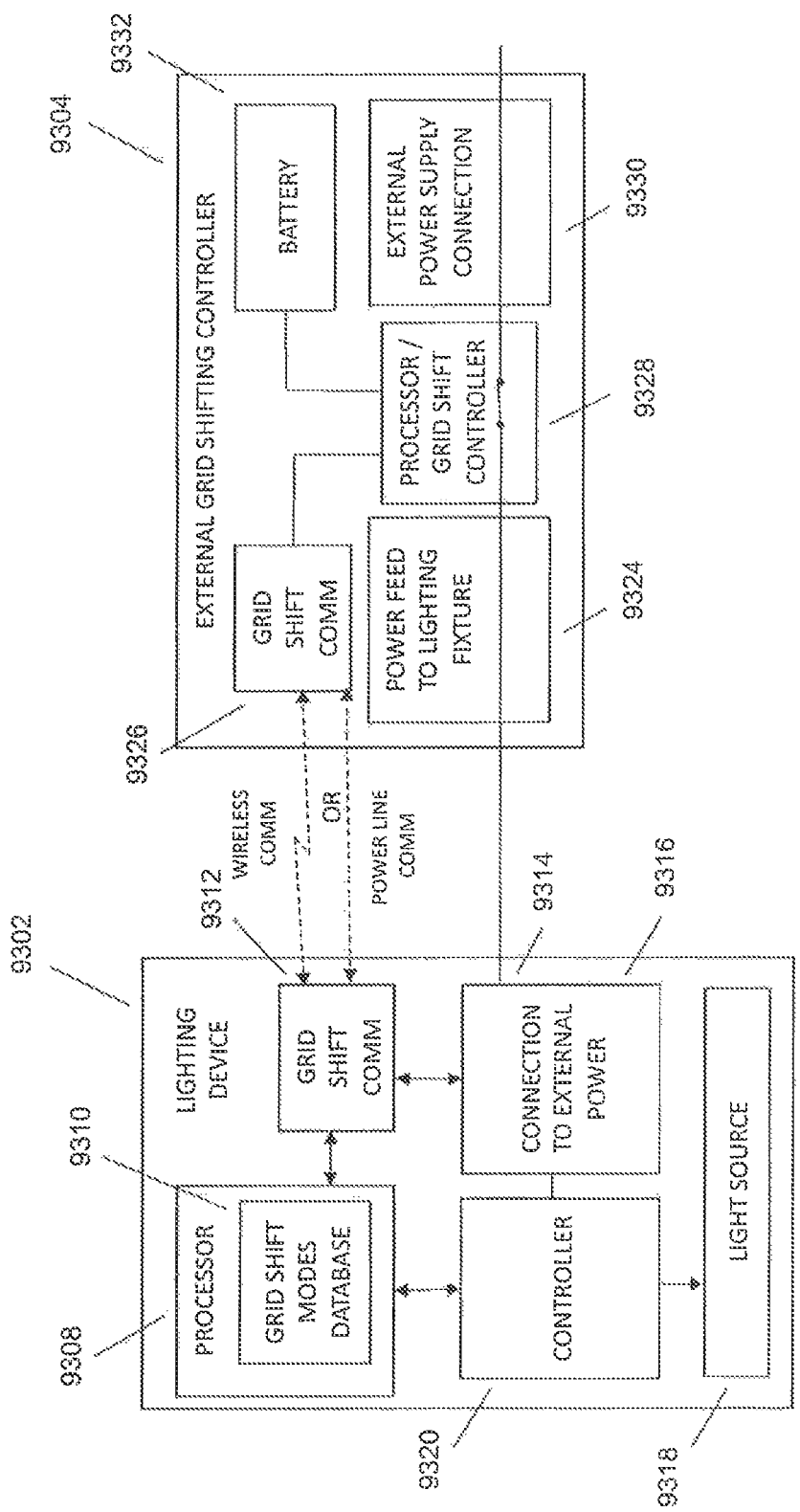
FIG. 93 shows a block diagram of a grid shifting system for lighting devices with an energy storage device in the external grid shifting controller.

Referring to FIG. 93, the present invention may provide for grid shifting for one or more lighting devices 9302 and an external grid shifting controller 9304, where the lighting device 9302 may include a processor 9308 with a lighting modes database 9310, a controller 9312, a power connection to external power 9314, a light source 9316, grid shifting communication 9322 and the like and where the external grid shifting controller 9304 may include a power feed to the lighting fixture 9324, grid shifting communication 9326, a processor/controller 9328, a connection to an external power supply 9330, an internal power source such as a battery 9332 and the like. In embodiments, the external grid shifting controller 9304 may use the battery for the purposes of energy efficiency, demand response applications, peak shedding, load control, load leveling backup power, local power generation and storage or any other use of a hybrid power system mentioned herein and as a result, determine whether to power one or more lighting devices 9302 using the connection to an external power supply 9330, using the battery 9332 or using some amount of power consumed from both sources. In embodiments, the processor 9308 may include a microprocessor, a microcomputer, a digital logic circuit, an analog circuit, and the like. In the case where the processor contains a computing device, software for the computing device may fixed at the factory, updated though an external interface to the processor (e.g. though a wired or wireless connection), and the like. The processor 9308 may have access to a lighting mode database 9310 that may contain information pertaining to controlling the light source, power management, use of embedded sensors, wired or wireless interfaces and the like. In embodiments, the controller 9312 may implement power management of the light source 9318 and power connection to external power 9314. The power connection to external power 9314 may be AC power, DC power or the like. The external grid shifting controller 9304 may contain an AC/DC converter, DC/DC converter and the like to convert and condition the power for the lighting devices. The light source 9316 may be fluorescent, LED, HID, incandescent or any known lights source. The light source 9316 may be integrated into the same housing as the remaining components of the lighting device or may be removable and replaceable like a light bulb. Grid shift communication 9322 may allow the external grid shifting controller 9304 to communicate with the lighting device 9308 to communicate grid shifting operation to the lighting devices, program or configure the processor 9308 or controller 9312, gather status and the like. The external grid shifting controller 9304 may allow for the power management and control of the grid shifting system by allowing parameters of grid shifting to be entered such that the processor/controller 9228 may make decisions on when and how to recharge the battery 9332, when to shift or share power, why to shift or share power and how much power should be shifted or shared between the power sources. The decision may be based on programming, configuration, external control, sensor inputs, monitoring of power consumption and the like. By way of an example, the external grid shifting controller 9304 may be a control panel that allows user input to program grid shifting operation. The processor/controller 9328 may contain a real time clock that may allow the user to program times of day and the percentage of power that will be supplied from the battery 9332 source at those times of day such that the processor/controller 9328 may manage the two power sources to implement the sharing. It is to be appreciated that the external grid shifting controller 9304 may implement any of the grid shifting functions described herein.

Figure 94:
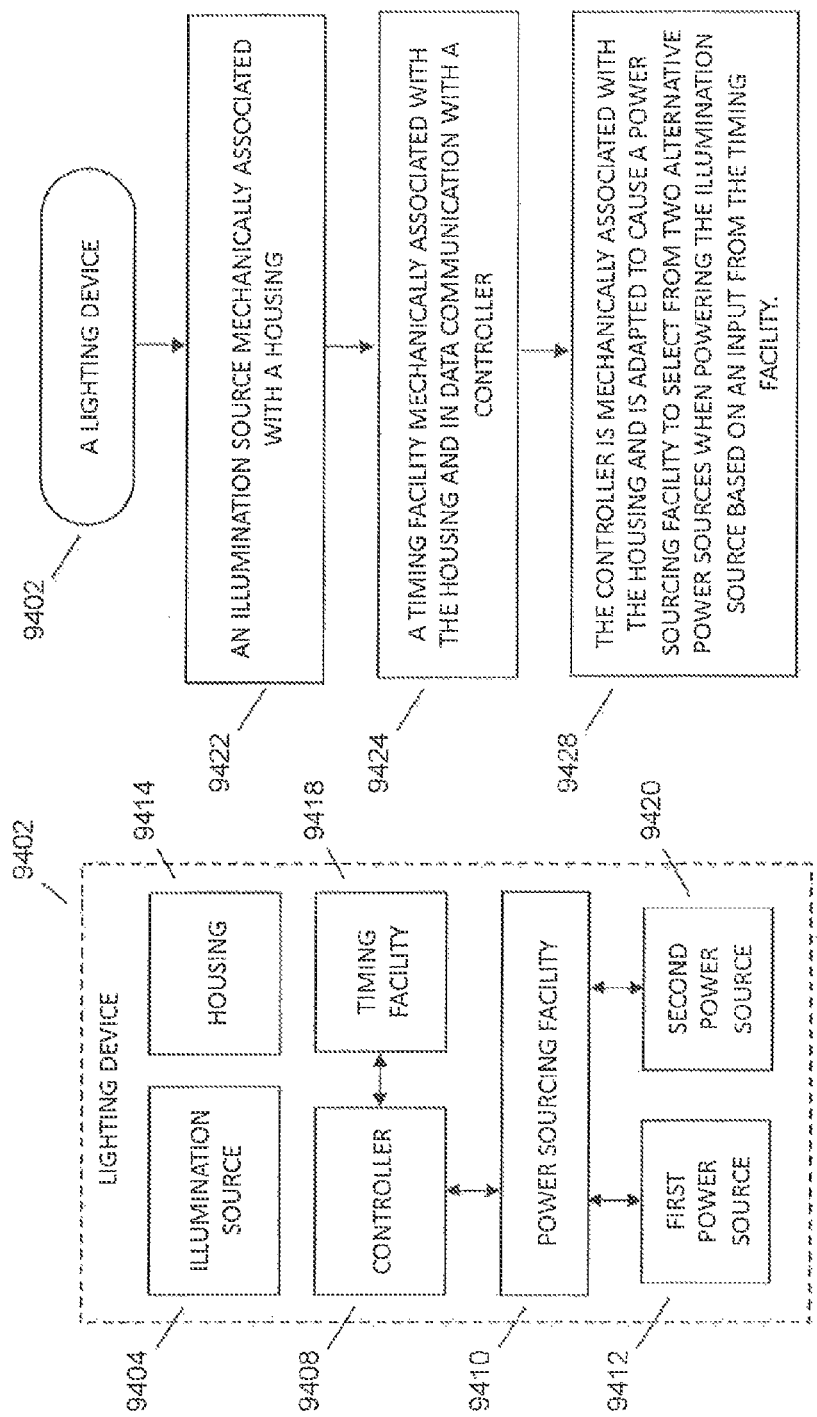
FIG. 94A shows a block diagram of a lighting device with internal timing for grid shifting.
FIG. 94B shows a flow diagram of a lighting device with internal timing for grid shifting.

Referring to FIG. 94A, the lighting device 9402 may include an illumination source 9404, housing 9414, controller 9408, timing facility 9418, power sourcing facility 9410, a first power source 9412, a second power source 9420, and the like. In embodiments, the first power source 9412, second power source 9420, or both, may be located as part of the housing 9414 or outside the housing. Either or both of the power sources 9412 9420 may be any power source described herein, such as a battery, super capacitor, fuel cell, and the like. Either or both of the power sources 9412 may be an external power source, such as the power grid, an external DC power source, and the like. For example, the first power source 9412 may be a battery internal to the housing 9414 and the second power source 9420 may be the external power grid. In another example, the first power source 9412 may be the external power grid and the second power source may be an external DC power source. Referring to FIG. 94B, In embodiments the lighting device 9402 may include an illumination source mechanically associated with a housing 9422; a timing facility mechanically associated with the housing and in data communication with a controller 9424; and where the controller may be mechanically associated with the housing and adapted to cause a power sourcing facility to select from two alternative power sources when powering the illumination source based on an input from the timing facility 9428. In embodiments, the timing facility may utilize a calendar to determine times to select from the two alternative power sources. The timing facility may utilize a timing profile to determine times to select from the two alternative power sources. The timing facility may store times when selection is disabled. The timing facility may be a clock that is synchronized with a central clock. The timing facility may be a timer that counts to a predetermined period. The timing facility may utilize time of day. The controller may include a processor. The illumination source may be an LED. The lighting device may be an LED driver module and drive an LED illumination source. The lighting device may be a fluorescent lamp ballast and drive a fluorescent light source. The lighting device may be an inverter module driving a fluorescent lamp ballast and fluorescent light source. The lighting device may be a lighting fixture. The lighting fixture may include a housing that receives the illumination source. The lighting device may be an adapter that accepts the illumination source plugged into it. The step of selecting may involve switching between the two alternative power sources. The step of selecting may involve sharing power between the two alternative power sources simultaneously, such as where x percent of power is consumed from one of the alternative power sources and y percent of power is consumed from the other alternative power source.

Figure 95:
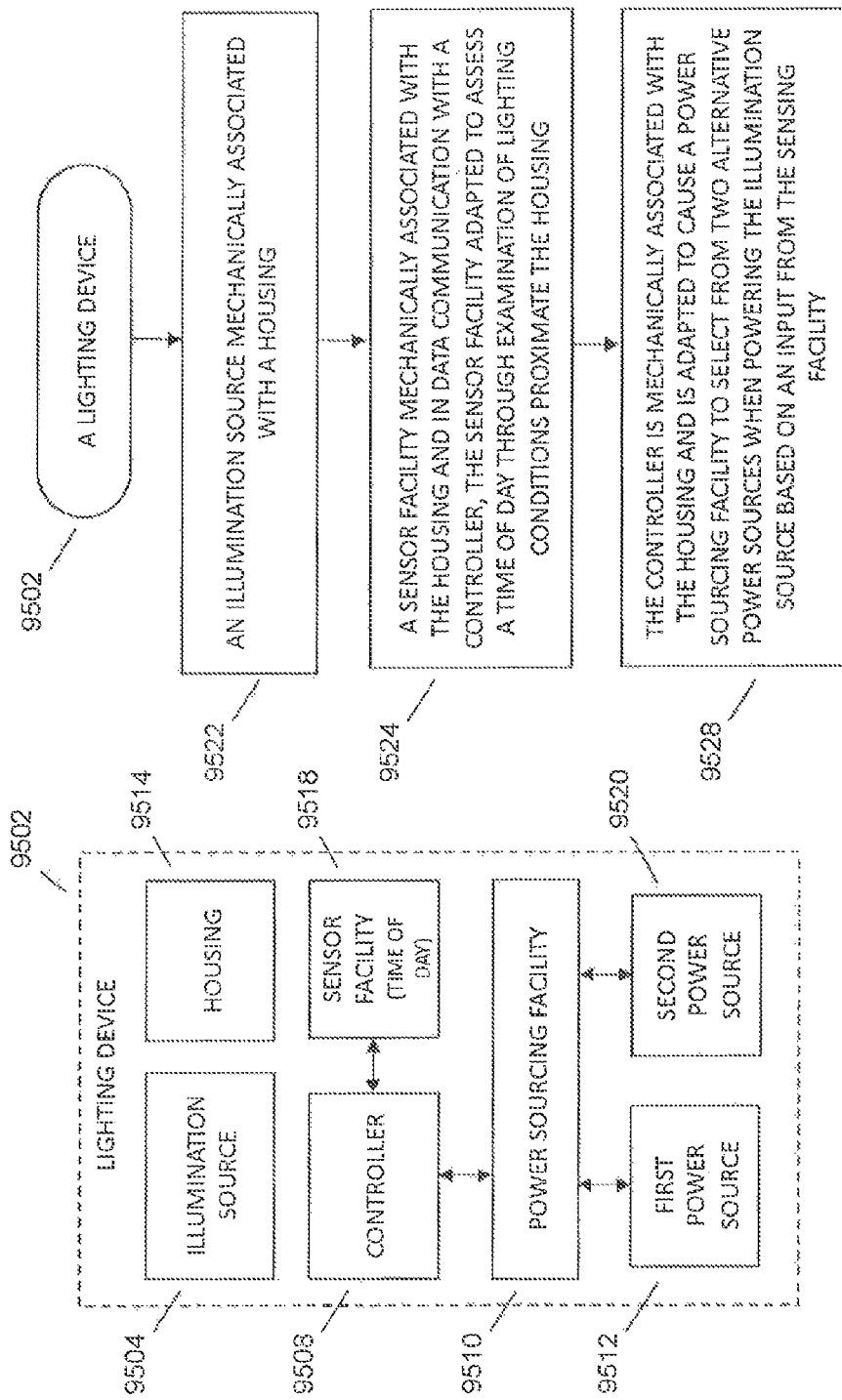
FIG. 95A shows a block diagram of a lighting device with time of day inference for grid shifting.
FIG. 95B shows a flow diagram of a lighting device with time of day inference for grid shifting.

Referring to FIG. 95A, the lighting device 9502 may include an illumination source 9504, a housing 9514, a controller 9508, a sensor facility 9518, a power sourcing facility 9510, a first power source 9512, a second power source 9520, and the like. In embodiments, the first power source 9512, second power source 9520, or both, may be located as part of the housing 9514 or outside the housing. Either or both of the power sources 9512 9520 may be any power source described herein, such as a battery, super capacitor, fuel cell, and the like. Either or both of the power sources 9512 may be an external power source, such as the power grid, an external DC power source, and the like. For example, the first power source 9512 may be a battery internal to the housing 9514 and the second power source 9520 may be the external power grid. In another example, the first power source 9512 may be the external power grid and the second power source may be an external DC power source. Referring to FIG. 95B, the lighting device 9502 may provide an illumination source mechanically associated with a housing 9522; a sensor facility mechanically associated with the housing and in data communication with a controller, the sensor facility adapted to assess a time of day through examination of lighting conditions proximate the housing 9524; where the controller may be mechanically associated with the housing and adapted to cause a power sourcing facility to select from two alternative power sources when powering the illumination source based on an input from the sensing facility. In embodiments, the sensor facility may further comprise a motion detector that is in communication with the controller, the controller adapted to use data from the motion detector when determining which of the two alternative power sources to select. The motion detector may sense motion proximate to the housing. The sensor facility may further comprise a light sensor that is in communication with the controller, the controller adapted to use data from the light sensor when determining which of the two alternative power sources to select and how much power to draw from each source. The controller may include a processor. The illumination source may be an LED, where the lighting device may include an LED driver module. The lighting device may be a fluorescent lamp ballast and drive a fluorescent light source. The lighting device may be an inverter module driving a fluorescent lamp ballast and fluorescent light source. The lighting device may be a lighting fixture. The lighting fixture may include a housing that receives the illumination source. The lighting device may be an adapter that accepts the illumination source plugged into it. The step of selecting may involve switching between the two alternative power sources. The step of selecting may involve sharing power between the two alternative power sources simultaneously, such as where x percent of power is consumed from one of the alternative power sources and y percent of power is consumed from the other alternative power source.

Figure 96:
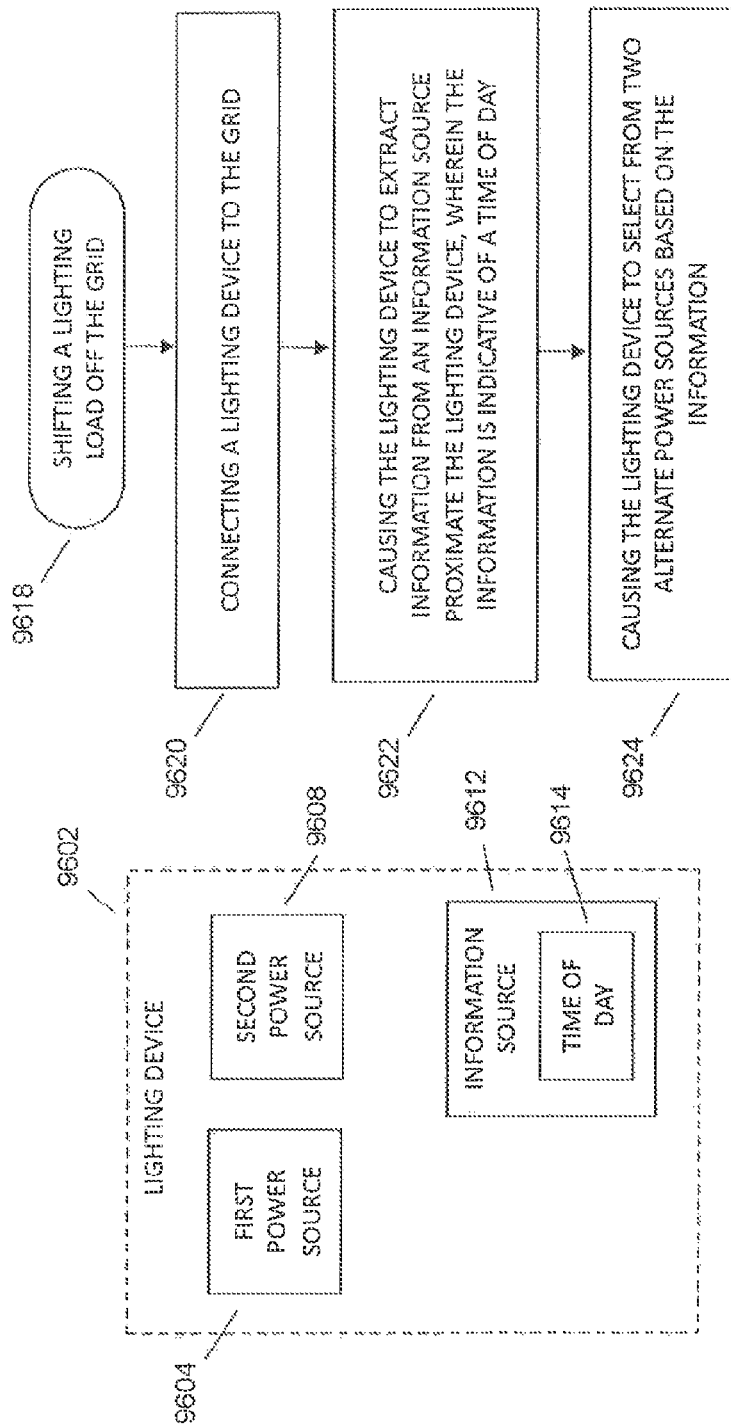
FIG. 96A shows a block diagram of a lighting device shifting a lighting load off the grid based on internally derived information.
FIG. 96B shows a flow diagram of a lighting device shifting a lighting load off the grid based on internally derived information.

Referring to FIG. 96A, the lighting device 9602 may include a first power source 9604, a second power source 9608, an information source, such as to provide time of day information 9614, and the like. In embodiments, the first power source 9604, second power source 9608, or both, may be located as part of the housing of the lighting device 9602 or outside the housing. Either or both of the power sources 9604 9608 may be any power source described herein, such as a battery, super capacitor, fuel cell, and the like. Either or both of the power sources 9604 9608 may be an external power source, such as the power grid, an external DC power source, and the like. For example, the first power source 9604 may be a battery internal to the housing and the second power source 9608 may be the external power grid. In another example, the first power source 9604 may be the external power grid and the second power source may be an external DC power source. In embodiments, the information source 9612 may be located as a part of the lighting device 9602, external to the lighting device, or some combination of internal and external. For example, the information source may provide the time of day to the lighting device 9602 from a real time clock module inside the lighting device. In another example, the time of day clock may be maintained in the lighting device and synchronized or set to an external time source (e.g. NTP, an atomic clock, a user interface, and the like). In another example, the lighting device may not maintain the time however an external device maintaining the time may control operation of the lighting device based on time of day. Referring to FIG. 96B, the lighting device 9602 may provide a method of shifting a lighting load off the grid 9618 by connecting a lighting device to the grid 9620; causing the lighting device to extract information from an information source proximate the lighting device, wherein the information is indicative of a time of day 9622; causing the lighting device to select from two alternate power sources based on the information 9624; and the like. In embodiments, a controller may perform the step of extracting information, where the controller may include a processor. The lighting device may include an LED lighting source. The LED lighting source may include an LED driver module. The lighting device may be a fluorescent lamp ballast and drive a fluorescent light source. The lighting device may be an inverter module driving a fluorescent lamp ballast and fluorescent light source. The lighting device may be a lighting fixture, where the lighting fixture includes a housing that receives the illumination source. The lighting device may be an adapter that accepts the illumination source plugged into it. The step of selecting may involve switching between the two alternative power sources. The step of selecting may involve sharing power between the two alternative power sources simultaneously, such as where x percent of power is consumed from one of the alternative power sources and y percent of power is consumed from the other alternative power source.

Figure 97:
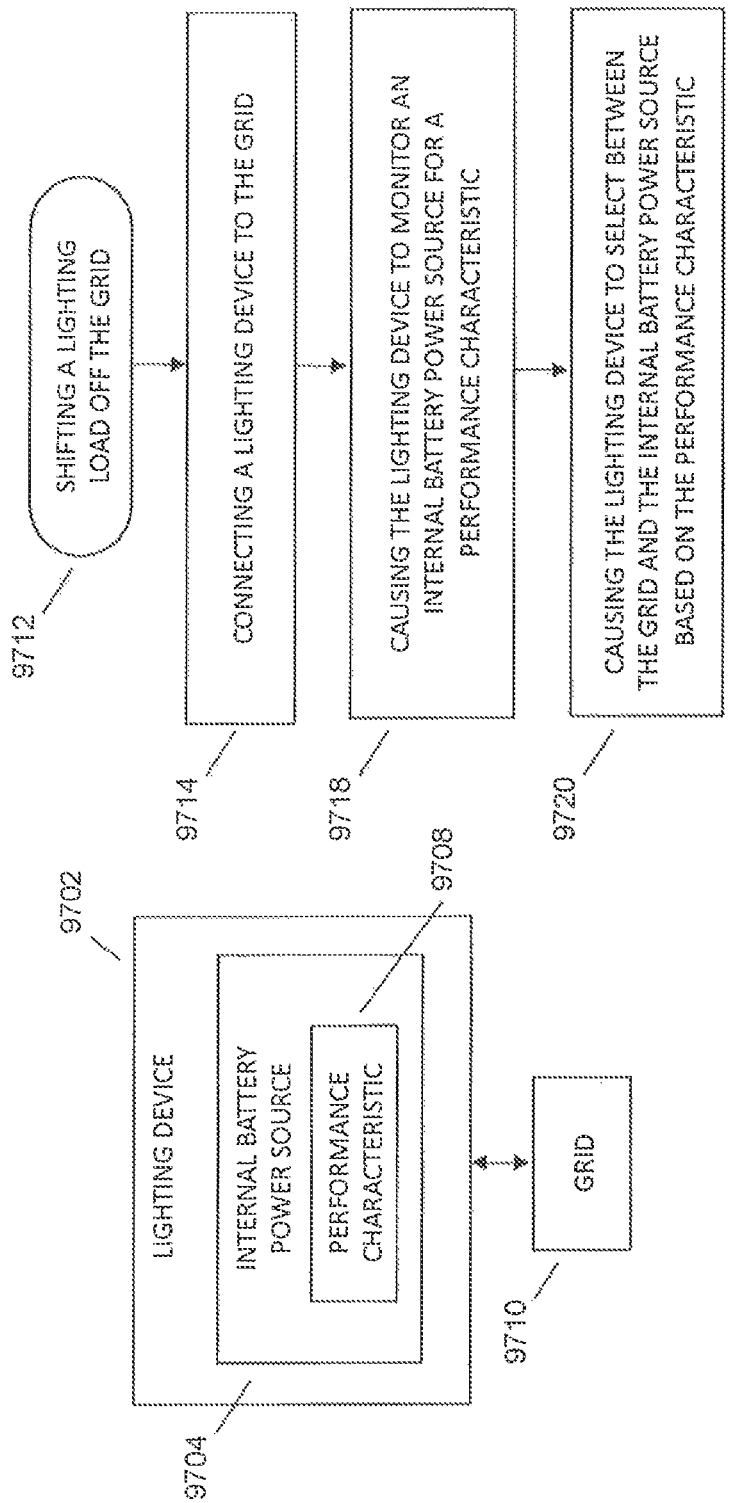
FIG. 97A shows a block diagram of a lighting device shifting a lighting load off the grid based on an internal power source performance characteristic.
FIG. 97B shows a flow diagram of a lighting device shifting a lighting load off the grid based on an internal power source performance characteristic.

Referring to FIG. 97A, the lighting device 9702 may include an internal battery power source 9704, which may include a performance characteristic 9708 such as for battery capacity level; a connection to the power grid 9710; and the like. Referring to FIG. 97B, the lighting device 9702 may provide for shifting of a lighting load off the grid 9712 by connecting a lighting device to the grid 9714; causing the lighting device to monitor an internal battery power source for a performance characteristic 9718; causing the lighting device to select between the grid and the internal battery power source based on the performance characteristic 9720; and the like. In embodiments, the lighting device may include a controller for performing the steps of monitoring the internal battery and choosing between the grid and the internal battery, such as where the controller includes a processor. The lighting device may include an LED lighting source, and the LED lighting source may include an LED driver module. The lighting device may include a fluorescent lamp ballast. The lighting device may be an inverter module driving a fluorescent lamp ballast and fluorescent light source. The lighting device may be a lighting fixture. The lighting fixture may include a housing that receives the illumination source. The lighting device may be an adapter that accepts the illumination source plugged into it. The step of selecting may involve switching between the two alternative power sources. The step of selecting may involve sharing power between the two alternative power sources simultaneously, such as where x percent of power is consumed from one of the alternative power sources and y percent of power is consumed from the other alternative power source.

Figure 98:
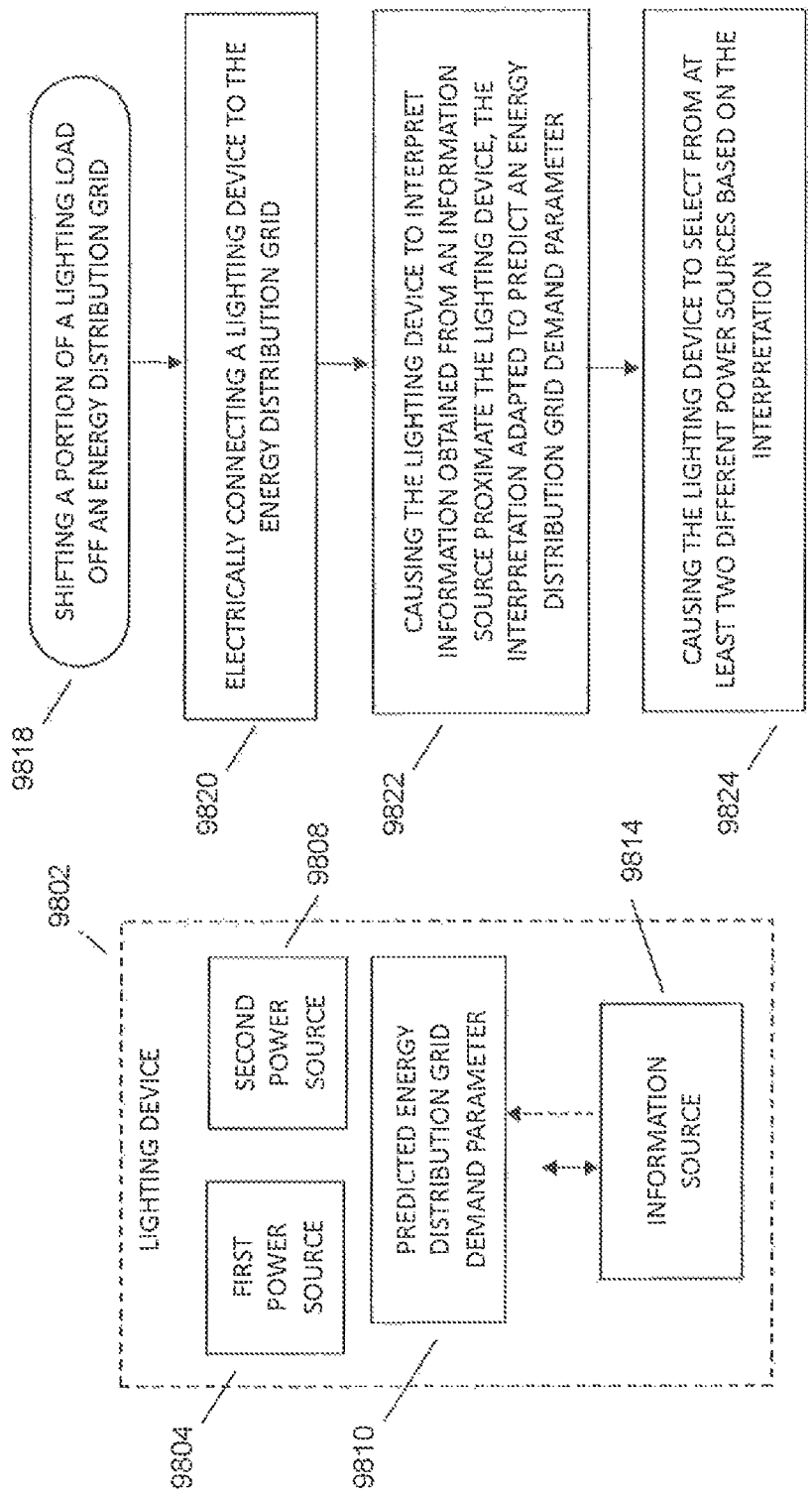
FIG. 98A shows a block diagram of a lighting device shifting a lighting load off the grid based on internally derived information associated with an energy distribution grid demand parameter.
FIG. 98B shows a flow diagram of a lighting device shifting a lighting load off the grid based on internally derived information associated with an energy distribution grid demand parameter.

Referring to FIG. 98A, the lighting device 9802 may include a first power source 9804, a second power source 9808, predict an energy distribution grid demand parameter 9810, an environmental information source 9814, and the like. In embodiments, the first power source 9804, second power source 9808, or both, may be located as part of the housing of the lighting device 9802 or outside the housing. Either or both of the power sources 9804 9808 may be any power source described herein, such as a battery, super capacitor, fuel cell, and the like. Either or both of the power sources 9804 9808 may be an external power source, such as the power grid, an external DC power source, and the like. For example, the first power source 9804 may be a battery internal to the housing and the second power source 9808 may be the external power grid. In another example, the first power source 9804 may be the external power grid and the second power source may be an external DC power source. In embodiments, the information source 9814 may be located as a part of the lighting device 9802, external to the lighting device, or some combination of internal and external. The information source 9814 may be an environmental information source, a power input information source, and the like. For instance, the information source may enable the prediction or determination of an energy distribution grid parameter, such as to improve energy efficiency, provide cost savings, to reduce energy demand, and the like, such as when the energy demand is a peak energy demand, is at predetermined times, at a time when new energy demand is required at an energy provider, and the like. Referring to FIG. 98B, the lighting device 9802 may provide for shifting a portion of a lighting load off an energy distribution grid 9818 by electrically connecting a lighting device to the energy distribution grid 9820; causing the lighting device to interpret information obtained from an environmental information source proximate the lighting device, the interpretation adapted to predict an energy distribution grid demand parameter 9822; causing the lighting device to select from at least two different power sources based on the interpretation 9824; and the like. In embodiments, the lighting device may include a controller for performing the steps of interpreting the information and selecting between the at least two different power sources, where the controller may include a processor. The environmental information source proximate the lighting device may include an internal timer, a time of day clock, a calendar, an environmental sensor input device for detecting an environmental condition, and the like. The lighting device may be caused to assess a power viability factor associated with at least one of the at least two different power sources, and where the step of causing the lighting device to select from at least two different power sources may be based on the interpretation comprises causing the lighting device to select from the at least two different power sources based at least in part on the environmental information interpretation and at least in part on the power viability factor. The step of causing the lighting device to select from at least two different power sources based on the interpretation may involve switching between the two different power sources. The step of causing the lighting device to select from at least two different power sources based on the interpretation may involve simultaneously drawing power from the two different power sources, such as where x percent of power is consumed from one of the alternative power sources and y percent of power is consumed from the other alternative power source. The environmental sensor input device may be a light sensor sensing a level of ambient light. The environmental sensor input device may be a motion sensor sensing motion. A power sensor input device may also be included, such as where the power sensor input device measures the amount of power consumed from one or more of the power sources, the power sensor input device measures the capacity level of at least one of the two different power source, the power sensor input device allows for an estimation of the capacity level of at least one of the two different power sources, and the like. In some embodiments, the lighting device may not contain an environmental sensor input and instead rely on measurements of the power sensor input device to select from the at least two different power sources. The lighting device may include an LED lighting source, where the LED lighting source may include an LED driver module. The lighting device may further include a fluorescent lamp ballast. The lighting device may be an inverter module driving a fluorescent lamp ballast and fluorescent light source. The lighting device may be a lighting fixture, such as where lighting fixture includes a housing that receives the illumination source. The lighting device may be an adapter that accepts the illumination source plugged into it. The step of selecting may involve switching between the two alternative power sources. The step of selecting may involve sharing power between the two alternative power sources simultaneously, such as where x percent of power is consumed from one of the alternative power sources and y percent of power is consumed from the other alternative power source.

Figure 99:
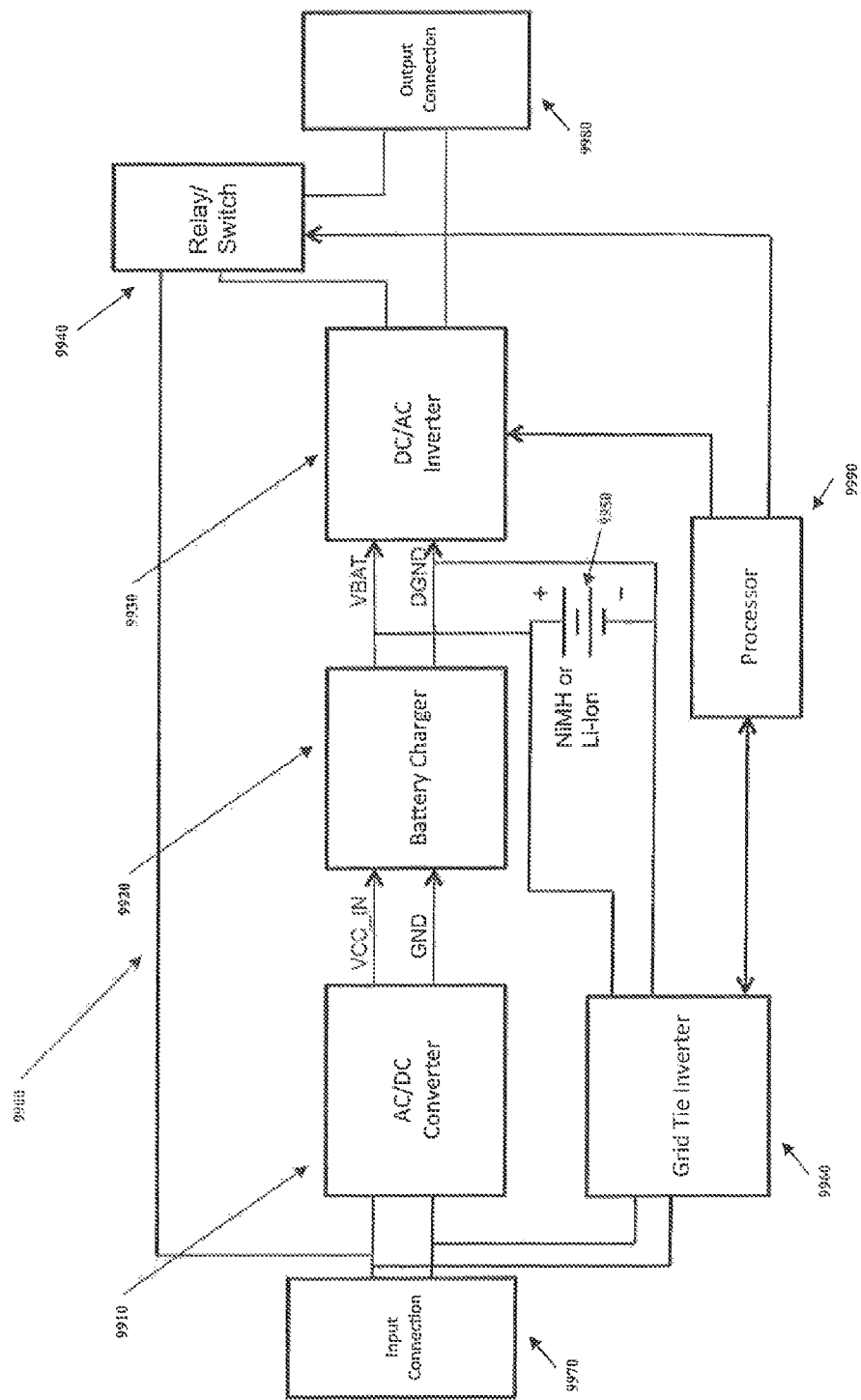
FIG. 99 shows a block diagram of a battery backup module with a grid tie inverter.

In an illustrative embodiment shown in FIG. 99, the block diagram shows a Battery Backup Module with Grid Tie Inverter 9900 that may be used as an in-line adapter where it may receive input power from a grid connected power source and provide an output connection to one or more devices to be powered from the line or from the battery backup. In the case of a module used for lighting, the module may power any type of light source (incandescent, compact fluorescent, LED, fluorescent, HID etc) and either pass input power through if it is available or provide output power to the bulb, tube, lamp or light source using an embedded power source in the absence of input power. The Battery Backup Module with Grid Tie Inverter 9900 may include a grid tie inverter that may be connected to the input connection (ie a grid connection) to provide the ability to return power to the grid. Thus, the Battery Backup Module with Grid Tie Inverter 9900 may contain a DC to AC inverter and a switching circuit to power devices connected at the output from either an input power source or an internal power source and it may also contain a grid tie inverter that may connect to the grid and return power to the grid from the stored energy source. The Battery Backup Module with Grid Tie Inverter 9900 may include an AC/DC converter 9910, battery charger circuitry 9920, a DC/AC inverter 9930, switching circuitry 9940, an embedded battery supply 9950, grid tie inverter 9960, an input connection 9970, an output connection 9980 and a processor 9990. A Battery Backup Module with Grid Tie Inverter 9900 may be designed with switching circuitry 9940 such that when external power is applied, the input connection 9970 supplies power to the output connection 9980. When the external power is no longer present the switching circuitry 9940 may automatically switch such that the embedded battery supply 9950 is the power source. The DC/AC inverter 9930 may supply power from the embedded battery supply 9950 converted to AC power to the output connection 9980. By way of an example, a bulb, tube, lamp or light source plugged into or electrically connected to the output connection 9980 may be powered from embedded battery supply 9950. The switching circuitry 9940 in the illustrative embodiment consists of a relay capable of switching a power source to the output connection 9980. In alternate embodiments the switching circuitry 9940 may consist of a FET, transistor, solid state switch, discrete circuitry and the like such that the desired power source may be supplied to the output connection 9980. It is to be appreciated that several methods of selecting and switching the power source to the output connection 9980 will be readily apparent to those skilled in the art.

The input connection 9970 may consist of any type of connector commonly used for connecting to the grid. In the lighting example, the input connector may be similar that that used used by standard size bulb (PAR30, PAR38, A19, R30, MR16, and so on), non-standard size bulb, fixture, fluorescent bulb or lamp (T4, T5, T8, circular, and so on) or down light assembly (recessed fixtures, fluorescent fixtures or down light fixtures for residential or industrial lighting), or the like such that the Battery Backup Module with Grid Tie Inverter 9900 may electrically and mechanically couple the input connection to the mating connection to mimic the connection on the bulb, fixture, lamp, assembly or the like that would connect to the output connection 9980. As such the output connection 9980 may provide a connector to accept any of lighting devices mentioned in the example. In another example, the Battery Backup Module with Grid Tie Inverter 9900 may be an in-line AC power adapter that may be hard wired to AC power with a terminal block or similar on the input connection 9970 and a terminal block or similar at the output connection 9980. In another example, the input connection 9970 is a NEMA plug that may plug into a wall outlet and the output connection 9980 is an AC outlet that a NEMA plug may connect to. It is to be appreciated that any type of input connection 9970 and output connection 9980 may be used with the claimed subject matter. In the illustrated embodiment, the embedded battery supply 9950 is a dual cell Li-Ion battery pack. It is to be appreciated that the embedded battery supply 9950 may be any rechargeable battery type mentioned herein. In alternate embodiments, the embedded battery supply 9950 may be non-rechargeable such as one or more alkaline batteries. In other embodiments, the embedded battery supply 9950 may be a capacitor, super capacitor, fuel cell etc. In the illustrative embodiment, the dual cell Li-Ion battery pack is charged with dual cell Li-Ion charging circuit based on the Microchip MCP73213 battery charger. It is to be appreciated that any type of battery charger circuitry may be used to charge the desired type rechargeable battery used as the embedded battery supply 9950. The output of the AC/DC converter 9910 may provide the required input power to the battery charger circuitry 9920, the processor 9990 and other circuitry to operate in the module.

In the illustrated embodiment, a DC/AC inverter 9930 may provide an output with the desired electrical characteristics of the power delivered to the device attached to the Battery Backup Module with Grid Tie Inverter 9900. In some embodiments, the Battery Backup Module with Grid Tie Inverter 9900 may include a triac, thyristor, adjustable resistor, adjustable transformer, PWM controllable FET or transistor or similar device to allow a bulb, tube, lamp or light source connected to the Battery Backup Module with Grid Tie Inverter 9900 to be dimmable or to allow the module to support more than one light level if the application benefits from dimming or multiple light levels or for the purpose of extending battery life. In embodiments, the processor 9990 in the Battery Backup Module with Grid Tie Inverter 9900 may use any combination of switch sensing, receiver, transceiver and sensor functionality to set the mode of operation of the module, such as described herein. In one embodiment, the Battery Backup Module with Grid Tie Inverter 9900 contains a light sensor that may be used for a daylight harvesting function as described herein. Based on the detected light level, the Battery Backup Module with Grid Tie Inverter 9900 may alter the light intensity of the lighting devices connected to it.

The processor 9990 may be programmed or configured to manage the modes of operation of the Battery Backup Module with Grid Tie Inverter 9900. It may control which power may be connected to the output connection 9980 either from the input connection 9970 or from the embedded battery supply 9950. The processor 9990 may control when the grid tie inverter 9960 returns power to the grid. The processor 9990 may control when the embedded battery supply 9950 may be charged. It is to be appreciated that the processor 9990 may manage the operation of the Battery Backup Module with Grid Tie Inverter 9900 to implement any of the intelligent power functions described herein for battery backed devices or grid tie inverters. In embodiments, the processor 9990 may provide control functions as described herein, such as for power management, reconciliation of multiple inputs (e.g. remote control inputs, sensor inputs, time inputs, internal programming control functions, wireless network interface inputs), and the like.

The Battery Backup Module with Grid Tie Inverter 9900 may operate in several modes. In one mode, the module may connect grid power to any devices connected at its output. In this mode, the batteries may be charging or they may not be charging. In this mode the grid tie inverter may return power to the grid or it may not return power to the grid. In some cases, the grid tie inverter may have a relay, solid state switch or the like to connect or disconnect the output of the grid tie inverter to the grid. In another mode, the module may power any devices connected at its output using the battery and DC to AC inverter. In its operational modes, the Battery Backup Module with Grid Tie Inverter 9900 provides the ability to put an energy storage device at any point in the power distribution network and allow for a distributed energy storage network. By way of an example, several Battery Backup Module with Grid Tie Inverters may be distributed throughout an office building. Power may be stored at any time to be used as backup power, grid shifting or for net metering to be returned to the grid at some time.

In embodiments, the battery backup module with grid tie inverter 9900 may include additional input components as disclosed herein, such as remote control inputs, sensor inputs, time inputs, wireless network interface inputs, and the like. In embodiments, the battery backup module with grid tie inverter 9900 may include a lighting source as described herein, or a socket to receive the lighting source. In embodiments, components of the battery backup module with grid tie inverter 9900 may be housed in a single assembly, where the assembly is a lighting fixture where a standard light source is mounted into the assembly (e.g. by a user), a light fixture where a light source is a fixed component (e.g. an LED light source that does not require changing), a light bulb where all the components are included in an assembly that is mounted in a standard fixture (e.g. a light source with an Edison socket, or other standard lighting interconnection as described herein), a separate module that interfaces with a lighting source or device, and the like.

In alternate embodiments, similar functionality to the Battery Backup Module with Grid Tie Inverter 9900 may be implemented in a wireless lighting device. In the embodiments, the wireless lighting device may require different circuitry to provide power to the light source. In one embodiment, the light source may be an LED light source. In this embodiment, the DC to AC inverter may be replaced by one or more LED driver circuits that may provide power to the LED light source from the input connection or embedded battery supply. The wireless lighting device may comprise of an input connection, an LED light source, one or more LED driver circuits, an embedded battery supply, a battery charging circuit, a grid tie inverter and a processor. The wireless lighting device with battery backup and grid tie inverter may operate in similar modes of operation as the Battery Backup Module with Grid Tie Inverter however instead of having an output connection it may power the light source directly.

In embodiments, a lighting device with switch sense as described herein, such as a UPS light bulb, adapter, fixture, and the like, may include a time of day clock designed that allows a user to program the time period that the bulb, adapter or fixture must be on or alternately set when the on/off switch operates the devices on the circuit normally (8 am to 8 pm for example). This switch time lockout function may be implemented through a time of day clock and calendar function inside a UPS light bulb, adapter or fixture such that a user may program the time lockout functionality. The UPS light bulb, adapter or fixture may operate in a mode where it automatically switches to an internal power supply when it detects a disruption of input power or it may operate in a mode where it does not switch to the internal power supply even when it detects a disruption of power. The switch time lockout function may determine which mode the bulb, adapter or fixture operates in based on a time of day and/or calendar scheduling. In alternate embodiments, the switch time lockout function may be implemented in a battery backed LED driver or a fluorescent emergency ballast with battery backup. Programming of the time lockout function may happen through any wired or wireless interface mentioned herein or it may be factory programmed such that the hours of operation may be set. In alternate embodiments, the time lockout capable lighting device may contain an atomic clock, network clock or other mechanism to maintain an accurate time of day or calendar and allow the device to operate on a time of day clock or calendar to meet the desired user operation. In alternate embodiments, the mode the bulb, adapter or fixture operates in may be controlled by an external device such that the UPS light bulb, adapter or fixture may be told whether to automatically switch to the internal power supply when a disruption of input power is detected or whether to disable the switch to internal power supply communicated over any wired or wireless method mentioned herein. Further, the lighting device may have a method to override the setting in cases where emergency lighting is immediately required. In some embodiments, the time of day or calendar may trigger different functions. By way of an example, there may be multiple periods of time during the day or during the week where the time lockout operation may be different. The weekends may have a different schedule than during the week. The level of illumination may be scheduled such that during certain times the light intensity is at different levels whether running off of external power or battery power. In some embodiments, the lighting device may contain a sensor such as a motion sensor or light sensor. In these embodiments, the sensor may be integrated into the time schedule such that the function of the sensor depends on the time of day. In some embodiments, the sensor may override the scheduled functions. By way of an example, a lighting device with a motion sensor may be scheduled to be off during certain times however when it detects motion it may be powered using battery power and auto shutoff after some time of motion not being detected. It is to be appreciated that the time lockout function may be used instead of or in conjunction with the switch sense functionality in any of the applications mentioned herein.

In embodiments containing switch sense functionality, a switch sense approach may be employed of determining the response of electrical circuit to a pulse sent into the electrical circuit. For instance, the response may be dictated by the electrical characteristics of the electrical circuit (impedance or active circuitry on the circuit). In embodiments where the state of a controlling device is to be detected, the electrical characteristics will be different with the switch open or closed. By way of an example, on the rising edge of a long pulse, the initial response to the edge by the impedance of electrical circuit and all of the detection and protection circuitry required by the switch sensing function will be reflected in the shape of the pulse after the sense resistor. A measurement of the shape of the pulse by sampling with an analog to digital converter allows a determination of the electrical characteristics of the circuit. Ultimately the pulse may reach a steady state. The response of the system to the impulse allows a control facility to make a decision on whether the controlling devices intend to apply power to the lighting device or not and thus the control facility can determine whether to use the battery backup or not. The timing associated with the response of the circuit to an incident pulse may allow for a determination of the electrical characteristics of the circuit. For example, a small inductor may respond quickly while large inductor like a coil of mains transformer may have long response.

In embodiments, an inverter and battery backup with the switch sense functionality may be employed in a fluorescent light fixture to provide a battery backup to the fluorescent fixture with the switch sense functionality allowing a decision from a control facility on whether to provide power from the battery backup to the fluorescent light source or fluorescent ballast. By way of an example, an inverter, rechargeable battery, switch sense function and a DPDT relay may be designed into a housing to be placed in-line with a fluorescent ballast to power a fluorescent light source. A control facility may be included to switch in and out the main power path and battery and inverter power sources to the ballast during a detected outage such that either source may provide power to the fluorescent light fixture based on the detected switch state, the detected state of input power or any other input to the control facility that it may determine necessitates a switchover to battery power from input power or to input power from battery power.

In embodiments, an intelligent wall switch may continue to control the electrical devices it delivers power to during a power outage in the absence of input power to the wall switch or through switch sensing from the end devices on the circuit. The intelligent wall switch may implement any form of wired or wireless communication to communicate to the end devices and may have an integrated power source such as a battery such that it may still operate and communicate with the end devices in the absence of input power. By way of an example, an intelligent wall switch controlling a lighting circuit containing lighting devices with battery power may detect a power outage at its input and subsequently send a communication to the lighting devices to turn on using battery power or to turn the lighting devices off. In order for this communication to occur, a power source must be present at the intelligent wall switch and at the lighting devices. In some embodiments, the power source at the intelligent wall switch may also provide power to the end devices on the electrical circuit. It is to be appreciated that a user may be able to control the lighting devices on the circuit using any of the controls of the intelligent wall switch (wall switch, dimmer switch, push buttons etc.) during the power outage.

In some embodiments implementing the switch sense functionality, the switch sensing function may be employed by synthesizing a sine wave at a frequency from a microcontroller, oscillator circuit, DDS or other method of generating a signal and coupling the signal onto the circuit such that the state of the switch may be detected through a sense resistor. Using the sense resistor, the resistive and reactive components of the impedance of the electrical circuit that the switch sensor is connected to may be calculated. A measurement of the rms voltage of the signal on both sides of the sense resistor and the rms voltage across the sense resistor may be used to calculate the resistive and reactive components of the impedance. Different impedances may be detected if the controlling device intends to apply power to the circuit and no power is applied, does not intend to apply power to the circuit or intends to apply power to the circuit and power is applied.

In embodiments of the switch sense functionality, the state of the switch may be determined by a passive measurement of inductance or capacitance using the inductance or capacitance as component to op amp oscillator such that the oscillation frequency of the oscillator may be measured to determine the value of the inductance or capacitance. In some embodiments, the frequency out of oscillator may be used such that the frequency and a known inductance may be used to calculate the capacitance. In some embodiments, the frequency out of oscillator may be used such that the frequency and a known capacitance may be used to calculate the inductance. Different measurements of inductance and capacitance may be detected if the controlling device intends to apply power to the circuit and no power is applied, does not intend to apply power to the circuit or intends to apply power to the circuit and AC applied and thus a control facility may be able to make a decision whether the user intent was to turn the light on, off or if there may be a disruption in power.

In embodiments of the switch sense, a power line beaconing system may transmit a beacon on power line that lighting or electrical devices may detect using a control facility that may receive the beacons and as such determine that the controlling devices intend to apply power to the end devices. By way of an example, if a lighting or electrical device detects the beacon on the power line, it may determine that a wall switch may be in the closed position as the beacon may have an electrical path from the transmitter to the receiver. If the control facility of the lighting or electrical devices does not detect the beacon, it may assume that the controlling device may not be applying power to the end devices. By way of an example, if a lighting or electrical device does not detect the beacon on the power line, it may determine that a wall switch may be in the open position. When the controlling device intends to apply power to the circuit and a beacon is detected but AC power is not present, the control facility may implement a switch over to an internal power source to keep the lighting device illuminated or the electrical device powered. It is to be appreciated that the power line beaconing system may operate with any of the controlling devices mentioned herein. In some embodiments, the beacon of the power line beaconing system may be a wideband pulse that may be detected by the control facility, may be a data message that may be received over the power lines by the control facility, may be an electrical signal that may be detected by the control facility, may be a modulated signal that may be demodulated by the control facility or the like. In alternate embodiments, the beaconing system may be received by a method of wireless communication. The power line beaconing system may include a beaconing module that may contain a detector for monitoring power, a processor or electrical circuit for creating and sending the beacon and a method to transmit the beacon over a wired or wireless communication to the lighting or electrical devices. The beaconing module may be connected to an electrical circuit at a point that the lighting or electrical devices may be connected and able to receive the beacon. In some embodiments, the power line beaconing system may multicast the beacon such that all lighting or electrical devices on a connected circuit may be able to detect or receive the beacon. In some embodiments, the beaconing module may be encoding in a manner such that only one or a group of lighting or electrical devices may detect or receive the beacon.

In embodiments, a Switch Sensing Lighting Device may be designed to be installed on the same circuit with other lighting devices where a user may desire to have the switch sensing functionality and a backup light source implemented in parallel to the other lighting devices. The Switch Sensing Lighting Device may detect the state of a controlling switch or device remotely and the Switch Sensing Lighting Device may illuminate independent of the state of the other lighting devices based on the state of the switch and power on the circuit. The Switch Sensing Lighting Device may be a light fixture designed into a housing with a connection to the power lines on the circuit it is monitoring and providing a backup light source. The Switch Sensing Lighting Device may contain a light source, a driver for the light source, a connection to the power circuit, an embedded power source, the ability to sense the state of one or more controlling devices and a control facility to manage the operation of the device. By way of an example, the Switch Sensing Lighting Device may be in a housing that contains three 1 W LEDs, an LED driver, a connection to AC power on the circuit it is monitoring and providing a back up light source, switch sensing circuitry and a processor to act as the control facility to take the detected switch sense and state of power delivered on the circuit and illuminate the LEDs upon certain conditions. It is to be appreciated that the processor may control the Switch Sensing Lighting Device to implement any function described herein for battery backup lighting capable of detecting the state of the controlling switches or devices.

In embodiments, a regional grid shifting architecture may be created such that a power provider in a region may implement a peak shedding algorithm to reduce demand in the region by instructing end users to reduce demand by shifting power to the local power sources of the grid shifting lighting and electrical devices through the issuing of load control messages (ie communication with controlling facilities at the energy users) or through the use of time of day and calendar to schedule end users to shift some amount of power off the grid at scheduled times. The transmission utility that supplies one or more regions and the lighting or electrical devices at the end user facilities described herein may be deployed in each of those regions such that the load that is demanded from the grid is reduced through the power management techniques (load control messages, time of day scheduling etc). As a result, the power provider in a region may not need to bring any additional infrastructure on-line to meet peak demand.

In embodiments of grid shifting lighting devices, grid shifting electrical devices and grid shifting controllers, a wide area wireless network interface may be integrated into the grid shifting devices such that the wireless interface in the grid shifting devices may allow a power provider or intermediary to issue instructions over the wireless network to end devices and controllers to implement grid shifting. In such embodiments, a power provider may issue unicast, multicast or broadcast instructions to the grid shifting devices over the wireless network. The power provider may be able to reduce power consumption by issuing instructions over the wireless network to end devices and controllers to transition some of their power consumption to local power sources. The power provider may be able to implement peak shedding or other function to make use of local power sources implement in end devices without the need for power line communication or other methods that may require additional infrastructure and cost to implement. By way of an example, a 2.5G or 3G network may be used by a power provider when 2.5G or 3G network interfaces are integrated into a grid shifting device. A protocol may be developed to allow unidirectional or bidirectional communication between the power provider and end devices. In alternate embodiments, the protocol may be implemented over the power lines to communicate with the grid shifting devices.

In embodiments of grid shifting lighting devices, a triac dimmable driver may be implemented where a control facility provides power management such that a battery driver circuit automatically makes up the difference of the power delivered to the light source from the amount of power that is detected that has been reduced in the triac chopped waveform. By way of an example, an LED light source may be driven by an oring of the external power source consisting of a triac chopped waveform and an LED battery driver circuit. A control facility may manage the amount of power delivered by the LED battery driver circuit in response to the amount of power delivered by the external power source.

In an embodiment of a grid shifting lighting device, a grid shifting production/manufacturing work light may be implemented that grid shifts to use power from a local energy storage device to allow users and workers to work through a rolling blackout, scheduled outage or unscheduled disruption in power. In some embodiments, the grid shifting production/manufacturing work light may contain the switch sense functionality to automatically switch to the local energy storage device during the outage. In alternate embodiments, the grid shifting production/manufacturing work light may contain a time of day and calendar such that it may be programmed with a schedule of when to use the primary power source and when to use the local energy storage device. In alternate embodiments, the grid shifting production/manufacturing work light may contain a wireless receiver such that a user may use the remote control containing controls and a wireless transmitter to turn on, turn off or alter the light intensity of the grid shifting production/manufacturing work light. In alternate embodiments, the wireless receiver may be a wireless wide area network interface such as a 2.5G or 3G interface and a power provider may transmit a message in a geographical area when the rolling or scheduled blackout will happen and the grid shifting production/manufacturing work light may automatically switch over to the local power source for the duration of the outage. In alternate embodiments, the lighting device may be a fixture, bulb, retrofit fixture, fluorescent lamp or light fixture, LED fixture or the like. In alternate embodiments, a grid shifting production/manufacturing battery module may be used to provide grid shifting functionality to any lighting device by providing the grid shifting capability in line with external power to the lighting device. It is to be appreciated that the external power may be AC or DC. By way of an example, a grid shifting production/manufacturing battery inverter module may be designed to pass AC power when it is available but upon an outage or upon user control, switchover to power the lighting device from the battery inverter circuit.

In an embodiment of a grid shifting lighting system, a group of DC powered lighting devices and a grid shifting controller may be deployed to provide a lighting solution to an area with poor power distribution (i.e. without access to or isolated from a power provider, receiving unreliable power from a power provider or the like). In the embodiment, a power source such as a battery, a generator, an energy harvesting power source (solar, wind etc), an AC/DC converter etc. located proximate or inside a grid shifting controller may be deployed as part of the grid shifting system such that the DC powered lighting devices may derive power from the electrical circuit that is connected to the grid shifting controller which would manage power to the lighting devices. In embodiments, the DC powered lighting devices may be bulbs, fixtures or the like. In embodiments, the light source of the lighting devices may be LED, fluorescent, incandescent or the like. In alternate embodiments, the DC powered lighting devices may have a battery and be rechargeable from the grid shifting controller via an external power source.

In embodiments of emergency lighting devices and grid shifting lighting devices with LED light sources, an electrical circuit may be used to turn off, turn on or pulse width modulate the output of an LED driver circuit such that the path may be opened or closed to turn off or turn on power delivered to the LED light source such that the amount of power delivered to the LED light source may be reduced by an amount consistent with the pulse width modulation (i.e. dimming, reducing the light intensity or reducing the amount of power delivered by the LED driver circuit to the light sources). The electrical circuit may include two FETs such that the control may be implemented by a voltage level typical of logic circuits such that a significantly higher voltage that may be typical out of an LED driver circuit may be controlled using a much lower voltage. In some embodiments, the output of the LED driver circuit may drive a series chain of LEDs and as such the voltage drop across the series chain of LED may be significantly higher than what would be typical of a voltage of a logic circuit. By way of an example, a series chain of 15 LEDs may be powered by an LED driver circuit. At a constant current of 200 mA, the 15 LEDs would typically see a voltage drop of approximately 50 volts. Passing this through a FET to allow a control facility to turn on, turn off or pulse width modulate this path, the FET would have to be capable of withstanding more than 50 volts and the controlling logic may have to be able to control the FET with voltages as high as or close to 50 volts. To control the LED driver FET that may control the path to the LEDs, a second FET may be used to control the LED driver FET such that when the second FET is turned on, the LED driver FET is controlled to turn off and when the second FET is turned off the LED driver FET would be wired to be normally closed and thus pass power to the series chain of LEDs. The second FET may be controlled by a low voltage typical of the output of logic, a microcontroller, a microprocessor, a low voltage electrical circuit or the like. If the FETs are selected to allow a fast switching speed, a pulse width modulation may be employed to turn the path on and off quickly effectively allowing the control facility implemented with the logic, microcontroller, microprocessor, low voltage electrical circuit or the like to control the amount of power delivered to the light source from the LED driver circuit. It is to be appreciated that N channel FETs, P channel FETs etc may be used in conjunction with the claimed invention and may be wired in any manner to allow logic level control of a high voltage path to a light source. In embodiments of wireless lighting devices that contain an integrated power source, this circuit may allow a control facility to disconnect power to the light sources on the drive side of the LED driver circuit thus allowing the return of the LED driver circuit from an external power source and the return of the step up battery LED driver circuit to be tied together. In alternate embodiments, the light source may be any light source mentioned herein and the two FET control circuit may be used to allow a low voltage device to turn on, turn off or pulse width modulate power delivered to the light source. In embodiments a grid shifting lighting or electrical device may be used in demand response applications, where demand response parameters may be considered to determine when and how to charge the battery. By way of an example, an instruction may be issued by a demand response control system to grid shifting lighting or electrical devices to begin charging the integrated battery source or to schedule the charging of the integrated battery source. In demand response applications, actions taken as a result of dynamic changes in energy prices, demand or peaks in energy usage may necessitate that a demand response control entity control charge cycles of integrated battery sources that may be used to supply some or all of the power for a grid shifting lighting or electrical device.

In embodiments where a grid shifting lighting or electrical device may be used in demand response applications, a demand response control entity may monitor power on one or more lighting or electrical circuits to make a decision based on power consumption whether or not to initiate an action to use an alternate power source. In the embodiments, a demand response control entity may not move power over to an integrated power source unless the entity detects that power consumptions crosses some threshold amount of power consumed. By way of an example, if only half of the lights on a lighting circuit are turned on or some of the lights have already been dimmed, then the demand response entity may not need to take an action because power is not being used on that circuit to a level where demand response is necessary. In some embodiments, the demand response control entity may program or configure the grid shifting lighting or electrical devices with the thresholds by which their operation may require a response to a demand response action.

In embodiments, a grid shifting lighting system may contain an external grid shifting controller, where the external grid shifting controller may have a connection to a network, may communicate wirelessly or may communicate over the power lines such that the external grid shifting controller may receive control, configuration and programming or transmit status or responses to an external controlling entity that may control one or more grid shifting lighting systems, and the like. As such, the external controlling entity may control the operation of a large number of grid shifting lighting devices through communication with an external grid shifting lighting controller. The external controlling entity would not have to communicate with every end device nor would it be required to implement a wired or wireless interface and communication protocol into the end devices became the external grid shifting lighting controller may receive higher level commands from the external controlling entity and implement the required lower level commands to control the end devices to operate as required. By way of an example, a grid shifting lighting system may receive configuration and control from a demand response server or similar hardware such that the demand response may control grid shifting lighting systems that are controlled by an external grid shifting controller. In another example, a smart grid controller or meter may be capable of communicating with an external grid shifting controller to controller one or more grid shifting lighting systems to make use of grid shifting for the purposes of energy efficiency, demand response applications, peak shedding, load control, load leveling, backup power, local power generation and storage or any other use of a hybrid power system mentioned herein.

In embodiments of emergency lighting devices and grid shifting lighting devices, an architecture to provide battery backup as an AC input to AC output in-line battery backup module may be used such that the AC input is converted to DC, then the converted DC input is or'ed with the output of battery that is fed into a conversion where the output is converter through an inverter to create a AC output to the end device. The DC paths, either from the AC input or from the battery integrated into the in-line battery backup module, may be controlled with a switching circuit and to turn on, turn off or pulse width modulate to control whether power is delivered and/or the amount of power delivered to one or more devices powered by the AC output. In some embodiments, the amount of power delivered to the AC output may be monitored such that a control facility of the in-line battery backup module may be able to manage the amount of power delivered from any input source to provide a desired amount of power at the AC output and to draw the desired amount of power from the input sources.

In embodiments of emergency lighting devices, the device may be in electrical communication with a test button to provide a test of the emergency lighting device. The test button may disconnect power from the input power such that when the test button is pushed, the user may see whether the emergency lighting device may switch over to the battery backup. In some embodiments, a hold mode may be implemented where the test button is pressed down for a period of time that may be above some threshold amount of time. When a control facility detects that the button has been pushed beyond that amount of time, the control facility may enter a test mode controlling the emergency lighting device to initiate a longer duration test. In some embodiments, the control facility may allow a second press of the push button to stop test or reset light to normal operation. By way of an example, an integrated test switch with an emergency lighting device may allow a user to press the test button for less than 10 seconds and at below 10 seconds the user will see that the emergency lighting device works using its battery backup then releasing the button to return to normal operation. If the user presses the button for longer than 10 seconds, the emergency lighting device enters a long duration mode where the light may run for greater than 90 minutes showing that the battery capacity still meets a 90 minute requirement to meet emergency lighting requirements. If the user wants to stop the long duration mode, they can push the button again stopping the long duration test. In some embodiments, the push button latches the test mode on until the push button is pressed again or the long duration mode expires in either case returning the emergency lighting device to normal operation. It is to be appreciated that several different modes of operation may be entered into via sequences of different duration presses of the test button such that the control facility may provide several different test scenarios that may be entered to control the time duration of the test, indications from the light source or separate indicator lights as to the status or healthy of the emergency lighting device etc. In alternate embodiments, the function may be implemented by a wireless test button that contains a transmitter allowing a wireless receiver in the emergency lighting device to receive command and control from a user to implement the test functions described herein.

In embodiments of battery backed lighting modules, a battery backed fluorescent light fixture may be implemented where the battery backup may be part of an electronic ballast or may be in-line with an external power source into the electronic ballast. By way of an example, a fluorescent ceiling light may have a fluorescent light source, an electronic ballast, a housing allowing it to mount to a ceiling and wiring to allow a user to wire the fluorescent ceiling light to an external power source. The external power source may be AC power or may be DC power. The fluorescent light source may be built into the fixture or the fixture may contain one or more sockets to plug one or more fluorescent tubes, lamps or bulbs into the fixture to provide the light source. In some embodiments the electronic ballast may have a battery built into it such that the battery may be selected as the source of power to the light source as controlled by a control facility that is part of the electronic ballast. In alternate embodiments, the battery backup may be implemented using an electronic ballast with an in-line battery module prior to the electronic ballast with the ability to select the battery as the source of power to the electronic ballast and light source. In some embodiments, the battery backed electronic ballast or in-line battery module may contain a switch sensor function and a control facility such that the switch sense functionality may be implement in conjunction with a battery backed fluorescent light fixture. In an alternate example, the fluorescent light fixture may be a stair light that is built into a housing to mount along a stair well to provide lighting for the stairs. It is to be appreciated that the battery backed electronic ballast, in-line battery module and switch sense functionality for fluorescent light fixtures may be implemented in any light fixture housing described herein to meet the needs of a particular application.

In embodiments, a power outage may be detected in a wall switch or similar controlling device and with no power on the line still control lighting devices or electrical devices using communication over the power lines between the wall switch or similar controlling device and the lighting or electrical devices that are being controlled. It is to be appreciated that power in the wall switch or similar controlling device, lighting device or electrical device may be provided by the power source integrated into those devices to facilitate power outage functionality. In embodiments, the wall switch or similar controlling device may still control the lighting or electrical devices as they may with power applied from the line. In alternate embodiments, the wall switch or similar controlling devices may provide alternate means of control during a power outage such as automated control of the lighting or electrical devices in a pre-configured method. By way of an example, upon detecting a power outage, the wall switch or similar controlling device may instruct the control facility in a lighting device or electrical device to remain on for some period of time at which point the wall switch or similar controlling device may instruct the lighting device or electrical device to turn off, change light intensity or change mode or method of operation. In embodiments of grid shifting lighting devices or grid shifting electrical devices, input power may be shut off from grid shifting lighting devices or grid shifting electrical devices but power line communication may still need to happen to allow a grid shifting controller device to continue to configure and control the grid shifting operation in the absence of power.

In embodiments of battery powered wireless lighting modules and power outage detection function, the battery powered wireless lighting modules may be controlled such that they are turned on when a disruption may be detected where wired lighting devices are controlled. In embodiments, one or more battery powered wireless lighting modules may receive a signal transmitted from a point on the wired power distribution such that the detected state of power turns on, turns off or changes the operation of battery powered wireless lighting modules. In some embodiments, the battery powered wireless lighting modules may contain transceivers allowing battery powered wireless lighting modules to form a network to transmit, receive and forward commands, control and status. In some embodiments, a wall switch controlling wired lighting may contain a wireless transmitter and an integrated power source such as a coin cell battery, rechargeable battery or the like and may operate to control the one or more battery powered wireless lighting modules if a disruption is detected in wired power. In an embodiment where wall switch controls wired lighting, the switches may still control the battery powered wireless lighting modules. By way of an example, a power outage may be detected by the intelligent wall switch. The intelligent wall switch may transmit a control message to one or more battery powered wireless lighting modules to turn on during the outage. When the intelligent wall switch detects that power has returned, it may send an off message to one or more battery powered wireless lighting modules. In addition, the intelligent wall switch may control the battery powered wireless lighting modules through the outage such that if a user turns the switch to the on position, an on command is transmitted and the modules turn on. When the user turns the switch to the off position, an off command is transmitter and the modules turns off. In alternate embodiments, the intelligent wall switch may have additional controls on it to control the battery powered wireless lighting modules independent of control of the wired lighting. By way of an example, a separate on/off switch may be on the intelligent wall switch to control the modules. In another example, an intelligent wall switch may have a USB connector that a user may plug a laptop into to control, configure or gather status of the battery powered wireless lighting modules. By way of an example, the user may control and/or run a test of the battery powered wireless lighting modules via a software application on a laptop or similar computer device that may be connected to an intelligent wall switch to illuminate the lights, gather battery capacity status, configure auto-shutoff times or brightness levels etc.

In embodiments of emergency lighting devices or grid shifting lighting devices, a control facility may monitor the amount of power used over time to determine when to stop or reduce the use of battery power (versus monitoring battery capacity). Knowing the capacity of the battery when it was installed and knowing the history of use of the battery may allow for a battery capacity estimation. An estimate of capacity loss over time using number of charge cycles at given charge rates, temperature, the characteristics of the power consumption of lighting devices powered by the battery may allow an emergency lighting device or grid shifting lighting device to indicate when the battery capacity may be below a threshold such that the device may not meet specification. In some embodiments, a control facility in the emergency lighting device or grid shifting lighting device may use the information to change the mode of operation (brightness level at start, brightness profile over time, amount of use of battery, charge rates etc) to extend the usable battery life.

In embodiments of a security sensor, a circuit sense device with a transmitter may be installed inside a building and a receiver may be installed outside of the building between the point the electricity comes into a building and the power distribution transformer. Any change detected between the two points logs the error in time and creates an alarm. In alternate embodiments, an impedance sensing device is placed inside a building and calibrated to be able to measure the impedance or electrical characteristics of the electrical circuit out to the transformer. Any change detected in the impedance logs the change in time and creates an error. Immediate detection of a break or change in impedance or electrical characteristics between a building and the power distribution transformer that provides power to the building may allow a detection of tampering of the power by energy thieves or the like. By way of an example, the switch sense circuitry may monitor an electrical characteristic such as impedance of the connection. If the electrical characteristic changes above or below some threshold, the switch sense circuitry may have detected tampering with the power distribution network. In alternate embodiments, a detection of a disconnection between the two points may indicate that someone or something has broken the lines intentionally or unintentionally. An alarm or indication that a break in the lines may have occurred allows a user to take action about the detected change.

A lighting adapter or fixture with a battery and integrated light source may contain the ability to detect a bad light bulb plugged in (for example, light bulb that has burned out). Upon detecting a defective light source, the adapter or fixture may switch over to the internal battery and light source on the adapter or fixture to provide light during the outage of light caused by the burned out light bulb. The detection of a bad light bulb may be implemented by monitoring the current flowing through the adapter to the bulb and a detection that the bulb is plugged in. If current is not flowing and the bulb is plugged in, the adapter may determine that the light source may not be illuminated and in response illuminate the light source on the adapter or fixture. In alternate embodiments, the secondary light source and battery power may be integrated into a bulb or fixture such that can come on powered by battery when main light source goes bad. A single LED in "backup" mode may be in standby and only be powered when main path has power but is not drawing any power (ie the primary light source is bad). In alternate embodiments, a ballast or LED driver module may contain a battery and integrated light source and the ability to detect if power is being drawn by the fluorescent or LED light source. During normal operation, a power detector may detect some amount of power drawn by the light source. When the power detector detects that the power drawn by the primary light source drops below a threshold such that the primary light source is drawing little or no power, the secondary light source integrated into the ballast or LED driver module may illuminate. In alternate embodiments, the ballast or LED driver module do not have the secondary light source integrated into their housing but rather the secondary light source is in a separate housing that may be driven by battery power integrated into the ballast or LED driver module. In alternate embodiments when the secondary light source may be in a secondary housing, the battery power may also be in the separate house and the control may come from ballast or LED driver module. In other embodiments, the secondary light source, battery power, power detector and control facility that monitors the power drawn by a lighting circuit or electrical circuit are all in the separate housing and may be place in-line with the lighting circuit or electrical circuit and may illuminate the secondary light source based on the amount of power drawn by the circuit. In alternate embodiments, the lighting circuit or electrical circuit may generate an alarm when the power detector detects an amount of power drawn by the circuit that may indicate an alarm condition.

In some embodiments, a battery powered wireless lighting module may be built into an explosion proof or flame proof housing. The wireless lighting module may have a battery integrated and may contain a wireless receiver that allows it to be controlled from a distance with a wireless transmitter control device. The explosion proof or flame proof housing may have an explosion proof or flame proof antenna attached to the explosion proof wireless lighting module to allow it to receive control. In some embodiments, the explosion proof wireless lighting module may contain energy harvesting methods to recharge the integrated battery. In some embodiments, the batteries may be removable and replaceable. In some embodiments, a low battery indication may be present to allow a user to change or charge batteries. In some embodiments, the explosion proof wireless lighting module may contain a transceiver to allow it to receive and transmit control messages such that one or more explosion proof wireless lighting modules may form a network to allow control to be forwarded throughout the network. By way of an example, at an oil refinery or a coal mine these battery powered wireless lighting modules may be installed such that when there is an emergency, such as an explosion in a coal mine, a user with a wireless transmitter control device may turn on these lights that had survived the explosion and still are capable of receiving control and turning on. It is to be appreciated that the wireless transmitter control device may allow user control to turn the lights on, off, change light intensity, change light color, blink in a manner to indicate the nature of an emergency or communicate a message and the like. In embodiments using an LED light source, a high battery capacity may allow for an extended illumination of the light source perhaps for days or months. It is to be appreciated that there may be one or more lenses, reflectors, optical filters, aperture, and so on that are integrated into the housing of the explosion or flame proof wireless light such that the light source may be protected from the cause of the hazard.

In embodiments a mesh network of battery powered wireless lighting device may provide the ability to deploy a network of wirelessly controlled and wirelessly powered lighting device. As such, costly and time consuming wiring typically associated with installing, moving and/or replacing conventional lighting and/or to provide power or a network connection to conventional lighting need not be effectuated in connection with the networked wireless lighting devices described herein. The networked battery powered wireless lighting device may comprise of an interface component, a battery, a light source, and/or a processor. The networked battery powered wireless lighting device may be incorporated into a housing. It is contemplated that any size and/or shape housing can be employed with the networked battery powered wireless lighting device. The interface component may receive an input from a disparate device or can provide various adaptors, connectors, channels, communication paths, etc. to enable interaction with the disparate device. Pursuant to an illustration, the input can be wirelessly transmitted (e.g., via an RF signal, an IR signal, . . . ) from the disparate device to the interface component; thus, the interface component can be a receiver and/or a transceiver that obtains the wirelessly transferred signal. By way of an example, any type of remote control may wirelessly communicate with the interface component. For instance, the remote control can be a stand-alone remote control and/or incorporated into a disparate device (e.g., incorporated into a key fob, a programmable wireless transceiver integrated in a wall controller, . . . ). Moreover, the remote control can be a personal computer, a cellular phone, a smart phone, a laptop, a handheld communication device, a handheld computing device, a global positioning system, a personal digital assistant (PDA), and/or any other suitable device; such devices can communicate directly with the interface component and/or via a network (e.g., local area network (LAN), wide area network (WAN), cellular network, . . . ). Additionally or alternatively, the interface component may be a sensor that can monitor a condition associated with the networked battery powered wireless lighting device to generate the input. It is to be appreciated that any sensor mentioned herein may be used in conjunction with the claimed subject matter. Further, the interface component can wirelessly transmit data (e.g., feedback, related to a current and/or anticipated future state, . . . ) to one or more remote networked battery powered wireless lighting devices. By way of another example, the interface component can wirelessly communicate with an interface component of a disparate remote networked battery powered wireless lighting devices to enable coordinated operation between more than one remote networked battery powered wireless lighting devices. Following this example, an input can be retransmitted within a network of battery powered wireless lighting devices, where the network of lighting devices can be dispersed within a geographic area.

The battery may be any number and/or type of battery. For instance, the battery may be a rechargeable battery. According to another example, the battery may be a non-rechargeable battery. The battery supplies power to the to enable installing, moving, replacing, etc. the networked battery powered wireless lighting device at substantially any indoor or outdoor location. It is to be appreciated that the battery capacity may be any size to meet the application. By way of an example, a small outdoor network battery powered wireless lighting device with a motion sensor may require 3 D cell batteries to operate for over a year, may power the light source when triggered by motion and may be part of a network of battery powered wireless lighting devices that may be controlled by a remote device or coordinate operation over the network. In some embodiments, an energy harvesting method such as solar, wind or the like may be integrated into the networked battery powered wireless lighting device such that a rechargeable battery, fuel cell, capacitor or the like may be recharged by the energy harvesting method. In alternate embodiments, there may not be a battery or the like and the energy harvesting method provides power for the networked battery powered wireless lighting device. Embodiments may include but are not limited to any known light source including LEDs, compact fluorescent, fluorescent, induction, halogen, gas discharge, organic LEDs (OLED), plasma, radio generated plasma and incandescent bulbs and can illuminate any size area. By way of an example, a networked battery powered wireless lighting device using an LED light source may be designed for outdoor lighting applications such as but not limited to street lamps, path lights, wall lights, landscape lights, lamp posts etc. In an example of a street lamp, the battery may be a large battery pack and may reside in a separate housing. In this case, the battery pack may be in a NEMA enclosure at the base of the street lamp and provide several thousand watt hours of power. A highly efficient LED light source may require three to five watts to put out enough light for a street lamp application. If a day/night light sensor enables the light or the street lamp can be controlled over a network to turn on and off based on time of day or expected occupancy, a three thousand watt hour power source may operate a three watt light source for a thousand hours.

The processor may control operation of the light source. The processor, for example, may execute instructions to switch one or more LEDs on and/or off, change an intensity of illumination (e.g., brightness), switch a wavelength of light emitted from the LEDs (e.g., to change light color), manipulate direction of illumination (e.g., by moving, rotating, etc. one or more of the LEDs) and the like. Further, it is contemplated that any number, type, color, arrangement, etc. of LEDs can be utilized with the networked battery powered wireless lighting device. The processor employs the input obtained by the interface component. The processor may further include a network component, state modification component, a timer component, an intensity regulation component, and/or a wavelength control component; however, it is to be appreciated that the processor may include a subset of these components. The network component may allow the networked battery powered wireless lighting device to be assigned one or more unique network addresses, one or more group network addresses, one or more broadcast addresses and the like. The processor and the interface component may provide the protocol layers to interface the networked battery powered wireless lighting device to any network interface type mentioned herein (wireless PAN, wired or wireless LAN, wireless MAN, wireless WAN, mobile device networks and the like). It is also to be appreciated that any standard or proprietary protocol (e.g. networking protocols such as IP, TCP, UDP, routing protocols etc. and physical layer protocols such as WIFI, Ethernet, ZIGBEE, 2.5G, 3G, WiMax, GSM etc.) may be used to communicate between networked battery powered wireless lighting device. In some embodiments, a bridge between a wired network or an existing lighting or building control system using any of the networking interfaces mentioned herein or a proprietary network interface may provide a communication channel to allow the lighting or building control system to control one or more networked battery powered wireless lighting devices and as such allow a wired lighting installation to include battery powered wireless lighting devices such that battery powered wireless lighting devices may provide the ability to deploy a network of wirelessly controlled and wirelessly powered lighting device as an extension of the wired lighting installation to provide light indoors and outdoors where it may be difficult to install, move and/or replace conventional lighting.

In association with networked battery powered wireless lighting devices, a lighting control system may be deployed to manage the installation of networked battery powered wireless lighting devices. The wireless lighting control system may comprise of a lighting controller and one or more networked battery powered wireless lighting devices. In some embodiments, the lighting controller may be dedicated to the control of a completely wireless installation of one or more networked battery powered wireless lighting devices. In other embodiments, the lighting controller may control a lighting installation that is wired for power or control and also may have a bridge or connection to one or more networked battery powered wireless lighting devices such that the networked battery powered wireless lighting devices may extend the reach of a lighting installation where it may be difficult, impractical or cost prohibitive to provide wired power or wired control to. Thus, the battery powered wireless lighting devices may provide auxiliary lighting for a lighting installation. By way of an example, an installation of lighting for a commercial building may be extended outside such that the lighting control system that manages lighting wired to building power may be adapter to manage fully wireless lights that are installed for outdoor lighting, for indoor lighting in locations where fully wireless lights have an advantage etc. The lighting controller may control, configure, program or communicate with networked battery powered wireless lighting devices to manage on/off, lighting intensity, light color or other characteristics of the light source, to manage the operation of sensors within a battery powered wireless lighting device such as the operation of motion sensors for occupancy sensing, light sensors for day/night control or daylight harvesting and the like, to manage intelligent functions of the networked battery powered wireless lighting devices such as time of day, calendar, synchronizing time to network clocks or timer based operations for scheduling operation based on time and to manage network functions such as distribute or exchange routing or forwarding information with other networked battery powered wireless lighting devices. In alternate embodiments, the wireless lighting device may be replaced with a wireless lighting fixture that any light source such as a bulb, tube, lamp or the like may connect to. In such an embodiment, the networked battery powered wireless lighting fixture with one or more light sources connected to it may provide the functionality described herein for the networked battery powered wireless lighting device such that the networked battery powered wireless lighting fixture and one or more connected light sources may logically operate in a manner similar to a networked battery powered wireless lighting device.

In embodiments of a grid shifting lighting device, an LED light fixture with an LED light source and an intelligent driver module that contains an integrated rechargeable battery and the ability to drive the LED light source from the battery as well as the ability to drive the LED light source from a connection to grid power may be implemented. Intelligence in the form of a microcontroller, microprocessor, programmable logic or the like may control the amount of power consumed in each path (i.e., the path from the battery and the path from the grid). The intelligence may implement control of the amount of power consumed in each path through pulse width modulation control of two switching circuits to allow the two paths to be combined and the amount of power supplied from each path to be controlled via the pulse width modulation. This allows for control of the amount of power consumed from each path therefore any amount of the power supplied to the light source may be shared between the two sources of power. Multiple methods of control implemented by the integrated intelligence may be provided to make a decision on when to perform grid shifting and how much power to shift. One method may be time of day and calendar based. The intelligence may maintain an accurate time of day clock and be capable of maintaining a schedule of when to activate or deactivate grid shifting and by what amount. At each entry in the schedule, the intelligence may change the control of the two paths. In addition, the integrated intelligence may be capable of scheduling charge cycles for the rechargeable battery such that the energy storage device may be charged at the optimal time depending on the application. Time scheduling may be used as a trigger to power the light fixture during a power outage. By way of an example, if full light intensity is required from the fixture during work hours, the light fixture can be programmed to automatically power the light source from the battery during work hours when it detects that the grid connection is no longer providing power. Another method may be the reception of a load control signal from an external controller. This method correlates to an interrupt from an external control source to reduce demand on the grid or return to normal operation. In the context of a grid shifting light fixture, the load control command may contain the amount of power consumption to be shifted and for how long. Time based and load control based methods of triggering grid shifting have practical application in peak shedding, demand response and other load control mechanisms that may be desirable to a power provider. The grid shifting lighting device may contain a communication interface. A software application may run on a separate device such as a laptop, computer, handheld device, server or the like that allows a user to enter the parameters for grid shifting such that those parameters may then get communicated to the grid shifting lighting device. A user interface may need to create and format for the commands that get transferred from the user interface through the communication interface to the intelligence on the lighting device. In some embodiments, the grid shifting lighting device may have a transceiver such that one or more grid shifting lighting devices may form a network to receive and/or forward commands or data throughout a network of grid shifting lighting devices. It is to be appreciated that the communication interface may be any type of wired or wireless interface described herein.

The methods and systems described herein may be deployed in part or in whole through a machine that executes computer software, program codes, and/or instructions on a processor. The present invention may be implemented as a method on the machine, as a system or apparatus as part of or in relation to the machine, or as a computer program product embodied in a computer readable medium executing on one or more of the machines. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, ZIP drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipments, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

The invention claimed is:

1. A coordinated lighting system with camera capabilities comprising:
a first lighting module, including a battery, a first light source, a wireless transceiver, a processor, and a housing;
a second lighting module separate from the first lighting module, the second lighting module including:
a second light source;
a sensor configured to detect at least one of motion and a proximity of an object;
a processor device in communication with the sensor and configured to generate a control signal in response to the detection of the motion or the proximity of the object;
a camera; and
a transmitter configured to transmit the control signal to the first lighting module;
and an intelligent device comprising a remote control including a receiver and a display;
wherein the processor device of the second lighting module is further configured to cause a change in illumination of the second light source of the second lighting module in response to the detection of the motion or the proximity of the object, the wireless transceiver of the first lighting module is configured to receive the control signal, and the processor of the first lighting module is configured to control illumination of the first light source of the first lighting module based on the control signal received from the second lighting module; and
wherein the intelligent device is configured to receive at least one of a video stream and a picture from the camera.

2. The coordinated lighting system with camera capabilities of claim 1, wherein the control signal transmitted by the second lighting module is a first control signal, including one of an on signal, an off signal, or a change in brightness signal.

3. The coordinated lighting system with camera capabilities of claim 2, further comprising a plurality of lighting modules, and wherein the second lighting module is configured to transmit a second control signal, including one of an on signal, an off signal, or a change in brightness signal to each of the plurality of lighting modules, and wherein the second control signal is different than the first control signal.

4. The coordinated lighting system with camera capabilities of claim 1, wherein the intelligent device comprises at least one of a personal computer, a cellular phone, a smart phone, a laptop, a handheld communication device, and a handheld computing device.

5. The coordinated lighting system with camera capabilities of claim 1, wherein the battery is a rechargeable battery, the coordinated lighting system further comprising a solar power source to recharge the rechargeable battery.

6. The coordinated lighting system with camera capabilities of claim 1, wherein the first lighting module is identified by a predetermined channel, and wherein the control signal includes at least a lighting command and a channel identifier corresponding to the predetermined channel.

7. The coordinated lighting system with camera capabilities of claim 1, wherein the control signal includes one of a light on command, a light off command, or a light change brightness command.

8. The coordinated lighting system with camera capabilities of claim 1, wherein the second lighting module includes a timer, and wherein the processor device of the second lighting module is further configured to initiate the timer in response to the detection of the motion or the proximity of the object and to generate an off signal for transmission to the first lighting module based on an output of the timer.

9. The coordinated lighting system with camera capabilities of claim 1, wherein the processor of the first lighting module is configured to cause the transceiver to re-transmit the control signal generated by the processor device of the second lighting module and received by the wireless transceiver to a third lighting module.

10. The coordinated lighting system with camera capabilities of claim 9, wherein a processor of the third lighting module is configured to control illumination of a light source of the third lighting module based on the control signal re-transmitted by the wireless transceiver of the first lighting module.

11. The coordinated lighting system with camera capabilities of claim 1, wherein the first lighting module includes a sensor, and the output of the sensor is used to generate a control signal to change the illumination of the second light source in the second lighting module.

12. The coordinated lighting system with camera capabilities of claim 1, wherein the battery of the first lighting module is a first battery, and wherein the second lighting module includes a second battery, and the change in illumination of a second light emitting diode in the second lighting module includes powering the second light source with power from the second battery.

13. The coordinated lighting system with camera capabilities of claim 1, wherein the control signal is configured to cause the illumination of the first light source of the first lighting module and the second light source of the second lighting module to be changed at a substantially same time.

14. The coordinated lighting system with camera capabilities of claim 1, wherein the first lighting module is configured to be a spotlight, a ceiling light, an under cabinet light, a wall sconce, a step light, a night light, a path light or a light fixture.

15. The coordinated lighting system with camera capabilities of claim 1, wherein the battery is a non-rechargeable battery.

16. A lighting device with camera capabilities, comprising:
a housing;
an environmental sensor;
at least one light source;
a power source;
a camera;
a wireless transceiver; and
a processor configured to:
detect presence of a predetermined condition based on an output of the environmental sensor;
cause a change in illumination of the at least one light source of the lighting device in response to the detection of the predetermined condition;
generate a first control signal in response to the detection of the predetermined condition and cause the wireless transceiver to transmit the first control signal for use by another lighting device in controlling illumination of at least one light source associated with the another lighting device, wherein the first control signal is configured to cause the illumination of the at least one light source associated with the another lighting device to be changed;

control the illumination of the at least one light source, by causing power from the battery to be supplied to the at least one light source, in response to at least one of the detection of the predetermined condition based on the output of the environmental sensor and to a second control signal received via the wireless transceiver from the another lighting device; and cause the camera to capture video stream or a picture and transmit the video stream or the picture via the wireless transceiver to an intelligent device comprising a remote control configured to receive at least one of the video stream and the picture from the camera.

17. The lighting device with camera capabilities of claim 16, wherein controlling illumination of the at least one light source includes turning on the at least one lighting source, turning off the at least one lighting source, or changing brightness of the at least one lighting source.

18. The lighting device with camera capabilities of claim 16, wherein the processor is further configured to cause the wireless transceiver to re-transmit the second control signal received via the wireless transceiver from the another lighting device.

19. The lighting device with camera capabilities of claim 16, wherein the predetermined condition includes at least one of a detected motion, a detected proximity of an object and a detected change in ambient light.

20. The lighting device with camera capabilities of claim 16, wherein the intelligent device comprises at least one of a personal computer, a cellular phone, a smart phone, a laptop, a handheld communication device, and a handheld computing device.

21. The lighting device with camera capabilities of claim 16, wherein the power source includes at least one of a wired AC power source, a wired DC power source, a non-rechargeable battery, a rechargeable battery, and one or more solar cells.

* * * * *